US011080031B2

(12) United States Patent
Bequet et al.

(10) Patent No.: US 11,080,031 B2
(45) **Date of Patent: *Aug. 3, 2021**

(54) MESSAGE-BASED COORDINATION OF CONTAINER-SUPPORTED MANY TASK COMPUTING

(71) Applicant: SAS Institute Inc., Cary, NC (US)

(72) Inventors: Henry Gabriel Victor Bequet, Cary, NC (US); Ronald Earl Stogner, Cary, NC (US); Chaowang "Ricky" Zhang, Morrisville, NC (US); Qing Gong, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,577

(22) Filed: Oct. 6, 2020

(65) Prior Publication Data

US 2021/0026611 A1 Jan. 28, 2021

Related U.S. Application Data

(63) Continuation-in-part of application No. 16/814,481, filed on Mar. 10, 2020, now Pat. No. 10,795,935, (Continued)

(51) Int. Cl.
*G06F 9/46* (2006.01)
*G06F 8/51* (2018.01)
(Continued)

(52) U.S. Cl.
CPC .................. *G06F 8/51* (2013.01); *G06F 9/46* (2013.01); *G06F 16/9014* (2019.01); (Continued)

(58) Field of Classification Search
None
See application file for complete search history.

(56) References Cited

U.S. PATENT DOCUMENTS 8,001,420 B2 8/2011 Tenenti
8,549,536 B2 * 10/2013 Vasil .................... G06F 9/5038 718/106

(Continued)

OTHER PUBLICATIONS

Gerlach et al.; "Skyport-Container-Based Execution Environment Management for Multi-Cloud Scientific Workflows", IEEE 2014 (Gerlach_2014.pdf; pp. 1-8) (Year: 2014).*

(Continued)

*Primary Examiner* — Hiren P Patel
(74) *Attorney, Agent, or Firm* — Kacvinsky Daisak Bluni PLLC

(57) ABSTRACT

An apparatus includes processor(s) to: receive a request to perform a job flow; retrieve a job flow definition from federated area(s); store, within a job queue, a job performance request message comprising the job flow definition; within a first performance container, execute a performance routine causing the processor(s) to, in response to the storage of the job performance request message within the job queue, derive an order of performance of tasks specifying a first task based on dependencies among the tasks, and store, within a task queue, a first task routine execution request message comprising an identifier associated with the first task; and within a first task container, in response to the storage of the first task routine execution request message within the task queue, use the identifier to retrieve a first task routine from the federated area(s), and execute the first task routine to perform the first task.

27 Claims, 118 Drawing Sheets

Related U.S. Application Data which is a continuation-in-part of application No. 16/708,179, filed on Dec. 9, 2019, now Pat. No. 10,740,076, which is a continuation-in-part of application No. 16/587,965, filed on Sep. 30, 2019, now Pat. No. 10,650,046, which is a continuation-in-part of application No. 16/556,573, filed on Aug. 30, 2019, now Pat. No. 10,650,045, which is a continuation-in-part of application No. 16/539,222, filed on Aug. 13, 2019, now Pat. No. 10,649,750, which is a continuation of application No. 16/538,734, filed on Aug. 12, 2019, now Pat. No. 10,642,896, which is a continuation-in-part of application No. 16/223,518, filed on Dec. 18, 2018, now Pat. No. 10,380,185, which is a continuation-in-part of application No. 16/205,424, filed on Nov. 30, 2018, now Pat. No. 10,346,476, which is a continuation-in-part of application No. 15/897,723, filed on Dec. 15, 2018, now Pat. No. 10,331,495, said application No. 16/538,734 is a continuation-in-part of application No. 16/236,401, filed on Dec. 29, 2018, now Pat. No. 10,409,863, which is a continuation-in-part of application No. 16/039,745, filed on Jul. 19, 2018, now Pat. No. 10,360,069, which is a continuation-in-part of application No. 15/897,723, filed on Feb. 15, 2018, now Pat. No. 10,331,495, which is a continuation-in-part of application No. 15/896,613, filed on Feb. 14, 2018, now Pat. No. 10,002,029, which is a continuation-in-part of application No. 15/851,869, filed on Dec. 22, 2017, now Pat. No. 10,078,710, which is a continuation of application No. 15/613,516, filed on Jun. 5, 2017, now Pat. No. 9,852,013, which is a continuation of application No. 15/425,886, filed on Feb. 6, 2017, now Pat. No. 9,684,544, which is a continuation of application No. 15/425,749, filed on Feb. 6, 2017, now Pat. No. 9,684,543.

(60) Provisional application No. 62/972,240, filed on Feb. 10, 2020, provisional application No. 62/985,455, filed on Mar. 5, 2020, provisional application No. 62/816,160, filed on Mar. 10, 2019, provisional application No. 62/776,691, filed on Dec. 7, 2018, provisional application No. 62/739,314, filed on Sep. 30, 2018, provisional application No. 62/725,186, filed on Aug. 30, 2018, provisional application No. 62/717,873, filed on Aug. 12, 2018, provisional application No. 62/654,643, filed on Apr. 9, 2018, provisional application No. 62/631,462, filed on Feb. 15, 2018, provisional application No. 62/801,173, filed on Feb. 5, 2019, provisional application No. 62/689,040, filed on Jun. 22, 2018, provisional application No. 62/534,678, filed on Jul. 19, 2017, provisional application No. 62/560,506, filed on Sep. 19, 2017, provisional application No. 62/460,000, filed on Feb. 16, 2017, provisional application No. 62/297,454, filed on Feb. 19, 2016, provisional application No. 62/292,078, filed on Feb. 15, 2016.

(51) Int. Cl.

| | |
|---|---|
| ***G06N 3/08*** | (2006.01) |
| ***G06F 16/901*** | (2019.01) |
| ***G06F 16/903*** | (2019.01) |
| *H04L 29/08* | (2006.01) |

(52) U.S. Cl.

CPC ......... *G06F 16/90344* (2019.01); *G06N 3/08* (2013.01); *H04L 67/10* (2013.01)

(56) References Cited

U.S. PATENT DOCUMENTS

| | | | |
|---|---|---|---|
| 8,706,798 B1 * | 4/2014 | Suchter | H04L 43/0876 709/202 |
| 8,793,691 B2 | 7/2014 | Devadhar | |
| 8,849,891 B1 * | 9/2014 | Suchter | H04L 43/08 709/202 |
| 8,869,165 B2 | 10/2014 | Dasgupta et al. | |
| 9,280,381 B1 * | 3/2016 | Florissi | G06F 11/302 |
| 9,372,735 B2 * | 6/2016 | Calder | G06F 9/5077 |
| 9,465,653 B2 | 10/2016 | Kishore et al. | |
| 9,557,988 B2 | 1/2017 | Binjrajka | |
| 9,645,845 B2 | 5/2017 | Marwinski et al. | |
| 9,740,538 B1 | 8/2017 | Cohen et al. | |
| 9,747,127 B1 * | 8/2017 | Florissi | G06F 9/5027 |
| 9,946,576 B2 * | 4/2018 | van Velzen | G06F 8/70 |
| 10,013,267 B1 * | 7/2018 | Wagner | G06F 9/445 |
| 10,120,722 B2 | 11/2018 | Hamway et al. | |
| 10,235,783 B2 | 3/2019 | Zeyl et al. | |
| 10,282,690 B1 | 5/2019 | DelFranco et al. | |
| 10,372,492 B2 | 8/2019 | Kishore et al. | |
| 10,395,181 B2 | 8/2019 | Bowers et al. | |
| 10,437,689 B2 | 10/2019 | Taubler et al. | |
| 10,474,488 B2 | 11/2019 | Aleksandrov et al. | |
| 10,740,076 B2 * | 8/2020 | Bequet | G06F 16/182 |
| 10,761,765 B2 * | 9/2020 | Duggal | G06F 3/0613 |
| 10,846,204 B2 | 11/2020 | Vaishnav et al. | |
| 2011/0225565 A1 | 9/2011 | van Velzen et al. | |
| 2014/0040905 A1 * | 2/2014 | Tsunoda | G06Q 10/06311 718/103 |
| 2014/0208169 A1 | 7/2014 | Randhir et al. | |
| 2015/0067028 A1 * | 3/2015 | Kumar | G06F 9/5038 709/203 |
| 2015/0067698 A1 | 3/2015 | Naseh et al. | |
| 2016/0371122 A1 * | 12/2016 | Nair | G06F 9/46 |
| 2019/0205792 A1 | 7/2019 | Huang | |
| 2020/0184376 A1 | 6/2020 | Parameswaran et al. | |

OTHER PUBLICATIONS

Zheng et al; "Integrating Containers into Workflows: A Case Study Using Makeflow, Work Queue, and Docker", ACM 2015, (Zheng_2015.pdf; pp. 1-8) (Year: 2015).*

Wikipedia, "Apache Avro" Dec. 13, 2019, retreived from https://en.wikipedia.org/wiki/Apache_Avro, 5 pages.

Apache Software Foundation, "Apache Parquet" Dec. 13, 2019, retreived from parquet.apache.org/documentation/latest, 7 pages.

Cloudera Community, "Between Avro, Parquet, and RC/ORC which is useful . . ." Dec. 13, 2019, retreived from https://community.cloudera.com/t5/Support-Questions/Between-Avro-Parquet-and-RC-ORC-which-is-useful-for/td-o/222271, 7 pages.

Bhatia, R., "Big Data File Formats", Big Data File Formats—Clairvoyant Blog, Dec. 13, 2019, retreived from https://blog.clairvoyantsoft.com/big-data-file-formats-3fb659903271.

Woodie, A., "Bit Data File Formats Demystified", Datanami, May 16, 2018, retreived from https://www.datanami.com/2018/05/16/big-data-file-formats-demystified/?, 4 pages.

Author Unknown, "The Data Lake Engine", Dremio is the data lake engine—Dremio, Dec. 13, 2019, retreived from https://www.dremio.com, 6 pages.

Author Unknown, GitHub—apache/parquet-format: Apache Parquet, Dec. 13, 2019, retreived from https://github.com/apache/parquet-format, 7 pages.

Manannykov, D., "How to Work with Avro Files", Dzone Big Data, Oct. 11, 2018, retreived from https://dzone.com/articles/new-article on Dec. 13, 2019, 14 pages.

Author Unknown, "Lighning-fast Queries, Directly on Data Lake Storage", Lightnin-fast queries—Dremio, Dec. 13, 2019, retreived from https://www.dremio.com/data-lake-engine/fast-queries/, 3 pages.

Karanjawala, R.,"ORC vs. Parquet Vs. Avro: How to Delect a Right File Format for Hive?", ORC Vs Parquet Vs Avro How to Select Right File Format for Hive?—Ellicium, Jul. 3, 2017, retreived from https://www.ellicium.com/orc-parquet-avro/ Dec. 13, 2019, 4 pages.

(56) References Cited

OTHER PUBLICATIONS

Palkar, et al., "Weld: A Common Runtime for High Performance Data Analytics", 8th Biennial Conference on Innovative Data Systems Research (CIDR '17) Jan. 8-11, 2017, Chaminade, Califormia, USA, 8 pages.
Author Unknown, "Ursa Labs Technology", date unknown, 14 pages.
Author Unknown, "Ursa Labs Technology", retreived from wesm.github.io/urslalabs-staging/tech/ Dec. 10, 2020, 9 pages.

* cited by examiner

2000

2000

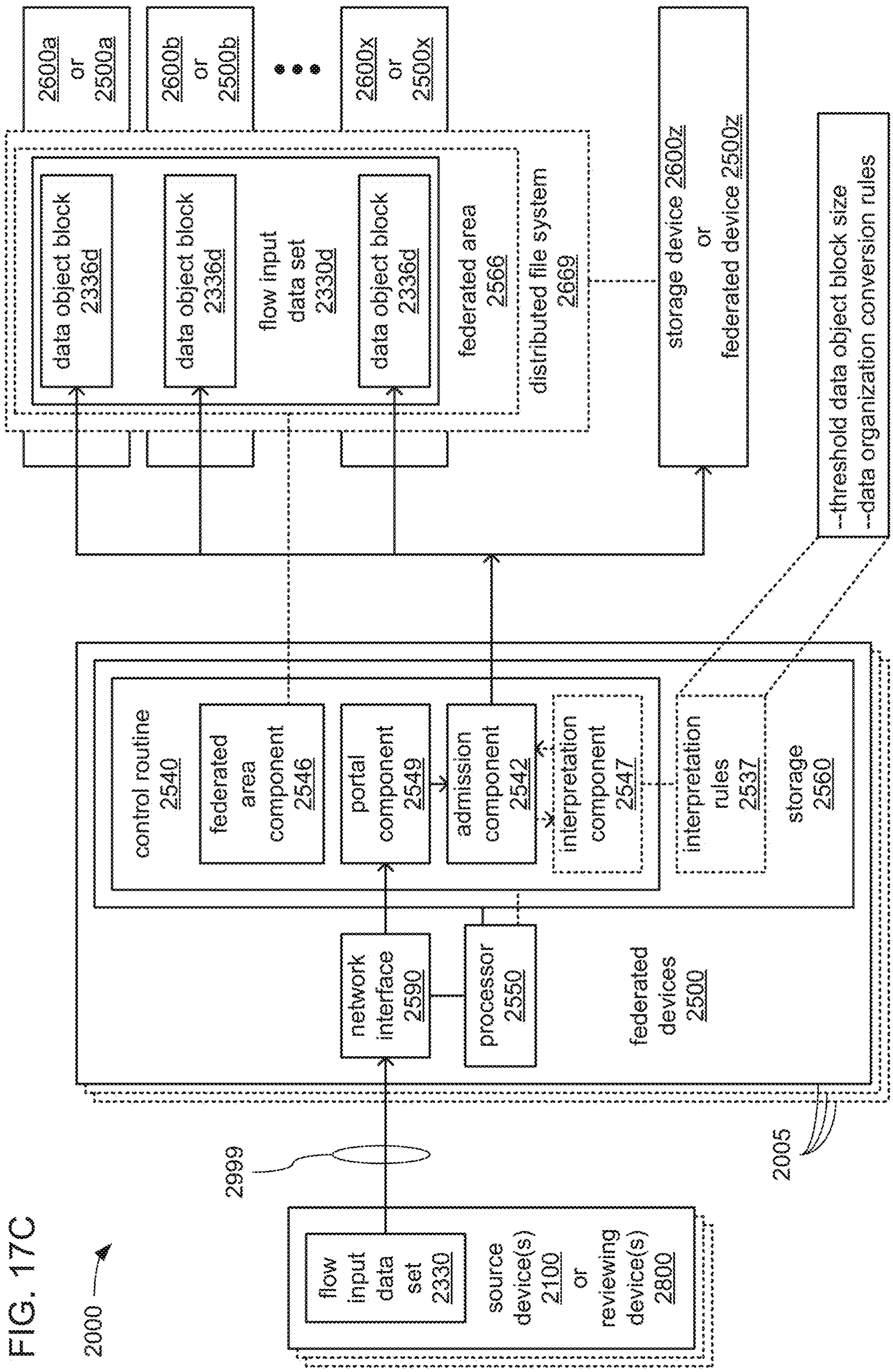
FIG. 17C
2000
flow input data set 2330
source device(s) 2100 or reviewing device(s) 2800
2999
2005
network interface 2590
processor 2550
federated devices 2500
control routine 2540
federated area component 2546
portal component 2549
admission component 2542
interpretation component 2547
interpretation rules 2537
storage 2560
--threshold data object block size
--data organization conversion rules
data object block 2336d
flow input data set 2330d
federated area 2566
distributed file system 2669
2600a or 2500a
2600b or 2500b
2600x or 2500x
storage device 2600z or federated device 2500z 2000
devices 2100 or 2800
2999
2500 and/or 2600
portal data 2539
request data 2535
per request...
--request details
--external status
--identifier(s)
message broker routine 2649
portal component 2549
container 2565p
messaging routine 2644
container 2565m
portal pod 2661p
2669

3200

3500

3500

3500

3500

3600

MESSAGE-BASED COORDINATION OF CONTAINER-SUPPORTED MANY TASK COMPUTING

CROSS-REFERENCE TO RELATED APPLICATIONS

This application is a continuation-in-part of, and claims the benefit of priority under 35 U.S.C. § 120 to, U.S. patent application Ser. No. 16/814,481 filed Mar. 10, 2020; which is a continuation-in-part of, and claims the benefit of priority under 35 U.S.C. § 120 to, U.S. patent application Ser. No. 16/708,179 filed Dec. 9, 2019 (since issued as U.S. Pat. No. 10,740,076); which is a continuation-in-part of, and claims the benefit of priority under 35 U.S.C. § 120 to, U.S. patent application Ser. No. 16/587,965 filed Sep. 30, 2019 (since issued as U.S. Pat. No. 10,650,046); which is a continuation-in-part of, and claims the benefit of priority under 35 U.S.C. § 120 to, U.S. patent application Ser. No. 16/556,573 filed Aug. 30, 2019 (since issued as U.S. Pat. No. 10,650,045); which is a continuation-in-part of, and claims the benefit of priority under 35 U.S.C. § 120 to, U.S. patent application Ser. No. 16/539,222 filed Aug. 13, 2019 (since issued as U.S. Pat. No. 10,649,750); which is a continuation of, and claims the benefit of priority under 35 U.S.C. § 120 to, U.S. patent application Ser. No. 16/538,734 filed Aug. 12, 2019 (since issued as U.S. Pat. No. 10,642,896); which is a continuation-in-part of, and claims the benefit of priority under 35 U.S.C. § 120 to, U.S. patent application Ser. No. 16/223,518 filed Dec. 18, 2018 (since issued as U.S. Pat. No. 10,380,185); which is a continuation-in-part of, and claims the benefit of priority under 35 U.S.C. § 120 to, U.S. patent application Ser. No. 16/205,424 filed Nov. 30, 2018 (since issued as U.S. Pat. No. 10,346,476); which is a continuation-in-part of, and claims the benefit of priority under 35 U.S.C. § 120 to, U.S. patent application Ser. No. 15/897,723 filed Feb. 15, 2018 (since issued as U.S. Pat. No. 10,331,495); all of which are incorporated herein by reference in their respective entireties for all purposes.

U.S. patent application Ser. No. 16/538,734 is also a continuation-in-part of, and claims the benefit of priority under 35 U.S.C. § 120 to, U.S. patent application Ser. No. 16/236,401 filed Dec. 29, 2018 (since issued as U.S. Pat. No. 10,409,863); which is a continuation-in-part of, and claims the benefit of priority under 35 U.S.C. § 120 to, U.S. patent application Ser. No. 16/039,745 filed Jul. 19, 2018 (since issued as U.S. Pat. No. 10,360,069); which is a continuation-in-part of, and claims the benefit of priority under 35 U.S.C. § 120 to, the aforementioned U.S. patent application Ser. No. 15/897,723; all of which are incorporated herein by reference in their respective entireties for all purposes.

U.S. patent application Ser. No. 15/897,723 is a continuation-in-part of, and claims the benefit of priority under 35 U.S.C. § 120 to, U.S. patent application Ser. No. 15/896,613 filed Feb. 14, 2018 (since issued as U.S. Pat. No. 10,002, 029); which is a continuation-in-part of, and claims the benefit of priority under 35 U.S.C. § 120 to, U.S. patent application Ser. No. 15/851,869 filed Dec. 22, 2017 (since issued as U.S. Pat. No. 10,078,710); which is a continuation of, and claims the benefit of priority under 35 U.S.C. § 120 to, U.S. patent application Ser. No. 15/613,516 filed Jun. 5, 2017 (since issued as U.S. Pat. No. 9,852,013); which is a continuation of, and claims the benefit of priority under 35 U.S.C. § 120 to, U.S. patent application Ser. No. 15/425,886 filed Feb. 6, 2017 (since issued as U.S. Pat. No. 9,684,544); which is a continuation of, and claims the benefit of priority under 35 U.S.C. § 120 to, U.S. patent application Ser. No.

15/425,749 also filed on Feb. 6, 2017 (since issued as U.S. Pat. No. 9,684,543); all of which are incorporated herein by reference in their respective entireties for all purposes.

This application also claims the benefit of priority under 35 U.S.C. § 119(e) to U.S. Provisional Application Ser. No. 62/972,240 filed Feb. 10, 2020, and to U.S. Provisional Application Ser. No. 62/985,455 filed Mar. 5, 2020, both of which are incorporated herein by reference in their respective entireties for all purposes. U.S. patent application Ser. No. 16/814,481 also claims the benefit of priority under 35 U.S.C. § 119(e) to U.S. Provisional Application Ser. No. 62/816,160 filed Mar. 10, 2019, which is incorporated herein by reference in its entirety for all purposes. U.S. patent application Ser. No. 16/708,179 also claims the benefit of priority under 35 U.S.C. § 119(e) to U.S. Provisional Application Ser. No. 62/776,691 filed Dec. 7, 2018, which is incorporated herein by reference in its entirety for all purposes. U.S. patent application Ser. No. 16/587,965 also claims the benefit of priority under 35 U.S.C. § 119(e) to U.S. Provisional Application Ser. No. 62/739,314 filed Sep. 30, 2018, which is incorporated herein by reference in its entirety for all purposes. U.S. patent application Ser. No. 16/556,573 also claims the benefit of priority under 35 U.S.C. § 119(e) to U.S. Provisional Application Ser. No. 62/725,186 filed Aug. 30, 2018, which is incorporated herein by reference in its entirety for all purposes. U.S. patent application Ser. No. 16/538,734 also claims the benefit of priority under 35 U.S.C. § 119(e) to U.S. Provisional Application Ser. No. 62/717,873 filed Aug. 12, 2018, and to U.S. Provisional Application Ser. No. 62/801,173 filed Feb. 5, 2019, both of which are incorporated herein by reference in their respective entireties for all purposes.

U.S. patent application Ser. No. 16/223,518 also claims the benefit of priority under 35 U.S.C. § 119(e) to U.S. Provisional Application Ser. No. 62/654,643 filed Apr. 9, 2018, which is incorporated herein by reference in its entirety for all purposes. U.S. patent application Ser. No. 16/205,424 also claims the benefit of priority under 35 U.S.C. § 119(e) to U.S. Provisional Application Ser. No. 62/631,462 filed Feb. 15, 2018, which is incorporated herein by reference in its entirety for all purposes.

U.S. patent application Ser. No. 16/236,401 also claims the benefit of priority under 35 U.S.C. § 119(e) to U.S. Provisional Application Ser. No. 62/689,040 filed Jun. 22, 2018, which is incorporated herein by reference in its entirety for all purposes. U.S. patent application Ser. No. 16/039,745 also claims the benefit of priority under 35 U.S.C. § 119(e) to U.S. Provisional Application Ser. No. 62/534,678 filed Jul. 19, 2017, and to U.S. Provisional Application Ser. No. 62/560,506 filed Sep. 19, 2017, both of which are incorporated herein by reference in their respective entireties for all purposes.

U.S. patent application Ser. No. 15/896,613 also claims the benefit of priority under 35 U.S.C. § 119(e) to U.S. Provisional Application Ser. No. 62/460,000 filed Feb. 16, 2017, which is incorporated herein by reference in its entirety for all purposes. U.S. patent application Ser. No. 15/425,749 also claims the benefit of priority under 35 U.S.C. § 119(e) to U.S. Provisional Application Ser. No. 62/292,078 filed Feb. 5, 2016, and to U.S. Provisional Application Ser. No. 62/297,454 filed Feb. 19, 2016, both of which are incorporated herein by reference in their respective entireties for all purposes.

BACKGROUND

Distributed development and execution of task routines using pooled task routines with pooled data has advanced to an extent that the addition of mechanisms for organization of development and to provide oversight for reproducibility and accountability have become increasingly desired. In various scientific, technical and other areas, the quantities of data employed in performing analysis tasks have become ever larger, thereby making desirable the pooling of data objects to enable collaboration, share costs and/or improve access. Also, such large quantities of data, by virtue of the amount and detail of the information they contain, have become of such value that it has become desirable to find as many uses as possible for such data in peer reviewing and in as wide a variety of analysis tasks as possible. Thus, the pooling of components of analysis routines to enable reuse, oversight and error checking has also become desirable.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including receive, at the at least one processor and from a requesting device via a network, a request to perform a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The at least one processor is also caused to: retrieve the job flow definition from among the multiple job flow definitions in the at least one federated area; store, within a job queue, a job performance request message comprising the job flow definition; and within a first performance container, execute instructions of a first instance of a performance routine to cause the at least one processor to, in response to the storage of the job performance request message within the job queue, perform operations including derive an order of performance of the set of tasks that specifies at least a first task of the set of tasks to be performed, and that is based on indications in the job flow definition of dependencies among the set of tasks, and store, within a task queue, a first task routine execution request message comprising an identifier associated with the first task. The at least one processor is also caused to, within a first task container, in response to the storage of the first task routine execution request message within the task queue, perform operations including: use the identifier associated with the first task to retrieve a first task routine of the set of task routines from the at least one federated area; and commence execution, within the first task container, of instructions of the first task routine to commence performance of the first task.

A computer-program product tangibly embodied in a non-transitory machine-readable storage medium includes instructions operable to cause at least one processor to perform operations including receive, at the at least one processor and from a requesting device via a network, a request to perform a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The at least one processor is also caused to: retrieve the job flow definition from among the multiple job flow definitions in the at least one federated area; store, within a job queue, a job performance request message comprising the job flow definition; and within a first performance container, execute instructions of a first instance of a performance routine to cause the at least one processor to, in response to the storage of the job performance request message within the job queue, perform operations including derive an order of performance of the set of tasks that specifies at least a first task of the set of tasks to be performed, and that is based on indications in the job flow definition of dependencies among the set of tasks, and store, within a task queue, a first task routine execution request message comprising an identifier associated with the first task. The at least one processor is also caused to, within a first task container, in response to the storage of the first task routine execution request message within the task queue, perform operations including: use the identifier associated with the first task to retrieve a first task routine of the set of task routines from the at least one federated area; and commence execution, within the first task container, of instructions of the first task routine to commence performance of the first task.

The at least one processor may also be caused to perform operations including: within the first task container, following completion of the execution of the instructions of the first task routine, store, within the task queue, an execution completion message indicative of completion of execution of the first task routine; within the first performance container, in response to at least storage of the execution completion message within the task queue, store a job completion message indicative of completion of the job flow within the job queue; and in response to storage of the job completion message within the job queue, transmit an indication of completion of the job flow to the requesting device via the network.

The order of performance of the set of tasks may specify a second task of the set of tasks to be performed after the first task based on an indication of a dependency of the second task on the first task. The at least one processor may be caused to perform operations including: within the first task container, following completion of the execution of the first task routine, store, within the task queue, an execution completion message indicative of completion of execution of the first task routine; within the first performance container, in response to at least storage of the execution completion message within the task queue, store, within the task queue, a second task routine execution request message comprising an identifier associated with the second task; and within a second task container, in response to the storage of the second task routine execution request message within the task queue, perform operations including use the identifier associated with the second task to retrieve a second task routine of the set of task routines from the at least one federated area, and commence execution, within the second task container, of instructions of the second task routine to commence performance of the second task.

The request to perform a job flow may include a job flow identifier of the job flow definition; the retrieval of the job flow definition may include use of the job flow identifier, wherein the job flow definition comprises a set of flow task identifiers that each identify a task of the set of tasks; the identifier associated with the first task may include a flow task identifier of the set of flow task identifiers that identifies the first task; and the retrieval of the first task routine may include selecting, from among the multiple task routines stored within the at least one federated area, a latest version of task routine comprising instructions that, when executed by the at least processor, causes the at least one processor to perform the first task.

The request to perform a job flow may include a request to repeat a past performance of the job flow and includes an instance log identifier of an instance log that documents the past performance of the job flow, wherein the instance log comprises a set of task routine identifiers that each identify a task routine of the set of task routines. The retrieval of the job flow definition may include: use of the instance log identifier to retrieve the instance log from among multiple instance logs stored within the at least one federated area; retrieval of a job flow identifier of the job flow definition from the instance log; and use of the job flow identifier to retrieve the job flow definition from the at least one federated area. The identifier associated with the first task may include a task routine identifier that identifies the first task, and the retrieval of the first task routine may include use of the task routine identifier to retrieve the first task routine from the at least one federated area.

The at least one processor may be caused to perform operations including, within a second performance container, execute instructions of a second instance of the performance routine to cause the at least one processor to, in response to the storage of the job performance request message within the job queue and in response to an uninstantiation of the first performance container prior to storage of a job completion message indicative of completion of the job flow within the job queue, perform operations including: derive the order of performance of the set of tasks based on indications in the job flow definitions of dependencies among the set of tasks; and store, within the task queue, the first task routine execution request message.

The at least one processor may be caused to perform operations including, within a second task container, in response to the storage of the first task routine execution request message within the task queue and in response to an uninstantiation of the first task container prior to storage, within the task queue, of a task completion message indicative of completion of the first task, perform operations including: use the identifier associated with the first task to retrieve the first task routine from the at least one federated area; and commence execution, within the second task container, of instructions of the first task routine to commence performance of the first task.

The at least one processor may execute instructions of a resource allocation routine to cause the at least one processor to dynamically allocate multiple pods based on availability of at least one of processing resources and storage resources; the first performance container and a first messaging container may be instantiated within a first pod of the multiple pods; within the first messaging container, instructions of a first instance of a messaging routine may be executed by the at least one processor to cause the at least one processor to provide the first instance of the performance routine with access to the job queue and the task queue; the first task container and a second messaging container may be instantiated within a second pod of the multiple pods; and within the second messaging container, instructions of a second instance of the messaging routine may be executed by the at least one processor to cause the at least one processor to provide the first task routine with access to the task queue.

A portal container and a third messaging container may be instantiated within a third pod of the multiple pods, and within the portal container, the at least one processor may execute instructions of an instance of a portal routine to cause the at least one processor to perform operations including: receive the request to perform the job flow from the requesting device; determine whether the requesting device or an operator of the requesting device is authorized to request a performance of the job flow; retrieve the job flow definition from the at least one federated area; and store the job performance request message within the job queue.

The at least one processor may execute instructions of a message broker routine to provide multiple queues comprising the job queue and the task queue.

A computer-implemented method includes receiving, by at least one processor and from a requesting device via a network, a request to perform a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The method further includes retrieving the job flow definition from among the multiple job flow definitions in the at least one federated area; and storing, within a job queue, a job performance request message comprising the job flow definition. The method further includes, within a first performance container, executing, by the at least one processor, instructions of a first instance of a performance routine causing the at least one processor to, in response to the storage of the job performance request message within the job queue, perform operations including: deriving, by the at least one processor, an order of performance of the set of tasks that specifies at least a first task of the set of tasks to be performed, and that is based on indications in the job flow definition of dependencies among the set of tasks; and storing, within a task queue, a first task routine execution request message comprising an identifier associated with the first task. The method further includes, within a first task container, in response to the storage of the first task routine execution request message within the task queue, performing operations including: using the identifier associated with the first task to retrieve a first task routine of the set of task routines from the at least one federated area; and commencing execution of, by the at least one processor and within the first task container, instructions of the first task routine to commence performance of the first task.

An apparatus includes at least one processor and a storage to store instructions that, when executed by the at least one processor, cause the at least one processor to perform operations including, receive, at the at least one processor and from a requesting device via a network, a request to cancel a performance of a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The at least one processor is also caused to store, within a task kill queue, a kill tasks request message comprising a job flow identifier of the job flow, and within a first task container, in response to the storage of the kill tasks request message within the task kill queue, perform operations including: cease execution of instructions of a first task routine of the set of task routines to cease performance of a first task of the set of tasks of the job flow, wherein execution of the instructions of the first task routine commenced within the first task container in response to storage of a first task routine execution request message within a task queue; and store, within the task queue, a first task cancelation message indicative of cancelation of execution of the first task routine. The at least one processor is also caused to, within a first performance container, execute instructions of a first instance of a performance routine to cause the at least one processor to, in response to the storage of the first task canceled message within the task queue, perform operations including: cease monitoring of the task queue for indications of completion of execution of the set of task routines, wherein the task queue was monitored for indications of completion of execution of the set of task routines and the first task routine execution request message was stored within the task queue in response to storage, within a job queue, of a job performance request message comprising the job flow definition of the job flow; and store, within the job queue, a job cancelation message indicative of cancelation of the job flow. The at least one processor is also caused to, in response to the storage of the job cancelation message within the job queue, transmit an indication of cancelation of the job flow to the requesting device via the network.

A computer-program product tangibly embodied in a non-transitory machine-readable storage medium includes instructions operable to cause at least one processor to perform operations including, receive, at the at least one processor and from a requesting device via a network, a request to cancel a performance of a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The at least one processor is also caused to store, within a task kill queue, a kill tasks request message comprising a job flow identifier of the job flow, and within a first task container, in response to the storage of the kill tasks request message within the task kill queue, perform operations including: cease execution of instructions of a first task routine of the set of task routines to cease performance of a first task of the set of tasks of the job flow, wherein execution of the instructions of the first task routine commenced within the first task container in response to storage of a first task routine execution request message within a task queue; and store, within the task queue, a first task cancelation message indicative of cancelation of execution of the first task routine. The at least one processor is also caused to, within a first performance container, execute instructions of a first instance of a performance routine to cause the at least one processor to, in response to the storage of the first task canceled message within the task queue, perform operations including: cease monitoring of the task queue for indications of completion of execution of the set of task routines, wherein the task queue was monitored for indications of completion of execution of the set of task routines and the first task routine execution request message was stored within the task queue in response to storage, within a job queue, of a job performance request message comprising the job flow definition of the job flow; and store, within the job queue, a job cancelation message indicative of cancelation of the job flow. The at least one processor is also caused to, in response to the storage of the job cancelation message within the job queue, transmit an indication of cancelation of the job flow to the requesting device via the network.

The at least one processor may also be caused to perform operations including, within a second task container, in response to the storage of the kill tasks request message within the task kill queue, perform operations including: cease execution of instructions of a second task routine of the set of task routines to cease performance of a second task of the set of tasks of the job flow, wherein execution of the instructions of the second task routine commenced within the second task container in response to storage of a second task routine execution request message within the task queue; and store, within the task queue, a second task cancelation message indicative of cancelation of execution of the second task routine. The at least one processor may also be caused to, within the first performance container, execute instructions of the first instance of the performance routine to cause the at least one processor to, in response to the storage of either the first task canceled message within the task queue or the second task canceled message within the task queue, perform operations including: cease monitoring of the task queue for indications of completion of execution of the set of task routines; and store, within the job queue, the job cancelation message indicative of cancelation of the job flow.

The at least one processor may be caused to perform operations including, within a first portal container, execute instructions of a first instance of a portal routine to cause the at least one processor to, in response to receiving the request to cancel the performance of the job flow, perform operations including, in preparation for uninstantiation of the first portal container, store, within a job kill queue, a kill job request message comprising the job flow identifier of the job flow, and in response to the storage of the kill job request message within the job kill queue: generate the kill tasks request message; store the kill tasks request message within the task kill queue; monitor the job queue for the job cancelation message; and in response to storage of the job cancelation message within the job queue, transmit the indication of cancelation of the job flow to the requesting device via the network.

The at least one processor may be caused to perform operations including, within a first portal container, execute instructions of a first instance of a portal routine to cause the at least one processor to, in response to receiving the request to cancel the performance of the job flow, perform operations including: in preparation for uninstantiation of the first portal container, store, within a job kill queue, a kill job request message comprising the job flow identifier of the job flow; and in response to the storage of the kill job request message within the job kill queue, generate the kill tasks request message. The at least one processor may be caused to, within a second portal container, execute instructions of a second instance of the portal routine to cause the at least one processor to, in response to the storage of the kill job request message within the job kill queue and in response to the uninstantiation of the first portal container, perform operations to take over for the first portal container that include: generate the kill tasks request message; store the kill tasks request message within the task kill queue; monitor the job queue for the job cancelation message; and in response to storage of the job cancelation message within the job queue, transmit the indication of cancelation of the job flow to the requesting device via the network.

The at least one processor may be caused to perform operations including: receive, from a requesting device via the network, a request to perform the job flow; retrieve the job flow definition from among the multiple job flow definitions in the at least one federated area; and store, within the job queue, the job performance request message comprising the job flow definition. The at least one processor may also be caused to, within the first performance container, in response to the storage of the job performance request message within the job queue, perform operations including: derive an order of performance of the set of tasks that specifies at least the first task of the set of tasks to be performed, and that is based on indications in the job flow definition of dependencies among the set of tasks; store, within the task queue, the first task routine execution request message comprising an identifier associated with the first task; and monitor the task queue for an indication of completion of execution of the first task routine. The at least one processor may be caused to, within the first task container, in response to the storage of the first task routine execution request message within the task queue, perform operations including: use the identifier associated with the first task to retrieve the first task routine from the at least one federated area; and commence execution, within the first task container, of instructions of the first task routine to commence performance of the first task.

The request to perform a job flow may include the job flow identifier of the job flow definition; the retrieval of the job flow definition may include use of the job flow identifier, wherein the job flow definition comprises a set of flow task identifiers that each identify a task of the set of tasks; the identifier associated with the first task may include a flow task identifier of the set of flow task identifiers that identifies the first task; and the retrieval of the first task routine may include selecting, from among the multiple task routines stored within the at least one federated area, a latest version of task routine comprising instructions that, when executed by the at least processor, causes the at least one processor to perform the first task.

The request to perform a job flow may include a request to repeat a past performance of the job flow and includes an instance log identifier of an instance log that documents the past performance of the job flow, wherein the instance log comprises a set of task routine identifiers that each identify a task routine of the set of task routines. The retrieval of the job flow definition may include: use of the instance log identifier to retrieve the instance log from among multiple instance logs stored within the at least one federated area; retrieval of the job flow identifier of the job flow definition from the instance log; and use of the job flow identifier to retrieve the job flow definition from the at least one federated area. The identifier associated with the first task may include a task routine identifier that identifies the first task; and the retrieval of the first task routine may include use of the task routine identifier to retrieve the first task routine from the at least one federated area.

The at least one processor may execute instructions of a resource allocation routine to cause the at least one processor to dynamically allocate multiple pods based on availability of at least one of processing resources and storage resources; the first performance container and a first messaging container may be instantiated within a first pod of the multiple pods; within the first messaging container, instructions of a first instance of a messaging routine may be executed by the at least one processor to cause the at least one processor to provide the first instance of the performance routine with access to the job queue and the task queue; the first task container and a second messaging container may be instantiated within a second pod of the multiple pods; and within the second messaging container, instructions of a second instance of the messaging routine may be executed by the at least one processor to cause the at least one processor to provide the first task routine with access to the task queue and to the task kill queue.

A portal container and a third messaging container may be instantiated within a third pod of the multiple pods, and within the portal container, the at least one processor may execute instructions of an instance of a portal routine to cause the at least one processor to perform operations including: receive the request to cancel the job flow from the requesting device; determine whether the requesting device or an operator of the requesting device is authorized to request a performance of the job flow; store the kill tasks request message within the task kill queue; and in response to storage of the job cancelation message within the job queue, transmit the indication of cancelation of the job flow to the requesting device via the network.

The at least one processor may execute instructions of a message broker routine to provide multiple queues including the task kill queue, the task queue and the job queue.

A computer-implemented method includes receiving, by at least one processor and from a requesting device via a network, a request to cancel a performance of a job flow, wherein: the job flow is defined in a job flow definition that specifies a set of tasks to be performed via execution of a corresponding set of task routines during the job flow performance; the job flow definition is stored among multiple job flow definitions within at least one federated area; the set of task routines is stored among multiple task routines within the at least one federated area; and the at least one federated area is maintained within at least one storage device. The method also includes storing, within a task kill queue, a kill tasks request message comprising a job flow identifier of the job flow, and within a first task container, in response to the storage of the kill tasks request message within the task kill queue, performing operations including: ceasing execution of instructions of a first task routine of the set of task routines to cease performance of a first task of the set of tasks of the job flow, wherein execution of the instructions of the first task routine commenced within the first task container in response to storage of a first task routine execution request message within a task queue; and storing, within the task queue, a first task cancelation message indicative of cancelation of execution of the first task routine. The method also includes, within a first performance container, executing instructions of a first instance of a performance routine causing the at least one processor to, in response to the storage of the first task canceled message within the task queue, perform operations including: ceasing monitoring of the task queue for indications of completion of execution of the set of task routines, wherein the task queue was monitored for indications of completion of execution of the set of task routines and the first task routine execution request message was stored within the task queue in response to storage, within a job queue, of a job performance request message comprising the job flow definition of the job flow; and storing, within the job queue, a job cancelation message indicative of cancelation of the job flow. The method also includes, in response to the storage of the job cancelation message within the job queue, transmitting an indication of cancelation of the job flow to the requesting device via the network.

An apparatus includes at least one processor and a storage to store instructions that, when executed by the at least one processor, cause the at least one processor to perform operations including, within a first kill container, execute instructions of a first instance of a kill routine to cause the at least one processor to perform operations including: monitor a task kill queue for storage, within the task kill queue, of multiple execution failure messages that each indicate an occurrence of a failure to successfully execute a first task routine of a set of task routines to perform a first task of a set of tasks of a job flow, wherein: the job flow is defined in a job flow definition that specifies the set of tasks to be performed via execution of a the set of task routines during the job flow performance; the job flow definition is stored among multiple job flow definitions within at least one federated area; the set of task routines is stored among multiple task routines within the at least one federated area; and the at least one federated area is maintained within at least one storage device. The at least one processor is also caused to, in response to a quantity of execution failure messages of the multiple execution failure messages reaching a predetermined threshold quantity, store, within a task kill queue, a kill tasks request message comprising a job flow identifier of the job flow. The at least one processor is also caused to, within a first task container, in response to the storage of the kill tasks request message within the task kill queue, perform operations including: cease execution of instructions of the first task routine to cease performance of the first task of the job flow, wherein execution of the instructions of the first task routine commenced within the first task container in response to storage of a first task routine execution request message within a task queue; and store, within the task queue, a first task cancelation message indicative of cancelation of execution of the first task routine. The at least one processor is also caused to, within a first performance container, execute instructions of a first instance of a performance routine to cause the at least one processor to, in response to the storage of the first task canceled message within the task queue, perform operations including: cease monitoring of the task queue for indications of completion of execution of the set of task routines, wherein the task queue was monitored for indications of completion of execution of the set of task routines and the first task routine execution request message was stored within the task queue in response to storage, within a job queue, of a job performance request message comprising the job flow definition of the job flow; and store, within the job queue, a job cancelation message indicative of cancelation of the job flow. The at least one processor is also caused to, in response to the storage of the job cancelation message within the job queue, transmit an indication of cancelation of the job flow to a requesting device via a network, wherein a request to perform the job flow was received at the at least one processor from the requesting device via the network.

In response to each occurrence of failure to successfully execute the first task routine, the at least one processor may be caused to perform operations including: uninstantiate a task container of multiple task containers in which the failure to successfully execute the first task routine occurred; and store, within the task kill queue, an execution failure message of the multiple execution failure messages. The multiple task containers may include the first task container.

The at least one processor may be caused to perform operations including, within a second task container, in response to the storage of the kill tasks request message within the task kill queue, perform operations including: cease execution of instructions of a second task routine of the set of task routines to cease performance of a second task of the set of tasks of the job flow, wherein execution of the instructions of the second task routine commenced within the second task container in response to storage of a second task routine execution request message within the task queue; and store, within the task queue, a second task cancelation message indicative of cancelation of execution of the second task routine. The at least one processor may also be caused to, within the first performance container, in response to the storage of either the first task canceled message within the task queue or the second task canceled message within the task queue, perform operations including: cease monitoring of the task queue for indications of completion of execution of the set of task routines; and store, within the job queue, the job cancelation message indicative of cancelation of the job flow.

The at least one processor may be caused to perform operations including, within a second kill container, executes instructions of a second instance of the kill routine to cause the at least one processor to perform operations including: monitor the task kill queue for storage, within the task kill queue, of an earlier multitude of execution failure messages that each indicate an occurrence of a failure to successfully execute the first task routine; and await an instance of a quantity of the earlier multitude of execution failure messages reaching the predetermined threshold quantity to determine whether to store the kill tasks request message within the task kill menu. The at least one processor may also be caused to: prior to the quantity of the earlier multitude of execution failure messages reaching the predetermined threshold quantity, make a first determination, based on availability of at least one of processing resources and storage resources, that the second kill container is to be uninstantiated; in response to the first determination, uninstantiate the second kill container; at a time following the uninstantiation of the second kill container, make a second determination, based on the availability of at least one of the processing resources and the storage resources, that the first kill container is to be instantiated; and in response to the second determination, instantiate the first kill container.

The at least one processor may be caused to perform operations including: receive, from the requesting device, the request to perform the job flow; retrieve the job flow definition from among the multiple job flow definitions in the at least one federated area; and store, within the job queue, the job performance request message comprising the job flow definition. The at least one processor may also be caused to, within the first performance container, in response to the storage of the job performance request message within the job queue, perform operations including: derive an order of performance of the set of tasks that specifies at least the first task of the set of tasks to be performed, and that is based on indications in the job flow definition of dependencies among the set of tasks; generate the first task routine execution request message to comprise an identifier associated with the first task; store, within the task queue, the first task routine execution request message; and monitor the task queue for an indication of completion of execution of the first task routine. The at least one processor may also be caused to, within the first task container, in response to the storage of the first task routine execution request message within the task queue, perform operations including: use the identifier associated with the first task to retrieve the first task routine from the at least one federated area; and commence execution, within the first task container, of instructions of the first task routine to commence performance of the first task.

The at least one processor may be caused to perform operations including, within a second performance container, execute instructions of a second instance of the performance routine to cause the at least one processor to, in response to the storage of the job performance request message within the job queue, perform operations including: derive the order of performance of the set of tasks based on indications in the job flow definitions of dependencies among the set of tasks; and generate the first task routine execution request message to comprise an identifier associated with the first task. The at least one processor may also be caused to: prior to storage of the first task routine execution request message within the task queue, make a first determination, based on availability of at least one of processing resources and storage resources, that the second performance container is to be uninstantiated; in response to the first determination, uninstantiate the second performance container; at a time following the uninstantiation of the second performance container, make a second determination, based on the availability of at least one of the processing resources and the storage resources, that the first performance container is to be instantiated; and in response to the second determination, instantiate the first performance container.

The request to perform a job flow may include the job flow identifier of the job flow definition; the retrieval of the job flow definition may include use of the job flow identifier, wherein the job flow definition comprises a set of flow task identifiers that each identify a task of the set of tasks; the identifier associated with the first task may include a flow task identifier of the set of flow task identifiers that identifies the first task; and the retrieval of the first task routine may include selecting, from among the multiple task routines stored within the at least one federated area, a latest version of task routine comprising instructions that, when executed by the at least processor, causes the at least one processor to perform the first task.

The at least one processor may execute instructions of a resource allocation routine to cause the at least one processor to dynamically allocate multiple pods based on availability of at least one of processing resources and storage resources; the first performance container and a first messaging container may be instantiated within a first pod of the multiple pods; within the first messaging container, instructions of a first instance of a messaging routine may be executed by the at least one processor to cause the at least one processor to provide the first instance of the performance routine with access to the job queue and the task queue; the first task container and a second messaging container may be instantiated within a second pod of the multiple pods; and within the second messaging container, instructions of a second instance of the messaging routine may be executed by the at least one processor to cause the at least one processor to provide the first task routine with access to the task queue and to the task kill queue.

A portal container and a third messaging container may be instantiated within a third pod of the multiple pods, and within the portal container, the at least one processor may execute instructions of an instance of a portal routine to cause the at least one processor to perform operations including: receive the request to cancel the job flow from the requesting device; determine whether the requesting device or an operator of the requesting device is authorized to request a performance of the job flow; store the kill tasks request message within the task kill queue; and in response to storage of the job cancelation message within the job queue, transmit the indication of cancelation of the job flow to the requesting device via the network.

The at least one processor may execute instructions of a message broker routine to provide multiple queues comprising the task kill queue, the task queue and the job queue.

A computer-implemented method includes, within a first kill container, executing instructions of a first instance of a kill routine causing the at least one processor to perform operations including, monitoring a task kill queue for storage, within the task kill queue, of multiple execution failure messages that each indicate an occurrence of a failure to successfully execute a first task routine of a set of task routines to perform a first task of a set of tasks of a job flow, wherein: the job flow is defined in a job flow definition that specifies the set of tasks to be performed via execution of a the set of task routines during the job flow performance; the job flow definition is stored among multiple job flow definitions within at least one federated area; the set of task routines is stored among multiple task routines within the at least one federated area; and the at least one federated area is maintained within at least one storage device. The method also includes, in response to a quantity of execution failure messages of the multiple execution failure messages reaching a predetermined threshold quantity, storing, within a task kill queue, a kill tasks request message comprising a job flow identifier of the job flow. The method also includes, within a first task container, in response to the storage of the kill tasks request message within the task kill queue, performing operations including: ceasing execution of instructions of the first task routine to cease performance of the first task of the job flow, wherein execution of the instructions of the first task routine commenced within the first task container in response to storage of a first task routine execution request message within a task queue; and storing, within the task queue, a first task cancelation message indicative of cancelation of execution of the first task routine. The method also includes, within a first performance container, executing instructions of a first instance of a performance routine to cause the at least one processor to, in response to the storage of the first task canceled message within the task queue, perform operations including: ceasing monitoring of the task queue for indications of completion of execution of the set of task routines, wherein the task queue was monitored for indications of completion of execution of the set of task routines and the first task routine execution request message was stored within the task queue in response to storage, within a job queue, of a job performance request message comprising the job flow definition of the job flow; and storing, within the job queue, a job cancelation message indicative of cancelation of the job flow. The method also includes, in response to the storage of the job cancelation message within the job queue, transmitting an indication of cancelation of the job flow to a requesting device via a network, wherein a request to perform the job flow was received at the at least one processor from the requesting device via the network.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 17A, 17B, 17C, 17D, 17E and 17F, together, illustrate an example of selectively storing, translating and assigning identifiers to objects in federated area(s).

DETAILED DESCRIPTION

Figure 1:
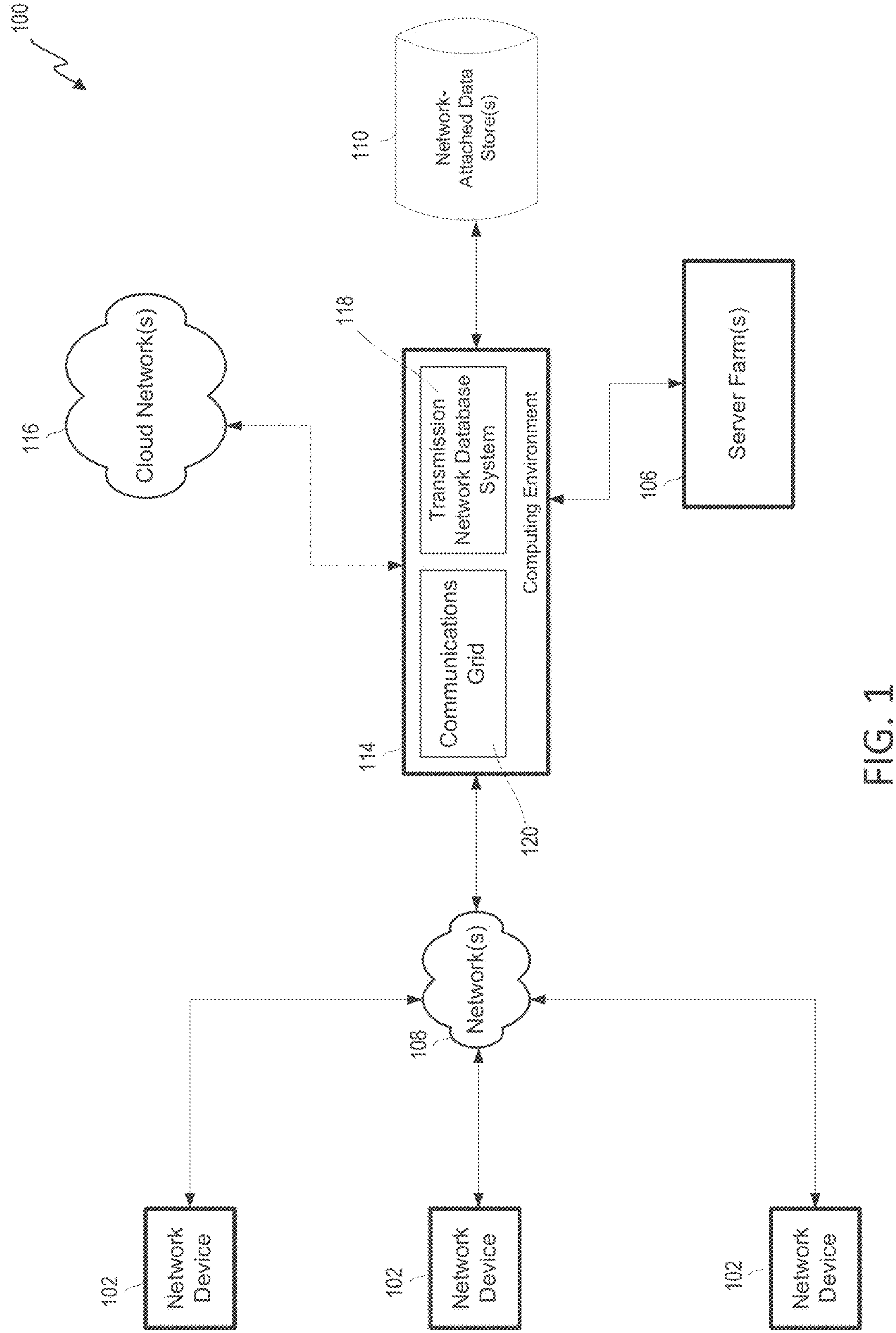
FIG. 1 illustrates a block diagram that provides an illustration of the hardware components of a computing system, according to some embodiments of the present technology.

Various embodiments described herein are generally directed to techniques for the use of message queuing to coordinate the execution of task routines of a job flow that are distributed among multiple container environments, wherein the quantity of the container environments is dynamically managed independently of such coordination. A distributed processing system may employ resource allocation routine(s) to dynamically assign and monitor the use of processing, storage and/or communications resources of one or more computing devices used to implement many-task computing (MTC). MTC, and the breaking up of a complex analysis into job flows with associated sets of tasks, may be used together to enable a high degree of parallelism in the performance of those analyses. Developers are able to divide such a complex analysis into a set of tasks to be performed, are able to separately develop a task routine (or reuse a previously developed task routine) to perform each task, and are able to generate a job flow definition that specifies inputs and outputs of the job flow, as well as data dependencies among the tasks. Upon performance of the analysis, the job flow definition is analyzed to identify opportunities, afforded by instances of lack of dependency among the tasks, to perform various subsets of the tasks in parallel as part of dynamically deriving and effectuating an order of performance of those tasks that takes advantage of varying levels of available processing, storage and/or communications resources of the distributed processing system.

As part of enabling such advantage to be taken of such varyingly available resources, resource allocation routine(s) may be executed to provide a quantity of pods that is dynamically alterable based on the varying levels of availability and/or use of such resources. Each pod may include at least one container environment to which at least one thread of execution is assigned to execute an instance of a routine therein. Some of the pods may be employed in executing instances of task routines to perform corresponding tasks of job flows. Others of the pods may be employed in executing instances of various routines that control the performance of job flows, including the derivation and effectuation of an order of performance of tasks of a job flow through the execution of instances of task routines. The order in which task routines within such isolated environments are executed to effectuate the derived order of performance of their corresponding tasks may be coordinated through a set of message queues. Such coordination may be entirely independent of the dynamic provision of the pods by the resource allocation routine(s) such that it is possible for the execution of instances of task routines, and/or of routines that coordinate the execution of the task routines, to be interrupted or otherwise impaired by various events, including instances of uninstantiation of the pods within which they are executed. The set of message queues may be used to implement various protocols that aid in ensuring that such events will not prevent job flows from being successfully performed.

As will be familiar to those skilled in the art, the efficient allocation of resources of computing devices to perform operations therein is a longstanding challenge that has been addressed with numerous solutions over multiple decades. In recent years, the dynamic allocation of containers providing a dynamically alterable quantity of semi-separated execution environments has become more a more widely favored approach to addressing this challenge. In particular, resource allocation software, such as Docker offered by Docker, Inc. of Palo Alto, Calif., USA, and Kubernetes offered by the Cloud Native Computing Foundation of San Francisco, Calif., USA. Docker is the simpler one of these two particular offerings, in that it is operable in a “Swarm” mode in which it is capable of dynamically allocating numerous containers. Kubernetes is the more complex of these two particular offerings, in that it dynamically allocates “Pods” that each include one or more containers to support more complex combinations of execution environments.

While Docker's Swarm mode has become widely used in simpler applications, Kubernetes has become a de facto choice for resource allocation software as it has proven to be quite capable of supporting the parallelized execution of very large quantities of software routines across numerous computing devices. Unfortunately, experience with using even relatively sophisticated resource allocation software, such as Kubernetes, has shown that it can be at least difficult to coordinate the actions of instantiating and/or uninstantiating containers by such resource allocation software with commencement and/or completion of execution of routines within those containers. More specifically, in Kubernetes, issues have been encountered with pods being uninstantiated while routine(s) are still being executed within a container therein such that their functions may be just partially performed. As will be familiar to those skilled in the art, allowing a software routine to just partially perform its function to an unknown extent by stopping its execution at an unknown point can be worse than simply not allowing a software routine to ever begin performing its function, at all.

The fact that many of such resource allocation routines are offered as open-source software does present the possibility of making changes to their source code to add the ability to coordinate their dynamic allocation of containers with the state of software routines executed within those containers. In this way, the uninstantiation of a container in which a routine is currently being executed might be delayed until that routine has reached the end of its execution therein. Alternatively or additionally, the uninstantiation of a container may be coordinated with the cessation of execution of a routine therein at a known point that results in a known state of the function being performed at the time of cessation of execution such that resumption of execution may be more easily resumed. However, it may be deemed desirable to avoid making such changes to the source code of an open source resource allocation routine so as to avoid such issues as the need to repeatedly merge the changes made in new versions thereof with the changes made to add such coordination capabilities. Instead, it may be deemed desirable to address such coordination issues in a manner that more easily allows new versions of a resource allocation routine to be adopted and used.

There are also other issues that can arise that impair the ability to effectively coordinate the execution of multiple routines across multiple ones of such dynamically allocated containers. Among such issues may be instances of aberrant behavior by the routines, themselves, within the container environments that may be severe enough to cause crashing of a container. Also, hardware malfunctions within computing devices may also occur that may cause unpredictable changes in the execution of a routine within a container and/or a crash of a container. Further, where the computing resources of multiple computing devices interconnected by a network are being centrally managed by a resource allocation routine executed within just one of those multiple computing devices, instances of loss or other impairment of network connections thereamong may cause loss of communications with containers between computing devices.

To address such a range of issues, one or more routines performing various coordinating functions may be executed within one or more computing devices alongside such resource allocation software as Kubernetes. Such additional routines may establish, maintain and use a set of message queues, where each such message queue links particular subsets of the containers/pods that are dynamically allocated by the resource allocation routine. Within the set of message queues, protocols may be used that enable the preservation of information about the state of execution of various routines among the set of containers/pods. In this way, aspects of the state of the performances of tasks of job flows implementing MTC may be preserved, along with aspects of the state of the performances of the functions of other routines that serve to coordinate the performances of those tasks. Thus, where an event occurs that causes an uncoordinated cessation of execution of a routine within a container, or that causes the crashing or uninstantiation of a container or entire pod, a restarting of execution of another instance of the same routine may be caused within another available container/pod to ensure that the function(s) that were supposed be performed by that routine are ultimately performed.

More specifically, a set of coordinating pods may be allocated in which various routines may be executed to support the performance of job flows using computing resources that are allocated through the allocation of a set of task pods. Within each coordinating pod and each task pod may be at least one container in which a messaging routine is executed to engage in the exchange through message queues (specifically, through the storing of messages within queues, the reading of messages stored within queues and/or the removal of messages from queues), and another container in which the one of the routines supporting the performance of job flows or one of the task routines may be executed. Among the set of coordinating pods may be at least one portal pod in which a routine may executed to provide a portal on a network that implements a selected applications programming interface (API) and/or other protocol to enable the reception of requests from requesting devices for the performances of job flows. The portal pod(s) may maintain request data (e.g., a database) indicative of individual received requests for the performance of job flows, along with indications of the statuses of those performances and/or indications of the responses to the requests that have been transmitted back to the requesting devices. Also among the set of coordinating pods may be at least one performance pod in which a routine may be executed that employs the information provided in job flow definitions to coordinate the performances of tasks of job flows by task routines executed within the task pods.

Multiple message queues may be established and combined into a single queue structure that may be managed by a message broker routine, which may implement the Advanced Message Queuing Protocol (AMQP) promulgated by the Organization for the Advancement of Structured Information Standards (OASIS) of Burlington, Mass., USA. One such message broker may be RabbitMQ offered by Pivotal of San Francisco, Calif., USA. Each message queue may be implemented to function in a manner in which a message is placed on a queue that is intended to be received by a particular type of pod in which a particular type of routine is executed, rather than a message that is intended to be received by any one particular individual pod. As will be explained in greater detail, this may allow multiple ones of the same type of pod to listen for the same message, and for whichever one of them that is able to take action in response to the message to reply to the message. This may be one of the approaches taken to provide some degree of resiliency in situations in which one of the pods of a particular type is uninstantiated or otherwise rendered nonfunctional (e.g., crashes).

At least a pair of message queues may be established that include a job queue and a task queue. Through the job queue, the portal pod(s) and the performance pod(s) may cooperate to initiate performances of job flows and to exchange status information concerning those performances to ensure the completion thereof in spite of instances of uninstantiation of pods and/or other mishaps, as will be described in greater detail. Through the task queue, the performance pod(s) and the task pods may cooperate to ensure the executions of task routines to perform of the tasks of each job flow for which a request is received, as will also be described in greater detail. As task routines are successfully executed to perform tasks of a job flow, a performance pod coordinating the performance of that job flow receives messages indicative of those successful completions from those task pods through the task queue. Upon successful completion of the last of the tasks of a job flow, the performance pod may transmit a message conveying an indication of the results of the completion of the job flow to the portal pod to be relayed onward to requesting device.

It may be that, during such executions of task routines within the task pods, if one of those task pods is unexpectedly uninstantiated by the resource allocation routine, crashes and/or suffers some other form of mishap, the performance pod may be apprised of such an event as a result of ceasing to receive a status indication from that task pod within a predetermined period of time. In response, the performance pod may cause the performance of that task to be re-commenced within another task pod.

In some embodiments, in addition to the aforementioned job and task queues, at least one task kill queue may also be established and managed by the message broker routine. Additionally, among the set of coordinating pods may be at least one kill pod in which a routine may be executed that responds to instances of a task routine repeatedly crashing by triggering the uninstantiation of the task pod in which it is being executed. More specifically, through the task kill queue, the kill pod may monitor the task kill queue for messages from task pods indicating that the task being executed therein has crashed such that its execution needs to be re-attempted. As will be explained in greater detail, the kill pod may enforce a rule in which a task routine is allowed to crash up to a predetermined maximum number of times before the task routine is deemed incapable of being successfully executed such that it is deemed necessary to trigger, through the task kill queue, the uninstantiation of that task pod. Upon being so triggered, that task pod may transmit an indication to the performance pod, via the task queue, that attempts at executing the task routine were unsuccessful before uninstantiating itself. In response, the performance pod may effectuate the cessation of any further performance of any of the tasks of the job flow that included the execution of that task routine, and may transmit an indication to the portal pod via the job queue of the performance of the job flow having ended with errors, and the portal pod may relay such an indication onward to the requesting device. As will also be explained in greater detail, an instance of a task pod uninstantiating itself and/or a container therein may trigger the resource allocation routine to instantiate a new task pod to replace it.

In some embodiments, in addition to the aforementioned job queue, task queue and task kill queue, at least one job kill queue may also be established and managed by the message broker routine. Through the task kill queue, one of the portal pod(s) and the task pods that are executing task routines to perform the tasks of a particular job flow may cooperate to stop the performance of that job flow. More specifically, a portal pod may relay, through the task kill queue, and to all of the task queues, a request received from a requesting device to stop the performance of all tasks associated with that particular job flow. The ones of the task pods that are involved in performing the tasks of the job flow will each individually recognize the message as being pertinent to them. Each of such task pods may transmit a message to the performance pod, via the task queue, indicating that execution of the task routine that was being executed within it has stopped, and for the reason of a received cancellation request. Following the transmission of such a message, each such task pod may uninstantiate itself, thereby triggering the resource allocation routine to replace it by instantiating a new task pod. In response to receiving such messages of cancellation of the performance(s) of one or more tasks of the particular task routine, the performance pod that was coordinating the performance of the tasks of that job flow may cease to cause any more of the tasks of that job flow to be executed, and may transmit a message acknowledging the cancellation of the job flow to portal pod to be relayed back to the device from which the cancellation request was received.

It should be noted that, either as a portal pod transmits the message to end the performance of the job flow onto the job kill queue, that same portal pod may also transmit the same message onto the job queue, and then refrain from retrieving that message from the job queue until it has updated the indications of the status the job flow stored within the database to indicate that the job flow is to be cancelled. In this way, if the particular portal pod becomes uninstantiated before the message indicating that the job flow has indeed been cancelled is received via the execution queue from a performance pod, such a status indication in the database will spur another portal pod to take over the work of ensuring that the cancellation takes place and/or of notifying the requesting device when that cancellation has happened.

The storage of objects (e.g., data objects, task routines, macros of task routines, job flow definitions, instance logs of past performances of job flows, and/or DAGs of task routines and/or job flows) may be effected using a grid of devices. Such a grid may provide distributed storage for data objects that include large data sets, complex sets of task routines for the performance of various analyses divided into tasks specified in job flows, and/or instance logs that document an extensive history of past performances of such analyses. Such distributed storage may be used to provide one or both of fault tolerance and/or faster access through the use of parallelism. In various embodiments, the objects stored within a federated area or a set of federated areas may be organized in any of a variety of ways that may employ any of a variety of indexing systems to enable access. By way of example, one or more databases may be defined by the one or more federated devices to improve efficiency in accessing data objects, task routines and/or instance logs of performances of analyses.

In some embodiments, the grid of devices may be a grid of federated devices that internally provide storage spaces within which federated area(s) may be defined for the storage of objects. Alternatively, the federated devices of such a grid may each be coupled to one or more storage devices that are operated under the control of the grid of federated devices. In such embodiments, each of the federated devices may provide the processing resources by which various operations may be performed in association with the objects. In other embodiments, the grid of devices may be a grid of storage devices within which federated area(s) may be defined for the storage of objects. In such embodiments, each of the storage devices may provide at least some degree of processing resources that may be of lesser capability than the processing resources of the federated device(s), but may still be sufficient for use in performing at least some limited range of operations in association with the objects.

Regardless of the type of device used to form such a grid, in some embodiments, each of those devices may store whole objects such that each object (including each data object) is stored as a single undivided object within a single storage device, and not stored in a distributed manner across two or more storage devices. In other embodiments, at least data objects that exceed a predetermined threshold size may each be stored in a distributed manner in which each such data object is divided into multiple blocks that are distributed for storage among multiple devices. In still other embodiments, a combination of such approaches may be used in which each object that is smaller than the predetermined threshold size is stored as an undivided object entirely within a single one of the devices, while each object that is larger than the predetermined threshold size is divided into blocks that are stored in a distributed manner across multiple ones of the devices. In some of such grids of devices that enable the storage of objects in a distributed manner, the devices of that grid may cooperate to implement a distributed file system with various data organization features that may fit one or more specific industrial standards. By way of a specific example, the multiple devices of such a grid may cooperate among themselves the HADOOP® distributed file system (HDFS) promulgated by the Apache™ Software Foundation of Wakefield, Mass., USA.

The one or more federated devices may define at least some of the storage space provided by the one or more federated devices and/or the one or more storage devices as providing federated area(s) in which the objects are stored and to which access is controlled by the one or more federated devices (or one or more other devices separately providing access control). By way of example, access to a federated area may be limited to one or more particular authorized persons and/or one or more particular authorized entities (e.g., scholastic entities, governmental entities, business entities, etc.). Alternatively or additionally, access to a federated area may be limited to one or more particular authorized devices that may be operated under the control of one or more particular persons and/or entities.

In embodiments in which at least some objects are to be stored as undivided objects within storage space provided by a single device(s) such that no object is to be stored in a distributed manner across two or more devices, the one or more federated devices may define each federated area to be entirely contained within a single federated device or storage device. Alternatively, at least one federated area may be defined to span two or more federated devices and/or storage devices, but each object stored therein may still be stored as an undivided object within just one of the two or more storage devices. Thus, while there may be one or more federated areas that span multiple devices, there may be no objects stored in a manner that does so. In embodiments in which at least data objects that exceed the predetermined threshold size are each to be stored in a distributed manner in which each such data object is divided into multiple blocks, the one or more federated devices may define at least one federated area to span multiple devices among which the blocks of such a data object may be distributed for storage. Thus, such a data object may be caused to span multiple federated devices and/or storage devices within a single federated area that also does so. In still other embodiments in which a combination of such approaches is to be used, a mixture of federated areas that are contained within a single device and that span multiple devices may be defined. Additionally, at least one federated area that is defined to span multiple devices may store a mixture of objects that are each stored as an undivided object within a single one of the multiple devices and objects that are divided into blocks that are distributed among the multiple devices for storage in a manner that spans the multiple devices.

In various embodiments, the manner in which a federated area is used may be limited to the storage and retrieval of objects with controlled access, while in other embodiments, the manner in which a federated area is used may additionally include the performances of analyses as job flows using the objects stored therein. In support of enabling at least the storage of objects within one or more federated areas, the one or more federated devices may provide a portal accessible to other devices via a network for use in storing and retrieving objects associated with the performances of analyses by other devices. More specifically, one or more source devices may access the portal through the network to provide the one or more federated devices with the data objects, task routines, job flow definitions, DAGs and/or instance logs associated with completed performances of analyses by the one or more source devices for storage within one or more federated areas for the purpose of memorializing the details of those performances. Subsequently, one or more reviewing devices may access the portal through the network to retrieve such objects from one or more federated area through the one or more federated devices for the purpose of independently confirming aspects of such the performances.

As an alternative to or in addition to the provision of such a portal, the one or more federated devices may be caused to repeatedly synchronize the contents of at least a portion of at least one selected federated area with an external storage space maintained by another device in a bidirectional manner, such as another source code repository system (e.g., GitHub™). More specifically, as object(s) within the external storage space of the other device are changed in any of a number of ways (e.g., added, edited, deleted, etc.), corresponding changes may be automatically made to corresponding objects maintained within the federated area to synchronize the contents therebetween. Similarly, as object(s) within the federated area are changed in any of a number of ways, corresponding changes may be automatically made to corresponding objects maintained within the external storage space of the other device, again, to synchronize the contents therebetween.

Among the objects that may be stored in a federated area may be numerous data objects that may include data sets. Each data set may be made up of any of a variety of types of data concerning any of a wide variety of subjects. By way of example, a data set may include scientific observation data concerning geological and/or meteorological events, or from sensors in laboratory experiments in areas such as particle physics. By way of another example, a data set may include indications of activities performed by a random sample of individuals of a population of people in a selected country or municipality, or of a population of a threatened species under study in the wild. By way of still another example, a data set may include data descriptive of characteristics of one or more neural networks, such as hyperparameters that specify the quantity and/or organization of nodes within the neural network, and/or such as parameters weights and biases of each of the nodes that may have been derived through a training process in which the neural network is trained to perform a function. In some embodiments, a single data set or a set of data sets may include data descriptive of multiple neural networks that are used together in an ensemble to perform a function.

Regardless of the types of data each such data set may contain, some data sets stored in a federated area may include data sets employed as inputs (or "input data objects") to the performance of one or more job flows (e.g., flow input data sets), and/or other data sets stored in a federated area may include data sets that are generated as outputs (or "output data objects") of past performance(s) of one or more job flows (e.g., result reports). It should be noted that some data sets that serve as inputs to the performance of one job flow may be generated as an output of a past performance of another job flow (e.g., a result report becoming an flow input data set). Still other data sets may be both generated as an output and used as input during a single performance of a job flow, such as a data set generated as an output by the performance of one task of a job flow for use by one or more other tasks of that same job flow as an input (e.g., mid-flow data sets).

Also among the objects that may be stored in a federated area may be a combination of task routines and a job flow definition that, together, provide a combination of definitions and executable instructions that enable the performance of an analysis as a job flow that is made up of a set of tasks to be performed. More precisely, executable instructions for the performance of an analysis may be required to be stored as a set of task routines where each task routine is made up of executable instructions to perform a task, and a job flow definition that specifies aspects of how the set of task routines are executed together to perform the analysis. In some embodiments, the definition of each task routine may include definitions of the inputs and outputs thereof. In a job flow definition, each task to be performed may be assigned a flow task identifier, and each task routine that is to perform a particular task may be assigned the flow task identifier of that particular task to make each task routine retrievable by the flow task identifier of the task it performs. Thus, each performance of an analysis may entail a parsing of the job flow definition for that analysis to retrieve the flow task identifiers of the tasks to be performed, and may then entail the retrieval of a task routine required to perform each of those tasks.

As will be explained greater detail, such breaking up of an analysis into a job flow made up of tasks performed by the execution of task routines that are stored in federated area(s) may be relied upon to enable code reuse in which individual task routines may be shared among the job flows of multiple analyses. Such reuse of a task routine originally developed for one analysis by another analysis may be very simply effected by specifying the flow task identifier of the corresponding task in the job flow definition for the other analysis. Additionally, reuse may extend to the job flow definitions, themselves, as the availability of job flow definitions in a federated area may obviate the need to develop of a new analysis routine where there is a job flow definition already available that defines the tasks to be performed in an analysis that may be deemed suitable. Thus, among the objects that may be stored in a federated area may be numerous selectable and reusable task routines and job flow definitions.

In various embodiments, a job flow definition may be augmented with graphical user interface (GUI) instructions that are to be executed during a performance of the job flow that it defines to provide a GUI that provides a user an opportunity to specify one or more aspects of the performance of the job flow at runtime. By way of example, such a GUI may provide a user with an opportunity to select one or more data objects to be used as inputs to that performance, to select which one of multiple versions of a task routine is to be used to perform a task, and/or select a federated area into which to store a result report to be output by that performance. In so doing, the GUI may include instructions to display lists of objects, characteristics of objects, DAGs of objects, etc. in response to specific inputs received from a user.

In some of such embodiments, the source device that provides such an augmented job flow definition to the one or more federated devices for storage may enable a user to author such GUI instructions through use of a sketch input user interface. More specifically, such a source device may support the entry of GUI instructions as graphical symbols sketched by a user of the source device through a touchscreen user interface device that supports sketch input and a stylus. Such a source device may maintain a library of graphical symbols that are each correlated to a particular type of object, to a particular characteristic of an object and/or to the displaying of particular information in connection to a particular type of object. Alternatively or additionally, such a library may include graphical symbols that are correlated to particular types of user input that is to be awaited and/or to particular types of actions to be taken in response to the receipt of particular types of user input. One or more of such graphical symbols may include human readable text that may be employed to specify distinct pages of a GUI and/or to specify particular objects. Such a source device may interpret the graphical symbols, any text incorporated therein, and/or the manner in which those graphical symbols are arranged relative to each other in the sketch input to derive and generate the GUI instructions with which a job flow definition is to be augmented.

Although an analysis routine may be implemented as a single job flow that defines a set of tasks to be performed in a specified order, it may be deemed desirable to implement a relatively large and/or complex analysis routine as multiple job flows that are, themselves, performed in a specified order. More precisely, it may be deemed desirable for a relatively large and/or complex analysis routine to be developed as multiple job flows to enable the development effort to be distributed among multiple developers and/or teams of developers, with the intention to combine the multiple job flows into a single "superset" job flow once such a distributed development effort is completed. The multiple job flows to be combined into such a superset job flow may have been previously performed in a particular temporal order, starting with one or more preexisting data objects being provided to the first one(s) of the multiple job flows to be performed (i.e., the input job flow(s)). The performance(s) of those first one(s) of the multiple job flows may, in turn, have generated one or more data objects that were subsequently been used directly as inputs to other(s) of the multiple job flows, and so on following the temporal order, until one or more of the multiple job flows were performed that generated one or more data objects that were directly provided to a last job flow among the multiple job flows that directly generated the particular output data object (i.e., the output job flow).

Alternatively, it may be that a superset job flow arises more organically as a result of different developers or teams of developers having minimal connection with each other independently develop each of multiple job flows that, at a subsequent time, are determined to be capable of being combined to implement a relatively large and/or complex analysis.

Regardless of what the exact motivation and/or circumstances may be for the development of a superset job flow, the ability for a data set output by the performance of one job flow to be used as an input to a subsequent performance of another job flow serves to enable the formation of a superset job flow. In such a superset job flow, at least a portion of each job flow of the set of job flows from which the superset job flow is derived may be caused to be specified to be performed together in an order that is based on dependencies thereamong that arise from each instance in which an output data object generated by the performance of one of the job flows becomes an input data object to the performance of another of the job flows. Thus, the job flow definition of such a superset job flow may be generated by combining information from the job flow definitions of each of the job flows of the set of job flows. The job flow definition for the superset job flow may then simply be stored in a federated area to enable access to it, and thereby, enable the performance of the superset job flow.

In such a superset job flow, each job flow therein that outputs a data object that is not also used as an input to one of the other job flows therein may be designated an output job flow. Correspondingly, each job flow therein that uses a job data object as an input that is not generated by one of the other job flows therein may be designated an input job flow. Due to dependencies among the job flows within a superset job flow, it is expected that input job flows would precede output job flows in the order in which they are to be performed, though an exception is possible where a job flow therein is both an input job flow and an output job flow.

Once so derived, the superset job flow may then be used in place of the multiple job flows to either repeat the generation of the particular output data object or to generate other similar output data objects, thereby reducing the number of distinct job flows that must be explicitly requested be performed to accomplish the generation of the same output. The automation of the derivation of the superset job flow may enable personnel with little or no programming skills to nonetheless cause the superset job flow to be derived from at least a portion of each of the multiple job flows. More precisely, the job flow definition that defines the superset job flow is derived based on at least a portion of the job flow definitions that define each of the multiple job flows.

The derivation of the superset job flow may begin with the receipt, by one or more federated devices, of a request to so derive it, where the request may employ different object identifiers to explicitly identify different ones of the output job flow, the particular output data object and/or the past performance of the output job flow by which the particular output data object was originally generated. More specifically, the one or more federated devices may receive a request to generate the job flow definition for such a superset job flow in which the particular output data object is identified, and may use the data object identifier of that output data object to identify an instance log documenting the particular past performance of the output job flow by which the output data object was directly generated, and thereby identify the output job flow of the particular past performance. Alternatively, the one or more federated devices may receive a request to generate the job flow definition for such a superset job flow in which the output job flow is identified, and may use the job flow identifier of the output job flow to identify instance log(s) documenting one or more past performances of the output job flow from which a selection of the particular past performance may be prompted to be made, which would thereby identify the particular output data object.

Regardless of the exact manner in which the particular output data object, the output job flow and/or the particular past performance of the output job flow that generated the particular output data object are identified in the request, the one or more federated devices may perform the derivation of the superset job flow in a manner that proceeds through the multiple job flows in the reverse of the order in which they were performed to generate the particular output data object. Thus, the derivation of the superset job flow may begin by analyzing aspects of the past performance of the output job flow (which again, would have occurred last) to identify which of one(s) of the other job flows among the multiple job flows were performed at a time immediately preceding the performance of the output job flow to directly provide the output job flow with data object(s) that were directly needed as inputs to the performance of the output job flow. Then, aspects of the past performance(s) of each of the preceding job flow(s) that were performed to directly provide input(s) to the output job flow are similarly analyzed to identify any of the multiple job flows that were performed at a still earlier time to provide input(s) to the job flow(s) that directly provided input(s) to the output job flow. Such a process of proceeding in reverse order through the performances of the multiple job flows, starting with the output job flow, continues until each job flow of the multiple job flows is identified so that at least a portion of each may then be incorporated into the superset job flow.

More specifically, the one or more federated devices may begin the automated derivation of the superset job flow by analyzing the output job flow to identify portion(s) thereof that were not required in the particular past performance to generate the particular output data object, and may prune those portion(s) to derive a pruned form of the output job flow to be included in the superset job flow. The one or more federated devices may then use indications of one or more input data objects that were directly used in the particular past performance as inputs to the pruned form of the output job flow to generate the particular output data object to identify one or more preceding job flows by which each of those one or more input data objects may have been generated. The one or more federated devices may then analyze each of the one or more preceding job flows to identify portion(s) of each that were not required to generate those one or more input data objects, and may prune those portion(s) to derive a pruned form of each to also be included in the superset job flow. The one or more federated devices may then use indications of one or more input data objects to the pruned form of each of those one or more preceding job flows to identify still more preceding job flows, and so on, until no further preceding job flows are able to be identified from which pruned forms may be derived for inclusion in the superset job flow. In this way, the superset job flow may be formed starting with the last task of the output job flow that was the last of the multiple job flows to be performed to generate the particular output data object, and proceeding towards the earliest task(s) to be performed within the one(s) of the multiple job flows to be performed first.

The response to a request to derive such a superset job flow may include the provision of a visual representation of the superset job flow. Such a visual representation may include indications of aspects of the output job flow and each of the preceding job flows, and/or what portions of each may have been pruned as part of deriving the superset job flow. In some embodiments, it may be that such a visual representation of the superset job flow is part of a series of visual representations that may be generated to provide a step-by-step visual presentation of the identification and/or pruning of the output job flow and/or of each preceding job flow. Alternatively or additionally, it may be that such a visual representation of the superset job flow is provided as part of a graphical user interface (GUI) of a graphical editor that may enable the superset job flow to be manually modified, following its derivation, to undo at least some of the pruning that has been performed and/or to make still other changes. As with the automation of the derivation of the superset job flow, such a graphical presentation of the superset job flow may further aid personnel with little or no programming skills in the development of such a new job flow by affording such personnel an opportunity to understand various aspects of the superset job flow that they have just caused to be created. Where such a visual presentation is made as part of a GUI for a graphical editor, the graphical presentation of the newly derived superset job flow may provide an advantageous starting point for what may be some relatively minor additional modifications to impart particular desired characteristics to the superset job flow.

The extent to which preceding job flows may be identified for inclusion within the superset job flow (either in a pruned form or without pruning) may be limited by what job flows have been stored within the one or more federated areas maintained by the one or more federated devices. Stated differently, if a job flow was performed externally on another device to generate a data object that served as an input data object to the past generation of the particular output data object, and if that externally generated input data object is provided to the one or more federated devices for storage, but not the job flow definition of that externally performed job flow, then information needed to include that externally performed job flow in the superset job flow is simply not available to the one or more federated devices.

Alternatively or additionally, the extent to which preceding job flows may be identified for inclusion within the superset job flow may be limited by what federated areas are authorized to be accessed as part of searching for preceding job flows. More specifically, the particular personnel originating the request and/or the requesting device from which the request is received may be associated with an authorization to access a particular defined set of one or more particular federated areas. Where an indication is found of there being another preceding job flow for which the job flow definition is not accessible due to lack of authorization to access the federated area within which it is stored, the visual representation of the superset job flow may be generated to include an indication that one or more additional preceding job flows do exist, but are unable to be included in the superset job flow due to lack of authorization to access their job flow definition(s). Such an indication may additionally include contact information by which a request may be made to obtain the necessary authorization.

Such limitations on authorization to access a job flow definition of a preceding job flow may be at least partially based on the location, within a hierarchy of federated areas, of each federated area to which authorization is granted. Alternatively or additionally, where the requesting device is associated with an alternate development environment with which objects area shared through the use of synchronized transfer areas, such limitations on authorization to access a job flow definition of a preceding job flow may be at least partially based on the location, within a hierarchy of federated areas, of each federated area in which one of such a synchronized transfer area has been defined. Also where the requesting device is associated with an alternate development environment in which a secondary programming language other than the primary programming language usually associated with federated areas is used, the job flow definition of the superset job flow, and/or the objects required to derive and/or provide a visual representation of the superset job flow, may be translated between such languages.

In some embodiments, a job flow definition may be stored within federated area(s) as a file or other type of data structure in which the job flow definition is represented as a DAG (directed acyclic graph). Alternatively or additionally, a file or other type of data structure may be used that organizes aspects of the job flow definition in a manner that enables a DAG to be directly derived therefrom. Such a file or data structure may directly indicate an order of performance of tasks, or may specify dependencies between inputs and outputs of each task to enable an order of performance to be derived. By way of example, an array may be used in which there is an entry for each task routine that includes specifications of its inputs, its outputs and/or dependencies on data objects that may be provided as one or more outputs of one or more other task routines. Thus, a DAG may be usable to visually portray the relative order in which specified tasks are to be performed, while still being interpretable by federated devices and/or other devices that may be employed to perform the portrayed job flow. Such a form of a job flow definition may be deemed desirable to enable an efficient presentation of the job flow on a display of a reviewing device as a DAG. Thus, review of aspects of a performance of an analysis may be made easier by such a graphical representation of the analysis as a job flow.

Regardless of whether the DAG is saved for use as a job flow definition, or simply to retain the DAG for future reference, the DAG may be stored as a script generated in a process description language such as business process model and notation (BPMN) promulgated by the Object Management Group of Needham, Mass., USA.

The tasks that may be performed by any of the numerous tasks routines may include any of a variety of data analysis tasks, including and not limited to searches for one or more particular data items, and/or statistical analyses such as aggregation, identifying and quantifying trends, subsampling, calculating values that characterize at least a subset of the data items within a data object, deriving models, testing hypothesis with such derived models, making predictions, generating simulated samples, etc. The tasks that may be performed may also include any of a variety of data transformation tasks, including and not limited to, sorting operations, row and/or column-based mathematical operations, filtering of rows and/or columns based on the values of data items within a specified row or column, and/or reordering of at least a specified subset of data items within a data object into a specified ascending, descending or other order. Alternatively or additionally, the tasks that may be performed by any of the numerous task routines may include any of a variety of data normalization tasks, including and not limited to, normalizing time values, date values, monetary values, character spacing, use of delimiter characters and/or codes, and/or other aspects of formatting employed in representing data items within one or more data objects. The tasks performed may also include, and are not limited to, normalizing use of big or little Endian encoding of binary values, use or lack of use of sign bits, the quantity of bits to be employed in representations of integers and/or floating point values (e.g., bytes, words, doublewords or quadwords), etc. Also alternatively or additionally, the tasks that may be performed may include tasks to train one or more neural networks for use, tasks to test one or more trained neural networks, tasks to coordinate a transition to the use of one or more trained neural networks to perform an analysis from the use of a non-neuromorphic approach to performing the analysis, and/or tasks to store, retrieve and/or deploy a data set that specifies parameters and/or hyper parameters of one or more neural networks. By way of example, such tasks may include tasks to train, test, and/or coordinate a transition to using, an ensemble of neural networks such as a chain of neural networks.

By way of example, tasks that may be performed may include the training, testing, and/or use of a chain of neural networks to generate time series predictions. Each neural network of such a neural network chain may be trained, and then used, to provide a portion of the time series prediction that covers a different subrange of time that make up the full range of time covered by the time series prediction. The neural networks may be interconnected such that each neural network in the neural network chain may receive, as a subset of its inputs, the outputs of each of the preceding neural networks by which each of those preceding neural networks provide their portion of the time series prediction. The neural networks may be trained, one at a time, starting with the first neural network in the chain. To reduce overall training time, a form of transferred learning may be employed in which each neural network, as a starting point for its training, is provided with the weights and biases representing what was learned by the preceding neural network.

The set of tasks that may be specified by the job flow definitions may be any of a wide variety of combinations of analysis, normalization and/or transformation tasks. The result reports generated through performances of the tasks as directed by each of the job flow definitions may include any of a wide variety of quantities and/or sizes of data. In some embodiments, one or more of the result reports generated may contain one or more data sets that may be provided as inputs to the performances of still other analyses, and/or may be provided to a reviewing device to be presented on a display thereof in any of a wide variety of types of visualization. In other embodiments, each of one or more of the result reports generated may primarily include an indication of a prediction and/or conclusion reached through the performance of an analysis that generated the result report as an output.

Additionally among the objects that may be stored in a federated area may be numerous instance logs that may each provide a record of various details of a single past performance of a job flow. More specifically, each instance log may provide indications of when a performance of a job flow occurred, along with identifiers of various objects stored within federated area(s) that were used and/or generated in that performance. Among those identifiers may be an identifier of the job flow definition that defines the job flow of an analysis that was performed, identifiers for all of the task routines executed in that performance, identifiers for any data objects employed as an input (e.g., input data sets), and identifiers for any data objects generated as an output (e.g., a result report that may include one or more output data sets).

The one or more federated devices may assign such identifiers to data objects, task routines and/or job flow definitions as each is stored and/or generated within a federated area to enable such use of identifiers in the instance logs. In some embodiments, the identifier for each such object may be generated by taking a hash of at least a portion of that object to generate a hash value to be used as the identifier with at least a very high likelihood that the identifier generated for each such object is unique. Such use of a hash algorithm may have the advantage of enabling the generation of identifiers for objects that are highly likely to be unique with no other input than the objects, themselves, and this may aid in ensuring that such an identifier generated for an object by one federated device will be identical to the identifier that would be generated for the same object by another device.

Where task routines are concerned, it should be noted that the unique identifier generated and assigned to each task routine is in addition to the flow task identifier that identifies what task is performed by each task routine, and which are employed by the job flow definitions to specify the tasks to be performed in a job flow. As will be explained in greater detail, for each task identified in a job flow definition by a flow task identifier, there may be multiple task routines to choose from to perform that task, and each of those task routines may be assigned a different identifier by the one or more federated devices to enable each of those task routines to be uniquely identified in an instance log. Where instance logs are concerned, the identifier assigned to each instance log may, instead of being a hash taken of that instance log, be a concatenation or other form of combination of the identifiers of the objects employed in the past performance that is documented by that instance log. In this way, and as will be explained in greater detail, the identifier assigned to each instance log may, itself, become useful as a tool to locating a specific instance log that documents a specific past performance.

The assignment of a unique identifier to each object (or at least an identifier that is highly likely to be unique to each object) enables each object to be subsequently retrieved from storage to satisfy a request received by a federated device to access one or more specific objects in which the request specifies the one or more specific objects by their identifiers. Alternatively, requests may be received to provide access to multiple objects in which the multiple objects are specified more indirectly. By way of example, a request may be received to provide access to a complete set of the objects that would be needed by the requesting device to perform a job flow with specified data set(s) serving as inputs, where it is the job flow definition and the data set(s) that are directly identified in the request. Responding to such a request may entail the retrieval of the specified job flow definition and the specified data set(s) by the one or more federated devices, followed by the retrieval of the flow task identifiers for the tasks to be performed from the job flow definition, followed by the use of the flow task identifiers to retrieve the most current version of task routine to perform each task, and then followed by the transmission of the specified job flow definition, the specified data set(s) and the retrieved task routines to the requesting device. By way of another example, a request may be received to provide access to the objects that are identified by an instance log as having been employed in a past performance of a job flow, where it is the instance log that is directly identified by its identifier in the request. Responding to such a request may entail the retrieval of the specified instance log by one or more federated devices, followed by the retrieval of the identifiers of other objects from that instance log, and then followed by the retrieval and transmission of each of those other objects to the device from which the request was received. As will be explained in greater detail, still other forms of indirect reference to objects stored within federated area(s) may be used in various requests.

In various embodiments, the use of federated area(s) may go beyond just the storage and/or retrieval of objects, and may include the use of those stored objects by the one or more federated devices to perform job flows. In such embodiments, the one or more federated devices may receive requests (e.g., via the portal) from other devices to perform various analyses that have been defined as job flows, and to provide an indication of the results to those other devices. More specifically, in response to such a request, the one or more federated devices may execute a combination of task routines to perform tasks of a job flow described in a job flow definition within a federated area to thereby perform an analysis with one or more data objects, all of which are stored in one or more federated areas. In so doing, the one or more federated devices may generate an instance log for storage within a federated area that documents the performances of the analysis, including identifiers of data objects used and/or generated, identifiers of task routines executed, and the identifier of the job flow definition that specifies the task routines to be executed to perform the analysis as a job flow.

In some of such embodiments, the one or more federated devices may be nodes of a grid of federated devices across which the tasks of a requested performance of an analysis may be distributed. The provision of a grid of the federated devices may make available considerable shared processing and/or storage resources to allow such a grid to itself perform complex analyses of large quantities of data, while still allowing a detailed review of aspects of the performance of that analysis in situations where questions may arise concerning data quality, correctness of assumptions made and/or coding errors. During the performance of a job flow, the one or more federated devices may analyze the job flow definition for the job flow to identify opportunities to perform multiple tasks in parallel based on dependencies among the tasks in which data generated as an output by one task is needed as an input to another. Such opportunities for parallel performances may be utilized as opportunities to more thoroughly spread the performances of the multiple tasks among more processor threads and/or cores, among more processors and/or among more federated devices.

However, it should be noted that other embodiments are possible in which each of the multiple storage devices may incorporate sufficient processing resources to enable at least a subset of job flows to be performed by the multiple storage devices in addition to and/or in lieu of the one or more federated devices doing so. In some of such embodiments, whether the processing resources of the one or more federated devices are employed to perform a particular job flow or the processing resources of multiple storage devices are employed to do so may be determined based on a variety of aspects associated with the manner in which one or more of the objects needed to perform the job flow are stored. At least in the case of data objects used as inputs, such aspects may include, and are not limited to, which federated area each such data object is stored within, which federated device(s) and/or storage device(s) each such data object is stored within, the size of such data objects, whether such data objects are stored in an undivided manner or a distributed manner, and/or whether such data objects that are stored in a distributed manner are in a distributable form.

The one or more federated devices may store a set of indications of such aspects of storage for each object stored within a federated area. In some embodiments, the one or more federated devices may generate a separate object location identifier for each object in addition to or in lieu of the object identifier generated for each object. In response to the receipt of a request to perform any of a variety of operations, including the retrieval of objects to transmit to another device or the performance of a job flow, the one or more federated devices may retrieve the indications of such aspects of storage from the object location identifier for each object that is to be accessed. The one or more federated devices may then use the retrieved indications in retrieving those objects and/or in determining whether to use the processing resources of the device(s) in which one or more of the objects are stored and/or the processing resources of other device(s) in performing a job flow.

By way of example, where a data set that is required as an input to a job flow is sufficiently large (e.g., exceeds a predetermined threshold size) that it has been divided into multiple blocks and stored in a distributed manner among multiple storage devices, it may be deemed desirable to employ the processing resources of the multiple storage devices among which that data set is distributed to perform the job flow so as to avoid incurring the overhead of transmitting such a large data set to the one or more federated devices so as to use the processing resources of the one or more federated devices to perform the job flow. Stated differently, it may be deemed desirable to essentially use the data set in situ within the storage devices in which it is already stored. This may be in spite of the one or more federated devices having superior processing resources such that the performance of one or more of the tasks of the job flow may be accomplished more quickly and/or efficiently using those processing resources, but where the overhead in transmitted the data set to the one or more federated devices would overwhelm the benefits of using those processing resources. In this way, the transmission of any portion of the data set among the storage and/or federated devices may be entirely avoided by the job flow being performed within the multiple storage devices among which the blocks of the data set are locally stored, and at least partially in parallel among those multiple storage devices.

Also among the aspects of the storage of at least data objects for which indications may be stored may be such aspects as their origins. More precisely, for each data object, indications may be stored as to whether each data object was generated as an output of a performance of a job flow within the distributed processing system, was generated as an output of a performance of a job flow within an other processing device and/or system before being provided to the distributed processing system, and/or was provided to the distributed processing system without any indication of its origins. In some embodiments, such indications of data object origins may be useful when the functionality of one or more job flows is being analyzed as part of enforcing accountability for sources of errors that may be discovered in past performances of job flows. By way of example, it may be deemed useful to know whether a data object used as an input to a job flow was generated in a past performance of another job flow, or was possibly generated in an entirely different way by an outside source, in a situation in which the difference in characteristics of a data object generated in one of these ways versus the other may be significant in understanding an occurrence of a failure in a performance of a job flow. Alternatively or additionally, in some embodiments, such indications of origins may be useful during the automated generation of a new job flow that is to be capable of generating a specified output from a specified input. More specifically, indications that one or more data objects needed as input are not able to be traced to having been generated as the output(s) of earlier performance(s) of one or more job flows may be deemed useful in identifying error condition(s) that may arise during such automated generation of a new job flow.

However, and as will be familiar to those skilled in the art, as originally received by the one or more federated devices, the data set may be in a form in which its data items are organized therein in complex manner that does not entail the use of a single data structure throughout (e.g., not a single two-dimensional array throughout). Alternatively or additionally, the data set may incorporate metadata within a particular portion thereof that specifies the manner in which the data items are organized therein (e.g., as a header at the head of a data file that specifies the type of data structure and/or indexing scheme used), and the manner of organization of the data items may be sufficiently complex as to be prohibitively difficult to identify without reference to that metadata. If such a data set is then simply divided up into blocks and distributed among the multiple storage devices or multiple federated devices, it may be that different ones of the blocks are caused to include portions of different data structures from within the data set such that the manner in which the data items are organized within the data blocks differs among the data blocks such that the manner in which data is accessed within each data block may differ among the data blocks. Alternatively or additionally, where the data set incorporates metadata, it may be that just one of the blocks includes the metadata, and that one block may then be distributed to just one of the multiple storage devices or multiple federated devices, thereby depriving the others of the information needed to access and use the data items within the blocks that are distributed to them. To make the data items within the other blocks accessible to the storage devices or federated devices within which they are stored, the metadata would have to be transmitted to the other ones of the multiple storage devices or multiple federated devices by the one storage device or federated device, respectively, that received the metadata within the block that was distributed to it.

To avoid such situations, prior to the storage of such a data set within a federated area, the one or more federated devices that receive the data set may analyze the form of the data set upon its receipt to determine whether or not the data items therein are already organized in a manner that is homogeneous throughout the data set such that it is already in a distributable form in which it is amenable to being divided into blocks in which data items would be organized in an identical manner In some embodiments, the type of homogeneous organization of data items within the set may be additionally required to match one of what may be a set of preselected types of homogeneous organization that may each employ a particular bit-wise and/or byte-wise formatting (e.g., a tabular format with a particular byte alignment), and/or a particular use of particular delimiters (e.g., as text made up of comma-separated variables or CSV). If the data set does not include a distinct metadata data structure, if the data items within the data set are organized in a homogeneous manner, and/or if that manner of organization is of a type that is among such a preselected set of types (in embodiments in which such a requirement exists), then the one or more federated devices may proceed to cooperate thereamong and/or with multiple storage devices to divide and store the data thereamong as multiple blocks in a distributed manner.

However, if the data set does include a distinct metadata data structure, or if the data items within the data set are not organized therein in a homogeneous manner, or if that manner of organization is of a type that is not among such a preselected set of types (again, in embodiments in which such a requirement exists), then the one or more federated devices that received the data set may convert the data set from the form in which it was received, and into a distributable form where there is no distinct metadata data structure, where the data items are organized therein in a homogeneous manner throughout, and where that homogeneous manner of organization is one of such preselected types. In so doing, where the original form of the data set includes a distinct metadata data structure, the one or more federated devices may use that metadata as a guide in accessing the data items therein, while generating a corresponding distributable form of the data set in which the same data items are organized in a homogeneous manner that, again, will enable the data items to be more readily accessible after the distributable form of the data set has been divided into multiple blocks. Following such conversion, the one or more federated devices may provide the distributable form of the data set to a set of multiple storage devices for being divided into blocks that are then distributed among the multiple storage devices as part of effecting distributed storage of the data set.

Also following such conversion, the one or more federated devices may store an indication of various aspects of the storage of the data set for future use in accessing it. More specifically, the one or more federated devices may generate an object location identifier that includes indications of such aspects, including and not limited to, which federated area it is stored within, which federated device(s) and/or storage device(s) it is stored within, its size, the fact that it is stored in a distributed manner, and/or the fact that it is stored in a distributable form Regardless of whether the data set was originally received already in a distributable form or was converted into a distributable form, with the distributable form of the data set now stored in a distributed manner, the homogeneous manner of storage of the data items within each of the blocks distributed to one of the multiple storage devices or federated devices enables an at least partially parallel performance of a job flow using each of the blocks as an input thereto in a manner that does not entail exchanges of information among the multiple storage devices. Stated differently, the data items within each block is able to be accessed and used locally within the device in which it is stored as an independent input to one of the parallel independent performances of a job flow within that device.

However, while such a large data set may be put through such conversion and then stored in such a distributed manner among the multiple storage devices such that there is a portion of the data set that is locally accessible to each of multiple storage devices or multiple federated devices, the other objects needed to perform a particular job flow may not be stored in a way in which each of those multiple devices has such local access to them. More precisely, the job flow definition and the task routines also needed to perform the job flow may each be stored as an undivided object within just a single one of those devices and/or within just a single one of still other devices. It should be noted that such objects as the job flow definition and each of the task routines may be expected to be of significantly smaller size than the data set (e.g., smaller than the predetermined threshold size) such that division into blocks for storage is deemed unnecessary. As a result, it may be that none or just one of those devices has local access to all of the objects needed to perform the particular job flow.

To address this issue, the one or more federated devices that may receive a request to perform the particular job flow may retrieve each of the other objects needed to perform the particular job flow from wherever they may be stored, and may then distribute copies of those other objects to each one of the multiple devices in which a block of the data set is stored. In so doing, the one or more federated devices may assemble those other objects into a container, along with additional executable instructions that enable the processor(s) of each of those devices in which one or more blocks of the data set are stored to perform the job flow using the block(s) of the data set that are stored therein, including the execution of the task routines.

The performance of the job flow with the data set as an input may be expected to result in the generation of another data object as an output, i.e., a result report. However, since the performance of the job flow using the processing resources of those multiple devices is as multiple at least partially parallel performances, the result report is necessarily generated as multiple separate blocks that each correspond to one of the blocks of the data set. In some embodiments, it may be a normal procedure to store the result report in a federated area to preserve it for future analyses as part of the earlier described policy of maintaining accountability for the results of performing job flows. However, in other embodiments, there may be provided an ability for the request to perform the particular job flow to include the ability to specify which data objects are to be so preserved, and which are not. Thus, in such embodiments, where the result report has not been specified as a data object to be preserved, the one or more federated devices that received the request to perform the particular job flow may delete the blocks of the result report upon completion of the performance of the particular job flow and/or upon determining that the result report is not used as an input to any other task within the job flow.

However, where the result report is meant to be preserved in a federated area (either by default as part of normal procedures or as a result of being specified as a data object to be preserved), the one or more federated devices may retrieve and assemble the blocks of the result report into a single undivided form of the result report, assign it a result report identifier, and then cooperate with one or more storage devices or federated devices to store it within a federated area. Where the result report, as assembled, is of a size that falls below the predetermined threshold size, the result report may be deemed too small to necessitate being stored in a distributed manner as the data set was, and therefore, may be stored as a undivided data object within a single storage device or federated device. However, if the assembled result report is of a size greater than the predetermined threshold size, then the result report may then be divided back into blocks and stored among multiple storage devices or multiple federated devices in a distributed manner, just as the data set was. Additionally, the one or more federated devices may store indications of various aspects of the storage of the results report, including and not limited to, which federated area it is stored within, which federated device(s) and/or storage device(s) it is stored within, its size, whether it is stored in an undivided manner or in a distributed manner, and/or whether it is stored in a distributable form (if it is stored in a distributed manner).

In some embodiments, the one or more federated devices may support the execution of a set of task routines written in differing programming languages as part of performing a job flow. As will be explained in greater detail, this may arise where it is deemed desirable to support collaborations among developers who are familiar with differing programming languages, but who are each contributing different objects, including task routines, the development of a job flow. To enable this, the one or more federated devices may employ a multitude of runtime interpreters and/or compilers for a pre-selected set of multiple programming languages to execute such a set of task routines during the performance of a job flow.

As will also be explained in greater detail, during the performance of a job flow, there may instances of a task routine generating a data set as an output that is to then be used as an input to one or more other task routines (e.g., a mid-flow data set). That data may be persisted by being stored in a federated area as a new data object that is assigned a unique identifier just as a data object received from a source device would be. As previously discussed, this may be done as part of enabling accountability concerning how an analysis is performed by preserving data sets that are generated as an output by one task routine for use as an input to another. However, where two or more task routines that exchange a data set thereamong are written in different programming languages, the data set so exchanged may be subjected to a conversion process to in some way change its form (e.g., serialization or de-serialization) to accommodate differences in data types and/or formats that are supported by the different programming languages (e.g., to resolve differences in the manner in which arrays are organized and/or accessed). Where such a conversion is performed, it may be that just one of the forms of the data set may be persisted to a federated area while the other form may be temporarily stored in a shared memory space that may be instantiated just for the duration of the performance of the job flow and that may be uninstantiated at the end of that performance.

In some embodiments, a request for a performance of a job flow may specify that the input/output behavior of the task routines used during the performance be verified. More specifically, it may be requested that the input/output behavior of the task routines that are executed during the performance of a job flow be monitored, and that the observed input/output behavior of each of those task routines with regard to accessing data objects and/or engaging in any other exchange of inputs and/or outputs be compared to the input and/or output interfaces that may be implemented by their executable instructions, that may be specified in any comments therein, and/or that may be specified in the job flow definition of the job flow that is performed. Each task routine that exhibits input/output behavior that remains compliant with such specifications during its execution may be in some way marked and/or recorded as having verified input/output behavior. Each task routine that exhibits input/output behavior that goes beyond such specifications may be in some way marked and/or recorded as having aberrant input/output behavior.

To perform such monitoring of the input/output behavior of task routines, each task routine that is executed during the performance of a particular job flow may be so executed within a container environment instantiated within available storage space by a processor of one of the federated devices. More specifically, such a container environment may be defined to limit accesses that may be made to other storage spaces outside the container environment and/or to input and/or output devices of the federated device. In effect, such a container environment may be given a set of access rules by which input/output behaviors that comply with input/output behaviors that are expected of particular task routine are allowed to proceed, while other input/output behaviors that go beyond the expected input/output behaviors may be blocked while the storage locations that were meant to be accessed by those aberrant input/output behaviors are recorded to enable accountability for such misbehavior by a task routine, and/or to serve as information that may be required by a programmer to correct a portion of the executable instructions within such a task routine to correct its input/output behavior.

By way of example, and still more specifically, such comments within a task routine and/or such specifications within a job flow definition may specify various aspects of its inputs and/or outputs, such data type, indexing scheme, etc. of data object(s), but may refrain from specifying any particular data object as part of an approach to allowing particular data object(s) to be specified by a job flow definition, or in any of a variety of other ways, during the performance of the job flow in which the task routine may be executed and/or that is defined by the job flow definition. Instead, a placeholder designator (e.g., a variable) may be specified that is to be given a value indicative of a specific data object during the performance of a job flow. Alternatively, where one or more particular data objects are specified, such specification of one or more particular data objects may be done as a default to address a situation in which one or more particular data objects are not specified by a job flow definition and/or in another way during performance of a job flow in which the task routine may be executed. Regardless of whether particular data objects are specified, following the retrieval and interpretation of such input/output specifications, a container environment may be instantiated that is configured to enable the task routine to be executed therein and that allows the task routine to engage in input/output behavior that conforms to those input/output specifications, but which does not allow the task routine to engage in aberrant input/output behavior that goes beyond what it is expected based on those input/output specifications. Depending on the input/output behavior that is observed as the task routine is so executed, the task routine may be marked as being verified as engaging in correct input/output behavior or may be marked as being observed engaging in aberrant input/output behavior.

In some embodiments, the marking of the results of such monitoring of input/output behavior of each task routine may be incorporated into task routine database(s) that may be used to organize the storage of task routines within one or more federated areas as part of enabling more efficient selection and retrieval of task routines for provision to a requesting device and/or for execution. In some of such embodiments, such marking of task routines may also play a role in which task routines are selected to be provided to a requesting device and/or to be executed as part of performing a job flow. As an alternative to such marking of such input/output behavior of a task routine being maintained by a task routine database, a separate and distinct data structure may be maintained within the federated area in which the task routine is stored as a repository of indications of such input/output behavior by the task routine and/or by multiple task routines (e.g., a data file of such indications). Alternatively or additionally, and regardless of the exact manner in which such indications of such input/output behavior of a task routine may be stored, in some embodiments, such stored indications of either correct or aberrant input/output behavior of a task routine may be reflected in instance logs from performances of job flows in which the task routine was executed and/or in a visual representation of the task routine in a DAG.

Some requests to perform a job flow may include a request to perform a specified job flow of an analysis with one or more specified data objects. Other requests may be to repeat a past performance of a job flow that begat a specified result report, or that entailed the use of a specific combination of a job flow and one or more data sets as inputs. Still other requests may specify the performance of a set of tasks using a set of data objects as inputs, but may not specify a job flow. Through the generation of identifiers for each of the various objects associated with each performance of a job flow, through the use of those identifiers to refer to such objects in instance logs, and through the use of those identifiers by the one or more federated devices in accessing such objects, requests for performances of analyses are able to more efficiently identify particular performances, their associated objects and/or related objects.

Regardless of the exact type of request received, each request may have formatting, syntax and/or other characteristics selected to cause the request to conform to one or more industry specifications for communications between devices. More specifically, the request may be generated by the requesting device to have characteristics conforming to one or more of the versions of the Message-Passing Interface (MPI) specification promulgated by the MPI Forum, which is a cooperative venture by numerous governmental, corporate and academic entities from around the world. Further, the manner in which the federated devices and/or storage devices communicate to effect the requested performance of the set of specified tasks may conform to one or more versions of the MPI specification, and/or the manner in which response(s) to the request are transmitted back to the requesting device may do so.

In embodiments in which a request is received to perform a specified job flow of an analysis with one or more specified data objects as inputs, the one or more federated devices may use the identifiers of those objects that are provided in the request to analyze the instance logs stored in one or more federated areas to determine whether there was a past performance of the same job flow with the same one or more data objects as inputs. If there was such a past performance, then the result report generated as the output of that past performance may already be stored in a federated area. As long as none of the task routines executed in the earlier performance have been updated since the earlier performance, then a repeat performance of the same job flow with the same one or more data objects serving as inputs may not be necessary. Thus, if any instance logs are found for such an earlier performance, the one or more federated devices may analyze the instance log associated with the most recent earlier performance (if there has been more than one past performance) to obtain the identifiers uniquely assigned to each of the task routines that were executed in that earlier performance. The one or more federated devices may then analyze each of the uniquely identified task routines to determine whether each of them continues to be the most current version stored in the federated area for use in performing its corresponding task. If so, then a repeated performance of the job flow with the one or more data objects identified in the request is not necessary, and the one or more federated devices may retrieve the result report generated by the past performance from a federated area and transmit that result report to the device from which the request was received.

However, if no instance logs are found for any past performance of the specified job flow with the specified one or more data objects that entailed the execution of the most current version of each of the task routines, then the one or more federated devices may perform the specified job flow with the specified data objects using the most current version of task routine for each task specified with a flow task identifier in the job flow definition. Indeed, and as will be explained in greater detail, it may be that the most current version of each task routine may be selected and used in performing a task by default, unless a particular earlier version is actually specified to be used. The one or more federated devices may then assign a unique identifier to and store the new result report generated during such a performance in a federated area, as well as transmit the new result report to the device from which the request was received. The one or more federated devices may also generate and store in a federated area a corresponding new instance log that specifies details of the performance, including the identifier of the job flow definition, the identifiers of all of the most current versions of task routines that were executed, the identifiers of the one or more data objects used as inputs and/or generated as outputs, and the identifier of the new result report that was generated.

In embodiments in which a request is received to repeat a past performance of a job flow of an analysis that begat a result report identified in the request by its uniquely assigned identifier, the one or more federated devices may analyze the instance logs stored in one or more federated areas to retrieve the instance log associated with the past performance that resulted in the generation of the identified result report. The one or more federated devices may then analyze the retrieved instance log to obtain the identifiers for the job flow definition that defines the job flow, the identifiers for each of the task routines executed in the past performance, and the identifiers of any data objects used as inputs in the past performance Upon retrieving the identified job flow definition, each of the identified task routines, and any identified data objects, the one or more federated devices may then execute the retrieved task routines, using the retrieved data objects, and in the manner defined by the retrieved job flow definition to repeat the past performance of the job flow with those objects to generate a new result report. Since the request was to repeat an earlier performance of the job flow with the very same objects, the new result report should be identical to the earlier result report generated in the past performance such that the new result report should be a regeneration of the earlier result report. The one or more federated devices may then assign an identifier to and store the new result report in a federated area, as well as transmit the new result report to the device from which the request was received. The one or more federated devices may also generate and store, in a federated area, a corresponding new instance log that specifies details of the new performance of the job flow, including the identifier of the job flow definition, the identifiers of all of the task routines that were executed, the identifiers of the one or more data objects used as inputs and/or generated as outputs, and the identifier of the new result report.

In embodiments in which one or more federated devices may receive a request to perform a set of tasks specified in the request using one or more data objects also specified in the request as input(s) thereto, and without specifying a job flow definition that would define an order in which the set of tasks is to be performed, the one or more federated devices may analyze the specification of data objects as input(s) and/or output(s) of each task, and/or may analyze the definition of input and/or output interface(s) of each task, to identify dependencies thereamong, and to thereby identify opportunities for at least partially parallel performances thereamong. Where the request includes or is accompanied by one or more of the specified data objects, the one or more federated devices may store each such data object in a federated area prior to commencing performance of the one(s) of the specified tasks that require such data as input.

In various embodiments, a request may be received to perform a specified set of tasks using one or more data objects as inputs where the request makes no reference, either directly or indirectly, to any job flow definition that may already be stored in a federated area. Indeed, it may be that there is no pre-existing job flow definition for performing the specified set of tasks. The request may additionally specify which data object(s) that are generated as outputs during the performance of the set of tasks are to be stored within a federated area and/or are to be transmitted back to the device from which the request is received. The specification of each task in the request may include the specification of the one or more data objects that are to be used as its inputs, and/or may include the specification of the one or more data objects that are to be generated as outputs. Alternatively or additionally, the specification of each task in the request may define the input and/or output interfaces thereof, or there may be reliance on the definition of the input and/or output interfaces provided by the executable instructions and/or comments of the one or more task routines that perform each of the specified tasks when executed.

In some of such requests, one or more objects required for the performance of the specified set of tasks may be provided along with the request. By way of example, one or more of the data objects to be used as an input may be directly incorporated into the request and/or may otherwise accompany the request. In response, the one or more federated devices may initially store such data object(s) in a federated area before commencing the requested performance of the set of tasks.

The one or more federated devices may analyze the specification in the request of each task, along with any specification in the request of data objects that are the input(s) and/or output(s) of each specified task, and/or along with any definition in the request of input and/or output interface(s) for each specified task, to identify dependencies among the specified tasks. From at least these identified dependencies, a job flow definition for the requested performance of the set of tasks may be derived. In so doing, the one or more federated devices may also identify opportunities for parallelism in which different ones of the specified tasks are able to be performed at least partially in parallel as a result of a lack of dependencies thereamong.

Alternatively or additionally, where a data object specified as an input is stored in a distributed manner across multiple federated devices or multiple storage devices, the one or more federated devices that received the request may employ such distributed storage as an opportunity for at least partially parallel performances of multiple instances of a task that requires that data object as an input by selecting the multiple federated devices or multiple storage devices in which that data object is stored to be used in performing that task. In this way, such a distributed object may be used in situ where it is already stored, thereby obviating the need to exchange portions of it among devices. To enable such partially parallel performances of that task, each of the selected federated devices or storage devices may be provided with a container that includes a copy of a task routine that is to be executed to cause the performance of the task within each of the selected devices, any other executable routines that may be needed to support the execution of that task routine, and/or any other data objects also required as an input to each of the at least partially parallel performances of that task.

Each such at least partially parallel performance of that task may generate a separate block of a data object as an output. As a result, such a data object is generated in a distributed form. The one or more federated devices may retrieve and perform a reduction operation on those blocks of the generated data object if the request includes an indication that the generated data object is to be stored in a federated area and/or is to be transmitted back to the requesting device from which the request was received. Otherwise, each of such blocks of the generated data object may be caused to simply remain stored within the federated device or the storage device within which it was generated, and may serve as an input to one of multiple at least partially parallel performances of another of the specified tasks.

In some embodiments, the one or more federated devices that received the request may initially attempt to determine whether the set of specified tasks has already been previously performed with the specified data object(s) as input. An attempt may be made to match the identifiers of the tasks specified in the request to an existing job flow definition in which the same set of tasks are performed. The identifier of that matching job flow definition may then be used along with the identifiers of each of the data objects specified in the request to attempt to identify an instance log that documents a past performance of the job flow defined by the matching job flow definition with the same data objects specified as inputs thereto. In response to having identified such a matching instance log, the identifier(s) provided therein for each of the data objects generated as output may be used to retrieve each of those output data objects, and then those output data objects may be transmitted to the requesting device in lieu of performing the set of tasks specified in the request.

The request may have formatting, syntax and/or other characteristics selected to cause the request to conform to one or more industry specifications for communications between devices. More specifically, the request may be generated by the requesting device to have characteristics conforming to one or more of the versions of the Message-Passing Interface (MPI) specification promulgated by the MPI Forum, which is a cooperative venture by numerous governmental, corporate and academic entities from around the world. Still more specifically, the request may generated to conform to the specification for OpenMPI, a variant of MPI promulgated by Software in the Public Interest (SPI) of New York, N.Y. in the USA.

In such embodiments, the manner in which each task, its inputs and/or its outputs are specified in the request may conform to a format for an application programming interface (API) associated with one or more of the versions of the MPI specification. Alternatively or additionally, the request may embed one or more of the specified data objects required as input the performance of the set of specified tasks as streaming data in accordance with one or more of the versions of the MPI specification. Further, the manner in which the federated devices and/or storage devices communicate to effect the requested performance of the set of specified tasks may conform to one or more versions of the MPI specification, and/or the manner in which response(s) to the request are transmitted back to the requesting device may do so.

In support enabling the objects stored within one or more federated areas to be used in performances of job flows, and/or in support of enabling accountability in analyzing aspects of a past performance of a job flow, a set of rules may be enforced by the one or more federated devices that limit what actions may be taken in connection with each object. Such enforced limitations in access to each object may be in addition to the aforementioned restrictions on accesses to federated area(s) that may be imposed on entities, persons and/or particular devices. Such rules may restrict what objects are permitted to be stored and/or when, and/or may restrict what objects are able to be altered and/or removed as part of preventing instances of there being "orphan" objects that are not accompanied in storage by other objects that may be needed to support a performance or a repetition of a performance of a job flow. Alternatively or additionally, such rules may restrict what objects are permitted to be stored and/or when as part of prevent instances of incompatibility between objects that are to be used together in a performance of a job flow.

By way of example, whether a job flow definition will be permitted to be stored within a federated area may be made contingent on whether, for each task that is specified in the job flow definition, there is at least one task routine that is already stored in the federated area and/or is about to be stored in the federated area along with the job flow definition. Such a rule that imposes such a condition on the storage of a job flow definition may be deemed desirable to prevent a situation in which there is a job flow definition stored in a federated area that defines a job flow that cannot be performed as a result of there being a task specified therein that cannot be performed due to the lack of storage in a federated area of any task routine that can be executed to perform that task. Similarly, and by way of another example, whether an instance log will be permitted to be stored within a federated area may be made contingent on whether each object identified in the instance log as being associated with a past performance of the job flow documented by the instance log is already stored in the federated area and/or is about to be stored in the federated area along with the instance log. Such a rule that imposes such a condition on the storage of an instance log may be deemed desirable to prevent a situation in which there is an instance log stored in a federated area that documents a past performance of a job flow that cannot be repeated due to the lack of storage in a federated area of an object specified in the instance log as being associated with that past performance.

By way of another example, whether a job flow definition will be permitted to be stored within a federated area may alternatively or additionally be made contingent on whether, the input and/or output interfaces specified for each task in the job flow definition are a sufficient match to the input and/or output definitions implemented by the already stored task routines that perform each of those tasks. Such a rule that imposes such a condition on the storage of a job flow definition may be deemed desirable to prevent incompatibilities between the specifications of interfaces in a job flow definition and the implementations of interfaces in the corresponding task routines. Similarly, and by way of still another example, whether a new version of a task routine that performs a particular task when executed will be permitted to be stored within a federated area may be made contingent on whether, the input and/or output definitions implemented within the new task routine are a sufficient match to the input and/or output definitions implemented by the one or more already stored task routines that also perform the same task. Such a rule that imposes such a condition on the storage of a new task routine may be deemed desirable to prevent incompatibilities between versions of task routines that perform the same task.

By way of still another example, whether a data object (e.g., flow input data set, a mid-flow data set, or result report) or a task routine is permitted to be deleted from a federated area may be made contingent on whether its removal would prevent a job flow that is defined in a job flow definition from being performed and/or whether its removal would prevent a past performance of a job flow that is documented by a instance log from being repeated. Such a rule that imposes such a condition may be deemed desirable to prevent a situation in which there is a job flow definition stored in a federated area that defines a job flow that cannot be performed due to the lack of storage in a federated area of any task routine that can be executed to perform one of the tasks specified in the job flow definition. Also, such a rule that imposes such a condition may be deemed desirable to prevent a situation in which there is an instance log stored in a federated area that documents a past performance of a job flow that cannot be repeated due to the lack of storage in a federated area of a data object or task routine specified in the instance log as being associated with that past performance. Similarly, and by way of yet another example, whether a job flow definition is permitted to be deleted from a federated area may be made contingent on whether its removal would prevent a past performance of the corresponding job flow that is documented by a instance log from being repeated. Such a rule that imposes such a condition may be deemed desirable to prevent a situation in which there is an instance log stored in a federated area that documents a past performance of a job flow that cannot be repeated due to the lack of storage in a federated area of the job flow definition for that job flow.

With such restrictions against the removal of objects from a federated area, an alternative that may be allowed by the set of rules may be the storing of newer versions of objects. By way of example, where an earlier version of a task routine or a job flow definition is determined to have flaws and/or to be in need of replacement for some other reason, the set of rules may allow a newer (and presumably improved) version of such a task routine or job flow definition to be stored so that it can be used instead of the earlier version. As previously discussed, while each version of each task routine may be assigned a unique identifier generated from the taking of a hash of thereof such that each version of each task routine is individually identifiable and selectable, each task routine is also assigned a flow task identifier that specifies the task that it performs when executed. As previously discussed, task routines may subsequently be searched for and selected based on their flow task identifiers, and use of the most current version of task routine to perform each task specified in a job flow by a flow task identifier may be the default rule. As a result, the storage of a new version of a task routine that performs a task identified by a particular flow task identifier may be relied upon to cause the use of any earlier versions of task routine that also perform that same task identified by that same flow task identifier to cease, except in situations where the use of a particular earlier version of task routine to perform a particular task is actually specified.

Through such pooling of older and newer versions of objects, through the provision of unique identifiers for each object, and through the enforcement of such a regime of rules restricting accesses that may be made to one or more federated areas, objects such as data sets, task routines and job flow definitions are made readily available for reuse under conditions in which their ongoing integrity against inadvertent and/or deliberate alteration is assured. The provision of a flow task identifier for each task may enable updated versions of task routines to be independently created and stored within one or more federated areas in a manner that associates those updated versions with earlier versions without concern of accidental overwriting of earlier versions.

As a result of such pooling of data sets and task routines, new analyses may be more speedily created through reuse thereof by generating new job flows that identify already stored data sets and/or task routines. Additionally, where a task routine is subsequently updated, advantage may be automatically taken of that updated version in subsequent performances of each job flow that previously used the earlier version of that task routine. And yet, the earlier version of that task routine remains available to enable a comparative analysis of the results generated by the different versions if discrepancies therebetween are subsequently discovered. Also, as a result of such pooling of data sets, task routines and job flows, along with instance logs and result reports, repeated performances of a particular job flow with a particular data set can be avoided. Through use of identifiers uniquely associated with each object and recorded within each instance log, situations in which a requested performance of a particular job flow with a particular data set that has been previously performed can be more efficiently identified, and the result report generated by that previous performance can be more efficiently retrieved and made available in lieu of consuming time and processing resources to repeat that previous performance And yet, if a question should arise as to the validity of the results of that previous performance, the data set(s), task routines and job flow definition on which that previous performance was based remain readily accessible for additional analysis to resolve that question.

Also, where there is no previous performance of a particular job flow with a particular data set such that there is no previously generated result report and/or instance log therefor, the processing resources of the grid of federated devices may be utilized to perform the particular job flow with the particular data set. The ready availability of the particular data set to the grid of federated devices enables such a performance without the consumption of time and network bandwidth resources that would be required to transmit the particular data set and other objects to the requesting device to enable a performance by the requesting device. Instead, the transmissions to the requesting device may be limited to the result report generated by the performance. Also, advantage may be taken of the grid of federated devices to cause the performance of one or more of the tasks of the job flow as multiple instances thereof in a distributed manner (e.g., at least partially in parallel) among multiple federated devices and/or among multiple threads of execution support by processor(s) within each such federated device.

As a result of the requirement that the data set(s), task routines and the job flow associated with each instance log be preserved, accountability for the validity of results of past performances of job flows with particular data sets is maintained. The sources of incorrect results, whether from invalid data, or from errors made in the creation of a task routine or a job flow, may be traced and identified. By way of example, an earlier performance of a particular job flow with a particular data set using earlier versions of task routines can be compared to a later performance of the same job flow with the same data set, but using newer versions of the same task routines, as part of an analysis to identify a possible error in a task routine. As a result, mistakes can be corrected and/or instances of malfeasance can be identified and addressed.

The one or more federated devices may maintain one or more sets of federated areas that may be related to each other through a set of relationships that serve to define a hierarchy of federated areas in which the different federated areas may be differentiated by the degree of restriction of access thereto that may be enforced by the one or more federated devices. In some embodiments, a linear hierarchy may be defined in which there is a base federated area with the least restricted degree of access, a private federated area with the most restricted degree of access, and/or one or more intervening federated areas with intermediate degrees of access restriction interposed between the base and private federated areas. Such a hierarchy of federated areas may be created to address any of a variety of situations in support of any of a variety of activities, including those in which different objects stored thereamong require different degrees of access restriction. By way of example, while a new data set or a new task routine is being developed, it may be deemed desirable to maintain it within the private federated area or intervening federated area to which access is granted to a relatively small number of users (e.g., persons and/or other entities that may each be associated with one or more source devices and/or reviewing devices) that are directly involved in the development effort. It may be deemed undesirable to have such a new data set or task routine made accessible to others beyond the users involved in such development before such development is completed, such that various forms of testing and/or quality assurance have been performed. Upon completion of such a new data set or task routine, it may then be deemed desirable to transfer it, or a copy thereof, to the base federated area or other intervening federated area to which access is granted to a larger number of users. Such a larger number of users may be the intended users of such a new data set or task routine.

It may be that multiple ones of such linear hierarchical sets of federated areas may be combined to form a tree of federated areas with a single base federated area with the least restricted degree of access at the root of the tree, and multiple private federated areas as the leaves of the tree that each have more restricted degrees of access. Such a tree may additionally include one or more intervening federated areas with various intermediate degrees of access restriction to define at least some of the branching of hierarchies of federated areas within the tree. Such a tree of federated areas may be created to address any of a variety of situations in support of any of a variety of larger and/or more complex activities, including those in which different users that each require access to different objects at different times are engaged in some form of collaboration. By way of example, multiple users may be involved in the development of a new task routine, and each such user may have a different role to play in such a development effort. While the new task routine is still being architected and/or generated, it may be deemed desirable to maintain it within a first private federated area or intervening federated area to which access is granted to a relatively small number of users that are directly involved in that effort. Upon completion of such an architecting and/or generation process, the new task routine, or a copy thereof, may be transferred to a second private federated area or intervening federated area to which access is granted to a different relatively small number of users that may be involved in performing tests and/or other quality analysis procedures on the new task routine to evaluate its fitness for release for use. Upon completion of such testing and/or quality analysis, the new task routine, or a copy thereof, may be transferred to a third private federated area or intervening federated area to which access is granted to yet another relatively small number of users that may be involved in pre-release experimental use of the new task routine to further verify its functionality in actual use case scenarios. Upon completion of such experimental use, the new task routine, or a copy thereof, may be transferred to a base federated area or other intervening federated area to which access is granted to a larger number of users that may be the intended users of the new task routine.

In embodiments in which multiple federated areas form a tree of federated areas, each user may be automatically granted their own private federated area as part of being granted access to at least a portion of the tree. Such an automated provision of a private federated area may improve the ease of use, for each such user, of at least the base federated area by providing a private storage area in which a private set of job flow definitions, task routines, data sets and/or other objects may be maintained to assist that user in the development and/or analysis of other objects that may be stored in at least the base federated area. By way of example, a developer of task routines may maintain a private set of job flow definitions, task routines and/or data sets in their private federated area for use as tools in developing, characterizing and/or testing the task routines that they develop. The one or more federated devices may be caused, by such a developer, to use such job flow definitions, task routines and/or data sets to perform compilations, characterizing and/or testing of such new task routines within the private federated area as part of the development process therefor. Some of such private job flow definitions, task routines and/or data sets may include and/or may be important pieces of intellectual property that such a developer desires to keep to themselves for their own exclusive use (e.g., treated as trade secrets and/or other forms of confidential information).

A base federated area within a linear hierarchy or hierarchical tree of federated areas may be the one federated area therein with the least restrictive degree of access such that a grant of access to the base federated area constitutes the lowest available level of access that can be granted to any user. Stated differently, the base federated area may serve as the most "open" or most "public" space within a linear hierarchy or hierarchical tree of federated spaces. Thus, the base federated area may serve as the storage space at which may be stored job flow definitions, versions of task routines, data sets, result reports and/or instance logs that are meant to be available to all users that have been granted any degree of access to the set of federated areas of which the base federated area is a part. The one or more federated devices may be caused, by a user that has been granted access to at least the base federated area, to perform a job flow within the base federated area using a job flow definition, task routines and/or data sets stored within the base federated area.

In a linear hierarchical set of federated areas that includes a base federated area and just a single private federated area, one or more intervening federated areas may be interposed therebetween to support the provision of different levels of access to other users that don't have access to the private federated area, but are meant to be given access to more than what is stored in the base federated area. Such a provision of differing levels of access would entail providing different users with access to either just the base federated area, or to one or more intervening federated areas. Of course, this presumes that each user having any degree of access to the set of federated areas is not automatically provided with their own private federated area, as the resulting set of federated areas would then define a tree that includes multiple private federated areas, and not a linear hierarchy that includes just a single private federated area.

In a hierarchical tree of federated areas that includes a base federated area at the root and multiple private federated areas at the leaves of the tree, one or more intervening federated areas may be interposed between one or more of the private federated areas and the base federated areas in a manner that defines at least part of one or more branches of the tree. Through such branching, different private federated areas and/or different sets of private federated areas may be linked to the base federated area through different intervening federated areas and/or different sets of intervening federated areas. In this way, users associated with some private federated areas within one branch may be provided with access to one or more intervening federated areas within that branch that allow sharing of objects thereamong, while also excluding other users associated with other private federated areas that may be within one or more other branches. Stated differently, branching may be used to create separate sets of private federated areas where each such set of private federated areas is associated with a group of users that have agreed to more closely share objects thereamong, while all users within all of such groups are able to share objects through the base federated area, if they so choose.

In embodiments in which there are multiple federated areas that form either a single linear hierarchy or a hierarchical tree, each of the federated areas may be assigned one or more identifiers. It may be that each federated area is assigned a human-readable identifier, such as names that are descriptive of ownership (e.g., "Frank's"), names that are descriptive of degree of access (e.g., "public" vs. "private"), names of file system directories and/or sub-directories at which each of the federated areas may be located, and/or names of network identifiers by which each federated area may be accessible on a network. However, it may be that each federated area is also assigned a randomly generated identifier with a large enough bit width that it is highly likely that each such identifier is unique across all federated areas anywhere in the world (e.g., a "global" identifier or "GUID"). Such a unique identifier for each federated area may provide a mechanism to resolve identification conflicts where perhaps two or more federated areas may have been given identical human-readable identifiers.

In one example of assignment and use of identifiers, a set of federated areas that form either a single linear hierarchy or hierarchical tree may be assigned identifiers that make the linear hierarchy or hierarchical tree navigable through the use of typical web browsing software. More specifically, one or more federated devices may generate the portal to enable access, by a remote device, to the set of federated areas from across a network using web access protocols, file transfer protocols and/or other protocols in which each of multiple federated areas is provided with a human-readable identifier in the form of a uniform resource locator (URL). In so doing, the URLs assigned thereto may be structured to reflect the hierarchy that has been defined among the federated areas therein. Thus, for a tree of federated areas, the base federated area at the root of the tree may be assigned the shortest and simplest URL, and such a URL given to the base federated area may be indicative of a name given to that entire tree of federated areas. In contrast, the URL of each federated area at a leaf of the tree may include a combination (e.g., a concatenation) of at least a portion of the URL given to the base federated area, and at least a portion of the URL given to any intervening federated area in the path between the federated area at the leaf and the base federated area.

In embodiments of either a linear hierarchy of federated areas or a hierarchical tree of federated areas, one or more relationships that affect the manner in which objects may be accessed and/or used may be put in place between each private federated area and the base federated area, as well as through any intervening federated areas therebetween. Among such relationships may be an inheritance relationship in which, from the perspective of a private federate area, objects stored within the base federated area, or within any intervening federated area therebetween, may be treated as if they are also stored directly within the private federated area for purposes of being available for use in performing a job flow within the private federated area. As will be explained in greater detail, the provision of such an inheritance relationship may aid in enabling and/or encouraging the reuse of objects by multiple users by eliminating the need to distribute multiple copies of an object among multiple private federated areas in which that object may be needed for performances of job flows within each of those private federated areas. Instead, a single copy of such an object may be stored within the base federated area and will be treated as being just as readily available for use in performances of job flows within each of such private federated areas.

Also among such relationships may be a priority relationship in which, from the perspective of a private federated area, the use of a version of an object stored within the private federated area may be given priority over the use of another version of the same object stored within the base federated area, or within any intervening federated area therebetween. More specifically, where a job flow is to be performed within a private federated area, and there is one version of a task routine to perform a task of the job flow stored within the private federated area and another version of the task routine to perform the same task stored within the base federated area, use of the version of the task routine stored within the private federated area may be given priority over use of the other version stored within the base federated area. Further, such priority may be given to using the version stored within the private federated area regardless of whether the other version stored in the base federated area is a newer version. Stated differently, as part of performing the job flow within the private federated area, the one or more federated devices may first search within the private federated area for any needed task routines to perform each of the tasks specified in the job flow, and upon finding a task routine to perform a task within the private federated area, no search may be performed of any other federated area to find a task routine to perform that same task. It may be deemed desirable to implement such a priority relationship as a mechanism to allow a user associated with the private federated area to choose to override the automatic use of a version of a task routine within the base federated area (or an intervening federated area therebetween) due to an inheritance relationship by storing the version of the task routine that they prefer to use within the private federated area.

Also among such relationships may be a dependency relationship in which, from the perspective of a private federated area, some objects stored within the private federated area may have dependencies on objects stored within the base federated area, or within an intervening federated area therebetween. More specifically, as earlier discussed, the one or more federated devices may impose a rule that the task routines upon which a job flow depends may not be deleted such that the one or more federated devices may deny a request received from a remote device to delete a task routine that performs a task identified by a flow task identifier that is referred to by at least one job flow definition stored. Thus, where the private federated area stores a job flow definition that includes a flow task identifier specifying a particular task to be done, and the base federated area stores a task routine that performs that particular task, the job flow of the job flow definition may have a dependency on that task routine continuing to be available for use in performing the task through an inheritance relationship between the private federated area and the base federated area. In such a situation, the one or more federated devices may deny a request that may be received from a remote device to delete that task routine from the base federated area, at least as long as the job flow definition continues to be stored within the private federated area. However, if that job flow definition is deleted from the private federated area, and if there is no other job flow definition that refers to the same task flow identifier, then the one or more federated devices may permit the deletion of that task routine from the base federated area.

In embodiments in which there is a hierarchical tree of federated areas that includes at least two branches, a relationship may be put in place between two private and/or intervening federated areas that are each within a different one of two branches by which one or more objects may be automatically transferred therebetween by the one or more federated devices in response to one or more conditions being met. As previously discussed, the formation of branches within a tree may be indicative of the separation of groups of users where there may be sharing of objects among users within each such group, such as through the use of one or more intervening federated areas within a branch of the tree, but not sharing of objects between such groups. However, there may be occasions in which there is a need to enable a relatively limited degree of sharing of objects between federated areas within different branches. Such an occasion may be an instance of multiple groups of users choosing to collaborate on the development of one or more particular objects such that those particular one or more objects are to be shared among the multiple groups where, otherwise, objects would not normally be shared therebetween. On such an occasion, the one or more federated devices may be requested to instantiate a transfer area through which those particular one or more objects may be automatically transferred therebetween upon one or more specified conditions being met. In some embodiments, the transfer area may be formed as an overlap between two federated areas of two different branches of a hierarchical tree. In other embodiments, the transfer area may be formed within the base federated area to which users associated with federated areas within different branches may all have access.

In some embodiments, the determination of whether the condition(s) for a transfer have been met and/or the performance of the transfer of one or more particular objects may be performed using one or more transfer routines to perform transfer-related tasks called for within a transfer flow definition. In such embodiments, a transfer routine may be stored within each of the two federated areas between which the transfer is to occur. Within the federated area that the particular one or more objects are to be transferred from, the one or more federated devices may be caused by the transfer routine stored therein to repeatedly check whether the specified condition(s) have been met, and if so, to then transfer copies of the particular one or more objects into the transfer area. Within the federated area that the particular one or more objects are to be transferred to, the one or more federated devices may be caused by the transfer routine stored therein to repeatedly check whether copies of the particular one or more objects have been transferred into the transfer area, and if so, to then retrieve the copies of the particular one or more objects from the transfer area.

A condition that triggers such automated transfers may be any of a variety of conditions that may eventually be met through one or more performances of a job flow within the federated area from which one or more objects are to be so transferred. More specifically, the condition may be the successful generation of particular results data that may include a data set that meets one or more requirements that are specified as the condition. Alternatively, the condition may be the successful generation and/or testing of a new task routine such that there is confirmation in a result report or in the generation of one or more particular data sets that the new task routine has been successfully verified as meeting one or more requirements that are specified as the condition. As will be explained in greater detail, the one or more performances of a job flow that may produce an output that causes the condition to be met may occur within one or more processes that may be separate from the process in which a transfer routine is executed to repeatedly check whether the condition has been met. Also, each of such processes may be performed on a different thread of execution of a processor of a federated device, or each of such processes may be performed on a different thread of execution of a different processor from among multiple processors of either a single federated device or multiple federated devices.

By way of example, multiple users may be involved in the development of a new neural network or a new ensemble of neural networks (e.g., a chain of neural networks), and each such user may have a different role to play in such a development effort. While the new neural network or neural network ensemble is being developed through a training process, it may be deemed desirable to maintain the data set(s) of weights and biases that is being generated through numerous iterations of training within a first intervening federated area to which access is granted to a relatively small number of users that are directly involved in that training effort. Upon completion of such training, a copy of the resulting one or more data sets of weights and biases may be transferred to a second intervening federated area to which access is granted to a different relatively small number of users that may be involved in testing the neural network or neural network ensemble defined by the data set(s) to evaluate fitness for release for at least experimental use. The transfer of the copy of one or more data set(s) from the first intervening federated area to the second intervening federated area may be triggered by the training having reached a stage at which a predetermined condition is met that defines the completion of training, such as a quantity of iterations of training having been performed. Upon completion of such testing of the neural network or neural network ensemble, a copy of the one or more data sets of weights and biases may be transferred from the second intervening federated area to a third intervening federated area to which access is granted to yet another relatively small number of users that may be involved in pre-release experimental use of the neural network or neural network ensemble to further verify functionality in actual use case scenarios. Like the transfer to the second intervening federated area, the transfer of a copy of the one or more data sets from the second intervening federated area to the third intervening federated area may be triggered by the testing having reached a stage at which a predetermined condition was met that defines the completion of testing, such as a threshold of a characteristic of performance of the neural network or neural network ensemble having been determined to have been met during testing. Upon completion of such experimental use, a copy of the one or more data sets of weights and biases may be transferred from the third federated area to a base federated area to which access is granted to a larger number of users that may be the intended users of the new neural network.

Such a neural network or neural network ensemble may be generated as part of an effort to transition from performing a particular analytical function using non-neuromorphic processing (i.e., processing in which no neural network is used) to performing the same analytical function using neuromorphic processing (i.e., processing in which one or more neural networks are used). Such a transition may represent a tradeoff in accuracy for speed, as the performance of the analytical function using neuromorphic processing may not achieve the perfect accuracy (or at least the degree of accuracy) that is possible via the performance of the analytical function using non-neuromorphic processing, but the performance of the analytical function using neuromorphic processing may be faster by one or more orders of magnitude, depending on whether the neural network or neural network ensemble is implemented with software-based simulations of artificial neurons executed by one or more CPUs or GPUs, or hardware-based implementations of artificial neurons provided by one or more neuromorphic devices.

Where the testing of such a neural network or neural network ensemble progresses successfully such that it begins to be put to actual use, there may be a gradual transition from the testing to the usage that may be automatically implemented in a staged manner Initially, non-neuromorphic and neuromorphic implementations of the analytical function may be performed at least partially in parallel with the same input data values being provided to both, and with the corresponding output data values of each being compared to test the degree of accuracy of the neural network or neural network ensemble in performing the analytical function. In such initial, at least partially parallel, performances, priority may be given to providing processing resources to the non-neuromorphic implementation, since the non-neuromorphic implementation is still the one that is in use. As the neural network or neural network ensemble demonstrates a degree of accuracy that at least meets a predetermined threshold, the testing may change such that the neuromorphic implementation is used, and priority is given to providing processing resources to it, while the non-neuromorphic implementation is used at least partially in parallel solely to provide output data values for further comparisons to corresponding ones provided by the neuromorphic implementation. Presuming that the neural network or neural network ensemble continues to demonstrate a degree of accuracy that meets or exceeds the predetermined threshold, further use of the non-neuromorphic implementation of the analytical function may cease, entirely.

In various embodiments, a somewhat similar temporary relationship may be instantiated between one or more selected federated areas and a storage space that is entirely external to the one or more federated devices and/or to the one or more federated areas, such as an external storage space maintained by a source device or a reviewing device. The federated area(s) selected for such a relationship may, again, include private federated area(s) and/or other federated area(s) used to store one or more objects that may be under development and/or associated with an analysis routine that may be under development. The purpose of such a relationship may be to cause the automatic synchronization of changes made to objects stored within each of the selected federated area(s) and the external storage space, as previously discussed. In some of such embodiments, automatic synchronization may be effected simply by transferring a copy of an object modified within a transfer area within a federated to a corresponding transfer area within the external storage space and vice versa such that both transfer areas are caused to have identical objects.

As with the aforedescribed automatic transfers between transfer areas defined within federated areas, any of a variety of conditions may be specified as the trigger for causing such automated transfers, such as the aforementioned examples of the successful completion of testing of an object (e.g., a task routine) and/or of a neural network (or an ensemble of neural networks) as a trigger. As an alternate example, the trigger may be an instance in which an object is in someway marked or otherwise indicated as having been completed to a degree that a developer working in one of these development environments desires to make it available to the other developers working in the other of these development environments. Such marking may be associated with a process in which an object and/or changes thereto are "committed" to a pool of other objects stored within a transfer area that have also been deemed and marked as similarly complete. Thus, upon an object having been so marked in one transfer area, the one or more federated devices may cause a copy thereof to be transferred to other transfer area with which the one transfer area is synchronized and to be similarly marked such that the fact of that object (or changes made thereto) having been "committed" is made evident at both transfer areas.

It should be noted that, unlike the one or more federated areas maintained by the one or more federated devices with the aforementioned set of rules that enforce conditions on when objects may be stored within federated area(s) and/or removed therefrom, there may be no such set of rules that are employed to provide similar restrictions for such an external storage space. Thus, synchronization between one or more selected federated areas and such an external storage space may necessitate providing the ability to at least temporarily suspend the enforcement of such rules for the one or more selected federated areas, at least where new objects and/or changes to objects are effected by the occurrence of transfers from the external storage space and to one of the one or more selected federated areas. It may be that the formation of such a relationship between each of the one or more selected federated areas and an external storage space is limited to private federated area(s) so as to avoid having a federated area in which there is such a suspension of rules that also becomes a federated area from which other federated areas may inherit objects. Alternatively or additionally, it may be that a portion of each of the one or more selected federated areas is designated as a transfer area that becomes the portion thereof in which the contents therein are kept synchronized with a corresponding transfer area within the external storage space.

In such example embodiments as are described above in which a selected federated area and the external storage space are both employed as shared storage spaces to enable the collaborative development of objects among multiple developers, such transfers to synchronize the conditions of objects therebetween may be performed bi-directionally such that changes to objects made within either location are reflected in the corresponding objects within the other location. As will be explained in greater detail, in embodiments in which such a collaboration is intended to result in the generation of a full set of objects needed to perform a job flow within the one or more federated areas, it may be that there are limits imposed on the bi-directionality of the exchanges such that, for example, job flow definitions may be exchanged bi-directionally, but not task routines. This may be the case where the developers who access the external storage space, but not the one or more federated areas, may be generating task routines and/or job flow definitions in a different programming language from the developers who access the one or more federated areas. Thus, in such a collaboration, task routines that may be accepted from the external storage space through such a synchronization relationship, but no task routines developed within the one or more federated areas may be transmitted back to the external storage space. In contrast, the job flow definition that defines the job flow under development may be transferred in either direction between to enable both groups of developers to be guided by the definition of the job flow therein and/or to enable either of these two groups of developers to modify it as the job flow evolves throughout its development.

There may be other embodiments in which an external storage space is used to disseminate new objects among multiple persons and/or entities that do not have access to the selected one or more federated areas, and the transfers to synchronize the conditions of objects therebetween may be entirely unidirectional from the designated federated area and to the external storage space. More specifically, it may be that fully developed and tested objects deemed ready for widespread dissemination for use by others are caused to be stored within the designated federated area (or within a portion thereof that is designated as a transfer area), and the fact that such an object has been stored therein may be used as the trigger to cause the automatic transfer of a copy of that object to the external storage space, while in contrast, there may be no automated transfers of objects back to the federated area from the external storage space.

Regardless of the exact manner in which objects are received by the one or more federated devices for storage in a federated area, it may be that at least some of those received objects may be written in a variety of different programming languages. More specifically, while some objects may be received that are written in a primary programming language that is normally expected to be interpreted by the one or more federated devices during a performance of a job flow (e.g., the SAS programming language), other objects may be received that may be written in one of a pre-selected set of secondary programming languages the one or more federated devices may also be capable of interpreting during a performance of a job flow (e.g., C, R, Python™).

As will be explained in greater detail, it may be deemed desirable to provide support for objects written in such secondary language(s) to enable programmers who are unfamiliar with the primary language to nonetheless avail themselves of the various benefits of federated areas. Additionally, supporting such secondary languages may enable programmers who are unfamiliar with the primary language and/or the features of federated areas, the highly structured nature of federated areas and/or the writing of programs for a many-task computing environment to still be able to collaborate with other programmers who are familiar therewith.

As part of supporting the use of one or more secondary programming languages, some limited degree of translation of programming languages may be performed on portions of objects received by the one or more federated devices. More specifically, the one or more federated devices may automatically translate portion(s) of a job flow definition that defines input and/or output interfaces for each task specified as part of its job flow, and/or may translate portion(s) of a task routine that implement input and/or output interfaces. Such translations may be from both the primary programming language and any of the pre-selected secondary programming languages, and into a single type of intermediate representation, such as an intermediate data structure or an intermediate programming language (e.g., JSON). This may enable comparisons to be made among specifications and/or implementations of input and/or output interfaces to be performed, regardless of which of the programming languages were used to write the specifications and/or implementations of those input and/or output interfaces. In this way, multiple programming languages are able to be accommodated while still using such comparisons to enforce the earlier described rules that may be used to limit what job flow definitions and/or task routines may be permitted to be stored within the one or more federated areas.

In some embodiments, the performance of translations from the primary programming language and/or secondary programming language(s) may be limited to such translations of specifications and/or implementations of input and/or output interfaces into such an intermediate representation for such comparisons. It may be deemed undesirable and/or unnecessary to translate other portions of task routines and/or job flow definitions to perform such comparisons and/or for any other purpose.

However, in other embodiments, it may deemed desirable to perform translations to the extent needed to derive a task routine written in the primary programming language from a task routine written a secondary programming language. This may be deemed desirable to enable developers who are generating objects required for a job flow in the primary programming language to have access to a version of the job flow definition that is also written in the primary programming to serve as a guide for their work and/or to enable them to make modifications thereto. In embodiments in which it is just the portion(s) of a job flow that define input and/or output interfaces that are written in a particular programming language, the translation thereof into the intermediate representation (e.g., an intermediate programming language) may be used as the basis for translations between primary and secondary programming languages. More specifically, where a job flow definition is received in which portion(s) that define input and/or output interfaces are written in a secondary programming language, the intermediate representation into which those portion(s) are translated to enable the aforedescribed comparisons may also be used as the basis to generate corresponding portion(s) that define the input and/or output interfaces in the primary language as part of a translated form of the job flow definition. In such embodiments, it may be translated form of the job flow definition that is then stored, instead of the originally received job flow definition.

Additionally, in such embodiments in which a translated form of a job flow definition with input and/or output interface definitions in the primary language may be generated from an originally received job flow definition that includes input and/or output interface definitions in a secondary language, it may be that such translations are performed bi-directionally as part of further supporting a collaboration among a combination of developers in which both the primary and secondary languages are used. More specifically, where a job flow definition in which input and/or output interface definitions are written in the primary language, an intermediate representation into which those portion(s) are translated to enable the aforedescribed comparisons may also be used as the basis to generate corresponding input and/or output interface definitions in a secondary programming language. Such a reverse translation may be performed regardless of whether the job flow definition with input and/or output definitions was originally written in the primary programming language, or was translated into the primary programming language from an originally received job flow definition written in a secondary programming language. This may be deemed desirable to enable developers who are generating objects required for a job flow in a secondary programming language to have access to a version of the job flow definition that is also written in the secondary programming to serve as a guide for their work and/or to enable them to make modifications thereto.

By providing such translations of a job flow definition back and forth between the primary programming language and a secondary programming language, either the developers who write in the primary programming language or the developers who write in the secondary programming language are able to read and/or edit the job flow definition in their chosen programming language. In this way, the developers using the secondary programming language are put on a more equal footing as collaborators with the developers using the primary programming language as developers of either group are able to participate in shaping the definition of the job flow to which both groups are contributing objects.

As previously discussed, in some embodiments, a job flow definition may additionally include executable GUI instructions to implement a GUI interface that is to be provided during a performance of the job flow that is defined therein. In such embodiments, it may be deemed desirable to provide more extensive translation capabilities to enable the translation of GUI instructions between programming languages as part of providing a translated form of a job flow definition with input and/or output definitions, and also GUI instructions, written in the primary programming language from a received job flow definition with input and/or output definitions, and also GUI instructions, written in a secondary programming language, and vice versa.

In various embodiments, a set of objects needed to perform an analysis may effectively be provided to the one or more federated devices in the form of a complex data structure such as a spreadsheet data structure. Such a data structure may contain the equivalent of one or more data sets organized as two-dimensional arrays (e.g., tables) therein, may contain one or more calculations of the analysis organized as multiple equations that may each be stored in a separate row, and/or may specify one or more graphs that are to be presented based on a performance of the analysis. The one or more federated devices may interpret such a data structure to derive therefrom the set of objects needed to perform the analysis defined within the data structure as a job flow in which the analysis is divided into tasks that are each performed as a result of executing a corresponding task routine.

More precisely, the multiple equations within the data structure may be analyzed, along with the organization of the data into one or more two-dimensional arrays within the data structure, to derive definitions of input and output interfaces for each of the equations and to identify each distinct data object. The multiple equations may also be analyzed, in view of the derived input and/or output interface definitions, to identify the dependencies thereamong. Various checks may be made for instances of mismatched interfaces, missing data that is required as input and/or unused data to determine whether the contents of the data structure set forth analysis a complete analysis that is able to be performed. Presuming that the analysis is determined to be performable, a job flow definition may be derived based on the input and/or output interfaces and the identified dependencies in which each of the equations may be treated as a task of the job flow that is defined by the job flow definition. Each equation may be parsed to generate a corresponding task routine to perform the task of that equation, as specified in the job flow definition. Each identified data object may be generated from a two-dimensional array or a portion of a two-dimensional array within the data structure. This set of generated data objects may then be stored within the federated area into which it was requested that the data structure be stored. In some embodiments, the data structure, itself, may also be stored within the federated area as a measure to provide accountability for the quality of the conversion of the data structure into the set of objects.

In various embodiments, the one or more federated devices may receive a request to provide one or more related objects together in a packaged form that incorporates one or more features that enable the establishment of one or more new federated areas that contain the related objects within the requesting device or within another device to which the packaged form may be relayed. In some embodiments, the packaged form may be that of a "zip" file in which the one or more related objects are compressed together into a single file that may also include executable code that enables the file to decompress itself, and in so doing, may also instantiate the one or more new federated areas. Such a packaged form may additionally include various executable routines and/or data structures (e.g., indications of hash values, such as checksum values, etc.) that enable the integrity of the one or more related objects to be confirmed, and/or that enable job flows based on the one or more related objects to be performed. In generating the packaged form, the one or more federated devices may employ various criteria specified in the request for which objects are to be provided in the packaged form to confirm that the objects so provided are a complete enough set of objects as to enable any job flow that may be defined by those objects to be properly performed.

In various embodiments, one or more of comments descriptive of input and/or output interfaces within one or more task routines, portions of instructions within one or more task routines that implement input and/or output interfaces, and specifications of input and/or output interfaces provided in one or more job flow definitions may be used to generate a DAG of one or more task routines and/or of a job flow. More precisely, such information may be used to build any of a variety of data structure(s) that correlate inputs and/or outputs to tasks and/or the task routines that are to perform those tasks, and from which a DAG for one or more task routines and/or a job flow may be generated and/or visually presented. In some embodiments, such a data structure may include script generated in a markup language and/or a block of programming code for each task or task routine (e.g., a macro employing syntax from any of a variety of programming languages). Regardless of the form of the data structure(s) that are generated, such a data structure may also specify the task routine identifier assigned to each task routine and/or the flow task identifier identifying the task performed by each task routine.

Which one or more task routines are to be included in such a DAG may be specified in any of a variety of ways. By way of example, a request may be received for a DAG that includes one or more tasks or task routines that are explicitly identified by their respective flow task identifiers and/or task routine identifiers. By way of another example, a request may be received for a DAG that includes all of the task routines currently stored within a federated area that may be specified by a URL. By way of still another example, a request may be received for a DAG that includes task routines for all of the tasks identified within a specified job flow definition. And, by way of yet another example, a request may be received for a DAG that includes all of the task routines specified by their identifiers in an instance log of a previous performance of a job flow. Regardless of the exact manner in which one or more tasks and/or task routines may be specified in a request for inclusion within a DAG, each task routine that is directly identified or that is specified indirectly through the flow task identifier of the task it performs may be searched for within one or more federated areas as earlier described.

In situations in which a DAG is requested that is to include multiple tasks and/or task routines, the DAG may be generated to indicate any dependencies thereamong. In some embodiments, a visualization of the DAG may be generated to provide a visual indication of such a dependency, such as a line, arrow, color coding, graphical symbols and/or other form of visual connector indicative of the dependency may be generated within the visualization to visually link an output of the one task routine to an input of the other. In embodiments in which the parsing of task routines and/or of job flows includes comparisons between pieces of information that may result in the detection of discrepancies in such details as dependencies among tasks and/or among task routines, such discrepancies may be visually indicated in a DAG in any of a variety of ways. By way of example, a DAG may be generated to indicate such discrepancies with color coding, graphical symbols and/or other form of visual indicator positioned at or adjacent to the graphical depiction of the affected input or output in the DAG. Such a visual indicator may thereby serve as a visual prompt to personnel viewing the DAG to access the affected task routine(s) and/or affected job flow definition to examine and/or correct the discrepancy. Alternatively or additionally, at least a pair of alternate DAGs may be generated, and personnel may be provided with a user interface (UI) that enables "toggling" therebetween and/or a side-by-side comparison, where one DAG is based on the details of inputs and/or outputs provided by comments while another DAG is based on the manner in which those details are actually implemented in executable code.

In some embodiments, with a DAG generated and visually presented for viewing by personnel involved in the development of new task routines and/or new job flow definitions, such personnel may be provided with a UI that enables editing of the DAG. More specifically, a UI may be provided that enables depicted dependencies between inputs and outputs of task routines to be removed or otherwise changed, and/or that enables new dependencies to be added. Through the provision of such a UI, personnel involved in the development of new task routines and/or new job flow definitions may be able to define a new job flow by modifying a DAG generated from one or more task routines. Indeed, the one or more task routines may be selected for inclusion in a DAG for the purpose of having them available in the DAG for inclusion in the new job flow. Regardless of whether or not a DAG generated from one or more task routines is edited as has just been described, a UI may be provided to enable personnel to choose to save the DAG as a new job flow definition. Regardless of whether the DAG is saved for use as a job flow definition, or simply to retain the DAG for future reference, the DAG may be stored as a script generated in a process description language such as business process model and notation (BPMN) promulgated by the Object Management Group of Needham, Mass., USA.

As an alternative to receiving a request to generate a DAG based on at least one or more task routines, a request may be received by one or more federated devices from another device to provide the other device with objects needed to enable the other device to so generate a DAG. In some embodiments, such a request may be treated in a manner similar to earlier described requests to retrieve objects needed to enable another device to perform a job flow with most recent versions of task routines or to repeat a past performance of a job flow, as documented by an instance log. However, in some embodiments, the data structure(s) generated from parsing task routines and/or a job flow definition may be transmitted to the other device in lieu of transmitting the task routines, themselves. This may be deemed desirable as a mechanism to reduce the quantity of information transmitted to the other device for its use in generating a DAG.

Regardless of whether a requested DAG is to include a depiction of a single task routine or of multiple task routines, it may be that, prior to the receipt of the request for the DAG, one or more of the task routines to be depicted therein may have been test executed to observe their input/output behavior within a container environment as previously described. As also previously discussed, an indication of the input/output behavior observed under such container environment conditions for each task routine so tested may be stored in any of a variety of ways to enable its subsequent retrieval. It may be that an indication of the input/output behavior that was observed may be positioned next to the depiction of a corresponding task routine within the requested DAG.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
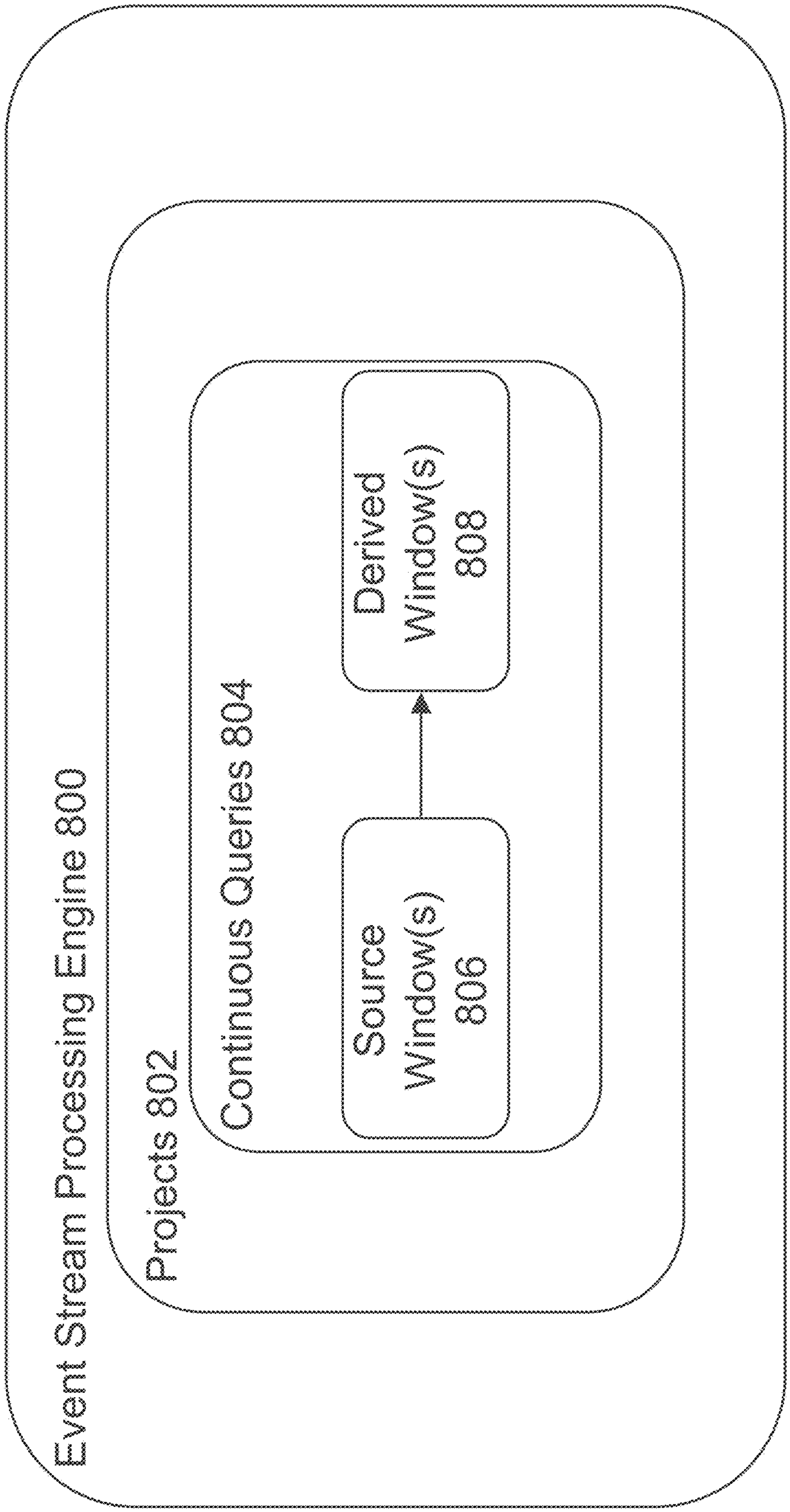
FIG. 8 illustrates a block diagram including components of an Event Stream Processing Engine (ESPE), according to embodiments of the present technology.
Figure 9:
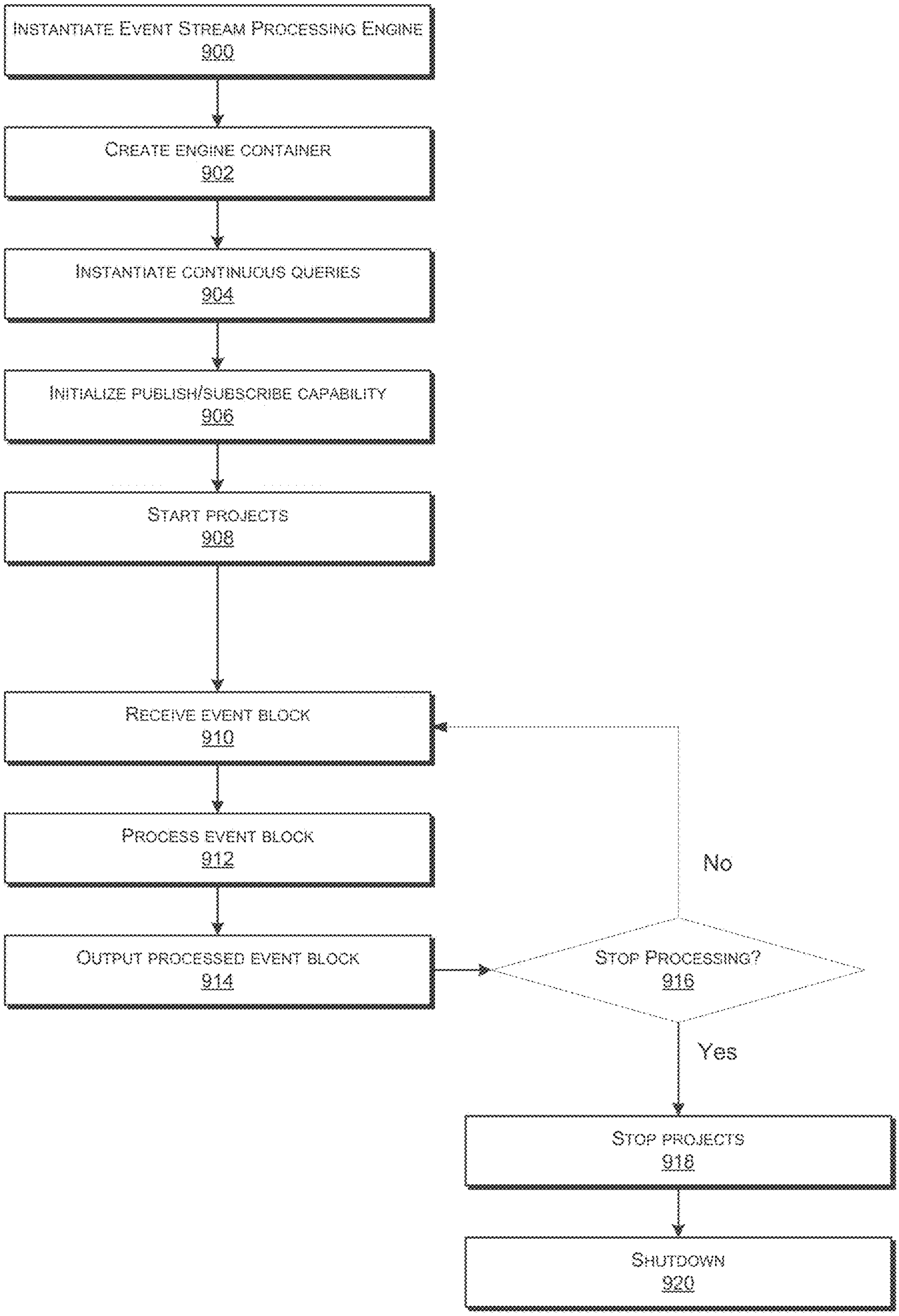
FIG. 9 illustrates a flow chart showing an example process including operations performed by an event stream processing engine, according to some embodiments of the present technology.
Figure 10:
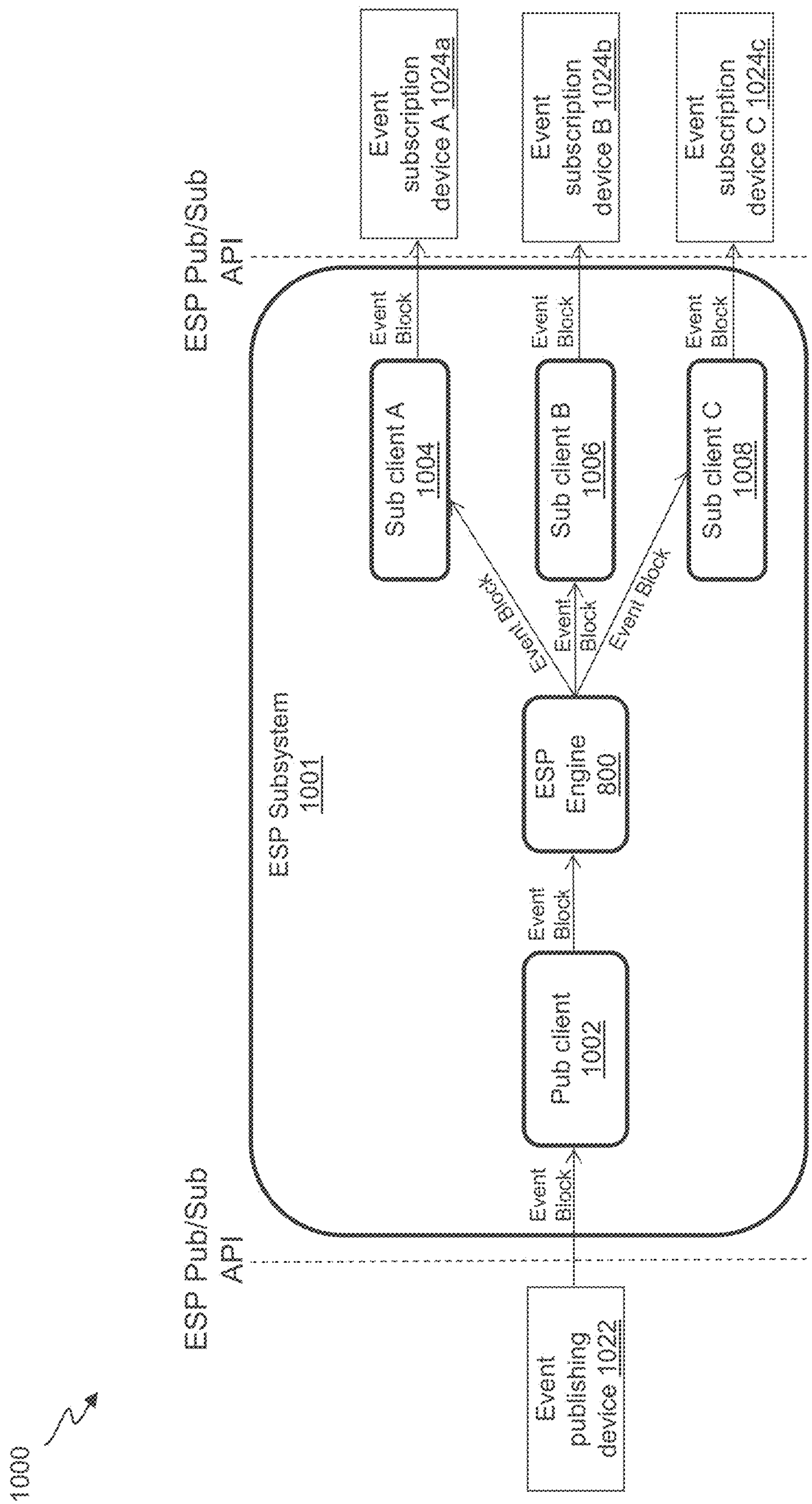
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
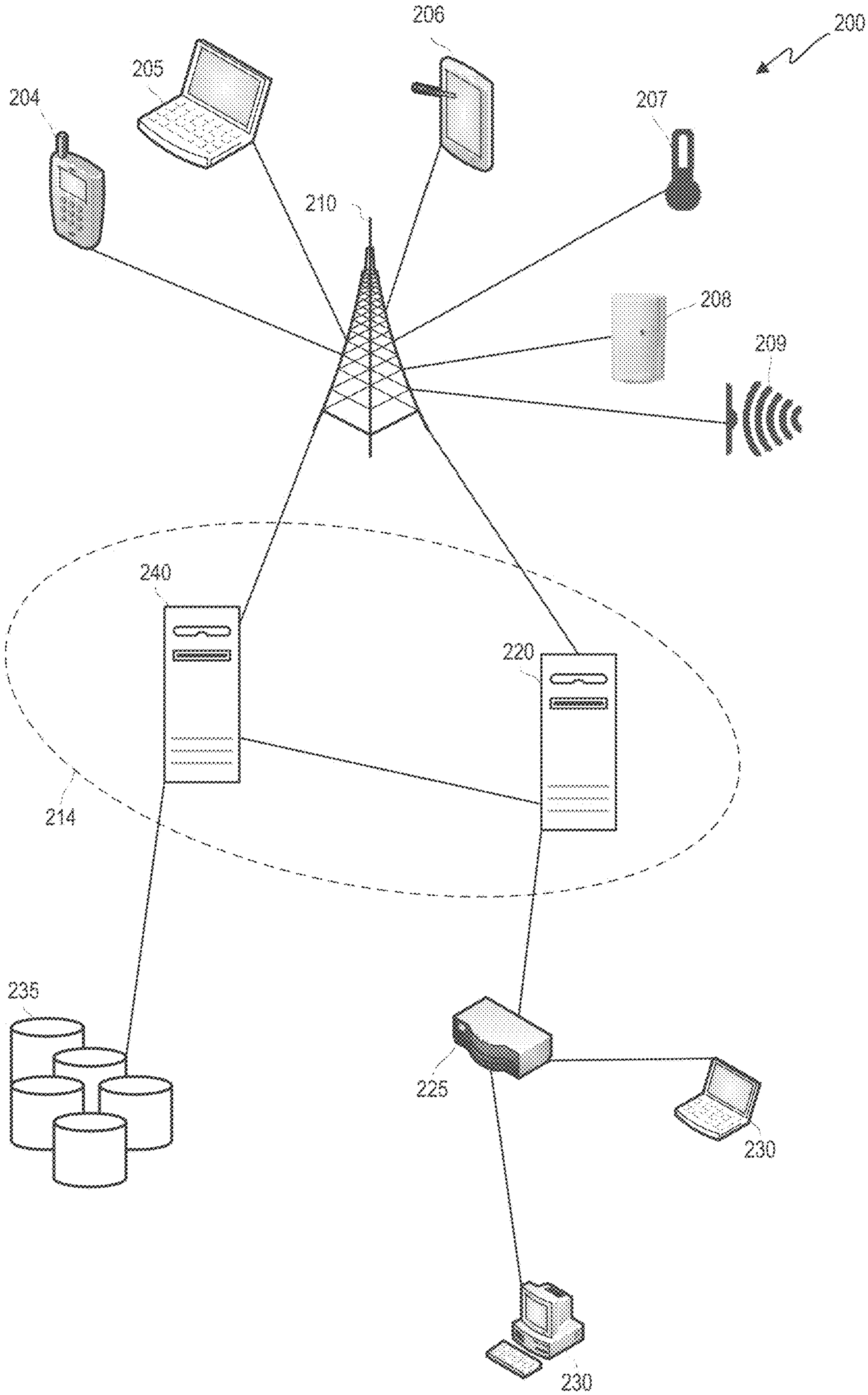
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
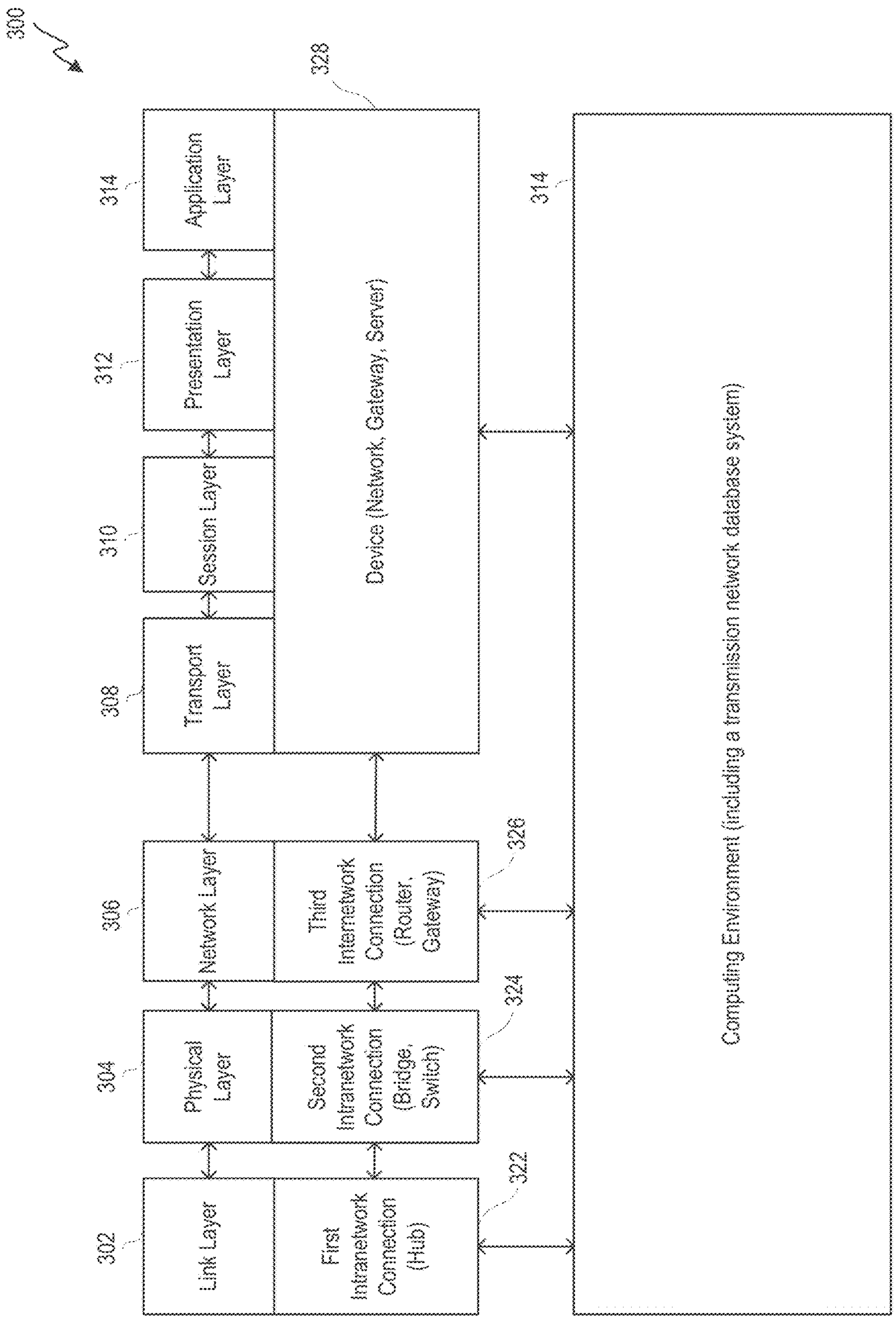
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
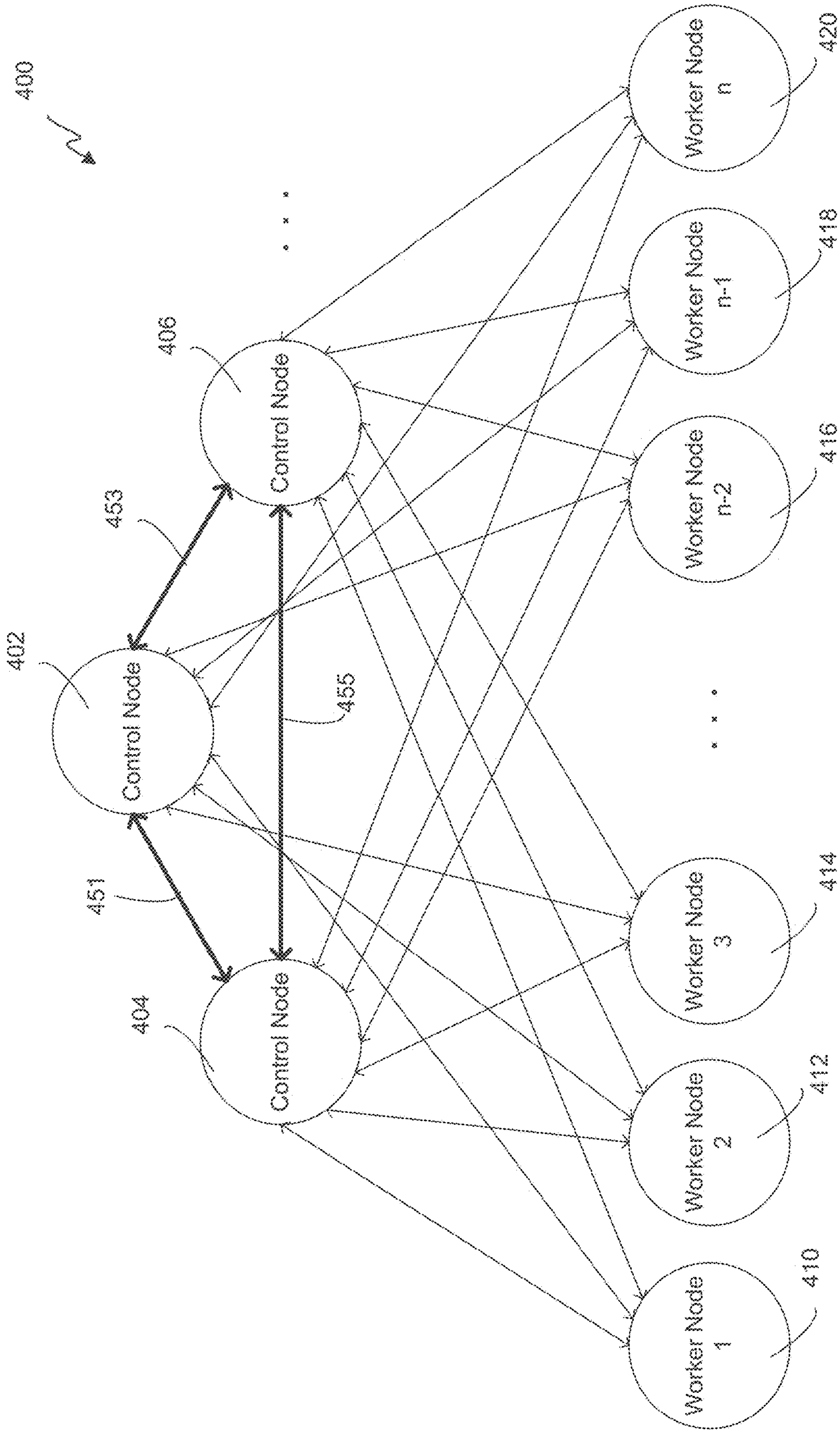
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® distributed file system, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
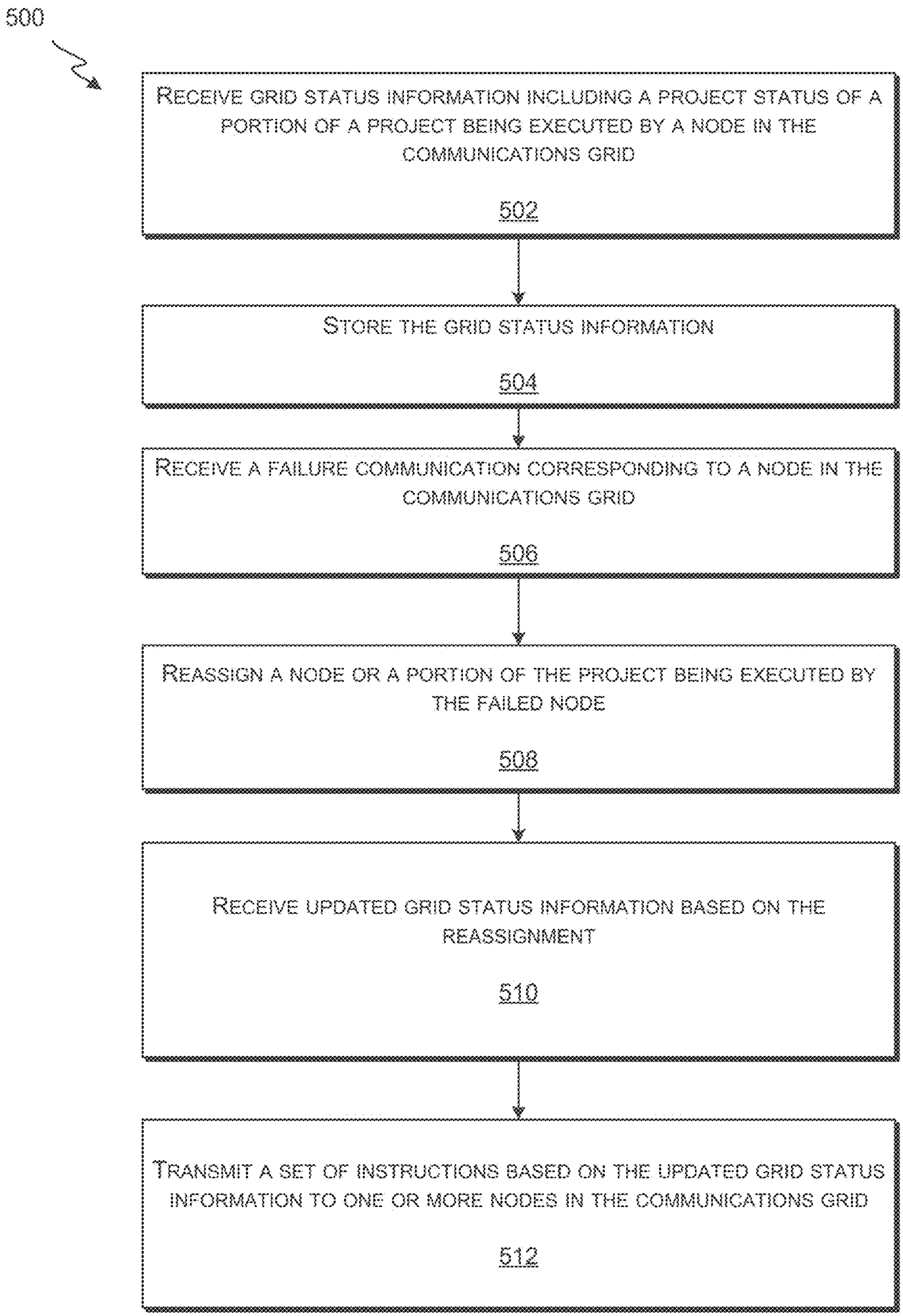
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
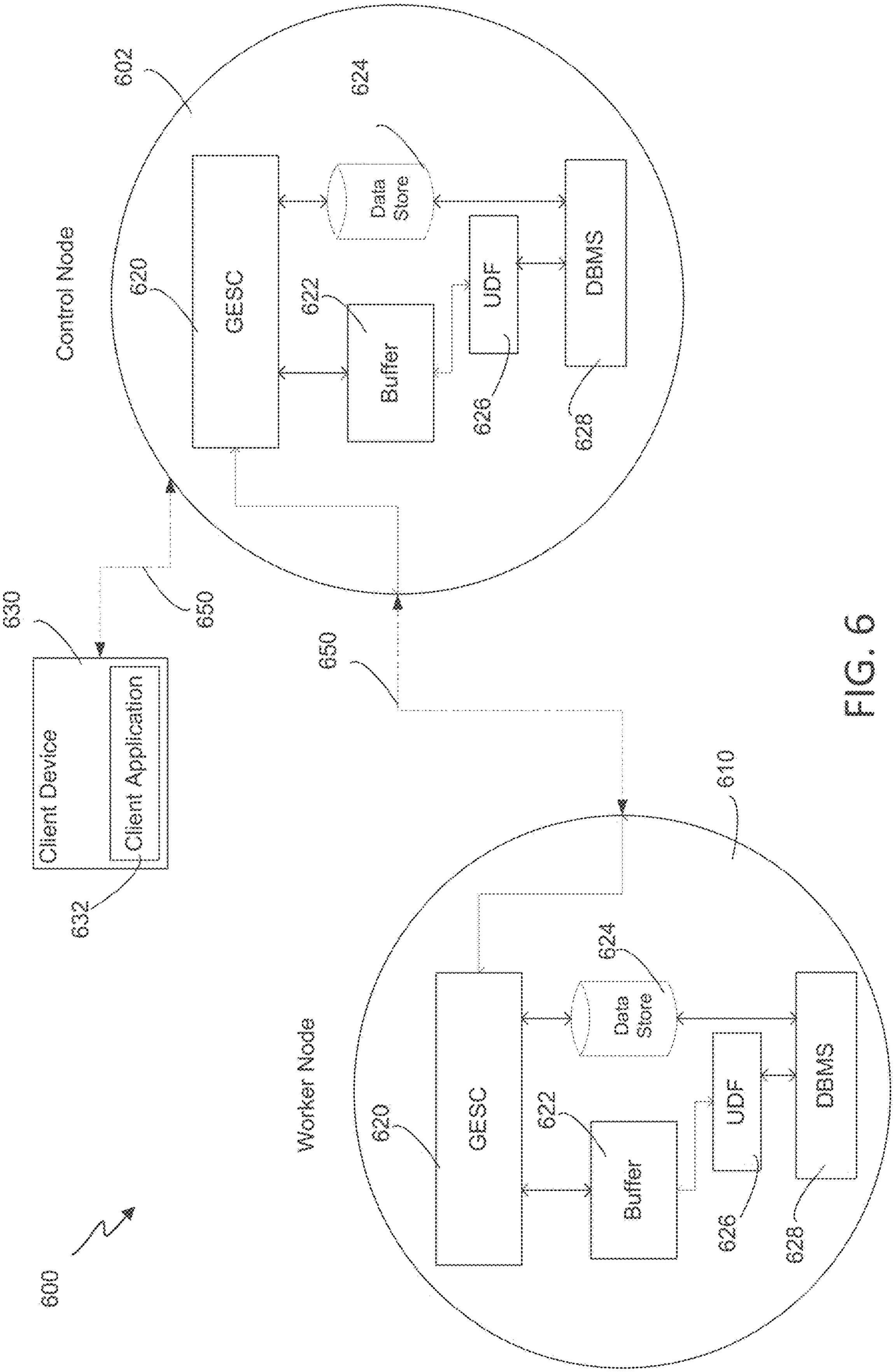
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
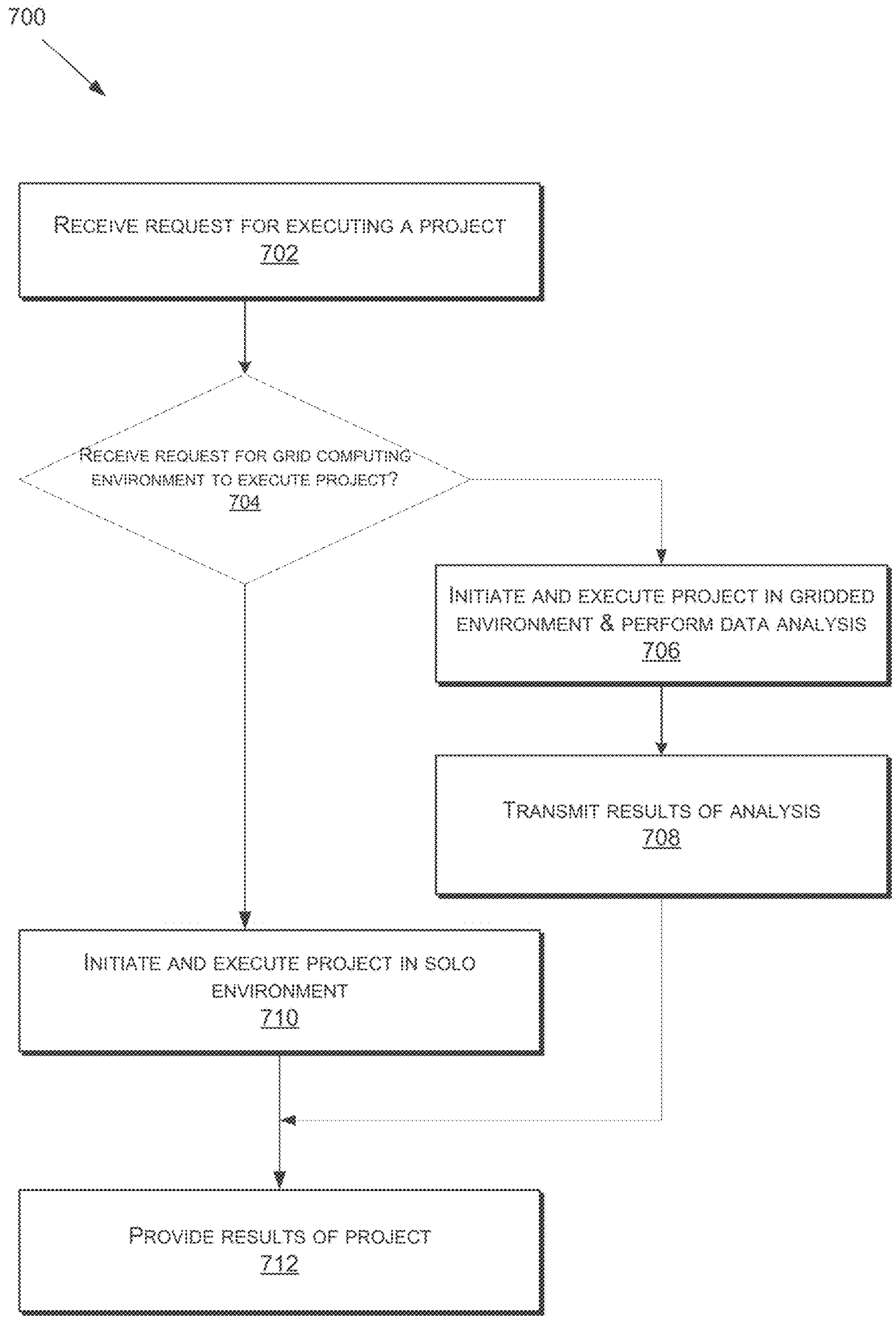
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.). ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
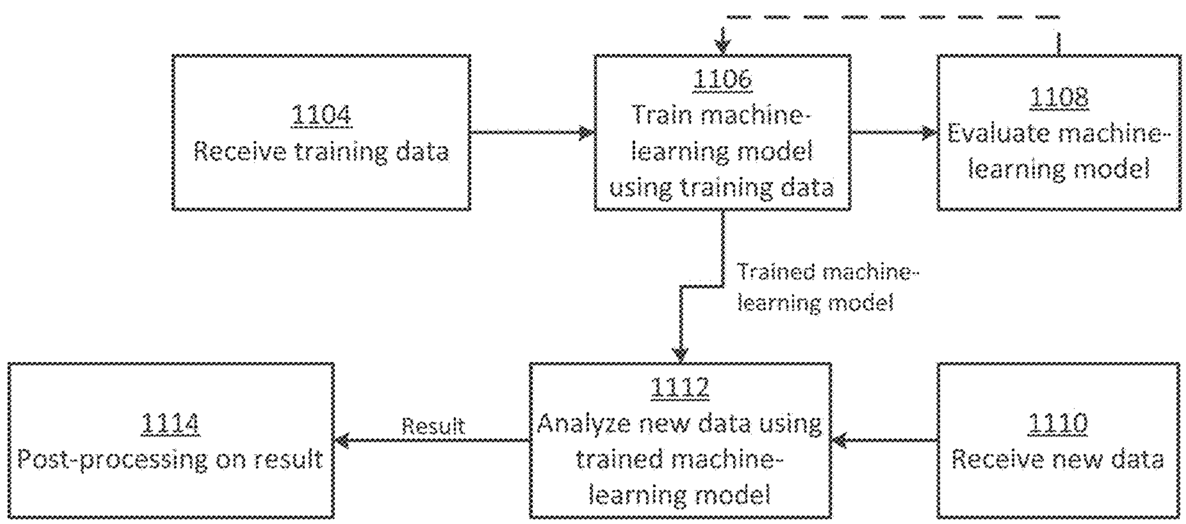
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
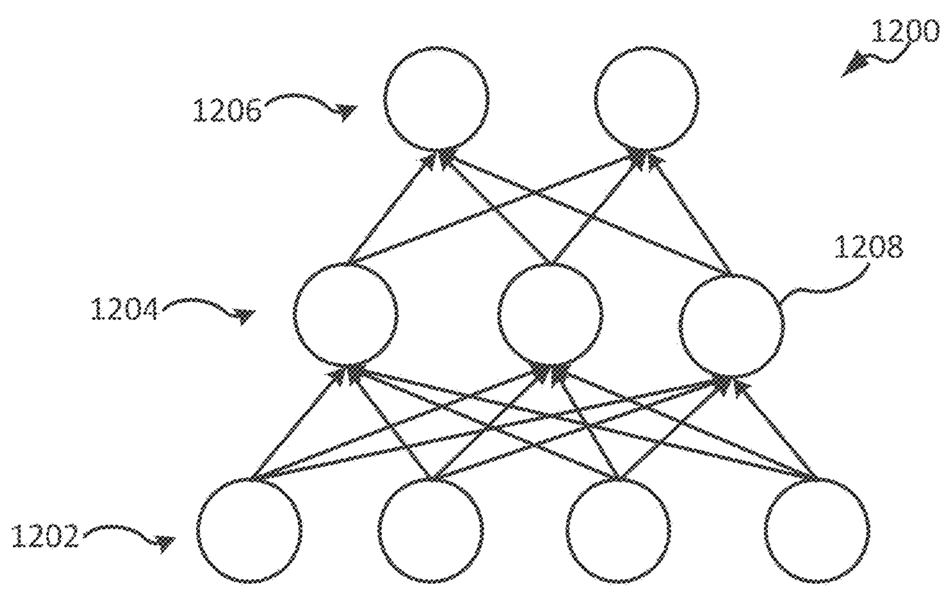
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
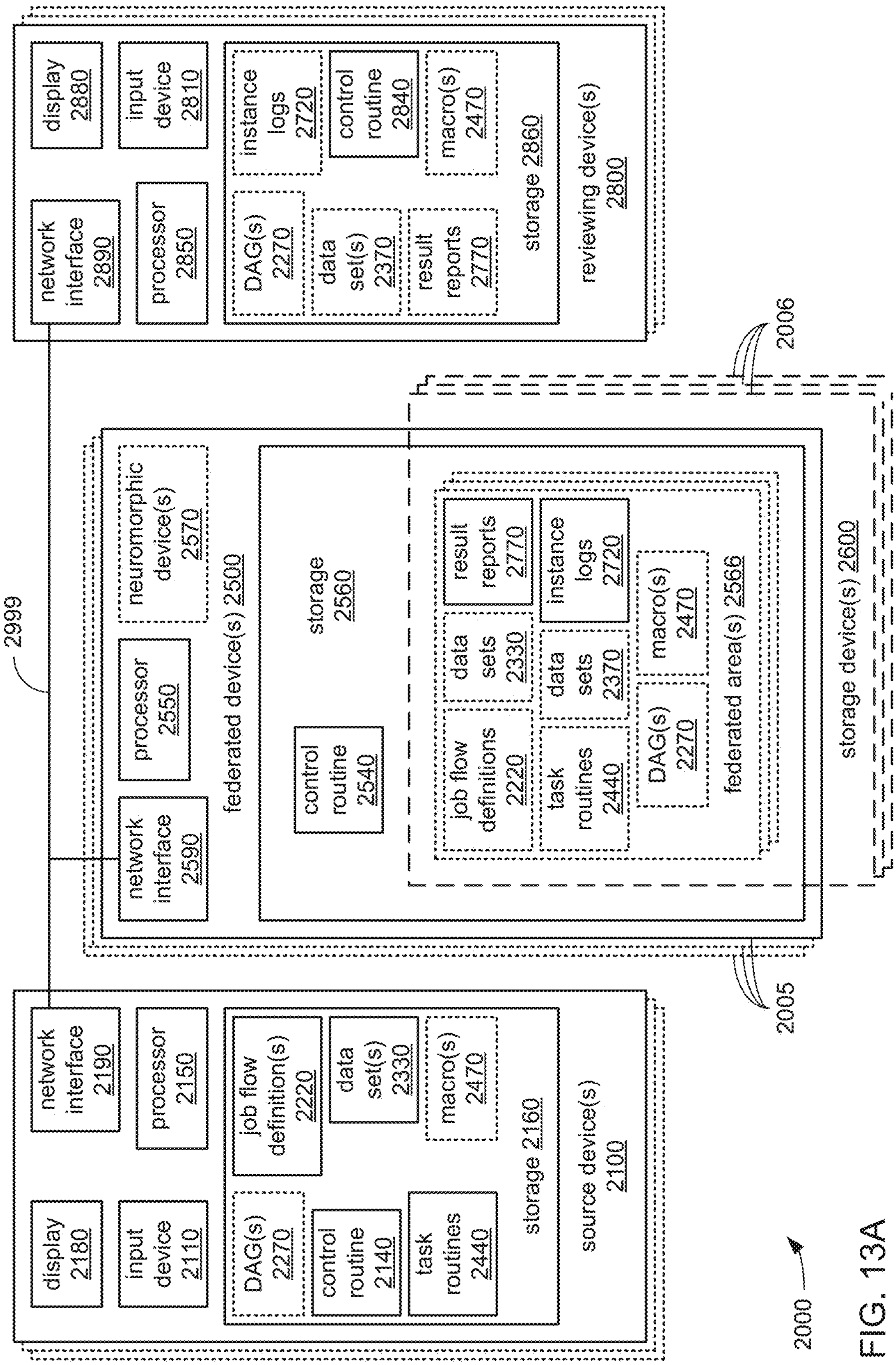
FIGS. 13A, 13B, 13C, 13D, 13E, 13F and 13G, together, illustrate an example embodiment of a distributed processing system.
Figure 13B:
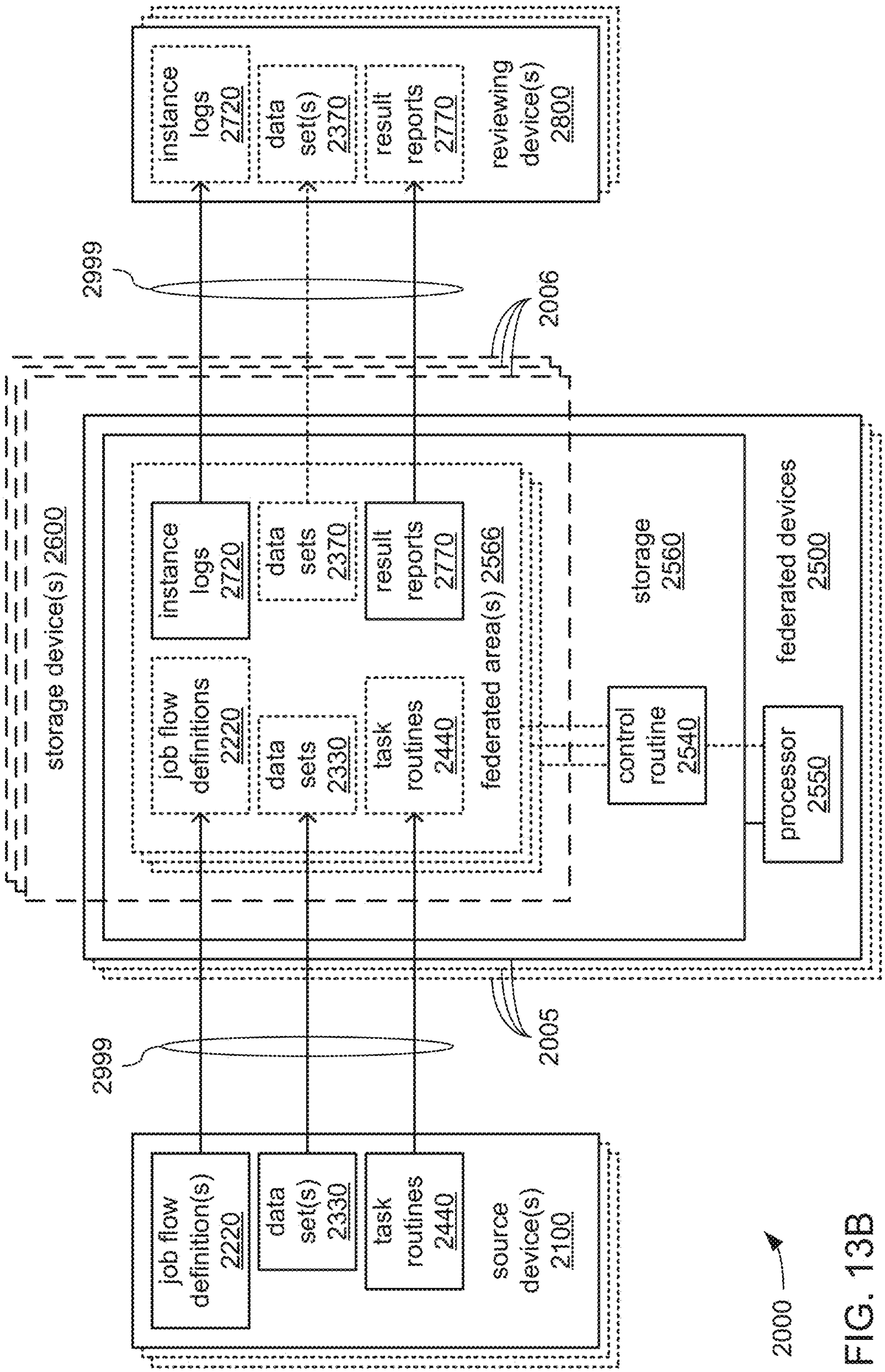
Figure 13C:
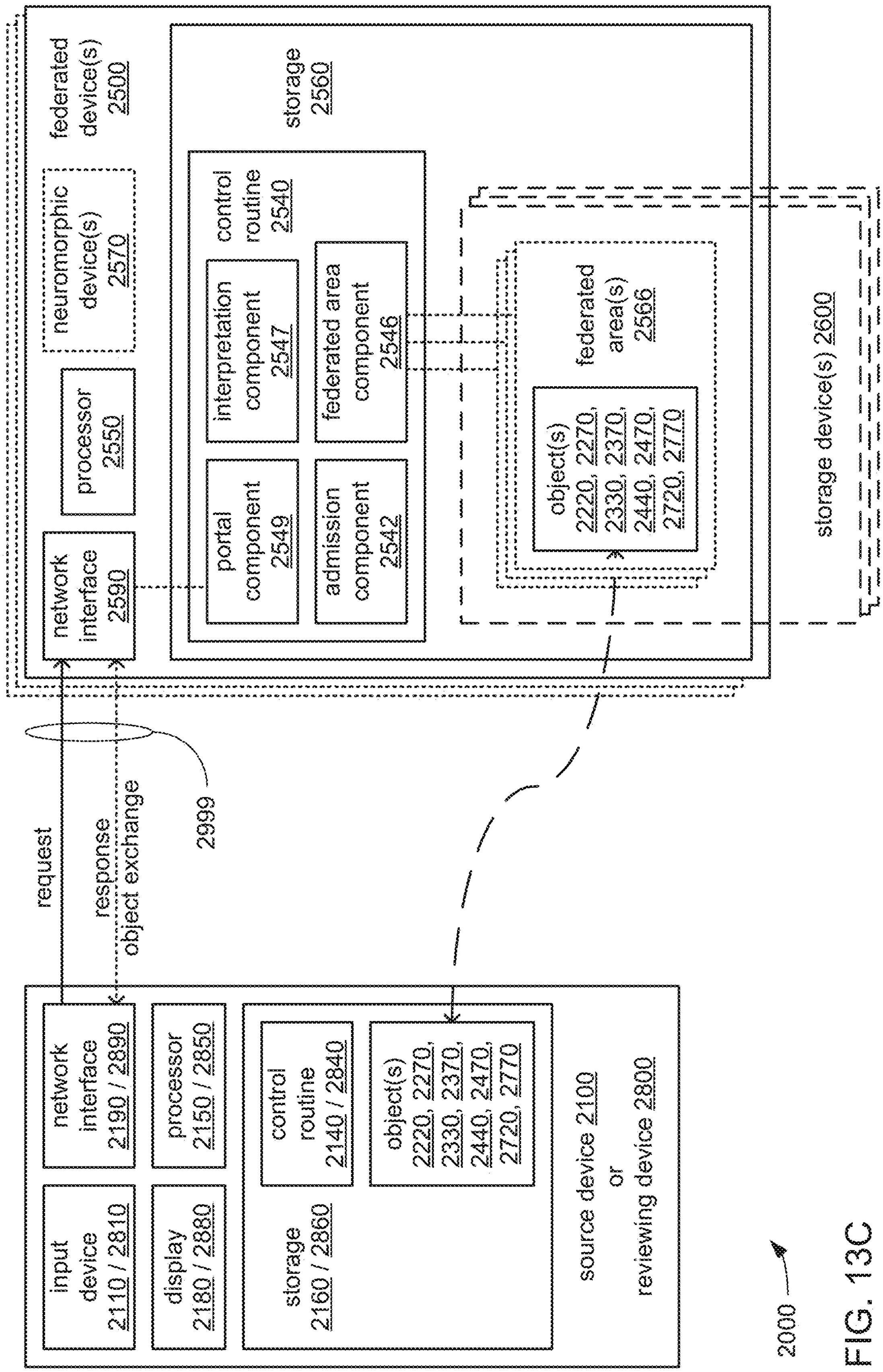
Figure 13D:
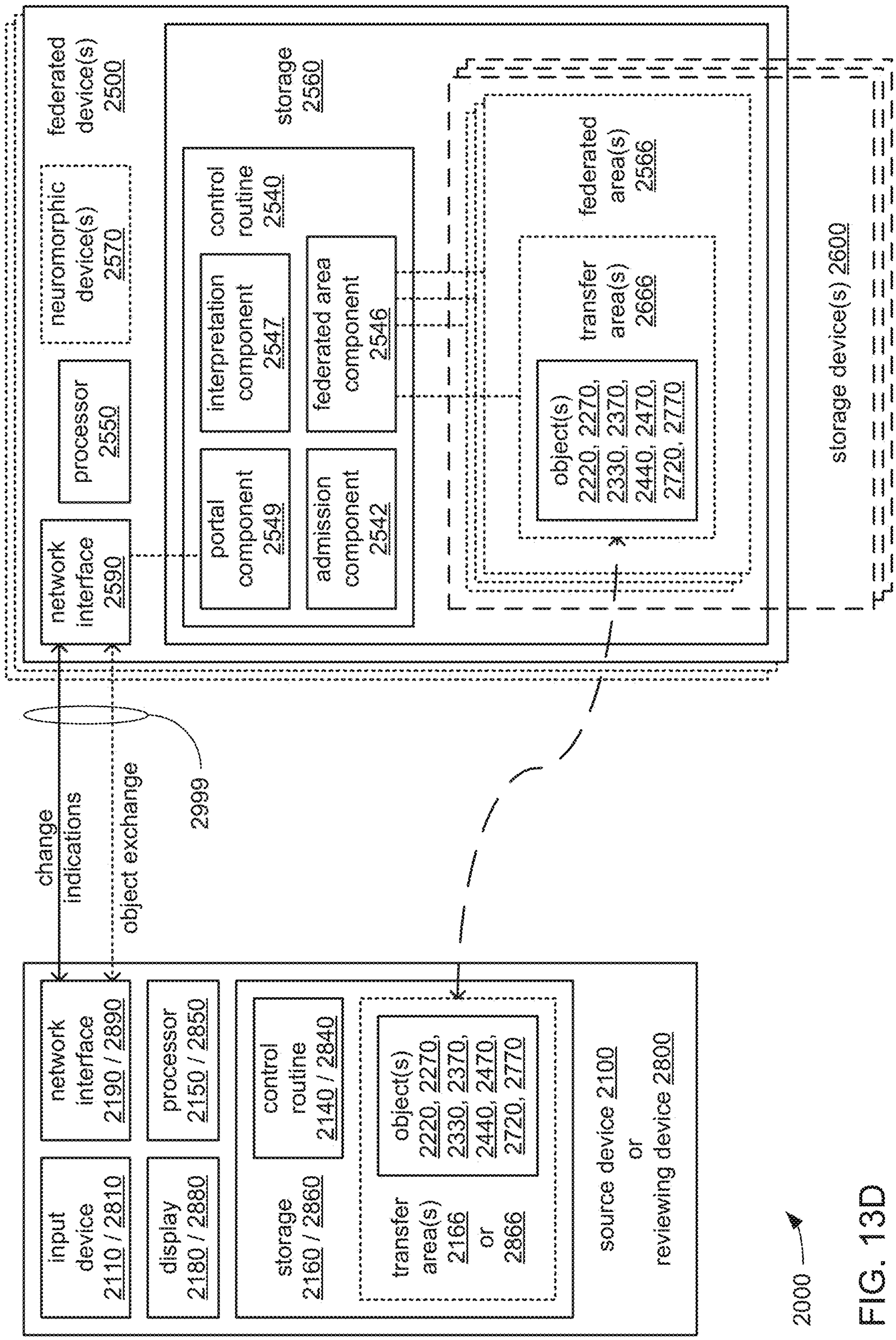
Figure 13E:
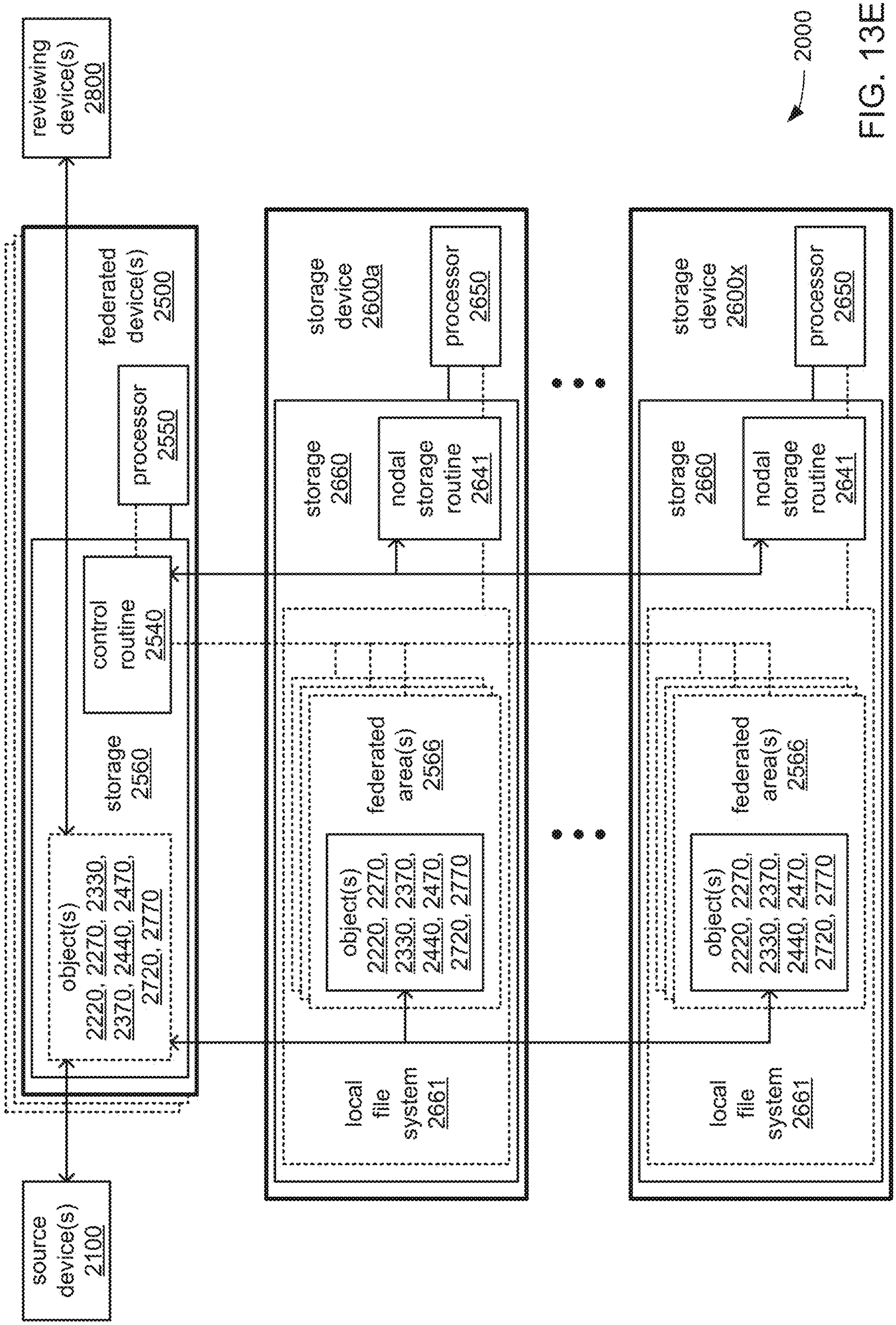
Figure 13F:
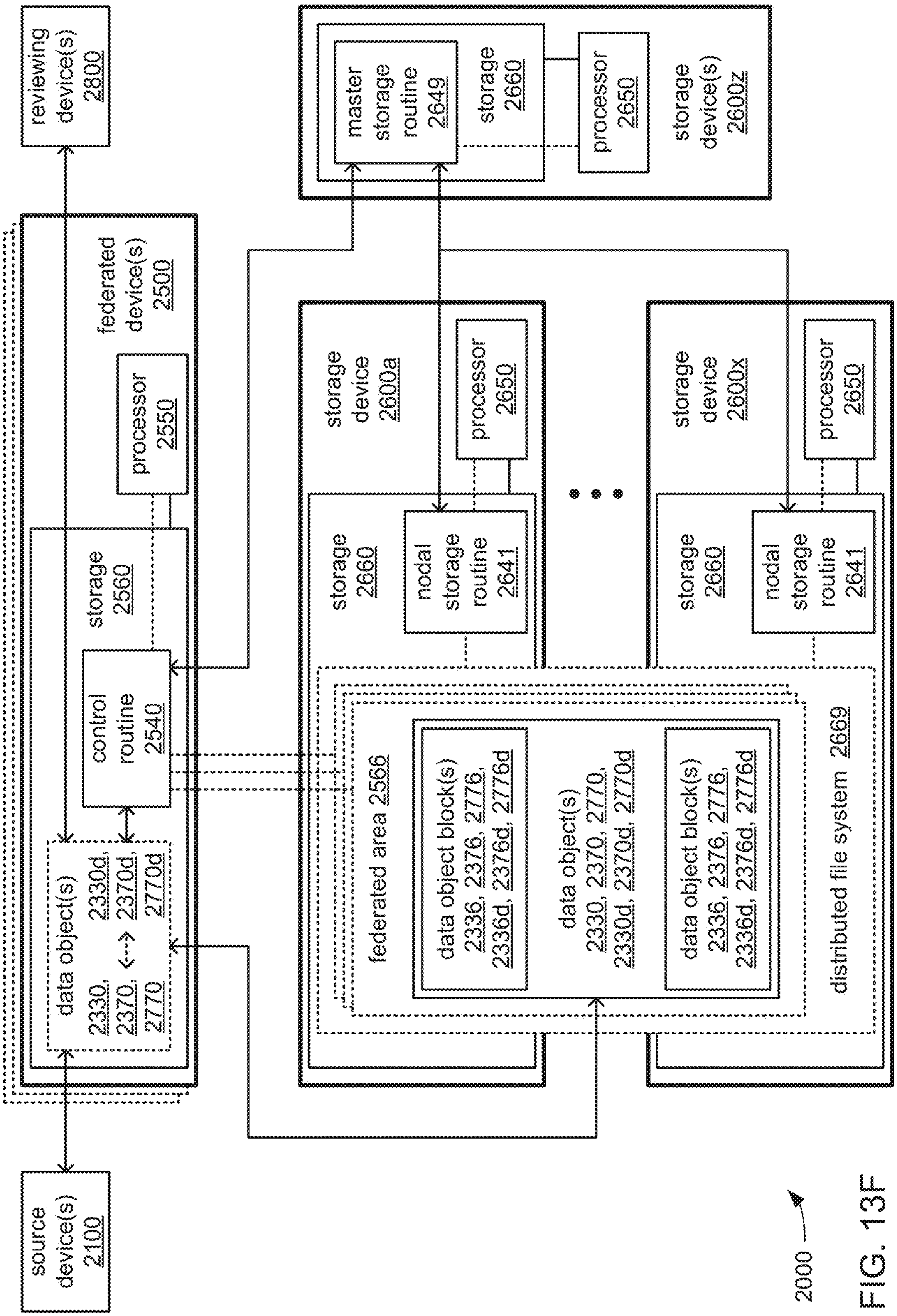
Figure 13G:
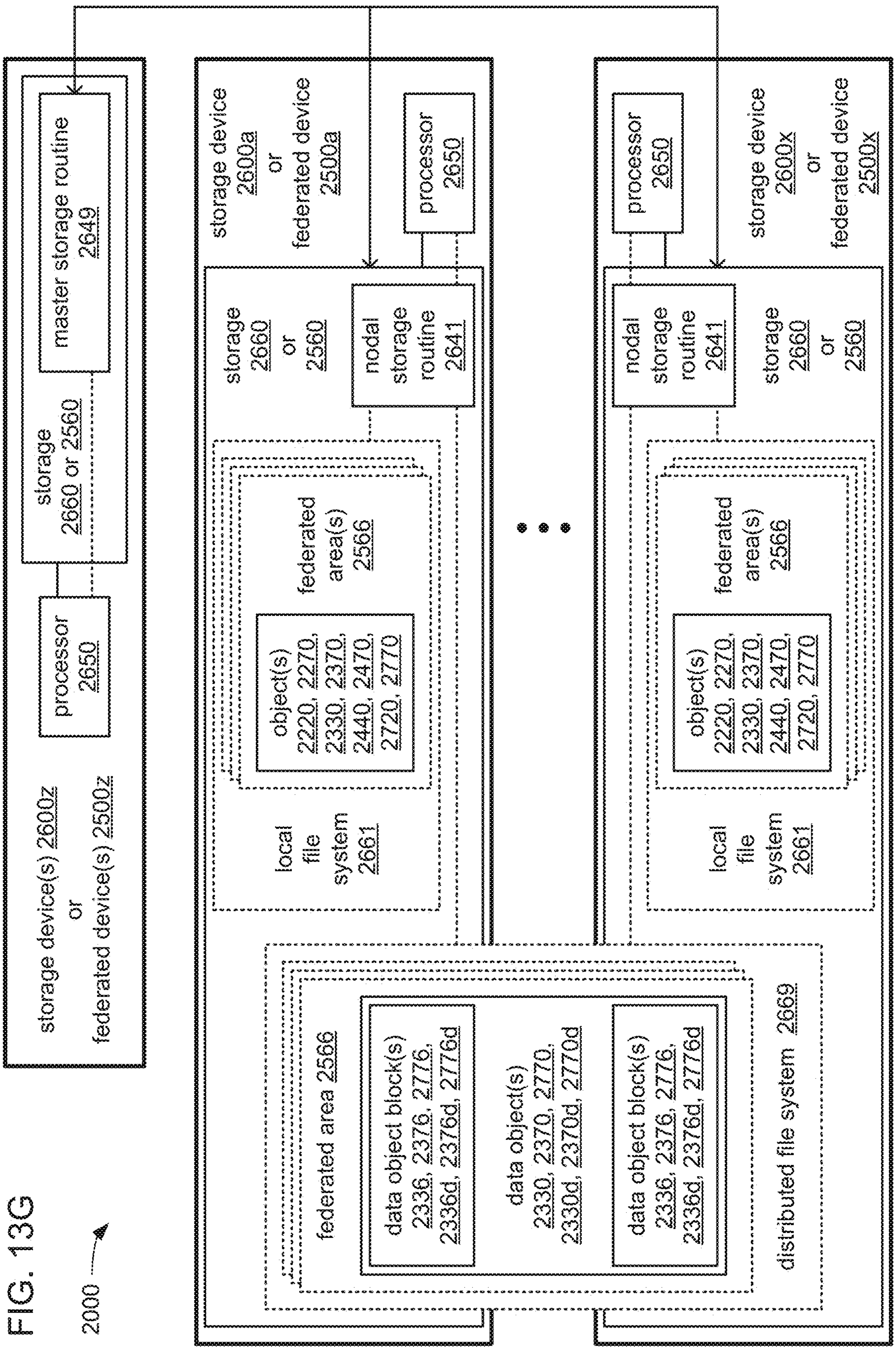

FIG. 13A is a block diagram of an example embodiment of a distributed processing system 2000 incorporating one or more source devices 2100, one or more reviewing devices 2800, one or more federated devices 2500 that may form a federated device grid 2005, and/or one or more storage devices 2600 that may form a storage device grid 2006. FIG. 13B illustrates exchanges, through a network 2999, of communications among the devices 2100, 2500, 2600 and/or 2800 associated with the controlled storage of and/or access to various objects within one or more federated areas 2566, and/or the performance of job flows of analyses associated therewith. FIG. 13C illustrates embodiments in which such exchanges are performed in response to requests from the devices 2100 and/or 2800. FIG. 13D illustrates embodiments in which such exchanges are performed as part of a pre-arranged synchronization of storage spaces among the devices 2100, 2500, 2600 and/or 2800. FIGS. 13E-G illustrate various embodiments of the manner in which such objects may be caused to be stored as a result of such exchanges.

Referring to both FIGS. 13A and 13B, communications among the devices 2100, 2500, 2600 and/or 2800 may include the exchange of objects for the performance of job flows, such as job flow definitions 2220, directed acyclic graphs (DAGs) 2270, data sets 2330 and/or 2370, task routines 2440, macros 2470 and/or result reports 2770. The purposes for such exchanges may be simply to store such objects within one or more federated areas 2566 and/or to retrieve such objects therefrom, and/or to trigger performances of job flows using such objects. However, one or more of the devices 2100, 2500, 2600 and/or 2800 may also exchange, via the network 2999, other data entirely unrelated to any object stored within any federated area 2566. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the one or more source devices 2100 may incorporate one or more of an input device 2110, a display 2180, a processor 2150, a storage 2160 and a network interface 2190 to couple each of the one or more source devices 2100 to the network 2999. The storage 2160 may store a control routine 2140, one or more job flow definitions 2220, one or more DAGs 2270, one or more data sets 2330, one or more task routines 2440 and/or one or more macros 2470. The control routine 2140 may incorporate a sequence of instructions operative on the processor 2150 of each of the one or more source devices 2100 to implement logic to perform various functions. In embodiments in which multiple ones of the source devices 2100 are operated together as a grid of the source devices 2100, the sequence of instructions of the control routine 2140 may be operative on the processor 2150 of each of those source devices 2100 to perform various functions at least partially in parallel with the processors 2150 of others of the source devices 2100.

In some embodiments, one or more of the source devices 2100 may be operated by persons and/or entities (e.g., scholastic entities, governmental entities, business entities, etc.) to generate and/or maintain analysis routines, that when executed by one or more processors, causes an analysis of data to be performed. In such embodiments, execution of the control routine 2140 may cause the processor 2150 to operate the input device 2110 and/or the display 2180 to provide a user interface (UI) by which an operator of the source device 2100 may use the source device 2100 to develop such analysis routines and/or to test their functionality by causing the processor 2150 to execute such routines. As will be explained in greater detail, a rule imposed in connection with such use of a federated area 2566 may be that routines to be stored and/or executed therein are required to be divided up into a combination of a set of objects, including a set of task routines 2440 and a job flow definition 2220. Each of the task routines 2440 performs a distinct task, and the job flow definition 2220 defines the analysis to be performed as a job flow as a combination of tasks to be performed in a particular order through the execution of the set of task routines 2440 in that particular order to thereby perform the job flow. Thus, the source device 2100 may be used in generating such objects which may then be stored within one or more federated areas 2566.

The tasks that each of the task routines 2440 may cause a processor to perform may include any of a variety of data analysis tasks, data transformation tasks and/or data normalization tasks. The data analysis tasks may include, and are not limited to, searches and/or statistical analyses that entail derivation of approximations, numerical characterizations, models, evaluations of hypotheses, and/or predictions (e.g., a prediction by Bayesian analysis of actions of a crowd trying to escape a burning building, or of the behavior of bridge components in response to a wind forces). The data transformation tasks may include, and are not limited to, sorting, row and/or column-based mathematical operations, row and/or column-based filtering using one or more data items of a row or column, and/or reordering data items within a data object. The data normalization tasks may include, and are not limited to, normalizing times of day, dates, monetary values (e.g., normalizing to a single unit of currency), character spacing, use of delimiter characters (e.g., normalizing use of periods and commas in numeric values), use of formatting codes, use of big or little Endian encoding, use or lack of use of sign bits, quantities of bits used to represent integers and/or floating point values (e.g., bytes, words, doublewords or quadwords), etc.

In some embodiments, the UI provided by one or more of the source devices 2100 may take the form of a touch-sensitive device paired with a stylus that serves to enable sketch input by an operator of a source device 2100. As will be familiar to those skilled in the art, this may entail the combining of the display 2180 and the input device 2110 into a single UI device that is able to provide visual feedback to the operator of the successful sketch entry of visual tokens and of text. Through such sketch input, the operator may specify aspects of a GUI that is to be provided during a performance of a job flow to provide an easier and more intuitive user interface by which a user may provide input needed for the performance of that job flow. Following recognition and interpretation of the visual tokens and/or text within the sketch input, a set of executable GUI instructions to implement the GUI may be stored as part of a job flow definition 2220 for such a job flow.

In some embodiments, one or more of the source devices 2100 may, alternatively or additionally, serve to assemble one or more flow input data sets 2330. In such embodiments, execution of the control routine 2140 by the processor 2150 may cause the processor 2150 to operate the network interface 2190, the input device 2110 and/or one or more other components (not shown) to receive data items and to assemble those received data items into one or more of the data sets 2330. By way of example, one or more of the source devices 2100 may incorporate and/or be in communication with one or more sensors to receive data items associated with the monitoring of natural phenomena (e.g., geological or meteorological events) and/or with the performance of a scientific or other variety of experiment (e.g., a thermal camera or sensors disposed about a particle accelerator). By way of another example, the processor 2150 of one or more of the source devices 2100 may be caused by its execution of the control routine 2140 to operate the network interface 2190 to await transmissions via the network 2999 from one or more other devices providing at least at portion of at least one data set 2330.

Regardless of the exact manner in which flow input data sets 2330 are generated, each flow input data set 2330 may include any of a wide variety of types of data associated with any of a wide variety of subjects. By way of example, each flow input data set 2330 may include scientific observation data concerning geological and/or meteorological events, or from sensors employed in laboratory experiments in areas such as particle physics. By way of another example, the each flow input data set 2330 may include indications of activities performed by a random sample of individuals of a population of people in a selected country or municipality, or of a population of a threatened species under study in the wild.

In various embodiments, each of the one or more reviewing devices 2800 may incorporate one or more of an input device 2810, a display 2880, a processor 2850, a storage 2860 and a network interface 2890 to couple each of the one or more reviewing devices 2800 to the network 2999. The storage 2860 may store a control routine 2840, one or more DAGs 2270, one or more data sets 2370, one or more macros 2470, one or more instance logs 2720, and/or one or more result reports 2770. The control routine 2840 may incorporate a sequence of instructions operative on the processor 2850 of each of the one or more reviewing devices 2800 to implement logic to perform various functions. In embodiments in which multiple ones of the reviewing devices 2800 are operated together as a grid of the reviewing devices 2800, the sequence of instructions of the control routine 2840 may be operative on the processor 2850 of each of those reviewing devices 2800 to perform various functions at least partially in parallel with the processors 2850 of others of the reviewing devices 2800.

In some embodiments, one or more of the reviewing devices 2800 may be operated by persons and/or entities (e.g., scholastic entities, governmental entities, business entities, etc.) to utilize and/or perform reviews of analysis routines that have been stored in one or more federated areas 2566 as a set of objects, such as a set of task routines 2440 and a job flow definition 2220. In such embodiments, execution of the control routine 2840 may cause the processor 2850 to operate the input device 2810 and/or the display 2880 to provide a user interface by which an operator of the reviewing device 2800 may use the reviewing device 2800 to view result reports 2770 and/or instance logs 2720 generated by new and/or past performances of job flows. Alternatively, an operator of the reviewing device 2800 may use the reviewing device 2800 to audit aspects of new and/or past performances of job flows, including selections of flow input data sets 2330 used, selections of task routines 2440 used, and/or mid-flow data sets 2370 that were generated and exchanged between task routines 2440, as well as viewing result reports 2770 and/or instance logs 2720. By way of example, the operator of one of the reviewing devices 2800 may be associated with a scholastic, governmental or business entity that seeks to review a performance of a job flow of an analysis that was created by another entity. Such a review may be a peer review between two or more entities involved in scientific or other research, and may be focused on confirming assumptions on which algorithms were based and/or the correctness of the performance of those algorithms. Alternatively, such a review may be part of an inspection by a government agency into the quality of the analyses performed by and relied upon by a business in making decisions and/or assessing its own financial soundness, and may seek to confirm whether correct legally required calculations were used.

In various embodiments, each of the one or more federated devices 2500 may incorporate one or more of a processor 2550, a storage 2560, one or more neuromorphic devices 2570, and a network interface 2590 to couple each of the one or more federated devices 2500 to the network 2999. The storage 2560 may store a control routine 2540. In some embodiments, part of the storage 2560 may be allocated for at least a portion of one or more federated areas 2566. In other embodiments, each of the one or more federated devices 2500 may incorporate and/or be coupled to one or more storage devices 2600 within which storage space may be allocated for at least a portion of one or more federated areas 2566 in addition to or in lieu of storage space within the storage(s) 2560 being so allocated.

More precisely, some embodiments of the distributed processing system 2000 may not include the one or more storage devices 2600, at all, and the one or more federated areas 2566 may be defined entirely within the storage(s) 2560 of the one or more federated devices 2500. Other embodiments of the distributed processing system 2000 may include the one or more storage devices 2600 as storage peripherals (e.g., one or more hard drives) and/or network-attached storage (NAS) device(s) that may be coupled to the one or more federated devices 2500, and the one or more federated devices 2500 may operate the one or more storage devices 2600 as additional storage in which the one or more federated areas 2566 may be defined. In still other embodiments, each of the one or more storage devices 2600 may be an independent computing device incorporating its own processor 2650 and storage 2660 coupled to the processor 2650 (depicted in FIGS. 13E-F), and may be capable of serving the function of maintaining the one or more federated areas 2566 (under the control of the one or more federated devices 2500), and/or serving the function of employing its own processing resources to perform job flows in addition to or in lieu of the processing resources of the one or more federated devices 2500 being employed to do so.

Regardless of where storage space is allocated for one or more federated areas 2566, each of the one or more federated areas 2566 may hold one or more objects such as one or more job flow definitions 2220, one or more DAGs 2270, one or more flow input data sets 2330, one or more task routines 2440, one or more macros 2470, one or more instance logs 2720, and/or one or more result reports 2770. In embodiments in which a job flow is performed by the one or more federated devices 2500 (or by the one or more storage devices 2600) within a federated area 2566, such a federated area 2566 may at least temporarily hold one or more mid-flow data sets 2370 during times when one or more of the mid-flow data sets 2370 are generated by and exchanged between task routines 2440 during the performance of the job flow. In embodiments in which a DAG 2270 is generated by the one or more federated devices 2500 within a federated area 2566 to provide a visualization of aspects of a job flow, a particular performance of a job flow and/or one or more task routines 2440, such a federated area 2566 may at least temporarily hold one or more macros 2470 during times when one or more of the macros 2470 are generated as part of generating the DAG 2270.

In some embodiments that include the one or more storage devices 2600 in addition to the one or more federated devices 2500, the maintenance of the one or more federated areas 2566 within such separate and distinct storage devices 2600 may be part of an approach of specialization between the federated devices 2500 and the storage devices 2600. More specifically, there may be numerous ones of the federated devices 2500 forming the grid 2005 in which each of the federated devices 2500 may incorporate processing and/or other resources selected to better enable the execution of task routines 2440 as part of performing job flows defined by the job flow definitions 2220, the generation of DAGs 2270, and/or other processing functions associated with developing, performing and/or analyzing aspects of job flows. Correspondingly, there may be numerous ones of the storage devices 2600 forming the grid 2006 in which the storage devices 2600 may be organized and interconnected in a manner providing a distributed storage system that may provide increased speed of access to objects within each of the one or more federated areas 2566 through parallelism, and/or may provide fault tolerance of storage. Such distributed storage may also be deemed desirable to better accommodate the storage of particularly large ones of the data sets 2330 and/or 2370, as well as any particularly large data sets that may be incorporated into one or more of the result reports 2770.

However, as an alternative to such a division of functions between the devices 2500 and 2600, or as an augmentation thereto, and even if the one or more federated devices 2500 incorporate considerably more and/or better suited processing resources, it may be deemed desirable for the one or more storage devices 2600 to perform at least a subset of the job flows. As previously explained, it may be that a data object (e.g., a data set 2330 or 2370, or a result report 2770) is received by the one or more federated devices 2500 that is of sufficient size that exchanging it among the devices 2500 and 2600 for use as an input to performing a job flow is deemed to be undesirable due to the amount of overhead that would be incurred in doing so (e.g., consumption of time and various resources). In such instances, it may be deemed desirable to utilize the processing resources of the one or more storage devices 2600 to perform such a job flow so that such a large data object may be used as an input thereto without exchanging portions of it (or all of it) among devices. Indeed, the overhead of moving such a data object to the one or more federated devices 2500 may be significant enough as to outweigh whatever advantages in processing speed and/or efficiency that the processing resources of the one or more federated devices 2500 would provide over using the processing resources of the one or more storage devices 2600.

The control routine 2540 may incorporate a sequence of instructions operative on the processor 2550 of each of the one or more federated devices 2500 to implement logic to perform various functions. In embodiments in which multiple ones of the federated devices 2500 are operated together as the grid 2005 of the federated devices 2500, the sequence of instructions of the control routine 2540 may be operative on the processor 2550 of each of the federated devices 2500 to perform various functions at least partially in parallel with the processors 2550 of others of the federated devices 2500. As will be described in greater detail, among such functions may be the at least partially parallel performance of job flows defined by one or more of the job flow definitions 2220, which may include the at least partially parallel execution of one or more of the task routines 2440 to perform tasks specified by the one or more job flow definitions 2220. As will also be described in greater detail, also among such functions may be the operation of the one or more neuromorphic devices 2570 to instantiate, develop and/or utilize one or more neural networks, or one or more neural network ensembles, to enable neuromorphic processing to be employed in the performance of one or more tasks and/or job flows. Where such functions are performed, one or more data sets 2330 and/or 2370 that include hyperparameters and/or trained parameters of one or more neural networks may be generated, analyzed, modified and/or transferred as a result of the performances of those functions.

Regarding the control routine 2540, and as will be discussed repeatedly throughout the present application, the control routine 2540 may be made up of multiple different components 2541 through 2549. In some embodiments, the control routine 2540 may be generated as a single software routine in which each of these components may be callable subparts (e.g., subroutines, etc.). However, in other embodiments, it may be deemed desirable to allow different portions of the control routine 2540 to be executed by different cores of different processors that may exist within different devices, and/or it may be deemed desirable to allow multiple instances of some portions of the control routine 2540 to be run independently of each other and at least partially in parallel. To accommodate this, it may be that one or more of the components 2541 through 2549 is a separately executable, and perhaps fully self contained, software routine.

Turning to FIG. 13C, as depicted, the control routine 2540 may include a federated area component 2546 to cause the processor(s) 2550 of the one or more federated devices 2500 to maintain the one or more federated areas 2566 within the storage 2560 of each of the one or more federated devices 2500 and/or within the one or more storage devices 2600. Many of the operations that the processor(s) 2550 of the one or more federated devices 2500 may be caused to perform by execution of the control routine 2540, including the instantiation, maintenance and/or un-instantiation of the one or more federated areas 2566, may be in response to requests received via the network 2999 from the one or more source devices 2100 and/or from the one or more reviewing devices 2800. Also, many of such received requests may entail the exchange of one or more objects.

As also depicted, the control routine 2540 may also include a portal component 2549 to cause the processor(s) 2550 of the one or more federated devices 2500 to limit access to the one or more federated areas 2566 to particular authorized persons and/or particular authorized devices that may be associated with one or more particular corporate, governmental, scholastic and/or other types of entities. Correspondingly, the processor(s) 2150 of the one or more source devices 2100 may be caused by execution of the control routine 2140 to provide a UI that enables an operator thereof to send such requests to the one or more federated devices 2500, and/or the processor(s) 2850 of the one or more reviewing devices 2800 may be caused by execution of the control routine 2840 to provide a UI that enables an operator thereof to do so. The processor(s) 2550 of the one or more federated devices 2500 may be caused by the portal component 2549 to cooperate, via the network 2999, with the requesting device 2100 or 2800 to cause the UI provided thereby to present the operator thereof with a request for a password or other security credential to verify that the operator and/or the requesting device 2100 or 2800 is authorized to make the particular request that has been made.

Alternatively or additionally, some interactions with a requesting device 2100 or 2800, including requests that may be transmitted via the network 2999 to the one or more federated devices 2566, may be automated. In embodiments in which such automated requests are made, the requesting device 2100 or 2800 may automatically provide security credentials to the one or more federated devices 2500 to verify that the requesting device 2100 or 2800 is authorized to make the particular request that has been made.

In some embodiments, the requests received by the one or more federated devices 2500 received via the network 2999 and/or the responses transmitted by the one or more federated devices 2500 thereto via the network 2999 may employ formatting, syntax, timing, synchronization with other activities, etc. that conform to one or more industry standards for network communications, programming, processor coordination, etc. By way of example, such aspects of such requests may conform to one or more of the various versions of the specification for the message-passing interface (MPI) promulgated by the MPI Forum, which is a cooperative venture by numerous governmental, corporate and academic entities from around the world. As will be explained in greater detail, one or more objects may be exchanged in such requests and/or in such responses thereto as portions of streamed data that is included therewith.

As further depicted, the control routine 2540 may also include an interpretation component 2547 to cause the processor(s) 2550 of the one or more federated devices 2500 to, in response to any of a variety of error conditions that may arise in performing a requested operation and/or in response to instances in which a request is to be denied, generate a graphical indication of the error and/or the cause for denial. Such a graphical indication may take the form of a DAG 2270 that provides a visual indication of an error or other condition within an object and/or between two or more objects, and may entail interpreting portions of executable instructions, definitions of job flows, specifications of input and/or output interfaces, comments written by programmers, etc., within such objects as job flow definitions 2220, task routines 2440 and/or instance logs 2720. Upon being generated, the processor(s) 2550 may be caused by the portal component 2549 to relay such graphical indications (e.g., DAGs 2270) to the requesting device to be visually presented to an operator thereof and/or stored therein for a future visual presentation to an operator thereof.

Among such requests may be a request to store one or more objects within a federated area 2566, to access one or more objects stored within a federated area 2566 and/or to delete one or more objects stored within a federated area 2566. As depicted, the control routine 2540 may include an admission component 2542 to cause the processor(s) 2550 of the one or more federated devices 2500 to apply a set of rules that place constraints on the storage of objects within federated areas and/or the removal of objects therefrom to ensure that job flows are able to be fully performed and/or that past performances of job flows are able to be repeated as part of being scrutinized. In so applying such rules, the processor(s) 2550, in response to the request, may fully or partially carry out the requested operations, which may result in the exchange of one or more objects via the network 2999 between the requesting device 2100 or 2800 and the one or more federated devices 2500, depending on the application of such a set of rules. Alternatively, in response, the processor(s) 2550 may transmit an indication of a refusal, via the network 2999 and to the requesting device, to carry out the requested operations, depending on the application of such a set of rules. Such an indication may include a DAG 2270 that visually presents an indication of the reason for the refusal.

Among such requests may be a request for the one or more federated devices 2500 to convert a spreadsheet data structure into a set of objects required for the performance of an analysis as a job flow, and to store those generated objects within a federated area 2566. Such a spreadsheet data structure may contain one or more two-dimensional arrays of data and multiple formulae for the performance of the analysis. In response, the processor(s) 2550 of the one or more federated devices 2500 may analyze the included data and the formulae to derive a set of task routines and a job flow definition that is able to perform the analysis specified in the data structure in a manner that may be better optimized for a performance of the analysis as a job flow using distributed processing resources of the one or more federated devices 2500. Additionally, the processor(s) 2550 may generate a DAG 2270 to provide a visual representation of the resulting job flow.

Among such requests may be a request for the processor(s) 2550 of the one or more federated devices 2500 to perform a job flow. It may be that such a request conveys a job flow identifier and/or an instance log identifier that enables the identification of the job flow requested to be performed, thereby allowing an already generated job flow definition that defines various aspects of the job flow to be retrieved from storage, along with other objects, to enable the requested performance of the job flow. However, it may also be (e.g., where the request conforms to one or more of the MPI specifications) that the request does not provide either a job flow identifier or an instance log identifier, and instead, directly provides portions of the content of a job flow definition, such as flow task identifiers, specifications of interfaces and/or data object identifiers, thereby enabling a job flow definition that defines various aspects of the job flow to be dynamically generated as part of enabling the job flow to be performed.

Regardless of the exact manner in which a request to perform a job flow is received, the processor(s) 2550 may, in response, retrieve the various objects needed for the performance, including the most up to date versions of the task routines 2440 needed to perform each of the tasks specified in the job flow definition 2220 for the job flow. The processor(s) 2550 may additionally check whether the job flow has already been performed with the same set of most up to date task routines 2440, and if so, may then transmit the result report(s) 2770 of that past performance to the requesting device 2100 or 2800 in lieu of performing what would be a repetition of that past performance In this way, processing resources may be conserved for use in performing other operations, including other job flows.

Alternatively, where the request is to repeat a particular past performance of a job flow, the processor(s) 2550 of the one or more federated devices may, in response, use the information included in the request that identifies the job flow to retrieve the various objects associated with the past performance (e.g., the job flow definition 2220, the flow input data set(s) 2330, the task routines 2440) from one or more federated areas 2566, and may then use the retrieved objects to repeat the past performance In some embodiments, the processor(s) 2550 may also retrieve the results report(s) 2770 generated by the past performance for comparison with the corresponding result report(s) 2770 generated by the repeat performance, and may transmit an indication of the results thereof to the requesting device 2100 or 2800. Such an indication of the results may include a DAG 2270 that may provide a visual indication of any inconsistency identified by the comparison.

Among such requests may be a request for the one or more federated devices 2500 to generate a DAG 2270 of one or more objects, such as a DAG 2270 of one or more task routines 2440, the task(s) performed by one or more task routines 2440, a job flow specified in a job flow definition 2220, or a past performance of a job flow documented by an instance log 2720. A DAG 2270 may provide visual representations of one or more tasks and/or task routines 2440, including visual representations of inputs and/or outputs of each. In response, the processor(s) 2550 of the one or more federated devices 2500 may generate the requested DAG 2270 and transmit it the requesting device 2100 or 2800. As an alternative to a request to generate a DAG 2270 using the processing resources of the one or more federated devices 2500, a request may be received for the one or more federated devices 2500 to provide the requesting device 2100 or 2800 a set of objects needed to enable the requesting device 2100 or 2800 to generate a DAG 2270. In response, the processor(s) 2550 of the one or more federated devices 2500 may generate a set of macros 2470, one for each task or task routine 2440 that is to be included in the DAG 2270 for purposes of being transmitted to the requesting device 2100 or 2800 to enable generation of the DAG 2270 by the requesting device 2100 or 2800.

Among such requests may be a request to generate a package containing copies of one or more of the federated areas 2566 maintained by the one or more federated devices 2500 to enable the copies of the one or more federated areas 2566 to be instantiated within one or more other devices. The request may specify that each copy of a federated area 2566 that is within the package is to include copies of all of the objects present within the counterpart federated area 2566 from which the copy is generated. Alternatively, the request may specify that each of copy of a federated area that is within the package is to include copies of objects present within the counterpart federated area 2566 from which the copy is generated that are needed to perform a specified job flow and/or that are needed to repeat a specified past performance of a job flow. In some embodiments, the processor(s) 2550 of the one or more federated devices 2500 may, in response, apply a set of rules to the generation of the package to ensure that the copies of federated area(s) included therein and/or the copies of sets of objects included within each copy of a federated area 2566 is complete enough to avoid one or more job flows being rendered incapable of being performed as a result of copies of one or more needed objects not having been included in the package. Following generation of the package, the processor(s) 2550 may transmit the package to the requesting device 2100 or 2800.

Turning to FIG. 13D, as an alternative to the use of separate requests to bring about individual transfers of one or more objects to and from the one or more federated devices 2500, a single request may be made and granted by the processor(s) 2550 of the one or more federated devices 2500 to instantiate a synchronization relationship between a transfer area 2666 instantiated within a specified federated area 2566 maintained by the one or more federated devices 2500, and another transfer area 2166 or 2866 instantiated within the storage 2160 or 2860 of a source device 2100 or a reviewing device 2800, respectively. The transfer area 2666 may occupy the entirety of the federated area 2566 within which it is instantiated, or a designated portion thereof. Correspondingly, the transfer area 2166 or 2866 may occupy a designated portion of the storage 2160 or 2860, respectively. With such a synchronization relationship in place, the contents of the transfer area 2666 may be recurringly synchronized with the contents of the transfer area 2166 or 2866. More specifically, changes made to objects within the transfer area 2666 (e.g., the addition, removal and/or alteration of objects) may trigger the transfer of one or more objects therefrom to the transfer area 2166 or 2866 to cause the contents of these two transfer areas to remain synchronized with each other. Correspondingly, changes made to objects within the transfer area 2166 or 2866 may trigger a similar transfer of one or more objects therefrom to the transfer area 2666 to also cause the contents of these two transfer areas to remain synchronized with each other.

In some embodiments, processor(s) 2550 of the one or more federated devices 2500 may cooperate with the other device 2100 or 2800 in the triggering of such transfers by recurringly exchanging indications of the current state of the objects stored in their respective ones of the transfer areas 2666, and 2166 or 2866. By way of example, a polling approach may be used in which the one or more federated devices 2500 may be provided with the security credentials required to "log in" to the other device 2100 or 2800 to gain access to the transfers space 2166 or 2866 in a manner similar to that of a user of the other device 2100 or 2800, and may then compare what objects are present within the transfer space 2166 or 2866, respectively, to what objects were present during the last time such a check was performed to identify added objects, altered objects and/or removed objects therein. Correspondingly, as an alternative, the other device 2100 or 2800 may be provided with similar credentials to enable the processor(s) 2150 or 2850 thereof to "log in" to the one or more federated devices 2500 to make similar comparisons concerning the objects that are present within the transfer space 2666. Where a change to an object in one of these transfer areas has been determined to have occurred, the one of these devices that has "logged in" to the other may then make a request of the other to provide the copies of one or more objects that are needed to bring its own one of these transfer areas back into synchronization with the other such that both of these transfer areas again contain the same objects in the same condition.

In other embodiments, as an alternative to or in addition to such a polling approach, an approach of "volunteering" indications may be used in which the processor(s) 2550 of the one or more federated devices 2500 may, either at a recurring interval of time or in response to the occurrence of changes to one or more objects within the transfer area 2666, transmit an indication of the current state of objects currently present within the transfer area 2666 to the other device 2100 or 2800. Where there has been such a change within the transfer area 2666, such a transmitted indication thereof may be accompanied with the transmission of one or more copies of the objects that are present within the transfer area 2666 to the other device 2100 or 2800 to enable the processor(s) 2150 or 2850 of the other device 2100 or 2800 to bring the transfer area 2166 or 2866, respectively, back into synchronization with the transfer area 2666 such that both of these transfer areas again contain the same objects in the same condition. Correspondingly, the processor(s) 2150 or 2850 may be use such a "volunteering" approach in similarly transmitting an indication of the current state of the objects currently present within the transfer area 2166 or 2866 to the one or more federated devices 2500, either at a recurring interval of time or in response to the occurrence of changes to one or more objects within the transfer area 2166 or 2866, respectively. Similarly, where there has been such a change within the transfer area 2166 or 2866, such a transmitted indication thereof may be accompanied with the transmission of one or more copies of the objects that are present within the transfer area 2166 or 2866 to the one or more federated devices 2500 to enable the processor(s) 2550 of the one or more federated devices 2500 to bring the transfer area 2666 back into synchronization with the transfer area 2166 or 2866, respectively, such that both of these transfer areas again contain the same objects in the same condition.

In some embodiments, the processor(s) 2550 of the one or more federated devices 2500 may be caused by the admission component 2542 to apply the same set of rules restricting the storage of objects within the one or more federated areas 2566 and/or the removal of objects therefrom as were described above in handling responses to received requests. However, in other embodiments and as will be explained in greater detail, accommodating such a synchronization relationship may entail changes to, or relaxation of, the enforcement of that set of rules. In such other embodiments, instead of applying the set of rules in a manner that disallows the transfer of objects in response to an error condition or other violation of the rules, a DAG 2270 may be generated that provides a visual indication of the rule violation and/or the error condition. Upon being generated, the processor(s) 2550 may be caused by the portal component 2549 to automatically transfer such a DAG 2270 between the two transfer areas as part of the synchronization relationship and to make such a DAG 2270 available in both transfer areas.

In some embodiments, such a synchronization relationship may be instantiated where the device 2100 or 2800 is at least partially used as a repository for objects, such as a source code repository for an analysis routine that is under development. As will also be explained in greater detail, it may be that developers who are familiar with the use of federated areas 2566 and/or who have been granted access to the one or more federated areas 2566 maintained by the one or more federated devices 2500 may be working in collaboration with other developers who are not so familiar with the use of federated areas 2566 and/or who have not been granted such access. Through such a synchronization relationship, objects developed by such other developers may be contributed to the objects stored within the one or more federated areas 2566 by placing them within the transfer area 2166 or 2866. Correspondingly, such other developers may be given access to objects stored within the one or more federated areas 2566 by placing those objects (or copies thereof) within the transfer area 2666.

As will further be explained in greater detail, such other developers may also not be familiar with a primary programming language that may normally be expected to be used in generating job flow definitions 2220, DAGs 2270, task routines 2440 and/or macros 2470, and as a result, may generate such objects in one or more secondary programming languages. Thus, as part of performing such automated transfers and applying the set of rules, the processor(s) 2550 of the one or more federated devices 2500 may also perform automated translations of at least portions of objects that define or implement input and/or output interfaces. Such translations may be between the primary and secondary programming languages. Alternatively or additionally, such translations may be from the primary and secondary programming languages, and into an intermediate representation, such as an intermediate programming language or a data structure, to enable the earlier described comparisons among definitions and/or implementations of input and/or output interfaces to be made.

As an alternative to the aforedescribed relatively simple synchronization relationship between a single transfer area 2666 within a single federated area 2566 and a single transfer area 2166 or 2866 within a single storage 2160 or 2860, respectively, in other embodiments, a set of synchronization relationships may be formed that includes multiple transfer areas 2666 across multiple federated areas 2566 and/or that includes multiple transfer areas 2166 or 2866 within a storage 2160 or 2860, respectively. Such embodiments may be deemed desirable where there is a collaborative development effort to develop a relatively complex analysis routine between developers familiar with federated areas and/or familiar with the primary programming language normally expected to be used in generating job flow definitions 2220, DAGs 2270, task routines 2440 and/or macros 2470, and developers who may not be familiar with either or both. More specifically, and as will be explained in greater detail, the objects used in the development of such a relatively complex analysis routine may be stored across multiple federated areas 2566 that form a hierarchy thereamong, thereby prompting a need to define a separate transfer area 2666 within each. It may be that a corresponding hierarchy may be created within a storage 2160 or 2860 as a set of directories and/or subdirectories, each with a corresponding transfer area 2166 or 2866, respectively. Thus, each of the multiple transfer areas 2666 within one of such federated areas 2566 may have a corresponding one of the multiple transfer areas 2166 or 2866 at a corresponding hierarchical position with which it is synchronized.

Alternatively or additionally, as an alternative to the performance of exchanges of objects occurring in a synchronization relationship being triggered by instances of changes in objects, in other embodiments, exchanges between synchronized transfer areas may also be triggered by an instance of the use of an object to generate a new object. By way of example, and as will be explained in greater detail, where an object, such as a job flow definition 2220 or a DAG 2270, is used as a component in forming a new object, such as a new job flow definition 2220 or a new DAG 2270, such a new object may be become another of the objects that are kept synchronized in a synchronization relationship between transfer areas. Thus, and more specifically, such a new object, and subsequent changes made thereto, may be copied between a transfer area 2566 and another transfer area 2166 or 2866. Alternatively, where different programming languages are used, a translated form of such a new object, and of subsequent changes made thereto, may be generated in the other language within the other of the two transfer areas.

Turning to FIGS. 13E-G, in various embodiments, each of the one or more storage devices 2600 within the depicted set of storage devices 2600*a-x* and/or 2600*z* may incorporate a processor 2650 and/or a storage 2660 coupled to the processor. In at least a subset of the storage devices 2600*a-x* and/or 2600*z*, the storage 2660 may store a nodal storage routine 2641. Alternatively or additionally, in at least a subset of the storage devices 2600*a-x* and/or 2600*z*, the storage 2660 may store a master storage routine 2649. Each of the nodal storage routine 2641 and the master storage routine 2649 may incorporate a sequence of instructions operative on the processor 2650 of each of the storage devices 2600*a-x* and/or 2600*z* to implement logic to perform various functions. Each of the storage devices 2600*a-x* and/or 2600*z* may be directly coupled to and/or otherwise interact with a single federated device 2560. Alternatively, each of the storage devices 2600*a-x* and/or 2600*z* may interact with multiple ones of the federated devices 2560 as a result of being shared thereamong. Although not specifically depicted, such sharing of the storage devices 2600*a-x* and/or 2600*z* may be through the network 2999.

Turning more specifically to FIG. 13E, in some embodiments, at least a subset of the storage devices 2600*a-x* may be operated by the one or more federated devices 2500 as individual storage devices 2600 where each is caused to store objects (e.g., the depicted objects 2220, 2270, 2330, 2370, 2440, 2470, 2720 and/or 2770) in an undivided manner such that none of such objects are stored in a distributed form that spans multiple ones of the storage devices 2600*a-x*. As will be explained in greater detail, such storage of objects in an undivided manner may be limited to objects that are of a smaller size than a predetermined threshold size. In such embodiments, and as will also be explained in greater detail, it may be that each federated area 2566 is defined to exist entirely within a single one of the storage devices 2600*a-x*. Within each such one of the storage devices 2600*a-x*, the processor 2650 may be caused by its execution of the nodal storage routine 2641 to implement a local file system 2661 within at least a portion of the storage 2660 thereof, and may be caused to cooperate with the one or more federated devices 2560 to define one or more federated areas 2566 within such a portion of the storage 2660 that is occupied by the local file system 2661.

Turning more specifically to FIG. 13F, in some embodiments, at least a subset of the storage devices 2600*a-x* and/or 2600*z* may be operated together by the one or more federated devices 2500 to store at least data objects (e.g., the depicted data objects 2330, 2330*d*, 2370, 2370*d*, 2770 and/or 2770*d*) in a distributed manner such that each of such data objects is divided into data object blocks 2336, 2336*d*, 2370, 2376*d*, 2776 and/or 2776*d*, respectively, which are distributed across multiple ones of such storage devices for storage for storage in a manner that spans multiple ones of the storage devices 2600*a-x*. As previously discussed, such distributed storage of objects may be limited to those that are larger in size than the predetermined threshold size. In such embodiments, and as will be explained in greater detail, it may be that each federated area 2566 is defined to span multiple ones of the storage devices 2600*a-x*.

Within the storage device 2600*z*, the processor 2650 may be caused by its execution of the master storage routine 2649 to coordinate with such ones of the storage devices 2600*a-x* to implement a distributed file system 2669 that spans and encompasses at least a portion of the storage 2660 of each. Within each such one of the storage devices 2600*a-x*, the processor 2650 may be caused by its execution of the nodal storage routine 2641 to cooperate with the storage device 2600*z* to implement a portion of the distributed file system 2669 within at least a portion of its storage 2660. The processors 2650 of the storage device 2600*z* and of each of such ones of the storage devices 2600*a-x* may cooperate with the one or more federated devices 2500 to define one or more federated areas 2566 to span such portions of the storages 2660 within which the distributed file system 2669 is so implemented.

In some of such embodiments, the distributed file system 2669 that is so implemented may be HDFS, and it may be that the processor 2650 of the storage device 2600*z* is caused by the master storage routine 2649 to operate the storage device 2600*z* to serve as the "name server" for such an implementation of HDFS. It should be noted that, there may be more than one of the storage device 2600*z*, and such additional storage device(s) 2006*z* may be maintained as additional name servers to enable the name server functions to be implemented more quickly and/or efficiently through the use of parallelism, and/or to serve as backup name server(s) to provide redundancy against failure in the performance of the name server functions.

As previously discussed, it may be that a relatively large data object 2330, 2370 or 2770 received by the one or more federated devices 2500 for storage is of a form that is not able to be divided to directly generate data object blocks in which the data items are organized in a homogeneous manner Δs also previously discussed, the one or more federated devices 2500 may address this issue by converting such a data object 2330, 2370 or 2770 from its originally received from and into a distributable form (e.g., as a corresponding one of the data object 2330*d*, 2370*d* or 2440*d*) in which the organization of the data items is changed into a homogeneous manner of organization that enables its division into data object blocks 2336*d*, 2376*d* or 2446*d*, respectively, in which the data items are also organized in a homogeneous manner that makes the data items more readily accessible (e.g., without the need to refer to a distinct metadata structure).

In embodiments in which at least a subset of the storage devices 2600*a-x* and/or 2600*z* implement HDFS, it may be those storage devices within that subset that perform the division of a data object into blocks for storage. As will be familiar to those skilled in the art, implementing HDFS typically includes selecting a distribution block size that is used to determine whether an object that is to be stored will be divided into blocks, or not. Objects that are larger than the distribution block size will be divided into blocks that are each no larger than the distribution block size, while objects that are smaller than the threshold size are not so divided. Typical distribution block sizes that have been used in previous implementations of HDFS are 64 MB and 128 MB. The one or more federated devices 2500 may employ the same distribution block size as is used to implement HDFS among the storage devices 2600*a-x* and/or 2600*z* as the predetermined threshold size used as at least one factor in determining whether or not to convert the form of a data block that is to be stored from the form in which it was originally received and a distributable form.

In some embodiments, the distribution block size may be associated with storage capacity limitations of one or more of the storage devices 2600. By way of example, the predetermined threshold size may be selected to trigger the dividing of large data objects that might actually be larger than the storage capacity of any one of the storage devices 2600. In such embodiments, there may be an upper limit placed on the size of any data object based on the total capacity of a set of storage devices 2600 that are used together to store large data objects in a distributed manner, and such an upper limit may be selected to strike a balance between enabling storage of large data objects, while preventing the storage capacity from being consumed by the storage of a relatively small quantity of data objects. Alternatively, the predetermined threshold size may be selected to cause division of large data objects that are sufficiently large that there is an appreciable improvement possible in speed of access thereto by splitting them up into data object blocks that are distributed across multiple ones of the storage devices 2600. In each of such other embodiments, there may be an upper limit placed on the size of any data object that may be based on the total storage capacity available in any one of the storage devices 2600.

It should be noted that, although the distributed storage of large data objects that are either already in distributable form or that have been converted into distributable form is discussed herein, various circumstances may arise in which other large data objects that are not in distributable form may, nonetheless, also be stored in a distributed manner among multiple ones of the storage devices 2600*a-x*. By way of example, it may be that the at least partially parallel performances of a job flow on the earlier stored data object blocks 2336*d*, 2376*d* or 2776*d* of the distributable form of the data object 2330*d*, 2370*d* or 2770*d*, respectively, may result in the generation of corresponding data object blocks of another data set as an output of that job flow. Thus, as a result of such at least partially parallel performances of the job flow, a portion of the storage space provided within each of those storage devices 2600*a-x* for a portion of a federated area 2566 may be caused to store a new data object block 2336, 2376 or 2776 belonging to another data set 2330, 2370 or 2770, respectively, that was not generated by dividing a distributable form of a data set 2330*d*, 2370*d* or 2770*d* that is provided by the one or more federated devices such that data items within each may not be organized in a homogeneous manner Thus, as depicted, a federated area 2566 that spans multiple ones of the storage devices 2600*a-x* within the portions of storage space spanned by the distributed file system 2669 may store data object blocks 2336, 2376 and/or 2776 of data objects 2330, 2370 or 2770 that are not of distributable form alongside data object blocks 2336*d*, 2376*d* and/or 2776*d* of data object blocks 2330*d*, 2370*d* and/or 2770*d*, respectively, that are of distributable form.

As will be explained in greater detail, the selection of which of multiple ones of the storage devices 2600 are used in performing a job flow may be at least partially determined by which of those multiple storage devices 2600 store a data object block of a data object that is to be used as an input in that performance. As will also be explained in greater detail, such generated and stored data object blocks 2336, 2376 and/or 2776 that are not of distributable form may be selectively combined (e.g., in a reduction operation) to generate a corresponding one of the data object 2330, 2370 or 2770 of undivided form. By way of example, where a result report 2770 that was originally generated as such data object blocks 2776 during a performance of a job flow is to be transmitted to a device that requested the performance (e.g., a source device 2100 or a reviewing device 2800, those data object blocks 2776 may be so combined to generate an undivided form of the result report 2770 as part of enabling its transmittal to the requesting device.

Turning more specifically to FIG. 13G, although not specifically discussed or depicted in either of FIG. 13E or 13F, embodiments of the distributed processing system 2000 are possible in which data objects 2330, 2370 and/or 2440 may be stored as a mixture of storage as undivided data objects and storage in a distributed manner Δgain, the manner in which each data object 2330, 2370 and 2440 is stored may depend upon its size relative to a predetermined threshold size. More specifically, where a data object 2330, 2370 or 2440 is of a size that is smaller than the predetermined threshold size, that data object may be stored within a single one of the storage devices 2600 as a single undivided object. However, where a data object 2330, 2370 or 2440 is or a size that exceeds the predetermined threshold size, that data object may be converted from the form in which it was received and into a distributable form, and may then be stored in a distributed manner among multiple storage devices 2600 as multiple blocks 2336*d*, 2376*d* and/or 2770*d*, respectively.

As also more specifically depicted in FIG. 13G, it may be that such storage of data objects 2330, 2370 and/or 2440 (either as undivided data objects and/or in a distributed manner as data object blocks) is across one or more federated devices 2500, either in addition to or in lieu of such storage across one or more storage devices 2600. In such embodiments, it may be the processor(s) 2550 of one or more other federated device(s) 2500 designated as 2500*a-x* that execute instructions of the nodal storage routine 2641 to perform operations associated with storing data objects and/or data object blocks, and/or it may be the processor(s) 2550 of one or more federated devices 2500 designated as 2500*z* that execute instructions of the master storage routine 2649 to perform operations to coordinate the storage of data objects in at least a distributed manner.

Figure 14A:
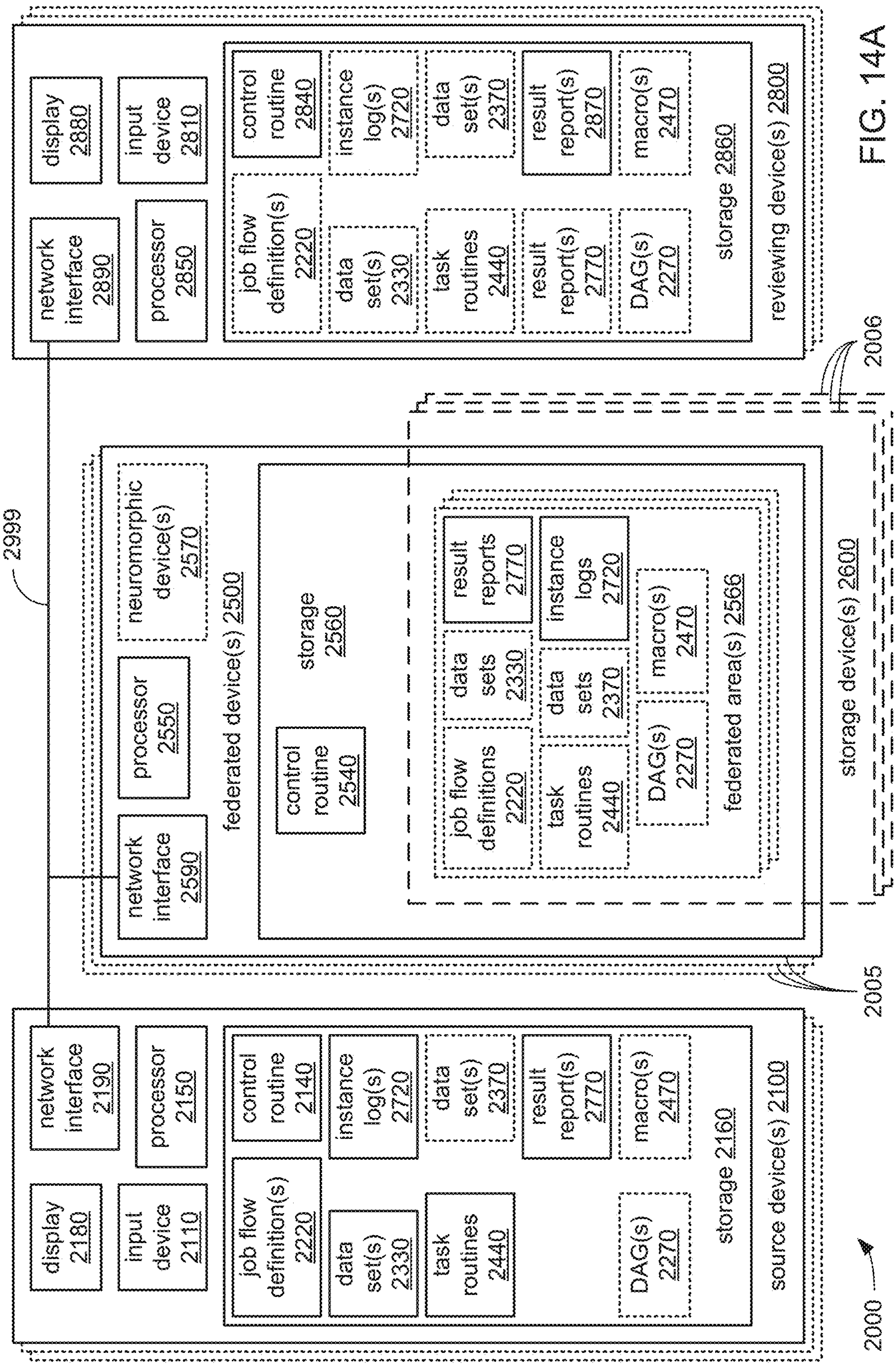
FIGS. 14A and 14B, together, illustrate an example alternate embodiment of a distributed processing system.
Figure 14B:
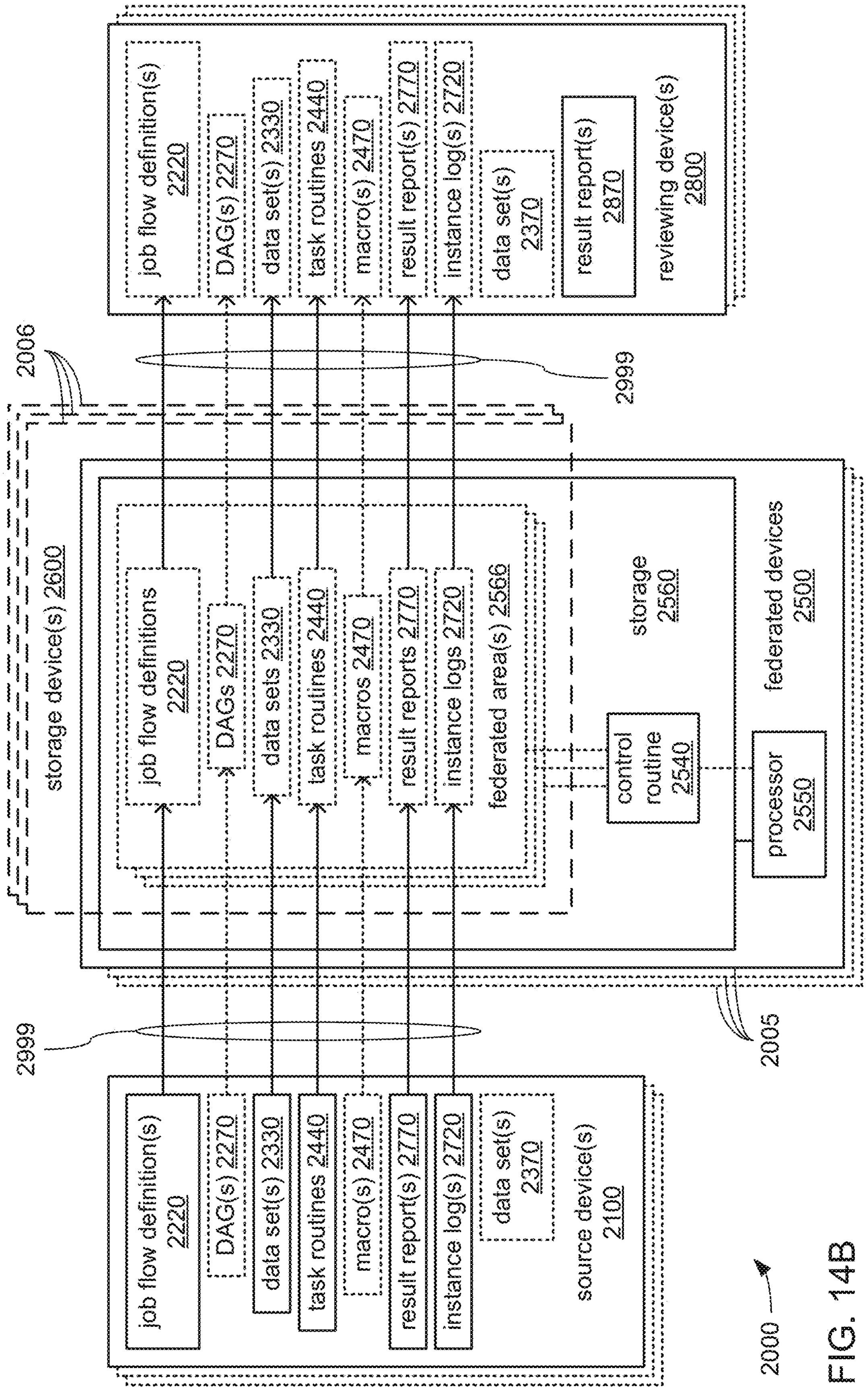

FIG. 14A illustrates a block diagram of another example embodiment of a distributed processing system 2000 also incorporating one or more source devices 2100, one or more reviewing devices 2800, one or more federated devices 2500 that may form the federated device grid 2005, and/or one or more storage devices 2600 that may form the storage device grid 2006. FIG. 14B illustrates exchanges, through a network 2999, of communications among the devices 2100, 2500, 2600 and/or 2800 associated with the controlled storage of and/or access to various objects within one or more federated areas 2566. The example distributed processing system 2000 of FIGS. 14A-B is substantially similar to the example processing system 2000 of FIGS. 13A-B, but features an alternate embodiment of the one or more federated devices 2500 providing an embodiment of the one or more federated areas 2566 within which job flows are not performed. Thus, while task routines 2440 may be executed by the one or more federated devices 2500 within each of the one or more federated areas 2566 in addition to storing objects within each of the one or more federated areas 2566 of FIGS. 13A-B, in FIGS. 14A-B, each of the one or more federated areas 2566 serves as a location in which objects may be stored, but within which no task routines 2440 are executed.

Instead, in the example distributed processing system 2000 of FIGS. 14A-B, the performance of job flows, including the execution of task routines 2440 of job flows, may be performed by the one or more source devices 2100 and/or by the one or more reviewing devices 2800. Thus, as best depicted in FIG. 14B, the one or more source devices 2100 may be operated to interact with the one or more federated devices 2500 to more simply store a variety of objects associated with the performance of a job flow within the one or more source devices 2100. More specifically, one of the source devices 2100 may be operated to store, in a federated area 2566, a result report 2770 and/or an instance log 2720 associated with a performance of a job flow defined by a job flow definition 2220, in addition to also being operated to store the job flow definition 2220, along with the associated task routines 2440 and any associated data sets 2330 in a federated area 2566. Additionally, such a one of the source devices 2100 may also store any DAGs 2270 and/or macros 2470 that may be associated with those task routines 2440. As a result, each of the one or more federated areas 2566 is employed to store a record of performances of job flows that occur externally thereof.

Correspondingly, as part of a review of a performance of a job flow, the one or more reviewing devices 2800 may be operated to retrieve the job flow definition 2220 of the job flow, along with the associated task routines 2440 and any associated data sets 2330 from a federated area 2566, in addition to retrieving the corresponding result report 2770 generated by the performance and/or the instance log 2720 detailing aspects of the performance. With such a more complete set of the objects associated with the performance retrieved from one or more federated areas 2566, the one or more reviewing devices 2800 may then be operated to independently repeat the performance earlier carried out by the one or more source devices 2100. Following such an independent performance, a new result report 2870 generated by the independent performance may then be compared to the retrieved result report 2770 as part of reviewing the outputs of the earlier performance Where macros 2470 and/or DAGs 2270 associated with the associated task routines 2440 are available, the one or more reviewing devices 2800 may also be operated to retrieve them for use in analyzing any discrepancies revealed by such an independent performance.

Referring back to all of FIGS. 13A-B and 14A-B, the role of generating objects and the role of reviewing the use of those objects in a past performance have been presented and discussed as involving separate and distinct devices, specifically, the source devices 2100 and the reviewing devices 2800, respectively. However, it should be noted that other embodiments are possible in which the same one or more devices may be employed in both roles such that at least a subset of the one or more source devices 2100 and the one or more reviewing devices 2800 may be one and the same.

Figure 15A:
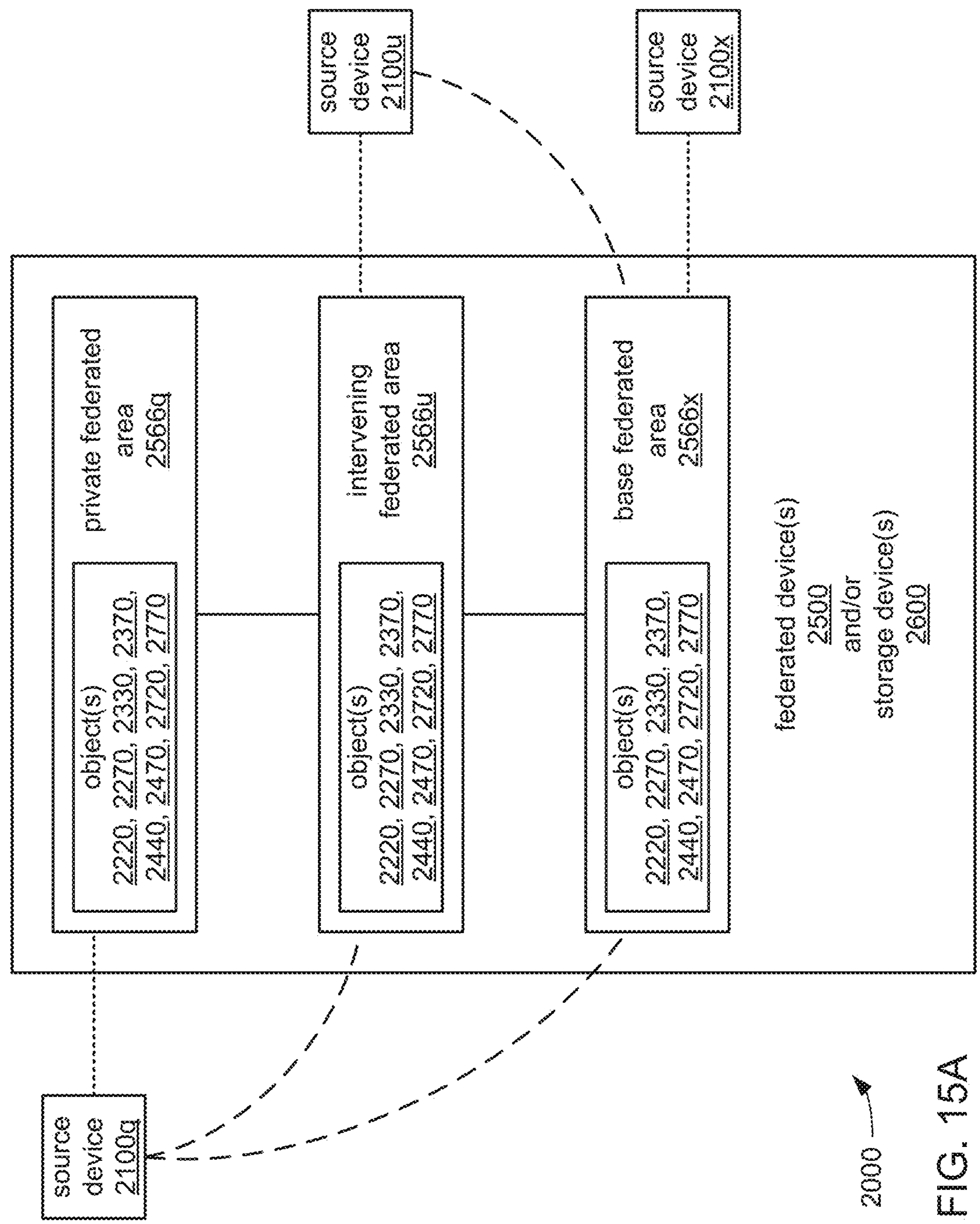
FIGS. 15A, 15B, 15C, 15D, 15E, 15F, 15G, 15H, 15I, 15J and 15K, together, illustrate aspects of example hierarchical sets of federated areas and their formation.
Figure 15B:
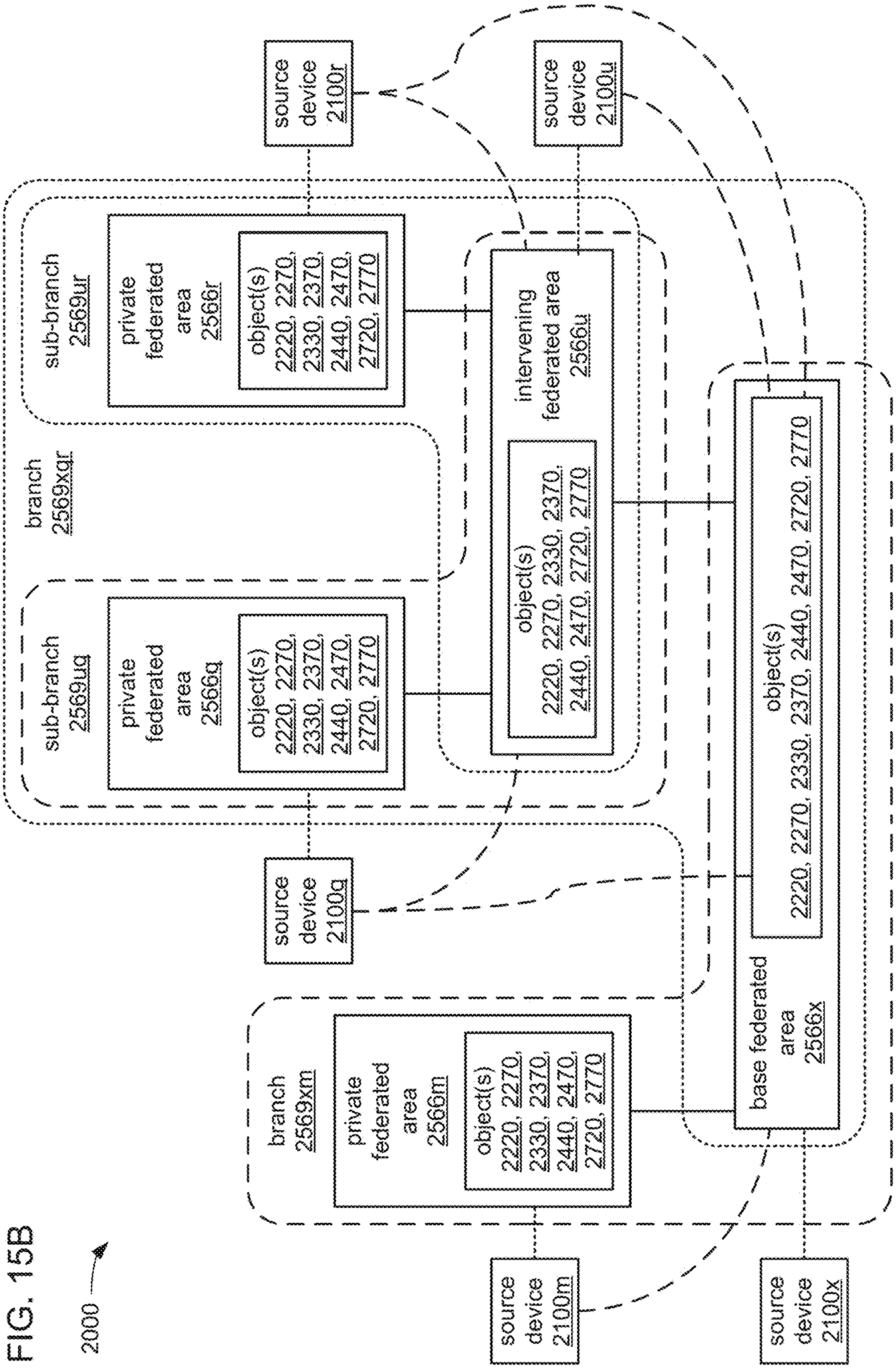
Figure 15C:
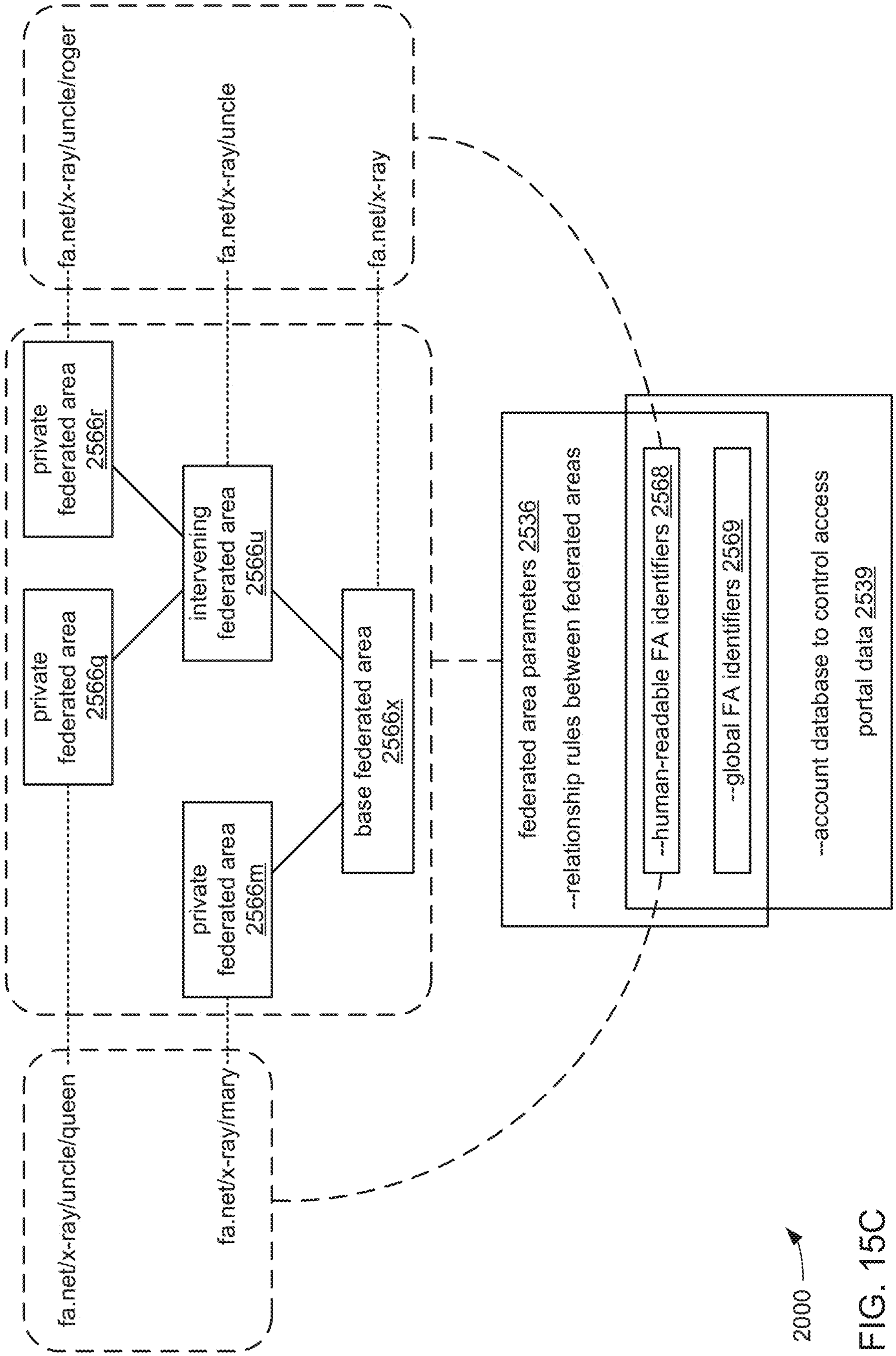
Figure 15D:
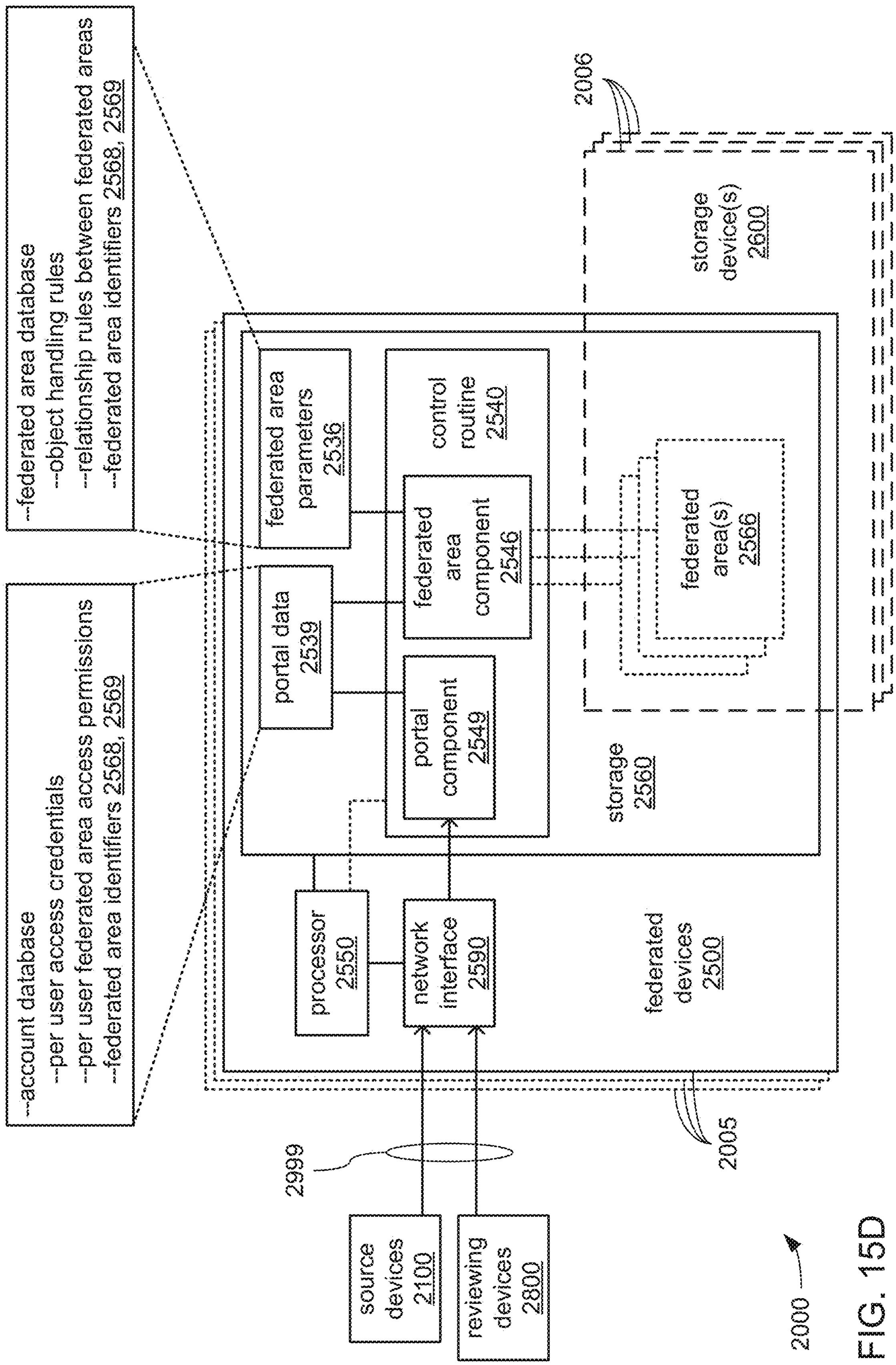
Figure 15E:
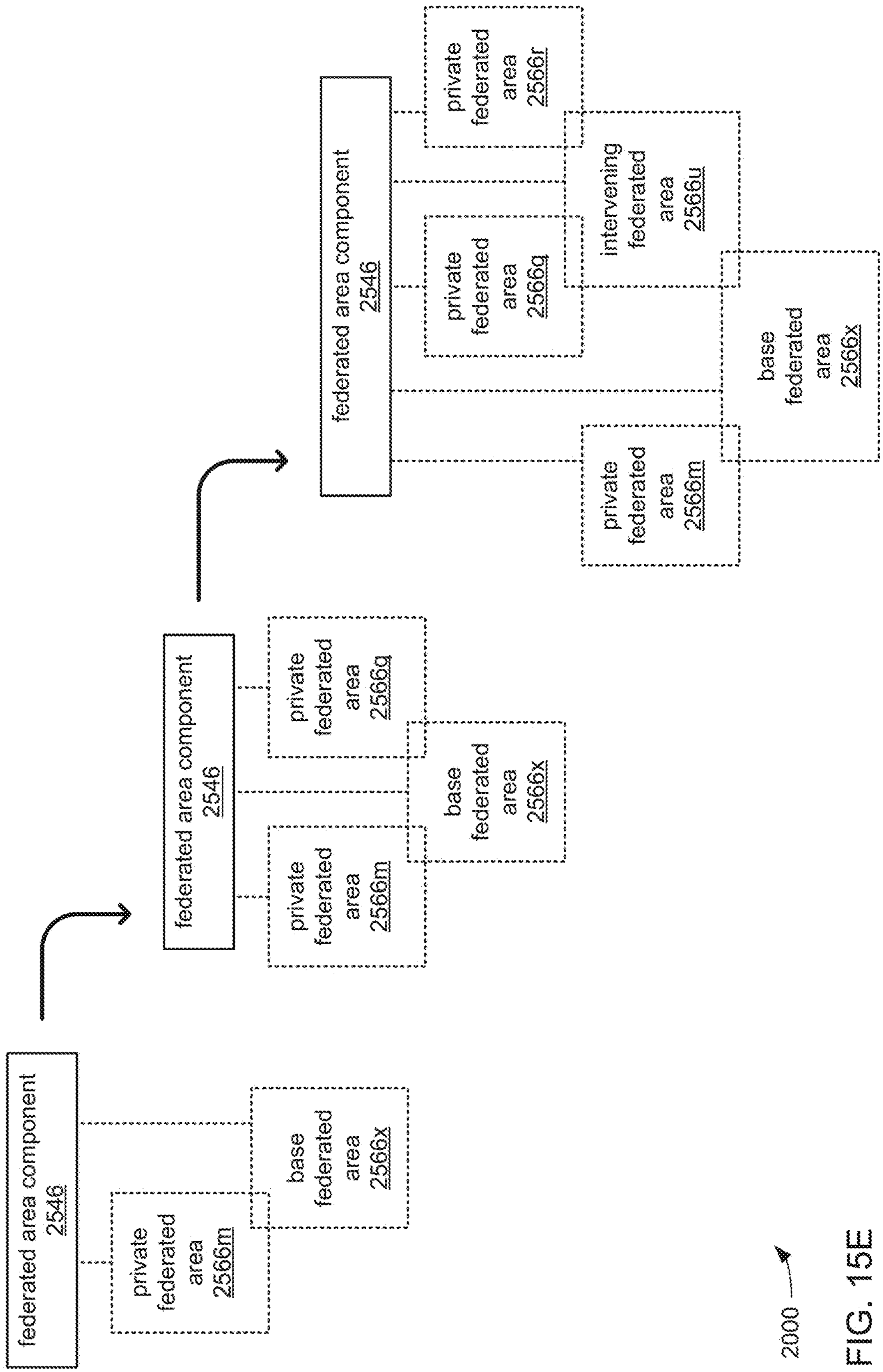
Figure 15F:
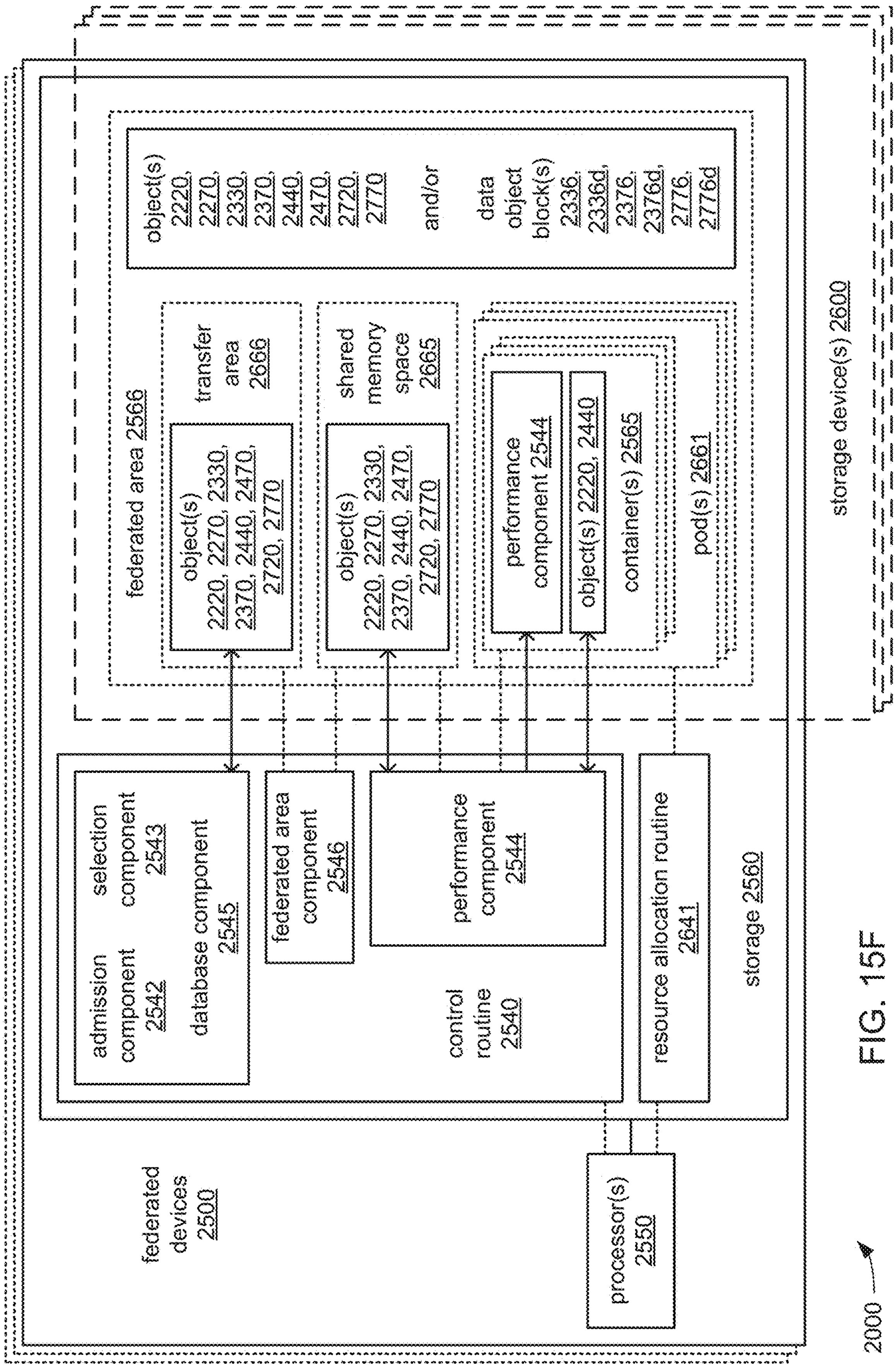
Figure 15G:
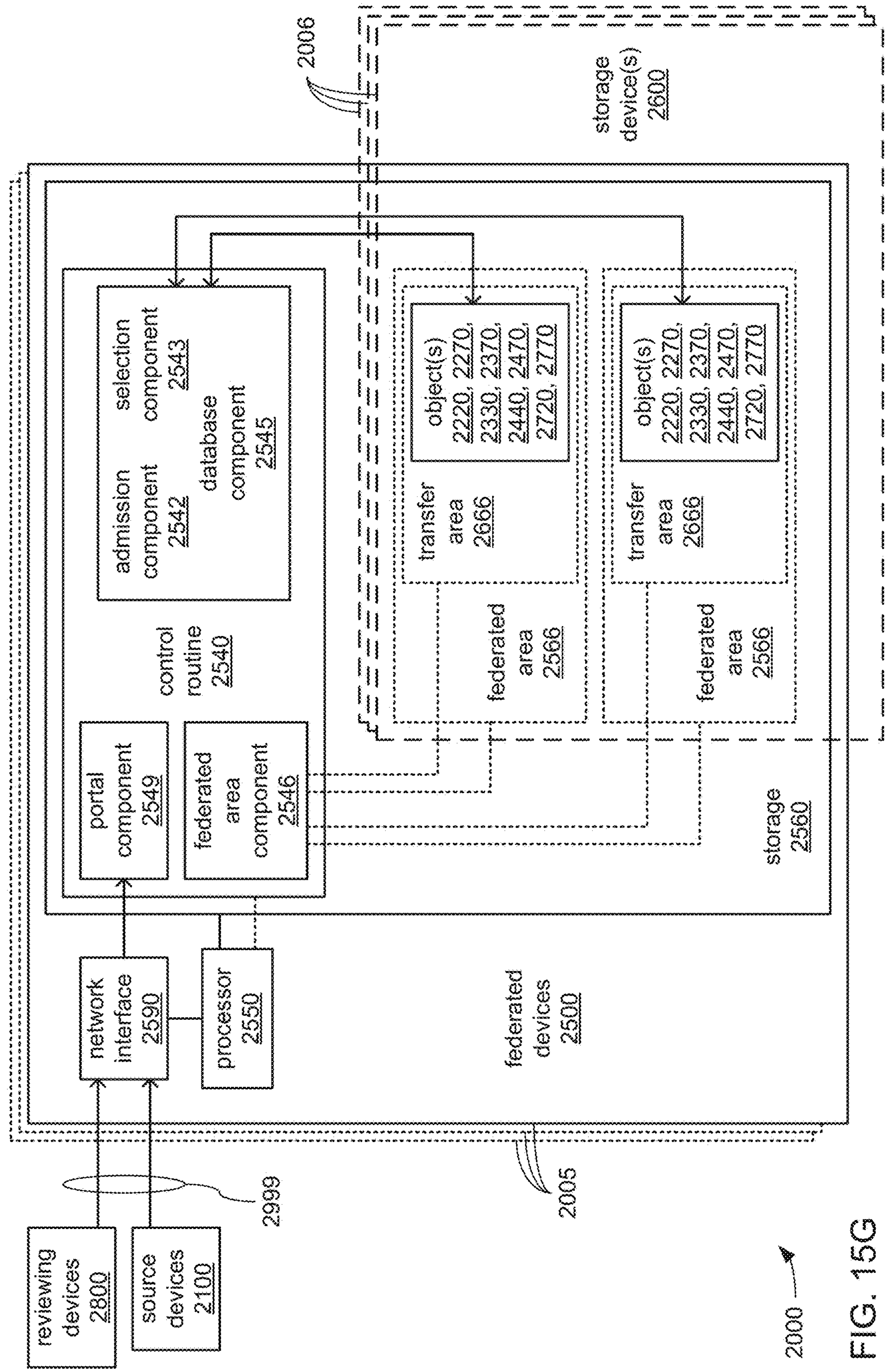
Figure 15H:
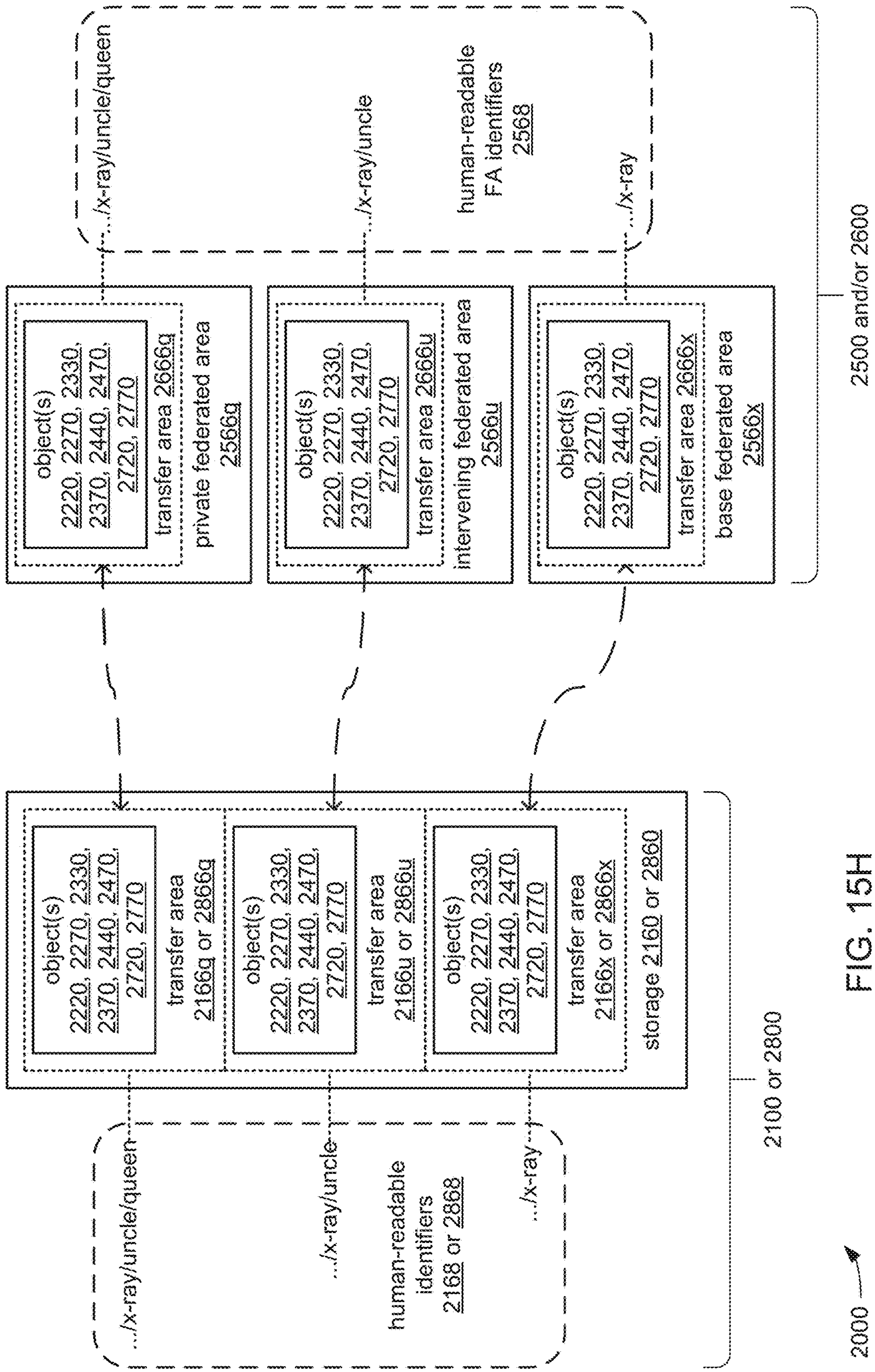
Figure 15I:
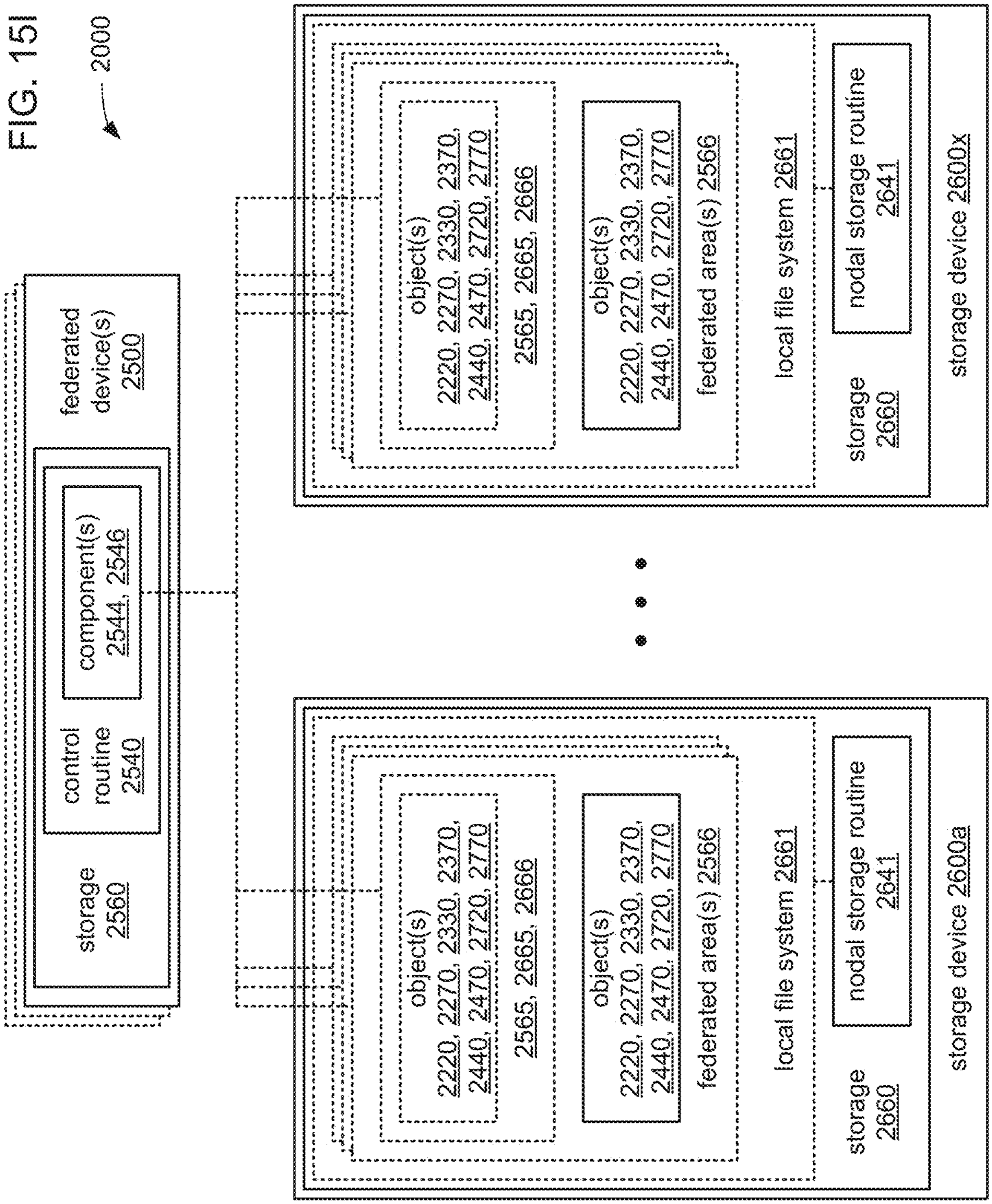
Figure 15J:
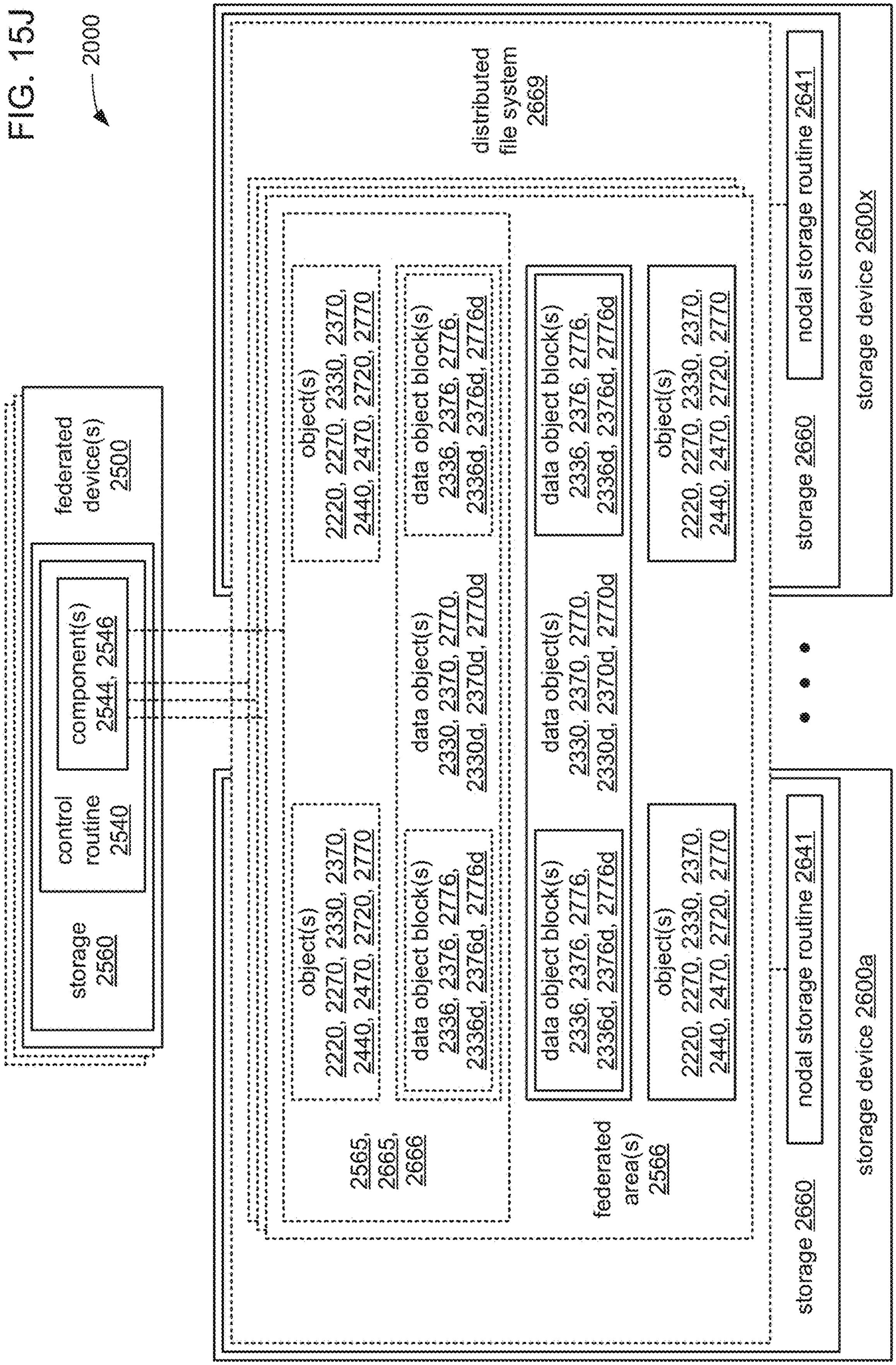
Figure 15K:
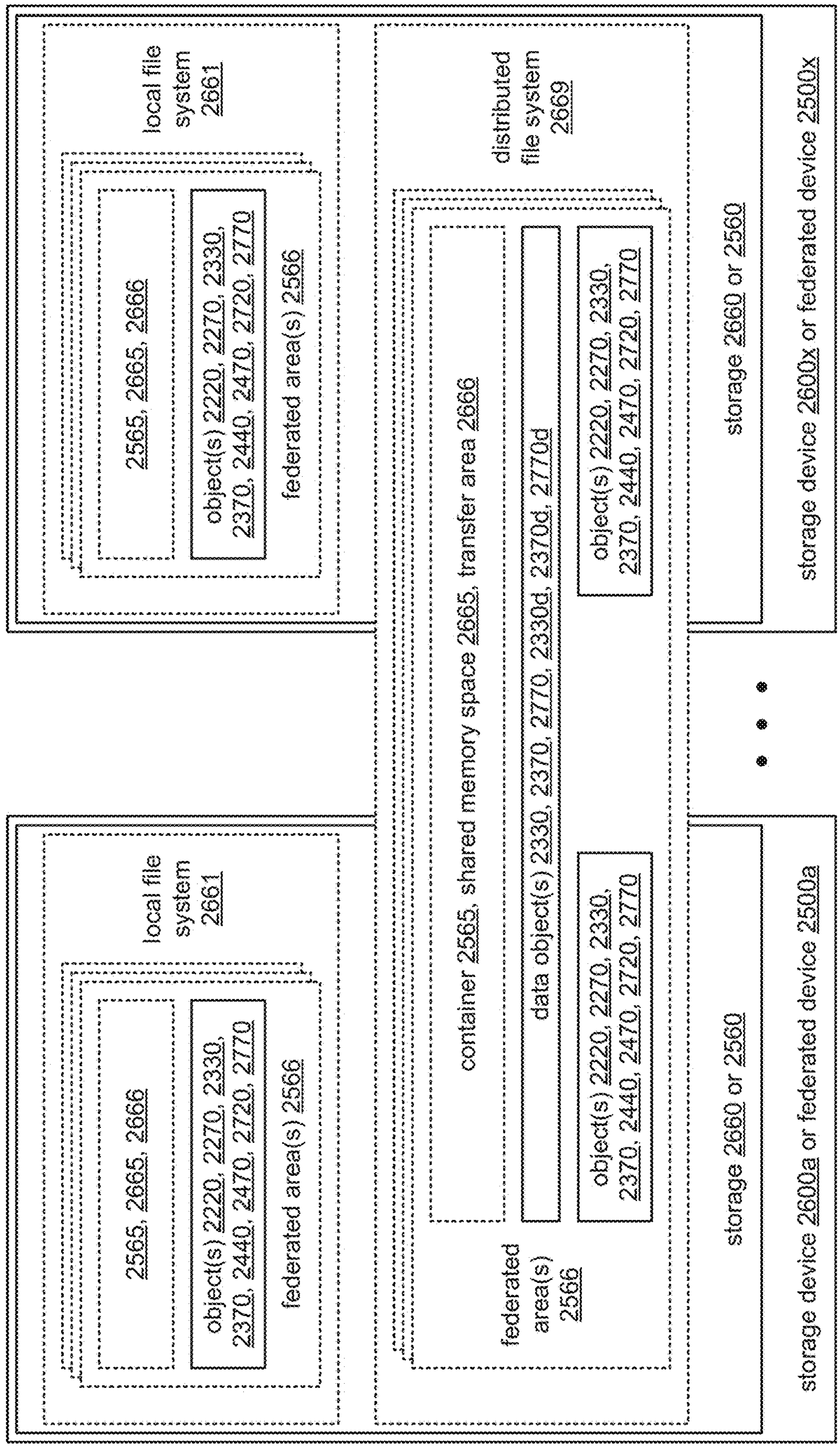

FIGS. 15A, 15B, 15C, 15D, 15E, 15F, 15G, 15H, 15I, 15J and 15K, together, illustrate aspects of the provision of, and interactions among, multiple related federated areas 2566 by the one or more federated devices 2500. FIG. 15A depicts aspects of a linear hierarchy of federated areas 2566, FIG. 15B depicts aspects of a hierarchical tree of federated areas 2566, and FIG. 15C depicts aspects of navigating among federated areas 2566 within the hierarchical tree of FIG. 15B. FIGS. 15A-C, together, also illustrate aspects of one or more relationships that may be put in place among federated areas 2566 that may control access to objects stored therein. FIG. 15D illustrates aspects of selectively allowing users of one or more federated areas 2566 to exercise control over various aspects thereof. FIG. 15E illustrates aspects of supporting the addition of new federated areas 2566 and/or new users of federated areas 2566, using an example of building a set of related federated areas 2566 based on the example hierarchical tree of federated areas introduced in FIGS. 15B-C. FIGS. 15F-H, together, illustrate aspects of allocating portion(s) of one or more federated areas for one or more specialized functions. FIGS. 15I-K, together, illustrate various ways in which federated areas 2566 and/or their contents may be defined within storage space(s) provided by one or more storage devices 2600 and/or one or more federated devices 2500.

Turning to FIG. 15A, a set of federated areas 2566*q*, 2566*u* and 2566*x* may be maintained within the storage(s) 2560 of the one or more federated devices 2500 and/or within the one or more storage devices 2600. As depicted, a linear hierarchy of degrees of restriction of access may be put in place among the federated areas 2566*q*, 2566*u* and 2566*x*. More specifically, the federated area 2566*q* may be a private federated area subject to the greatest degree of restriction in access among the depicted federated areas 2566*q*, 2566*u* and 2566*x*. In contrast, the base federated area 2566*x* may a more "public" federated area to the extent that it may be subject to the least restricted degree of access among the depicted federated areas 2566*q*, 2566*u* and 2566*x*. Further, the intervening federated area 2566*u* may be subject to an intermediate degree of restriction in access ranging from almost as restrictive as the greater degree of restriction applied to the private federated area 2566*q* to almost as unrestrictive as the lesser degree of restriction applied to the base federated area 2566*x*. Stated differently, the number of users granted access may be the largest for the base federated area 2566*x*, may progressively decrease to an intermediate number for the intervening federated area 2566*u*, and may progressively decrease further to a smallest number for the private federated area 2566*q*.

There may be any of a variety of scenarios that serve as the basis for selecting the degrees of restriction of access to each of the federated areas 2566*q*, 2566*u* and 2566*x*. By way of example, all three of these federated areas may be under the control of a user of the source device 2100*q* where such a user may desire to provide the base federated area 2566*x* as a storage location to which a relatively large number of other users may be granted access to make use of objects stored therein by the user of the source device 2100*q* and/or at which other users may store objects as a mechanism to provide objects to the user of the source device 2100*q*. Such a user of the source device 2100*q* may also desire to provide the intervening federated area 2566*u* as a storage location to which a smaller number of selected other users may be granted access, where the user of the source device 2100*q* desires to exercise tighter control over the distribution of objects stored therein.

As a result of this hierarchical range of restrictions in access, a user of the depicted source device 2100*x* may be granted access to the base federated area 2566*x*, but not to either of the other federated areas 2566*u* or 2566*q*. A user of the depicted source device 2100*u* may be granted access to the intervening federated area 2566*u*, and as depicted, such a user of the source device 2100*u* may also be granted access to the base federated area 2566*x*, for which restrictions in access are less than that of the intervening federated area 2566*u*. However, such a user of the source device 2100*u* may not be granted access to the private federated area 2566*q*. In contrast, a user of the source device 2100*q* may be granted access to the private federated area 2566*q*. As depicted, may also be granted access to the intervening federated area 2566*u* and the base federated area 2566*x*, both of which are subject to lesser restrictions in access than the private federated area 2566*q*.

As a result of the hierarchy of access restrictions just described, users granted access to the intervening federated area 2566*u* are granted access to objects 2220, 2270, 2330, 2370, 2440, 2470, 2720 and/or 2770 that may be stored within either of the intervening federated area 2566*u* or the base federated area 2566*x*. To enable such users to request the performance of job flows using objects stored in either of these federated areas 2566*x* and 2566*u*, an inheritance relationship may be put in place between the intervening federated area 2566*u* and the base federated area 2566*x* in which objects stored within the base federated area 2566*x* may be as readily available to be utilized in the performance of a job flow at the request of a user of the intervening federated area 2566*u* as objects that are stored within the intervening federated area 2566*u*.

Similarly, also as a result of the hierarchy of access restrictions just described, the one or more users granted access to the private federated area 2566*q* are granted access to objects 2220, 2270, 2330, 2370, 2440, 2470, 2720 and/or 2770 that may be stored within any of the private federated area 2566*q*, the intervening federated area 2566*u* or the base federated area 2566*x*. Correspondingly, to enable such users to request the performance of job flows using objects stored in any of these federated areas 2566*x* and 2566*u*, an inheritance relationship may be put in place among the private federated area 2566*q*, the intervening federated area 2566*u* and the base federated area 2566*x* in which objects stored within the base federated area 2566*x* or the intervening federated area 2566*u* may be as readily available to be utilized in the performance of a job flow at the request of a user of the private federated area 2566*q* as objects that are stored within the private federated area 2566*q*.

Such inheritance relationships among the federated areas 2566*q*, 2566*u* and 2566*x* may be deemed desirable to encourage efficiency in the storage of objects throughout by eliminating the need to store multiple copies of the same objects throughout multiple federated areas 2566 to make them accessible throughout a hierarchy thereof. More precisely, a task routine 2440 stored within the base federated area 2566*x* need not be copied into the private federated area 2566*q* to become available for use during the performance of a job flow requested by a user of the private federated area 2566*q* and defined by a job flow definition 2220 that may be stored within the private federated area 2566*q*.

In some embodiments, such inheritance relationships may be accompanied by corresponding priority relationships to provide at least a default resolution to instances in which multiple versions of an object are stored in different ones of the federated areas 2566*q*, 2566*u* and 2566*x* such that one version thereof must be selected from among multiple federated areas for use in the performance of a job flow. By way of example, and as will be explained in greater detail, there may be multiple versions of a task routine 2440 that may be stored within a single federated area 2566 or across multiple federated areas 2566. This situation may arise as a result of improvements being made to such a task routine 2440, and/or for any of a variety of other reasons. Where a priority relationship is in place between at least the base federated area 2566*x* and the intervening federated area 2566*u*, in addition to an inheritance relationship therebetween, and where there is a different version of a task routine

2440 within each of the federated areas 2566*u* and 2566*x* that may be used in the performance of a job flow requested by a user of the intervening federated area 2566*u* (e.g., through the source device 2100*u*), priority may be automatically given by the processor(s) 2550 of the one or more federated devices 2500 to using a version stored within the intervening federated area 2566*u* over using any version that may be stored within the base federated area 2566*x*. Stated differently, the processor(s) 2550 of the one or more federated devices 2500 may be caused to search within the intervening federated area 2566*u*, first, for a version of such a task routine 2440, and may use a version found therein if a version is found therein. The processor(s) 2550 of the one or more federated devices 2500 may then entirely forego searching within the base federated area 2566*x* for a version of such a task routine 2440, unless no version of the task routine 2440 is found within the intervening federated area 2566*u*.

Similarly, where a priority relationship is in place between among all three of the federated areas 2566*x*, 2566*u* and 2566*q*, in addition to an inheritance relationship thereamong, and where there is a different version of a task routine 2440 within each of the federated areas 2566*q*, 2566*u* and 2566*x* that may be used in the performance of task of a job flow requested by a user of the private federated area 2566*q* (e.g., through the source device 2100*q*), priority may be automatically given to using the version stored within the private federated area 2566*q* over using any version that may be stored within either the intervening federated area 2566*u* or the base federated area 2566*x*. However, if no version of such a task routine 2440 is found within the private federated area 2566*q*, then the processor(s) 2550 of the one or more federated devices 2500 may be caused to search next within the intervening federated area 2566*u* for a version of such a task routine 2440, and may use a version found therein if a version is found therein. However, if no version of such a task routine 2440 is found within either the private federated area 2566*q* or the intervening federated area 2566*u*, then the processor(s) 2550 of the one or more federated devices 2500 may be caused to search within the base federated area 2566*x* for a version of such a task routine 2440, and may use a version found therein if a version is found therein.

In some embodiments, inheritance relationships may be accompanied by corresponding dependency relationships that may be put in place to ensure that all objects required to perform a job flow continue to be available. As will be explained in greater detail, for such purposes as enabling accountability and/or investigating errors in analyses, it may be deemed desirable to impose restrictions against actions that may be taken to delete (or otherwise make inaccessible) objects stored within a federated area 2566 that are needed to perform a job flow that is defined by a job flow definition 2220 within that same federated area 2566. Correspondingly, where an inheritance relationship is put in place among multiple federated areas 2566, it may be deemed desirable to put a corresponding dependency relationship in place in which similar restrictions are imposed against deleting (or otherwise making inaccessible) an object in one federated area 2566 that may be needed for the performance of a job flow defined by a job flow definition 2220 stored within another federated area 2566 that is related by way of an inheritance relationship put in place between the two federated areas 2566. More specifically, where a job flow definition 2220 is stored within the intervening federated area 2566*u* that defines a job flow that requires a task routine 2440 stored within the base federated area 2566*x* (which is made accessible from within the intervening federated area 2566*u* as a result of an inheritance relationship with the base federated area 2566*x*), the processor(s) 2550 of the one or more federated devices 2500 may not permit the task routine 2440 stored within the base federated area 2566*x* to be deleted. However, in some embodiments, such a restriction against deleting the task routine 2440 stored within the base federated area 2566*x* may cease to be imposed if the job flow definition 2220 that defines the job flow that requires that task routine 2440 is deleted, and there are no other job flow definitions 2220 stored elsewhere that also have such a dependency on that task routine 2440.

Similarly, where a job flow definition 2220 is stored within the private federated area 2566*q* that defines a job flow that requires a task routine 2440 stored within either the intervening federated area 2566*u* or the base federated area 2566*x* (with which there may be an inheritance relationship), the processor(s) of the one or more federated devices 2500 may not permit that task routine 2440 to be deleted. However, such a restriction against deleting that task routine 2440 may cease to be imposed if the job flow definition 2220 that defines the job flow that requires that task routine 2440 is deleted, and there are no other job flow definitions 2220 stored elsewhere that also have such a dependency on that task routine 2440.

In concert with the imposition of inheritance and/or priority relationships among a set of federated areas 2566, the exact subset of federated areas 2566 to which a user is granted access may be used as a basis to automatically select a "perspective" from which job flows may be performed by the one or more federated devices 2500 at the request of that user. Stated differently, where a user requests the performance of a job flow, the retrieval of objects required for that performance may be based, at least by default, on what objects are available at the federated area 2566 among the one or more federated areas 2566 to which the user is granted access that has highest degree of access restriction. The determination of what objects are so available may take into account any inheritance and/or priority relationships that may be in place that include such a federated area 2566. Thus, where a user granted access to the private federated area 2566*q* requests the performance of a job flow, the processor(s) 2550 of the federated devices 2500 may be caused to select the private federated area 2566*q* as the perspective on which determinations concerning which objects are available for use in that performance will be based, since the federated area 2566*q* is the federated area 2566 with the most restricted access that the user has been granted access to within the depicted linear hierarchy of federated areas 2566. With the private federated area 2566*q* so selected as the perspective, any inheritance and/or priority relationships that may be in place between the private federated area 2566*q* and either of the intervening federated area 2566*u* or the base federated area 2566*x* may be taken into account in determining whether any objects stored within either are to be deemed available for use in that performance (which may be a necessity if there are any objects that are needed for that performance that are not stored within the private federated area 2566*q*).

Alternatively or additionally, in some embodiments, such an automatic selection of perspective may be used to select the storage space in which a performance takes place. Stated differently, as part of maintaining the security that is intended to be provided through the imposition of a hierarchy of degrees of access restriction across multiple federated areas 2566, a performance of a job flow requested by a user may, at least by default, be performed within the federated area that has the highest degree of access restriction among the one or more federated areas to which that user has been granted access. Thus, where a user granted access to the private federated area 2566*q* requests a performance of a job flow by the one or more federated devices 2500, such a requested performance of that job flow may automatically be so performed by the processor(s) 2550 of the one or more federated devices 2500 within the storage space of the private federated area 2566*q*. In this way, aspects of such a performance are kept out of reach from other users that have not been granted access to the private federated area 2566*q*, including any objects that may be generated as a result of such a performance (e.g., mid-flow data sets 2370, result reports 2770, etc.). Such a default selection of a federated area 2566 having more restricted access in which to perform a job flow may be based on a presumption that each user will prefer to have the job flow performances that they request being performed within the most secure federated area 2566 to which they have been granted access.

It should be noted that, although a linear hierarchy of just three federated areas is depicted in FIG. 15A for sake of simplicity of depiction and discussion, other embodiments of a linear hierarchy are possible in which there may be multiple intervening federated areas 2566 of progressively changing degree of restriction in access between the base federated area 2566*x* and the private federated area 2566*q*. Therefore, the depicted quantity of federated areas should not be taken as limiting.

It should also be noted that, although just a single source device 2100 is depicted as having been granted access to each of the depicted federated areas 2566, this has also been done for sake of simplicity of depiction and discussion, and other embodiments are possible in which access to one or more of the depicted federated areas 2566 may be granted to users of more than one device. More specifically, the manner in which restrictions in access to a federated area 2566 may be implemented may be in any of a variety of ways, including and not limited to, restricting access to one or more particular users (e.g., through use of passwords or other security credentials that are associated with particular persons and/or with particular organizations of people), or restricting access to one or more particular devices (e.g., through certificates or security credentials that are stored within one or more particular devices that may be designated for use in gaining access).

Turning to FIG. 15B, a larger set of federated areas 2566*m*, 2566*q*, 2566*r*, 2566*u* and 2566*x* may be maintained within the storage(s) 2560 of the one or more federated devices 2500 and/or within the one or more storage devices 2600. As depicted, a tree-like hierarchy of degrees of restriction of access, similar to the hierarchy depicted in FIG. 15A, may be put in place among the federated areas 2566 within each of multiple branches and/or sub-branches of the depicted hierarchical tree. More specifically, each of the federated areas 2566*m*, 2566*q* and 2566*r* may be a private federated area subject to the highest degrees of restriction in access among the depicted federated areas 2566*m*, 2566*q*, 2566*r*, 2566*u* and 2566*x*. Again, in contrast, the base federated area 2566*x* may be a more public federated area to the extent that it may be subject to the least restricted degree of access among the depicted federated areas 2566*m*, 2566*q*, 2566*r*, 2566*u* and 2566*x*. Further, the intervening federated area 2566*u* interposed between the base federated area 2566*x* and each of the private federated areas 2566*q* and 2566*r* may be subject to an intermediate degree of restriction in access ranging from almost as restrictive as the degree of restriction applied to either of the private federated areas 2566*q* or 2566*r* to almost as unrestrictive as the degree of restriction applied to the base federated area 2566*x*. Thus, as in the case of the linear hierarchy depicted in FIG. 15A, the number of users granted access may be the largest for the base federated area 2566*x*, may progressively decrease to an intermediate number for the intervening federated area 2566*u*, and may progressively decrease further to smaller numbers for each of the private federated areas 2566*m*, 2566*q* and 2566*r*. Indeed, the hierarchical tree of federated areas 2566 of FIG. 15B shares many of the characteristics concerning restrictions of access of the linear hierarchy of federated areas 2566 of FIG. 15A, such that the linear hierarchy of FIG. 15A may be aptly described as a hierarchical tree without branches.

As a result of the depicted hierarchical range of restrictions in access, a user of the depicted source device 2100*x* may be granted access to the base federated area 2566*x*, but not to any of the other federated areas 2566*m*, 2566*q*, 2566*r* or 2566*u*. A user of the depicted source device 2100*u* may be granted access to the intervening federated area 2566*u*, and may also be granted access to the base federated area 2566*x*, for which restrictions in access are less than that of the intervening federated area 2566*u*. However, such a user of the source device 2100*u* may not be granted access to any of the private federated areas 2566*m*, 2566*q* or 2566*r*. In contrast, a user of the source device 2100*q* may be granted access to the private federated area 2566*q*, and may also granted access to the intervening federated area 2566*u* and the base federated area 2566*x*, both of which are subject to lesser restrictions in access than the private federated area 2566*q*. A user of the source device 2100*r* may similarly be granted access to the private federated area 2566*r*, and may similarly also be granted access to the intervening federated area 2566*u* and the base federated area 2566*x*. Additionally, a user of the source device 2100*m* may be granted access to the private federated area 2566*m*, and may also be granted access to the base federated area 2566*x*. However, none of the users of the source devices 2100*m*, 2100*q* and 2100*r* may be granted access to the others of the private federated areas 2566*m*, 2566*q* and 2566*r*.

As in the case of the linear hierarchy of FIG. 15A, within the depicted branch 2569*xm*, one or more of inheritance, priority and/or dependency relationships may be put in place to enable objects stored within the base federated area 2566*x* to be accessible from the private federated area 2566*m* to the same degree as objects stored within the private federated area 2566*m*. Similarly, within the depicted branch 2569*xqr*, and within each of the depicted sub-branches 2569*uq* and 2569*ur*, one or more of inheritance, priority and/or dependency relationships may be put in place to enable objects stored within either of the intervening federated area 2566*u* and the base federated area 2566*x* to be accessible from the private federated areas 2566*q* and 2566*r* to the same degree as objects stored within the private federated areas 2566*q* and 2566*r*, respectively.

Turning to FIG. 15C, the same hierarchical tree of federated areas 2566*m*, 2566*q*, 2566*r*, 2566*u* and 2566*x* of FIG. 15B is again depicted to illustrate an example of the use of human-readable forms of identification to enable a person to distinguish among multiple federated areas 2566, and to navigate about the hierarchical tree toward a desired one of the depicted federated areas 2566*m*, 2566*q*, 2566*r*, 2566*u* or 2566*x*. More specifically, each of the federated areas 2566*m*, 2566*q*, 2566*r*, 2566*u* and 2566*x* may be assigned a human-readable textual name such as the depicted textual names "mary", "queen", "roger", "uncle" and "x-ray", respectively. In some embodiments, each of these human-readable names may be stored and maintained as a human-readable federated area identifier 2568, where the human-readable text of each such human-readable FA identifier 2568 may have any of a variety of meanings to the persons who assign and use them, including and not limited to, indications of who each of these federated areas 2566 belongs to, what the purpose of each of these federated areas 2566 is deemed to be, how each of these federated areas 2566 relates to the others functionally and/or in terms of location within the depicted tree, etc.

In this depicted example, these depicted human-readable FA identifiers 2568 have been created to also serve as part of a system of navigation in which a web browser of a remote device (e.g., one of the devices 2100 or 2800) may be used with standard web access techniques through the network 2999 to navigate about the depicted tree. More specifically, each of these human-readable FA identifiers 2568 may form at least part of a corresponding URL that may be structured to provide an indication of where its corresponding one of these federated areas 2566 is located within the hierarchical tree. By way of example, the URL of the base federated area 2566*x*, which is located at the root of the tree, may include the name "x-ray" of the base federated area 2566*x*, but not include any of the names assigned to any other of these federated areas. In contrast, each of the URLs of each of the private federated areas located at the leaves of the hierarchical tree may be formed, at least partially, as a concatenation of the names of the federated areas that are along the path from each such private federated area at a leaf location of the tree to the base federated area 2566*x* at the root of the tree. By way of example, the private federated area 2566*r* may be assigned a URL that includes the names of the private federated area 2566*r*, the intervening federated area 2566*u* and the base federated area 2566*x*, thereby providing an indication of the entire path from the leaf position of the private federated area 2566*r* within the tree to the root position of the base federated area 2566*x*.

In some embodiments, either in lieu of the assignment of human-readable FA identifiers 2568, or in addition to the assignment of human-readable FA identifiers 2568, each federated area 2566 may alternatively or additionally be assigned a global federated area identifier 2569 (GUID) that is intended to be unique across all federated areas 2566 that may be instantiated around the world. In some of such embodiments, such uniqueness may be made at least highly likely by generating each such global FA identifier 2569 as a random number or other form of randomly generated set of bits with a relatively large bit width such that the possibility of two federated areas 2566 ever being assigned the same global FA identifier 2569 is deemed sufficiently small that each global FA identifiers 2569 is deemed, for all practical purposes, to be unique across the entire world. Such practically unique global FA identifiers 2569 may be so generated and assigned to each federated area 2566 in addition to the human-readable FA identifiers 2568 to provide a mechanism by which each federated area 2566 will always remain uniquely distinguishable from all others, regardless of any situation that may arise where two or more federated areas 2566 are somehow given identical human-readable FA identifiers 2568.

It should be noted that, unlike the human-readable FA identifiers 2568 that may be manually entered and assigned by an operator of another device (e.g., one of the devices 2100 or 2800) that may be in communication with the one or more federated devices 2500 via the network 2999, the global FA identifiers 2569 may be automatically generated by the one or more federated devices 2500 as part of the instantiation of any new federated area 2566. Such automatic generation of the global FA identifiers 2569 as part of instantiating any new federated area 2566 may be deemed desirable to ensure that such practically unique identification functionality is provided for each federated area 2566 from the very moment that it exists. This may also be deemed desirable to provide some degree of continuity in the unique identification of each federated area 2566 throughout the time it exists, since in some embodiments, the human-readable FA identifiers 2568 may be permitted to be changed throughout the time it exists.

Turning to FIG. 15D, the control routine 2540 executed by processor(s) 2550 of the one or more federated devices 2500 may include a federated area component 2546 to control the instantiation of, maintenance of, relationships among, and/or un-instantiation of federated areas 2566 within the storage 2560 of one or more federated devices 2500 and/or within one or more of the storage devices 2600. The control routine 2540 may also include a portal component 2549 to restrict access to the one or more federated areas 2566 to only authorized users (e.g., authorized persons, entities and/or devices), and may restrict the types of accesses made to only the federated area(s) 2566 for which each user and/or each device is authorized. However, in alternate embodiments, control of access to the one or more federated areas 2566 may be provided by one or more other devices that may be interposed between the one or more federated devices 2500 and the network 2999, or that may be interposed between the one or more federated devices 2500 and the one or more storage devices 2600 (if present), or that may still otherwise cooperate with the one or more federated devices 2500 to do so.

In executing the portal component 2549, the processor(s) 2550 of the one or more federated devices 2500 may be caused to operate one or more of the network interfaces 2590 to provide a portal accessible by other devices via the network 2999 (e.g., the source devices 2100 and/or the reviewing devices 2800), and through which access may be granted to the one or more federated areas 2566. In some embodiments in which the one or more federated devices 2500 additionally serve to control access to the one or more federated areas 2566, the portal may be implemented employing the hypertext transfer protocol over secure sockets layer (HTTPS) to provide a website securely accessible from other devices via the network 2999. Such a website may include a webpage generated by the processor 2550 that requires the provision of a password and/or other security credentials to gain access to the one or more federated areas 2566. Such a website may be configured for interaction with other devices via an implementation of representational state transfer (REST or RESTful) application programming interface (API). However, other embodiments are possible in which the processor 2550 may provide a portal accessible via the network 2999 that is implemented in any of a variety of other ways using any of a variety of handshake mechanisms and/or protocols to selectively provide secure access to the one or more federated areas 2566.

Regardless of the exact manner in which a portal may be implemented and/or what protocol(s) may be used, in determining whether to grant or deny access to the one or more federated areas 2566 to another device from which a request for access has been received, the processor(s) 2550 of the one or more federated devices 2500 may be caused to refer to indications stored within portal data 2539 of users authorized to be granted access. Such indications may include indications of security credentials expected to be provided by such persons, entities and/or machines. In some embodiments, such indications within the portal data 2539 may be organized into a database of accounts that are each associated with an entity with which particular persons and/or devices may be associated. The processor(s) 2550 may be caused to employ the portal data 2539 to evaluate security credentials received in association with a request for access to the at least one of the one or more federated areas 2566, and may operate a network interface 2590 of one of the one or more federated devices 2500 to transmit an indication of grant or denial of access to the at least one requested federated area 2566 depending on whether the processor(s) 2550 determine that access is to be granted.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. By way of example, the portal data 2539 may indicate that different users are each to be allowed to have different degrees of control over different aspects of one or more federated areas 2566. A user may be granted a relatively high degree of control such that they are able to create and/or remove one or more federated areas 2566, are able to specify which federated areas 2566 may be included in a set of federated areas, and/or are able to specify aspects of relationships among one or more federated areas 2566 within a set of federated areas. Alternatively or additionally, a user may be granted a somewhat more limited degree of control such that they are able to alter the access restrictions applied to one or more federated areas 2566 such that they may be able to control which users have access each of such one or more federated areas 2566.

The processor(s) 2550 may be caused by execution of the portal component 2549 to store indications of such changes concerning which users have access to which federated areas 2566 and/or the restrictions applied to such access as part of the portal data 2539, where such indications may take the form of sets of correlations of authorized users to federated areas 2566 and/or correlations of federated areas 2566 to authorized users. In such indications of such correlations, either or both of the human-readable FA identifiers 2568 or the global FA identifiers 2569 may be used. Where requests to add, remove and/or alter one or more federated areas 2566 are determined, through execution of the portal component 2549 to be authorized, the processor(s) 2550 may be caused by execution of the federated area component 2546 to carry out such requests.

FIG. 15E depicts an example of a series of actions that the processor(s) 2550 are caused to take in response to the receipt of a series of requests to add federated areas 2566 that eventually results in the creation of the tree of federated areas 2566 depicted in FIGS. 15B-C. As depicted, the processor(s) 2550 of the one or more federated devices 2500 may initially be caused to instantiate and maintain both the private federated area 2566*m* and the base federated area 2566*x* as part of a set of related federated areas that form a linear hierarchy of degrees of access restriction therebetween. In some embodiments, the depicted pair of federated areas 2566*m* and 2566*x* may have been caused to be generated by a user of the source device 2100*m* having sufficient access permissions (as determined via the portal component 2549) as to be able to create the private federated area 2566*m* for private storage of one or more objects that are meant to be accessible by a relatively small number of users, and to create the related public federated area 2566*x* for storage of objects meant to be made more widely available through the granting of access to the base federated area 2566*x* to a larger number of users. Such access permissions may also include the granted ability to specify what relationships may be put in place between the federated areas 2566*m* and 2566*x*, including and not limited to, any inheritance, priority and/or dependency relationships therebetween. Such characteristics about each of the federated areas 2566*m* and 2566*x* may be caused to be stored by the federated area component 2546 as part of the federated area parameters 2536. As depicted, the federated area parameters 2536 may include a database of information concerning each federated area 2566 that is caused to be instantiated and/or maintained by the federated area component 2546. As with the database of accounts just earlier described as being implemented in some embodiments within the portal data 2539, such a database of information concerning federated areas 2566 within the federated area parameters 2536 may also make use of either or both of the human-readable FA identifiers 2568 or the global FA identifiers 2569 to identify each federated area 2566.

As an alternative to both of the federated areas 2566*m* and 2566*x* having been created and caused to be related to each other through express requests by a user, in other embodiments, the processor(s) 2550 of the one or more federated devices 2500 may be caused by the federated area component 2546, and based on rules retrieved from federated area parameters 2536, to automatically create and configure the private federated area 2566*m* in response to a request to add a user associated with the source device 2100*m* to the users permitted to access the base federated area 2566*x*. More specifically, a user of the depicted source device 2100*x* that may have access permissions to control various aspects of the base federated area 2566*x* may operate the source device 2100*x* to transmit a request to the one or more federated devices 2500, via the portal provided thereby on the network 2999, to grant a user associated with the source device 2100*m* access to use the base federated area 2566*x*. In response, and in addition to so granting the user of the source device 2100*m* access to the base federated area 2566*x*, the processor(s) 2550 of the one or more federated devices 2500 may automatically generate the private federated area 2566*m* for private use by the user of the source device 2100*m*. Such automatic operations may be triggered by an indication stored in the federated area database within the federated area parameters 2536 that each user that is newly granted access to the base federated area 2566*x* is to be so provided with their own private federated area 2566. This may be deemed desirable as an approach to making the base federated area 2566*x* easier to use for each such user by providing individual private federate areas 2566 within which objects may be privately stored and/or developed in preparation for subsequent release into the base federated area 2566*x*. Such users may be able to store private sets of various tools that each may use in such development efforts.

Following the creation of both the federated areas 2566*x* and 2566*m*, the processor(s) 2550 of the one or more federated devices 2500 may be caused to instantiate and maintain the private federated area 2566*q* to be part of the set of federated areas 2566*m* and 2566*x*. In so doing, the private federated area 2566*q* is added to the set in a manner that converts what was a linear hierarchy into a hierarchical tree with a pair of branches. As with the instantiation of the private federated area 2566*m*, the instantiation of the private federated area 2566*q* may also be performed by the processor(s) 2550 of the one or more federated devices 2500 as an automated response to the addition of a user of the depicted source device 2100*q* as authorized to access the base federated area 2566_x_. Alternatively, a user with access permissions to control aspects of the base federated area 2566_x_ may operate the source device 2100_x_ to transmit a request to the portal generated by the one or more federated devices 2500 to create the private federated area 2566_q_, with inheritance, priority and/or dependency relationships with the base federated area 2566_x_, and with access that may be limited (at least initially) to the user of the source device 2100_q_.

Following the addition of the federated area 2566_q_, the processor(s) 2550 of the one or more federated devices 2500 may be caused to first, instantiate the intervening federated area 2566_u_ inserted between the private federated area 2566_q_ and the base federated area 2566_x_, and then instantiate the private federated area 2566_r_ that branches from the newly created intervening federated area 2566_u_. In so doing, the second branch that was created with the addition of the private federated area 2566_q_ is expanded into a larger branch that includes both of the private federated areas 2566_q_ and 2566_r_ in separate sub-branches.

In various embodiments, the insertion of the intervening federated area 2566_u_ may be initiated in a request transmitted to the portal from either the user of the source device 2100_q_ or the user of the source device 2100_x_, depending on which user has sufficient access permissions to be permitted to make such a change in the relationship between the private federated area 2566_q_ and the base federated area 2566_x_, including the instantiation and insertion of the intervening federated area 2566_u_ therebetween. In some embodiments, it may be necessary for such a request made by one of such users to be approved by the other before the processor(s) 2550 of the one or more federated devices 2500 may proceed to act upon it.

Such a series of additions to a hierarchical tree may be prompted by any of a variety of circumstances, including and not limited to, a desire to create an isolated group of private federated areas that are all within a single isolated branch that includes an intervening federated area by which users associated with each of the private federated areas within such a group may be able to share objects without those objects being more widely shared outside the group as by being stored within the base federated area 2566_x_. Such a group of users may include a group of collaborating developers of task routines 2440, data sets 2330 and/or job flow definitions 2220.

As each of the federated areas 2566_m_, 2566_q_, 2566_r_, 2566_u_ and 2566_x_ are created, each may be given a human-readable FA identifier 2568 that may be supplied in the requests that are received to create each of them and/or that may be supplied and/or generated in any of a variety of other ways, including through any of a variety of user interfaces. Also, as previously discussed, regardless of the manner or circumstances in which each of the depicted federated areas 2566_m_, 2566_q_, 2566_r_, 2566_u_ or 2566_x_ is instantiated, in at least some embodiments, the processor(s) 2550 may be caused to generate a global FA identifier 2569 for each of these federated areas automatically as part of each of their instantiations. Again, this may be deemed desirable in order to have each of these federated areas be immediately distinguishable by such a practically unique identifier from the moment that each begins its existence. In this way, such global FA identifiers 2569 may be immediately available to be used to identify each of these federated areas within both the federated area parameters 2536 and the portal data 2539.

FIG. 15F depicts various examples of designating at least a portion of a federated area 2566 as a storage location that serves a specialized purpose. As depicted, the processor(s) 2550 of the one or more federated devices 2500 may be caused to instantiate different ones of these depicted examples of a portion of a federated area 2566 by the execution of the executable instructions of different components of the control routine 2540, and/or by the execution of a resource routine. As also depicted, such designated portions of a federated area 2566 may also be caused to co-exist with another portion of the federated area 2566 that may not be so designated, and which may be used simply for the storage of objects 2220, 2270, 2330, 2370, 2440, 2470, 2720 and/or 2770, and/or used for the storage of data object blocks 2336, 2336_d_, 2376, 2376_d_, 2776 and/or 2776_d_ that each form a portion of a data object 2330, 2330_d_, 2370, 2370_d_, 2770 and/or 2770_d_, respectively.

As has already been discussed, the processor(s) 2550 of the one or more federated devices 2500 may be caused by execution of the federated area component 2546 to instantiate a transfer area 2666 within a federated area 2566 as part of providing a mechanism by which the processor(s) 2550 may be caused by execution of one or more of the admission component 2542, the selection component 2543 and/or the database component 2545 to exchange objects between the one or more federated devices 2500 and other devices. Again, such transfers may be triggered as part of synchronizing the contents of the transfer area 2666 with the contents of a corresponding transfer area within another device (e.g., the transfer area 2166 or 2866 instantiated within another device 2100 or 2800, respectively, depicted in FIG. 13D). Again, by way of example, where such transfer areas may be instantiated to implement synchronization of objects where another device that does not implement federated areas 2566 is, nonetheless, used as a source code repository (e.g., a device functioning as a GitHub™ source code server) in a situation where cooperation in source code development is underway between developers.

As will also be discussed in greater detail, the processor(s) 2550 of the one or more federated devices 2500 may be caused by execution of the performance component 2544 to instantiate a shared memory space 2665 within a federated area 2566 as part of a mechanism to perform one or more conversions of data object(s) between primary and secondary forms associated with primary and secondary programming languages, respectively, as part of an approach to accommodating the use of task routines 2440 written in differing programming languages in performing a job flow. More specifically, where task routines 2440 written in different languages must exchange data object(s), a shared memory space 2665 may be temporarily instantiated to provide a temporary storage location in which serialization, de-serialization and/or other operations may be performed with data object(s) to enable such an exchange therebetween.

As will be discussed in greater detail, the processor(s) 2550 of the one or more federated devices 2500 may be caused by execution of the federated area component 2546 to instantiate a container 2565 within a federated area 2566 within each of one or more storage devices 2600 to provide objects along with one or more components of the control routine 2540 (e.g., the depicted instance of the performance component 2544) that are needed to enable the processor(s) 2650 of those one or more storage devices 2600 to perform a job flow. As has been discussed, it may be that a data object is sufficiently large that it is stored in a distributed manner in a federated area 2566 that spans the storage spaces provided by multiple ones of the storage devices 2600. Indeed, the size of such a data object may cause the transmission of it into the federated device(s) 2500 from such multiple storage devices 2600 to be at least undesirable, if not prohibitively difficult. It may, therefore, be deemed more desirable to use the processing resources of those multiple storage devices 2600 to execute the task routine(s) 2440 that require such a large data object as an input, while allowing that data object to remain effectively where it already is within those multiple storage devices 2600. Multiple copies of such a container 2565 may be distributed among those multiple storage devices 2600 as a mechanism to temporarily provide the much smaller task routine(s) 2440 that are to be so executed, along with other object(s) and/or other routines that may be needed (e.g., the depicted instance of the performance component 2544).

Alternatively or additionally, and as will also be discussed in greater detail, the processor(s) 2550 of the one or more federated devices 2500 may be caused by execution of the performance component 2544 to temporarily instantiate a container 2565 within a federated area 2566 to enable the processor(s) 2550 to monitor and/or verify the input and/or output operations that are caused to be performed as a result of the execution of a particular task routine 2440. Such temporary instantiation of a container 2565 may be used in a development or diagnostic situation in which debugging, testing and/or verification of the functionality of a newly written task routine 2440 is underway.

However, and as will also be discussed in greater detail, in some embodiments, it may be that such containers 2565 are routinely instantiated to separately support the execution of each task routines 2440 during the performance of every job flow as part of a system of managing the allocation of processing and/or storage resources of the federated device(s) 2500. More specifically, as a result of execution of a resource allocation routine 2641, it may be that a set of pods 2661 are instantiated with portions of the processing and storage resources of one or more of the federated devices 2500 allocated to each. Within each of at least a subset of the set of the pods 2661, at least one container 2565 may be instantiated in which a single instance of a task routine 2440 is executed to perform a task of a job flow. Within other(s) of the pods 2661, at least one container 2565 may be instantiated in which instances of other routines may be executed to support the execution of the task routines 2440 as part of supporting the performance of the job flow (e.g., the depicted instance of the performance component 2544).

FIG. 15G depicts an example of designating at least a portion of each of multiple federated areas 2566 as a transfer area 2666. In some embodiments, and as previously discussed in reference to FIG. 13D, such multiple transfer areas 2666 may be defined to enable the automated exchange, through synchronization, of the objects between those multiple transfer areas 2666 and counterpart transfer areas 2166 or 2866 defined within a storage 2160 or 2860 of another device 2100 or 2800, respectively, as an approach to sharing a set of objects that are distributed across a hierarchy of federated areas 2566. Again, such embodiments may be deemed desirable as a mechanism to enable a collaboration on the development of a relatively complex analysis routine between developers who are familiar with federated areas 2566 and the programming language(s) that may be associated therewith and other developers who are not familiar with federated areas 2566 and/or with those programming language(s).

Alternatively or additionally, in other embodiments, the definition of multiple transfer areas 2666, one each in a different federated area 2566, may be used to enable the automated transfer of specific objects from one federated area 2566 to another in response to specific conditions having been met. Such embodiments may be deemed desirable as an approach to automating the development of at least a portion of an analysis routine by causing the automated transfer of portions thereof from a federated area 2566 associated with one phase of development thereof to another as various thresholds of development, testing, accuracy, etc. are met.

FIG. 15H depicts an example embodiment of a synchronization relationship having been put in place between a set of transfer areas 2666 defined within a corresponding set of federated areas 2566, and a set of transfer areas 2166 or 2866 defined within a storage 2160 or 2860, respectively. More specifically, FIG. 15H depicts a multitude of synchronization relationships involving a triplet of transfer areas 2666*q*, 2666*u* and 2666*x* defined within the triplet of federated areas 2566*q*, 2566*u* and 2566*x*, respectively, of the example linear hierarchy of federated 2666 introduced in FIG. 15A, and involving a corresponding triplet of transfer areas 2166*q*/2866*q*, 2166*u*/2866*u* and 2166*x*/2866*x* defined within a storage 2160 or 2860 of a device 2100 or 2800, respectively.

As will be familiar to those skilled in the art, in the development of a relatively complex analysis routine, it may be deemed desirable to organize the numerous portions of executable instructions and/or other supporting portions thereof into a set hierarchy of directories and/or subdirectories that reflect distinct portions of the analysis routine that may be the responsibility of different groups of developers (e.g., a user interface group, a file management group, a core analysis group, etc.). In some embodiments, it may be that the hierarchical arrangement of directories and/or subdirectories is reflective of differing levels of security access to different portions of the executable instructions (e.g., where particular intellectual property rights may be involved for one or more particular portions), and/or it may be that the hierarchical arrangement of directories and/or subdirectories may be reflective of an order of compilation and/or linking of at least a subset of the executable instructions. Thus, and as previously discussed, in a collaborative development of a relatively complex analysis routine between developers of two different development environments (one entailing the use of federated areas 2566 and associated primary programming language, and one not entailing the use of one or both of those), it may be desirable to enable sharing of objects that are stored across multiple ones of such directories and/or subdirectories, and across corresponding multiple ones of federated areas 2566 that may be organized into a hierarchy that corresponds (to at least some degree) to such a hierarchy of directories and/or subdirectories. To enable this, and as depicted, each of the transfer areas 2166 or 2866 may be defined to encompass storage space associated with a directory or sub-directory, and may be synchronized with a corresponding transfer area 2666 that is defined within a federated area 2566 that is meant to correspond to that same directory or sub-directory. Also, the position of each such directory or subdirectory within its hierarchy of directories and/or subdirectories may be made to correspond to the position of its corresponding federated area 2566 within its hierarchy of federated areas 2566.

As also depicted in FIG. 15H, and as was earlier discussed in reference to FIG. 15C, it may be deemed desirable to provide each federated area 2566 in such a hierarchy of federated areas 2566 with a human-readable federated area identifier 2568 that is in some way reflective of the position of each federated area 2566 in the hierarchy, and therefore, may provide some indication of how to navigate among those federated areas 2566 within the hierarchy. As a result, and as additionally depicted in FIG. 15H, it may be that such human-readable federated area identifiers 2568 are also be reflective of the naming convention used in the hierarchy of directories and/or sub-directories, as well as how to navigate among those directories and/or subdirectories. Such a correspondence in hierarchies and naming conventions between two such environments may be deemed desirable to enable the different developers of two such environments to more easily refer to particular objects for which there may be corresponding copies and/or corresponding versions at similar locations within the corresponding hierarchies.

Turning to FIG. 15I, and as previously discussed in connection with FIG. 13E, the processor(s) 2550 of the one or more federated devices 2500 may be caused to instantiate one or more federated areas 2566 that may each be entirely constrained to exist within the storage space provided by a local file system 2661 implemented entirely within the storage 2660 of a single one of the storage devices 2600*a-x*. More precisely, each such federated area 2566 may, therefore, not span across the storage spaces provided by multiple ones of the storage devices 2600*a-x* in any way. As depicted, each such federated area 2566 may be limited to storing undivided objects 2220, 2270, 2330, 2370, 2440, 2470, 2720 and/or 2770. As also depicted, each such federated area 2566 may include one or more storage locations designated as serving a specialized purpose, such as a container 2565, a shared memory space 2665 or a transfer area 2666. As also depicted, such storage of undivided objects may be within or outside of such designated storage locations, or both.

Turning to FIG. 15J, and as previously discussed in connection with FIG. 13F, the processor(s) 2550 of the one or more federated devices 2500 may be caused to instantiate one or more federated areas 2566 that may exist within a storage space provided by the distributed file system 2669 implemented to span portions of the storage 2660 of multiple ones of the storage devices 2600*a-x*. More precisely, each such federated area 2566 may, therefore, span across the storage spaces provided by multiple ones of the storage devices 2600*a-x*. As depicted, each such federated area 2566 may be used to store undivided objects 2220, 2270, 2330, 2370, 2440, 2470, 2720 and/or 2770. However, as also depicted, each such federated area 2566 may alternatively or additionally be used to store data object blocks 2336, 2336*d*, 2376, 2376*d*, 2776 and/or 2776*d* of large data sets 2330, 2330*d*, 2370, 2370*d*, 2770 and 2770*d*, respectively, such that they are caused to span multiple ones of the storage devices 2600*a-x*. As also depicted, each such federated area 2566 may include one or more storage locations designated as serving a specialized purpose, such as a container 2565, a shared memory space 2665 or a transfer area 2666. As also depicted, such storage of undivided objects and/or data object blocks may be within or outside of such designated storage locations, or both.

Turning more specifically to FIG. 15K, although not specifically discussed or depicted in either of FIG. 15I or 15J, embodiments of the distributed processing system 2000 are possible in which a mixture of different federated areas 2566 may be instantiated in which one or more may exist entirely within storage space provided by a single storage device 2600, while one or more others may span across storage space provided by multiple storage devices 2600. As also more specifically depicted in FIG. 15K, it may be that such federated areas 2566 may be instantiated in which one or more may exist entirely within storage space provided by a single federated device 2500, and/or in which one or more may span across storage space provided by multiple federated devices 2500 (either in lieu of or in addition to storage within one or more storage devices 2600). Again, regardless of whether a particular federated area 2566 exists within storage space provided by a single federated device 2500 or storage device 2600, or multiple federated devices 2500 or multiple storage devices 2600, each such federated area 2566 may include one or more storage locations designated as serving a specialized purpose, such as a container 2565, a shared memory space 2665 or a transfer area 2666. As also depicted, the storage of undivided objects may be within or outside of such designated storage locations, or both.

Figure 16A:
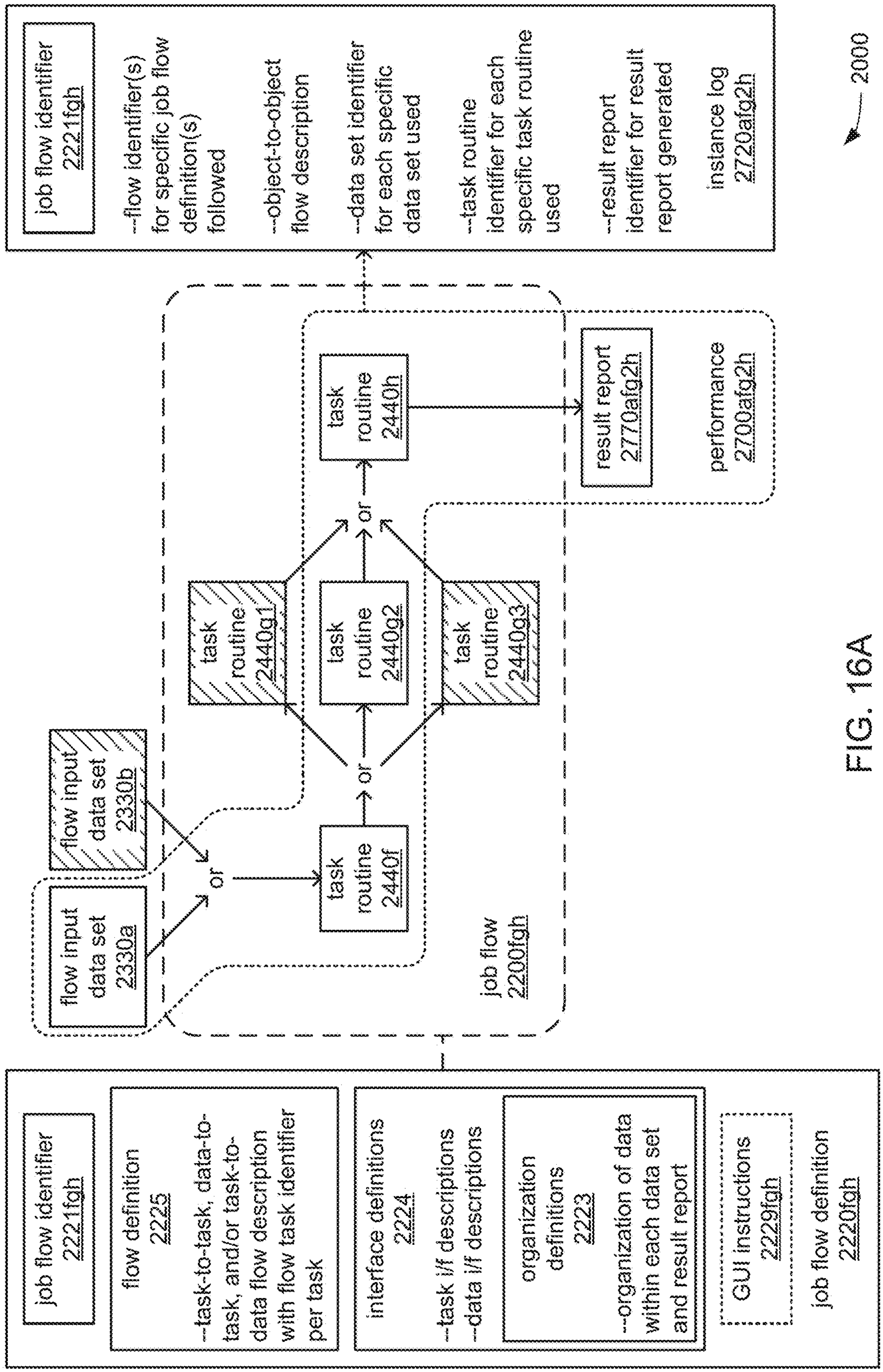
FIGS. 16A, 16B, 16C, 16D, 16E, 16F, 16G, 16H, 16I, 16J and 16K, together, illustrate an example of defining, performing and documenting a job flow.
Figure 16B:
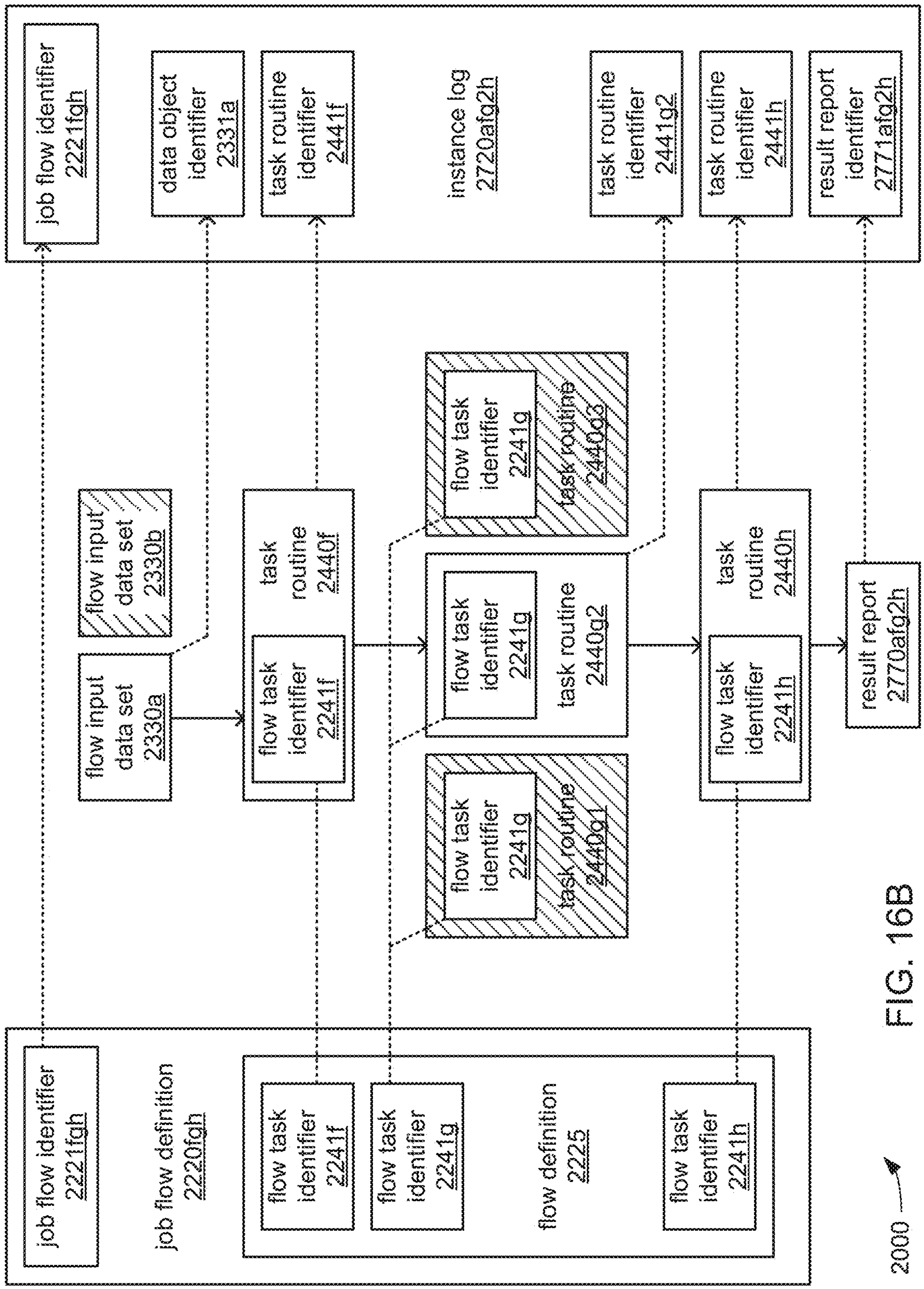
Figure 16C:
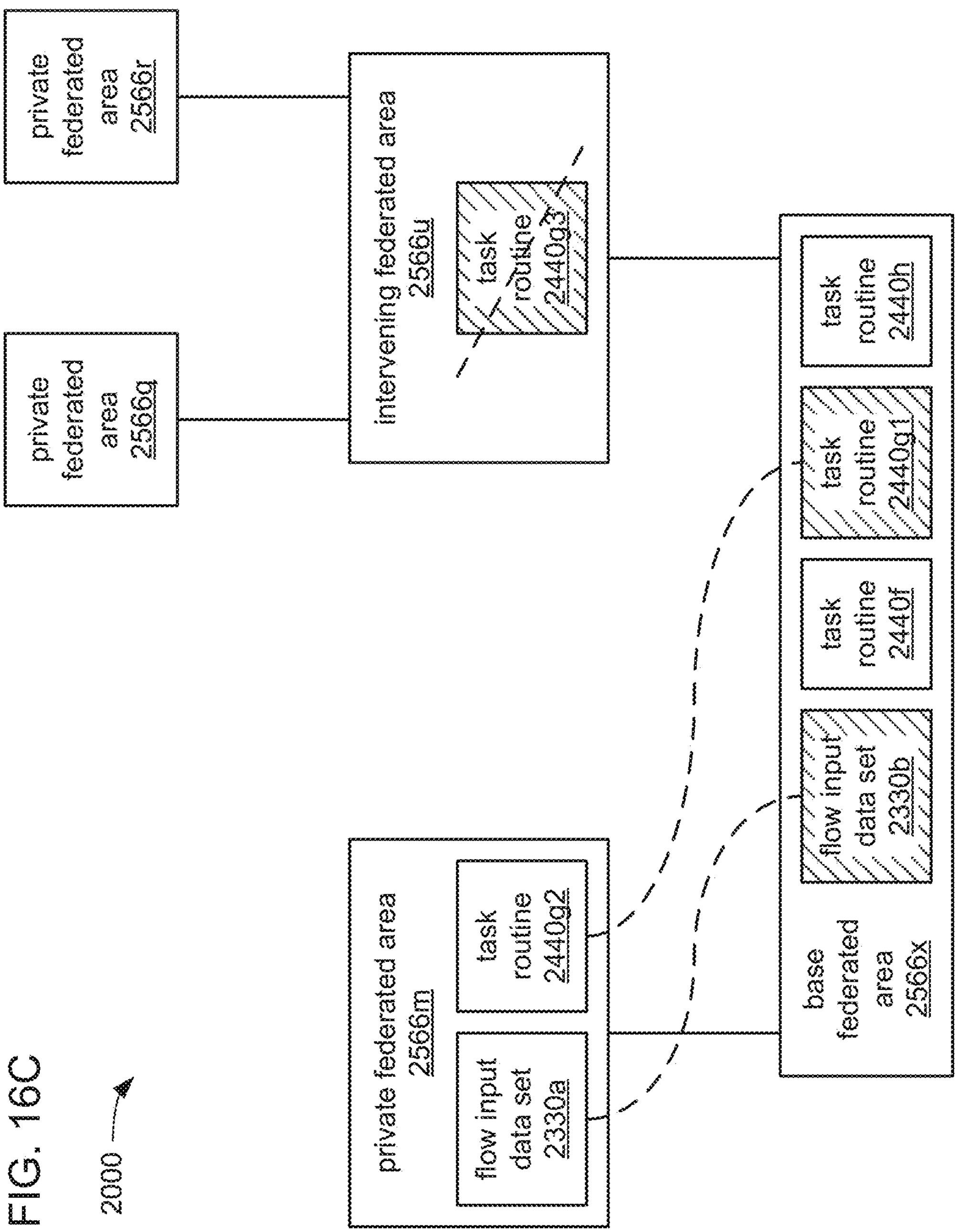
Figure 16D:
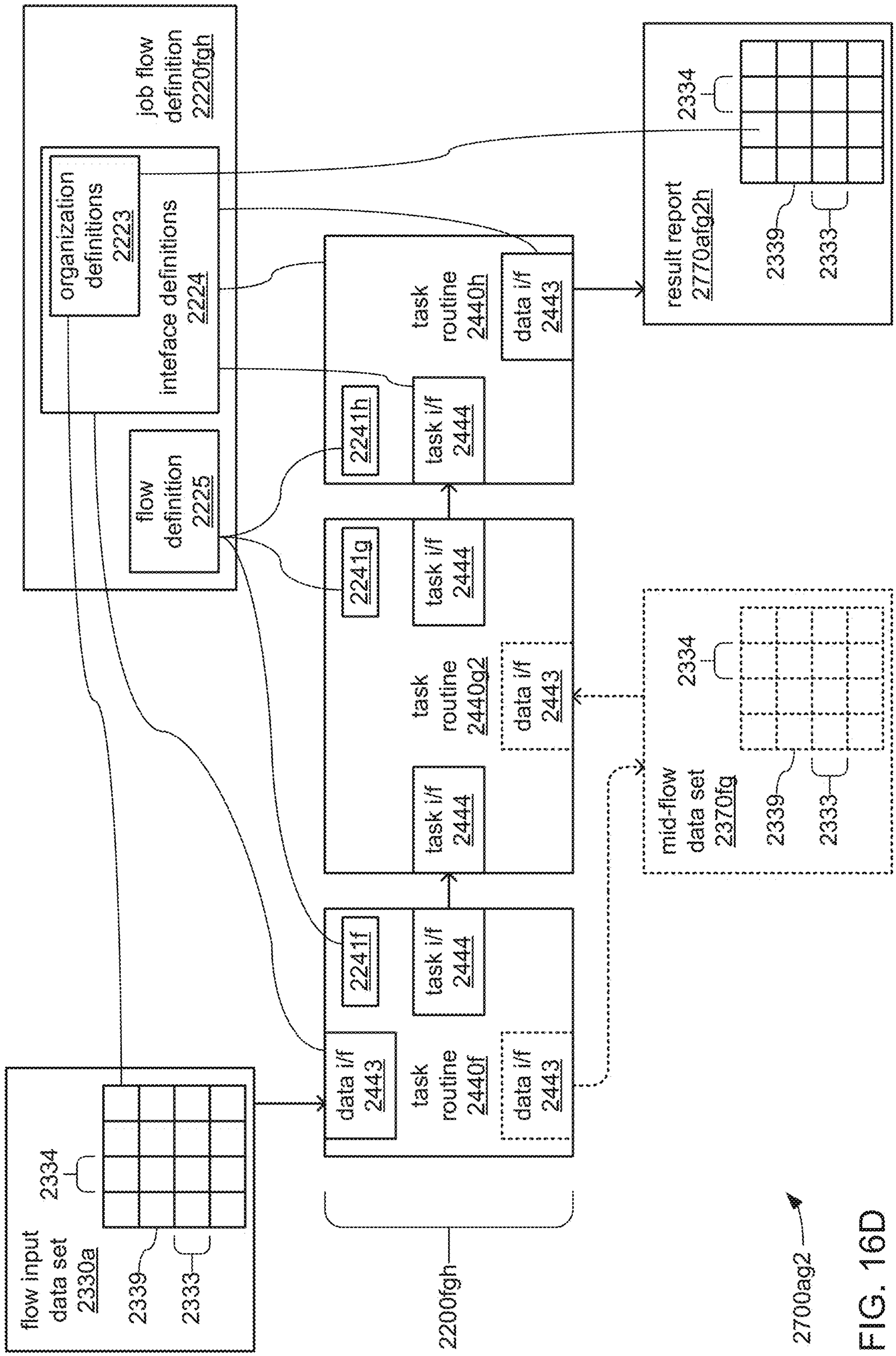
Figure 16E:
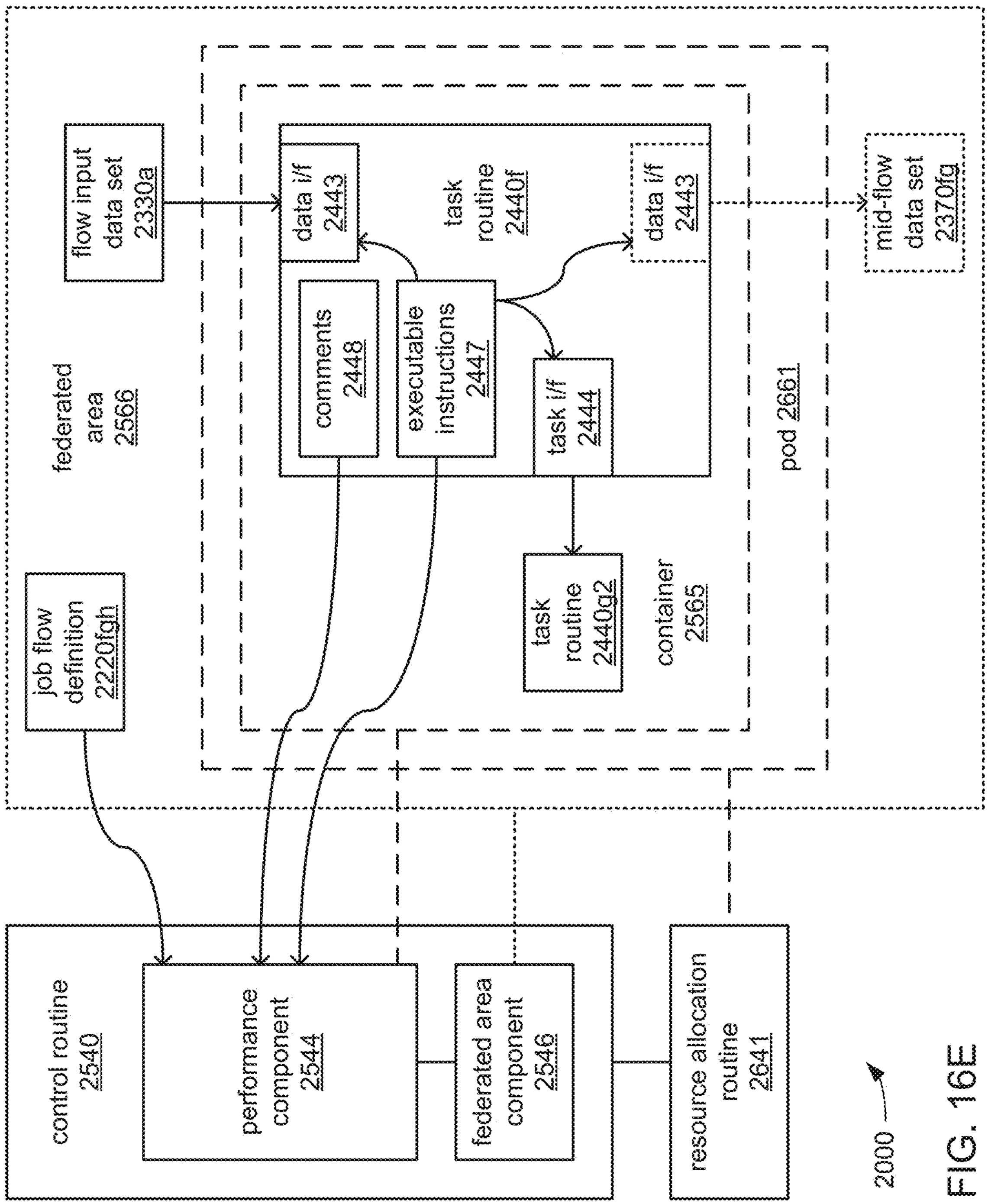
Figure 16F:
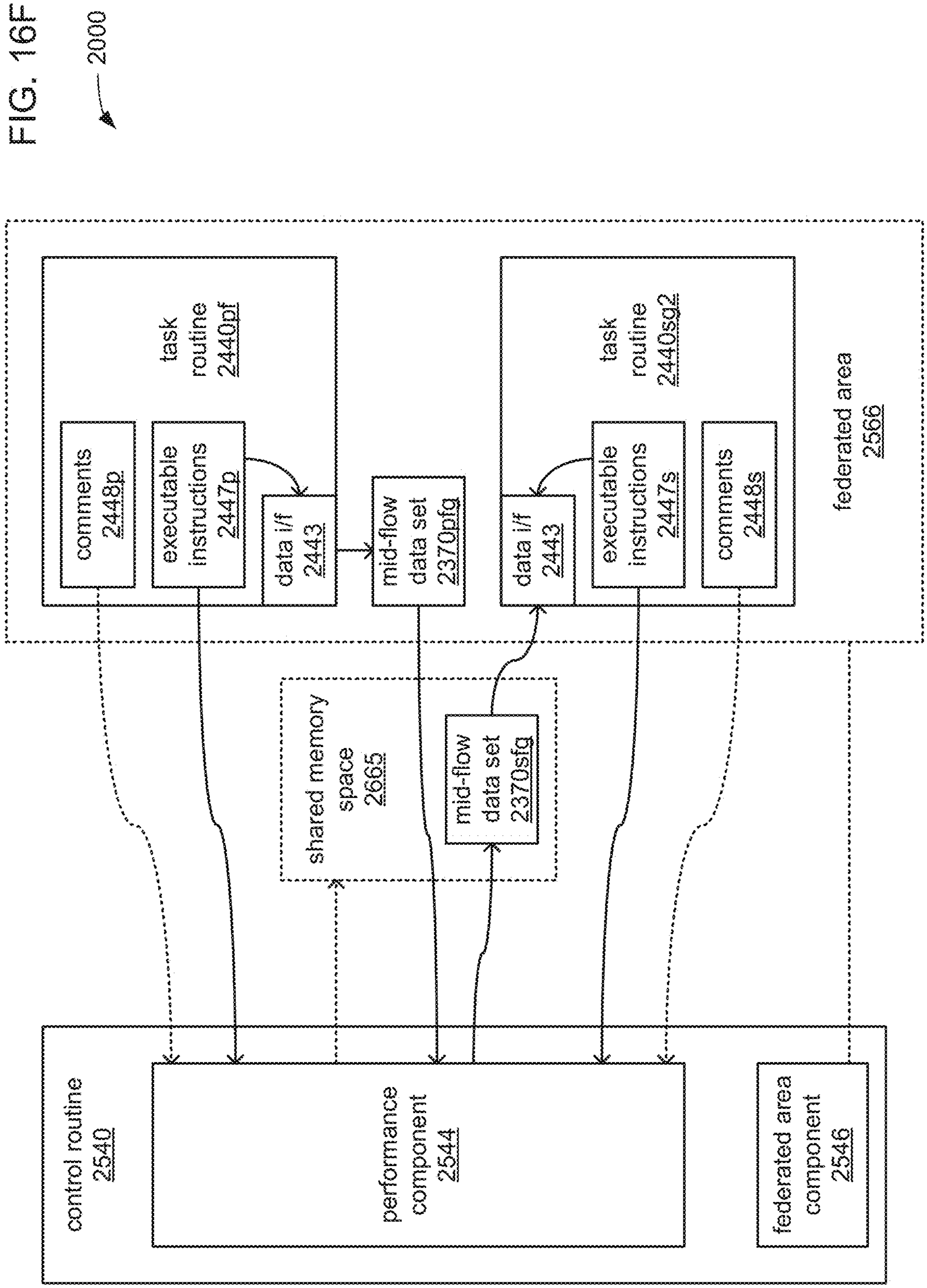
Figure 16G:
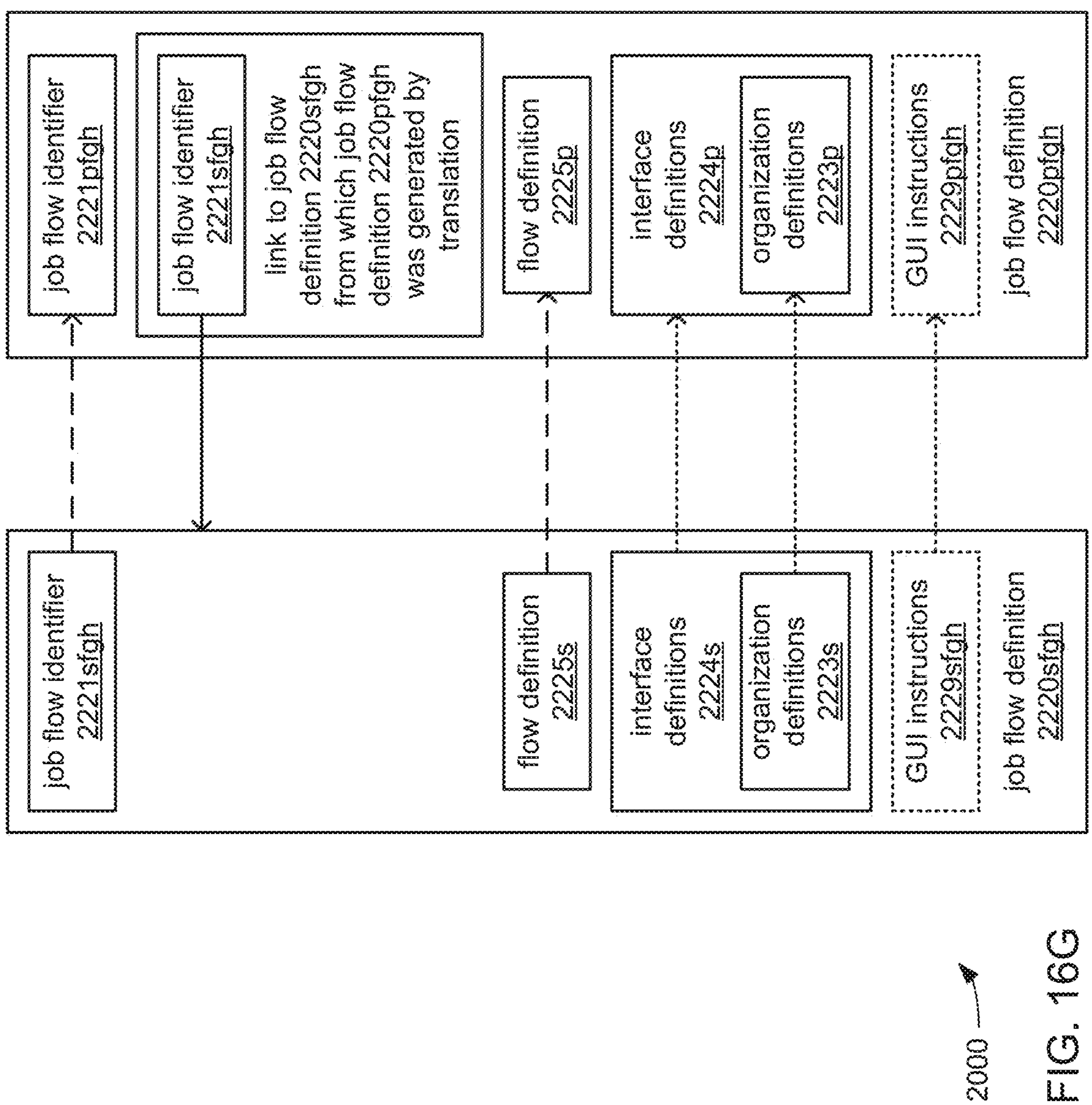
Figure 16H:
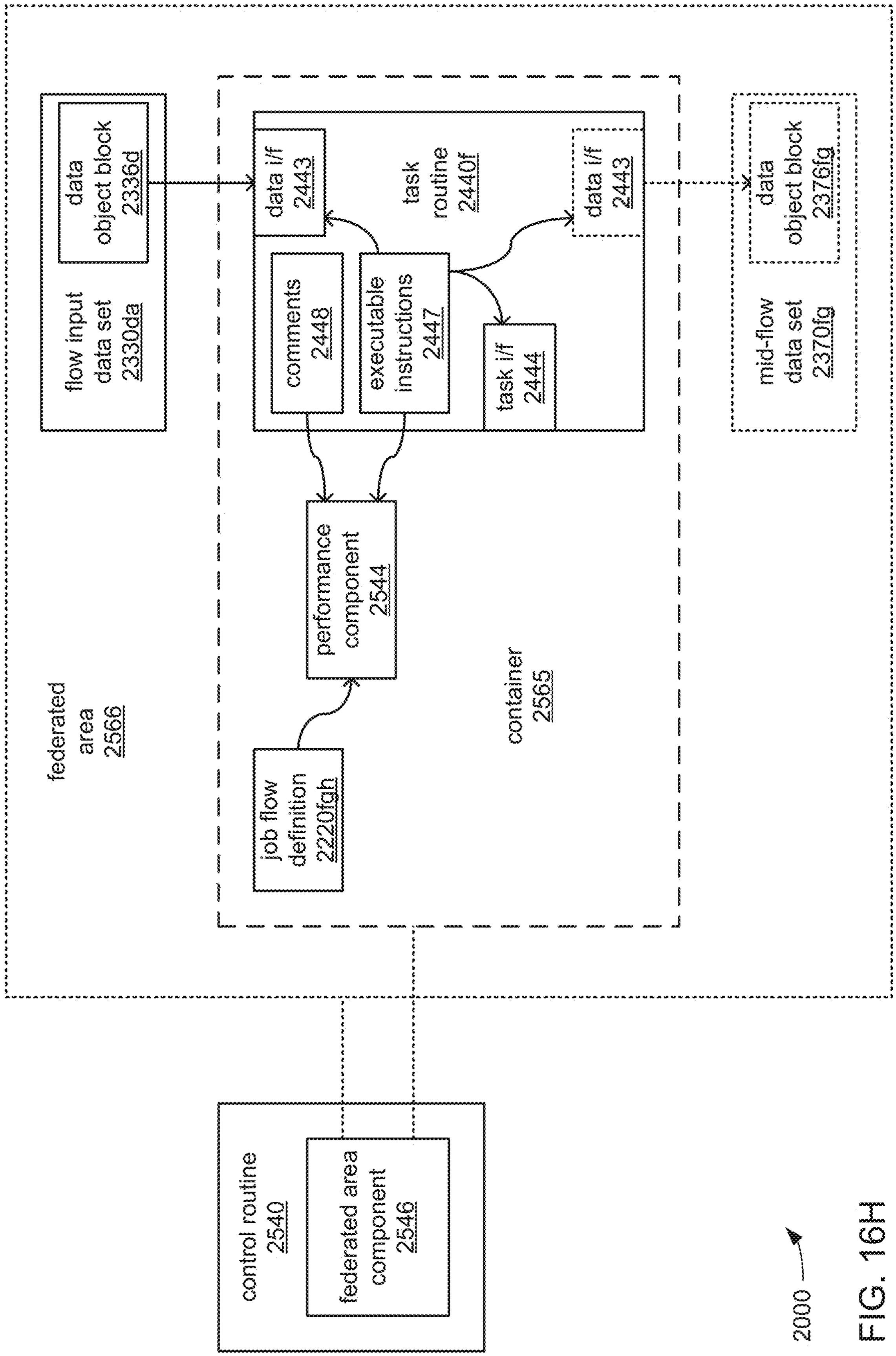
Figure 16I:
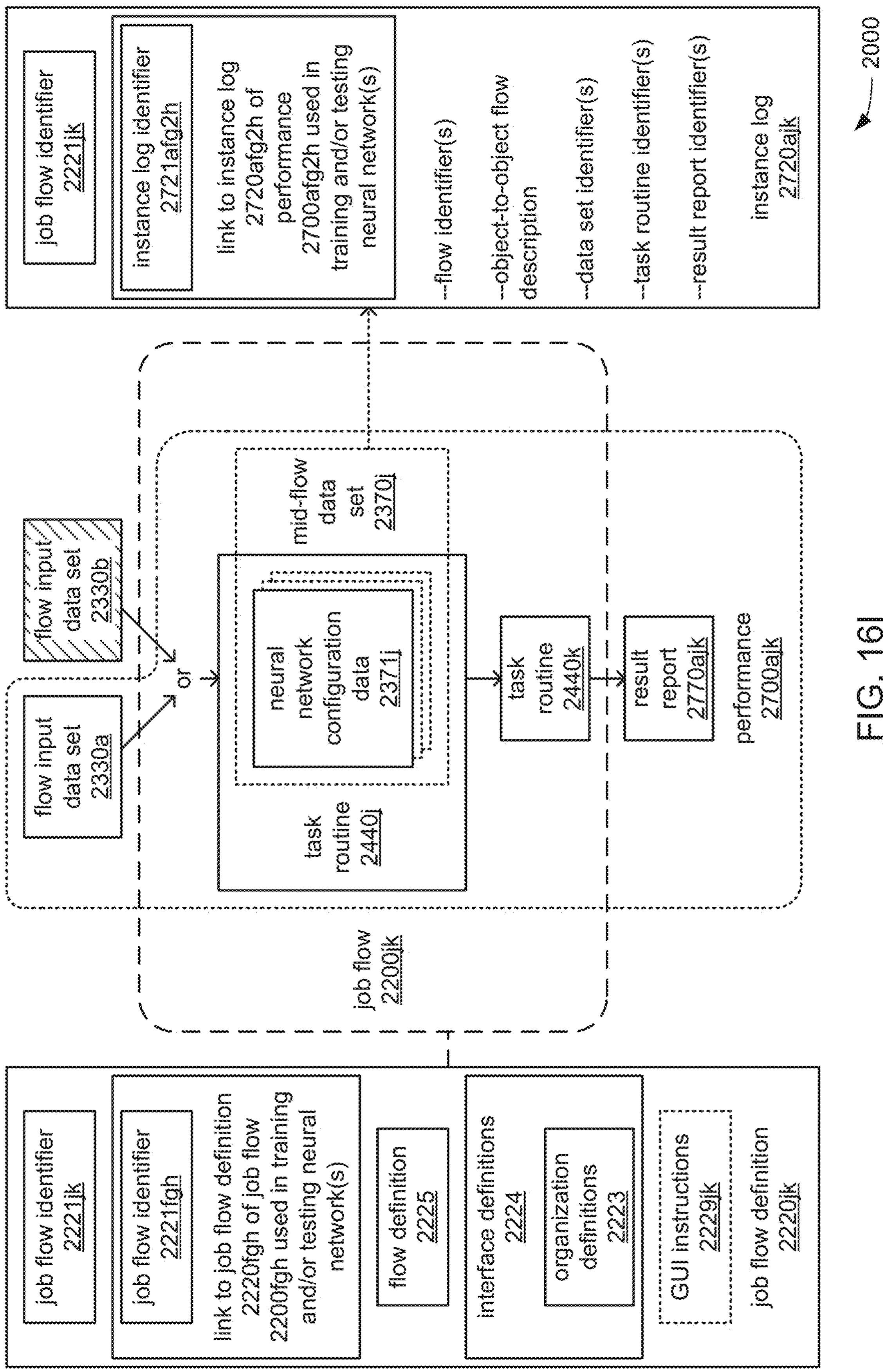
Figure 16J:
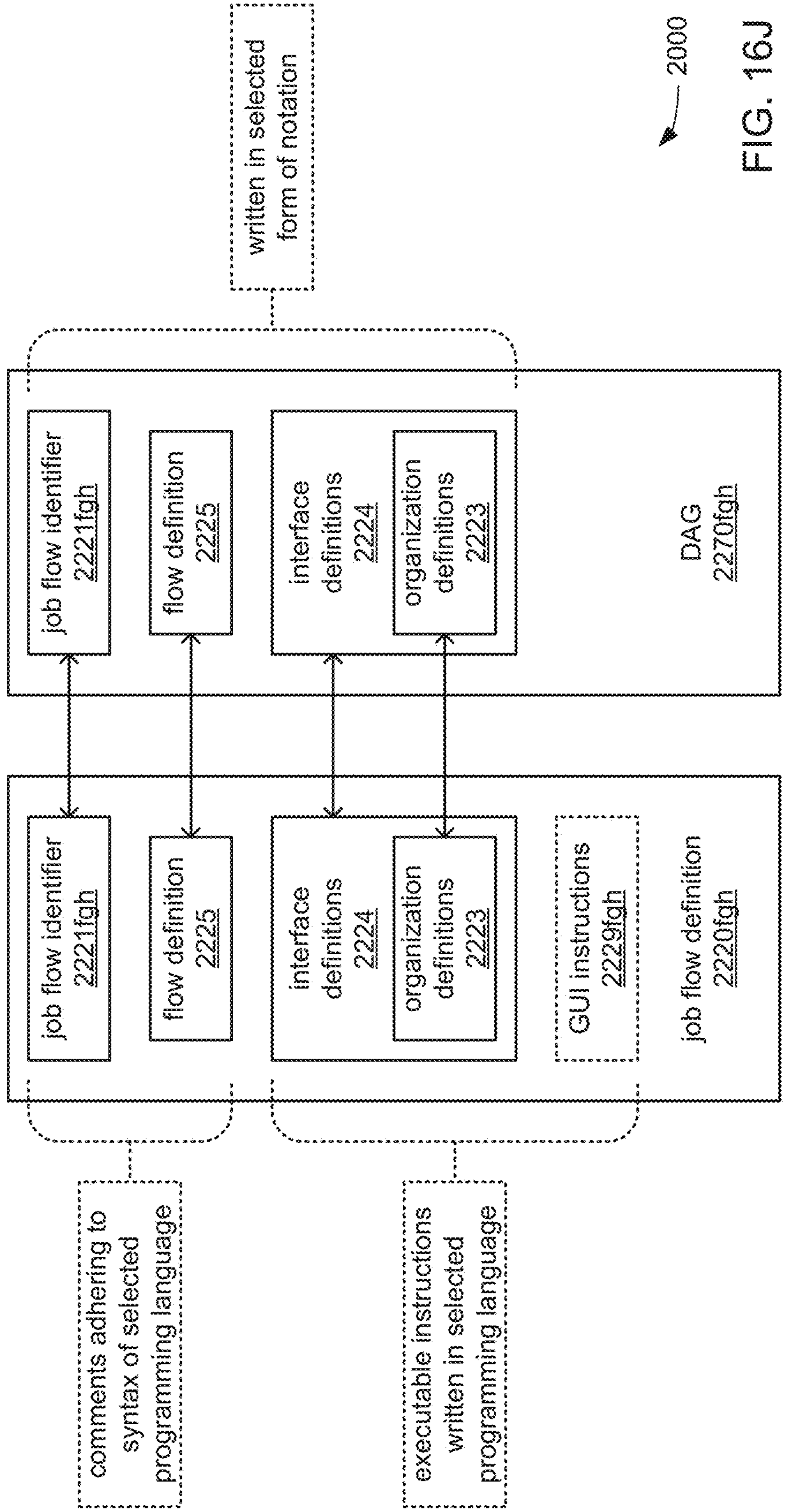
Figure 16K:
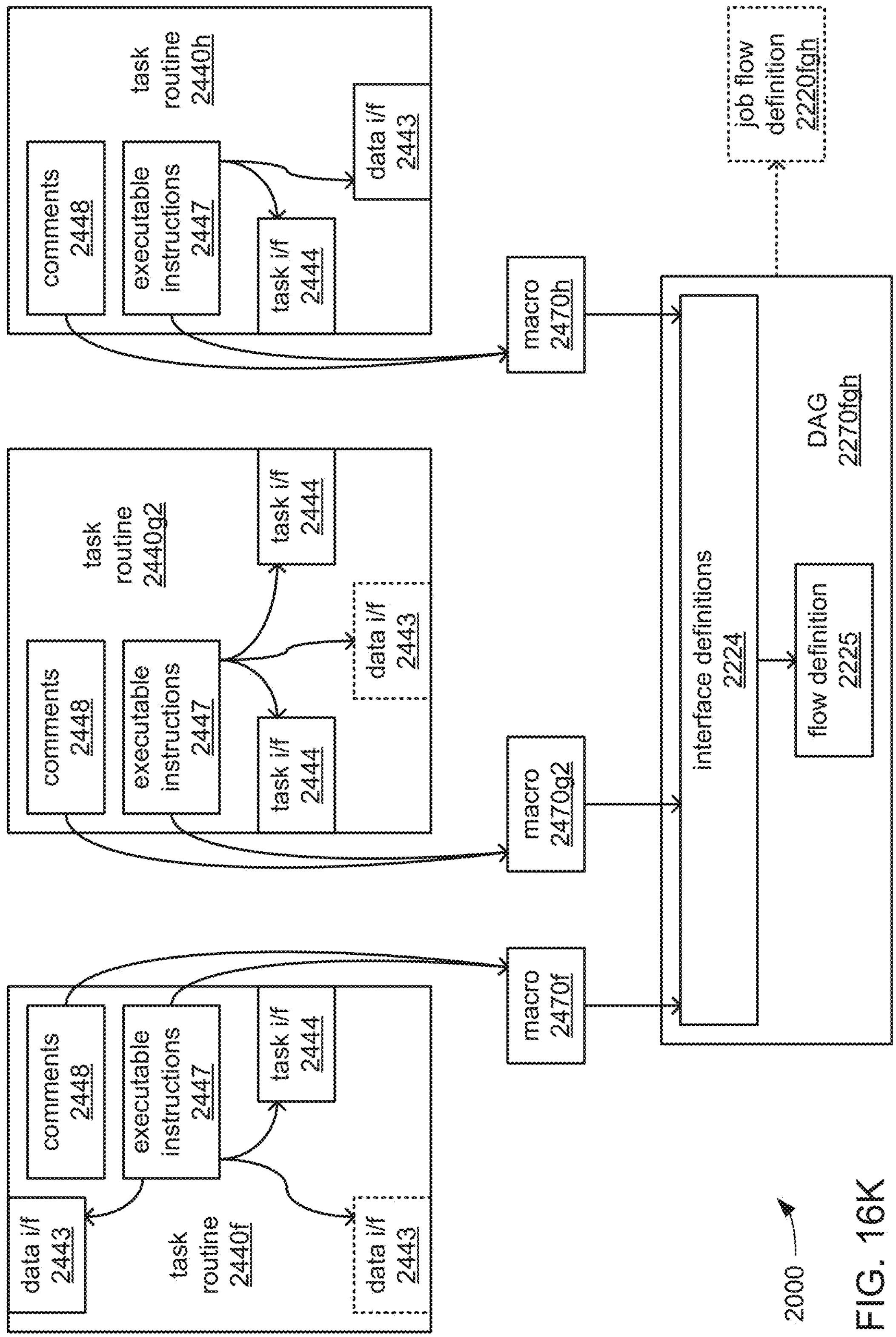

FIGS. 16A, 16B, 16C, 16D, 16E, 16F, 16G, 16H, 16I, and 16J and 16K, together, illustrate the manner in which a set of objects may be used to define and perform an example job flow 2200*fgh*, as well as to document the resulting example performance 2700*afg*2*h* of the example job flow 2200*fgh*. FIG. 16E additionally illustrates how a container 2565 and information incorporated into one of the task routines 2440*f* and/or into the job flow definition 2220*fgh* may be used to verify the functionality of that task routine. FIG. 16F additionally illustrates how a mid-flow data set 2370*fg* may be converted between two forms 2370*pfg* and 2370*sfg* amidst being exchanged between two task routines to accommodate the use of different programming languages therebetween. FIG. 16G additionally illustrates the manner in which the job flow definition 2200*pfg*h may be marked as associated with another job flow definition 2200*sfg*h from which the job flow definition 2200*pfg*h may have been derived by translation. FIG. 16I additionally illustrates the manner in which a job flow 2200*fgh* that employs non-neuromorphic processing to perform a function may be marked as associated with another job flow 2200*jk* that employs neuromorphic processing to perform the same function and that was derived from the job flow 2200*fgh*. FIGS. 16J and 16K, together, additionally illustrate the manner in which the job flow definition 2220*fgh* may be generated as and/or from a DAG 2270*fgh*. For sake of ease of discussion and understanding, the same example job flow 2200*fgh* and example performance 2700*afg*2*h* of the example job flow 2200*fgh* are depicted (or are at least associated with what is depicted) throughout all of FIGS. 16A-K. Also, it should be noted that the example job flow 2200*fgh* and example performance 2700*afg*2*h* thereof are deliberately relatively simple examples presented herein for purposes of illustration, and should not be taken as limiting what is described and claimed herein to such relatively simple embodiments.

Turning to FIGS. 16A and 16B, as depicted, the example job flow 2200*fgh* specifies three tasks that are to be performed in a relatively simple three-step linear order through a single execution of a single task routine 2440 for each task, with none of those three tasks entailing the use of neuromorphic processing. Also, the example job flow 2200*fgh* requires a single data set as an input data object to the first task in the linear order, may generate and exchange a single data set between two of the tasks, and generates a single result report as an output data object of the last task in the linear order. As also depicted, in the example performance 2700*afg*2*h* of the example job flow 2200*fgh*, task routines 2440*f*, 2440*g*2 and 2440*h* are the three task routines selected to be executed to perform the three tasks. Also, a flow input data set 2330*a* is selected to serve as the input data object, a mid-flow data set 2370*fg* may be generated and exchanged between two of the performed tasks as a mechanism to exchange data therebetween, and a result report 2770*afg*2*h* is the output data object to be generated as an output of the performance 2700*afg*2*h*. Again, it should be noted that other embodiments of a job flow are possible in which there may be many more tasks to be performed, many more data objects that serve as inputs and/or many more data objects generated as outputs. It should also be noted that other embodiments of a job flow are possible in which there is a much more complex order of the performance of tasks that may include parallel and/or conditional branches that may converge and/or diverge.

The job flow definition 2220_fgh_ for the example job flow 2200_fgh_ may include a flow definition 2225 that specifies the three tasks to be performed, the order in which they are to be performed, and which of the three tasks is to accept a data object as an input and/or generate a data object as an output. In specifying the three tasks to be performed, the flow definition 2225 may use flow task identifiers 2241, such as the depicted flow task identifiers 2241_f_, 2241_g_ and 2241_h_ that uniquely identify each of the three tasks. As depicted, there may be just a single task routine 2440_f_ available among one or more federated areas 2566 to which access is granted that is able to perform the task specified with the flow task identifier 2241_f_, and therefore, the single task routine 2440_f_ may be the one task routine that is assigned the flow task identifier 2241_f_ to provide an indication that it is able to perform that task. Also, there may be three task routines 2440_g_1, 2440_g_2 and 2440_g_3 available among the one or more accessible federated areas 2566 that are each able to perform the task specified with the flow task identifier 2241_g_, and therefore, each may be assigned the same flow task identifier 2241_g_. Further, there may be just a single task routine 2440_h_ available within the one or more accessible federated areas 2566 that is able to perform the task specified with the flow task identifier 2241_h_, resulting in the assignment of the flow task identifier 2241_h_ to the single task routine 2440_h_.

As has been discussed, the job flow definition 2220_fgh_ specifies the tasks to be performed in a job flow, but does not specify any particular task routine 2440 to be selected for execution to perform any particular one of those tasks during any particular performance of the job flow. Where there are multiple task routines 2440 that are capable of performing a particular task, a single one of those multiple task routines 2440 is selected for execution to do so, and the selection that is made may, in part, depend on the nature of the request received to perform a job flow. More specifically, the selection of a particular task routine 2440 for execution to perform each particular task may be based on which task routine 2440 is the newest version to perform each task, and/or may be based on which task routine 2440 was used in a previous performance of each task in a specified previous performance of a job flow. As will be explained in detail, the selection criteria that is used to select a task routine 2440 for each task may depend on whether an entirely new performance of a job flow is requested or a repetition of an earlier performance of a job flow is requested. As depicted, in the example performance 2700_afg_2_h_ of the example job flow 2200_fgh_, the task routine 2440_g_2 is selected from among the task routines 2440_g_1, 2440_g_2 and 2440_g_3 for execution to perform the task identified with the flow task identifier 2241_g_.

Alternatively or additionally, and as previously explained in connection with FIGS. 15A-B, in situations in which objects needed for the performance of a job flow are distributed among multiple federated areas that are related by inheritance and/or priority relationships, the selection of a particular task routine 2440 to perform a task from among multiple task routines 2440 that are each capable of performing that same task may, in part, be dependent upon which federated area 2566 each of such multiple task routines 2440 are stored within. By way of example, FIG. 16C depicts an example situation in which objects needed to perform the job flow 2200_fgh_ are distributed among the federated areas 2566_m_, 2566_u_ and 2566_x_ in the example hierarchical tree of federated areas first introduced in FIGS. 15B-C. More specifically, in this example, the data set 2330_a_ and the task routine 2440_g_2 are stored within the private federated area 2566_m_; the task routine 2440_g_3 is stored within the intervening federated area 2566_u_; and the data set 2330_b_ and the task routines 2440_f_, 2440_g_1 and 2440_h_ are stored within the base federated area 2566_x_.

As previously discussed in reference to the linear hierarchy depicted in FIG. 15A, a "perspective" from which a job flow is to be executed may based on which federated areas 2566 are made accessible to the device and/or device user makes the request for the performance to occur. As depicted, where the request to perform the job flow 2200_fgh_ is received from a user granted access to the private federated area 2566_m_, as well as to the base federated area 2566_x_, but not granted access to any of the federated areas 2566_q_, 2566_r_ or 2566_u_, the search for objects to use in the requested performance may be limited to those stored within the private federated area 2566_m_ and the base federated area 2566_x_. Stated differently, the perspective that may be automatically selected for use in determining which federated areas 2566 are searched for objects may be that of the private federated area 2566_m_, since the private federated area 2566_m_ is the one federated area to which the user in this example has been granted access to that is subject to the most restricted degree of access. Based on this perspective, the private federated area 2566_m_ will be searched, along with the base federated area 2566_x_, and along with any intervening federated areas 2566 therebetween, if there were any federated areas 2566 therebetween.

As a result, the task routine 2440_g_3 stored within the intervening federated area 2566_u_ is entirely unavailable for use in the requested performance as a result of the user having no grant of access to the intervening federated area 2566_u_, and this then becomes the reason why the task routine 2440_g_3 is not selected. In contrast, as a result of an inheritance relationship between the private federated area 2566_m_ and the base federated area 2566_x_, the data set 2330_b_ and each of the task routines 2440_f_, 2440_g_1 and 2440_h_ stored in the based federated area 2566_x_ may each be as readily available for being used in the requested performance of the job flow 2200_fgh_ as the data set 2330_a_ and the task routine 2440_g_2 stored in the private federated area 2566_m_. Therefore, the task routines 2440_f_ and 2440_h_ may be selected as a result of being the only task routines available within either federated area 2566_m_ or 2566_x_ that perform their respective tasks. However, although both of the flow input data sets 2330_a_ and 2330_b_ may be equally available through that same inheritance relationship, a priority relationship also in place between the federated areas 2566_m_ and 2566_x_ may result in the data set 2330_a_ being selected as the data set used as input, since the flow input data set 2330_a_ is stored within the private federated area 2566_m_, which is searched first for the objects needed for the requested performance, while the flow input data set 2330_b_ is stored within the base federated area 2566_x_, which is searched after the search of the private federated area 2566_m_. The same combination of inheritance and priority relationships in place between the federated areas 2566_m_ and 2566_x_ may also result in the task routine 2440_g_2 stored within the private federated area 2566_m_ being selected, instead of the task routine 2440_g_1 stored within the base federated area 2566_x_.

Turning more broadly to FIGS. 16A and 16D, the job flow definition 2220_fgh_ may include interface definitions 2224 that specify aspects of task interfaces 2444 employed in communications among task the routines 2440 that are selected for execution to perform the tasks of the example job flow 2200_fgh_ (e.g., the task routines 2440_f_, 2440_g_2 and 2440_h_). Such aspects may include quantity, type, bit widths, protocols, etc., of parameters passed from one task routine 2440 to another as part of communications among task routines 2440 during their execution. As also depicted, the interface definitions 2224 may alternatively or additionally specify aspects of data interfaces 2443 between task routines 2440 and any data objects that may be employed as an input to a performance (e.g., the flow input data set 2330_a_) and/or that may be generated as an output of a performance (e.g., the result report 2770_afg_2_h_) of the example job flow 2200_fgh_, such as the data example performance 2700_afg_2_h_. The interface definitions 2224 may also specify aspects of data interfaces 2443 employed by one task routine 2440 to generate a data object to convey a relatively large quantity of data to another task routine 2440 (e.g., the mid-flow data set 2370_fg_ depicted with dotted lines, and depicted as generated by task routine 2440_f_ for use as an input to task routine 2440_g_2), and may specify aspects of the data interface 2443 employed by the other task routine 2440 to retrieve data from that same data object. Since many of the specified aspects of the data interfaces 2443 may necessarily be closely associated with the manner in which data items are organized and made accessible within data objects, the interface definitions 2224 may include organization definitions 2223 that specify such organizational and access aspects of the data objects. Thus, as depicted in FIG. 16D, where each of the data sets 2330_a_ and 2370_fg_ (if any are present), and the result report 2770_afg_2_h_ include a two-dimensional array, the organization definitions 2223 may specify various aspects of the data items 2339 (e.g., data type, bit width, etc.), the rows 2333 and/or the columns 2334 for each these data objects.

As previously discussed, the job flow definition 2220_fgh_ specifies tasks to be performed and not the particular task routines 2440 to be selected for execution to perform those tasks, which provides the flexibility to select the particular task routines 2440 for each task dynamically at the time a performance takes place. Similarly, the job flow definition 2220_fgh_ also does not specify particular data objects to be used, which provides the flexibility to select the particular data objects with which the job flow 2200_fgh_ is to be used dynamically at the time a performance takes place. However, the interface definitions 2224 do specify aspects of the interfaces among the task routines 2440, and between the task routines 2440 and data objects. The specification of aspects of the interfaces 2443 and/or 2444 may be deemed desirable to ensure continuing interoperability among task routines 2440, as well as between task routines 2440 and data objects, in each new performance of a job flow 2200, even as new versions of one or more of the task routines 2440 and/or new data objects are created for use in later performances.

In some embodiments, new versions of task routines 2440 that may be created at a later time may be required to implement the interfaces 2443 and/or 2444 in a manner that exactly matches the specifications of those interfaces 2443 and/or 2444 within a job flow definition 2220. However, in other embodiments, a limited degree of variation in the implementation of the interfaces 2443 and/or 2444 by newer versions of task routines 2440 may be permitted as long as "backward compatibility" is maintained in retrieving input data objects or generating output data objects through data interfaces 2443, and/or in communications with other task routines through task interfaces 2444. As will be explained in greater detail, the one or more federated devices 2500 may employ the job flow definitions 2220 stored within one or more federated areas 2566 to confirm that new versions of task routines 2440 correctly implement task interfaces 2444 and/or data interfaces 2443. By way of example, in some embodiments, it may be deemed permissible for an interface 2443 or 2444 that receives information to be altered in a new version of a task routine 2440 to accept additional information from a newer data object or a newer version of another task routine 2440 if that additional information is provided, but to not require the provision of that additional information, since older data objects don't provide that additional information. Alternatively or additionally, by way of example, it may be deemed permissible for an interface 2443 or 2444 that outputs information to be altered in a new version of a task routine 2440 to output additional information as an additional data object generated as an output, or to output additional information to a newer version of another task routine 2440 in a manner that permits that additional information to be ignored by an older version of that other task routine 2440.

Returning to FIGS. 16A and 16B, an example instance log 2720_afg_2_h_ that is generated as result a of the example performance 2700_afg_2_h_ of the example job flow 2200_fgh_ is depicted. Although the job flow definition 2220_fgh_ does not specify particular data objects or task routines 2440 to be used in performances of the example job flow 2200_fgh_, the example instance log 2720_afg_2_h_ does include such details, as well as others, concerning the example performance 2700_afg_2_h_. Thus, the example instance log 2720_afg_2_h_ includes the job flow identifier 2221_fgh_ for the example job flow definition 2220_fgh_; the task routine identifiers 2441_f_, 2441_g_2 and 2441_h_ for the particular task routines 2440_f_, 2440_g_2 and 2440_h_, respectively, that were executed in the example performance 2700_afg_2_h_; the data object identifier 2331_a_ for the data set 2330_a_ used as an input data object; and the result report identifier 2771_afg_2_h_ for the result report 2770_afg_2_h_ generated during the example performance 2700_afg_2_h_. As has been discussed, the example instance log 2720_afg_2_h_ is intended to serve as a record of sufficient detail concerning the example performance 2700_afg_2_h_ as to enable all of the objects associated with the example performance 2700_afg_2_h_ to be later identified, retrieved and used to repeat the example performance 2700_afg_2_h_. In contrast, the job flow definition 2220_fgh_ is intended to remain relatively open-ended for use with a variety of data objects and/or with a set of task routines 2440 that may change over time as improvements are made to the task routines 2440.

Turning to FIG. 16E, and as previously discussed, in some embodiments, the input/output behavior of one or more of the task routines 2440 that have been selected to be executed in performing the job flow 2200_fgh_ may be verified by being monitored during the performance of the job flow 2200_fgh_, with the observed input/output behavior being compared to the expected input/output behavior. More specifically and as depicted as an example, the processor(s) 2550 may be caused by execution of the performance component 2544 of the control routine 2540 to instantiate a container 2565 within a federated area 2566. The processor(s) 2550 may then be further caused to execute the executable instructions 2447 of the task routine 2440_f_ within the execution environment of the container 2565 to enable monitoring of the input/output behavior that is caused to occur as a result, as well as to enable such input/output behavior to be compared to the input/output behavior that is expected. In so doing, the interface definitions 2224 within the job flow definition 2220_fgh_, the comments 2448 of the task routine 2440_f_, and/or the particular ones of the executable instructions 2447 that implement each of the depicted interfaces 2443 and 2444 of the task routine 2440*f*, may be employed by the performance component 2544 as a reference for those interfaces of the task routine 2440*f* from which the expected behavior may be derived.

In some embodiments, the instantiation of the container environment 2565 may be done to also create an execution environment for the task routine 2440*f* in which the expected input/output behavior is not simply monitored and compared to the expected behavior, but is actually also enforced upon the task routine 2440*f* such that any aberrant input/output behavior by the task routine 2440*f* is not allowed to be fully performed (e.g., attempted input/output accesses to data structures and/or input/output devices that go beyond the expected input/output behavior are prevented from actually taking place). Where the observed input/output behavior conforms to the expected input/output behavior, the input/output functionality of the task routine 2440*f* may be deemed to have been verified.

However, in some embodiments, and as is also depicted, it may also be that all task routines 2440 are to be executed within separate containers 2565 that are instantiated as part of a system for the allocation of processing, storage and/or other resources of one or more of the federated devices 2500. More specifically, it may be that at least the container 2565 in which the task routine 2440*f* is executed (again, as depicted as an example) is instantiated within one of multiple pods 2661 that may be instantiated under the control of the resource allocation routine 2641, and thus, may be referred to as "task pods" 2661*t* in recognition of their function. In such embodiments, it may be that such monitoring and/or enforcement of input/output behavior may still be imposed on the task routine 2440*f* by the execution environment within the container 2565. As will also be explained in greater detail, the depicted container 2565 may be one of two containers that are instantiated within each such task pod 2661*t*, with the other container (not shown) being instantiated to provide a separate execution environment for a messaging routine (also not shown) that serves to support messaging-based communications with at least the performance component 2544 through one or more message queues.

Regardless of whether the container 2565 enforces expected input/output behavior in addition to monitoring the input/output behavior that actually occurs, the results of the comparison between the observed input/output behavior and the expected input/output behavior (e.g., whether the input/output functionality of the task routine 2440*f* is verified, or not) may be recorded in any of a variety of ways. By way of example, in embodiments in which each task routine 2440 is stored within one or more federated areas 2566 through use of a database to enable more efficient retrieval of task routines 2440, the results of this comparison for the task routine 2440*f* may be marked in an entry maintained by such a database for the task routine 2440*f*. Alternatively or additionally, where a DAG 2270 is generated that includes a visual representation of the task routine 2440*f*, that representation may be accompanied by a visual indicator of the results of this comparison.

Turning to FIG. 16F, as previously discussed, in some embodiments, the combination of task routines 2440 that are executed during the performance of a job flow 2200 may include task routines with executable instructions 2447 and/or comments 2448 written in differing programming languages with the differing syntax, vocabulary, formatting and/or semantic features thereof. More specifically, and as depicted, the task routine 2440*f* may have been written in a primary programming language that is normally interpreted by the processor(s) 2550 of the one or more federated devices 2500 at runtime, such that the task routine 2440*f* is designated as task routine 2440*pf*. Therefore, within the task routine 2440*pf*, the executable instructions 2447*p* may be written in the primary programming language, and the comments 2448*p* may be written with the syntax used to distinguish comments from executable instructions in the primary programming language. As also depicted, the task routine 2440*g*2 may have been written in a secondary programming language, such that the task routine 2440*g*2 is designated as task routine 2440*sg*2. The secondary programming language may not be one that is normally interpreted by the processor(s) 2550, but may still be among a set of pre-selected secondary programming languages that the processor(s) 2550 may still be capable of interpreting during runtime, either in addition to or in lieu of the primary programming language. Therefore, within the task routine 2440*sg*2, the executable instructions 2447*s* may be written in the secondary programming language, and the comments 2448*s* may be written with the syntax used to distinguish comments from executable instructions in the secondary programming language.

As will be familiar to those skilled in the art, among the differences between different programming languages may be support for different data types and/or differences in array types, including differences in data types of items of data within arrays and/or differences in accessing items of data therein. Thus, although the executable instructions 2447*p* of the task routine 2440*pf* may have been written to implement the depicted data output interface 2443 to generate the mid-flow data set 2370*fg* as an output, and although the executable instructions 2447*s* of the task routine 2440*sg*2 may have been written to implement the depicted data input interface 2443 to receive the mid-flow data set 2370*fg* as an input, there may be differences in the form of the mid-flow data set 2370*fg* as it is output from the form of the mid-flow data set 2370*fg* that is needed to be accepted as input. More specifically, the mid-flow data set 2370 may be output in a form designated as the mid-flow data set 2370*pfg* that has one or more particular details of its structure being dictated by the use of the primary programming language in the executable instructions 2447p that differ somewhat from the form designated as the mid-flow data set 2370*sfg* that is needed to accommodate the use of the secondary programming language in the executable instructions 2447*s*.

To resolve such differences, the performance component 2544 may perform a conversion of data structure and/or data type (e.g., serialization or de-serialization) of the mid-flow data set 2370*fg* from its 2370*pfg* form to its 2370*sfg* form during runtime. More precisely, the performance component 2544 may temporarily instantiate a shared memory space 2665 within which one of these two forms of the mid-flow data set 2370 may be temporarily stored during the performance of the job flow 2200*fgh*. As has been discussed, it may be deemed desirable to store mid-flow data sets 2370 that are generated during the performance of a job flow as part of enabling a subsequent analysis of the performance of individual tasks of that job flow by having the mid-flow data sets thereof 2370 preserved in federated area(s) 2566 along with other objects associated with that job flow. With the particular programming language in which the executable instructions 2447*p* of the task routine 2440*pf* having been designated as the primary programming language, it may be deemed preferable to store the mid-flow data set 2370*fg* in the form 2370*pfg* in which it was output by the task routine

2440*pf*, and to not consume valuable storage space in a federated area 2566 by also storing the other form 2370*sfg*. Thus, while the mid-flow data set 2370*fg* may be persisted in a federated area 2566 in the form 2370*pfg*, the other form 2370*sfg* may be discarded as part of un-instantiating the shared memory space 2665 when the performance of the job flow 2200*fgh* is completed.

Turning to FIG. 16G, as previously discussed, it may be that portion(s) of one or more objects of a job flow 2200 were originally written in a secondary programming language that differs from the primary programming language that is relied upon by the processor(s) 2550 of the one or more federated devices 2500 to perform job flows 2200. In such situations, and as will be discussed in more detail, such portions of such objects may be translated from such a secondary programming language and to the primary programming language, and this may result in the generation of a translated form of each of such objects in which the portion(s) written in the secondary programming language are replaced with corresponding portions in the primary programming language. It may be deemed desirable to be able to trace where a translated form of an object came from by including an identifier of the original form of the object from which the translated form was generated.

More specifically, it may be that portions of the job flow definition 2220*fgh* introduced in FIG. 16A were originally written in a secondary programming language as the job flow definition 2220*sfg*h. As depicted, such portions may include the depicted interface definitions 2224*s* (which may include the organization definitions 2223*s*) and/or the GUI instructions 2229*sfg*h. As depicted, such portions may be translated from the secondary programming language to the primary programming language that will be utilized during the performance 2700*afg*2*h* (e.g., the interface definitions 2224*s* and/or the GUI instructions 2229*sfg*h may be translated to generate the interface definitions 2224*p* and/or the GUI instructions 2229*pfg*h, respectively). In so doing, a form of the job flow definition 2220*fgh* written in the primary programming language as the job flow definition 2220*pfg*h may be generated from the secondary form 2220*sfg*h. As a measure to enable accountability for the accuracy of the translation(s) that are so performed, the primary form 2220*pfg*h may be generated to additionally include the job flow identifier 2221*sfg*h that identifies the secondary form 2220*sfg*h. Additionally, it may be that the secondary form 2220*sfg*h is maintained in a federated area 2566 along with the primary form 2220*pfg*h.

It may also be that other portions of the job flow definition 2220*sfg*h may be written in the secondary programming language in the sense that they are written as comments that are written in a manner that adheres to the syntax of the secondary programming languages as comments. Thus, while not actually including executable instructions, such other portions may still be regarded as having been written in the secondary programming language. As depicted, such other portions may include the depicted job flow identifier 2221*sfg*h and/or the flow definition 2225*s*. As also depicted, such other portions may be translated from the secondary programming language to the primary programming language that will be utilized during the performance 2700*afg*2*h* (e.g., the job flow identifier 2221*sfg*h and/or the flow definition 2225*s* may be translated to generate the job flow identifier 2221*pfg*h and/or the flow definition 2225*p*, respectively). More precisely, the syntax of such portions may be translated from the syntax for comments written in the secondary programming language and into the syntax for comments written in the primary programming language.

Turning to FIG. 16H, and as previously discussed, in some embodiments, the processing resources of multiple storage devices 2600 may be employed to perform a job flow (e.g., the job flow 2200*fgh*) as an approach to avoiding the transmission of a large data set (e.g., the flow input data set 2330*a*) from the multiple storage devices 2600 and to the one or more federated devices 2500 to enable the processing resources of the one or more federated devices 2500 to be so used. Again, making such use of the processing resources of the multiple storage devices 2600 may be deemed desirable to avoid incurring the overhead of transmitting such a large data set to the one or more federated devices 2500, as the incurring of such overhead may overwhelm any benefit that may be realized by using what may be superior processing resources incorporated into the one or more federated devices 2500.

However, as also previously discussed, while such a large data set may be stored in a manner that spans multiple storage devices 2600 such that each of those multiple storage devices 2600 has local access to at least one block of that data set, other objects required to perform the job flow may be sufficiently small in size (e.g., smaller than a predetermined threshold size) that they may each have been stored as an undivided object within storage space provided by a single storage device 2600. As a result, such smaller objects may be stored in different storage devices 2600 and/or in storage device(s) 2600 other than any of the multiple storage devices 2600 in which the blocks of the data set are stored. Still further, it may be that none of the multiple storage devices 2600 currently store any copies of any routine that may be required to control and/or cause the performance of a job flow (e.g., the performance component 2544 of the control routine 2540).

To address such issues, the one or more federated devices 2500 may retrieve each of the other (smaller) objects required to perform the job flow, and may generate a container 2565 within which the one or more federated devices may include the other objects (e.g., the job flow definition 2220*fgh* and one or more task routines, such as the task routine 2440*f*, as depicted) within the container 2565, along with a copy of such routines (e.g., the performance routine 2544, as depicted). The one or more federated devices 2500 may then transmit a copy of the container 2565, including all of such contents, to each of the multiple storage devices 2600 in which a block of the large data set is stored to enable the multiple storage devices 2600 to perform the job flow, at least partially in parallel, using the block(s) of the large data set locally stored within each as an input.

As has additionally been discussed, as a result of such at least partially parallel performances by each of the multiple storage devices 2600, a block of data of another data set may be generated (e.g., the depicted data object block 2376*fg*) within each of the multiple storage devices 2600 for each block of the large data set that is stored therein (e.g., for each one of the depicted data object block 2336*d*). As part of storing the data object to which these newly generated blocks belong (e.g., the depicted mid-flow data set 2370*fg*), each of these newly generated blocks may be provided to the one or more federated devices 2500 to be assembled together (e.g., in a reduction operation) to form a newly generated data object. The one or more federated devices 2500 may then analyze the resulting assembled data object to determine whether it is to be stored as an undivided object or in a distributed manner (e.g., whether its size is large enough to warrant being stored in a distributed manner).

Turning for FIG. 16I, a new job flow that employs neuromorphic processing (i.e., uses a neural network to implement a function) may be derived from an existing job flow that does not employ neuromorphic processing (i.e., does not use a neural network, and instead, uses the execution of a series of instructions to perform the function). This may be done as an approach to creating a new job flow that is able to be performed much more quickly (e.g., by multiple orders of magnitude) than an existing job flow by using a neural network in the new job flow to perform one or more tasks much more quickly than may be possible through the non-neuromorphic processing employed in the existing job flow. However, as those skilled in the art will readily recognize, such a neural network may need to be trained, and neuromorphic processing usually requires the acceptance of some degree of inaccuracy that is usually not present in non-neuromorphic instruction-based processing in which each step in the performance of a function is explicitly set forth with executable instructions.

Such training of a neural network of such a new job flow may entail the use of a training data set that may be assembled from data inputs and data outputs of one or more performances of an existing job flow. Such a training data set may then be used, through backpropagation and/or other neuromorphic training techniques, to train the neural network. Further, following such training, the degree of accuracy of the neural network in one or more performances of the new job flow may be tested by comparing data outputs of the existing and new job flows that are derived from identical data inputs provided to each. Presuming that the new job flow incorporating use of the neural network is deemed to be accurate enough to be put to use, there may still, at some later time, be an occasion where the functionality and/or accuracy of the new job flow and/or the neural network may be deemed to be in need of an evaluation. On such an occasion, as an aid to ensuring accountability for the development of the new job flow and/or the neural network, it may be deemed desirable to provide an indication of what earlier job flow(s) and/or data object(s) were employed in training and/or in testing the new job flow and/or the neural network.

FIG. 16I provides a view of aspects of a example job flow 2200*jk* that employs neuromorphic processing (i.e., employs one or more neural networks), an example job flow definition 2220*jk* that defines the job flow 2200*jk*, an example performance 2700*ajk* of the job flow 2200*jk*, and a corresponding example instance log 2720*ajk* that documents the performance 2700*ajk*. This view is similar to the view provided by FIG. 16A of aspects of the earlier discussed example job flow 2200*fgh* that does not employ neuromorphic processing (i.e., employs no neural networks), the job flow definition 2220*fgh* that defines the job flow 2200*fgh*, the example performance 2700*afg*2*h* of the job flow 2200*fgh*, and the example instance log 2720*afg*2*h* that documents the performance 2700*afg*2*h*. As depicted in FIG. 16I, the job flow definition 2220*jk* may be defined to include a first task able to be performed by a task routine 2440*j* that entails the use of neural configuration data 2371*j*, and a second task able to be performed by a task routine 2440*k*. The task performable by the task routine 2440*j* may be that of using the neural network configuration data 2371*j* to instantiate a one or more neural networks (not specifically shown), and the task performable by the task routine 2440*k* may be that of using those one or more neural networks to cause the job flow 2200*jk* to perform the same function as the job flow 2200*fgh*.

The neural network configuration data 2371*j* may define hyperparameters and/or trained parameters that define at least one neural network employed in the job flow 2200*jk* after the at least one neural network has been trained. By way of example, the neural network configuration data 2371*j* may define hyperparameters and/or trained parameters for each neural network in an ensemble of neural networks (e.g., a chain of neural networks). Regardless of how many neural networks are associated with the neural network configuration data 2371*j*, the neural network configuration data 2371*j* may be deemed and/or handled as an integral part of the depicted example task routine 2440*j* for purposes of storage among one or more federated areas 2566. In such embodiments, the executable instructions 2447 of the task routine 2440*j* may include some form of link (e.g., a pointer, identifier, etc.) that refers to the neural network configuration data 2371*j* as part of a mechanism to cause the retrieval and/or use of the neural network configuration data 2371*j* alongside the task routine 2440*j*. Alternatively, in such embodiments, the task routine 2440*j* may wholly integrate the neural network configuration data 2371*j* as a form of directly embedded data structure.

However, in other embodiments, the neural network configuration data 2371*j* may be incorporated into and/or be otherwise treated as a mid-flow data set 2370*j* that may be stored among multiple data sets 2330 and/or 2370 within one or more federated areas 2566, including being subject to at least a subset of the same rules controlling access thereto as are applied to any other data set 2330 and/or 2370. In such other embodiments, the same techniques normally employed in selecting and/or specifying a data set 2330 or 2370 as an input to a task routine 2440 in a performance of a job flow 2200 may be used to specify the neural network configuration data 2371*j* as the mid-flow data set 2370*j* serving as an input to the task routine 2440*j*. In this way, the at least one neural network defined by the configuration data 2371*j* may be given at least some degree of protection against deletion, may be made available for use in multiple different job flow flows (including other job flows that may perform further training of that at least one neural network that yield improved versions that may also be so stored), and/or may be documented within one or more instance logs as having been employed in one or more corresponding performances of job flows 2200.

It should be noted that, although the neural network configuration data 2371*j* is depicted and discussed herein as being designated and treated as the depicted mid-flow data set 2370*j*, this is in recognition of the possibility that, within a job flow 2200, one task routine 2440 may generate, in a training process, the neural network configuration data 2371*j* as a mid-flow data set 2370*j* for use by another task routine 2440 within the same job flow 2200. By way of example, a job flow 2200 may initially use the neural network configuration data 2371*j* as is, but may then cease that initial use and initiate a training mode in which the neural network configuration data 2371*j* is modified as a result of further training in response to a condition such as a failure to meet a threshold of accuracy during that initial use. However, other embodiments are possible in which the neural network configuration data 2371*j* is generated within one job flow 2200 for use by one or more other job flows 2200, and/or is generated in an entirely different process that is not implemented as a job flow 2200 made up of multiple tasks that are performed by the execution of multiple task routines 2440. Thus, other embodiments are possible in which the neural network configuration data 2371*j* may be more appropriately regarded as having been generated as a result report 2770 in the performance of a job flow 2200 and/or may be more appropriately regarded as a flow input data set 2330 to a job flow 2200.

It should also be noted that, although a single instance of neural network configuration data 2371 has been discussed as being treated as a data object (e.g., a data set 2330 or 2370, or a result report 2770), other embodiments are possible in which a single data object includes multiple instances of neural network configuration data 2371. This may be deemed desirable as a mechanism to keep together the hyperparameters and/or the trained parameters of a set of multiple neural networks that are to be used together to perform a function, such as an ensemble of neural networks. More precisely, while it may be that each neural network of a set of multiple neural networks is trained separately and/or sequentially, it may be deemed necessary to ensure success in using those multiple neural networks together by keeping the neural network configuration data 2371 for each of those neural networks together. In this way, a situation in which the neural network configuration data 2371 for a subset of those neural networks is errantly deleted may be avoided, as well as avoiding a situation in which older and newer versions of the neural network configuration data 2371 for different ones of those multiple neural networks are errantly used together.

As also depicted in FIG. 16I, the job flow definition 2220*jk* of the example job flow 2200*jk* may include the job flow identifier 2221*fgh* as a form of link to the job flow definition 2220*fgh* that defines the example job flow 2200*fgh*. Such a link to the job flow definition 2220*fgh* may be provided in the job flow definition 2220*jk* in a situation where one or more performances (i.e., the example performance 2700*afg*2*h*) of the job flow 2200*fgh* were used in training and/or in testing the at least one neural network of the job flow 2200*jk*. Alternatively or additionally, the instance log 2720*ajk* that documents aspects of the example performance 2700*afk* of the example job flow 2200*jk* may include the instance log identifier 2721*afg*2*h* as a link to the instance log 2720*afg*2*h* that documents the example performance 2700*afg*2*h*. Such a link to the instance log 2720*afg*2*h* may be provided in the instance log 2720*ajk* in a situation where the performance 2700*afg*2*h* was used in training and/or in testing the at least one neural network of the job flow 2200*jk*. Through the provision of such links, the fact that the job flow 2200*fgh* and/or the specific performance 2700*afg*2*h* was used in training and/or in testing the at least one neural network of the job flow 2200*jk* may be readily revealed, if at a later date, the job flow definition 2220*jk* and/or the instance log 2720*ajk* are retrieved and analyzed as part of a later evaluation of the job flow 2200*jk*. In this way, some degree of accountability for how the at least one neural network of the job flow 2200*jk* was trained and/or tested may be ensured should such training and/or testing need to be scrutinized.

Returning to both FIGS. 16A and 16I, as depicted, either or both of the example job flow definitions 2220*fgh* or 2220*jk* may additionally include GUI instructions 2229*fgh* or 2229*jk*, respectively. As previously discussed, such GUI instructions 2229 incorporated into a job flow definition 2220 may provide instructions for execution by a processor to provide a job flow GUI during a performance of the corresponding job flow 2200. As earlier discussed, a job flow definition 2220 may include flow task identifiers 2241 that identify the tasks to be performed, but not particular task routines 2440 to perform those tasks, as a mechanism to enable the most current versions of task routines 2440 to be used to perform the tasks. As also earlier discussed, a job flow definition 2220 may also define data interfaces 2223 in a way that specifies characteristics of the inputs and/or outputs for each task to be performed, but may not specify any particular data object 2330 as an approach to allowing data objects 2330 that are to be used as inputs to a performance to be specified at the time a performance is to begin. Through execution of GUI instructions 2229, a job flow GUI may be provided that guides a user through an opportunity to specify one or more of the data objects 2330 that are to be used as inputs. Alternatively or additionally, a job flow GUI may be provided to afford a user an opportunity to specify the use of one or more particular task routines 2440 as part of an effort to analyze the accuracy and/or other aspects of a performance of a job flow 2200. By way of example, the GUI instructions 2229*jk*, when executed, may provide a user an opportunity to specify the mid-flow data set 2370*j* or another data object 2330, 2370 or 2770 as the one that should be used to provide the neural network configuration data 2371*j* to be used to instantiate the at least one neural network to be used in a performance of the job flow 2200*jk*.

Turning to FIG. 16J, as has been discussed, DAGs 2270 may be generated to provide visual representations of various objects, including to highlight various details thereof, such as error conditions preventing their storage and/or use. Again, such objects include task routines 2440, job flow definitions 2220 and/or instance logs 2720. As exemplified using the job flow definition 2220*fgh* and an associated DAG 2270*fgh*, at least where a DAG 2270 is generated to provide a visual representation of a job flow described by a job flow definition 2220, such a DAG 2270 may be generated from that job flow definition 2220 to include most, if not all, of the same pieces of information concerning that job flow as are needed within that job flow definition 2220 to enable the job flow definition 2220 to be used in a performance of the job flow.

Thus, as depicted, the DAG 2270*fgh* may include the job flow identifier 2221*fgh*, the flow definition 2225 and the interface definitions 2224, as does the job flow definition 2220*fgh*, although the DAG 2270*fgh* may not include the GUI instructions 2229*fgh* that may be included within the job flow definition 2220*fgh*. However, as also depicted, while the DAG 2270*fgh* may have much of the same content as the job flow definition 2220*fgh*, the formatting and/or syntax of that content may differ therebetween. More specifically, the fact that the job flow definition 2220*fgh* is meant to be used in the performance of the job flow that it describes may lead to at least the interface definitions 2224 being written in a selected programming language (e.g., the SAS programming language), and may additionally lead to the job flow identifier 2221*fgh* and/or the flow definition 2225 being written to at least conform to the syntax used for comments in the same selected programming language. Also, the fact that the DAG 2270*fgh* is meant to be used to provide a visual representation of a job flow 2200 may lead to one or more of the job flow identifier 2221*fgh*, the flow definition 2225 and the interface definitions 2224 being written in a selected form of notation for the description of processes (e.g., BPMN). However, it should be noted that other embodiments are possible in which the job flow definition 2220*fgh* and the DAG 2270*fgh* are written using the same language and syntax such that the job flow definition 2220*fgh* and the DAG 2270*fgh* may be directly interchangeable (although the DAG 2270*fgh* may be generated to include a subset of the contents of the job flow definition 2220*fgh*, such that it may not include such items as the GUI instructions 2229*fgh*). Indeed, in some of such embodiments, it may be that the job flow definition 2220*fgh* and the DAG 2270*fgh* are one and the same object as stored within a federated area 2566.

Regardless of whether the contents of job flow definitions 2220 and their corresponding DAGs 2270 are written in the same language, the fact that DAGs 2270 generated to provide visual representations of job flow definitions 2220 include many (if not all) of the same pieces of information may enable job flow definitions 2220 to be generated from such DAGs 2270 just as easily as such DAGs 2270 may be directly generated from job flow definitions 2220. As will be explained in greater detail, advantage may be taken of this interchangeability between job flow definitions 2220 and such DAGs 2270 to enable new job flow definitions 2220 that describe entirely new job flows to be generated graphically by personnel who entirely lack programming skills. More specifically, a new job flow definition 2220 may be created by personnel though use of a graphical editor in which such personnel graphically create a DAG 2270 that may also serve as the new job flow definition 2220 or from which the new job flow definition 2220 may be automatically generated. In some of such embodiments, it may be that such a graphical editor is used to combine at least portions of multiple preexisting job flows to form a new job flow (e.g., the previously discussed "superset" job flow) as a DAG 2270 from which a corresponding job flow definition 2220 may be automatically generated.

Turning to FIG. 16K, in some embodiments, the interface definitions 2224 within the job flow definition 2220*fgh* may be derived as part of the generation of the DAG 2270*fgh* based on comments 2448 about the interfaces 2443/2444 and/or based on portions of the executable instructions 2447 that implement the interfaces 2443/2444 within the task routines 2440*f*, 2440*g*2 and 2440*h*. More specifically, it may be that the job flow definition 2220*fgh* is at least partially generated from a parsing of comments 2448 and/or of portions of the executable instructions 2447 descriptive of the input and/or output interfaces 2443 and/or 2444 of one or more task routines 2440 that perform the functions of the job flow 2200*fgh* that the job flow definition 2220*fgh* is to define. In some embodiments, and as depicted, information concerning input and/or output interfaces 2443 and/or 2444 from each of the task routines 2440*f*, 2440*g*2 and 2440*h* may be stored, at least temporarily, as macros 2470*f*, 2470*g*2 and 2470*h*, respectively, although it should be noted that other forms of intermediate data structure may be used in providing intermediate storage of information concerning inputs and/or outputs. With all of such data structures having been generated, the information within each that concerns input and/or output interfaces 2443 and/or 2444 may then be used to generate the DAG 2270*fgh* to include the interface definitions 2224. And it may be that, from the interface definitions 2224, at least a portion of the flow definition 2225 is able to be derived.

Figure 17A:
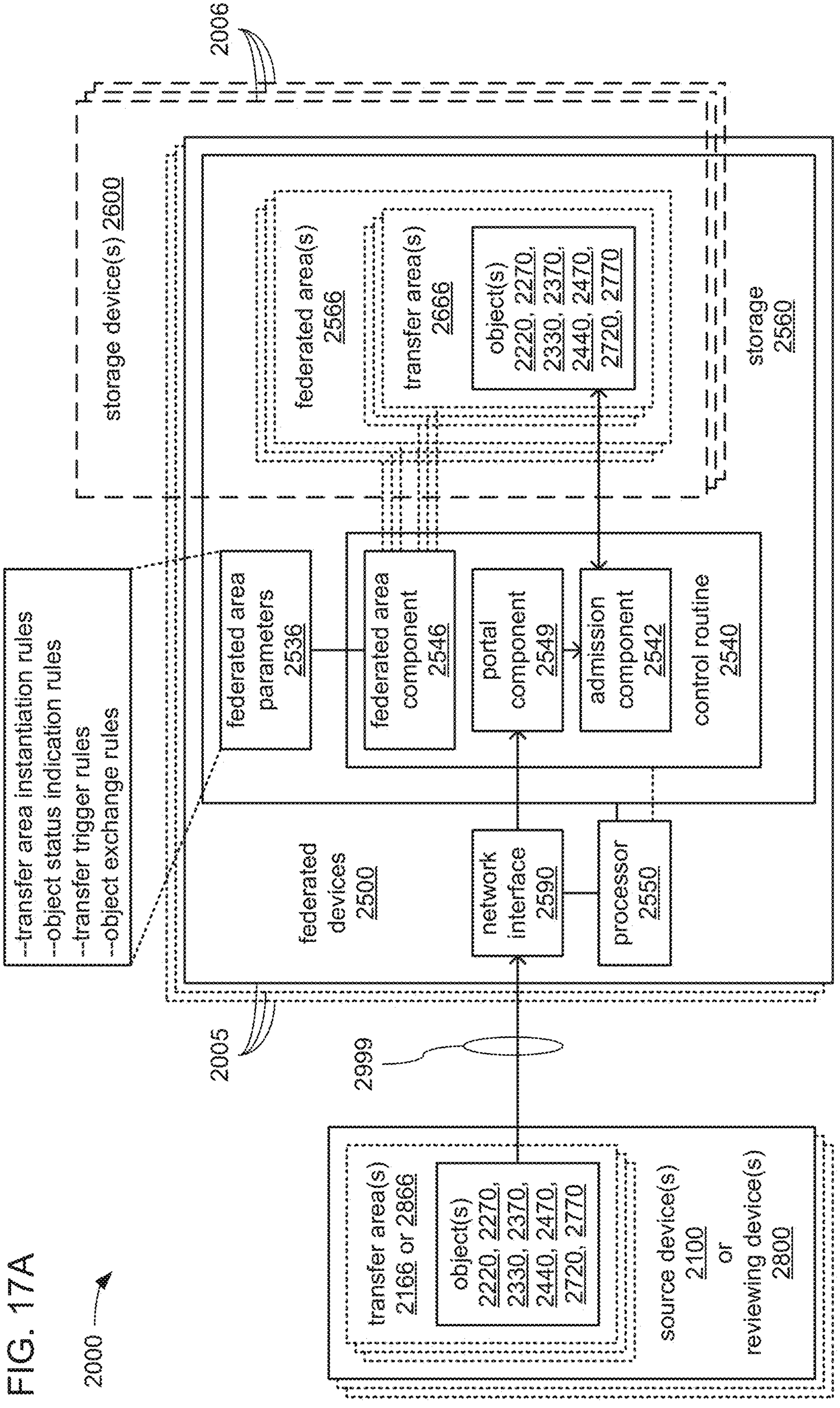
Figure 17B:
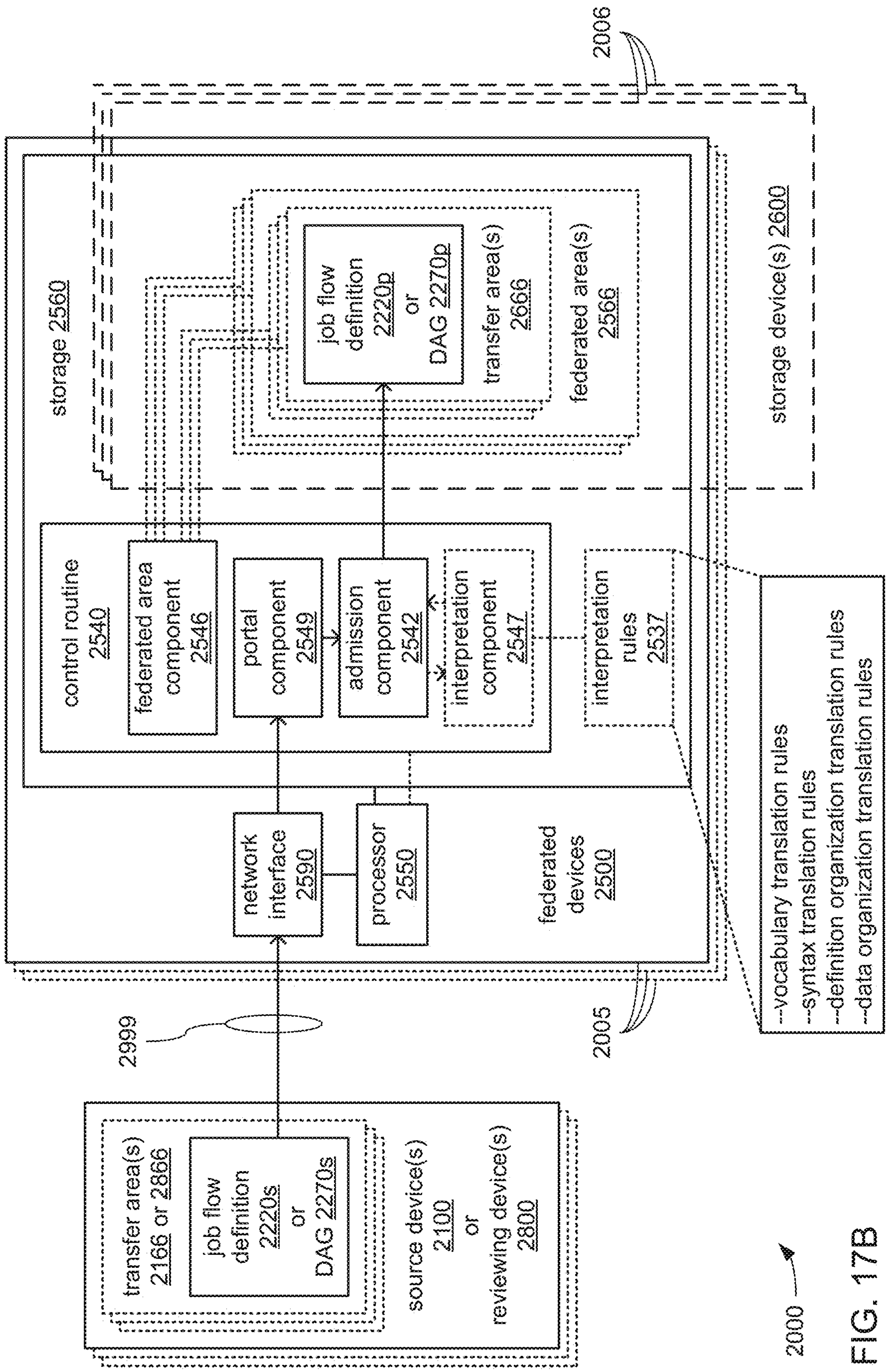
Figure 17D:
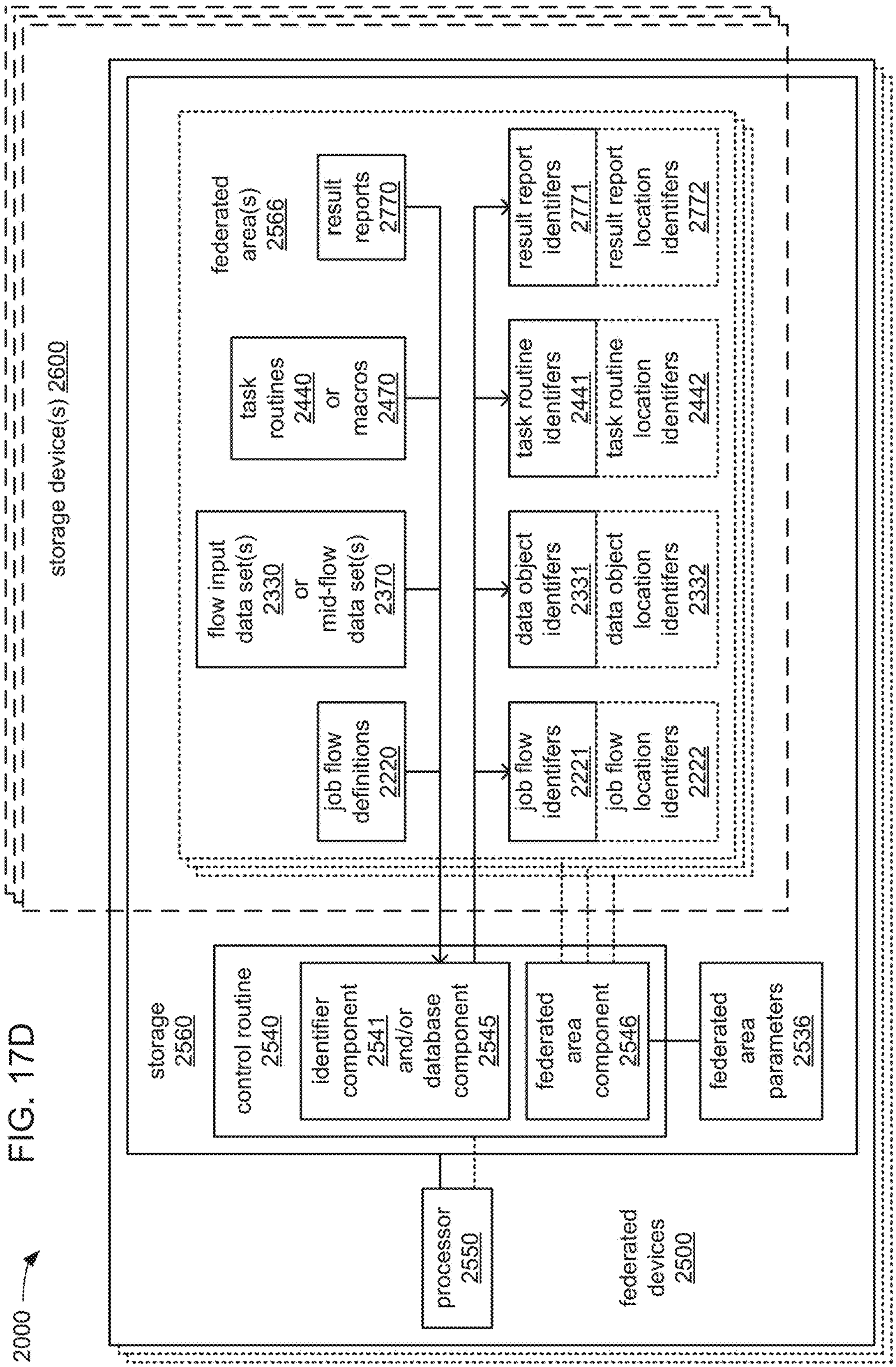
Figure 17E:
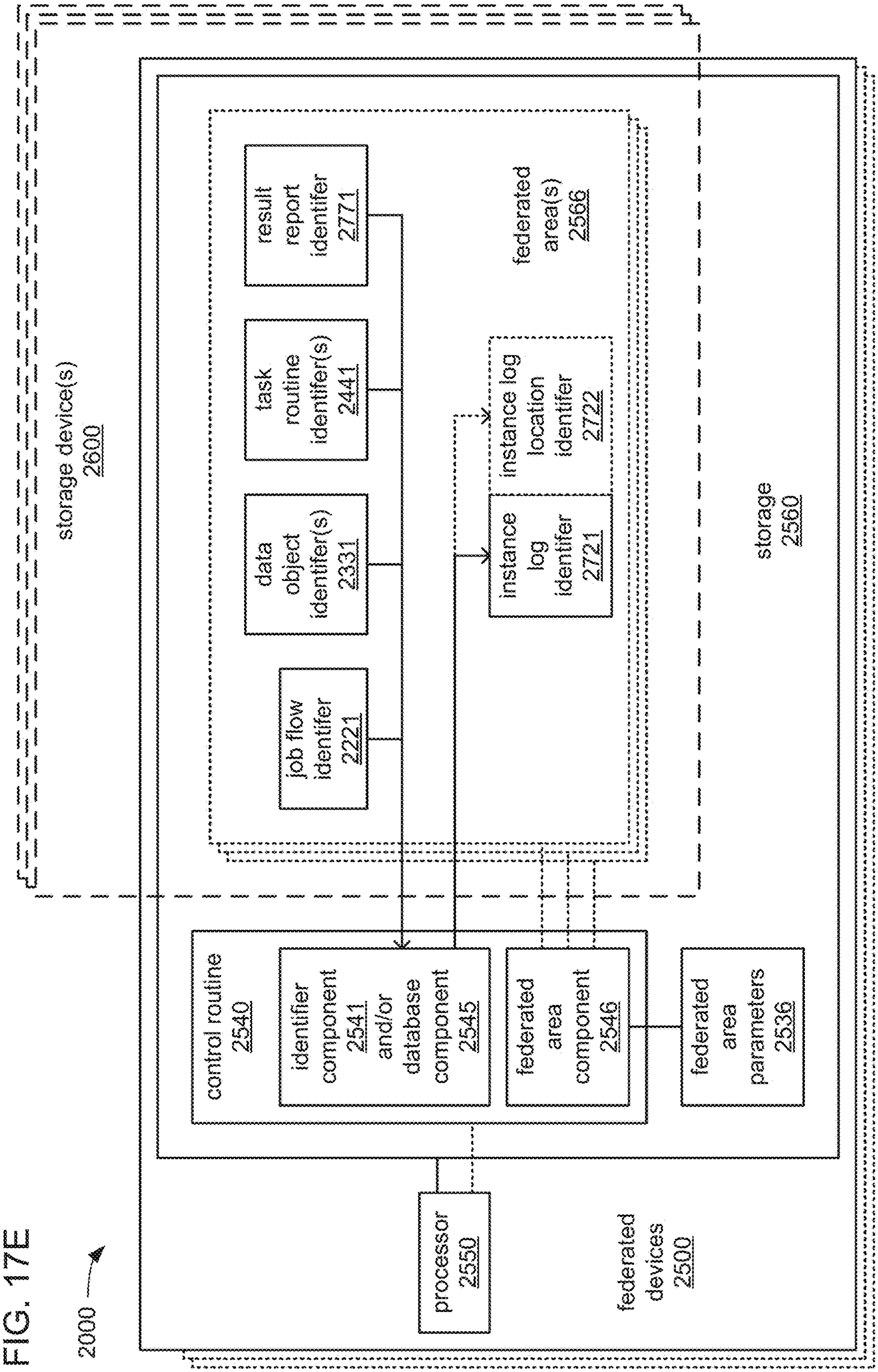
Figure 17F:
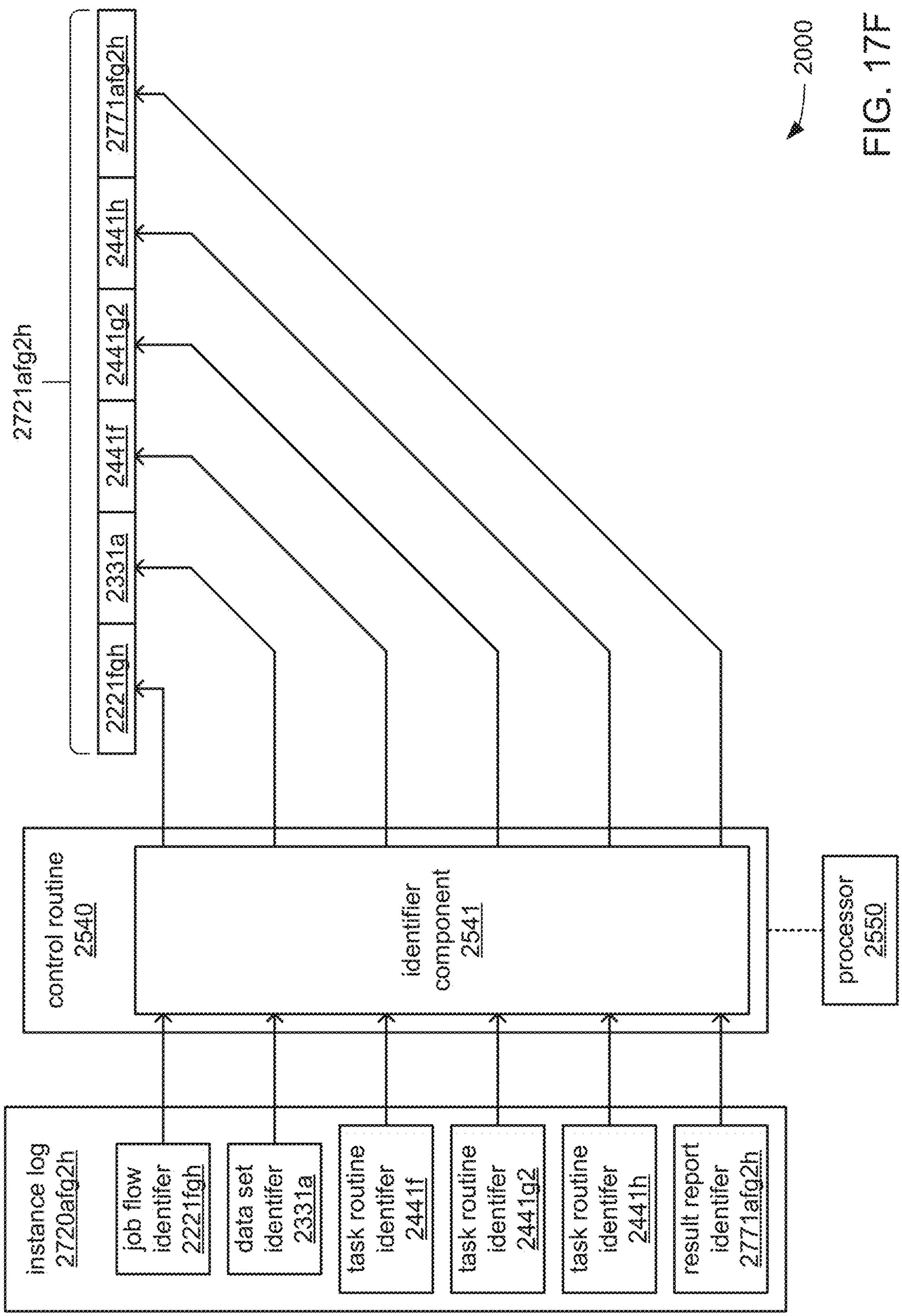

FIGS. 17A, 17B, 17C, 17D, 17E and 17F, together, illustrate the manner in which the one or more federated devices 2500 may selectively store and organize objects within one or more federated areas 2566. FIGS. 17A-C, together, illustrate aspects of the selective translation or conversion, of objects received from one or more source devices 2100, or from one or more reviewing devices 2800, as well as storage of those objects within the one or more federated areas 2566. FIGS. 17D-F, together, illustrate aspects of assigning identifiers to objects stored within the one or more federated areas 2566.

Turning to FIG. 17A, as previously discussed, the one or more federated devices 2500 may receive objects (e.g., job flow definitions 2220, DAGs 2270, flow input data sets 2330, mid-flow data sets 2370, task routines 2440, macros 2470, instance logs 2720 and/or result reports 2770) from other devices 2100 and/or 2800 as part of an exchange of objects in response to a request to perform any of a variety of operations. Again, in executing the portal component 2549, the processor(s) 2550 of the one or more federated devices 2500 may be caused to operate one or more of the network interfaces 2590 to provide a portal accessible by other devices via the network 2999, and through which access may be granted by the processor(s) 2550 to the one or more federated areas 2566. Also again, any of a variety of network and/or other protocols may be used. Such requests may include requests to store one or more objects transmitted therewith and/or for which pointer(s) may be transmitted therewith; and/or requests to perform one or more job flows and/or one or more individually specified tasks using one or more objects transmitted therewith and/or for which pointer(s) may be transmitted therewith.

Alternatively, and as also previously discussed, the one or more federated devices 2500 may receive objects as a result of an ongoing synchronization relationship instantiated between one or more transfer areas 2666 within one or more federated areas 2566 and one or more other transfer areas 2166 or 2866 within a storage 2160 or 2860, respectively. For each such transfer area 2666, the processor(s) 2550 of the one or more federated devices 2500 may be caused by the federated area component 2546 to refer to the federated area parameters 2536 for parameters in instantiating the transfer area 2666 within a federated area 2566, such as minimum and/or maximum size of the transfer area 2666 and/or minimum or maximum percentage of the space within a federated area 2566 that is to be occupied by the transfer area 2666. Other parameters that may be retrieved from the federated area parameters 2536 may be specifications of one or more types of cooperation that may be used with the other device 2100 or 2800 with which a synchronization relationship is instantiated, such as whether the earlier described polling or volunteering approaches are to be used, and/or at what minimum and/or maximum interval of time is to be allowed to elapse between each instance of exchange of status of objects within transfer areas. Other parameters that may be so retrieved may include specifications of a minimum or maximum quantity of objects to be exchanged when a transfer between transfer areas occurs.

Still another parameter concerning exchanges of objects between a transfer area 2666 within a federated area 2566 and a transfer area 2166 or 2866 within a storage 2160 or 2860, respectively, that may be retrieved from the federated area parameters 2536 may be a specification for what minimum conditions must be met for such an automated transfer of objects to be triggered. In some embodiments, the trigger may be one or more of a minimum degree of change in an object (e.g., a minimum percent change in size of a data object or a minimum extent of change in executable instructions of a task routine 2440), and/or a minimum number of objects that must be involved in a change in status. Alternatively or additionally, in other embodiments, the trigger for such an automated transfer may be a maximum amount of time to allow to elapse until the next exchange of object(s) since the detection of a change in status of any object.

Alternatively or additionally, and by way of example in still other embodiments, the trigger may be associated with occurrences of objects being "checked in" and/or "committed" in a formalized source code management system. More specifically, and as will be familiar to those skilled in the art, where multiple developers are collaborating to develop programming code for an analysis or other type of executable program, a source code management system may be put into place to improve coordination thereamong. Such a source code management system may enforce some degree of control over which developer and/or how many developers may be work with each one of different portions of executable instructions at the same time as a proactive measure to avoid having different developers making conflicting changes to the same portion of executable instructions. A developer may be required to "check out" a portion of executable instructions from the source control management system to be allowed to make changes thereto, and this may serve to cause other developers to be prevented from also checking out that same portion until the developer to which that portion is check out subsequently "checks in" that same portion. Alternatively or additionally, such a source code management system may track the changes made to different portions of executable instructions by different developers as a way to provide the ability to roll back changes made by any one developer to a portion of executable instructions that is found to "break" the ability to compile and/or interpret the executable instructions of the analysis or other routine. There may be a compiling of the executable instructions of the analysis or other routine on a recurring interval of time which may be used as a mechanism to identify changed portions of executable instructions that at least do not break the compiling of the full set of executable instructions such that they are deemed acceptable to remain as part of the full set of executable instructions such that those changes are deemed to be "committed" changes to the full set of executable instructions.

It may be that a portion of the storage 2160 of a source device 2100 or a portion the storage 2860 of a reviewing device 2800 is employed as the storage at which a source code management system maintains a copy of all of the executable instructions of an analysis routine or other routine under development by multiple developers who do not use the one or more federated area(s) 2566 maintained by the one or more federated devices 2500. Such developers may not have been granted access to a federated area 2566 and/or they may not be familiar with the use of federated areas 2566. Meanwhile, there may also be other developers also involved in developing the same analysis or other routine who do have access to and/or are familiar with the one or more federated areas 2566 maintained by the one or more federated devices 2500. Such other developers may at least partly rely on the enforcement of rules for the storage of objects in federated areas 2566 as a mechanism to similarly instill a degree of order in their collaboration among themselves in developing portions of the analysis or other routine. Thus, in this example embodiment, there may be two different sets of developers collaborating on the development of the same analysis or other routine who are using two separate systems of source code management to aid in coordinating their efforts.

As part of enabling collaboration between these two different groups of developers, as well as their differing systems of source code management, the portion of the storage 2160 or 2860 of the device 2100 or 2800 within which the source code management system maintains a copy of all of the executable instructions may be additionally designated as one or more transfer areas 2166 or 2866, respectively. Correspondingly, at least a portion of one or more federated areas 2566 that have been designated as the location in which portions of the executable instructions of the analysis or other routine may also be stored may each be similarly designated as a transfer area 2666, and a synchronization relationship may be instantiated between each such transfer area 2666 and a counterpart other transfer area 2166 or 2866. With these transfer areas and their synchronization relationship(s) having been instantiated, it may be that the processor(s) 2550 of the one or more federated devices 2500 are caused to cooperate with the processor(s) 2150 of the device 2100 in which the transfer area(s) 2166 are instantiated, or the processor(s) of the device 2800 in which the transfer area(s) 2866 are instantiated, to use instances in which changes to portions of executable instructions have been "committed" or at least "checked in" as a trigger to cause the transfer of the affected object(s) (e.g., job flow definitions 2220 and/or task routines 2440 that contain the changed executable instructions) between a transfer area 2666 and a corresponding other transfer area 2166 or 2866, respectively. In this way, collaboration among these two different groups of developers may be enabled through collaboration between the systems that each relies upon to coordinate their development efforts in this example embodiment.

As also previously discussed, the processor(s) 2550 of the one or more federated devices 2500 may selectively allow or disallow each received request (including a requests to instantiate a synchronization relationship) based on determinations of whether each of those requests is authorized. Again, and more precisely, the processor(s) 2550 of the one or more federated devices 2500 may be caused by the portal component 2549 to restrict what persons, devices and/or entities are to be given access to one or more federated areas 2566. It should be noted that, in alternate embodiments, such control over whether access is granted may be exerted by another device (not shown) that may be interposed between the one or more federated devices 2500 and the network 2999 to serve as a gateway that controls access to the one or more federated devices 2500, and thereby, controls access to the one or more federated areas.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. Again, the portal data 2539 may indicate that different persons and/or different devices associated with a particular scholastic, governmental or business entity are each to be allowed different degrees and/or different types of access. One such person or device may be granted access to retrieve objects from within a federated area 2566, but may not be granted access to alter or delete objects, while another particular person operating a particular device may be granted a greater degree of access that allows such actions. In embodiments in which there is a per-object control of access, the one or more federated devices 2500 (or the one or more other devices that separately control access) may cooperate with the one or more storage devices 2600 (if present) to effect such per-object access control.

Regardless of the exact manner in which objects may be received by the one or more federated devices from other devices, and as also previously discussed, the processor(s) 2550 of the one or more federated devices 2500 may be caused by the admission component 2542 to impose various restrictions on what objects may be stored within a federated area 2566, presuming that the processor(s) 2550 have been caused by the portal component 2549 to grant access in response to the received request to store objects. Some of such restrictions may be based on dependencies between objects and may advantageously automate the prevention of situations in which one object stored in a federated area 2566 is rendered nonfunctional as a result of another object having not been stored within the same federated area 2566 or within a federated area 2566 that is related through an inheritance relationship such that it is unavailable.

By way of example, and as previously explained, such objects as job flow definitions 2220 include references to tasks to be performed. In some embodiments, it may be deemed desirable to prevent a situation in which there is a job flow definition 2220 stored within a federated area 2566 that describes a job flow that cannot be performed as a result of there being no task routines 2440 stored within the same federated area 2566 and/or within a related federated area 2566 that are able to perform one or more of the tasks specified in the job flow definition 2220. Thus, where a request is received to store a job flow definition 2220, the processor(s) 2550 may be caused by the admission component 2542 to first determine whether there is at least one task routine 2440 stored within the same federated area 2566 and/or within a related federated area 2566 to perform each task specified in the job flow definition. If there isn't, then the processor(s) 2550 may be caused by the admission component 2542 to disallow storage of that job flow definition 2220 within that federated area 2566, at least until such missing task routine(s) 2440 have been stored therein and/or within a related federated area 2566 from which they would be accessible through an inheritance relationship. In so doing, and as an approach to improving ease of use, the processor(s) 2550 may be caused to transmit an indication of the reason for the refusal to inform an operator of the source device 2100 of what can be done to remedy the situation.

Also by way of example, and as previously explained, such objects as instance logs 2720 include references to such other objects as a job flow definition, task routines executed to perform tasks, and data objects employed as inputs and/or generated as outputs. In some embodiments, it may also be deemed desirable to avoid a situation in which there is an instance log 2720 stored within a federated area 2566 that describes a performance of a job flow that cannot be repeated as a result of the job flow definition 2220, one of the task routines 2440, or one of the data objects referred to in the instance log 2720 not being stored within the same federated area 2566 and/or within a related federated area 2566 from which they would also be accessible. Such a situation may entirely prevent a review of a performance of a job flow. Thus, where a request is received to store an instance log 2720, the processor(s) 2550 of the one or more federated devices 2500 may be caused by the admission component 2542 to first determine whether all of the objects referred to in the instance log 2720 are stored within the same federated area 2566 and/or a related federated area 2566 in which they would also be accessible, thereby enabling a repeat performance using all of the objects referred to in the instance log 2720. If there isn't then the processor(s) 2550 may be caused by the admission component 2542 to disallow storage of that instance log 2720 within that federated area 2566, at least until such missing object(s) have been stored therein and/or within a related federated area 2566. Again, as an approach to improving ease of use, the processor(s) 2550 may be caused to transmit an indication of the reason for the refusal to inform an operator of the source device 2100 of what can be done to remedy the situation, including identifying the missing objects.

Additionally by way of example, and as previously explained, such objects as job flow definitions 2220 may specify various aspects of interfaces among task routines, and/or between task routines and data objects. In some embodiments, it may be deemed desirable to prevent a situation in which the specification in a job flow definition 2220 of an interface for any task routine that may be selected to perform a specific task does not match the manner in which that interface is implemented in a task routine 2440 that may be selected for execution to perform that task. Thus, where a request is received to store a combination of objects that includes both a job flow definition 2220 and one or more associated task routines 2440, the processor(s) 2550 may be caused to compare the specifications of interfaces within the job flow definition 2220 to the implementations of those interfaces within the associated task routines 2440 to determine whether they sufficiently match. Alternatively or additionally, the processor(s) 2550 may be caused to perform such comparisons between the job flow definition 2220 that is requested to be stored and one or more task routines 2440 already stored within one or more federated areas 2566, and/or to perform such comparisons between each of the task routines 2440 that are requested to be stored and one or more job flow definitions 2220 already stored within one or more federated areas 2566. If the processor(s) 2550 determine that there is an insufficient match, then the processor(s) 2550 may be caused to disallow storage of the job flow definition 2220 and/or of the one or more associated task routines 2440. In so doing, and as an approach to improving ease of use, the processor(s) 2550 may be caused to transmit an indication of the reason for the refusal to inform an operator of the source device 2100 of what can be done to remedy the situation, including providing details of the insufficiency of the match.

As previously discussed, macros 2470 and DAGs 2270 may be generated from information concerning the inputs and/or outputs of one or more task routines 2440 such that, like a job flow definition 2200 and/or an instance log 2720, each macro 2470 and each DAG 2270 is associated with one or more task routines 2440. As a result of such associations, it may be deemed desirable to ensure that further analysis of the information within each macro 2470 and/or DAG 2270 is enabled by requiring that the one or more task routines 2440 from which each is derived be available within a federated area 2566 to be accessed. More specifically, in executing the admission component 2542, the processor(s) 2550 of the one or more federated devices 2500 may be caused to impose restrictions on the storage of macros 2470 and/or DAGs 2270 that may be similar to those just discussed for the storage of job flow definitions 2200 and/or instance logs 2720. Thus, in response to a request to store one or more macros 2470 and/or one or more DAGs 2270, the processor(s) 2550 may first be caused to determine whether the task routine(s) 2440 on which the information concerning inputs and/or outputs within each macro 2470 and/or within each DAG 2270 may be based is stored within a federated area 2566 or is provided for storage along with each 2470 and/or each DAG 2270 for storage. Storage of a macro 2470 or of a DAG 2270 may be refused if such associated task routine(s) 2440 are not already so stored and are also not provided along with the macro 2470 or DAG 2270 that is requested to be stored.

Regardless of the exact manner in which a transfer of objects between devices and through the network 2999 is caused to occur, it should be noted that, depending on whether grids or other groups of devices are on either end of the transfer, some degree of parallelism may be employed in carrying out the transfer. More specifically, at least where an object is being transferred to or transferred from multiple ones of the federated devices 2500 (e.g., a grid 2005 of the federated devices 2500) as a result of a federated area 2566 being maintained in a distributed manner by multiple federated devices 2500, the transfer of the single object may be broken up into separate and at least partially parallel transfers of different portions of the object to or from the multiple federated devices 2500. This may be deemed desirable for the transfer of larger objects, such as data objects (e.g., an flow input data set 2330 or a result report 2770) that may be quite large in size. Further, in embodiments in which grids of devices are involved in both ends of a transfer of an object, it may be that the transfer is performed as multiple transfers of portions of the object in which each such portion is transferred between a different pair of devices More precisely and by way of example, where a source device 2100 that transmitted a request to store an object in a federated area 2566 is operated as part of a grid of the source devices 2100, the granting of access to store an object in the federated area 2566 may result in each of multiple source devices 2100 transmitting a different portion of the object to a different one of multiple federated devices 2500 in at least partially parallel transfers.

Turning to FIG. 17B, regardless of the exact manner in which the one or more federated devices 2500 are caused to receive objects, and as previously discussed, it may be that some received objects include portions that are written in one or more secondary programming languages, instead of in the primary programming language normally utilized by the processor(s) 2550 during a performance of a job flow. More specifically, among the received objects may be task routines 2440 in which at least executable instructions for the performance of a task may be written in a secondary programming language, and/or job flow definitions 2220 in which at least portion(s) thereof that define input and/or output interfaces may be written in a secondary programming language. As has been previously discussed, task routines 2440 that include such portions written in a secondary programming language may be stored unchanged within federated area(s), and their executable instructions may later be interpreted and/or compiled by an appropriate runtime interpreter or compiler at the time of their execution.

However, and as also previously discussed, where a job flow definition 2220*s* is received that includes at least input and/or output interface definitions written in a secondary programming language, it may be deemed desirable to generate a translated form 2220*p* thereof in which those definitions are written in the primary programming language, and to store that translated form 2220*p* within a federated area in lieu of the originally received form 2220*s*. Again, this may be done to provide developers who are familiar with the primary programming language with a form of the job flow definition 2220*s* that is written in the primary programming language to improved the ease with which they are able to read and/or edit the job flow that is defined therein.

As previously discussed, in some embodiments, as part of performing various comparisons of definitions for and/or implementations of input and/or output interfaces, the processor(s) 2550 of the one or more federated devices 2500 may be caused by the admission component 2542 to translate each portion of each job flow definition 2220 that defines input and/or output interfaces, and each portion of executable instructions of each task routine that implements input and/or output interfaces, into an intermediate representation, such as an intermediate programming language or a data structure. Thus, upon receipt of the depicted job flow definition 2220*s*, the portion(s) thereof that define input and/or output interfaces using a secondary programming language may already be translated into an intermediate representation for purposes of making such comparisons. In such embodiments, the processor(s) may be further caused by the interpretation component 2547 to further translate that intermediate representation into the primary programming language as part of generating the corresponding input and/or output interface definitions for the job flow definition 2220*p* that is generated as the translated form of the originally received job flow definition 2220*s*.

As previously discussed, job flow definitions 2220 may be derived from DAGs 2270 and/or vice versa. As also previously discussed, embodiments are possible in which different DAGs 2270 may be generated in different languages, and such different languages may be the same differing programming languages as used in portions of job flow definitions 2220, or such different languages may be differing forms of notation (e.g., BPMN versus other forms of notation) that may each be associated with a different programming language and/or a different development environment. Thus, like job flow definitions 2220, it may be that DAGs 2270 exchanged between the one or more federated devices 2500 and another device 2100 or 2800 may also be at least partially translated such that, as depicted, for a DAG 2270*s* stored within a transfer area 2166 or 2866 within a storage 2160 or 2860, respectively, that employs a secondary programming language or secondary form of notation, there may be a corresponding DAG 2270*p* stored within a transfer area 2666 within a federated area 2566 that employs a primary programming language or primary form of notation to provide the same view of the same job flow 2200, of the same instance of performance of a job flow 2200, of the same task and/or of the same task routine 2440.

The processor(s) 2550 of the one or more federated devices 2500 may be caused by the interpretation component 2547 to retrieve various rules and/or other parameters for the performance of translations between programming language(s) from the interpretation rules 2537. Among such rules and/or parameters may be a data structure providing a cross-reference of items of vocabulary between the primary programming language and each of one or more secondary programming languages, and/or a data structure providing a cross-reference of items of syntax therebetween (e.g., punctuation, use of spacing, ordering of commands and/or data, etc.). Alternatively or additionally, among such rules and/or parameters may be a specification of the manner in which the organization of data within data objects that is to be used in either defining input and/or output interfaces in job flow definitions or implementing input and/or output interfaces in task routines.

Turning to FIG. 17C, also regardless of the exact manner in which the one or more federated devices 2500 are caused to receive objects, and as also previously discussed, it may be that a received data object, such as the depicted example flow input data set 2330, is of a size that is sufficiently large that it may not be possible (or at least, may be deemed prohibitively difficult) to store all of it within a single storage device 2600 as an undivided object. Again, where such a data object is of such large size, it may be divided into multiple data object blocks as part of storing it in a distributed manner across multiple storage devices 2600*a-x* within a federated area 2566 that spans storage spaces provided by the multiple storage devices 2600*a-x* within a distributed file system 2669 implemented by at least the multiple storage devices 2600*a-x*. Again, in some embodiments, still another storage device 2600*z* may be employed to coordinate the maintenance of the distributed file system 2669, as well as to coordinate the use of the storage space encompassed by the distributed file system 2669 with the one or more federated devices 2500.

As previously discussed, the processor(s) 2550 of the one or more federated devices 2500 may be caused by the admission component 2542 to compare the size of the flow input data set 2330 to a predetermined threshold size as part of determining whether the flow input data set is large enough to be divided into multiple blocks for storage. If not, then the processor(s) 2550 may be caused simply to cooperate with one of the storage devices 2600*a-x* to store the flow input data set 2330 therein as an undivided object therein.

However, if the flow input data set 2330 is larger than the predetermined threshold size, then the processor(s) 2550 of the one or more federated devices 2500 may analyze the flow input data set 2330 to determine whether it is in a distributable form in which it does not include a distinct metadata structure, in which the data items are organized in a homogeneous manner throughout (e.g., a single two-dimensional array), and/or in which the homogeneous organization of the data items is of one of a preselected set of types of homogeneous organization. If flow input data set 2330 is determined to already be in distributable form (such that the depicted distributable form 2330*d* and the originally received form 2330 are one and the same), then the processor(s) 2550 may be caused simply to cooperate with the storage devices 2600*a-x* and/or 2600*z* to store the flow input data set 2330, as received, as the distributable form 2330*d* in a distributed manner in which the storage devices 2600*a-x* and/or 2600*z* divide the flow input data set 2330 into the depicted multiple data object blocks 2336*d* that are distributed thereamong for storage.

However, if the flow input data set 2330 is both larger than the predetermined threshold size and not in distributable form, then the processor(s) 2550 may be caused by execution of the admission component 2542 and/or the interpretation component 2547 to convert the flow input data set 2330 from its originally received form and into the flow input data set 2330*d* of distributable form. In so doing, the processor(s) 2550 may be caused to refer to the interpretation rules 2537 for rules concerning the interpretation of any metadata that may be present within the flow input data set 2330 in its original form, and/or for rules concerning conversions from the manner in which the data items may be organized in the original form and into a homogeneous manner of organization of the data items in the distributable form (e.g., a conversion between differing data structures, such as arrays, linked lists, comma-separated values, etc.). With the flow input data set 2330 so converted into the distributable form 2330*d*, the processor(s) 2550 may then be caused to cooperate with the storage devices 2600*a-x* and/or 2600*z* to store the flow input data set 2330*d* of distributable form in a distributed manner among the storage devices 2600*a-x*.

Turning to FIG. 17D, as depicted, the control routine 2540 may include an identifier component 2541 to cause the processor(s) 2550 of the one or more federated devices 2500 to assign identifiers to objects stored within the one or more federated areas 2566. As previously discussed, each instance log 2720 may refer to objects associated with a performance of a job flow (e.g., a job flow definition 2220, task routines 2440, and/or data objects used as inputs and/or generated as outputs, such as the data sets 2330 and/or 2370, and/or a result report 2770) by identifiers assigned to each. Also, as will shortly be explained, the assigned identifiers may be employed as part of an indexing system in one or more data structures and/or databases to more efficiently retrieve such objects. In some embodiments, the processor(s) 2550 of the one or more federated devices 2500 may be caused by the identifier component 2541 to assign identifiers to objects as they area received via the network 2999 from other devices, such as the one or more source devices 2100 and/or the one or more reviewing devices 2800. In other embodiments, the processor(s) 2550 may be caused by the identifier component 2541 to assign identifiers to objects generated as a result of a performance of a job flow (e.g., a mid-flow data set 2370 or a result report 2770 generated as an output data object of a task routine).

In some embodiments, an object identifier may be generated by taking a hash of at least a portion of its associated object to generate a hash value that becomes the identifier. More specifically, a job flow identifier 2221 may be generated by taking a hash of at least a portion of the corresponding job flow definition 2220; a data object identifier 2331 may be generated by taking a hash of at least a portion of the corresponding data set 2330 or 2370; a task routine identifier 2441 may be generated by taking a hash of at least a portion of the corresponding task routine 2440; and/or a result report identifier 2771 may be generated by taking a hash of at least a portion of the corresponding result report 2770. Any of a variety of hash algorithms familiar to those skilled in the art may be employed. Such an approach to generating identifiers may be deemed desirable as it may provide a relatively simple mechanism to generate identifiers that are highly likely to be unique to each object, presuming that a large enough portion of each object is used as the basis for each hash taken and/or each of the identifiers is of a large enough bit width. In some embodiments, the size of the portions of each of these different objects of which a hash is taken may be identical. Alternatively or additionally, the bit widths of the resulting hash values that become the identifiers 2221, 2331, 2441 and 2771 may be identical.

Such an approach to generating object identifiers 2221, 2331, 2441 and/or 2771 may advantageously be easily implemented by devices other than the one or more federated devices 2500 to reliably generate identifiers for objects that are identical to the identifiers generated by the processor(s) 2550 of any of the one or more federated devices 2500. Thus, if a job flow is performed by another device, the instance log 2720 generated by the other device would use identifiers to refer to the objects associated with that performance that would be identical to the identifiers that would have been generated by the processor(s) 2550 of the one or more federated devices 2500 to refer to those same objects. As a result, such an instance log 2720 could be received by the one or more federated devices 2500 and stored within a federated area 2566 without the need to derive new identifiers to replace those already included within that instance log 2720 to refer to objects associated with a performance of a job flow.

Referring to FIG. 17A in addition to FIG. 17D, in some embodiments, the identifier component 2541 may cooperate with the admission component 2542 in causing the processor(s) 2550 of the one or more federated devices 2500 to analyze received objects to determine compliance with various restrictions as part of determining whether to allow those objects to be stored within the one or more federated areas 2566. More specifically, and by way of example, the identifier component 2541 may generate object identifiers for each received object. The provision of object identifiers for each received object may enable the admission component 2542 to cause the processor(s) 2550 to check whether the objects specified in a received instance log 2720 are available among the other objects received along with the received instance log 2720, as well as whether the objects specified in the received instance log 2720 are available as already stored within one or more of the federated areas 2566. If an object referred to in the received instance log 2720 is neither among the other objects received therewith or among the objects already stored within one or more of the federated area 2566, then the processor(s) 2550 may be caused by the admission component 2542 to disallow storage of the received instance log 2720 within the one or more federated areas 2566. As previously discussed, disallowing the storage of an instance log 2720 for such reasons may be deemed desirable to prevent storage of an instance log 2720 that describes a performance of a job flow that cannot be repeated due to one or more of the objects associated with that performance being missing.

Turning to FIG. 17E, in some embodiments, the generation of identifiers for instance logs 2720 may differ from the generation of identifiers for other objects. More specifically, while the identifiers 2221, 2331, 2441 and 2771 may each be derived by taking a hash of at least a portion of its corresponding object, an instance log identifier 2721 for an instance log 2720 may be derived from at least a portion of each of the identifiers for the objects that are associated with the performance that corresponds to that instance log 2720. Thus, as depicted, the processor(s) 2550 of the one or more federated devices 2500 may be caused by the identifier component 2541 to generate an instance log identifier 2721 for a performance of a job flow by concatenating at least a portion of each of a job flow identifier 2221, one or more data object identifiers 2331, one or more task routine identifiers 2441, and a result report identifier 2771 for a job flow definition 2220, one or more data sets 2330 and/or 2370, one or more task routines 2440, and a result report 2770, respectively, that are all associated with that performance of that job flow. In embodiments in which the bit widths of each of the identifiers 2221, 2331, 2441 and 2771 are identical, log identifiers 2721 may be formed from identically sized portions of each of such identifiers 2221, 2331, 2441 and 2771, regardless of the quantity of each of the identifiers 2221, 2331, 2441 and 2771 used. Such use of identically sized portions of such identifiers 2221, 2331, 2441 and 2771 may be deemed desirable to aid in limiting the overall bit widths of the resulting log identifiers 2721.

FIG. 17F illustrates such a concatenation of identifiers in greater detail using identifiers of objects associated with the example job flow 2200*fgh* and the example performance 2700*afg*2*h* earlier discussed in connection with FIGS. 16A-D. As depicted, after having generated a job flow identifier 2221*fgh*, a data set identifier 2331*a*, a task routine identifier 2441*f*, a task routine identifier 2441*g*2, a task routine identifier 2441*h* and a result report identifier 2771*afg*2*h* for the example job flow definition 2220*fgh*, the data set 2330*a*, the task routine 2440*f*, the task routine 2440*g*2, the task routine 2440*h* and the result report 2770*afg*2*h*, respectively, the processor(s) 2550 may be caused by the identifier component 2541 to concatenate at least an identically sized portion of each of these identifiers together to form the single instance log identifier 2721*afg*2*h* for the example instance log 2720*afg*2*h* of FIGS. 16A-D.

Referring back to FIGS. 17D-E, an object location identifier 2222, 2332, 2442, 2722 or 2772 may be also be generated along with an object identifiers 2221, 2331, 2441, 2721 or 2771, respectively, for at least each object that is stored within a federated area 2566. While the object identifiers 2221, 2331, 2441, 2721 and 2771 may serve to uniquely identify each object, the object location identifiers 2222, 2332, 2442, 2722 and 2772 may serve to identify where each object is stored in the storage space(s) provided by the one or more federated devices 2500 and/or by the one or more storage devices 2600. In some embodiments, each of the object location identifiers 2222, 2332, 2442, 2722 and 2772 may provide just an indication of what federated area 2566 an associated object is stored within, and an entirely separate mechanism may be employed to provide an indication of which one(s) of the one or more federated device(s) 2500 and/or which one(s) of the one or more storage device(s) 2600 provide storage space that is occupied by at least a portion of that federated area 2566.

However, in other embodiments, each of the object location identifiers 2222, 2332, 2442, 2722 and 2772 may directly provide both an indication of what federated area 2566 an associated object is stored within, and an indication of which one(s) of the one or more federated device(s) 2500 and/or which one(s) of the one or more storage device(s) 2600 provide storage space that is occupied by at least a portion of the associated object. It should be noted that, as previously discussed, even though a federated area 2566 may occupy storage spaces provided by multiple devices 2500 and/or 2600, an object may be stored within that federated area 2566 in a manner in which it does not occupy all of those storage spaces provided by all of those multiple devices 2500 and/or 2600. Therefore, the indication provided in each object location identifier 2222, 2332, 2442, 2722 or 2772 of which device(s) 2500 and/or 2600 store at least a portion of the associated object may be a subset of the devices 2500 and/or 2600 that provide storage space for the federated area 2566 in which the associated object is stored.

Additionally, and as will be explained in greater detail, there may be various aspects of the manner in which an object may be stored as undivided object within the storage space provided by a single device 2500 or 2600, and/or in a distributed manner across storage spaces provided by multiple devices 2500 and/or 2600, and one or more of these aspects may affect the manner in which that object is able to be subsequently accessed. By way of example, and as previously discussed, the federated area 2566 in which an object is stored may be defined to exist within a storage space provided by just a single device 2500 or 2600, but within either a local file system 2661 or a distributed file system 2669, which may affect the manner in which the single device 2500 or 2600 is communicated with as part of accessing that object. By way of another example, and as also previously discussed, the federated area 2566 in which an object is stored may be defined to exist such that it spans across storage spaces provided by multiple devices 2500 and/or 2600 within a distributed file system 2669, but with the object being stored within that federated area 2566 as either an undivided object that occupies storage space within just a single one of those devices 2500 and/or 2600 or in a distributed manner that occupies storage space within some or all of those storage spaces, which may determine whether one or more of those devices 2500 and/or 2600 must be communicated with as part of accessing that object.

In some embodiments, to enable such aspects of the storage of an object to be taken into account, indications of such aspects may be included in its associated object location identifier 2222, 2332, 2442, 2722 or 2772 for use in a subsequent retrieval of the object. Therefore, and referring back to FIGS. 17C-D as an example, the conversion of the flow input data set 2330 into its distributable form 2330*d* and the subsequent storage of the distributable form 2330*d* as the multiple data object blocks 2336*d*, as depicted in FIG. 17C, may be followed by the storage, within one of the data object location identifiers 2332 depicted in FIG. 17D, of indications of the flow input data set 2330 having been stored in a distributed manner as the multiple data object blocks 2336*d* across multiple devices 2500*a-x* or 2600*a-x*, along with indications of which ones of the multiple devices 2500*a-x* or 2600*a-x* the multiple data object blocks 2336*d* are stored within.

Figure 18A:
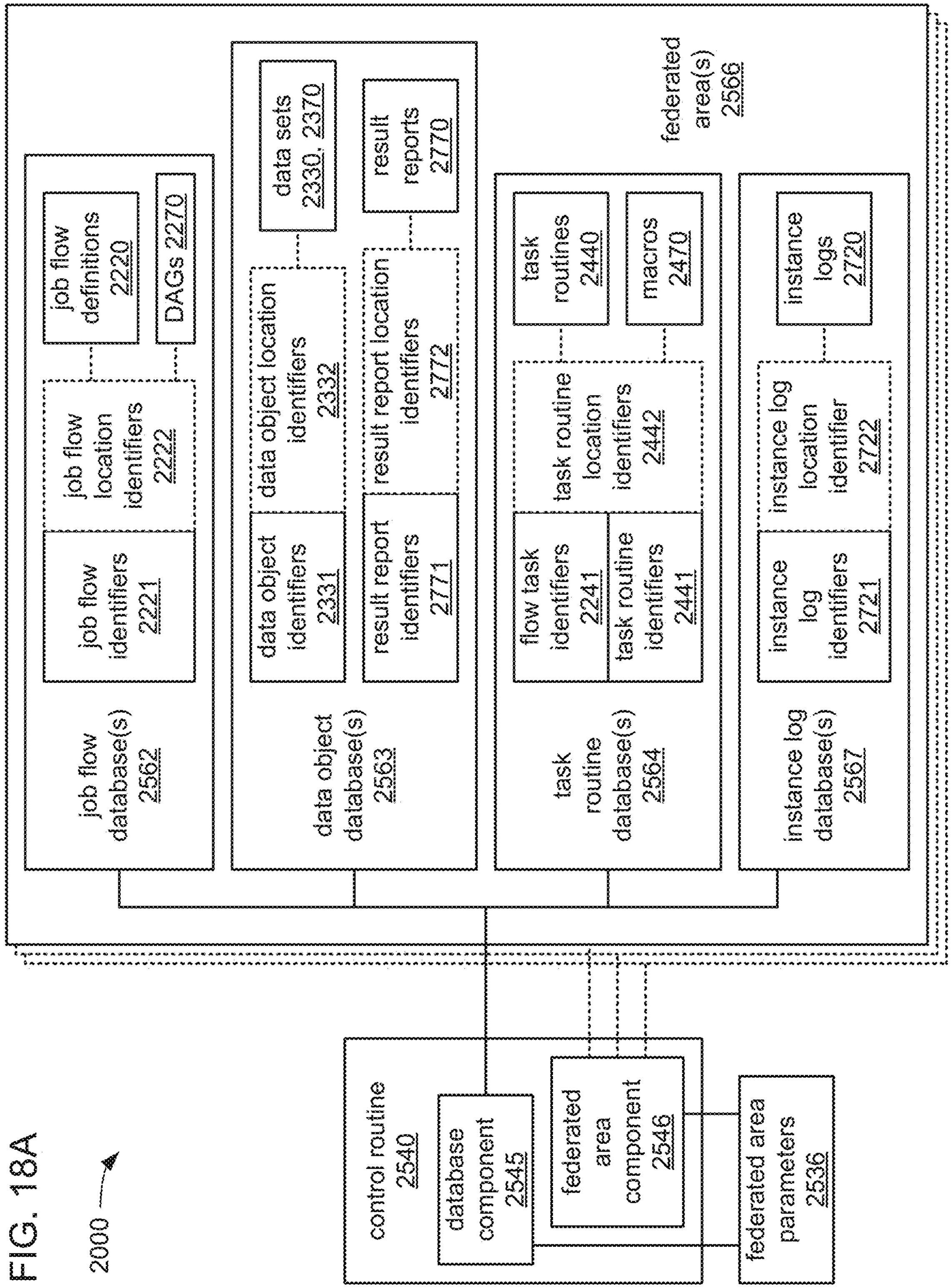
FIGS. 18A, 18B, 18C, 18D, 18E, 18F and 18G, together, illustrate an example of organizing, indexing and retrieving objects from federated area(s).
Figure 18B:
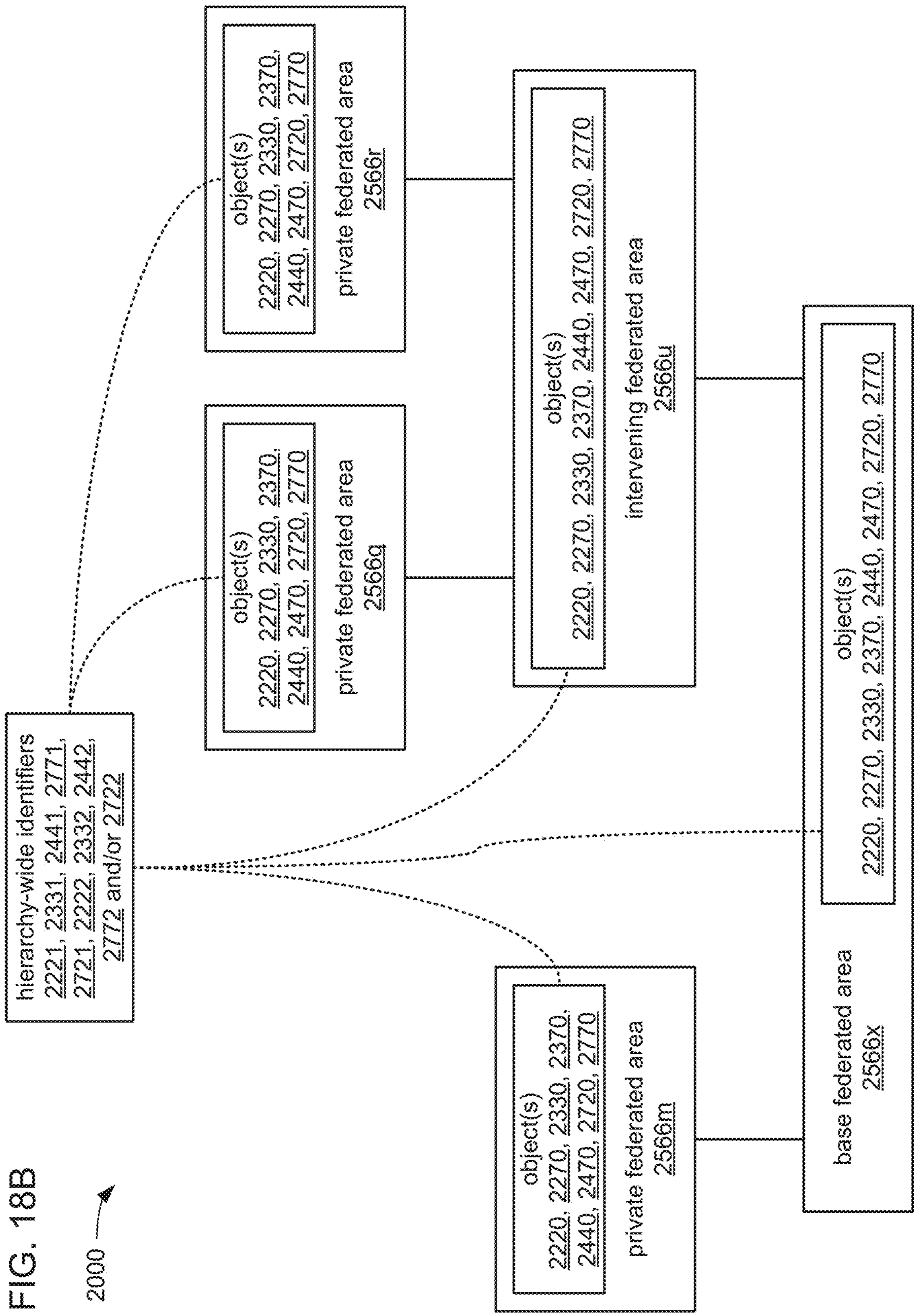
Figure 18C:
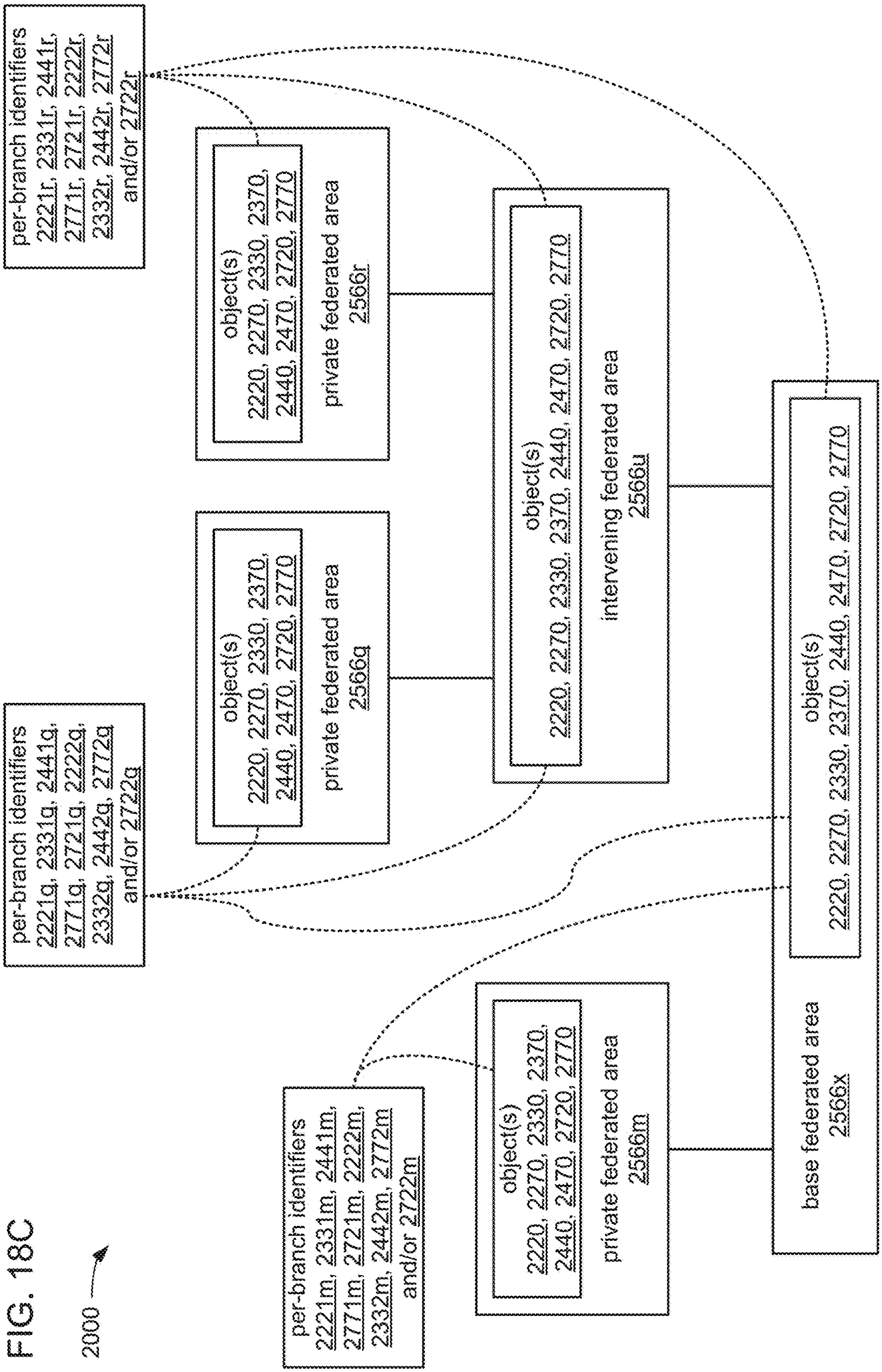
Figure 18D:
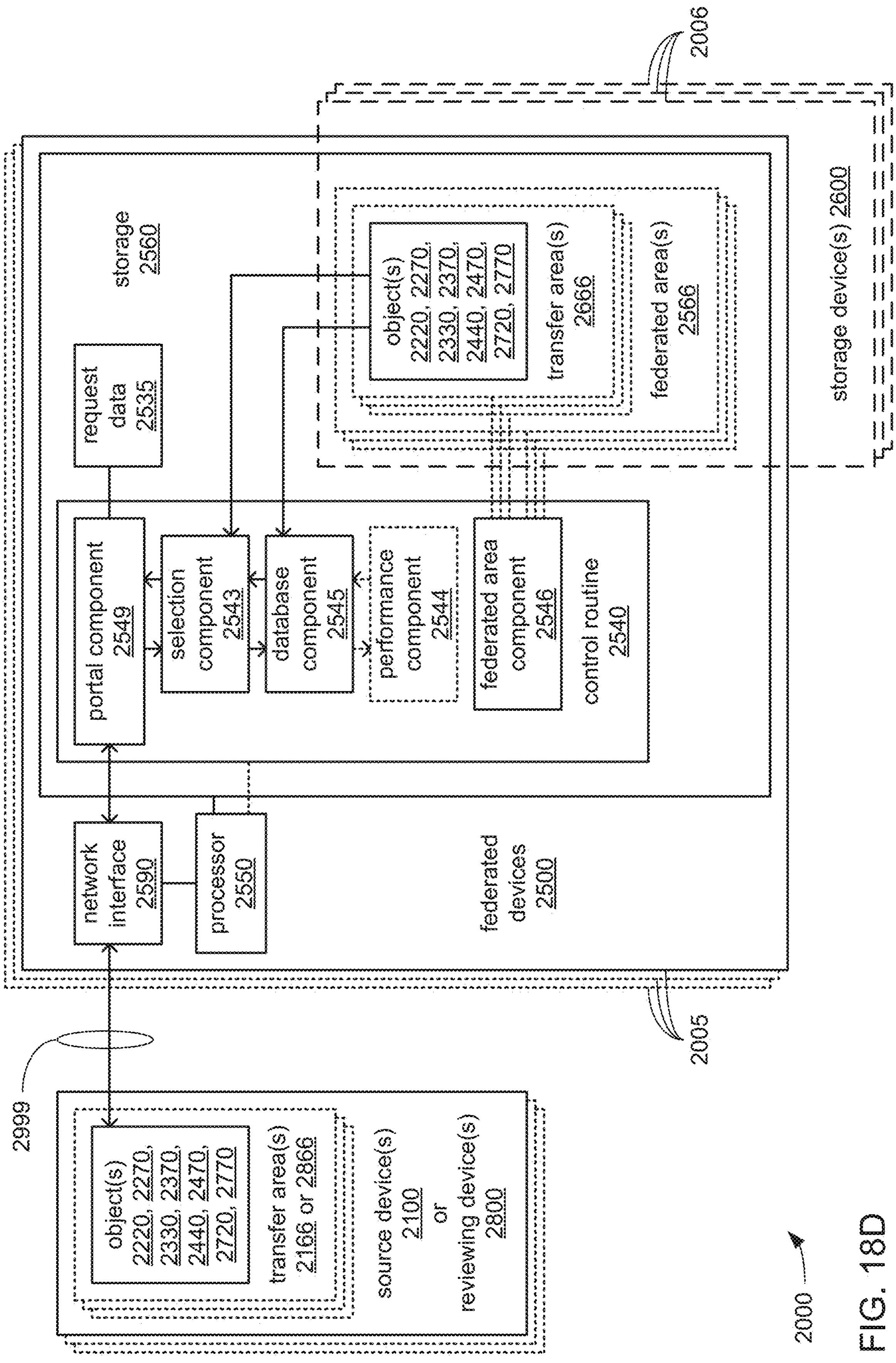
Figure 18E:
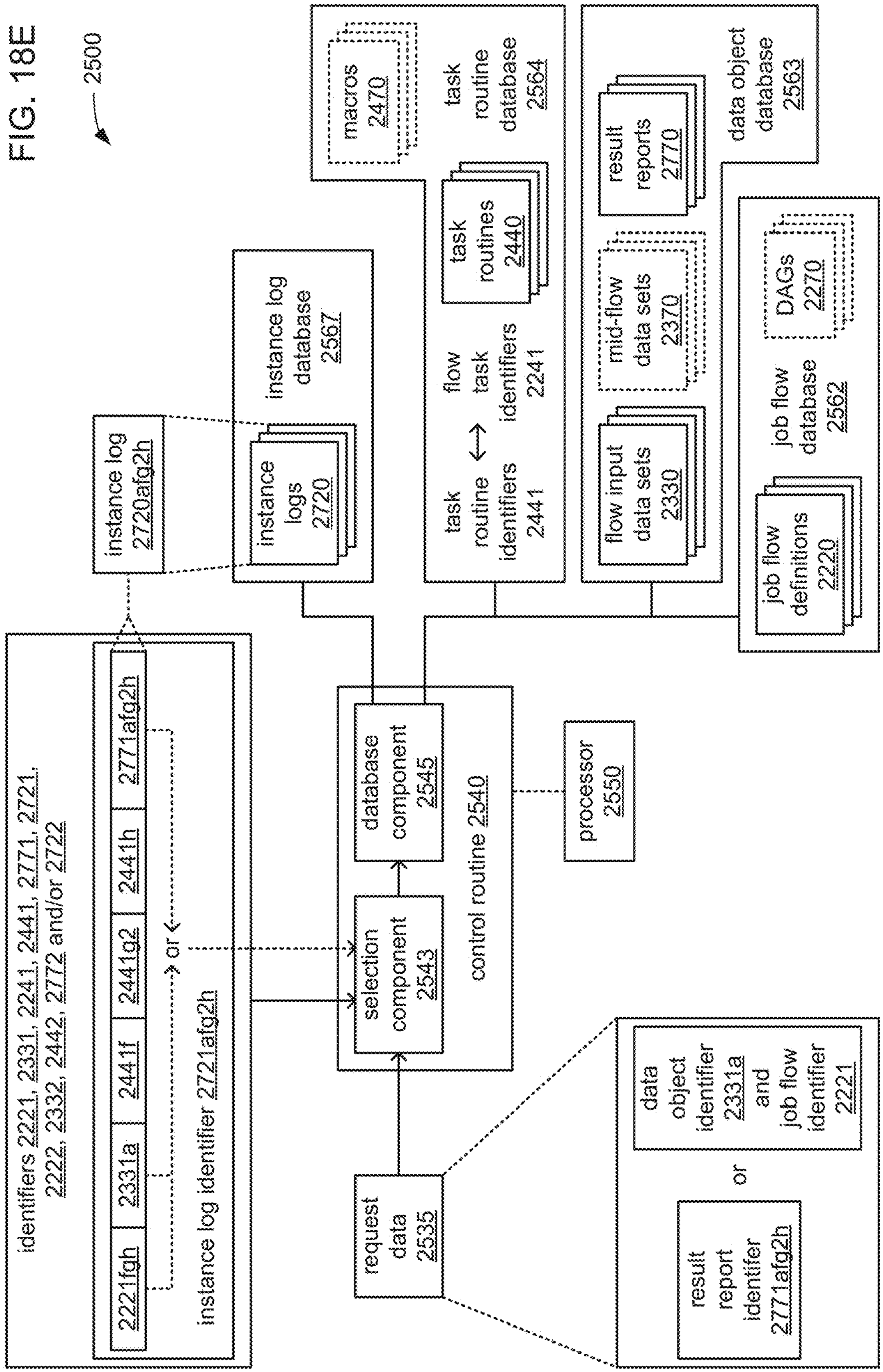
Figure 18F:
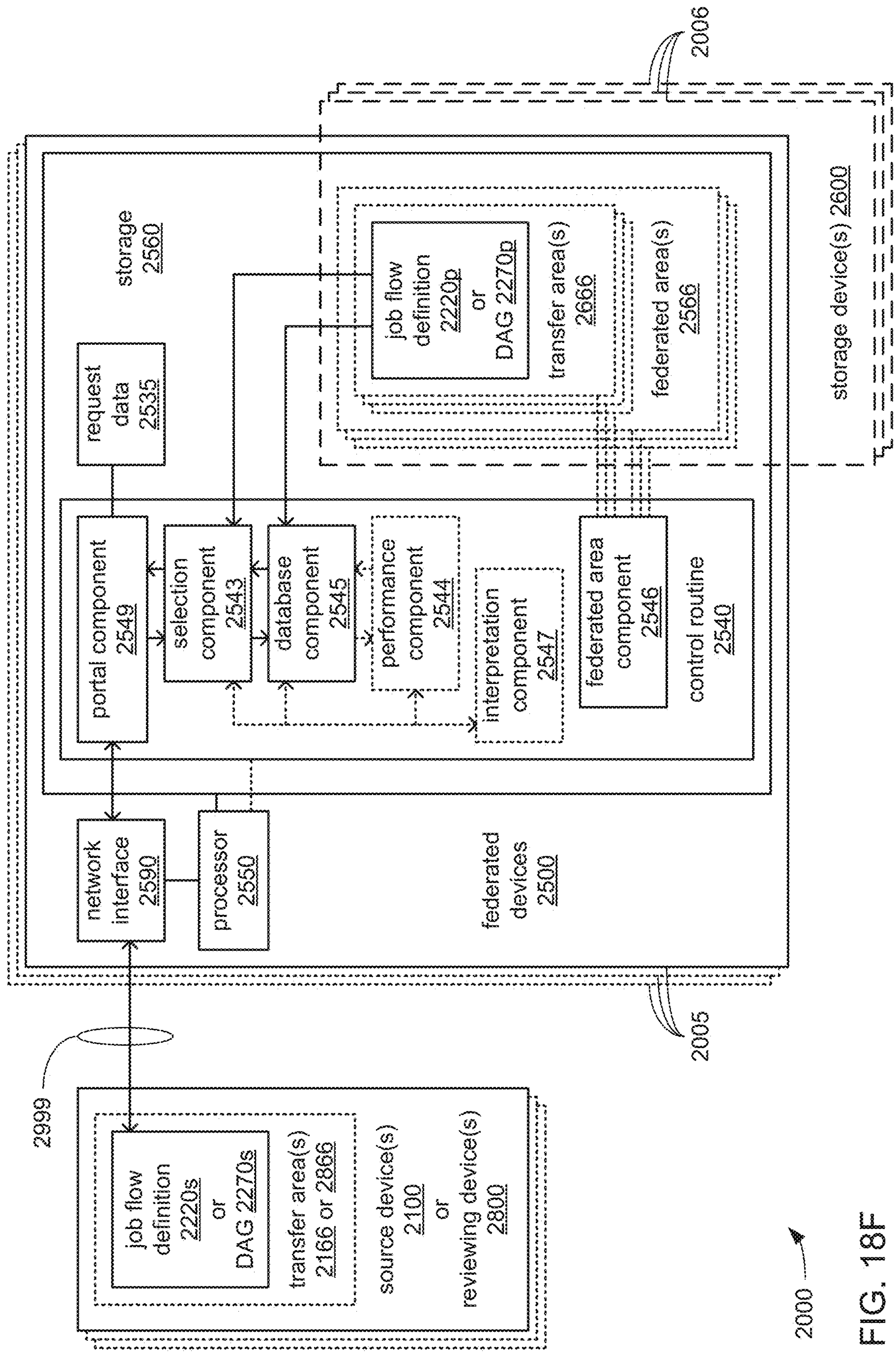
Figure 18G:
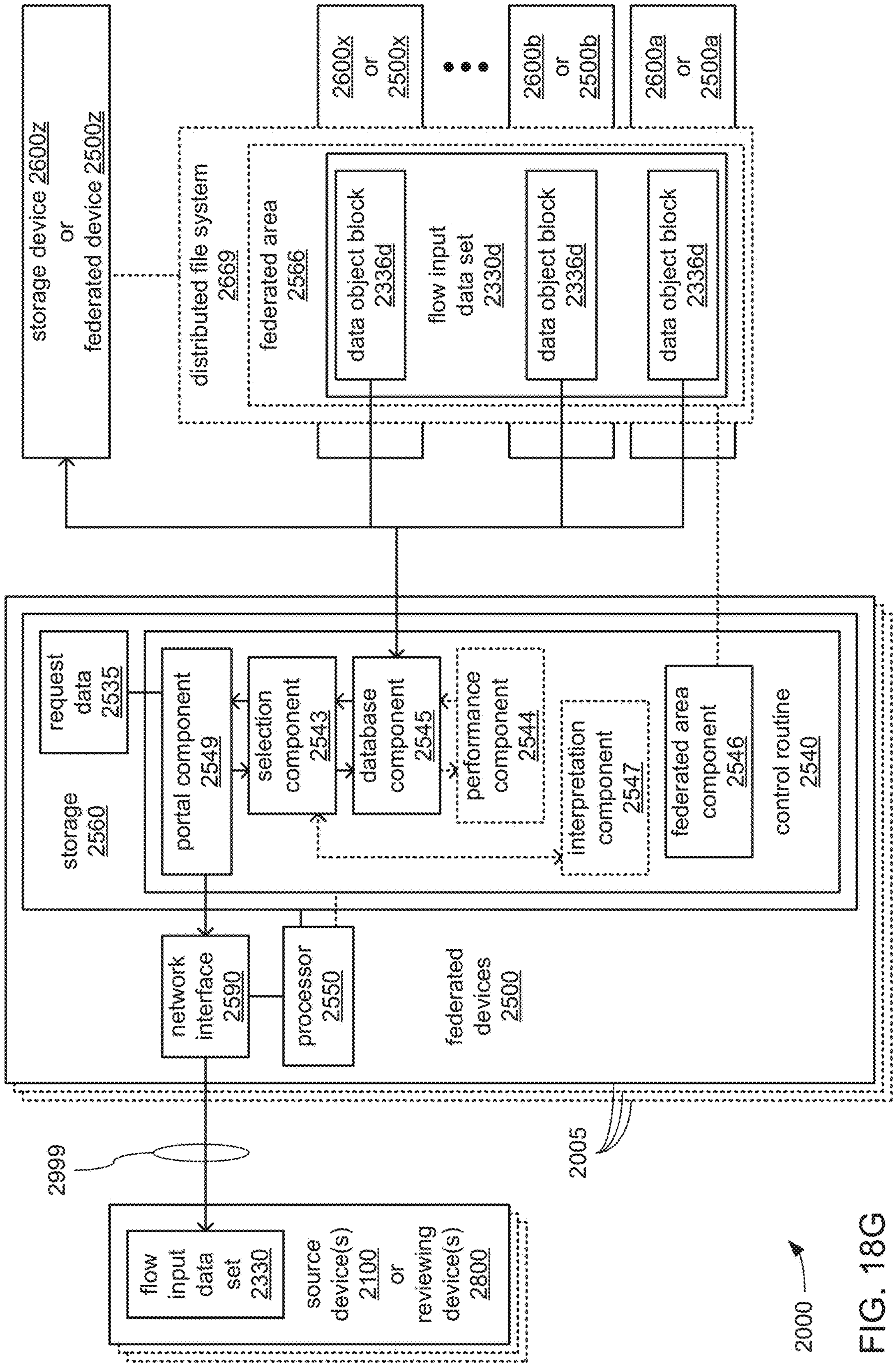

FIGS. 18A, 18B, 18C, 18D, 18E and 18F, together, illustrate aspects of organizing objects within federated areas to better enable the retrieval of objects for use. FIG. 18A depicts aspects of organizing objects into databases within federated areas 2566. FIG. 18B depicts aspects of a single global index that covers all federated areas 2566 within the example hierarchical tree earlier introduced in FIGS. 15B-C, and FIG. 18C depicts aspects of multiple side-by-side indexes for each private federated area 2566 within the same example hierarchical tree. FIG. 18D illustrates aspects of selective retrieval of objects from one or more federated areas 2566 in response to requests received from one or more of the reviewing devices 2800, and FIG. 18E illustrates aspects of the use of identifiers assigned to objects to locate objects within one or more federated areas 2566 and/or to identify object associations. FIG. 18F illustrates aspects of the retrieval of a job flow definition 2220 or a DAG 2270 in which a translation is performed between programming languages. FIG. 18G illustrates aspects of the retrieval of a data object that has been stored in a distributed manner.

Turning to FIG. 18A, as depicted, the control routine 2540 may include a database component 2545 to cause the processor(s) 2550 of the one or more federated devices 2500 to organize various ones of the objects 2220, 2270, 2330, 2370, 2440, 2470, 2720 and 2770 into one or more databases 2562, 2563, 2564 and/or 2567 (or one or more of another type of data structure) for more efficient storage and retrieval thereof within the one or more federated areas 2566. In some embodiments in which there are multiple unrelated federated areas 2566, the processor(s) 2566 may be caused to instantiate a separate instance of each of the databases 2562, 2563, 2564 and/or 2567 within each of those unrelated federated areas 2566. In other embodiments in which there are multiple federated areas 2566 that are related to each other as by being included in either a single linear hierarchy (e.g., the example linear hierarchy introduced in FIG. 15A) or a single hierarchical tree (e.g., the example hierarchical tree introduced in FIGS. 15B-C), the processor(s) 2566 may be caused to instantiate a single instance of each of the databases 2562, 2563, 2564 and/or 2567 that may cover (or be otherwise capable of covering) all of those multiple related federated areas 2566. However, in still other embodiments in which there are multiple federated areas 2566 that are related to each other as by being included in a single hierarchical tree, the processor(s) 2566 may be caused to instantiate multiple instances of each of the databases 2562, 2563, 2564 and/or 2567, where each of those multiple instances covers a different subset of those multiple related federated areas 2566 that exists within a different one of the branches of the hierarchical tree. Still other embodiments are possible in which each instance of each of the databases 2562, 2563, 2564 and/or 2567 may cover one or multiple related and/or unrelated federated areas 2566.

Within each instance of the job flow database 2562, the job flow definitions 2220 may be indexed or made otherwise addressable by their corresponding job flow identifiers 2221. In some embodiments, DAGs 2270 may be stored within each instance of the job flow database(s) 2562 alongside the job flow definitions 2220. As has been discussed, new job flow definitions 2220 may be at least partially based on DAGs 2270.

Within each instance of the data object database 2563, the data sets 2330 and/or 2370 may be accessible via their corresponding data object identifiers 2331, and/or each of the result reports 2770 may be accessible via their corresponding result report identifiers 2771.

Within each instance of the task routine database 2564, the task routines 2440 may be indexed or made otherwise addressable both by their corresponding task routine identifiers 2441, and by the flow task identifiers 2241 that each may also be assigned to indicate the particular task that each is able to perform. As has been discussed, there may be tasks that multiple task routines 2440 are able to perform such that there may be sets of multiple task routines 2440 that all share the same flow task identifier 2241. In some embodiments, a search of an instance of the task routine database 2564 using a flow task identifier 2241 to find a task routine 2440 that is able to perform the corresponding task may beget an indication from that instance of the task routine database 2564 of there being more than one of such task routines 2440, such as a list of the task routine identifiers 2441 of such task routines 2440. Such an indication may also include an indication of which of the multiple task routines 2440 so identified is the most recent version thereof. Such an indication may be provided by an ordering of the task routine identifiers 2441 of the multiple task routines 2440 that places the task routine identifier 2441 of the most recent version of the task routines 2440 at a particular position within the list. In this way, indications of whether one or multiple task routines 2440 exists that are able to perform a task, as well as which one of multiple task routines 2440 is the newest version, may be quickly provided from an instance of the task routine database 2564 in a manner that obviates the need to access and/or analyze any of the task routines 2440 therefrom.

In some embodiments, macros 2470 may be stored within each instance of the task routine database(s) 2564 alongside the task routines 2440 from which each macro 2470 may be derived. As will be explained in greater detail, it may be deemed desirable to enable each macro 2470 to be searchable based on either the task routine identifier 2441 of the specific task routine 2440 from which it was generated, or the flow task identifier 2241 of the task that the task routine 2440 performs.

Within each instance of the instance log database 2567, the instance logs 2720 may be indexed or made otherwise addressable by their corresponding instance log identifiers 2721. As has been discussed, each performance of a job flow may cause the generation of a separate corresponding instance log 2720 during that performance that provides a log of events occurring during the performance, including and not limited to, each performance of a task. In such embodiments, each instance log 2720 may be implemented as a separate data structure and/or file to provide indications of events occurring during the performance to which it corresponds. However, other embodiments are possible in which each of the instance logs 2720 is implemented as an entry of a larger log data structure and/or larger log data file, such as an instance of the instance log database 2567. In some embodiments, the manner in which the instance log identifiers 2721 of the instance logs 2720 are stored within an instance of the instance log database 2567 (or other data structure) may be structured to allow each of the instance log identifiers 2721 to be searched for at least portions of particular identifiers for other objects that were concatenated to form one or more of the instance log identifiers 2721. As will shortly be explained in greater detail, enabling such searches to be performed of the instance log identifiers 2721 may advantageously allow an instance log 2720 for a particular performance of a particular job flow to be identified in a manner that obviates the need to access and/or analyze any of the instance logs 2720 within an instance log database 2567.

As previously discussed, each of the object identifiers 2221, 2331, 2441, 2721 and/or 2771 may be accompanied by a corresponding object location identifier 2222, 2332, 2442, 2722 and/or 2772, respectively, that serves to indicate at least which federated area 2566 of the multiple related federated areas 2566 that the corresponding object may be stored within. Thus, and more precisely, each job flow identifier 2221 may be accompanied by a job flow location identifier 2222 that serves to identify which of multiple related federated areas 2566 the corresponding job flow definition 2220 or DAG 2270 is stored within. Similarly, each data object identifier 2331 may be accompanied by a data object location identifier 2332 that serves to identify which of multiple related federated areas 2566 the corresponding data set 2330 or 2370 is stored within. Similarly, each result report identifier 2771 may be accompanied by a result report location identifier 2772 that serves to identify which of multiple related federated areas 2566 the corresponding result report 2770 is stored within. Similarly, each task routine identifier 2441 may be accompanied by a task routine location identifier 2442 that serves to identify which of multiple related federated areas 2566 the corresponding task routine 2440 or macro 2470 is stored within. Similarly, each instance log identifier 2721 may be accompanied by an instance log location identifier 2722 that serves to identify which of multiple related federated areas 2566 the corresponding instance log 2720 is stored within.

FIG. 18B depicts the resulting hierarchy-wide coverage of the resulting single set of object identifiers 2221, 2331, 2441, 2771 and/or 2721, and object location identifiers 2222, 2332, 2442, 2772 and/or 2722, respectively, in embodiments in which a single instance of each of the databases 2562, 2563, 2564 and/or 2567 covers all of the multiple federated areas 2566 within a single set of related federated areas within a single hierarchical structure, such as the depicted example hierarchical tree introduced in FIGS. 15B-C. Thus, the single depicted set of object identifiers and object location identifiers may be used in retrieving any of the corresponding types of objects that may be stored within any of the federated areas 2566*m*, 2566*q*, 2566*r*, 2566*u* and 2566*x* of the depicted example hierarchical tree.

In contrast, FIG. 18C depicts the resulting per-branch coverage of the resulting multiple sets of object identifiers 2221*m*, 2331*m*, 2441*m*, 2771*m* and/or 2721*m*; 2221*q*, 2331*q*, 2441*q*, 2771*q* and/or 2721*q*; and/or 2221*r*, 2331*r*, 2441*r*, 2771*r* and/or 2721*r*; and object location identifiers 2222*m*, 2332*m*, 2442*m*, 2772*m* and/or 2722*m*; 2222*q*, 2332*q*, 2442*q*, 2772*q* and/or 2722*q*; and/or 2222*r*, 2332*r*, 2442*r*, 2772*r* and/or 2722*r*; respectively, in embodiments in which a separate instance of each of the databases 2562, 2563, 2564 and/or 2567 covers a different subset of the multiple federated areas 2566 within a different branch of a single set of related federated areas within a single hierarchical tree. Thus, one of the depicted sets of object identifiers and object location identifiers may be used in retrieving any of the corresponding types of objects that may be stored within either of the federated areas 2566*m* or 2566*x*; while another of the depicted sets of object identifiers and object location identifiers may be used in retrieving any of the corresponding types of objects that may be stored within any of the federated areas 2566*q*, 2566*u* or 2566*x*; and still another of the depicted sets of object identifiers and object location identifiers may be used in retrieving any of the corresponding types of objects that may be stored within any of the federated areas 2566*r*, 2566*u* or 2566*x*.

Turning to FIG. 18D, and as previously discussed, the one or more federated devices 2500 may receive a request from one of the source devices 2100, or from one of the reviewing devices 2800, to retrieve one or more objects associated with a job flow from within the one or more federated areas 2566 and provide it to the requesting device 2100 or 2800. Alternatively, the request may be to use one or more objects associated with a job flow, and retrieved from the one or more federated areas 2566, to perform an analysis and provide the results thereof. Or, as an another alterative, the request may be to use one or more objects associated with a job flow, and retrieved from the one or more federated areas 2566, to repeat a past performance of that job flow and provide the results thereof and/or the results of a comparison of past and new results thereof. In some embodiments, the processor(s) 2550 of the one or more federated devices 2500 may be caused by the portal component 2549 to queue such requests as request data 2535 to enable out-of-order handling of requests, and/or other approaches to increase the efficiency with which such requests are responded to. As previously discussed, the processor(s) 2550 may also be caused by the portal component to determine whether each of the received requests originated from an authorized person, an authorized device and/or an authorized entity, and/or to determine whether the type of request is authorized for originating person, device and/or entity.

As depicted, the control routine 2540 may also include a selection component 2543 to employ one or more identifiers provided in a request and/or one or more rules to locate, select and retrieve objects associated with a job flow from the one or more federated areas 2566. In executing the selection component 2543 and the database component 2545 to provide requested objects, the processor(s) 2550 may be caused to use one or more identifiers of objects that may be provided in a granted request to directly retrieve those one or more objects from one or more federated areas 2566. By way of example, a request may be received for the retrieval and transmission to the requesting device 2100 or 2800 of a particular flow input data set 2330, and the request may include the data object identifier 2331 of the particular flow input data set 2330.

In response to the request, the processor(s) 2550 may be caused by the database component 2545 to employ the provided data object identifier 2331 and/or the corresponding data object location identifier 2332 to search for the particular flow input data set 2330 within the one or more federated areas 2566, retrieve it, and transmit it to the requesting device 2800. In so doing, the processor(s) 2550 may be caused to correlate the received data object identifier 2331 to the corresponding data object location identifier 2332, and to then retrieve the particular flow input data set 2330 from the federated area 2566 indicated by that data object location identifier 2332. Further, in so doing, the processor(s) 2550 may be caused to communicate within one or more storage devices 2600 and/or one or more other federated devices 2500 that may be indicated by the data object location identifier as storing at least a portion of the flow input data set 2330.

However, other requests may be for the retrieval of objects from one or more federated areas 2566 where the identifiers of the requested objects may not be directly provided within the requests. Instead, such requests may employ other identifiers that provide an indirect reference to the requested objects.

In one example use of an indirect reference to objects, a request may be received for the retrieval and transmission to the requesting device 2100 or 2800 of a task routine 2440 that performs a particular task, and the request may include the flow task identifier 2241 of the particular task instead of a task routine identifier 2441 that directly identifies any particular task routine 2440. The processor(s) 2550 may be caused by the selection component 2543 and database component 2545 to employ the flow task identifier 2241 provided in the request to search within one or more federated areas 2566 for such task routines 2440. As has been previously discussed, the search may entail correlating the flow task identifiers 2241 to one or more task routine identifiers 2441 of the corresponding one or more task routines 2440 that may perform the task identified by the flow task identifier 2241. In embodiments in which the task routines 2440 have been organized into a task routine database 2564 within each federated area 2566 as depicted as an example in FIG. 18A (or other searchable data structure), the search may entail searches within such a database or other data structure. The result of such a search may be an indication from such a database or other data structure within the one or more federated areas 2566 that there is more than one task routine 2440 that is able to perform the task identified by the flow task identifier 2241 provided in the request. As previously discussed, such an indication may be in the form of a list of the task routine identifiers 2441 for the task routines 2440 that are able to perform the specified task. Additionally, and as also previously discussed, such a list may be ordered to provide an indication of which of those task routines 2440 stored within a federated area 2566 is the newest. Again, it may be deemed desirable to favor the use of the newest version of a task routine 2440 that performs a particular task where there is more than one task routine 2440 stored within one or more federated areas 2566 that is able to do so. Therefore, in response to the request, the processor(s) 2550 may be caused to select the newest task routine 2440 indicated among all of the one or more of such lists retrieved within each of one or more federated areas 2566 to perform the task specified in the request by the flow task identifier 2241, and to transmit that newest version to the requesting device. Through such automatic selection and retrieval of the newest versions of task routines 2440, individuals and/or entities that may be developing new analyses may be encouraged to use the newest versions.

In another example use of an indirect reference to objects, a request may be received by the one or more federated devices 2500 to repeat a previous performance of a specified job flow with one or more specified data objects as inputs (e.g., one or more of the data sets 2330), or to provide the requesting device with the objects needed to repeat the previous performance of the job flow, itself. Thus, the request may include the job flow identifier 2221 of the job flow definition 2220 for the job flow, and may include one or more data object identifiers 2331 of the one or more data sets 2330 to be employed as inputs to the previous performance of that job flow sought to be repeated, but may not include identifiers for any other object associated with that previous performance.

The processor(s) 2550 may be caused by the selection component 2543 to employ the job flow identifier 2221 and the one or more data objects identifiers 2331 provided in the request to search the one or more federated areas 2566 for all instance logs 2720 that provide an indication of a past performance of the specified job flow with the specified one or more input data objects. In embodiments in which the instance logs 2720 have been organized into an instance log database 2567 as depicted as an example in FIG. 18A (or other searchable data structure), the search may be within such a database or other data structure, and may be limited to the instance log identifiers 2721. More specifically, in embodiments in which the instance log identifiers 2721 were each generated by concatenating the identifiers of objects associated with a corresponding past performance, the instance log identifiers 2721, themselves, may be analyzed to determine whether the identifiers provided in the request for particular objects are included within any of the instance log identifiers 2721. Thus, the processor(s) 2550 may be caused to search each instance log identifier 2721 to determine whether there are any instance log identifiers 2721 that include the job flow identifier 2221 and all of the data object identifiers 2331 provided in the request. If such an instance log identifier 2721 is found, then it is an indication that the instance log 2720 that was assigned that instance log identifier 2721 is associated with a past performance of that job flow associated with the one or more data sets 2330 specified in the request.

It should be noted, however, that a situation may arise in which more than one of such instance log identifiers 2721 may be found, indicating that there has been more than one past performance of the job flow with the one or more data sets specified in the request. In response to such a situation, the processor(s) 2550 may be caused by the selection component 2543 to transmit an indication of the multiple previous performances to the requesting device 2100 or 2800 along with a request for a selection to be made from among those previous performances. The processor(s) 2550 may then await a response from the requesting device 2100 or 2800 that provides an indication of a selection from among the multiple past performances. As an alternative to such an exchange with the requesting device 2100 or 2800, or in response to a predetermined period of time having elapsed since requesting a selection without an indication of a selection having been received by the one or more federated devices 2500, the processor(s) 2550 may be caused by the selection component 2543 to, as a default, select the most recent one of the past performances.

After identifying a single past performance, or after the selection of one of multiple past performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then be caused by the database component 2545 to employ those task routine identifiers 2441 to retrieve the particular task routines 2440 associated with the previous performance from one or more federated areas 2566. The processor(s) 2550 may also be caused by the selection component 2543 to retrieve the result report identifier 2771 specified within the instance log 2720 of the result report that was generated in the previous performance. The processor(s) 2550 may be further caused by the selection component 2543 to retrieve any data object identifiers 2331 that may be present within the instance log 2720 that specify one or more data sets 2370 that may have been generated as a mechanism to exchange data between task routines 2440 during the performance of a job flow.

If the request was for the provision of objects to the requesting device, then the processor(s) 2550 may be caused by the database component 2543 to retrieve, from the one or more federated areas, the job flow definition 2220 and the one or more data sets 2330 specified by the job flow identifier 2221 and the one or more data object identifiers 2331, respectively, in the request, and may be further caused by the portal component 2549 to transmit those objects to the requesting device 2100 or 2800. The processor 2550 may also be caused by the portal component 2549 to transmit the instance log 2720 generated in the past performance, and the result report 2770 specified by the result report identifier 2771 retrieved from the instance log 2720. If any data sets 2370 were indicated in the instance log 2720 as having been generated in the previous performance, then the processor(s) 2550 may be further caused by the portal component 2549 to transmit such data set(s) 2370 to the requesting device 2100 or 2800 after having been caused to retrieve such data set(s) 2370 from the one or more federated areas 2566 by the database component 2545. Thus, based on a request that provided only identifiers for a job flow definition 2220 and one or more data objects used as inputs to a past performance of the job flow, a full set of objects may be automatically selected and transmitted to the requesting device to enable an independent performance of the job flow as part of a review of that previous performance.

However, if the request was for a repeat of the previous performance of the job flow by the one or more federated devices 2500, then instead of (or in addition to) transmitting the objects needed to repeat the previous performance to the requesting device 2100 or 2800, the processor(s) 2550 may be caused by execution of a performance component 2544 of the control routine 2540 to use those objects to repeat the previous performance within a federated area 2566 in which at least one of the objects is stored and/or to which the user associated with the request and/or the requesting device 2100 or 2800 has been granted access. In some embodiments, the federated area 2566 in which the previous performance took place may be selected, by default, to be the federated area 2566 in which to repeat the performance. Indeed, repeating the performance within the same federated area 2566 may be deemed a requirement to truly reproduce the conditions under which the previous performance occurred. More specifically, the processor(s) 2550 may be caused to execute the task routines 2440 specified in the instance log 2720, in the order specified in the job flow definition 2220 specified in the request, and using the one or more data sets 2330 specified in the request as input data objects. In some embodiments, where multiple ones of the federated devices 2500 are operated together as the federated device grid 2005, the processor(s) 2550 of the multiple ones of the federated devices 2500 may be caused by the performance component 2544 to cooperate to divide the execution of one or more of the tasks thereamong. Such a division of one or more of the tasks may be deemed desirable where one or more of the data objects associated with the job flow is of relatively large size. Regardless of the quantity of the federated devices 2500 involved in repeating the previous performance of the job flow, upon completion of the repeat performance, the processor(s) 2550 may be further caused by the performance component 2544 to transmit the newly regenerated result report 2770 to the requesting device. Alternatively or additionally, the processor(s) 2550 may perform a comparison between the newly regenerated result report 2770 and the result report 2770 previously generated in the previous performance to determine if there are any differences, and may transmit an indication of the results of that comparison to the requesting device. Thus, based on a request that provided only identifiers for a job flow definition 2220 and one or more data objects used as inputs to the job flow, a previous performance of a job flow may be repeated and the results thereof transmitted to the requesting device as part of a review of the previous performance.

In still another example use of an indirect reference to objects, a request may be received by the one or more federated devices 2500 to perform a specified job flow with one or more specified data objects as inputs (e.g., one or more of the data sets 2330). Thus, the request may include the job flow identifier 2221 of the job flow definition 2220 for the job flow, and may include one or more data object identifiers 2331 of the one or more data sets 2330 to be employed as input data objects, but may not include any identifiers for any other objects needed for the performance.

The processor(s) 2550 may be caused by the selection component 2543 to employ the job flow identifier 2221 provided in the request to retrieve the job flow definition 2220 for the job flow to be performed. The processor(s) 2550 may then be caused to retrieve the flow task identifiers 2241 from the job flow definition 2220 that specify the tasks to be performed, and may employ the flow task identifiers 2241 to retrieve the newest version of task routine 2440 within one or more federated areas 2566 (e.g., within the task routine database 2564 within each of one or more federated areas 2566) for each task. The processor(s) 2550 may also be caused by the selection component 2543 to employ the job flow identifier 2221 and the one or more data objects identifiers 2331 to search the one or more federated areas 2566 for any instance logs 2720 that provide an indication of a past performance of the specified job flow with the specified one or more input data objects.

If no such instance log identifier 2721 is found, then it is an indication that there is no record within the one or more federated areas of any previous performance of the specified job flow with the one or more specified data sets 2330. In response, the processor(s) 2550 may be caused by execution of the performance component 2544 to execute the retrieved newest version of each of the task routines 2440 to perform the tasks of the job flow in the order specified in the job flow definition 2220 specified in the request, and using the one or more data sets 2330 specified in the request as input data objects. Again, in embodiments in which multiple ones of the federated devices 2500 are operated together as the federated device grid 2005, the processor(s) 2550 may be caused by the performance component 2544 to cooperate to divide the execution of one or more of the tasks thereamong. Upon completion of the performance of the job flow, the processor(s) 2550 may be further caused by the performance component 2544 to transmit the result report 2770 generated in the performance of the job flow to the requesting device. Thus, based on a request that provided only identifiers for a job flow definition 2220 and one or more data objects used as inputs to the job flow, a performance of a job flow is caused to occur using the newest available versions of task routines 2440 to perform each task.

However, if such an instance log identifier 2721 is found, then it is an indication that there was a previous performance of the job flow specified in the request where the one or more data sets 2330 specified in the request were used as input data objects. If a situation should occur where multiple ones of such instance log identifiers 2721 are found, then it is an indication that there have been multiple previous performances of the job flow, and the processor(s) 2550 may be caused by the selection component 2543 to select the most recent one of the multiple previous performances, by default. After the finding of a single previous performance, or after the selection of the most recent one of multiple previous performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then employ those task routine identifiers 2441 to retrieve the particular task routines 2440 associated with the previous performance from one or more federated areas 2566. The processor 2550 may then compare each of the task routines 2440 specified in the instance log 2720 to the newest task routines 2440 retrieved for each task specified in the job flow definition 2220 to determine whether all of the task routines 2440 specified in the instance log 2720 are the newest versions thereof. If so, then the result report 2770 generated in the previous performance associated with the instance log 2720 was generated using the most recent versions of each of the task routines 2440 needed to perform the tasks of the job flow. The processor(s) 2550 may then entirely forego performing the job flow, may employ the result report identifier 2771 provided in the instance log 2720 to retrieve the result report 2770 generated in the earlier performance, and may transmit that result report 2770 to the requesting device. In this way, a form of caching is provided by which the previously generated result report 2770 is able to be recognized as reusable, and the use of processing resources of the one or more federated devices 2500 to repeat a previous performance of the job flow is avoided.

It should be noted, however, that a situation may arise in which one or more of the task routines 2440 specified in the instance log 2720 are the newest versions thereof, while one or more others of the task routines 2440 specified in the instance log 2720 are not. In response to such a situation, the processor(s) 2550 may be caused by the selection routine 2543 to check whether at least the task routine 2440 specified in the instance log 2720 as performing the first task in the order of tasks specified in the job flow definition 2220 is the newest version of task routine 2440 able to perform that task. If not, then the processor(s) 2550 may be caused by the performance component 2544 to employ all of the newest versions of the task routines 2440 to perform the entire job flow, just as the processor(s) 2550 would be caused to do so if there had been no previous performance of the job flow, at all. However, if the first task in the previous performance of the job flow was performed with the newest version of task routine 2440 able to perform that first task, then the processor(s) 2550 may iterate through each task in the order of tasks specified in job flow definition 2720 to determine which were performed with the newest version of task routine 2440. The processor(s) 2550 would start with the first task in the specified order of tasks, and stop wherever in the specified order of tasks the processor(s) 2550 determine that a task routine 2440 was used that is not the newest version thereof. In this way, the processor(s) 2550 may identify an initial portion of the order of tasks specified in the job flow definition 2220 that may not need to be performed again as they were already performed using the newest versions of their respective task routines 2440. As a result, only the remainder of the tasks that follow the initial portion in the order of tasks may need to be performed again, but using the newest versions of their respective task routines 2440 for all of those remaining tasks. In this way, a form of partial caching is provided by which an initial portion of a previous performance of a job flow is able to be reused such that not all of the job flow needs to be performed again to generate a result report 2770 to be transmitted to the requesting device.

FIG. 18E illustrates two examples of searching for objects using one or more identifiers that provide an indirect reference to those objects in greater detail. More specifically, FIG. 18E depicts two different searches for objects that each employ the example instance log identifier 2721*afg*2*h* associated with the 2720*afg*2*h* instance log of the example performance of the job flow 2200*fgh* of FIGS. 16A-D.

In one example search, and referring to both FIGS. 18D and 18E, a request may be received (and stored as part of the request data 2535) for the retrieval of objects associated with, and/or for a repetition of, the example performance 2700*afg*2*h* that resulted in the generation of the result report 2770*afg*2*h*. In so doing, the request may use the result report identifier 2771*afg*2*h* to refer to the result report 2770*afg*2*h*, while providing no other identifier for any other object associated with the performance 2700*afg*2*h*. In response, the processor(s) 2550 may be caused by the selection component 2543 to cooperate with the database component 2545 to search the instance log identifiers 2721 of the instance log database 2567 within one or more federated areas 2566 to locate the one of the multiple instance log identifiers 2721 that includes the result report identifier 2771*afg*2*h*. As depicted, the instance log identifier 2721*afg*2*h* is the one of the multiple instance log identifiers 2721 that contains the result report identifier 2771*afg*2*h*. With the instance log identifier 2721*afg*2*h* having been found, the processor(s) 2550 may then be caused by the selection component 2543 to retrieve, from the instance log 2720*afg*2*h*, the identifiers of the various objects requested to be transmitted to the requesting device and/or needed to repeat the example performance 2700*afg*2*h*.

In another example search, a request may be received for a repetition of a previous performance of a specific job flow with a specific data object used as input. In so doing, the request may refer to the example job flow 2200*fgh* of FIGS. 16A-D by using the job flow identifier 2221*fgh* of the job flow definition 2220*fgh* that defines the example job flow 2200*fgh*, and may refer to the data set 2330*a* by using the data object identifier 2331*a*. In response, the processor(s) 2550 may be caused by the selection component 2543 to cooperate with the database component 2545 to search the instance log identifiers 2721 of the instance log database 2567 within one or more federated areas 2566 to locate any of the multiple instance log identifiers 2721 that includes the both the job flow identifier 2221*fgh* and the data object identifier 2331*a*. As depicted, the instance log identifier 2721*afg*2*h* is the one of the multiple instance log identifiers 2721 that contains both of these identifiers 2221*fgh* and 2331*a*. With the instance log identifier 2721*afg*2*h* having been found, the processor(s) 2550 may then be caused by the selection component 2543 to retrieve, from the instance log 2720*afg*2*h*, the identifiers of the various objects needed to repeat the example performance 2700*afg*2*h*. The processor(s) 2550 may then be caused by execution of the performance component 2544 to perform the example job flow 2200*fgh* with the data set 2330*a* as the input data object.

Turning to FIG. 18F, while also referring back to FIG. 18D, as an alternative to the one or more federated devices 2500 transmitting objects to another device 2100 or 2800 in response to requests, and as previously discussed, the one or more federated devices 2500 may, instead, transmit objects to another device 2100 or 2800 as a result of an ongoing synchronization relationship instantiated between transfer area(s) 2666 within one or more federated areas 2566 and other transfer area(s) 2166 or 2866 within a storage 2160 or 2860 of the other device 2100 or 2800, respectively. Again, the instantiation of such synchronization relationship(s) may be in response to a request received by the one or more federated devices 2500. And again, in some embodiments, such synchronization relationship(s) may be requested and instantiated to support a collaboration among developers who have access to and are familiar with the use of the one or more federated areas 2566 of the one or more federated devices 2500, and other developers who do not have access to and/or are not familiar with the use of those one or more federated areas 2566.

As previously discussed, such synchronized relationship(s) in which there is a need for translations between programming languages may be instantiated in support of a collaboration among developers to develop an analysis or other routine that includes developers familiar with a primary programming language associated with the use of the one or more federated areas 2566, and other developers who may, instead, be familiar with a secondary programming language. Again, such other developers may also be accustomed to relying upon an implementation of a source code management system within the other device 2100 or 2800, instead of being familiar with the use of the one or more federated areas 2566.

Again, in such a situation, such synchronization relationship(s) may entail maintaining synchronization of contents between transfer area(s) 2666 instantiated within federated areas(s) 2566 maintained by the one or more federated devices 2500 and a transfer area(s) 2166 or 2866 maintained within the storage 2160 or 2860 of the other device 2100 or 2800, respectively. Again, the transfer area(s) 2166 or 2866 may be defined to occupy the portion of the storage 2160 or 2860 of the device 2100 or 2800 within which a source code management system maintains a copy of all of the executable instructions. Correspondingly, the transfer area(s) 2666 instantiated within a federated area(s) 2566 may also be the designated location(s) in which portions of the executable instructions of the analysis or other routine are to be stored as objects. With these transfer areas and their synchronization relationship having been instantiated, it may be that the processor(s) 2550 of the one or more federated devices 2500 are caused to cooperate with the processor(s) 2150 of the device 2100 in which the transfer area(s) 2166 is instantiated, or the processor(s) of the device 2800 in which the transfer area(s) 2866 is instantiated, to use instances in which changes to portions of executable instructions have been "committed" or at least "checked in" as a trigger to cause the transfer of the affected object(s) therebetween.

Continuing with FIG. 18F, regardless of the exact manner in which the one or more federated devices 2500 are caused to transmit an object to another device 2100 or 2800, it may be that the other device 2100 or 2800 requires a portion of the transmitted object to be written in a secondary programming language that is not utilized by the processor(s) 2550 of the one or more federated devices 2500 in the performance of job flows. In some embodiments, it may be that this requirement is to be applied to job flow definitions 2220 that are to be transmitted by the one or more federated devices 2500 back to the other device 2100 or 2800, as it may be that at least some other types of object may not be transmitted back to the other device 2100 or 2800. Thus, in such embodiments, the depicted job flow definition 2220*p*, which includes input and/or output interface definitions written in the primary programming language, is to be translated into the depicted other form 2220*s*, which includes corresponding input and/or output interface definitions written in the secondary programming language.

In some of such embodiments, the processor(s) 2550 of the one or more federated devices 2500 may be caused to perform a reverse form of the translation process earlier described in connection with FIG. 17B by which the job flow definition 2220*p* stored within a federated area may have been generated from an earlier received version thereof in which the input and/or output interface definitions were written in a secondary language. More specifically, the processor(s) 2550 may be caused to translate the input and/or output interface definitions within the depicted job flow definition 2220*p* into an intermediate representation, just as might normally be done to enable a comparison to input and/or output interface implementations by one or more task routines 2440. Subsequently, the processor(s) 2550 may be caused to translate the input and/or output definitions from the intermediate representation and into the secondary programming language within the depicted job flow definition 2220*s* that is transmitted to the other device 2100 or 2800.

Alternatively, in other embodiments in which the transmission of objects back to the other device 2100 or 2800 is limited to job flow definitions 2220, and at least the input and/or output interface definitions thereof are required to be written in the secondary programming language, the processor(s) 2550 may be caused by the interpretation component 2547 to perform a direct translation from the at least the input and/or output definitions written in the primary programming language within the depicted job flow definition 2220*p*, and into at least the input and/or output definitions written in the secondary programming language within the depicted job flow definition 2220*s* that is transmitted to the other device 2100 or 2800. Such a direct translation may be deemed desirable where a fuller translation capability is needed as a result of the depicted job flow definition 2220*p* also including GUI instructions that need to be translated from the primary programming language into the secondary programming language to generate corresponding GUI instructions within the depicted job flow definition 2220*s*.

As previously discussed, job flow definitions 2220 may be derived from DAGs 2270 and/or vice versa. As also previously discussed, embodiments are possible in which different DAGs 2270 may be generated in different languages, and such different languages may be the same differing programming languages as used in portions of job flow definitions 2220. Alternatively, such different languages may be differing forms of notation, and each may be associated with a different programming language and/or a different development environment. Thus, like job flow definitions 2220, it may be that DAGs 2270 exchanged between the one or more federated devices 2500 and another device 2100 or 2800 may also be at least partially translated such that, as depicted, for a DAG 2270*p* stored within a transfer area 2666 within a federated area 2566 that employs a primary programming language or primary form of notation, there may be a corresponding DAG 2270*s* that is generated therefrom and stored within a transfer area 2166 or 2866 within a storage 2160 or 2860, respectively, that employs a secondary programming language or secondary form of notation to provide the same view of the same job flow 2200, of the same instance of performance of a job flow 2200, of the same task and/or of the same task routine 2440.

Turning to FIG. 18G, also regardless of the exact manner in which the one or more federated devices 2500 are caused to transmit an object to another device 2100 or 2800, it may be that the other device 2100 or 2800 requires being provided with a large data object that had been previously stored in a distributed manner among multiple storage devices 2600*a-x* and/or 2600*z*, such as the depicted flow input data set 2330. As a result, a whole version of the flow input data set 2330 may need to be reassembled (e.g., in a reduction operation) from the multiple blocks into which it had been previously divided for storage, such as the depicted multiple data object blocks 2336*d* distributed across the storage devices 2600*a-x*, or across the federated devices 2600*a-x*, described in connection with FIG. 17C. However, as previously discussed, in some embodiments, it may be that such distributed storage of the flow input data set 2330 had entailed a conversion into a distributable form, such as the conversion that was also earlier described in connection with FIG. 17C. Thus, in such embodiments, reassembly of the flow input data set 2330 from the multiple data object blocks 2336*d* may entail a reversal of the earlier performed conversion into distributable form.

Therefore, in response to the requirement to provide the flow input data set 2330 to another device 2100 or 2800, and based on whether the flow input data set 2330 had been converted into a distributable form as part of storing it, the processor(s) 2550 of the one or more federated devices 2500 may be caused by execution of the selection component 2543 and/or the database component 2544 to cooperate with the storage devices 2600*a-x* and/or 2600*z*, or with the federated devices 2500*a-x* and/or 2500*z*, to retrieve the flow input data set 2330*d* of distributable form the multiple data object blocks 2336*d* distributed thereamong. As previously discussed in reference to FIG. 17D, it may be that a data object location identifier 2332 is accessed to retrieve indications of aspects of the manner in which the flow input data set 2330 was stored, including and not limited to, indications of having been so converted, of having been stored in a distributed manner, of what federated area 2566 in which it is stored and/or of which devices 2600*a-x* and/or 2500*a-x* in which it is stored in a distributed manner Δgain, such indications may affect the choice of which devices are communicated with to retrieve the flow input data set 2330.

In some embodiments in which the flow input data set 2330 is stored across the storage devices 2600*a-x*, it may be the storage devices 2600*a-x* and/or 2600*z* that perform the work of reassembling the flow input data set 2330*d* from the data object blocks 2336*d* as the flow input data set 2330*d*. Alternatively, it may be the processor(s) 2550 of the one or more storage devices 2500 that are to transmit the retrieved flow input data set 2330 to the other device 2100 or 2800 that may be caused to perform such a reassembly.

With the flow input data set 2330*d* reassembled, the processor(s) 2550 may then perform a reverse conversion of the flow input data set 2330*d* of distributable form into the originally received form of the flow input data set 2330. In so doing, the processor(s) 2550 may re-create a distinct metadata data structure within the re-created flow input data set 2330 (if such a metadata data structure was present therein, originally), and/or may organized the data items therein into multiple distinct and/or non-homogeneous data structures within the re-created flow input data set 2330 (if such multiple data structures were present therein, originally). Regardless of the exact actions required to re-create the flow input data set 2330 in its originally received form, following such a re-creation, the processor(s) 2550 may then be caused to transmit the newly re-created original form of the flow input data set 2330 to the other device 2100 or 2800 via the network 2999.

Figure 19A:
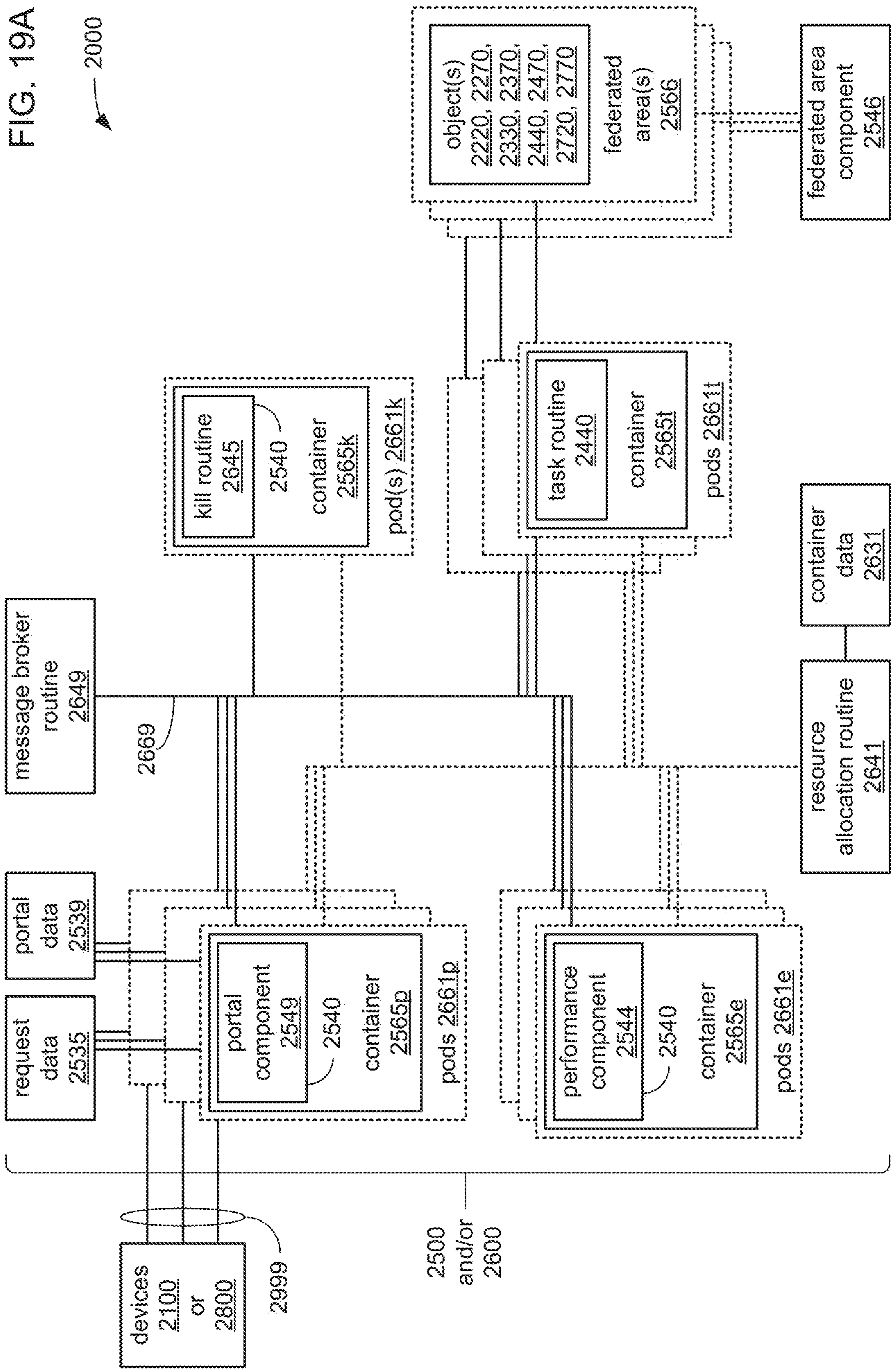
FIGS. 19A, 19B, 19C, 19D, 19E, 19F and 19G, together, illustrate an example of using a messaging architecture to coordinate the execution of routines (including task routines) among dynamically allocated containers.
Figure 19B:
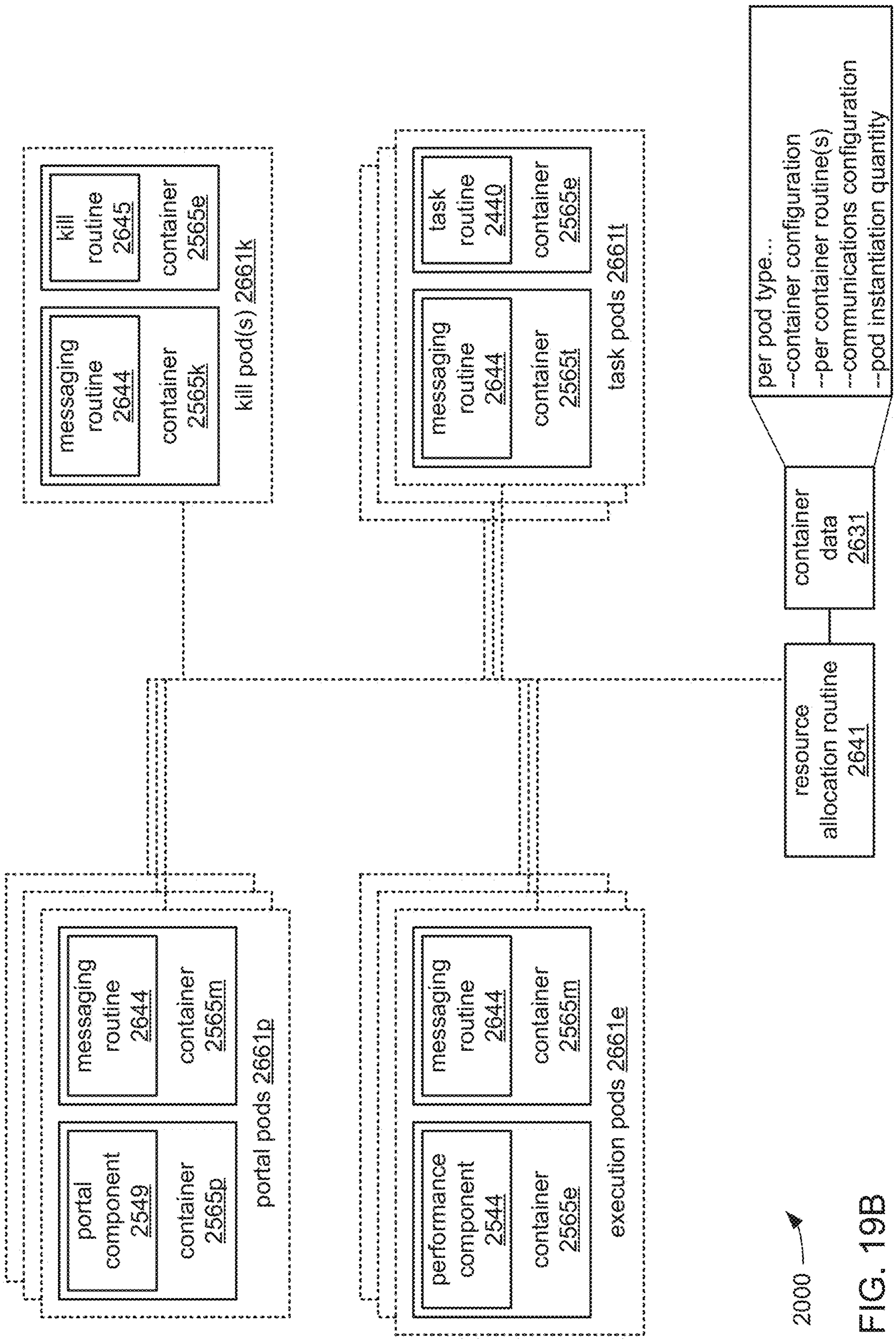
Figure 19C:
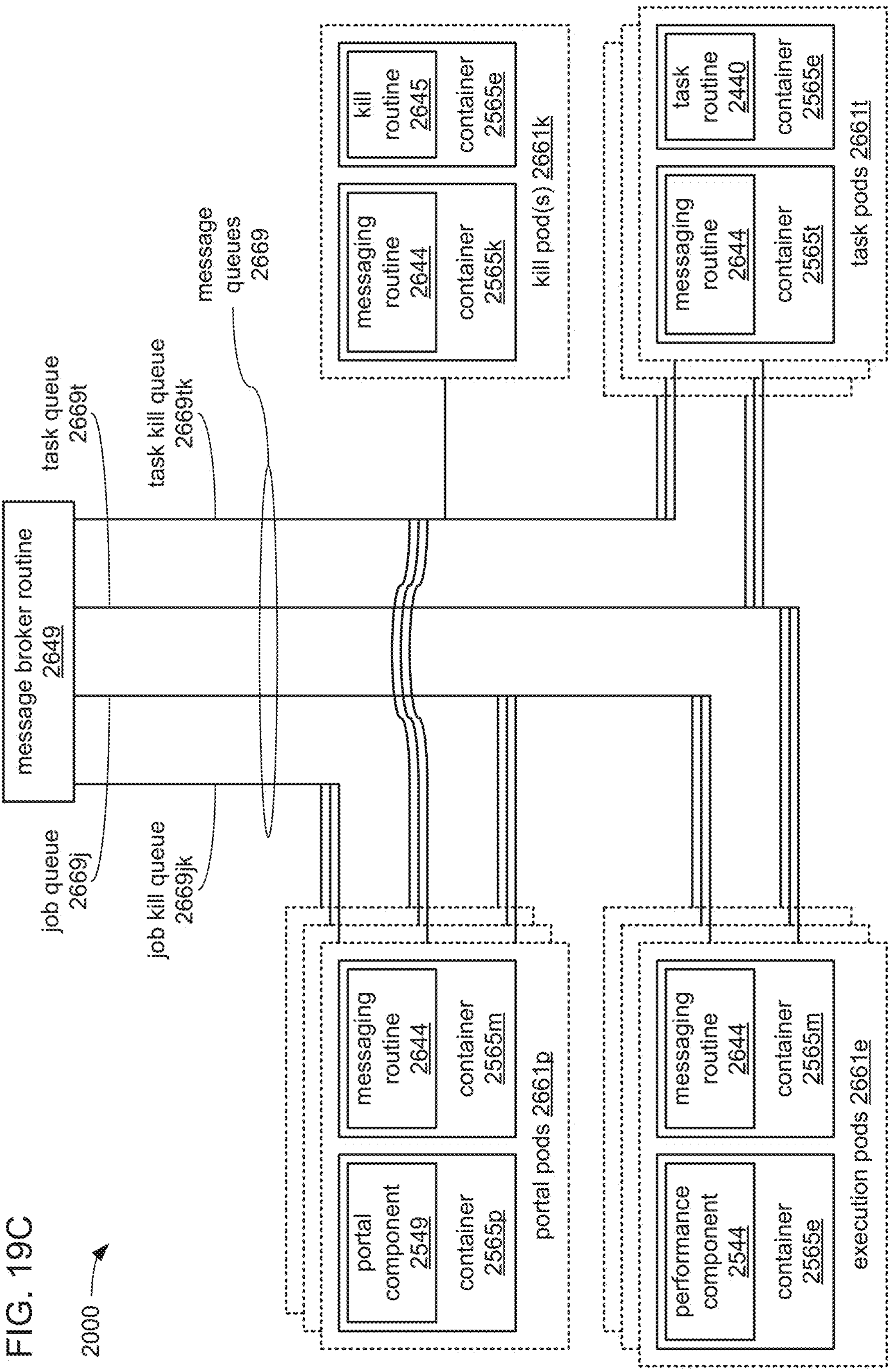
Figure 19D:
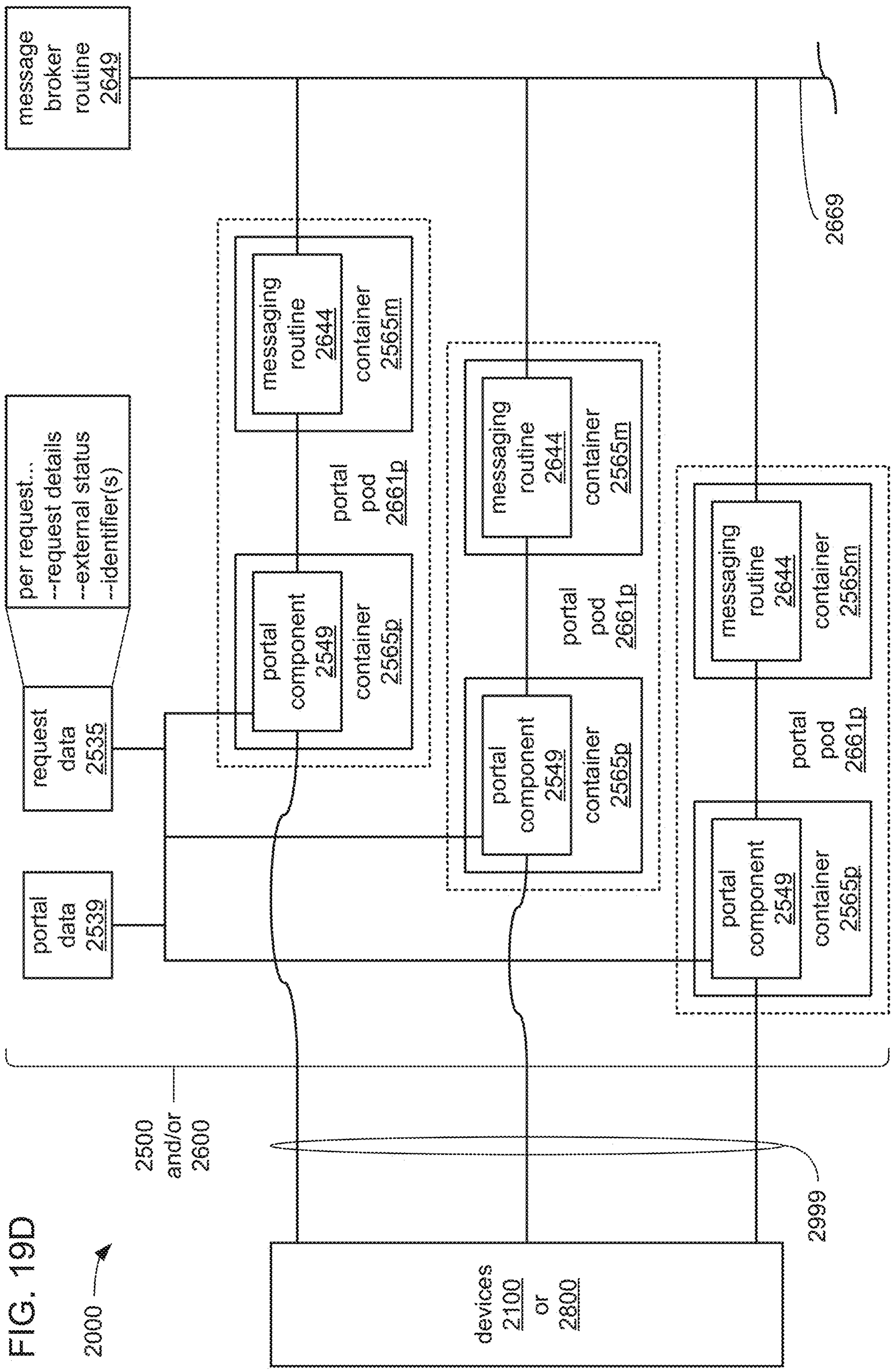
Figure 19E:
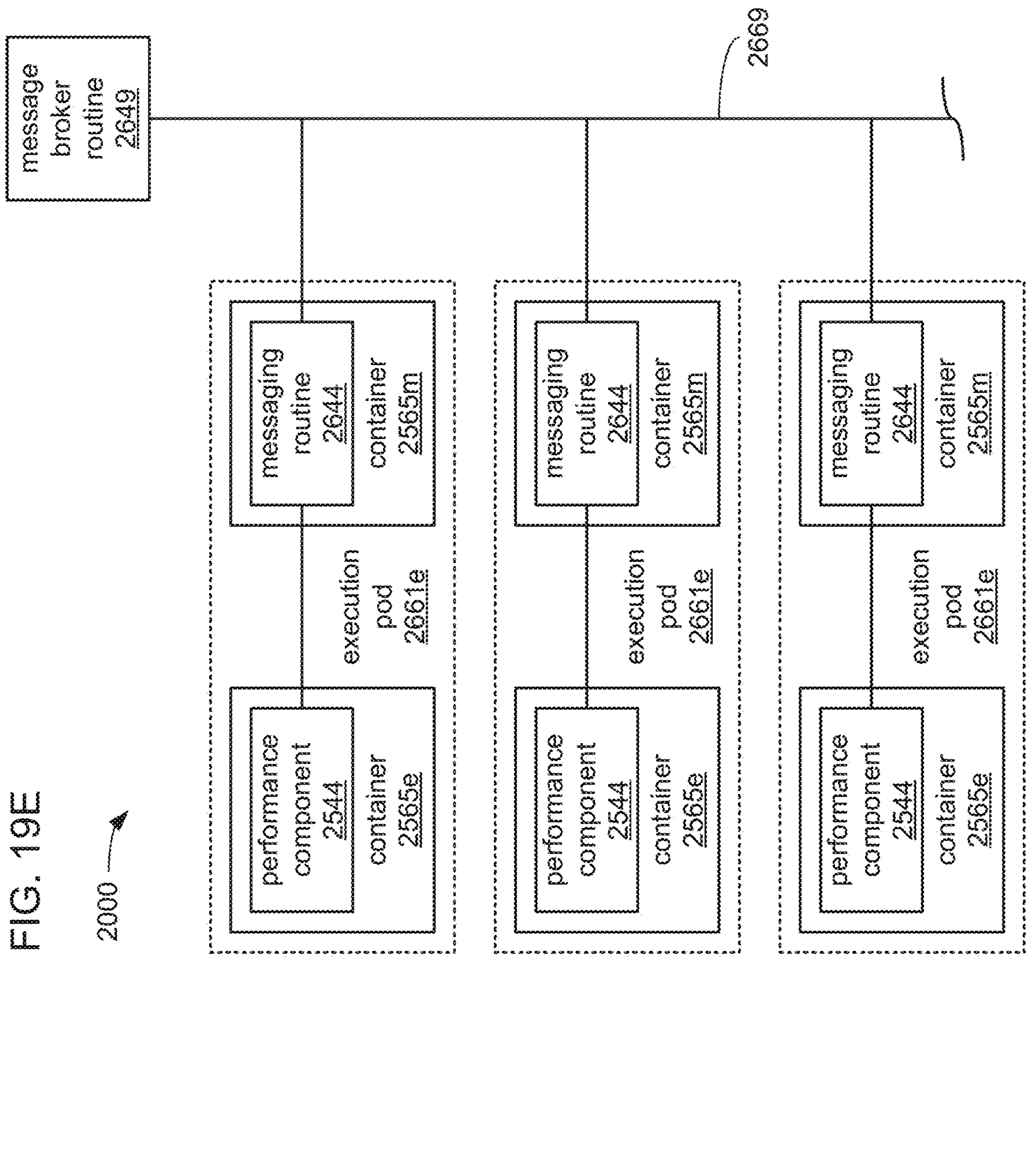
Figure 19F:
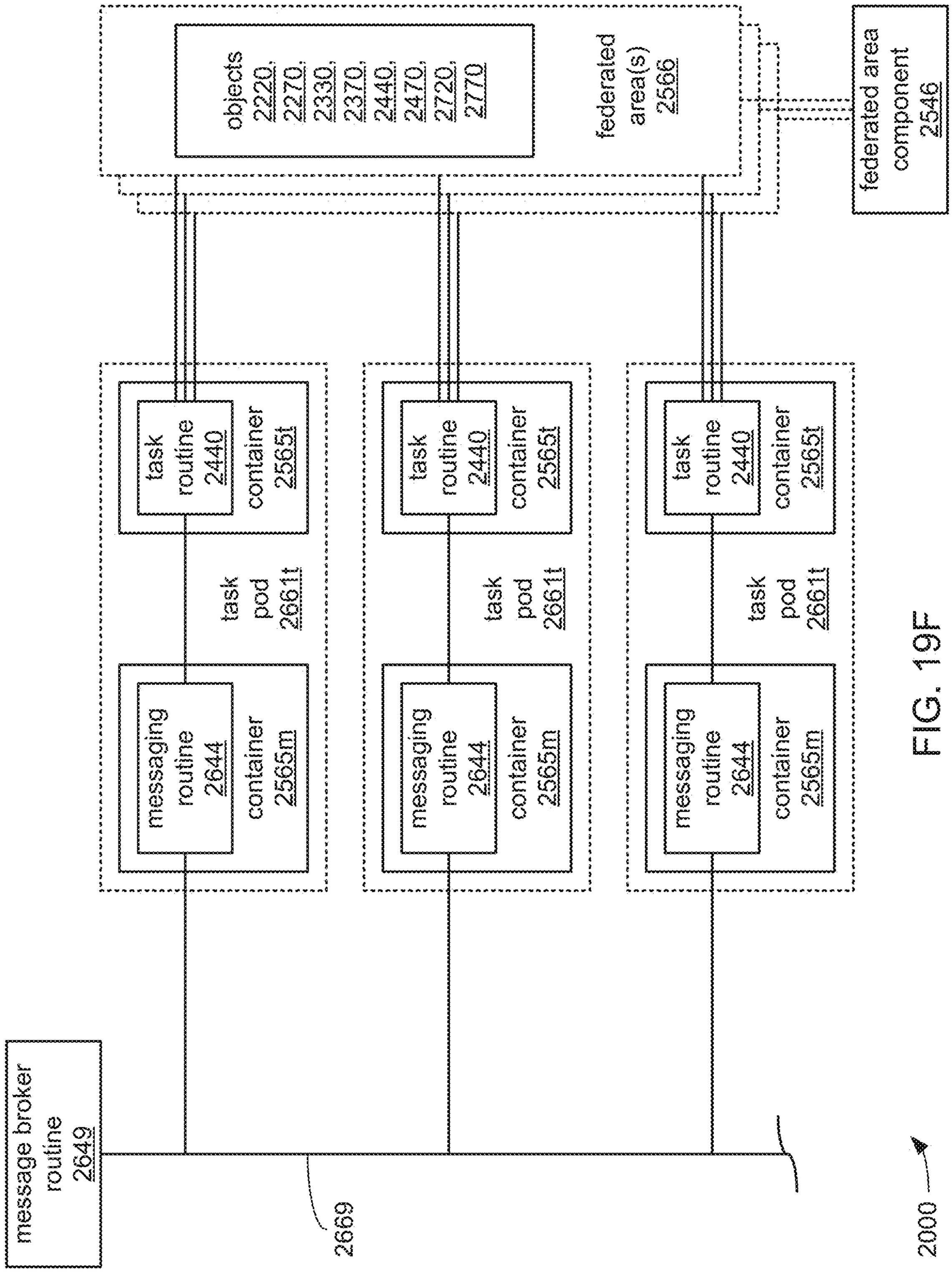
Figure 19G:
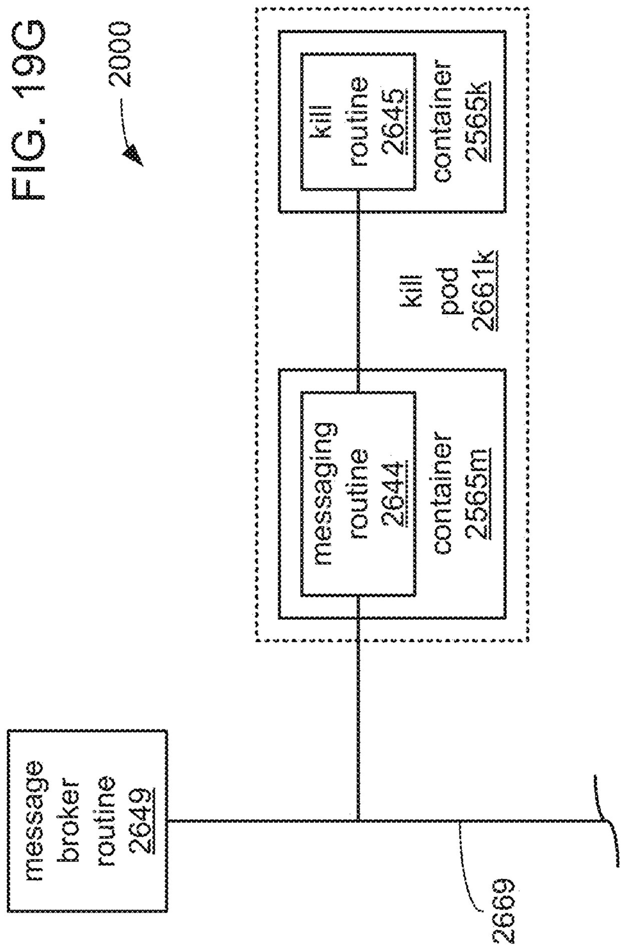

FIGS. 19A, 19B, 19C, 19D, 19E, 19F and 19G, together, illustrate various aspects of providing coordination through message queues to better enable the use of a resource allocation routine 2641 to dynamically allocate processing, storage and/or other resources of the federated device(s) 2500 and/or of the storage device(s) 2600 through the dynamic allocation of containers 2565 for the execution of routines within pods 2661. As is about to be explained, containers 2565 may be dynamically allocated within various types of pods 2661 that support the execution of various different routines, including and not limited to, portal pods 2661*p*, performance pods 2661*e*, task pods 2661*t* and kill pods 2661*k*. FIGS. 19A-C illustrates aspects of an overall architecture for providing such coordination. FIG. 19D illustrates aspects of the coordinated allocation of containers 2565 within portal pods 2661*p* to support the execution of one or more instances of the portal component 2549. FIG. 19E illustrates aspects of the coordinated allocation of containers 2565 within performance pods 2661*e* to support the execution of one or more instances of the performance component 2544. FIG. 19F illustrates aspects of the coordinated allocation of containers 2565 within task pods 2661*t* to support the execution of task routines 2440. FIG. 19G illustrates aspects of the coordinated allocation of at least one container 2565 within a kill pod 2661*k* to support the execution of a kill routine 2515.

Turning to FIG. 19A, in some embodiments, as part of implementing MTC in which complex analysis routines may be implemented as multiple task routines 2440 that are executed in a distributed manner under the control of a job flow definition 2220, a resource allocation routine 2641 may be relied upon to dynamically instantiate, maintain and/or uninstantiate containers 2565 within which the task routines 2440 and other routines that coordinate such distributed execution may each be separately executed. As previously discussed, the resource allocation routine 2641 may be an implementation of Kubernetes or similar software that allocates such containers 2565 within multiple pods 2661 of various types. As will be familiar to those skilled in the art, the overall quantity of the pods 2661 (and accordingly, the overall quantity of containers 2565) that are currently allocated may fluctuate under the control of the resource allocation routine 2641 in response to changes in the level of availability of processing, storage, communications and/or other resources within each of the federated device(s) 2500 and/or within each of the storage device(s) 2600. As previously discussed, such fluctuations in the overall quantity of currently allocated pods 2661 may be dynamically increased through the instantiation of one or more pods 2661, and may be dynamically decreased through the uninstantiation of one or more pods 2661, and such instances of instantiation and uninstantiation may occur without any coordination to when the execution of any routine within any container 2565 is commenced or is completed.

The uncoordinated instantiation of one or more new pods 2661 (and accordingly, one or more new containers 2565 within which routines may be executed) may present no issue to the successful execution of task routines 2440 associated with a job flow, and no issue to the successful execution of other routines to that serve to coordinate such executions of task routines 2440. Stated differently, the instantiation of a new container 2565, regardless of when it occurs, has little or no affect on the executions of routines already underway in other containers 2565 that already exist. However, the uncoordinated uninstantiation of a pod 2661 causes the uncoordinated uninstantiation of a container 2565 within which the execution of a routine may be underway, thereby causing such execution of that routine to cease with aspects of the execution of that routine in an unknown state, such that resumption of the execution of that routine from the point at which execution ceased may not be possible.

To mitigate the effects of such events on the distributed execution of task routines 2440 of a job flow, a message broker routine 2519 may maintain a set of message queues 2619 through which particular types of messages are exchanged among particular subsets of the various types of pods 2661. The particular messages that are exchanged and the protocols that are used in doing so may provide a mechanism to maintain information concerning the current state of execution of various ones of the routines within the containers 2565. In this way, an uncoordinated uninstantiation of a pod 2661 that causes the uncoordinated cessation of execution of a routine within a container 2565 of that pod 2661, may be responded to by causing the commencement of execution of a new instance of that same routine within another container 2565 of another pod 2661, when available. Stated differently, such commencement of execution of a new instance of that same routine within another container 2565 may be occasioned upon: 1) the completion of execution of another routine within an existing container 2565 within an existing pod 2565, such that the existing container 2565 becomes available for use; or 2) the instantiation of an entirely new container 2565 within a newly instantiated pod 2661, such that a new container 2565 becomes available for use.

Turning to FIG. 19B, in being executed by processor(s) 2550 of the federated device(s) 2500, the resource allocation routine 2641 may be caused to dynamically allocate a set of multiple pods 2661 of multiple types in accordance with configuration information stored within container data 2531. More specifically, the container data 2531 may specify a quantity of each type of pod 2661 that is to be maintained (e.g., a maximum and/or a minimum quantity per type), levels of one or more types of resource required to support each type, a quantity of containers 2565 to be instantiated within each type of pod 2661, particular routines that are to be executed within one or more containers 2565 within each type of pod 2661, and/or various aspects of communications that are to be permitted with the environment external to each type of pod 2661. Each the aforementioned types of pod 2661*p*, 2611*e*, 2611*t* and 2611*k* may have both features that are common to all types and features that may be unique to each type, as specified in the container data 2531.

As an example commonality among all types of pod 2661, it may be that the container data 2531 specifies that all of these types of pod 2661 (e.g., 2611*p*, 2611*e*, 2611*t* and 2611*k*) are to be instantiated with a pair of containers 2565 therein. It may be that one of the containers 2565 within all of these types of pod 2661 are specified as being dedicated to the execution of a messaging routine 2514 (e.g., a messaging container 2565*m*) to facilitate communications with one or more others of these types of pod 2661 through one or more of the message queues 2619. However, and as will shortly be explained in greater detail, the messaging routine 2514 within each of the different types of pod 2661 may be configured to exchange different types of message and through different ones of the message queues 2619.

As an example difference among all types of pod 2661, it may be that the container data 2531 specifies that 1) the other container 2565 (e.g., a portal container 2565*p*) within each of the portal pods 2661*p* is to be used for the execution of an instance of the portal component 2549; 2) the other container 2565 (e.g., the performance container 2565*e*) within each of the performance pods 2661*e* is to be used for the execution of an instance of the performance component 2544; 3) the other container 2565 (e.g., the task container 2565*t*) within each of the task pods 2661*t* is to be used for the execution of an instance of a task routine 2440; and/or 4) the other container 2565 (e.g., the kill container 2565*k*) within each of the kill pods 2661*k* is to be used for the execution of an instance of the kill routine 2515. As depicted, it may be that the quantity of the kill pods 2661*k* that are allocated by the resource allocation routine 2641 may be less than the quantities of the others, and indeed, may be specified in the container data 2531 as being as few a quantity of one. As will shortly be explained in greater detail, it is envisioned that relatively few of the kill pods 2661*k* should be needed compared to the other types of pod 2661.

Turning to FIG. 19C, in being executed by processor(s) 2550 of the federated device(s) 2500, the message broker routine 2519 may be caused to instantiate and maintain a set of message queues 2619 that, as depicted, may include a job queue 2619*j*, a task queue 2619*t*, a job kill queue 2619*jk* and/or a task kill queue 2619*tk*. As previously discussed, the message broker routine 2519 may be one that is selected for its ability to implement the widely used Advanced Message Queuing Protocol (AMQP), such as RabbitMQ. In some embodiments, the messages that are exchanged may generated to conform to any of a variety of types of format, including and not limited to a human-readable format such as JavaScript Object Notation (JSON) promulgated by ECMA International of Geneva, Switzerland.

As depicted, each one of the different message queues 2619*j*, 2619*t*, 2619*jk* and 2619*tk* may be made accessible to and utilized by different subsets of the different types of pod 2661*p*, 2611*e*, 2611*t* and 2611*k*. More specifically, the job queue 2619*j* may be accessible to and utilized by the portal pods 2661*p* and the performance pods 2661*e*; the task queue 2619*t* may be accessible to and utilized by the performance pods 2661*e* and the task pods 2661*t*; the job kill queue 2619*jk* may be solely accessible to and utilized by the portal pods 2661*p*; and the task kill queue 2619*tk* may be accessible to and utilized by the portal pods 2661*p*, the task pods 2661*t* and the kill pod(s) 2611*k*.

As will be familiar to those skilled in the art, each such message queue 2619*j*, 2619*t*, 2619*jk* and 2619*tk* functions essentially as a set of storage spaces for the storage of messages. Thus, when a message is "output" onto the one of these queues 2619, that message is actually being stored within that queue, and may remain stored therein until actively removed therefrom (or perhaps, until the queue's capacity is reached such that earlier messages may be overwritten, unless the queue's capacity is not fixed or is otherwise expandable to a degree based on available storage resources). This also applies where a message is said to be "exchanged" through one of these queues 2619—it is "exchanged" in the sense that it is stored within one of these queues 2619 and is at least detected as being stored therein and accessed to retrieve its contents, and then, may then also be removed therefrom, although again. such removal may be a separate action such that it is not coincident with being accessed to read its contents. Again, and as will be explained in greater detail, many of the messages that may be output from various ones of the pods 2661 onto various ones of the message queues 2619 may not be specifically directed at another particular one of the pods 2661. This is reflective of the fact that, in the middle of the performance of a job flow, one or more of the pods 2661 of any of the various types may be uninstantiated by the resource allocation routine 2641. Thus, it may simply not be possible to rely on any particular one of the pods 2661 to remain instantiated throughout the performance of a job flow. Stated differently, which pods 2661 are involved in different aspects of the performance of a job flow may change throughout the time that job flow is being performed, depending on which pods 2661 are instantiated and/or are available for use.

Turning to FIG. 19D, each of the portal pods 2661*p* may serve to provide a portal container 2565*p* in which an instance of the portal component 2549 may be executed. As has been previously discussed, in executing the portal component 2549, processor(s) 2550 of the federated device(s) 2500 may be caused to operate one or more of the network interfaces 2590 thereof to provide a portal accessible by other devices via the network 2999 (e.g., the source devices 2100 and/or the reviewing devices 2800), and through which requests may be received to perform various operations, including the performance of job flows. With multiple instances of the portal component 2549 being separately executed in multiple portal containers 2565*p* across multiple ones of the portal pods 2661*p*, different cores 2555 of one or more processor(s) 2550 of the one or more federated devices 2500 that execute different ones of the multiple instances of the portal component 2549 may be caused to share in maintaining the portal on the network 2999 and/or in receiving and/or responding to requests from other devices to perform various operations.

Any of a variety of types of portal may be provided that may use any of a variety of types of protocol and/or applications programming interface (API). By way of example, the portal may be implemented as a secure webpage portal employing the hypertext transfer protocol over secure sockets layer (HTTPS) that requires the provision of a password and/or other security credentials. Alternatively or additionally, the portal may employ an implementation of representational state transfer (REST or RESTful) API. Also alternatively or additionally, the portal may be configured to receive requests to perform operations that have formatting, syntax and/or other characteristics selected to conform to one or more industry specifications for communications between devices, such as one or more of the versions of the Message-Passing Interface (MPI) specification promulgated by the MPI Forum, a cooperative venture by numerous governmental, corporate and academic entities.

Regardless of the exact manner in which a portal may be implemented, and/or what protocol(s) and/or API(s) may be used, execution of the instance(s) of the portal component 2549 may cause core(s) 2555 of the processor(s) 2550 of the one or more federated devices 2500 to refer to indications stored within the portal data 2539 of what persons, entities and/or machines are authorized to be granted access to the various services that may be provided by the federated device(s) 2500. Such indications may include indications of security credentials expected to be provided by such persons, entities and/or machines. In some embodiments, such indications within the portal data 2539 may be organized into a database of accounts that are each associated with an entity with which particular persons and/or devices may be associated. Security credential presented by other devices across the network 2999 to the portal may be evaluated against such information stored within the portal data 2539 to determine whether access is to be granted.

Presuming access has been granted such that a request for a performance of a job flow is accepted from another device across the network 2999, then a record of details of the request, including the current status of the requested job flow performance, may be maintained within the request data 2535. In some embodiments, the request data 2535 may be implemented as a database to which access is shared by all of the instances of the portal component 2549 that are being executed within separate portal containers 2565*p* within separate ones of the portal pods 2661*p*. As will be explained in greater detail, an instance of the portal component 2549 that receives a request to perform a job flow may both store an indication of the request within a new entry for that request within the request data 2535, and may then exchange messages through the job queue 2619*j* with an available one of the instances of the performance component 2544 being executed within a portal container 2565*p* within one of the performance pods 2661*e* to cause commencement of the requested performance, and to monitor the status of that requested performance. Again, such exchanges with the job queue 2619*j* may be through the messaging routine 2514 that is executed within the corresponding messaging container 2565*m*.

Turning to FIG. 19E, each of the performance pods 2661*e* may serve to provide a performance container 2565*e* in which an instance of the performance component 2544 may be executed. As has been previously discussed, in executing the performance component 2545, processor(s) 2550 of the federated device(s) 2500 may be caused to: 1) coordinate the retrieval of the objects necessary to perform a particular job flow from one or more federated areas 2566, 2) to derive an order of performance of the tasks of the job flow that is based on indications of dependencies among the tasks indicated in the job flow definition 2220 and that takes advantage of opportunities for parallel performances of tasks, and 3) coordinate the execution of the task routines 2440 to enact the performances of those tasks in the derived order.

As previously discussed, the request received by one of the instances of the portal component 2549 may expressly identify the job flow that is requested to be performed by including the job flow identifier 2221 of the job flow definition 2220 that describes the job flow, or may indirectly refer to the job flow in any of a variety of ways, such as by including the instance log identifier 2721 of an instance log 2720 that documents a past performance of the job flow. As will be explained in greater detail, the message output onto the job queue 2619*j* by an instance of the portal component 2549 that conveys the request to perform a job flow may include whatever identifier(s) were provided in the original request received from across the network 2999.

An available one of the instances of the performance component 2544 that accepts that message through the job queue 2619*j* may use whatever identifiers are provided therein to obtain the job flow definition 2220 that describes the job flow and/or an instance log 2720 that documents a past performance of the job flow. As will also be explained in greater detail, that instance of the performance component 2544 may then exchange numerous messages with available instances of the task pods 2661*t* through the task queue 2619*t* to cause the executions of the task routines 2440 within those available task pods 2661*t* to cause performances of the tasks of the job flow. That instance of the performance component 2544 may exchange further messages with those task pods 2661*t* through the task queue 2619*t* to monitor the progress of those executions of task routines 2440. Upon completion of the executions of all of those task routines 2440, that instance of the performance component 2544 may output a message on the job queue 2619*j* to an available instance of the portal component 2549 indicating the successful completion of the job flow. Again, such exchanges with the job queue 2619*j* may be through the messaging routine 2514 that is executed within the corresponding messaging container 2565*m*.

Turning to FIG. 19F, each of the task pods 2661*t* may serve to provide a task container 2565*t* in which an instance of a task routine 2440 retrieved from a federated area 2566 may be executed. As depicted, each of the task pods 2661*t* may be instantiated with the ability to directly access federated area(s) 2566 to directly retrieve such objects as task routines 2440 to be executed within a task container 2565*t*, as well as to directly retrieve any data objects needed as input, and to directly store any data objects that are generated as output.

As will be explained in greater detail, a message output by an instance of the performance component 2544 that requests for an available task pod 2661*t* to execute a particular task routine 2440, may include the task routine identifier 2441 that uniquely identifies that task routine 2440. An available one of the task pods 2661*t* that accepts that message may then use that task routine identifier 2441 to directly retrieve that task routine 2440 from a federated area 2566 to be executed within a task container 2565*t* within that task pod 2661*t*. As will also be explained in greater detail, that task pod 2661*t* may exchange further messages with that instance of the performance component 2544 to enable monitoring of the progress of execution of the retrieved task routine 2440 within that task pod 2661*t*. Again, such exchanges with the job queue 2619*j* may be through the messaging routine 2514 that is executed within the corresponding messaging container 2565*m*.

Turning to FIG. 19G, the kill pod 2661*k* may serve to provide a kill container 2565*k* in which an instance of the kill routine 2515 may be executed. Like each of the instances of the performance component 2544, the kill routine 2515 may monitor the messages output by each of the task pods 2661*t* onto the task queue 2619*t* to monitor the status of the execution of task routines 2440 within each of task pods 2661*t*. However, unlike any of the instances of the performance component 2544, the kill routine 2515 more specifically monitors for a series of messages indicating that attempts to perform a particular task routine 2440 in connection with a particular job flow have failed a quantity of times that meets a predetermined threshold quantity for triggering the cancellation of that job flow.

As will be explained in greater detail, where the execution of a task routine 2440 fails badly enough to cause a crash within a task container 2565*t* of a task pod 2661*t*, the messaging routine 2514 being executed in the corresponding messaging container 2565*m* therein may be triggered to output a message onto the task queue 2619*t* indicating that execution of that task routine 2440 has ended with an error. The output of such a message may then be followed by an uninstantiation of that task pod 2661*t*, which may then trigger the resource allocation routine 2641 to instantiate a new task pod 2661*t* as a replacement. It may be deemed desirable for a task pod 2661*t* in which such a crash has occurred to be uninstantiated, rather than to attempt to use that task pod 2661*t* in re-attempting execution of the same routine or in executing another routine, as the crash that occurred may have adversely affected various aspects of the state of the task container 2565*t* within which the crash occurred and/or of that task pod 2661*t* such that unpredictable results may arise if that same task container 2565*t* within that same task pod 2661*t* is used again.

As will also be explained in greater detail, the message that is output onto the task queue 2619*t* from that task pod 2661*t*, before it is uninstantiated, may include the task routine identifier 2441 of the task routine 2440 that crashed and/or the job flow identifier 2221 of the job flow 2220 that the attempted execution of that task routine 2440 is associated with. Upon observing a quantity of messages on the task queue 2619*t* that indicate enough instances of failure in executing the same task routine 2440 in association with the same job flow, execution of the kill routine 2515 may cause core(s) 2555 of processor(s) 2550 of the one or more federated devices to respond by outputting a message onto the task kill queue 2619*tk* that conveys a command to all task pods 2661*t* in which any task routine 2440 is being executed to perform a task of that same job flow to cease any further execution of such task routines 2440. Such a message may include the job flow identifier 2221 to specify that job flow.

Again, each of the task pods 2661*t* may have access to the task kill queue 2619*tk* in addition to having access to the task queue 2619*t*. Each of the task pods 2661*t* may monitor the task kill queue 2619*tk* for such messages conveying such commands to cease the execution of various task routines 2440. Upon detecting the output of the message by the kill routine 2515 to cease the execution of all task routines 2440 associated with that job flow, each of the task pods 2661*t* in which such a task routine 2440 is currently being executed may: 1) cease such execution, 2) transmit a message onto the task queue 2619*t* indicating the cessation of execution of the task routine 2440 for reasons of that execution having been commanded to be canceled, and 3) cause its own uninstantiation.

The receipt, by an instance of the performance component 2544 that is coordinating the performance of that job flow, of one or more of such messages from one or more of the tasks pods 2661*t* indicating such cessation(s) of execution of task routine(s) associated with that job flow as a result of being commanded to do so, may cause that instance of the performance component 2544 to 1) cease to transmit any further messages to any task pods 2661*t* to perform any more task routines 2440 in connection with that job flow, and 2) output a message via the job queue 2619*j* to an available instance of the portal component 2549 indicating the cancellation of that job flow for reasons of errors having been encountered in attempting to perform it. That available instance of the portal component 2549 may relay such an indication onward to the device from which the request was received to perform it. Again, such exchanges with the job queue 2619*j* may be through the messaging routine 2514 that is executed within the corresponding messaging container 2565*m*.

Figure 20A:
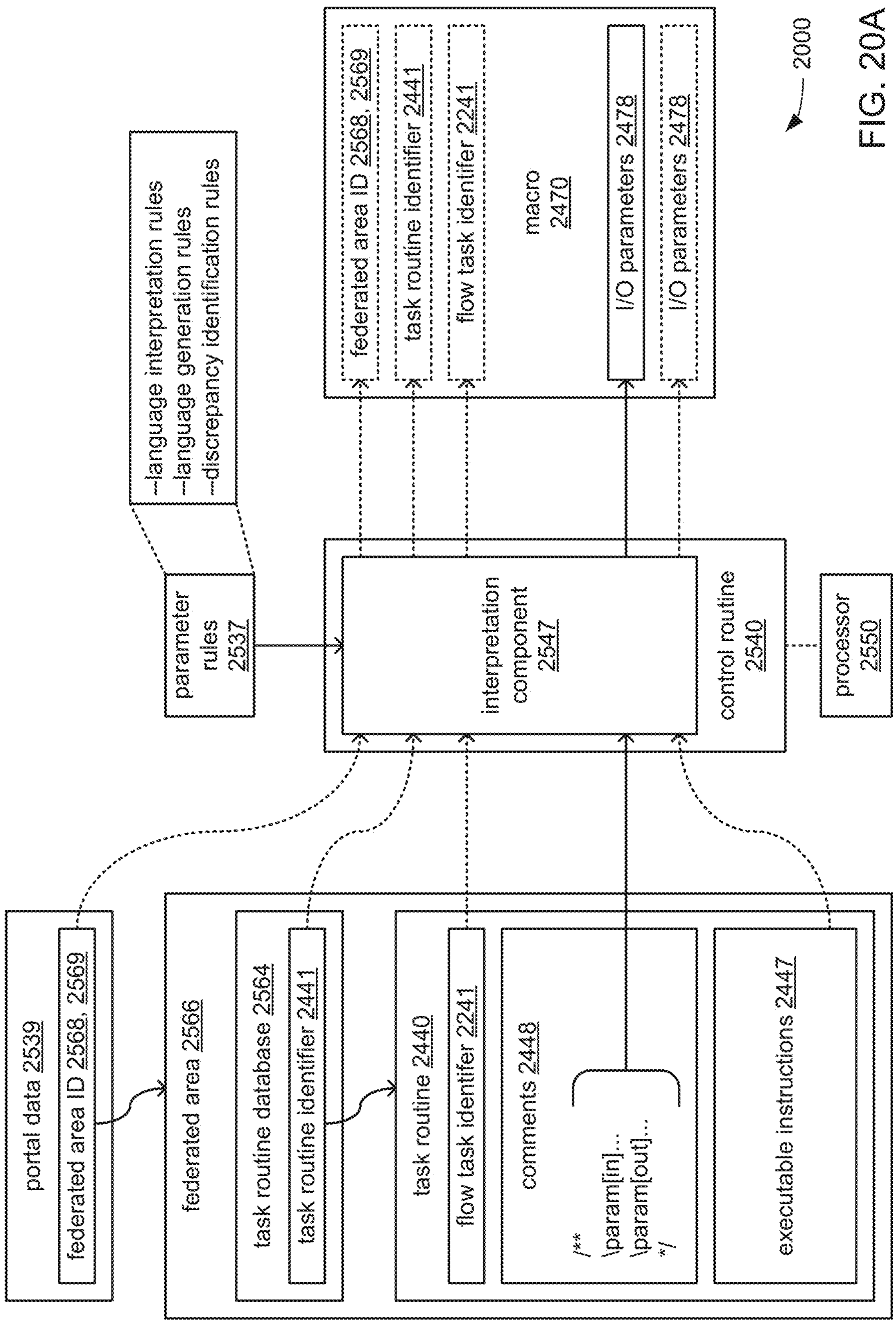
FIGS. 20A, 20B, 20C, 20D and 20E, together, illustrate aspects of the generation and use of a DAG.
Figure 20B:
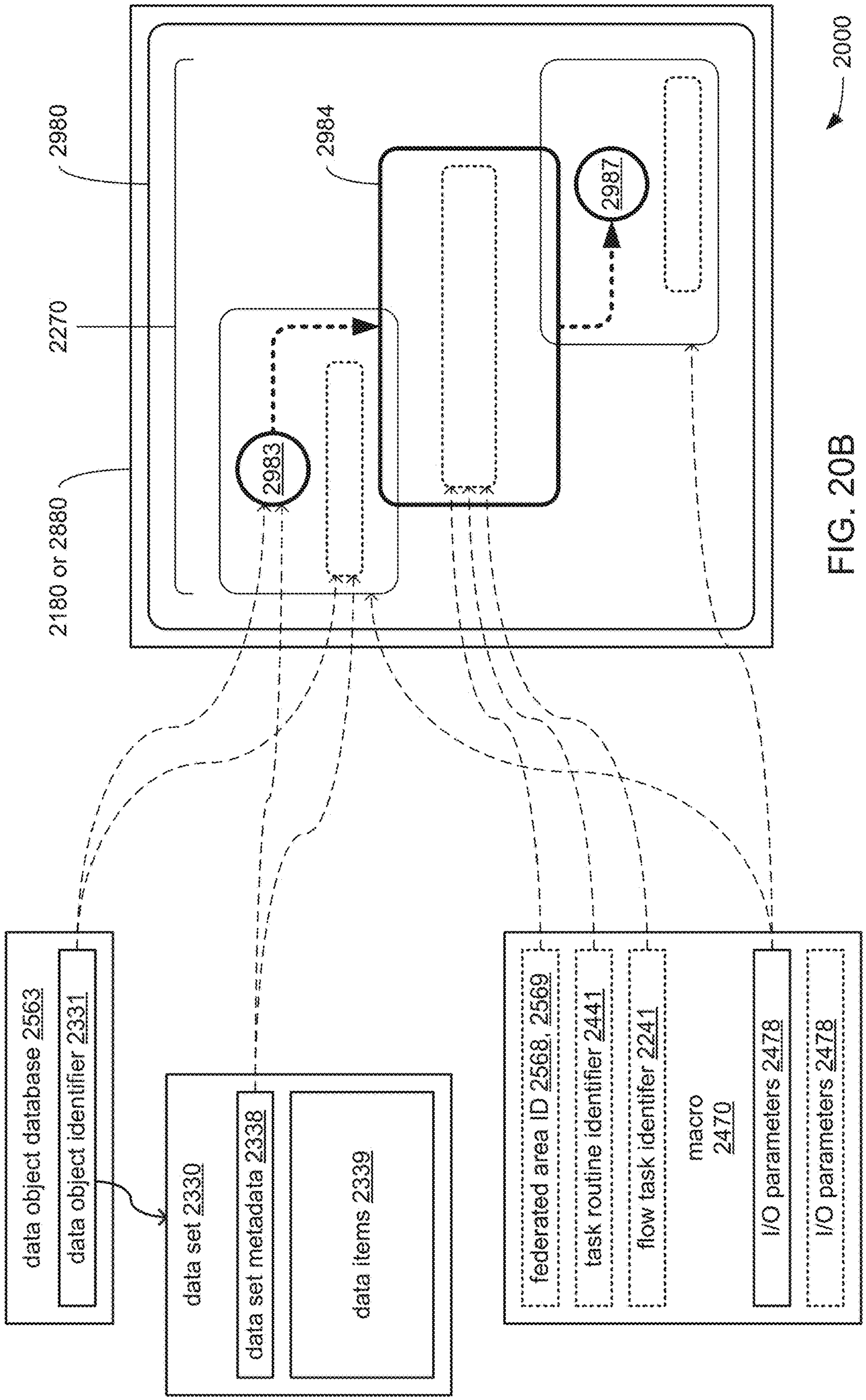
Figure 20C:
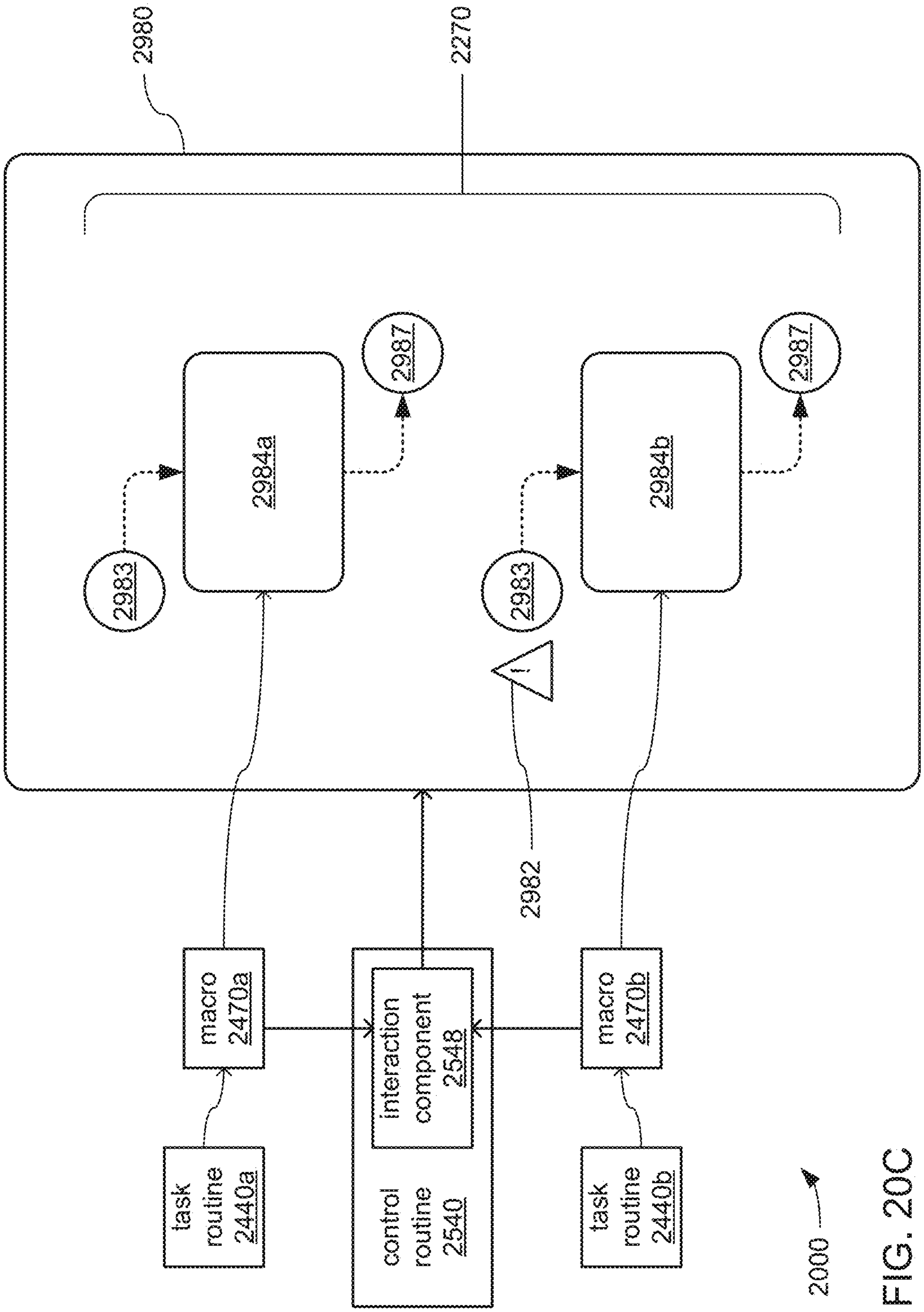
Figure 20D:
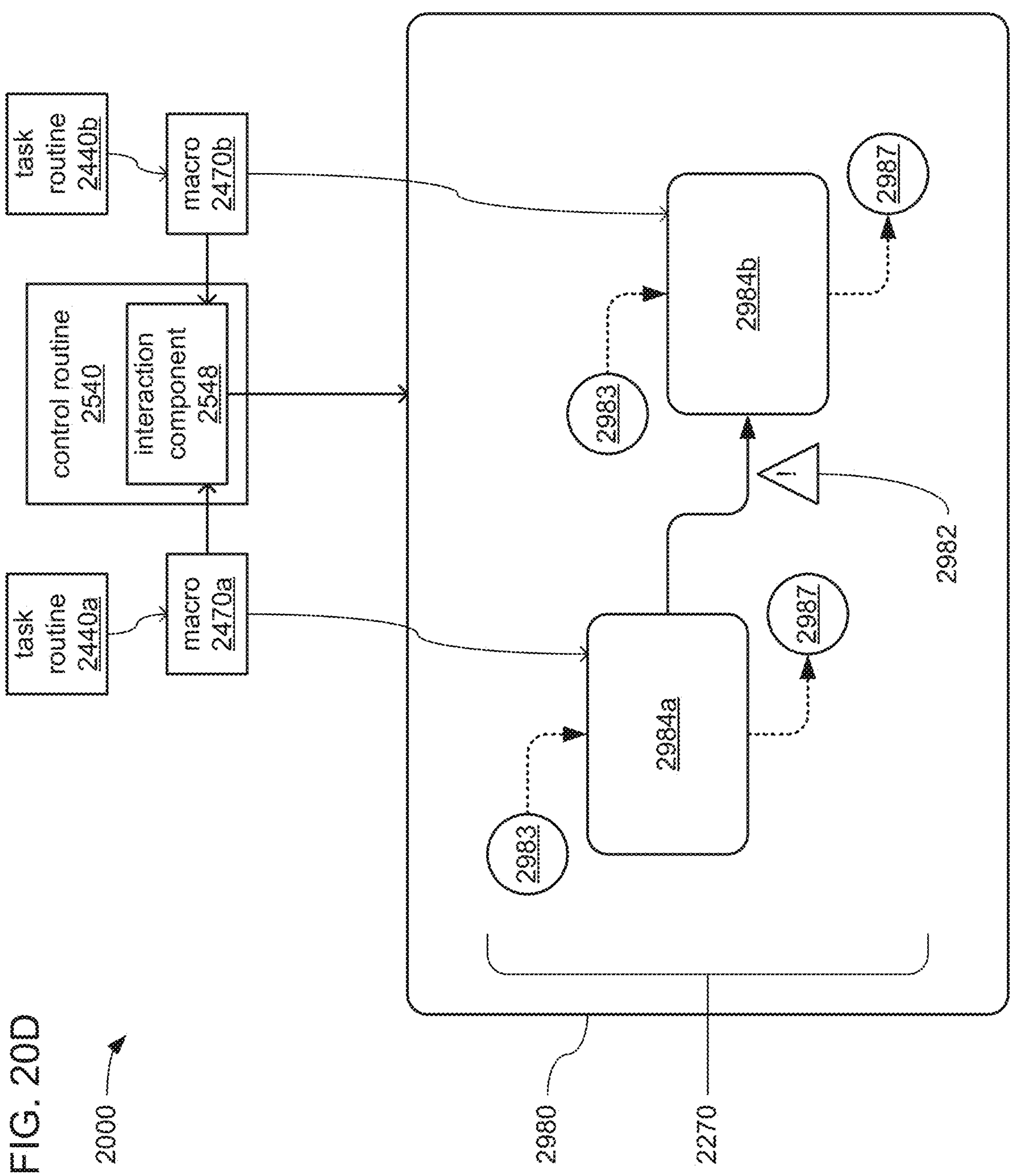
Figure 20E:
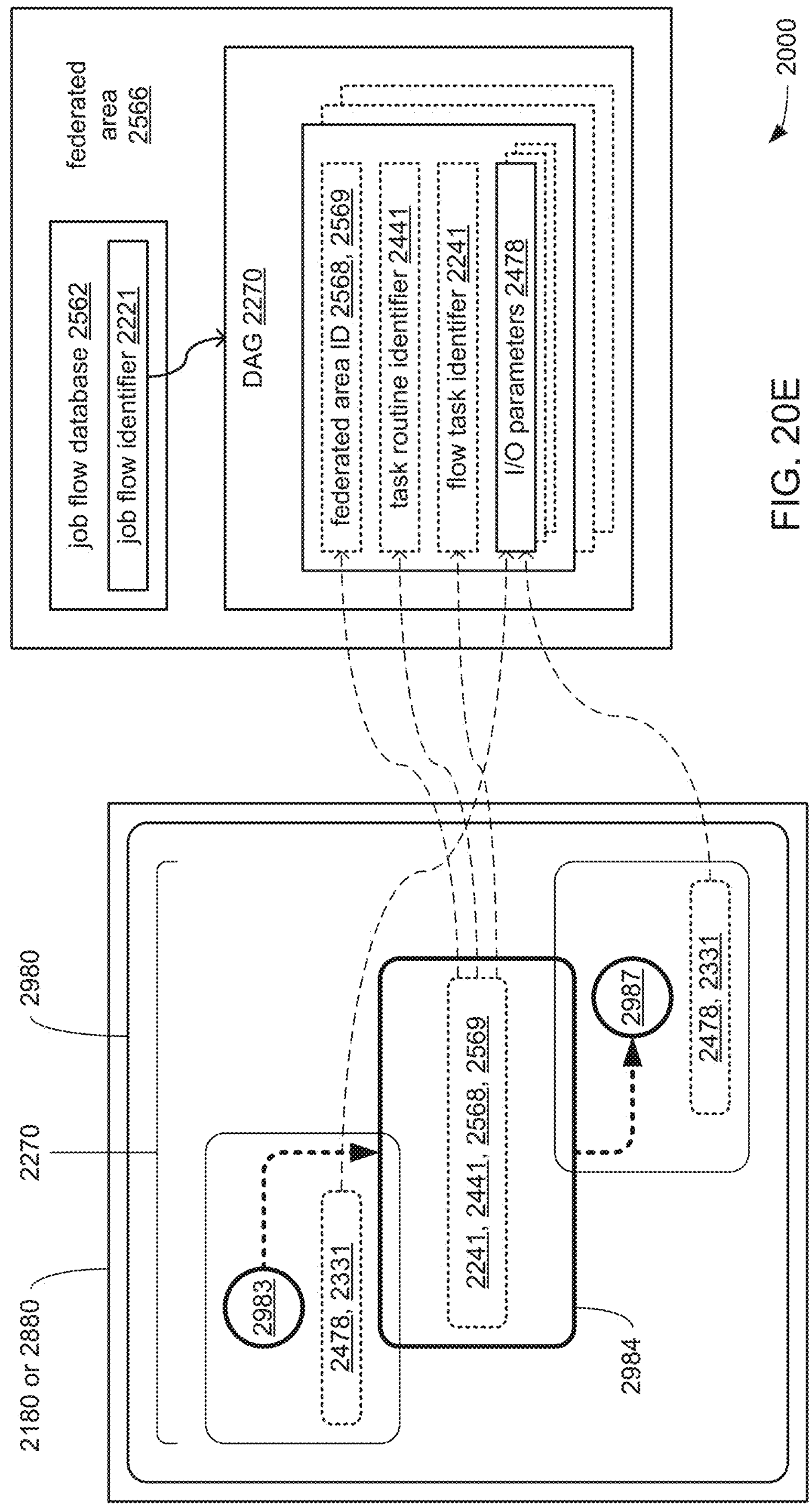

FIGS. 20A, 20B, 20C, 20D and 20E, together, illustrate various aspects of the generation of a DAG 2270 based on one or more task routines 2440, and of the use of such a DAG 2270 to provide a visualization 2980 of such one or more task routines 2440. FIG. 20A illustrates aspects of collecting information concerning inputs and/or outputs of at least one task routine 2440 in preparation for generating a DAG 2270. FIG. 20B illustrates aspects of generating a DAG 2270 based on collected information concerning inputs and/or outputs of at least one task routine 2440. FIGS. 20C and 20D, taken together, illustrate aspects of generating a visualization 2980 of a DAG 2270 to visually indicate a connection or a lack of connection between a pair of task routines. FIG. 20E illustrates aspects of the generation and storage of a new DAG 2270 from a visualization 2980 of an edited DAG 2270.

FIG. 20A illustrates aspects of the generation of a macro 2470 for each task routine 2440 that may be included in a DAG 2270 as an intermediate step to generating the DAG 2270. Such an intermediate step may be performed where the objects that serve as the sources of the information to be depicted in a DAG 2270 are located remotely from where a visualization 2980 of the DAG 2270 is to be displayed, such as where those objects are stored within federated area(s) 2566 maintained by one or more federated devices 2500, but the DAG 2270 is to be displayed by a source device 2100 or a reviewing device 2800. In such situations, the one or more macros 2470 that are so generated may then be transmitted to the device that is to display the visualization 2980 to enable the DAG 2270 to be generated thereat from the one or more macros 2470. However, it should be noted that, where the DAG 2270 is to be generated and/or a visualization 2980 of it is to be displayed locally (e.g., by a computing device with more direct access to the objects that serve as the sources of the information to be depicted), then the DAG 2270 may be generated more directly, and while foregoing the generation of macro(s) 2470. Also, as an alternative to the generation and transmission of macros 2470 to a remote device that is to display a DAG 2270 generated therefrom, the DAG 2270, itself, may be generated locally (e.g., at one or more of the federated devices 2500) and then an image of the DAG 2270 may be transmitted to the device that is to display a visualization 2980 of the DAG 2270.

As depicted, an example task routine 2440 from which at least a portion of a DAG 2270 may be generated may include executable instructions 2447 written in any of a variety of programming languages and comments 2448 written in a syntax for comments that may be based on the programming language in which the executable instructions 2447 are written. It should be noted that, for the sake of understandability in presentation, what is depicted is a deliberately simplified example of a task routine 2440 in which there is a single block of comments 2448 that precedes a single block of executable instructions 2447. As also depicted, and in keeping with the earlier discussed approaches to enabling the automated selection of task routines 2440 to perform specific tasks, the depicted example task routine 2440 may include the flow task identifier 2241 that identifies the particular task that is performed by the task routine 2440.

As also depicted, and in keeping with the earlier discussed approaches to organizing task routines 2440 for later retrieval and use, the depicted example task routine 2440 may be stored within a federated area 2566 in which a task routine database 2564 may also be stored that may employ an indexing scheme by which the task routine 2440 is able to be retrieved by the task routine identifier 2441 assigned to it. As has was also previously discussed, the task routine database 2564 may correlate flow task identifiers 2241 of tasks to be performed with task routine identifiers 2441 of the task routine(s) 2440 that perform each of those tasks. However, as previously noted, other mechanisms than a database may be employed to enable the retrieval of task routines 2440 for use in the performances of their respective tasks during the performance of a job flow. As has also been discussed, the federated area 2566 in which the depicted example task routine 2440 is stored may be one of a set of multiple related federated areas 2566, such as a linear hierarchy or a hierarchical tree. Thus, as depicted, the portal data 2539 (or other data structure) may store various parameters associated with each of the multiple federated areas 2566 within such a set of federated areas 2566, including aspects of relationships thereamong, and separate federated area identifiers 2568 and/or 2569 for each.

In executing the interpretation component 2547, the processor(s) 2550 of the one or more federated devices 2500 may be caused to parse the comments 2448 (whether divided into multiple blocks throughout the task routine 2440, or not) to identify, retrieve and interpret at least portions of the comments 2448 that specify aspects of inputs and/or outputs of the task routine 2440. Such aspects that may be so specified may include, and are not limited to, data types of data objects received as inputs and/or generated as outputs, and/or indexing schemes that may be employed in accessing data within data objects. Some of such comments 2448 may identify particular data objects used as inputs and/or generated as outputs, and this may be done to provide default selections of data objects. Alternatively, others of such comments 2448 may avoid doing so as part of an approach to allowing particular data object(s) to be specified by a job flow definition, or in any of a variety of other ways, during the performance of a job flow in which the task routine may be executed. In parsing the comments 2448, the processor(s) 2550 may be caused to retrieve various rules for interpreting the contents of the task routine 2440 from a stored set of parameter rules 2537, including language interpretation rules for at least the particular programming language in which the task routine 2440 was written. The processor(s) 2550 may be caused to use such rules to distinguish the comments 2448 from at least the executable instructions 2447, and may use such rules to interpret them.

In further executing the interpretation component 2547, the processor(s) 2550 of the one or more federated devices 2500 may be caused to generate a macro 2470 corresponding to the task routine 2440 that includes one or more input/output (I/O) parameters 2478 that indicate the details concerning inputs and/or outputs that are retrieved from the executable instructions 2447 and/or the comments 2448 of the task routine 2440. Additionally, other pieces of information may also be included in the macro 2470, such as the flow task identifier 2241 indicating the task performed when the task routine 2440 is executed, and/or the federated area identifiers 2568 and/or 2569 of the federated area 2566 in which the depicted example task routine 2440 is stored.

In some embodiments, the processor(s) 2550 of the one or more federated devices 2500 may additionally compare aspects of inputs and/or outputs indicated in the comments 2448 to how those aspects are actually implemented in the executable instructions 2447 to determine whether they match. Where discrepancies are detected, side by side sets of I/O parameters 2478 may be stored within the depicted example macro 2470, with one based on the comments 2448 and the other based on the executable instructions 2447, as a way of indicating a discrepancy therebetween. This may be deemed desirable to allow the details of such a discrepancy to be displayed as part of the DAG 2270 that is later generated from the macro 2470.

Turning to FIG. 20B, as depicted, an example DAG 2270 may be generated and then visually presented in an example visualization 2980 in which the example task routine 2440 of FIG. 20A is represented with a combination of graph objects, including a task graph object 2984 accompanied by an input data graph object 2983 and an output data graph object 2987. It should be noted that, for the sake of understandability in presentation, what is depicted is a deliberately simplified example of a DAG 2270 in which there is a single task routine 2440 depicted that has a single input and a single output. However, it is envisioned that other embodiments of the DAG 2270 may be generated that may include representations of a great many task routines 2440 of which many would may include multiple inputs and/or multiple outputs.

As depicted in the example visualization 2980, the graph objects 2983, 2984 and 2987 that form such a representation of the task routine 2440 of FIG. 20A may each be selected to visually conform, to at least some degree, to version 2.0 of the BPMN specification for visual representations of objects. More specifically, a rounded rectangle may be selected to be the task graph object 2984, and circles connected to the task graph object 2984 by arrows may be selected to be the data graph objects 2983 and 2987. In generating the task graph object 2984, some form of identifier of the task routine 2440 may be placed within the rounded rectangle shape thereof. In some embodiments, such an identifier may be the task routine identifier 2441 assigned to the task routine 2440 and/or the flow task identifier 2241 that identifies the task performed by the task routine 2440, each of which may be included within and retrieved from the macro 2470. However, as previously discussed, at least the task routine identifier 2441 may be a hash value of numerous bytes in size generated by taking a hash of at least a portion of the task routine 2440 such that the task routine identifier 2441 may be cumbersome for personnel to read, recognize and use as a mechanism to uniquely identify the task routine 2440. Therefore, the task routine 2440 may be assigned a less cumbersome textual name that may be placed within the rounded rectangle shape of the task graph object 2984. It may be that such an assigned textual name may be based on a name given to the file in which the task routine 2440 is stored in embodiments in which objects are stored within the federated area(s) 2566 as files with textual file names. Alternatively or additionally, it may be that such an assigned textual name may be specified in the comments 2448 of the task routine 2440.

Additionally, in embodiments in which the task routine 2440 is stored within a federated area 2566 that belongs to a set of related federated areas 2566, some form of identifier of the specific federated area 2566 in which the task routine 2440 is stored may be placed within the rounded rectangle shape of the task graph object 2984. In some embodiments, such an identifier may be the human-readable federated area identifier 2568. As previously discussed, it may be that the human-readable federated area identifier 2568 is a URL that may include a textual name given to the federated area 2566, and may additionally indicate a path among multiple federated areas 2566 by which the federated area 2566 that stores the task routine 2440 is connected to a base federated area 2566 (unless the federated area 2566 in which the task routine 2440 is stored is the base federated area). Further, in embodiments in which the human-readable federated area identifier 2568 is a URL and in which the task routine 2440 is assigned a textual name based on a file name, the human-readable federated area identifier 2568 may be combined with such a name into a single string of text within the rounded rectangle that both identifies the task routine 2440 and specifies its location among the set of related federated areas 2566 in relation to the base federated area thereof.

In generating the input data graph object 2983, some form of identifier of the input data object represented thereby may be placed within or adjacent to the input data graph object 2983. Similarly, in generating the output data graph object 2987, some form of identifier of the output data object represented thereby may be placed within or adjacent to the output data graph object 2987. As previously discussed, the comments 2448 within a task routine 2440 may provide a more or less specific indication of a data object serving as an input or an output, and this may depend on whether it is intended that a data object is to be specified when the task routine 2440 is executed as part of a performance of a job flow, or the identity of the data object is already known such that it is able to be specifically identified in the comments 2448.

Focusing, for sake of ease of discussion, on the input data graph object 2983, if the identity of the specific data object for this input (e.g., the depicted example data set 2330) is already known at the time the task routine 2440 is written, then some form of identifier of that specific data object may be specified in the comments 2448 and/or in the executable instructions 2447. In some embodiments, such an identifier may be the data object identifier 2331 assigned to the depicted example data set 2330. However, as previously discussed, as with the task routine identifier 2441 of the task routine 2440, the data object identifier 2331 may also be a hash value of numerous bytes in size such that the data object identifier 2331 may also be cumbersome for personnel to read, recognize and use. Therefore, as with the task routine 2440, the depicted data set 2330 may be assigned a less cumbersome textual name that may be incorporated into its data set metadata 2338, and this textual name may be placed within or adjacent to the circular input data graph object 2983. As with such a textual name that may be assigned to the task routine 2440, such a textual name assigned to the data set 2330 may be based on a name given to the file in which the data set 2330 is stored in embodiments in which objects are stored within the federated area(s) 2566 as files with textual file names.

However, and still focusing on the input data graph object 2983, if the identity of the specific data object for this input is not already known at the time the task routine 2440 is written, then the name of a variable or some other form of placeholder may be specified in the comments 2448 and/or in the executable instructions 2447. In such embodiments, it may be the name or other identifier of that variable or other type of placeholder that may be placed within or adjacent to the circular input data graph object 2983. It should be noted that such approaches to providing a visual indication of the identity of the input data object associated with the depicted input data graph object 2983 may also be applied to providing a visual indication of the identity of the output data object (not shown) associated with the depicted output data graph object 2987.

FIGS. 20C and 20D, taken together, depict an embodiment of an approach to conveying either the presence of a dependency or the lack of a dependency between two task routines in visualizations 2980 of contrasting examples of DAGs 2270. Each of the example visualizations 2980 of FIGS. 20C and 20D includes representations of two task routines **2440*a* and 2440*b*, where the task routine 2440*a* is represented by a combination of a task graph object 2984*a* and corresponding data graph objects 2983 and 2987, and where the task routine 2440*b* is represented by a combination of a task graph object 2984*b* and other corresponding data graph objects 2983 and 2987. However, in the visualization 2980 of FIG. 20C, a vertical arrangement of the representations of the task routines 2440*a* and 2440*b* is used to provide a visual indication of no dependency therebetween, such that there is no data object output by one of the task routines 2440*a* and 2440*b* that is needed as an input to the other. In contrast, in the visualization 2980 of FIG. 20D, a horizontal arrangement of the representations of the task routines 2440*a* and 2440*b* provides the suggestion of a left-to-right path of dependency from the task routine 2440*a* to the task routine 2440*b*. Reinforcing this indication of such a dependency is an additional arrow pointing from the representation of the task routine 2440*a* to the representation of the task routine 2440*b***. It should be noted that, although such a use of an arrow is depicted as providing an indication of such a dependency (regardless of whether horizontal arrangement is also used), any of a variety of other forms of indication of such a dependency may be used in other embodiments. By way of example, color coding, graphical symbols and/or other form of visual connector indicative of the dependency may be used to.

In situations, in which a visualization 2980 is to be generated of a DAG 2270 that includes multiple task routines 2440, the details of the inputs and outputs of each of the task routines may be analyzed to identify any instances that may be present of a particular data object having been specified as both an output of one task routine 2440 and an input of another task routine 2440. Such a situation, if found, may be deemed to indicate a dependency in which the one task routine 2440 provides the particular data object that is needed as an input to the other 2440, such as what is depicted in FIG. 20D between the output of task routine 2440*a* and the input of task routine 2440*b*. Again, as a result of such a dependency, execution of the task routine 2440*a* may be required to occur ahead of the execution of the task routine 2440*b* so as to ensure that the output of the task routine 2440*a* is able to be provided to the task routine 2440*b* for use during its execution.

FIG. 20E depicts aspects of the generation and storage, within a federated area 2566, of a new DAG 2270 from a visualization 2980 of an earlier DAG 2270 that may have been edited. More specifically, in some embodiments a UI may be provided to allow editing of aspects of one or more task routines 2440 of an existing DAG 2270 by graphically editing corresponding aspects of graph objects 2983, 2984 and/or 2987 of one or more corresponding representations of task routines 2440. Thus, where a visualization 2980 is initially generated of a DAG 2270, provision may be made for such editing to allow details of a new DAG 2270 to be developed. Further, upon completion of such editing, the new DAG 2270 thusly developed may then be stored within a federated area 2566, and may subsequently be used as at least a basis for a new job flow definition 2220 that defines a new job flow.

Such editing may entail changing the visual indication(s) of one or more I/O parameters 2478 that may be visually indicated within or adjacent to an input data graph object 2983 or an output data graph object 2987 to thereby change the one or more I/O parameters 2478 that correspond to those visual indication(s). More specifically, where a name or other identifier of a data object 2330 or 2370 that is generated as an output of a task routine 2440 is visually presented adjacent to the corresponding output data graph object 2987, an edit made in which that name or other identifier is changed in the visualization 2980 may trigger a corresponding change in what data object 2330 or 2370 is generated as an output. Correspondingly, where a name or other identifier of a data object 2330 or 2370 that is used as an input to a task routine 2440 is visually presented adjacent to the corresponding input data graph object 2983, an edit made in which that name or other identifier is changed in the visualization 2980 may trigger a corresponding change in what data object 2330 or 2370 is used as an input. As a result of such editing capabilities being provided, dependencies between task routines may be created, changed and/or entirely removed. In at least this way, the order of performance of tasks, and/or which tasks are able to be performed in parallel, may be changed as part of creating a new DAG 2270 that may be employed as at least part of a new job flow definition 2220.

As previously discussed, a DAG 2270 may be stored in a federated area as a script generated in a process description language such as BPMN. In some embodiments, at least a subset of the job flow definitions 2220 maintained within one or more federated areas 2566 by the one or more federated devices 2500 may also be stored, at least partially, as scripts in such a process description language as BPMN. Thus, there may be few, if any, differences in the contents of DAGs 2270 vs. job flow definitions 2220 such that a DAG 2270 may be usable as a job flow definition 2220 with little or no modification. It is for this reason that DAGs 2270 may be stored alongside job flow definitions 2220 in the earlier described job flow database 2562.

Figure 21A:
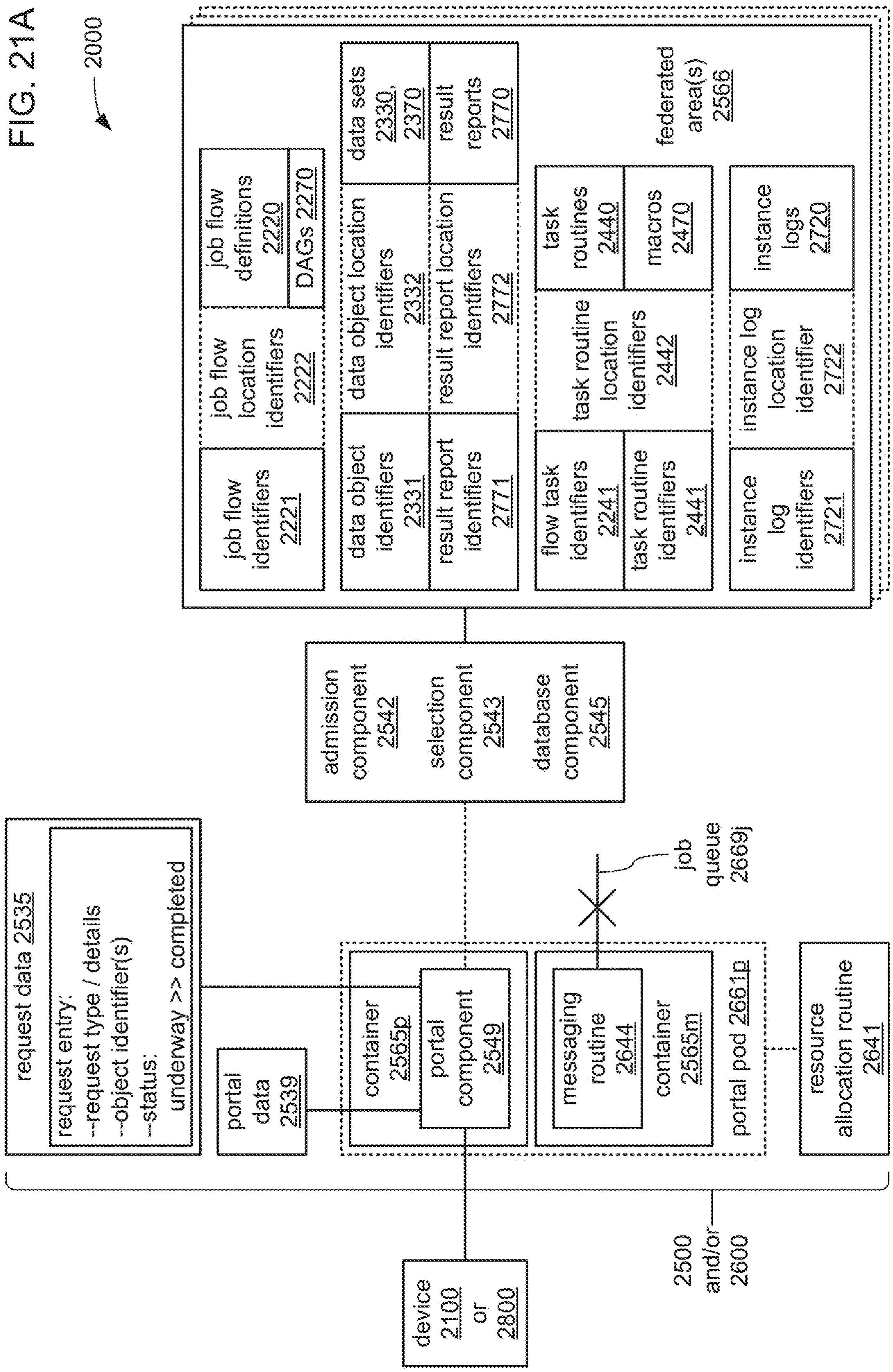
FIGS. 21A and 21B, together, illustrate aspects of exchanging objects between a distributed processing system with the architecture of FIGS. 19A-G and an external device.
Figure 21B:
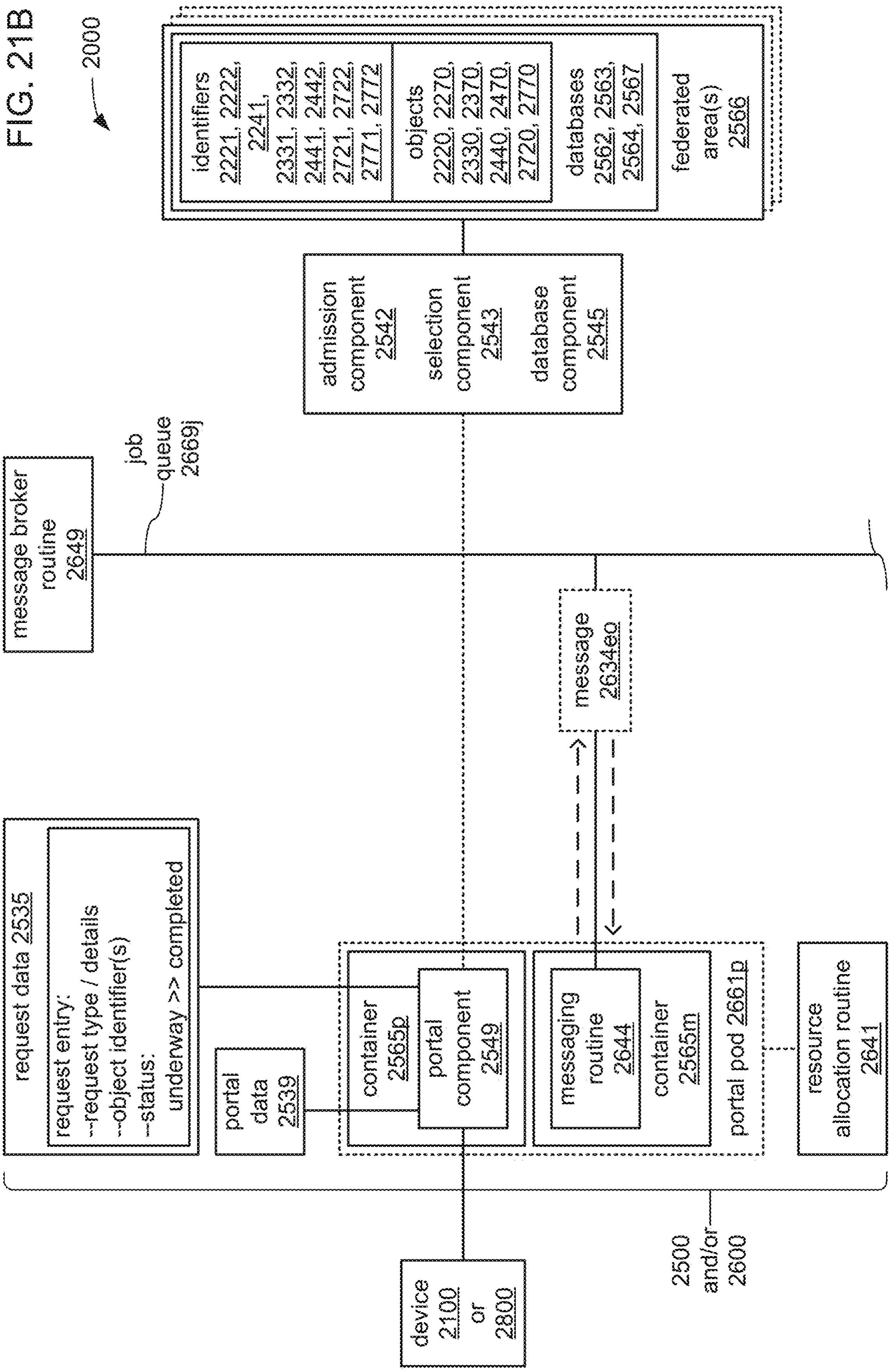

FIGS. 21A and 21B, together, illustrate various aspects of exchanging objects in an architecture employing both pod-based resource allocation and message-based coordination of MTC, such as the exemplary internal architecture of FIGS. 19A-G. More specifically, FIG. 21A depicts an example exchange of objects between the federated device(s) 2500 and a requesting device 2100 or 2800 in a pod-based environment while entirely circumventing the use of message-based coordination, and FIG. 21B depicts an example of a similar exchange in which some degree of message-based coordination may be used.

Turning to FIG. 21A, one of the one or more instances of the portal component 2549 may receive a request, through the network 2999 from a requesting device 2100 or 2800, to exchange object(s) with the federated device(s) 2500 in order to either store object(s) within a federated area 2566 or retrieve object(s) therefrom. As has been discussed, the instance of the portal component 2549 that receives this request may do so while being executed by core(s) 2555 of processor(s) 2550 within an portal container 2565*p* within a portal pod 2661*p* that was instantiated with a configuration that enables the instance of the portal component 2549 therein to have access to the network 2999, as well as to such external data structures as the portal data 2539 and/or the request data 2535 that may be shared with other similar instances of the portal component 2549. As has also been discussed, the same portal pod 2661*p* may have also been instantiated with a configuration to have a messaging container 2565*m* within which an instance of the messaging routine 2644 is executed to provide the instance of the portal component 2549 with access to the message queues 2669.

Upon receiving the exchange request, and as previously discussed, the determination made may be made as to whether or not the request is authorized using information concerning authorized individual persons, individual machines, institutions, corporations, government agencies, etc. that is maintained within the portal data 2539. Presuming the exchange request is authorized, core(s) 2555 of processor(s) 2550 of the federated device(s) 2500 may be caused by execution of the portal component 2549 to generate an entry for the request within the request data 2535 that may include details of what is requested (in this example, an exchange of objects), identifier(s) of the objects to be exchanged and/or of the federated area 2566 to be involved in the exchange, and/or an indication of the current status of the request. As previously discussed in detail, such a request may directly refer to the one or more objects to be exchanged by their individual identifiers, and/or may indirectly refer to the one or more objects by referring with an identifier to a job flow or an instance log that documents the use of particular objects in a past performance of a particular job flow. As another alternative where the request is to store one or more objects, the request, itself, may be accompanied by the one or more objects that are requested to be stored.

Following the storage of such an entry for the exchange request within the request data 2535, and following the storage of an indication therein that the requested exchange is underway, core(s) 2555 of processors 2550 may be caused by further execution of the instance of the portal component 2549 to transmit an indication of status across the network 2999 to the requesting device 2100 or 2800 that the requested exchange is underway. Beyond such a transmission of status, further execution of the instance of the portal component 2549 may cause core(s) 2555 of processor(s) 2550 to actually perform the requested exchange of object(s) between a federated area 2566 and the requesting device 2100 or 2800. As previously discussed in detail, the performance of such exchanges may entail the execution of instructions of the admission component 2542, the selection component 2543 and/or the database component 2545 to cause the performances of various aspects of the requested storage or retrieval of one or more objects. Again, such aspects may entail retrieving and/or generating various identifiers 2221, 2222, 2241, 2331, 2332, 2441, 2442, 2721, 2722, 2771 and/or 2772 to identify and/or locate objects to be retrieved, and/or to prepare for the storage of objects. In support of such exchanges, and of such cooperation among the instance of the portal component 2549, and each of the components 2542, 2543 and/or 2545, the portal pod 2661*p* may have also been instantiated with a configuration that enables such access to federated area(s) 2566 (as well as to the components 2542, 2543 and/or 2545) by the instance of the portal component 2549 therein. It may be that, as a result of having and using such relatively direct access to federated area(s) 2566, such a request to exchange objects may be referred to as a "direct request."

As has been discussed, there is the possibility that ongoing execution of the resource allocation routine 2641 may cause the uninstantiation of the very same portal pod 2661*p* in which the instance of the portal component 2549 that is currently involved in the exchange of objects is executed. As a result, requested exchange of objects may be interrupted, and that this may occur with no coordination with any aspect of the performance of that exchange. The storage of the indication that the exchange is underway within the entry for the request within the request data 2535 may serve as an indicator to all currently existing instances of the portal component 2549 within their corresponding portal pods 2661*p* that there is an exchange objects that is underway. Such a request entry with such an indication of underway status may include an identifier of the instance of the portal component 2949 (and/or of its portal pod 2661*p*) to thereby allow other instances of the portal component 2949 to monitor the status of the exchange. Such an underway indication may also enable another instance portal component 2949 to take over the performance of the exchange where the underway indication remains while the instance of the portal component 2949 that was originally involved in performing the exchange is uninstantiated. In this way, completion of the performance of the exchange is assured to occur, even if it has been interrupted and must be restarted.

Turning to FIG. 21B in addition to FIG. 21A, the instance of the portal component 2549 that originally received the exchange request and/or that stored the underway indication within the request data 2535, may cooperate with the messaging routine 2644 executed within the corresponding messaging container 2565*m* to output a message 2634*eo* indicating the receipt of a request to exchange objects onto the job queue 2669*j*. This may be done either in addition to or in lieu of storing the aforedescribed underway indication within the request data 2535, and may be serve similar functions, including triggering the taking over of the performance of the exchange following an uninstantiation of the instance of the portal component 2549 that was involved in performing it. As will be familiar to those skilled in the art, a message queue (e.g., the depicted job queue 2669*j*) may function as a set of storage locations where a protocol is employed concerning the output of messages onto the message queue, the monitoring the ongoing presence of messages on the message queue, and/or the removal of message from the message queue. Just as other instances of the portal component 2549 may monitor the ongoing presence of the earlier discussed underway indication within the request data 2535, other instances of the portal component 2549 may monitor the ongoing presence of the message 2634*eo* on the job queue 2669*j*.

Following the completion of the exchange of objects, where the underway indication was stored within the entry for the exchange request within the request data 2535, further execution of the instance of the portal component 2549 that is currently involved in the exchange may cause that underway indication to be replaced within an indication that the exchange has been completed. Alternatively, the request entry may simply be removed from the request data 2535. However, where the request reception message 2634*eo* was output onto the job queue 2669*j*, either in addition to or in lieu of the storage of the underway indication within the request data 2535, further execution of the instance of the portal component 2549 that is currently involved in the exchange may cause the message 2634*eo* to be removed from the job queue 2669*j*. Through such undoing of either or both of the underway indication within the request data 2535 and the message 2634*eo* from the job queue 2669*j*, the possibility of an accidental triggering of another instance of the portal component 2549 to attempt to perform the same exchange of objects, again, is thereby prevented. Core(s) 2555 of processor(s) 2550 of the federated device(s) 2500 may then be caused by further execution of the instance of the portal component 2549 that was last involved in performing the exchange of objects may then transmit an indication of completion of the exchange via the network 2999 to the requesting device 2100 or 2800.

Figure 22A:
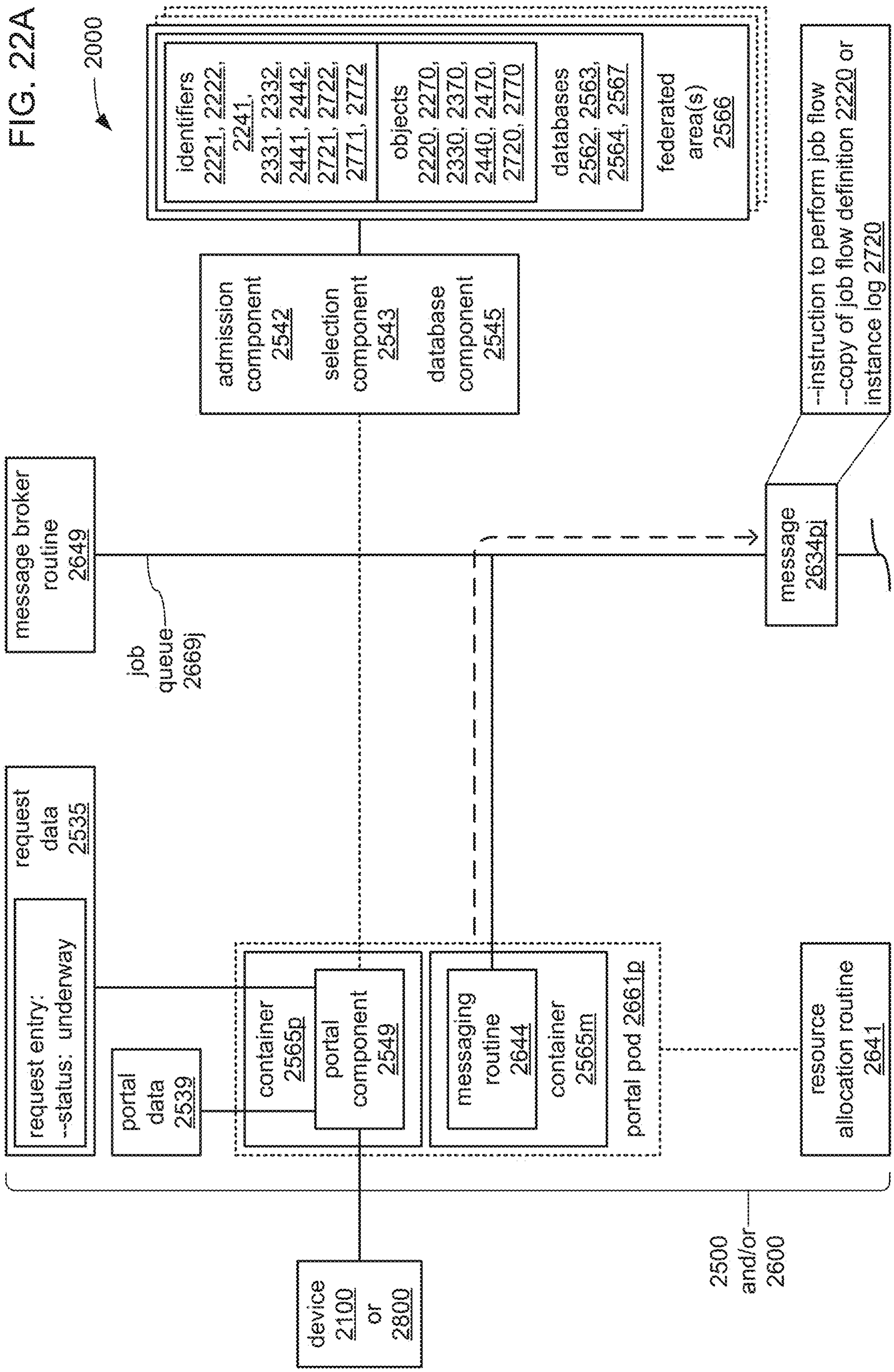
FIGS. 22A, 22B, 22C, 22D, 22E, 22F and 22G, together, illustrate an example of using the messaging architecture of FIGS. 19A-G to coordinate a job flow performance.
Figure 22B:
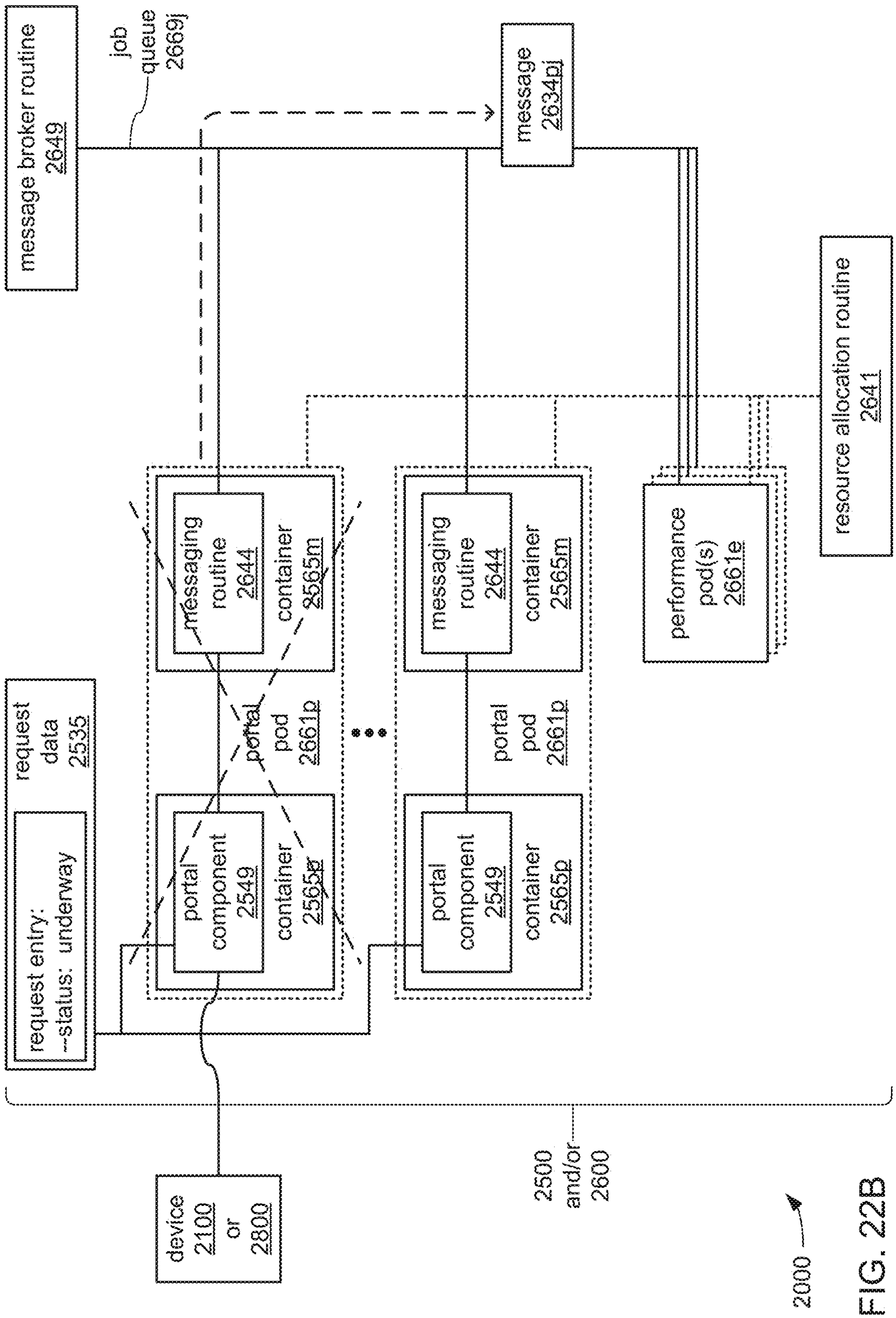
Figure 22C:
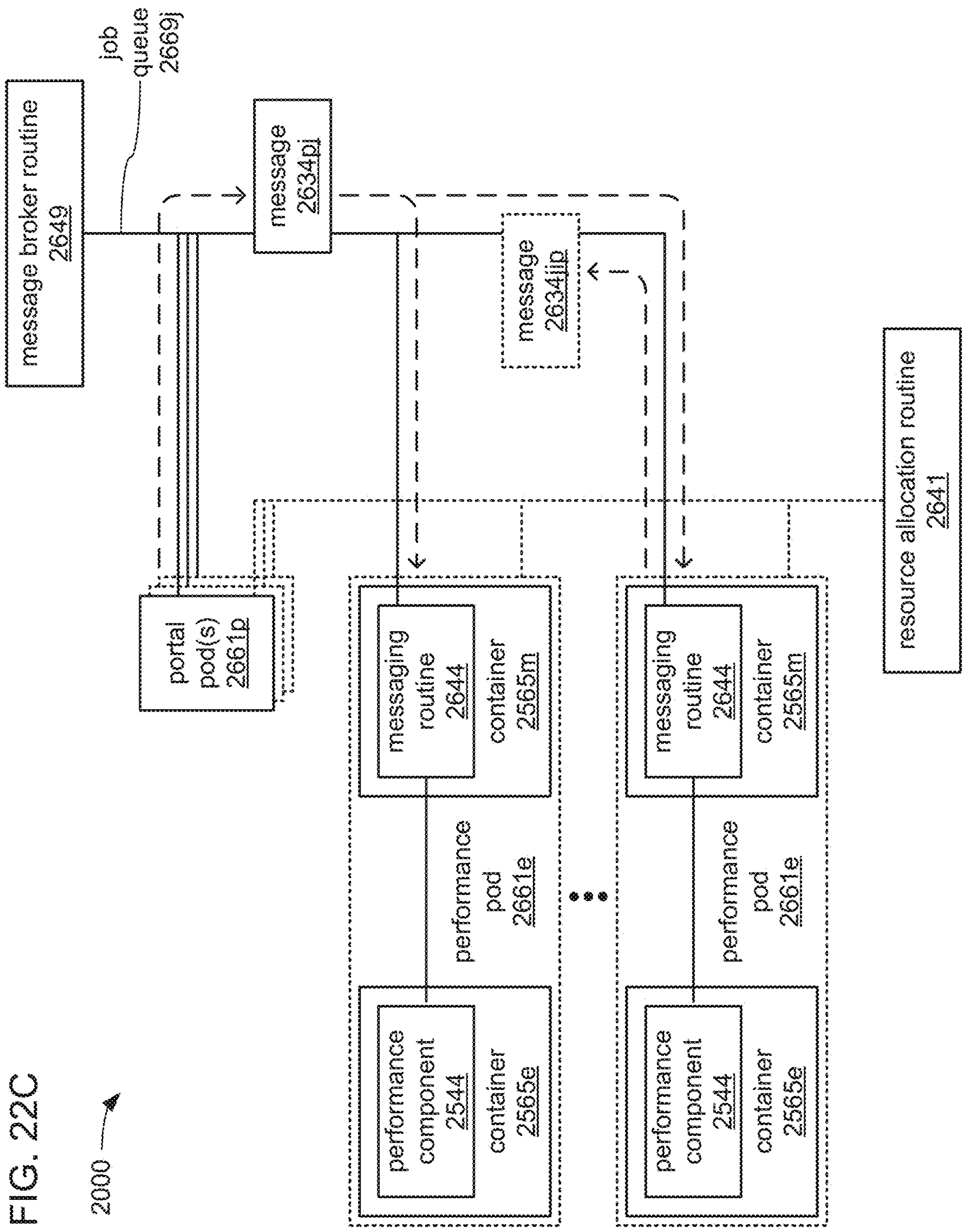
Figure 22D:
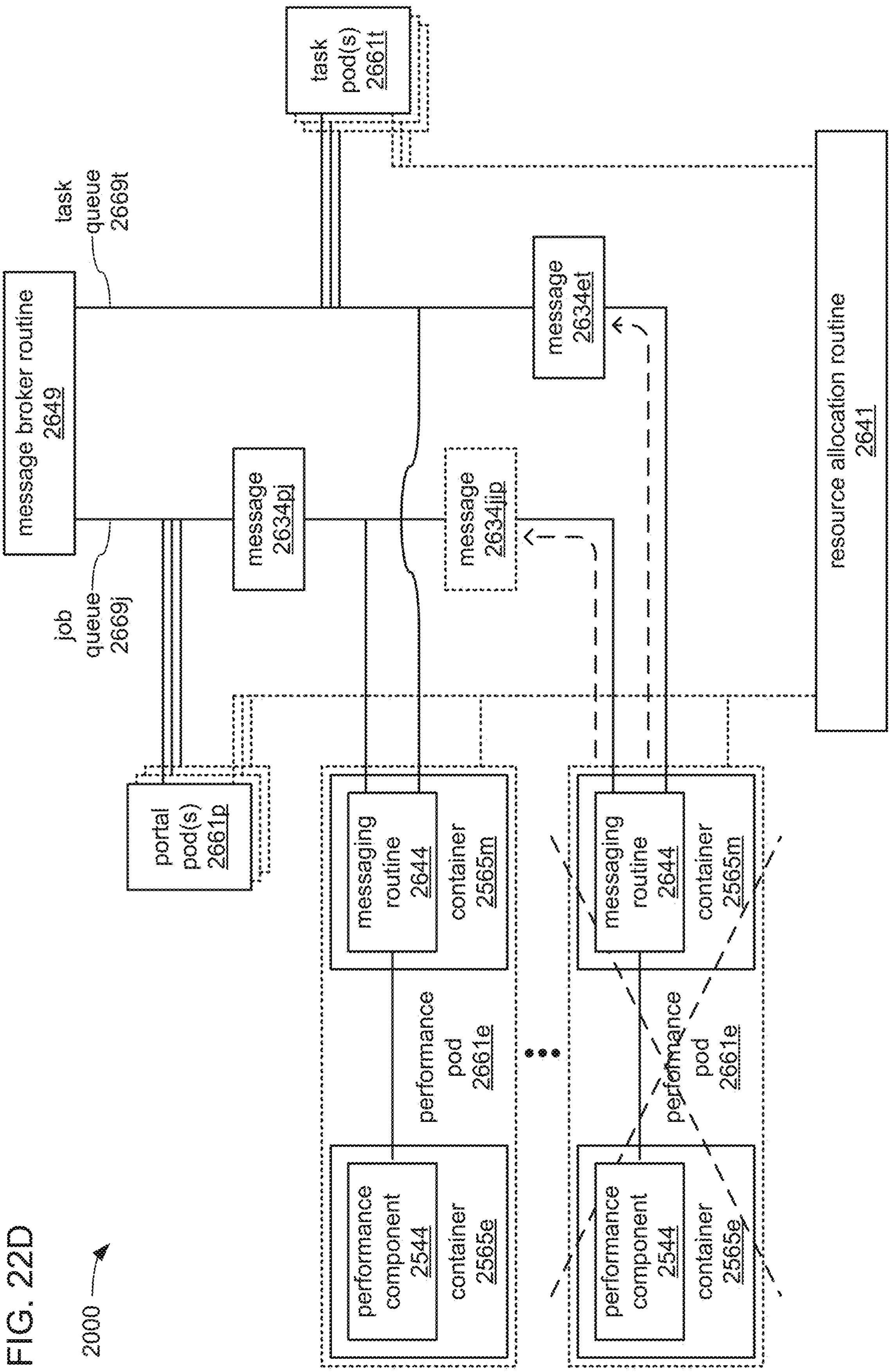
Figure 22E:
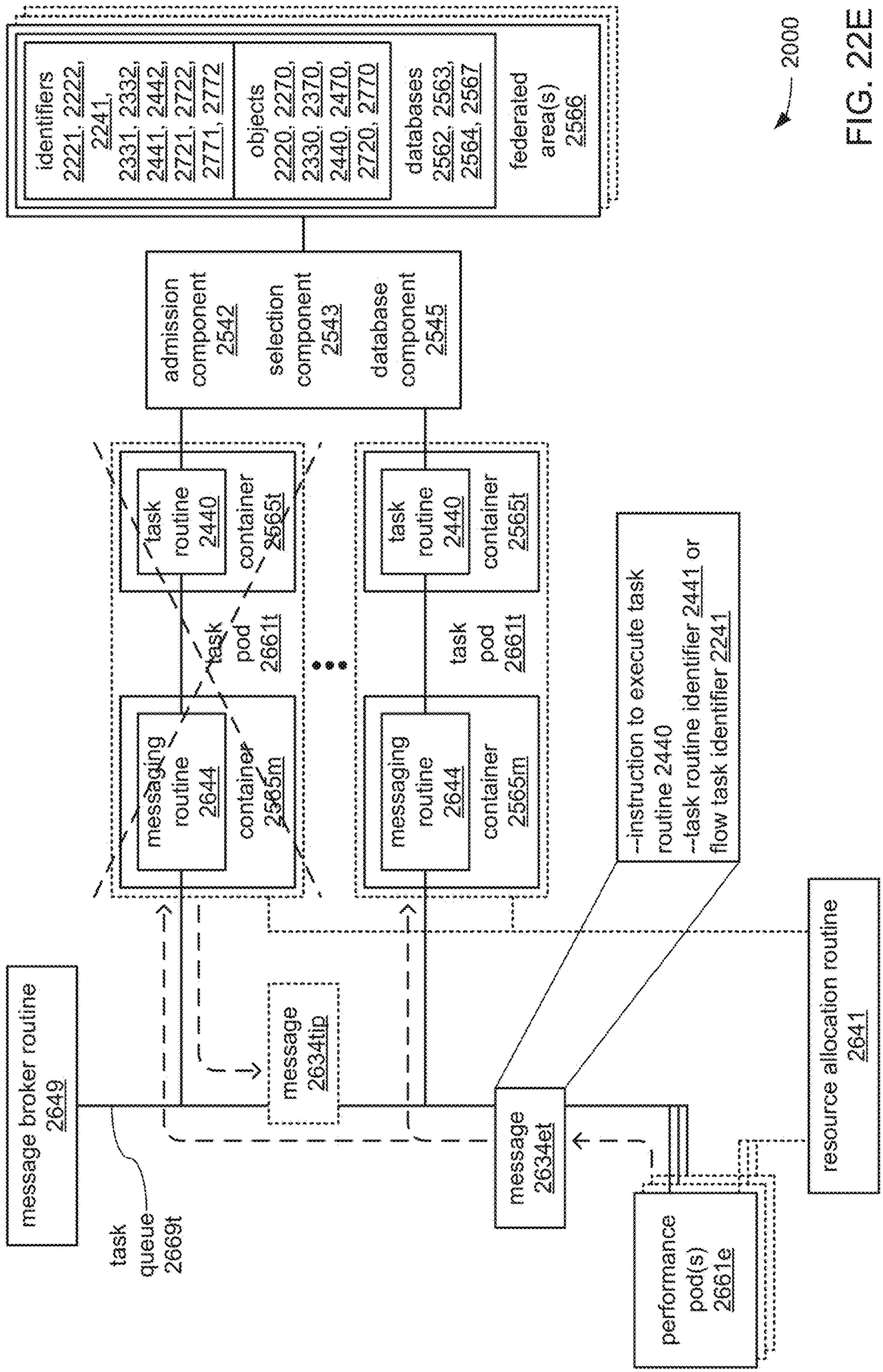
Figure 22F:
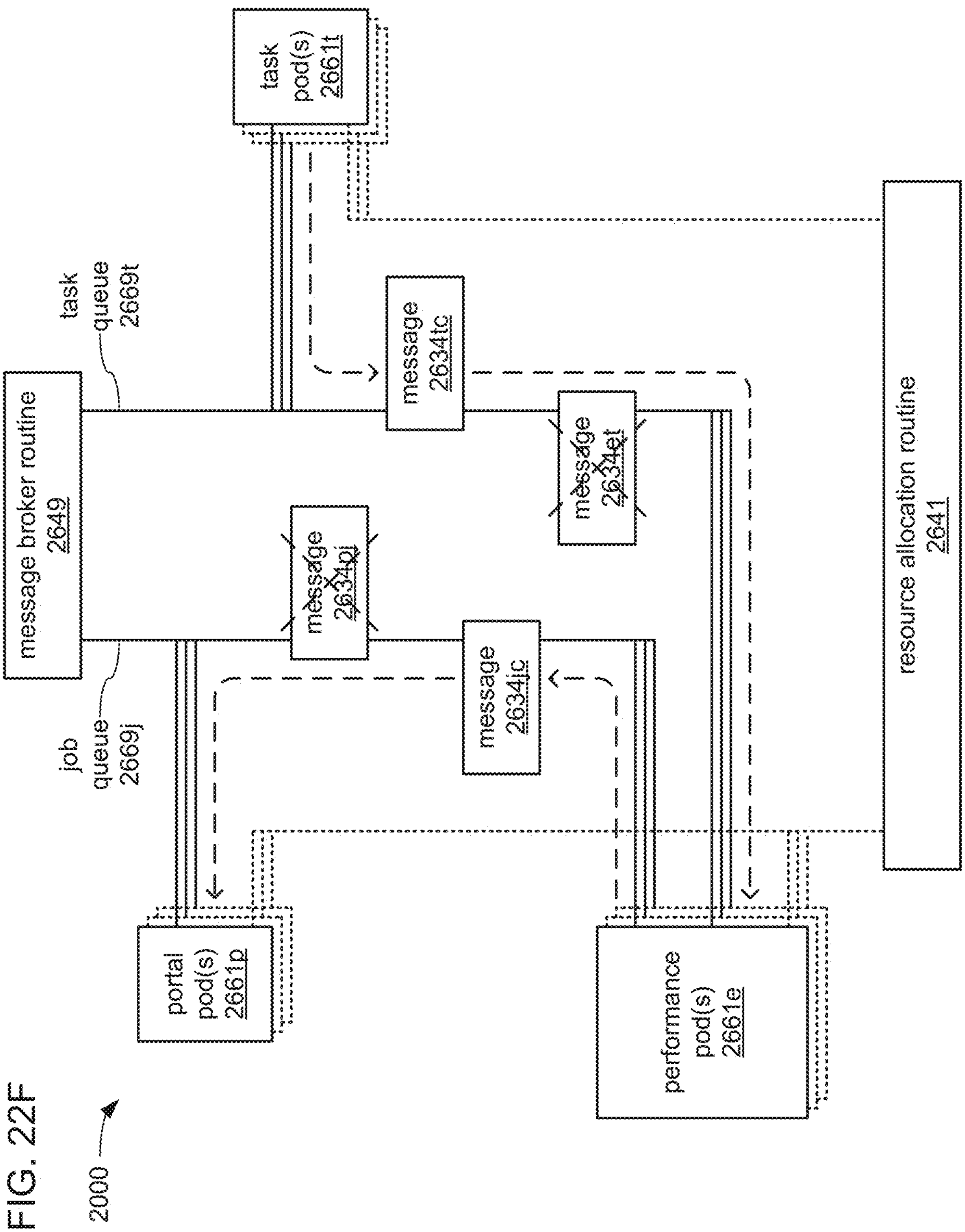
Figure 22G:
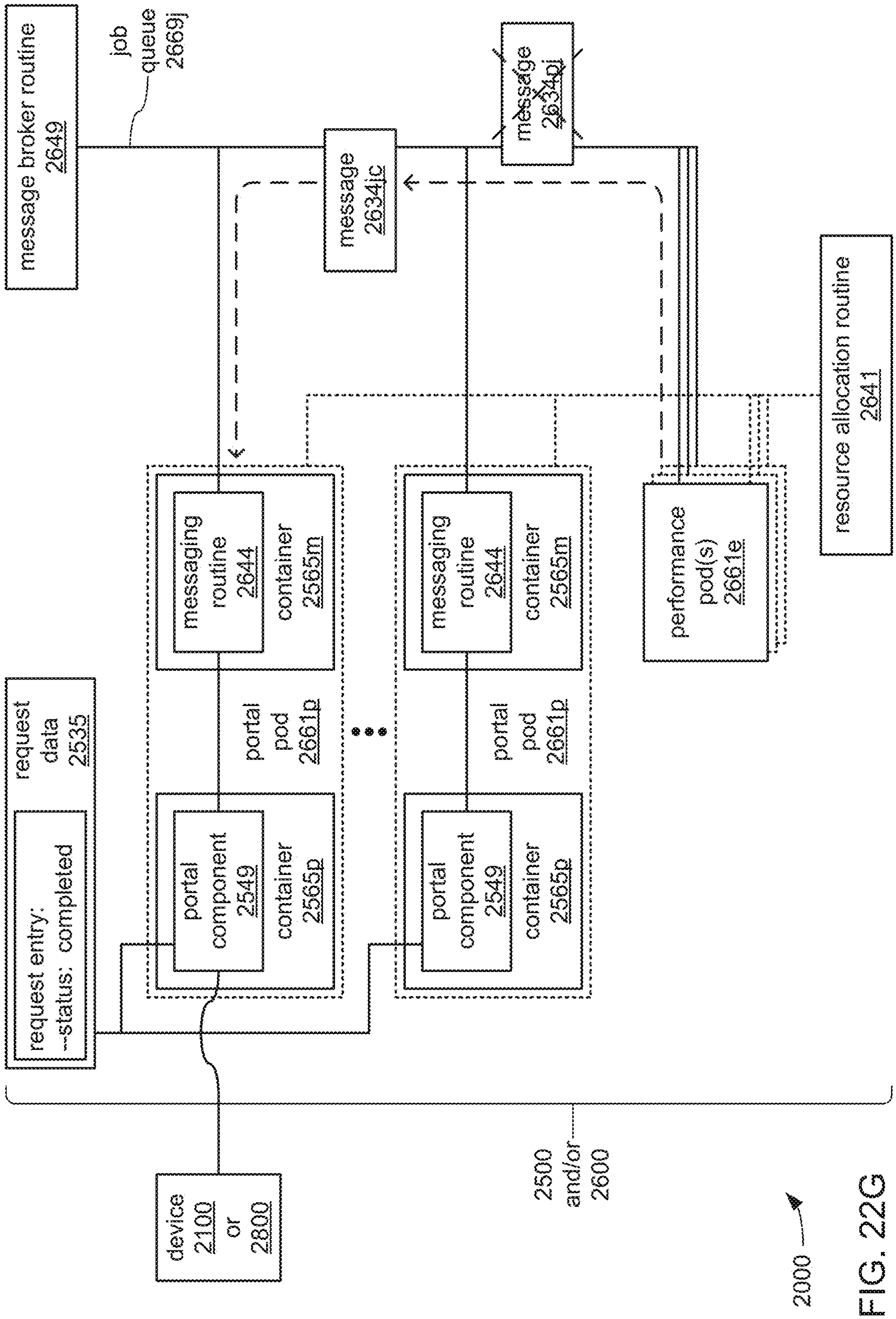

FIGS. 22A, 22B, 22C, 22D, 22E, 22F and 22G, together, illustrate various aspects of performing a job flow in an architecture employing both pod-based resource allocation and message-based coordination of MTC, such as the exemplary internal architecture of FIGS. 19A-G. More specifically, FIGS. 22A and 22B, together, depict aspects of receiving a request to perform the job flow, and of using messaging to trigger and ensure the performance of the job flow. FIGS. 22C, 22D and 22E, together, depict aspects of using messaging to monitor the performance of the job flow, while triggering and ensuring the execution of at least one task routine 2440 to cause the performance of at least one task of the job flow. FIGS. 22F and 22G, together, depict aspects of relaying indications of completion of the execution of a task and/or of completion of the performance of the job flow among pods 2661 and to the requesting device 2100 or 2800.

Turning to FIG. 22A, one of the one or more instances of the portal component 2549 may receive a request, through the network 2999 from a requesting device 2100 or 2800, to perform a job flow. Again, the instance of the portal component 2549 that receives this request may be executed by core(s) 2555 of processor(s) 2550 within an portal container 2565*p* within a portal pod 2661*p* providing access to the network 2999, access to the portal data 2539 and/or the request data 2535, and/or relatively direct access (e.g., through the components 2542, 2543 and/or 2545) to federated areas 2566. And again, the same portal pod 2661*p* may have also been instantiated to have a messaging container 2565*m* within which an instance of the messaging routine 2644 is executed to provide the instance of the portal component 2549 with access to the message queues 2669.

Again, upon receiving the job performance request, the determination may be made as to whether or not the request is authorized may first be checked using information within the portal data 2539. Presuming the job performance request is authorized, core(s) 2555 of processor(s) 2550 of the federated device(s) 2500 may be caused by execution of the portal component 2549 to generate an entry for the request within the request data 2535 that may include details of what is requested (in this example, a performance of a job flow), identifier(s) of the job flow and/or of objects associated with a past performance of the job flow, and/or an indication of the current status of the request. As previously discussed in detail, such a request to perform a job flow may be one of a variety of previously discussed types of requests. By way of example, the request may be to perform a job flow with one or more specified data objects as input, and using the latest versions of tasks routines to perform the various tasks of the job flow. As has been discussed, it may be that the use of the latest versions of tasks routines in performing a job flow is the default, unless a request to perform a job flow specifies otherwise. An example of a request that includes such a contrary specification may be a request to repeat a particular past performance of a job flow using the very same task routines as were used in that past performance, as well as the very same data objects as inputs as were used in that past performance. As has been explained, such a request may be made as part of enforcing accountability for the objects used and/or the results achieved in that past performance.

Following the storage of such an entry for the exchange request within the request data 2535, and following the storage of an indication therein that the requested job flow performance is underway, core(s) 2555 of processors 2550 may be caused by further execution of the instance of the portal component 2549 to transmit an indication of status across the network 2999 to the requesting device 2100 or 2800 that the requested job flow performance Beyond such a transmission of status, further execution of the instance of the portal component 2549 may cause core(s) 2555 of processor(s) 2550 to gather further details required to bring about the requested performance. As was previously discussed, regardless of the exact type of request to perform a job flow that is received, the retrieval of a job flow definition 2220 and/or of an instance log 2720 to obtain the various job flow identifiers 2221, data object identifiers 2331, flow task identifiers 2241, task routine identifiers 2441 and/or result report identifiers 2771 that may be needed to retrieve more of the objects needed for the requested performance. To effect such object retrievals, the relatively direct access that each of the instances of the portal component 2549 are provided to federated area(s) 2566 (as described above in connection with FIGS. 21A-B) may be used. Again, such object retrieval(s) may entail the execution of instructions of the admission component 2542, the selection component 2543 and/or the database component 2545 to cause the performances of various aspects of the requested retrieval of one or more objects.

Following such retrieval(s) of a job flow definition 2220 and/or an instance log 2720, and/or following the retrieval(s) of one or more identifiers, the instance of the portal component 2549 that originally received the job flow performance request and/or that stored the underway indication within the request data 2535, may cooperate with the messaging routine 2644 executed within the corresponding messaging container 2565*m* to output, onto the job queue 2669*j*, a job flow performance request message 2634*pj* that conveys the instruction to perform a job flow. Where the originally received request was simply to perform a particular job flow with one or more particular data objects as input, the request message 2634*pj* may include a copy of the job flow definition 2220 for that job flow, along with data object identifier(s) 2331 of the data object(s) that were specified in the original request to be used as inputs. However, where the originally received request was to repeat a particular past performance of a particular job flow, the request message 2634*pj* may additionally include a copy of the instance log 2720 that documents that particular past performance.

Both the storage of the underway indication within the request data 2535, and the output of the request message 2634*pj* onto the job queue 2669*j* may serve similar functions in terms of ensuring that the job flow will be performed as requested, even if the instance of the portal component 2549 that received the original request is uninstantiated as a result of its portal pod 2661*p* being uninstantiated by the resource allocation routine 2641. However, each of these actions may be of use in countering such an instance at a different time. More specifically, as described just above, the storage of the underway indication within the request data 2535 may occur relatively immediately after the receipt of the original request, and before the gathering of information needed to generate and output the request message 2634*pj*. Thus, if the instance of the portal component 2549 that received the original request is uninstantiated at that point, another instance of the portal component 2549 would be able to rely on the underway indication within the request data 2535 as providing an indication that there is still a job flow to be performed, and would be able to rely on the lack of the request message 2634*pj* having been output onto the job queue 2669*j* as serving as an indication that resumption of the performance of the job flow should begin with gathering whatever information may be needed from federated area(s) 2566 to generate the message 2634*pj*.

However, and turning to FIG. 22B, if the instance of the portal component 2549 that received the original request is uninstantiated (as depicted with a dashed "X") after the request message 2634*pj* has been output onto the job queue 2669*j*, then another instance of the portal component 2549 would be able to rely on the underway indication within the request data 2535 and the request message 2634*pj* present being on the job queue 2669*j* as serving, together, as an indication that there is still a job flow to be performed, and that the request message needed to trigger the performance thereof has already been generated and output onto the job queue 2669*j*. Thus, in this way, some amount of information concerning the state of the now uninstantiated instance of the portal component 2549 is preserved to be relayed to the instance of the portal component 2549 that has taken over therefor.

Turning to FIG. 22C, as previously discussed, it may be that none of the messages that are output onto each of the message queues 2669 (e.g., the job queue 2669*j* that is specifically depicted in FIG. 22C) are actually directed to any particular pod 2661 or any particular routine being executed within a pod 2661. Instead, each of the messages may be directed to an available type of pod 2661 in which an available instance of a type of routine is being executed within a container 2565 that could become involved in the performance of a job flow, or may be directed to whichever one of a type of pod 2661 is the one of that type of pod 2661 that contains an instance of a type of routine that is already involved in the performance of a job flow. Thus, and more specifically, the request message 2634*pj* that relays the request to perform the job flow may be meant to be received by whichever one of the performance pods 2661*e* happens to contain an instance of the performance component 2544 that is available to take on the controlling of the executions of individual task routines 2440 to thereby control the performances of the individual tasks of the job flow as part of actually effectuating the performance of the job flow.

As depicted, it may be that one of the performance pods 2661*e* does contain an instance of the performance component 2544 that is being executed within its performance container 2565*e*, and that is available to provide such control over such executions of task routines 2440. As further depicted, in some embodiments, the available instance of the performance component 2544 may cooperate with the instance of the messaging routine 2644 within the corresponding messaging container 2565*m* to output an in-progress message 2634*jip* onto the job queue 2669*j* that confirms that such per-task actions to effectuate the performance of the job flow are in progress, such that the performance of the job flow is currently in progress. Again, it may be that the in-progress message 2634*jip* is also not directed to any particular one of the portal pods 2661*p*, but instead, is directed to whichever one of the portal pods 2661*p* is the one that contains the instance of the portal component 2549 that is currently involved in the performance of the job flow. To do this, the in-progress message 2634*jip* may include an indication of the job flow identifier 2221 of the job flow and/or other identifier(s). Such an indirect approach to directing the message in-progress 2634*jip* to a destination among the multiple portal pods 2661*p* may be in recognition of the possibility that, following the output of the request message 2634*pj* (to which the output of the in-progress message 2634*jip* is a response), the portal pod 2661*p* from which the request message 2634*pj* was output may have been uninstantiated, and another instance of the portal component 2549 within another one of the portal pods 2661*p* may have taken over in becoming involved in the performance of the job flow.

In embodiments in which the in-progress message 2634*jip* is output onto the job queue 2669*j* as part of an instance of the performance component 2544 becoming involved in the performance of the job flow, the in-progress message 2634*jip* may serve the additional function of providing an indication that is able to be monitored by the other instances of the performance component 2544 that there is an instance of the performance component 2544 that has already become involved in the performance of the job flow, such that no other instance of the performance component 2544 needs to do so. Stated differently, the output of the in-progress message 2634*jip* may serve as a mechanism by which one of the instances of the performance component 2544 effectively "claims" the job flow that is requested to be performed in the request message 2634*jp*.

Turning to FIG. 22D, in some of such embodiments, it may be that the in-progress message 2634*jip* that claims the job flow includes an identifier of the instance of the performance component 2544 that made this claim. If that particular instance of the performance component 2544 is subsequently uninstantiated (as depicted with a dashed "X"), then another instance of the performance component 2544 that is available to take over the performance of the job flow may be triggered to do so by presence of the in-progress message 2634*jip* on the job queue 2669*j* that refers to the performance of the job flow as being in progress under the control of an instance of the performance component 2544 that is no longer instantiated.

Regardless of the exact manner in which an instance of the performance component 2544 claims the job flow so as to become involved in effectuating its performance, further execution of the instance of the performance component 2544 may cause core(s) 2555 of processor(s) 2550 to analyze the job flow definition 2220 of the job flow to derive an order of execution of task routines 2440 to perform the various tasks of the job flow in a manner that takes advantage of opportunities to cause various subsets of the tasks to be performed at least partially in parallel. Upon deriving such an order of execution of task routines 2440, that instance of the performance component 2544 may then cooperate with the instance of the messaging routine 2644 being executed within the corresponding messaging container 2565*m* to output, onto the task queue 2669*t* (i.e., store within the task queue 2669*t*), a set of task routine execution request messages 2634*et* that make requests for the execution of various task routines 2440 within available ones of the task pods 2661*t*. Such task routine execution request messages 2634*et* may be stored within the task queue 2669*t* in an order and with timings that follow the derived order of execution so as to account for the dependencies among the tasks of the job flow. Stated differently, where opportunities exist to cause the execution of multiple task routines 2440 to occur at least partially in parallel, then the request messages 2634*et* to cause such executions to occur may be stored on the task queue 2669*t* with little regard for when each is so stored within the task queue 2669*t* relative to the other(s). However, where the execution of an earlier task routine 2440 generates data that is needed as an input to the execution of a later task routine 2440, then the output of the request message 2634*et* to cause the execution of the later task routine 2440 may be delayed until a message 2634 indicating the completion of the execution of the earlier task routine 2440 (e.g., a completion message 2634*tc*) has been detected as having been output onto (i.e., stored within) the task queue 2669*t*. Thus, in coordinating the executions of multiple task routines 2440 to follow the derived order of execution, core(s) 2555 of processor(s) 2550 may be caused by execution of the instance of the performance component 2544 to monitor the task queue 2669*t* for completion messages 2634*tc*, and may condition the output of a subset of task routine execution request message(s) 2634*et* on a subset set of completion messages 2634*tc* being so stored within the task queue 2669*t*.

For sake of ease of understanding, FIG. 22D, and subsequent FIGS. 22E and 22F, depict the output and responses to a single one of such request messages 2634*et* onto the task queue 2669*t* that conveys a request to perform a task routine. It should be noted that such a depiction of only a single one of the request messages 2634*et* conveying a request for the execution of just a single task routine 2440 is meant to provide a deliberately highly simplified example so as to avoid unnecessary visual clutter as an aid to ease of understanding of what is depicted, discussed and claimed herein, and should not be taken as limiting what is described and claimed herein as being applicable only to such simplistic circumstances. Indeed, it is envisioned that what is depicted, discussed and claimed herein is to be used with job flows that include numerous tasks to be performed, thereby causing the execution of numerous corresponding task routines 2440, and perhaps numerous instances of numerous task routines 2440 in the case in which one or more data objects may be distributed across multiple devices—and not just a single task causing the execution of a single instance of a single task routine 2440, as depicted in FIGS. 22D-F.

In a manner somewhat like the earlier described output of the request message 2634*pj* onto the job queue 2669*j*, the output of the request message 2634*et* onto the task queue 2669*t* may serve to ensure that the corresponding task routine 2440 will be executed as requested, even if the instance of the performance component 2544 that claimed control over the performance of the job flow (e.g., by outputting the in-progress message 2634*jip*) is uninstantiated as a result of its performance pod 2661*e* being uninstantiated by the resource allocation routine 2641. More specifically, if the instance of the performance component 2544 that claimed control over the performance of the received the original request is uninstantiated (as depicted with a dashed "X") after the request message 2634*et* has been output onto the task queue 2669*t*, then another instance of the performance component 2544 would be able to rely on the request message 2634*et* being present on the task queue 2669*j* as serving as an indication that there is still a task routine 2440 to be executed, and that the request message needed to trigger the execution thereof has already been generated and output onto the task queue 2669*t*. Thus, in this way, some amount of information concerning the state of the now uninstantiated instance of the performance component 2544 is preserved to be relayed to the instance of the performance component 2544 that has taken over therefor.

Turning to FIG. 22E, as previously discussed, the request message 2634*et* that relays the request to execute a task routine 2440 as part of performing the job flow may be meant to be received by whichever one of the task pods 2661*t* happens to be available for use in so executing the task routine 2440. As depicted, it may be that one of the task pods 2661*t* is so available. As also depicted, in some embodiments, the instance of the messaging routine 2644 within the messaging container 2565*m* of the available task pod 2661*t* may output an in-progress message 2634*tip* onto the task queue 2669*t* that confirms that the execution of the task routine is in progress, such that the performance of the corresponding task of the job flow is currently in progress. Again, it may be that the in-progress message 2634*tip* is also not directed to any particular one of the performance pods 2661*e*, but instead, is directed to whichever one of the performance pods 2661*e* is the one that contains the instance of the performance component 2544 that is currently involved in the performance of the job flow. To do this, the in-progress message 2634*tip* may include an indication of the job flow identifier 2221 of the job flow and/or other identifier(s). Again, such an indirect approach to directing the message in-progress 2634*tip* to a destination among the multiple performance pods 2661*e* may be in recognition of the possibility that, following the output of the request message 2634*et* (to which the output of the in-progress message 2634*tip* is a response), the performance pod 2661*e* from which the request message 2634*et* was output may have been uninstantiated, and another instance of the performance component 2544 within another one of the performance pods 2661*e* may have taken over in becoming involved in the performance of the job flow.

In embodiments in which the in-progress message 2634*tip* is output onto the task queue 2669*t* as part of a task pod 2661*t* becoming involved in the execution of task routine 2440 to perform a task of the job flow, the in-progress message 2634*tip* may serve the additional function of providing an indication that is able to be monitored from the other task pods 2661*t* that there is a task pod 2661*t* that is already in use to execute the task routine 2440, such that no task pod 2661*t* is needed to do so. Stated differently, the output of the in-progress message 2634*tip* may serve as a mechanism by which one of the task pods 2661*t* effectively "claims" the task routine 2440 that is requested to be executed in the request message 2634*et*.

In some of such embodiments, it may be that the in-progress message 2634*tip* that claims the task routine 2440 includes an identifier of the task pod 2661*t* that made this claim. If that particular task pod 2661*t* is subsequently uninstantiated (as depicted with a dashed "X"), then another task pod 2661*t* that is available for use executing the task routine 2440 may be triggered to do so by presence of the in-progress message 2634*tip* on the task queue 2669*t* that refers to the execution of the task routine 2440 associated with the job flow as being in progress within the task container 2565*t* of a task pod 2661*t* that is no longer instantiated.

Regardless of the exact manner in which a task pod 2661*t* claims the task routine 2440 as one that it will be involved in executing, the task pod 2661*t* may then use the information provided in the request message 2634*et* concerning the task routine 2440 to be executed, along with any information concerning data objects to be used as inputs, to obtain the task routine 2440 and/or other objects needed to effectuate such execution from one or more federated areas 2566. In some embodiments, the exact information that is so provided in the request message 2634*et* may vary depending on various factors, including the type of request for a job flow performance that was originally received from the requesting device 2100 or 2800. More specifically, where the originally received request was to By way of example, the originally received request may be to perform a job flow with one or more specified data objects as input. Again, it may that, where a request does not specify that particular versions of task routines be used, then the use of the latest versions of tasks routines in performing a job flow is the default. In such a situation, the request message 2634*et* may be generated based on the job flow definition 2220 for the job flow, which as previously discussed, may include flow task identifiers 2241 that identify each of the tasks to be performed, but not the task routine identifiers 2441 that would uniquely identify the specific task routines (including versions) to be used in performing each of those tasks. Thus, the request message 2634*et* may include the flow task identifier 2241 that actually identifies the task to be performed, and not a task routine identifier 2441 that would specify the particular task routine 2440 (including the version thereof) that would be executed to perform that task. As a result, the task pod 2661*t*, may use the flow task identifier 2241 in cooperation with one or more of the components 2542, 2543 and 2545 to retrieve the task routine 2440 to be executed to perform the task from a federated area 2566. In so doing, the task pod 2661*t* may be provided with the latest version of task routine 2440 that performs that task.

Alternatively, and by way of another example, the originally received request may be to repeat a past performance of a job flow using the very same task routine as were used in that past performance, as well as the very same data objects as inputs as were used in that past performance. In such a situation, the request message 2634*et* may be generated based, at least partially, on the instance log 2720 that documents that past performance of the job flow, which as previously discussed, may include the task routine identifiers 2441 that uniquely identify each of the task routines 2440 (including versions) that were executed during that past performance Thus, the request message 2634*et* may include the task routine identifier 2441 that uniquely actually identifies the particular task routine 2440 (including the version thereof) that is to be executed to perform a task of the job flow. As a result, the task pod 2661*t*, may use the task routine identifier 2441 in cooperation with one or more of the components 2542, 2543 and 2545 to retrieve the particular uniquely identified task routine 2440 to be executed to perform the task from a federated area 2566.

Turning to FIG. 22F, upon completion of the execution of the task routine 2440, from the task pod 2661*t*, a message 2634*tc* indicating such completion of execution of the task routine 2440 may be output onto the task queue 2669*t*. Such a completion message 2634*tc* may be directed at whichever one of the instances of the performance component 2544 within one of the performance pods 2661*e* is the instance that is currently controlling the execution of task routines 2440 as part of effectuating the performance of the job flow. In some embodiments, the same task pod 2661*t* in which execution of the task routine 2440 has been completed and from which the completion message 2634*tc* message may have been output, may also act to "accept" the request message 2634*et*, thereby removing it from the task queue 2669*t*. Alternatively, it may be the instance of the performance component 2544 that is currently controlling the execution of task routines 2440 for the job flow that so "accepts" the request message 2634*et*, thereby removing it from the task queue 2669*t*, and may do so in response to the output of the completion message 2634*tc*. In various embodiments, the accepting of the request message 2634*et* to remove it from the task queue 2669*t* and/or the output of the completion message 2634*tc* onto the task queue 2669*t* may serve as another mechanism to again preserve an indication of the current state of the performance of the job flow, including the fact of completion of the task routine 2440, if the instance of the performance component 2544 that is currently controlling the execution of task routines 2440 for the job flow is uninstantiated.

Presuming there are no other task routines 2440 that need to be executed as part of performing the job flow, then upon receipt of the completion message 2634*tc*, the instance of the performance component 2544 that is currently controlling the execution of task routines 2440 for the job flow may be caused (in cooperation with its corresponding instance of the messaging routine 2644) to output a message 2634*jc* indicating completion of the performance of the job flow onto the job queue 2669*j*. Such a completion message 2634*jc* may be directed at whichever one of the instances of the portal component 2549 within one of the portal pods 2661*p* is the instance that is currently involved in the performance of the job flow. In some embodiments, the same instance of the performance component 2544 from which the completion message 2634*jc* message may have been output, may also act to "accept" the request message 2634*pj*, thereby removing it from the job queue 2669*j*. Alternatively, it may be the instance of the portal component 2549 that is currently involved in the performance of the job flow that so "accepts" the request message 2634*jp*, thereby removing it from the job queue 2669*j*, and may do so in response to the output of the completion message 2634*jc*. In various embodiments, the accepting of the request message 2634*jp* to remove it from the job queue 2669*t* and/or the output of the completion message 2634*jc* onto the job queue 2669*t* may serve as another mechanism to again preserve an indication of the current state of the performance of the job flow, including the fact of completion of the job flow, if the instance of the portal component 2549 that is currently involved in the performance of the job flow is uninstantiated.

Turning to FIG. 22G, upon receipt of the completion message 2634*jc*, the instance of the portal component 2549 that is currently involved in the performance of the job flow may be caused to update the indication of the status of the job flow performance stored within the entry within the request data 2535 from an indication of being underway to an indication of being completed (or, may simply remove the entry for the job flow, altogether). The same instance of the portal component 2549 may also transmit an indication of completion of the performance of the job flow via the network 2999 to the requesting device 2100 or 2800.

Figure 23A:
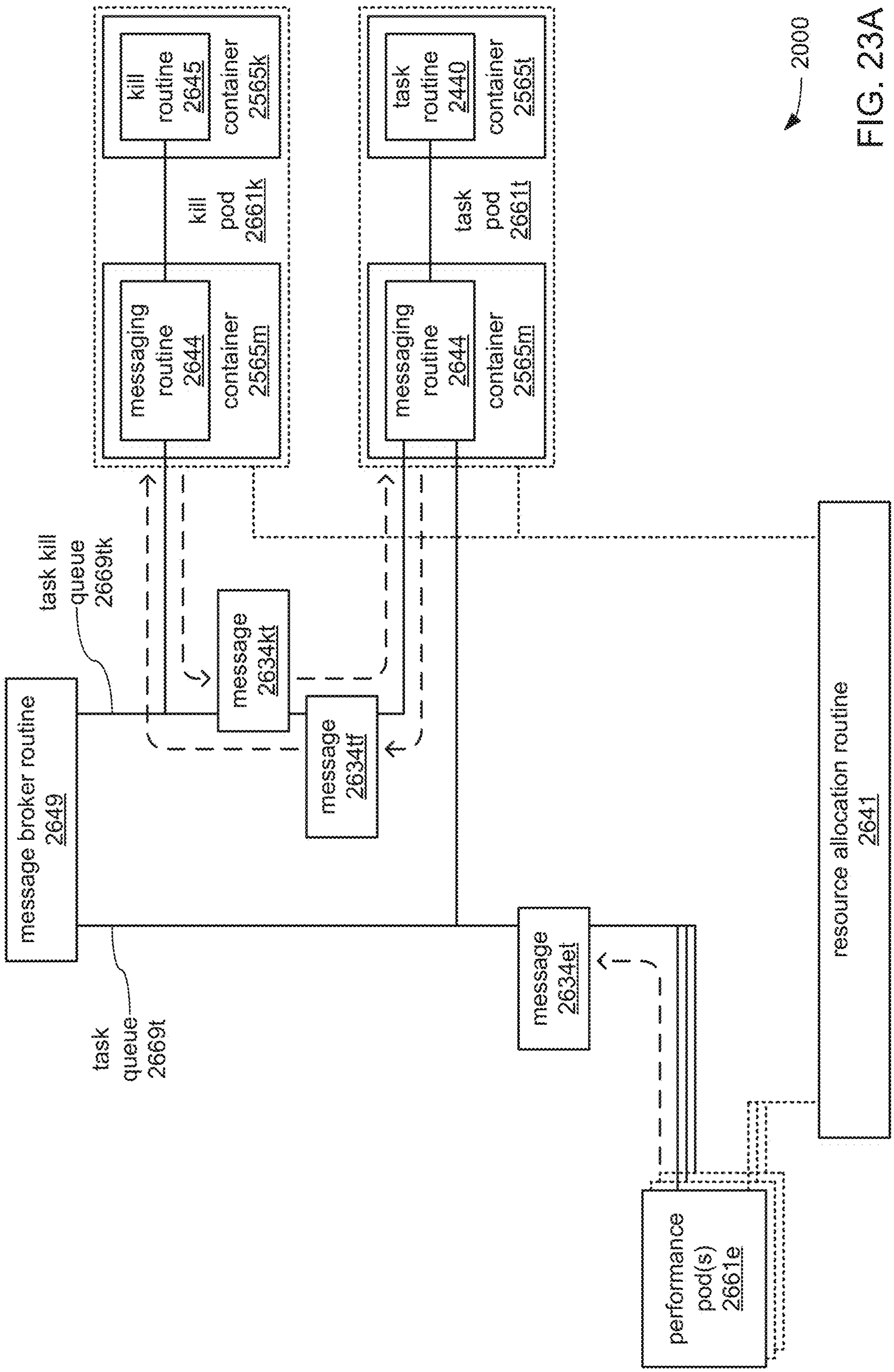
FIGS. 23A, 23B and 23C, together, illustrate an example of using the messaging architecture of FIGS. 19A-G to effectuate a commanded cancellation of a job flow performance.
Figure 23B:
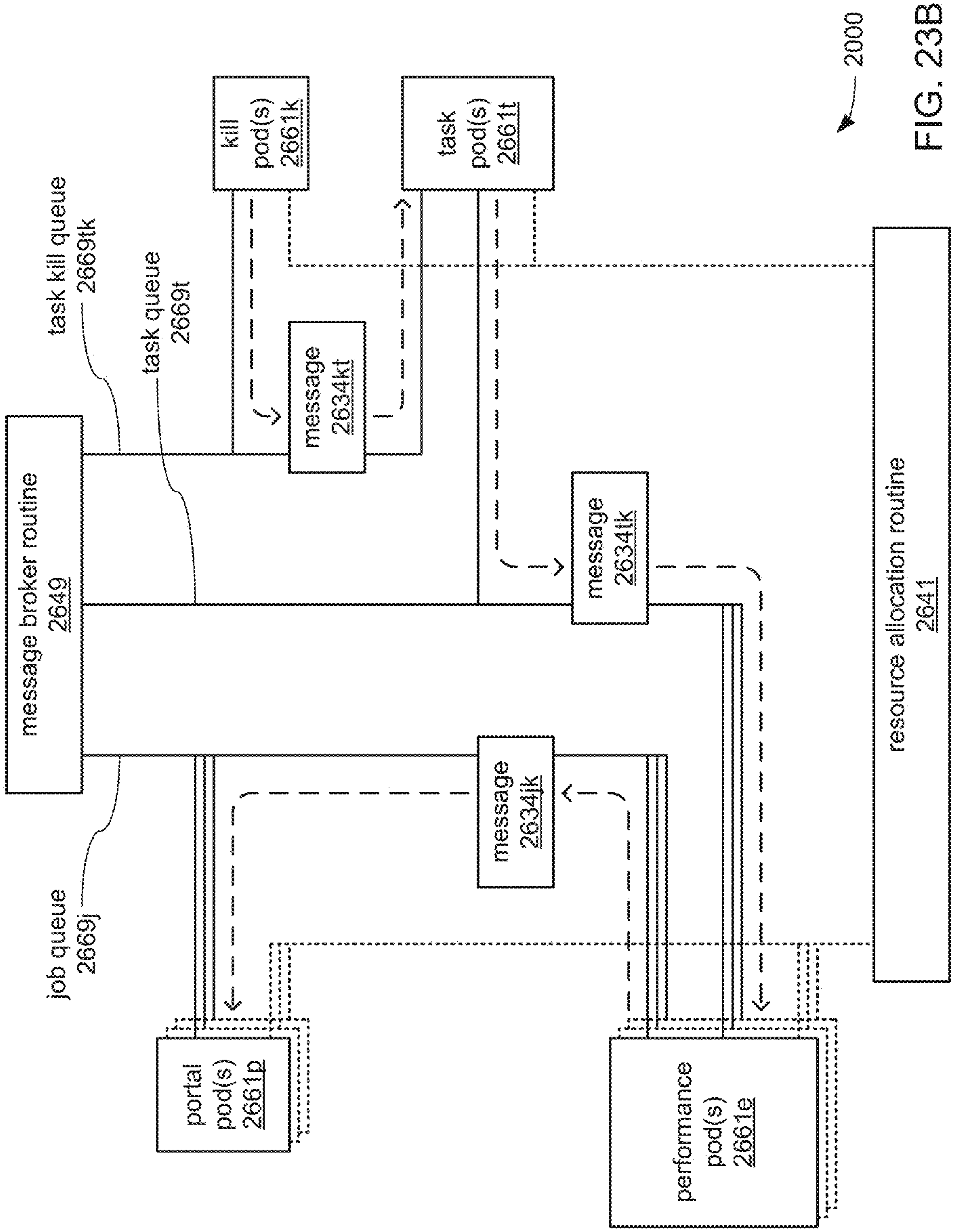
Figure 23C:
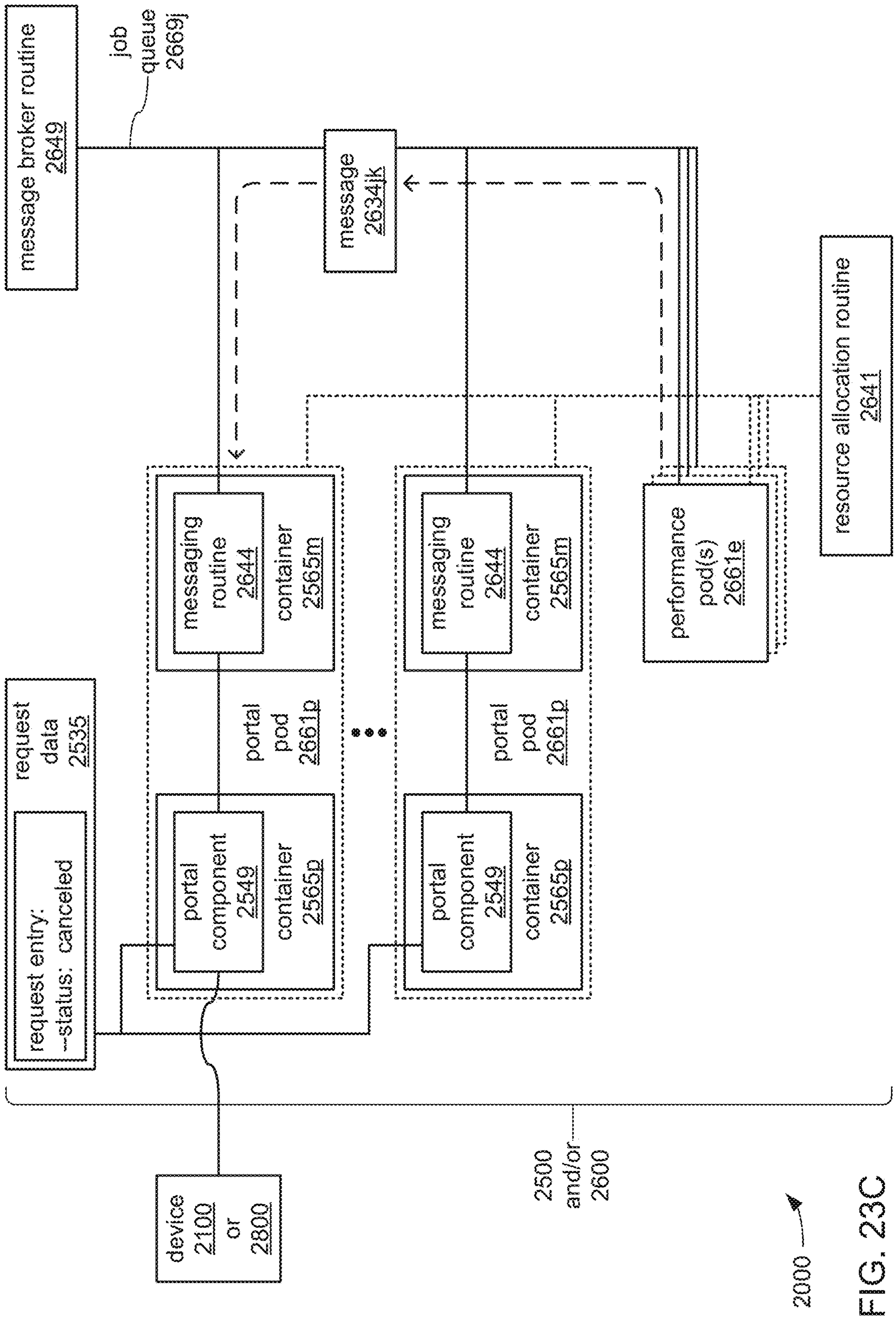

FIGS. 23A, 23B and 23C, together, illustrate various aspects of recovery from multiple unsuccessful attempts at executing a task routine 2440 as part of performing a job flow in an architecture employing both pod-based resource allocation and message-based coordination of MTC, such as the exemplary internal architecture of FIGS. 19A-G. More specifically, FIG. 23A depicts aspects of a situation in which repeated attempts may be made to execute a task routine 2440 that each end in failure, followed by the kill routine 2645 being triggered to cause cessation of further attempts. FIGS. 23B and 23C, together, depict aspects of the manner in which, through the message-based coordination, the message output by the kill routine 2645 propagates to cause a corresponding cessation of further efforts to perform any other portion of the job flow, and to reflect the occurrence of an error to a requesting device 2100 or 2800.

Turning to FIG. 23A, it may be that an error condition exists within a particular task routine 2440 and/or within a job flow that employs the task routine 2440 to perform a task thereof such that none of repeated attempts to execute the same task routine 2440 have resulted in a successful completion of the performance of the corresponding task. More specifically, it may be that each attempt at executing the task routine 2440 within a task container 2565*t* within a task pod 2661*t* has resulted in the crashing of at least the task routine 2440, which would typically also cause a corresponding crash of (or other form of halting of) the task container 2565*t*.

It is recognized that the causes for at least some instances of failure for a task routine 2440 to successfully execute may be transient circumstances that may not be specific to the task routine 2440, itself, or to the job flow with which the execution of the task routine 2440 is associated. By way of example, hardware and/or software failures within ones of the federated devices 2500 and/or ones of the storage devices 2600 may occur, and/or failures in communications between such devices may occur. Further, despite the presence of various devices, protocols and/or systems to provide some degree of redundancy to overcome such failures, there can still be instances where the execution of routines can still be adversely affected for at least a brief period before recovery from such failures can be fully effectuated.

As a result, it may be that such an exemplary internal architecture as presented in FIGS. 15A-G incorporates the ability to counteract such failures so as to enable the successful performance of job flows in spite of such failures. More specifically, where a crash arising from an attempt to execute a task routine 2440 occurs within a task pod 2661*t*, core(s) 2555 of processor(s) 2550 may be caused by ongoing execution of the resource allocation routine 2641 to respond by uninstantiating that task pod 2661*t*, and then instantiating a new task pod 2661*t* as a replacement (though doing so may be delayed depending on changing levels of availability of resources). Execution the crashed task routine 2440 may be re-attempted within a new task pod 2661*t* or an existing task pod 2661*t* that becomes available. As previously discussed in reference to FIG. 22E, the presence of a request message 2634*et* on the task queue 2669*t* that conveys the request to execute the task routine 2440 may serve as the trigger to cause such a re-attempting thereof.

However, while such a mechanism to cause the execution of a task routine 2440 to be re-attempted following a crash may be effective in addressing an occasional failure in execution that is not caused by an error within a task routine 2440 and/or within a job flow that requires its execution, such a mechanism may be ill suited to a situation in which there is such an error within a task routine 2440 and/or within a job flow that requires its execution. It may be that an endless loop of re-attempting to execute the task routine 2440 results, which may consume valuable resources and lead to a situation where the performance of the associated job flow is never completed with either a favorable or unfavorable result.

To address such a situation, the instance of the messaging routine 2644 within the messaging container 2565*m* within each task pod 2661*t* may respond to an occurrence of a crash of a task routine 2440 within the task container 2565*t* by outputting a message 2634*tf* indicating failure in the execution of the task routine 2440 onto the task kill queue 2669*tk*. Within the kill pod 2661*k*, the instance of the kill routine 2645 being executed within the kill container 2565*k* thereof may monitor the task kill queue 2669*tk* (through the instance of the messaging routine 2644 executed within the messaging container 2565*m* therein) for instances of such task failure messages 2634*tf*. Each such task failure message 2634*tf* may include the job flow identifier 2221, the task routine identifier 2441 and/or other identifiers to identify the task routine 2440 that crashed and/or the job flow that required the execution of the task routine.

In some embodiments, core(s) 2555 of processors 2550 may be caused by ongoing execution of the kill routine 2645 to count the quantities of task failure messages 2634*tf* that are associated with each job flow or that are associated with each combination of job flow and a particular task routine 2440. Where one of such counts associated with a job flow reaches a predetermined maximum count threshold for execution failures, a kill tasks message 2634*kt* may be output from the kill pod 2661*k* onto the task kill queue 2669*tk* to convey an instruction to cease any further execution of any task routine 2440 where such execution is associated with the job flow for which the maximum threshold count was reached. Again, as discussed in reference to other messages, the kill tasks message 2634*kt* is not addressed to any one particular task pod 2661*t*, but is instead addressed to all task pods 2661*tk* in which a task routine 2440 is being executed in connection with the specified job flow.

Turning to FIG. 23B, in response to the output of the kill tasks message 2634*kt*, each such task pod 2661*t* in which such an execution of a task routine 2440 is currently underway may cease such execution, and from each such task pod 2661*t*, a message 2634*tk* indicative of the cancelation of execution of the task routine 2440 therein may be output onto the task queue 2669*t*. Each such task cancelation message 2634*tk* may include the job flow identifier 2221 that identifies the job flow with the execution of the canceled task 2440 was associated. Each such task cancelation message 2634*tk* may also include an indication that the reason for such cancelation is that the job flow has been requested to be canceled due to a detected recurring error in attempts to execute one of the task routines 2440. Upon receipt of one or more of such task cancelation messages 2634*tk*, the instance of the performance component 2544 within its corresponding one of the performance pods 2661*e* may respond by ceasing to cause any more executions of task routines 2440 associated with the job flow to occur, and may output a job flow cancelation message 2634*jk* onto the job queue 2669*j*. The job flow cancelation message 2634*jk* may include the job flow identifier 2221 of the job flow.

Turning to FIG. 23C, in response to the output of the job flow cancellation message 2634*jk*, the instance of the portal component 2549 that is currently involved in the performance of the job flow may update the indication of status of the performance of the job flow within the request data 2535 from an indication that the performance is underway to an indication that the performance has been canceled. That same instance of the performance component 2549 may also cause the transmission, to the requesting device 2100 or 2800 that had originally requested the performance of the job flow, an indication that the performance has been canceled due to an error having been encountered.

Figure 24A:
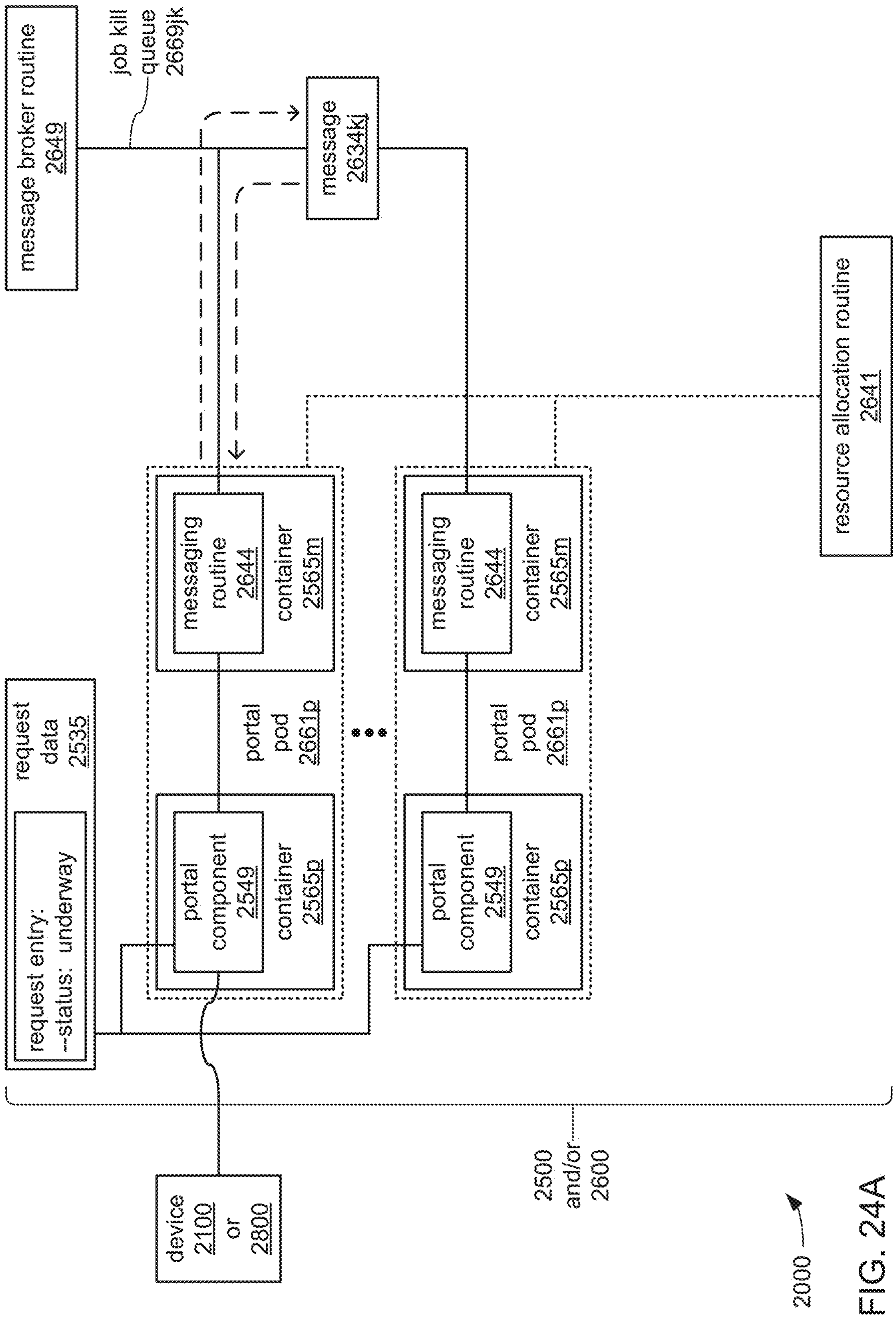
FIGS. 24A, 24B, 24C and 24D, together, illustrate an example of using the messaging architecture of FIGS. 19A-G to automatically cancel a job flow performance.
Figure 24B:
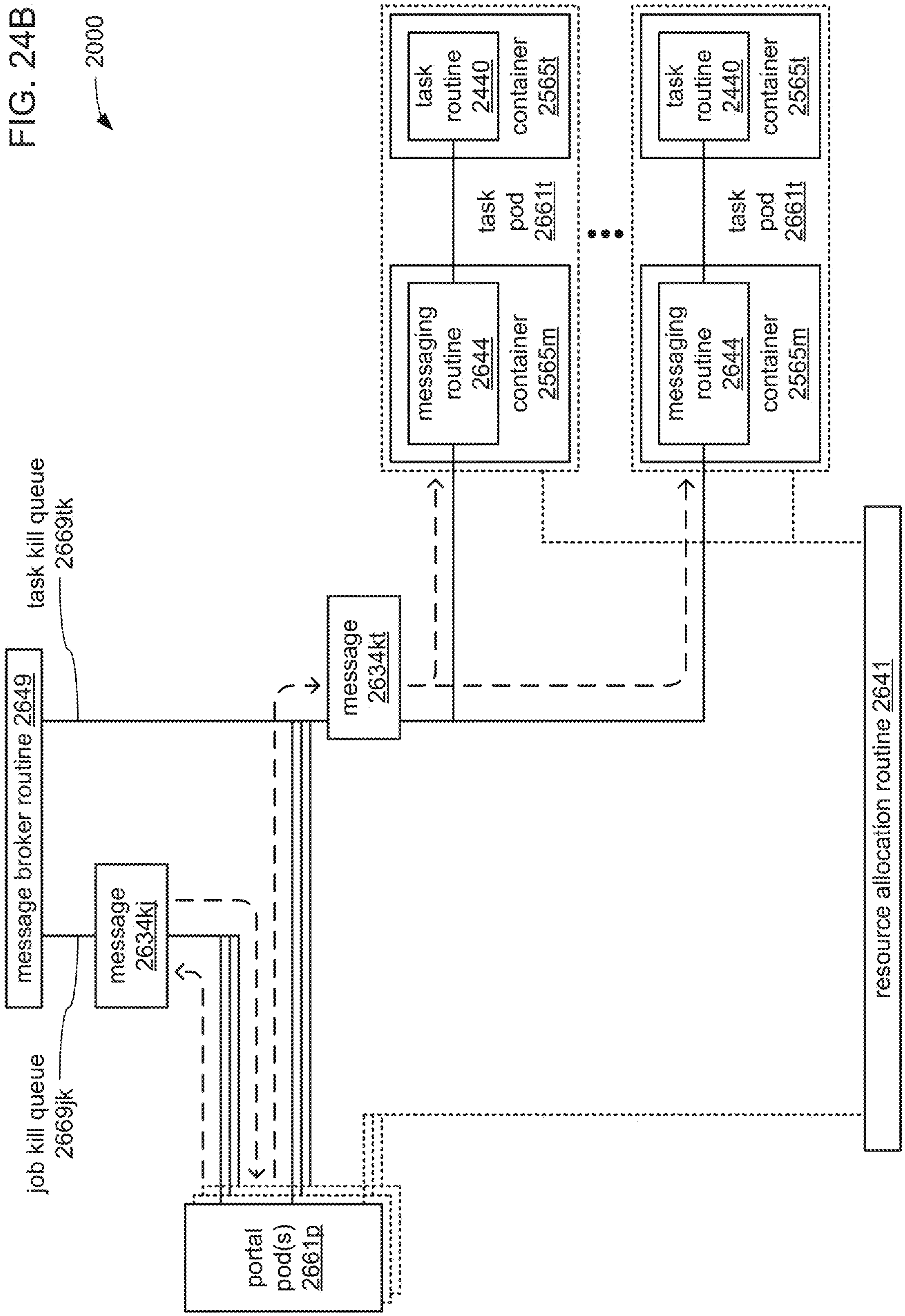
Figure 24C:
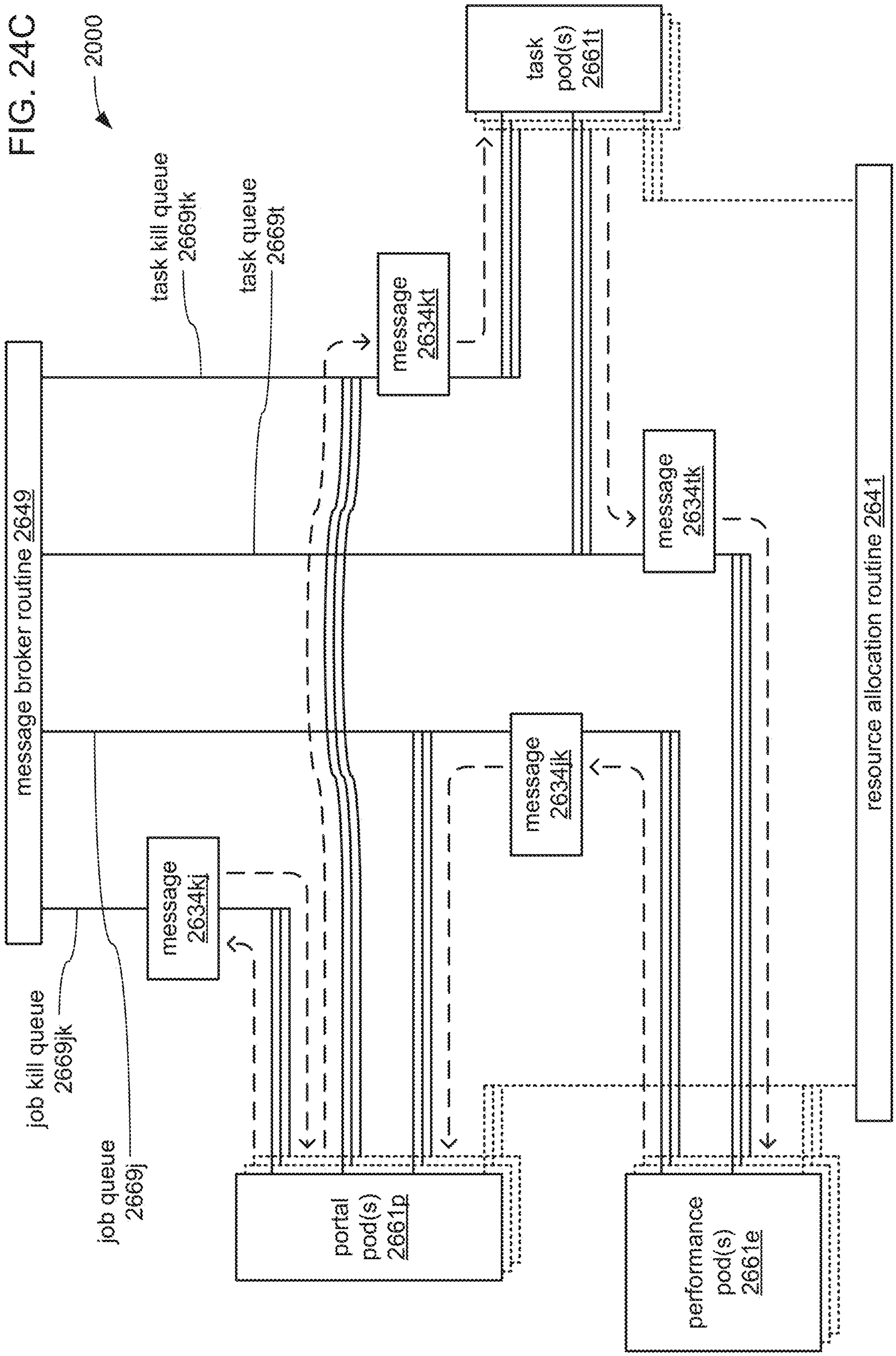
Figure 24D:
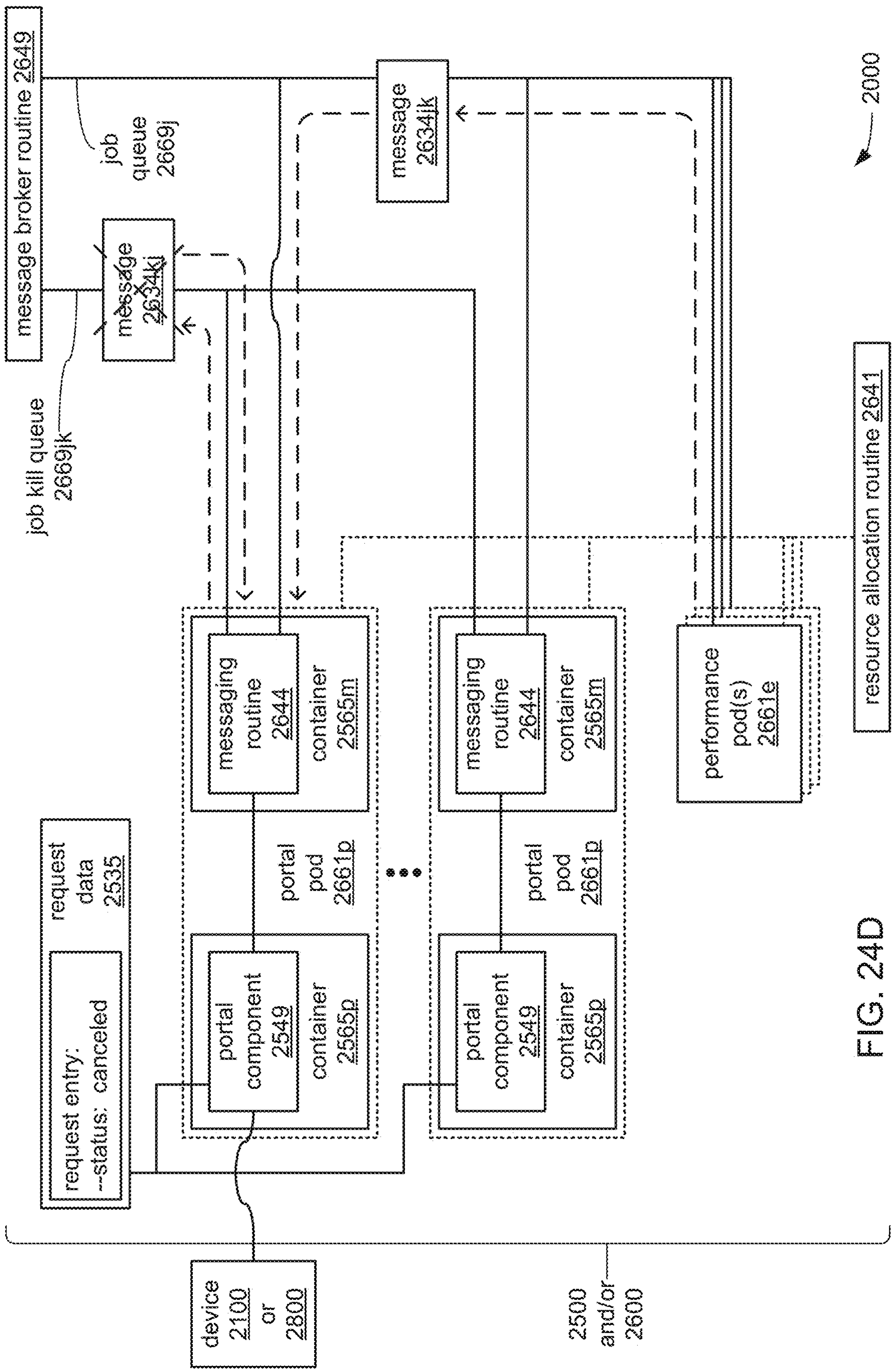

FIGS. 24A, 24B, 24C and 24D, together, illustrate various aspects of effecting a requested cancelation of a performance of a job flow in an architecture employing both pod-based resource allocation and message-based coordination of MTC, such as the exemplary internal architecture of FIGS. 19A-G. More specifically, FIG. 24A depicts aspects of the receipt of a request from a requesting device to cancel a performance of a job flow that had earlier been requested to be performed. FIGS. 24B, 24C and 24D, together, depict aspects of the manner in which, through the message-based coordination, a message that is output to cause a cessation of executions of tasks of the job flow leads to a cessation of other aspects of the performance of the job flow.

Turning to FIG. 24A, one of the one or more instances of the portal component 2549 may receive a request, through the network 2999 from a requesting device 2100 or 2800, to cancel a previously requested performance of a job flow. It should be noted that such a request to cancel a performance of a job flow may be received an handled by a different one of the instances of the portal component 2549 than the instance that is currently monitoring the performance of the job flow, as previously requested. To ensure that the cancelation is performed in spite of the possibility of the instance of the portal component 2549 that received the cancelation request being uninstantiated, that instance of the portal component 2549 may output a kill job flow message 2634*kj* onto the job kill queue 2669*jk*.

Turning to FIG. 24B, following such outputting of the kill job flow message 2634*kj* on to the job kill queue 2669*jk*, that same instance of the performance component 2549 may then output a kill tasks message 2634*kt* onto the task kill queue 2669*tk*. This kill tasks message 2634*kt* may be very similar to the kill tasks message 2634*kt* earlier described in reference to FIG. 23A as being output by the kill routine 2645 inasmuch as the kill tasks message 2634*kt* may specify that all execution of task routines 2440 within task pods 2661*t* must cease where the execution of those tasks is associated with the performance of the job flow that is requested to be canceled.

Turning to FIG. 24C, the response to the output of the kill tasks message 2634*kt* may be very much like what was described in reference to FIG. 23B. Again, each such task pod 2661*t* in which such an execution of a task routine 2440 is currently underway may cease such execution, and from each such task pod 2661*t*, a message 2634*tk* indicative of the cancelation of execution of the task routine 2440 therein may be output onto the task queue 2669*t*. Each such task cancelation message 2634*tk* may include the job flow identifier 2221 that identifies the job flow with the execution of the canceled task 2440 was associated. Each such task cancelation message 2634*tk* may also include an indication that the reason for such cancelation is that the job flow has been requested to be canceled. Upon receipt of one or more of such task cancelation messages 2634*tk*, the instance of the performance component 2544 within its corresponding one of the performance pods 2661*e* may respond by ceasing to cause any more executions of task routines 2440 associated with the job flow to occur, and may output a job flow cancelation message 2634*jk* onto the job queue 2669*j*. The job flow cancelation message 2634*jk* may also include the job flow identifier 2221 of the job flow.

Turning to FIG. 24D, the response to the output of the job flow cancelation message 2634*jk* may be very much like what was described in reference to FIG. 23C. Again, the instance of the portal component 2549 that currently oversees the performance of the job flow may update the indication of status of the performance of the job flow within the request data 2535 from an indication that the performance is underway to an indication that the performance has been canceled. That same instance of the performance component 2549 may also cause the transmission, to the requesting device 2100 or 2800 that had originally requested the performance of the job flow (which may or may not be the same requesting device 2100 or 2800 from which the request to cancel the performance was received), an indication that the performance has been canceled due to a request to do so. Further, the instance of the portal component 2549, whether it is the same instance that also oversaw the performance of the job flow, or not, may remove the kill job flow message 2634*kj* from the job kill queue 2669*jk*.

Figure 25A:
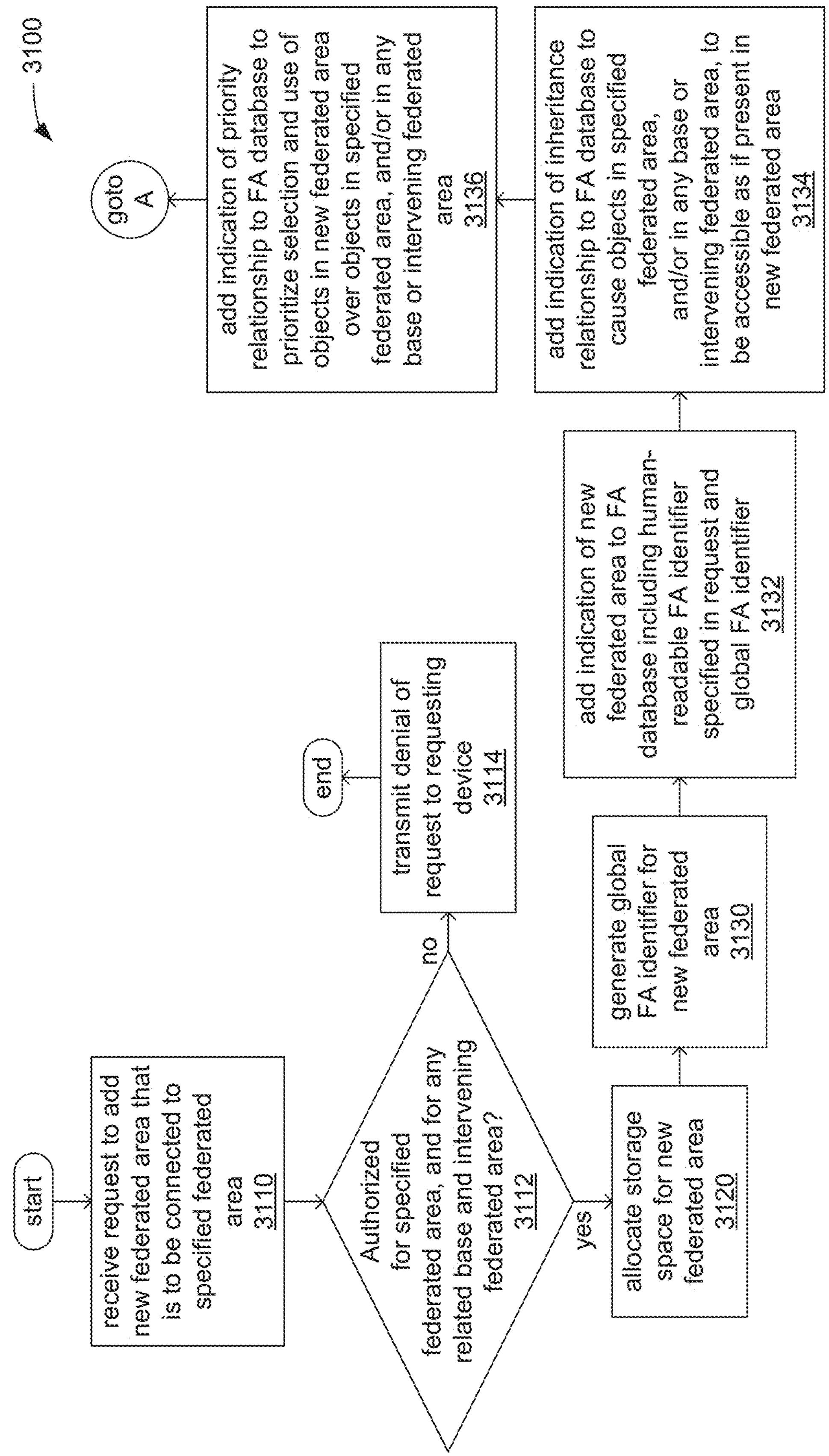
FIGS. 25A and 25B, together, illustrate an example embodiment of a logic flow of a federated device adding a requested federated area related to one or more other federated areas.
Figure 25B:
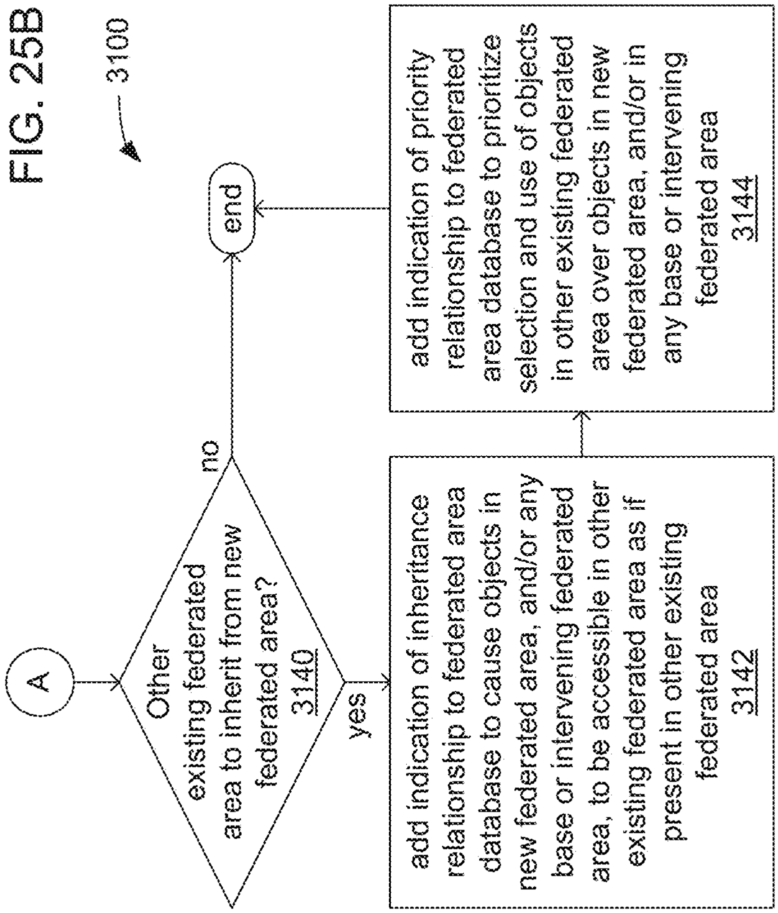
Figure 26A:
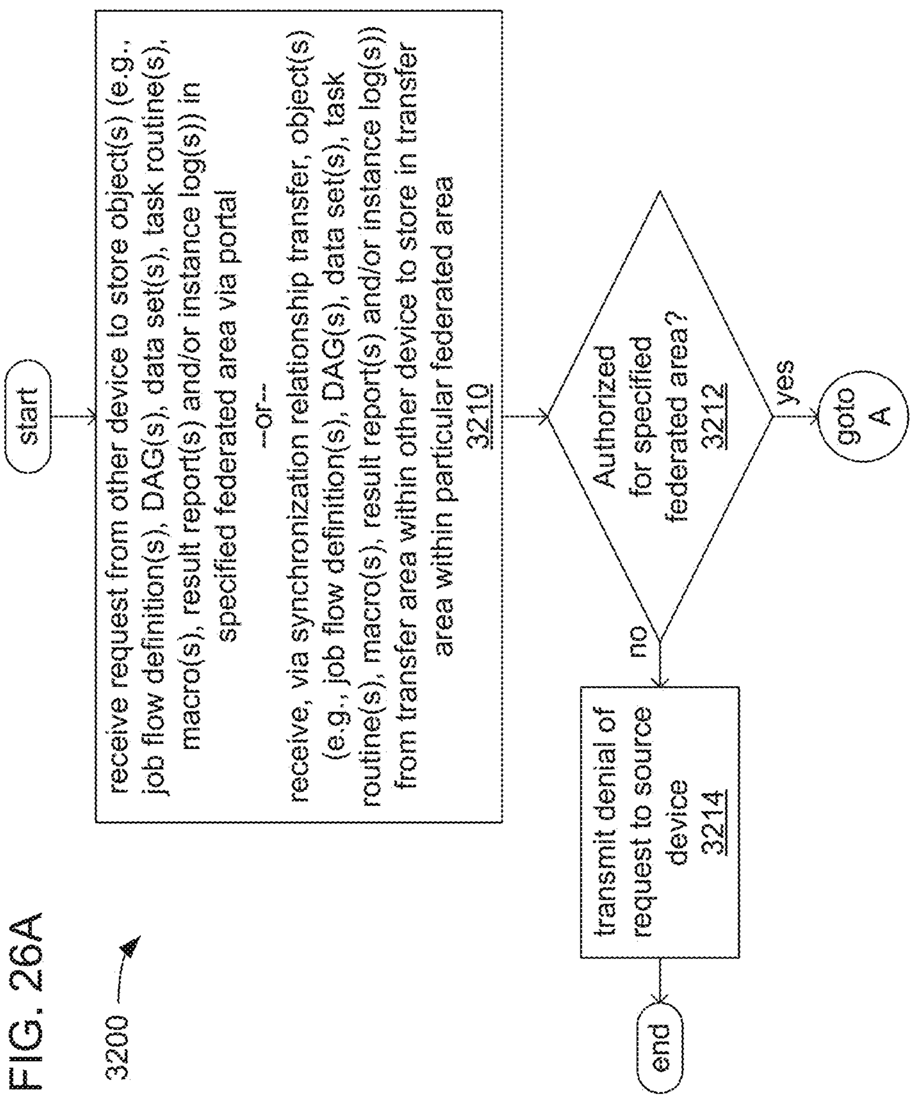
FIGS. 26A, 26B, 26C, 26D, 26E, 26F and 26G, together, illustrate an example embodiment of a logic flow of a federated device storing objects in a federated area.
Figure 26B:
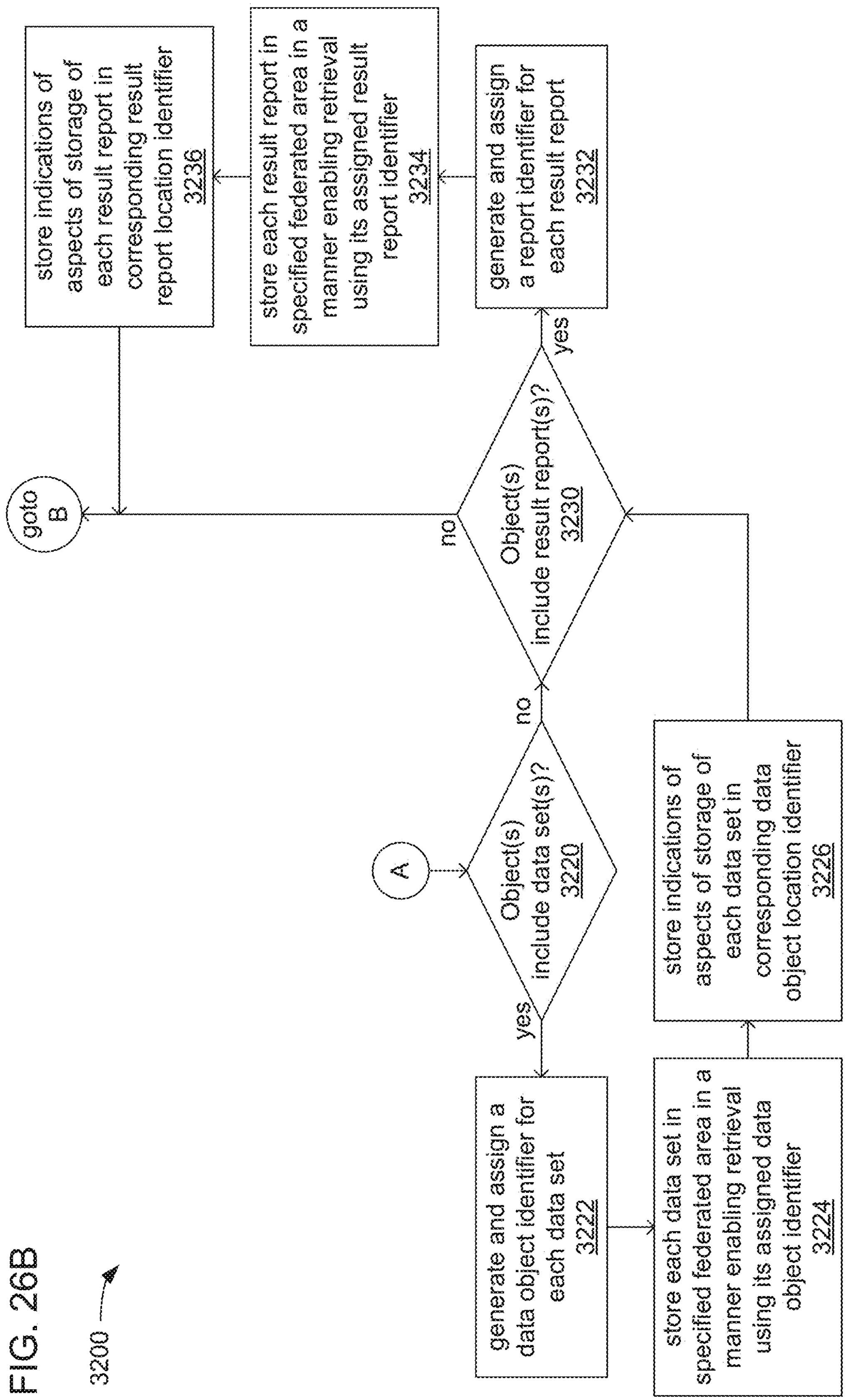
Figure 26C:
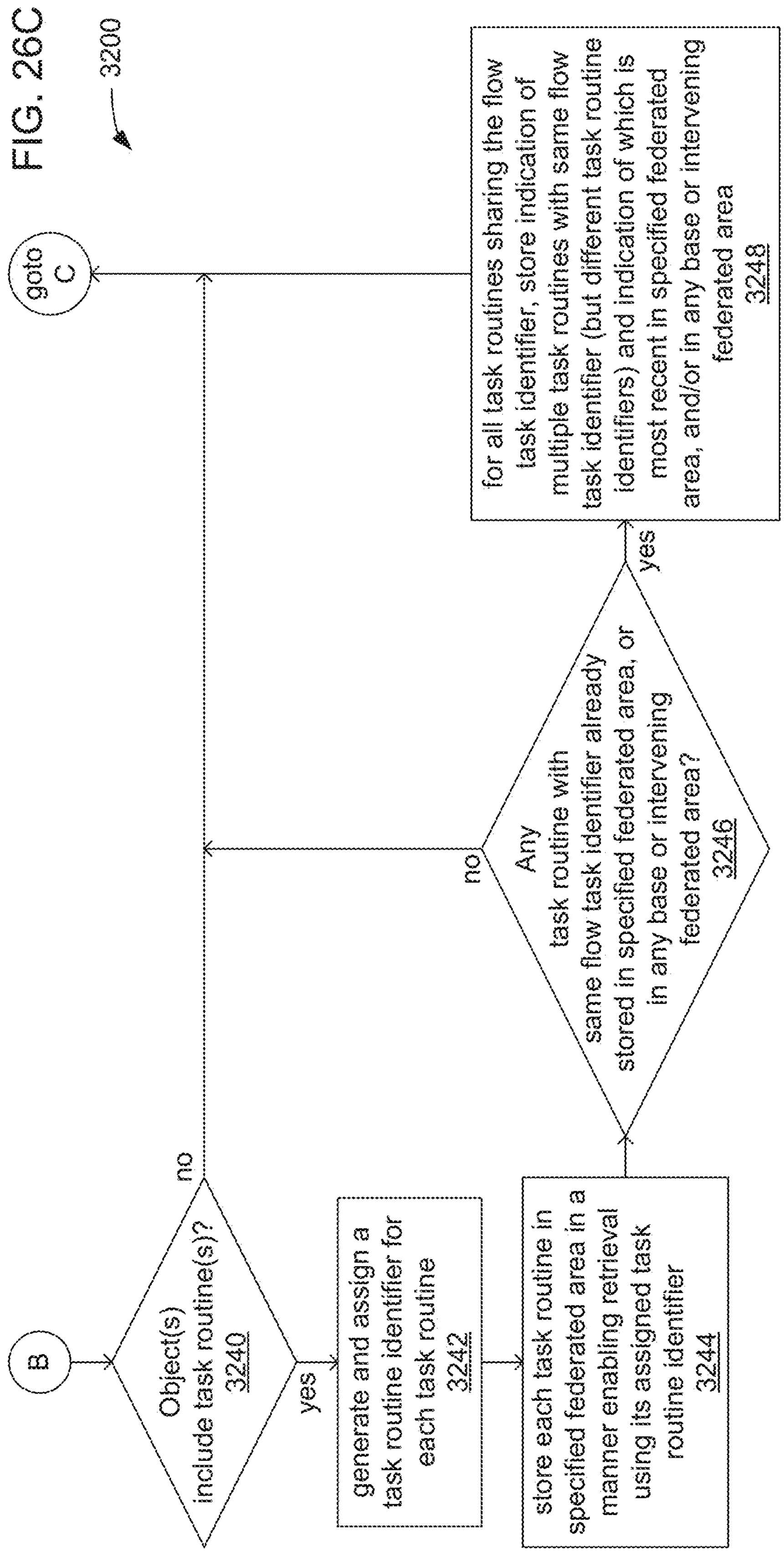
Figure 26D:
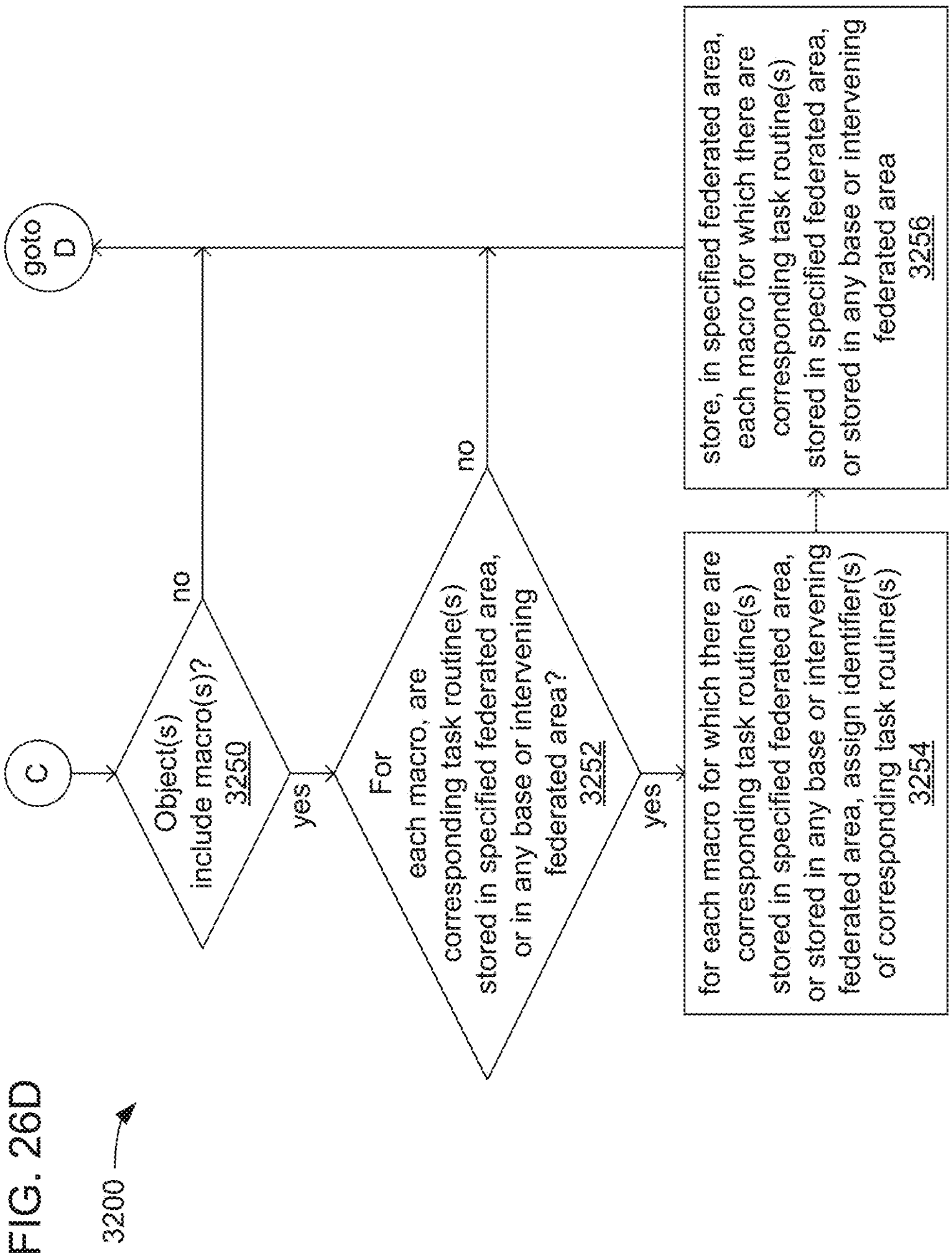
Figure 26E:
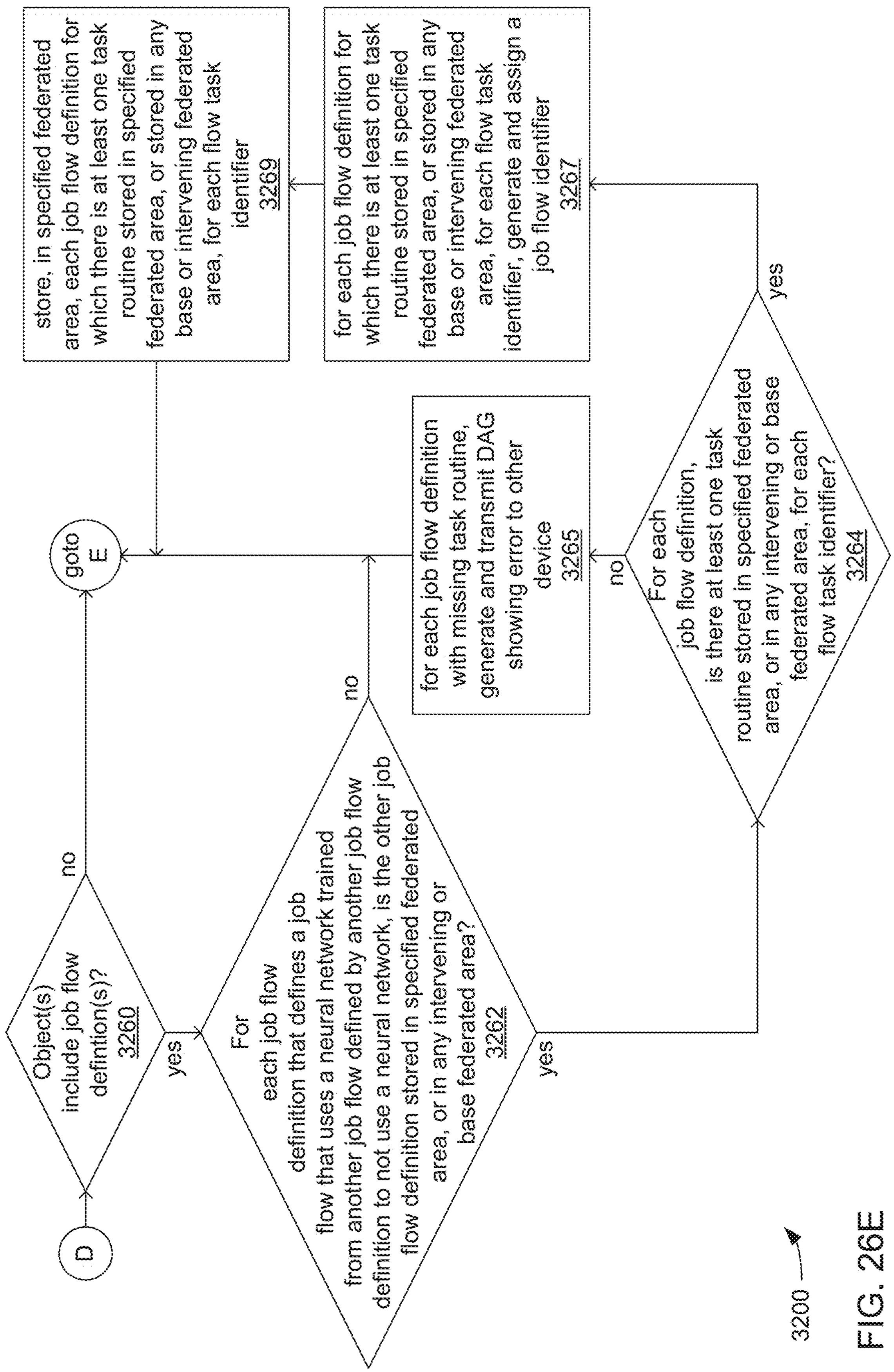
Figure 26F:
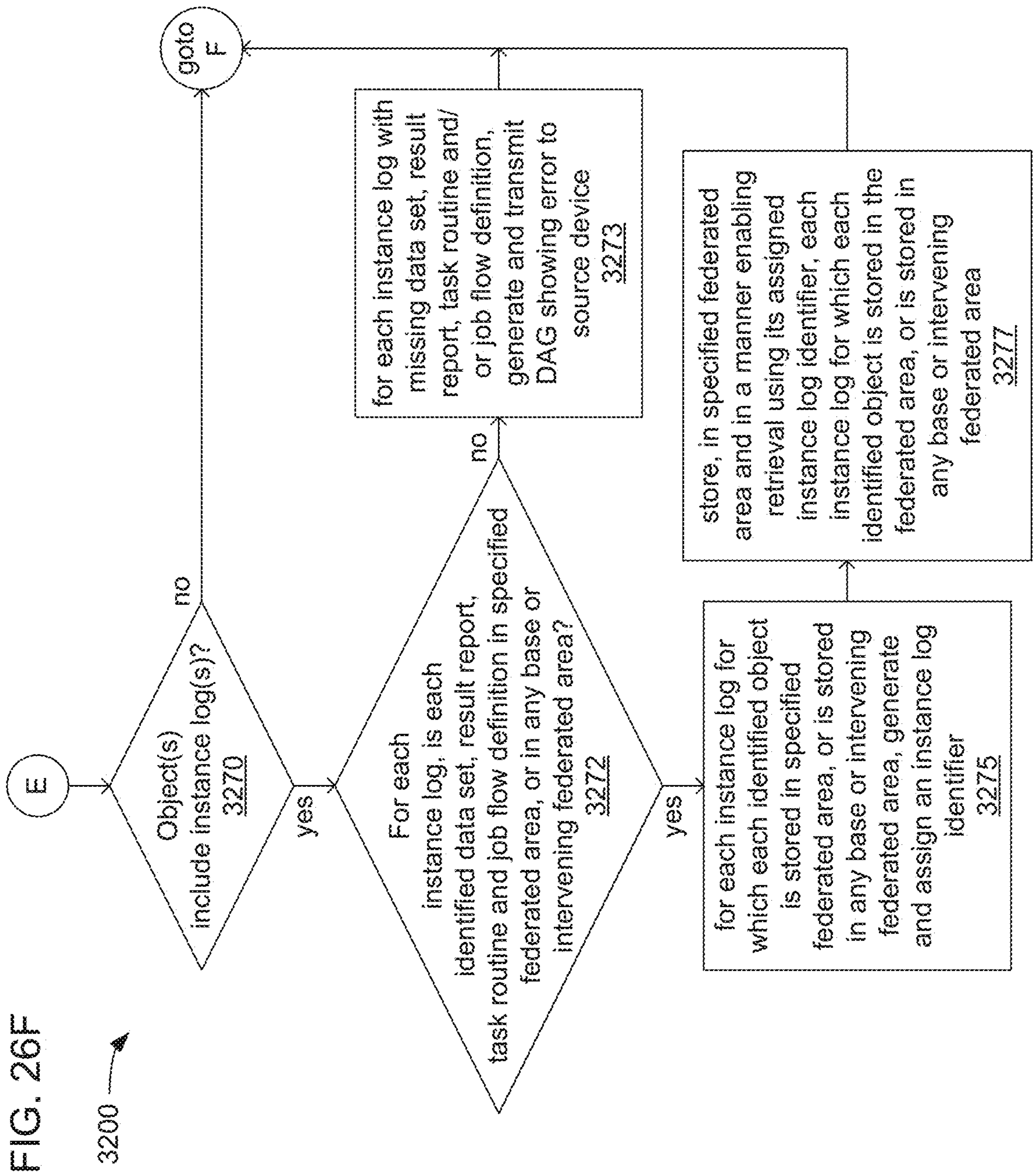
Figure 26G:
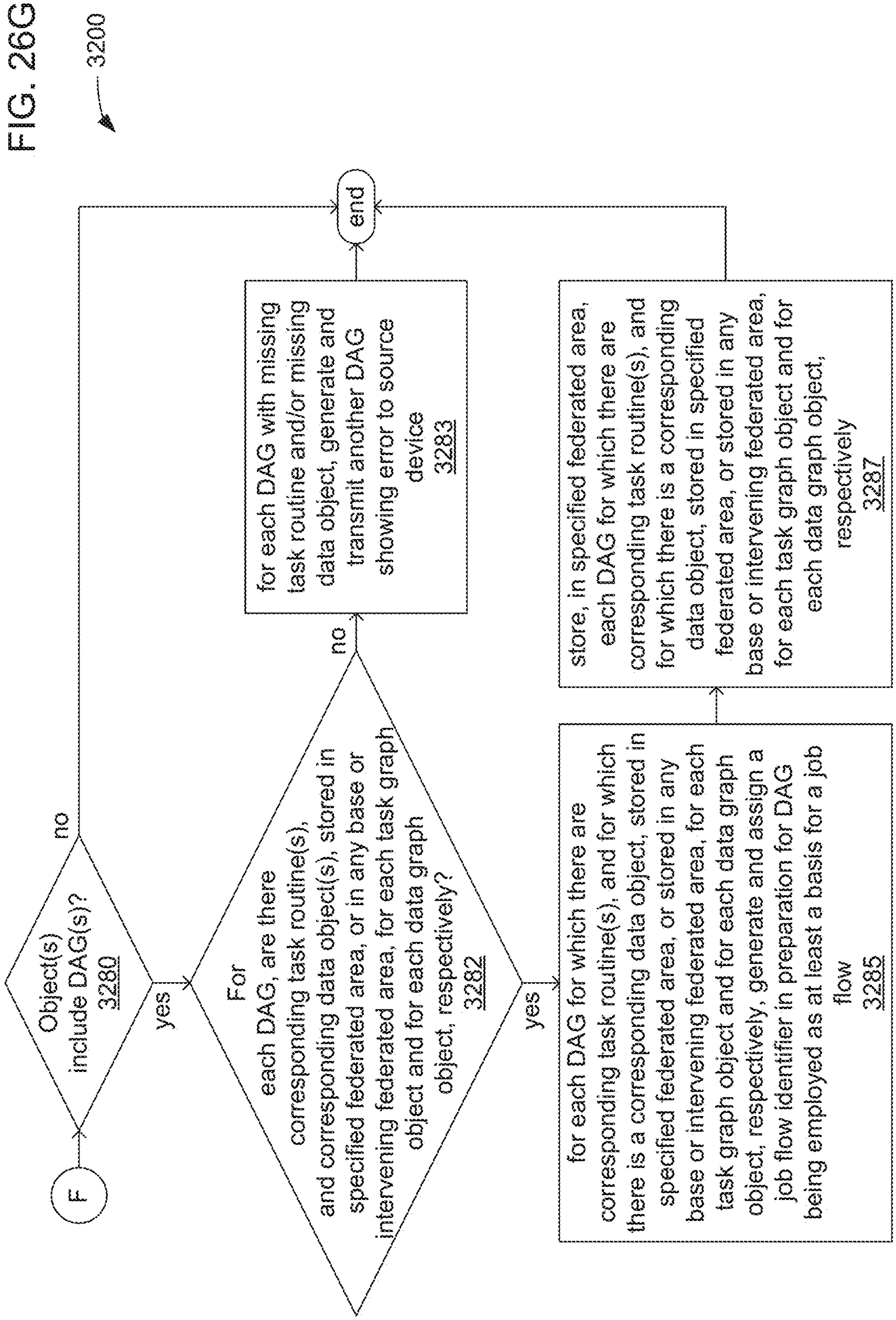

FIGS. 25A and 25B, together, illustrate an example embodiment of a logic flow 3100. The logic flow 3100 may be representative of some or all of the operations executed by one or more embodiments described herein. More specifically, the logic flow 3100 may illustrate operations performed by the processor(s) 2550 in executing the control routine 2540, and/or performed by other component(s) of at least one of the federated devices 2500.

At 3110, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to add a new federated area to be connected to a specified existing federated area. As has been discussed, such a portal may employ any of a variety of protocols and/or handshake mechanisms to enable the receipt of requests for various forms of access to the federated area by other devices, as well as to exchange objects with other devices, via the network.

At 3112, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area (as well as for any related base federated area and/or any related intervening federated area), and/or has been granted a level of access that includes the authorization to make such requests. Again, the processor may require the receipt of one or more security credentials from devices and/or users from which such requests are received. If, at 3112, the processor determines that the request is not from an authorized device and/or is not from a person and/or entity authorized as a user with sufficient access to make such a request, then the processor may transmit an indication of denial of the request to the device from which the request is received via the network at 3114.

However, if at 3112, the processor determines that the request is authorized, then at 3120, the processor may allocate storage space within the one or more federated devices, and/or within one or more storage devices under the control of the one or more federated devices, for the requested new federated area that is connected to (e.g., branches from) the specified existing federated area.

At 3130, the processor may generate a new global federated area identifier (GUID) that is to be used to uniquely identify the new federated area (e.g., a new global federated area identifier 2569). At 3132, the processor may add an indication of the creation of the requested new federate area, as well as the manner in which the requested new federated area is connected to the specified existing federated area to a federated area database that may store indications of the existence of each federated area, which users and/or devices are granted access to each, and/or how each federated area may be connected or otherwise related to one or more others (e.g., within the portal data 2539 and/or the federated area parameters 2536). In so doing, the new federated area, the specified existing federated area and/or other federated areas may be identified and referred to within such databases by their global federated area identifiers and/or human-readable federated area identifiers (e.g., the human-readable federated area identifiers 2568), with the global federated area identifiers serving to resolve any conflict that may arise among the human-readable federated area identifiers).

At 3134, the processor may add an indication to such a database of an inheritance relationship among the new federated area, the specified existing federated area, any base federated area to which the specified existing federated area is related, and any intervening federated area present between the specified existing federated area and the base federated area. As has been discussed, with such an inheritance relationship in place, any object stored within any base federated area to which the specified existing federated area may be related, within the specified existing federated, and/or within any intervening federated area that may be present between the specified existing federated area and such a base federated area may become accessible from within the new federated area as if stored within the new federated area.

At 3136, the processor may add an indication to such a database of a priority relationship among the new federated area, the specified existing federated area, any base federated area to which the specified existing federated area is related, and any intervening federated area present between the specified existing federated area and the base federated area. As has been discussed, with such a priority relationship in place, the use of objects stored within the new federated area is given priority over the use of similar objects (e.g., other task routines 2440 that perform the same task) that may be stored within any base federated area to which the specified existing federated area may be related, within the specified existing federated, and/or within any intervening federated area that may be present between the specified existing federated area and such a base federated area.

At 3140, the processor may check whether there is at least one other existing federated area that is connected to the requested new federated area within a set of related federated areas such that it is to have at least an inheritance relationship with the requested new federated area such that it is to inherit objects from the requested new federated area. As has been discussed, this may occur where the requested new federated area is requested to be instantiated at a position within a linear hierarchy or within a branch of a hierarchical tree such that it is interposed between two existing federated areas.

If, at 3140, there is such another federated area, then at 3142, the processor may add an indication to such a database of an inheritance relationship among the other existing federated area, the requested new federated area, the specified existing federated area, any base federated area to which the specified existing federated area and the other federated area are related, and any intervening federated area present between the specified existing federated area and the base federated area. In this way, any object stored within any base federated area, within the specified existing federated, within any intervening federated area that may be present between the specified existing federated area and such a base federated area, or within the requested new federated area may become accessible from within the other existing federated area as if stored within the other existing federated area.

At 3144, the processor may add an indication to such a database of a priority relationship among the other existing federated area, the requested new federated area, the specified existing federated area, any base federated area to which the specified existing federated area is related, and any intervening federated area present between the specified existing federated area and the base federated area. In this way, the use of objects stored within the other existing federated area is given priority over the use of similar objects (e.g., other task routines 2440 that perform the same task) that may be stored within the requested new federated area, any base federated area to which the specified existing federated area may be related, within the specified existing federated, and/or within any intervening federated area that may be present between the specified existing federated area and such a base federated area.

FIGS. 26A, 26B, 26C, 26D, 26E, 26F and 26G, together, illustrate an example embodiment of a logic flow 3200. The logic flow 3200 may be representative of some or all of the operations executed by one or more embodiments described herein. More specifically, the logic flow 3200 may illustrate operations performed by the processor(s) 2550 in executing the control routine 2540, and/or performed by other component(s) of at least one of the federated devices 2500.

At 3210, a processor of a federated device of a distributed processing system (e.g., at least one processor 2550 of one of the federated devices 2500 of the distributed processing system 2000) may receive a request from another device, via a network (e.g., one of the source devices 2100, or one of the reviewing devices 2800, via the network 2999) and through a portal provided by the processor for access to other devices via the network, to store one or more objects (e.g., one or more of the objects 2220, 2270, 2330, 2370, 2440, 2470, 2720 and/or 2770) within a specified federated area (e.g., one of the federated areas 2566). As has been discussed, such a portal may employ any of a variety of protocols and/or handshake mechanisms to enable the receipt of requests for various forms of access to a federated area by other devices, as well as to exchange objects with other devices, via the network. Alternatively, at 3310, the processor may receive the one or more objects, via the network, and in a transfer associated with a synchronization relationship between a transfer area instantiated within the particular federated area and another transfer area instantiated within the other device, where the one or more objects are intended to be stored within the transfer area within the particular federated area.

At 3212, in embodiments in which the federated device(s) that provide federated area(s) also control access thereto, the processor may perform a check of whether the request is from an authorized device and/or from an authorized person or entity (e.g., scholastic, governmental or business entity) operating the other device that is an authorized user of the specified federated area, and/or has been granted a level of access that includes the authorization to make such requests. As has been discussed, the processor may require the receipt of one or more security credentials from devices from which requests are received. If, at 3212, the processor determines that the request is not from a device and/or user authorized to make such a request, then the processor may transmit an indication of denial of the request to the device via the network at 3214.

However, if at 3212, the processor determines that the request to store one or more objects within the specified federated area is authorized, then at 3220, the processor may check whether the one or more objects includes one or more data sets (e.g., one or more of the flow input data sets 2330 and/or one or more mid-flow data sets 2370). If so, then the processor may generate and assign a data object identifier for each data set that is to be stored (e.g., one or more of the data object identifiers 3331) at 3222. At 3224, the processor may store each of the one or more data sets within the specified federated area. At 3226, the processor may also store indications of aspects of the storage of each such data set (e.g., its size, whether stored as an undivided object or in a distributed manner, whether stored in distributable form (if applicable), the identity of the federated area in which it is stored and/or the identity of each device in which at least a portion of it is stored). As has been discussed, in some embodiments, such information may be stored as part of a separate data object location identifier (e.g., a data object location identifier 2332 or 2372) for each such data set.

At 3230, the processor may check whether the one or more objects includes one or more result reports (e.g., one or more of the result reports 2770). If so, then the processor may generate and assign a result report identifier for each result report that is to be stored (e.g., one or more of the result report identifiers 2771) at 3232. At 3234, the processor may store each of the one or more result reports within the specified federated area. At 3236, the processor may also store indications of aspects of the storage of each such result report. As has also been discussed in reference to result reports, in some embodiments, such information may be stored as part of a separate result report location identifier (e.g., a result report location identifier 2772) for each such result report.

At 3240, the processor may check whether the one or more objects includes one or more task routines (e.g., one or more of the task routines 2440). If so, then the processor may generate and assign a task routine identifier for each task routine that is to be stored (e.g., one or more of the task routine identifiers 2441) at 3242. At 3244, the processor may store each of the one or more task routines within the specified federated area. At 3246, the processor may additionally check whether any of the task routines stored at 3244 have the same flow task identifier as another task routine that was already stored within the specified federated area (or within any base federated area to which the specified federated area is related and/or within any intervening federated area interposed therebetween), such that there is more than one task routine executable to perform the same task. If so, then at 3248 for each newly stored task routine that shares a flow task identifier with at least one other task routine already stored in the specified federated area (or within such a base or intervening federated area), the processor may store an indication of there being multiple task routines with the same flow task identifier, along with an indication of which is the most recent of the task routines for that flow task identifier.

As has been discussed, in embodiments in which task routines are stored in a manner organized into a database or other data structure (e.g., the task routine database 2564 within one or more related federated areas) by which flow task identifiers may be employed as a mechanism to locate task routines, the storage of an indication of there being more than one task routine sharing the same flow task identifier may entail associating more than one task routine with the same flow task identifier so that a subsequent search for task routines using that flow task identifier will beget a result indicating that there is more than one. As has also been discussed, the manner in which one of multiple task routines sharing the same flow task identifier may be indicated as being the most current version may entail ordering the manner in which those task routines are listed within the database (or other data structure) to cause the most current one to be listed at a particular position within that order (e.g., listed first).

At 3250, the processor may check whether the one or more objects includes one or more macros (e.g., one or more of the macros 2470). If so, then at 3252, the processor may additionally check, for each macro, whether there is a corresponding task routine (or corresponding multiple versions of a task routine in embodiments in which a single macro may be based on multiple versions) stored within the specified federated area (or within any base federated area to which the specified federated area is related and/or within any intervening federated area interposed therebetween). If, at 3252, there are any macros requested to be stored for which there is a corresponding task routine (or corresponding multiple versions of a task routine) stored in the specified federated area (or within such a base or intervening federated area), then for each such macro, the processor may assign the job flow identifier (e.g., one or more of the job flow identifiers 2221) of the corresponding task routine (or may assign job flow identifiers of each of the versions of a task routine) at 3254. At 3256, the processor may store each of such macros.

At 3260, the processor may check whether the one or more objects includes one or more job flow definitions (e.g., one or more of the job flow definitions 2220). If so, then at 3262, the processor may additionally check, for each job flow definition, whether that job flow definition defines a job flow that uses a neural network and was trained and/or tested using objects associated with another job flow (and/or performances thereof) that is defined to by its job flow definition to not use a neural network. As previously discussed, the preservation of such links between a neuromorphic job flow and an earlier non-neuromorphic job flow from which the neuromorphic job flow may be in some way derived may be of importance to ensuring accountability during a later evaluation of the neuromorphic job flow. For this reason, it may be deemed important to ensure that objects associated with the other non-neuromorphic job flow have already been stored in federated area(s) where they can be preserved for subsequent retrieval during such an evaluation of the neuromorphic job flow.

Presuming that there are no neuromorphic job flows requested to be stored that were derived from another non-neuromorphic job flow that is not already so stored, then at 3264, the processor may additionally check, for each job flow definition, whether there is at least one task routine stored within the specified federated area (or within any base federated area to which the specified federated area is related and/or within any intervening federated area interposed therebetween) for each task specified by a flow task identifier within the job flow definition. If, at 3264, there are any job flow definitions requested to be stored for which there is at least one task routine stored in the specified federated area (or within such a base or intervening federated area) for each task, then for each of those job flow definitions where there is at least one stored task routine for each task, the processor may generate and assign a job flow identifier (e.g., one or more of the job flow identifiers 2221) at 3267, and at 3269, may then store each of the one or more job flow definitions for which there was at least one task routine for each task. Otherwise, at 3265, for each job flow for which there is no task routine stored for one or more tasks, the processor may generate a DAG (e.g., one of the DAGs 2270) that provides a visual indication of the lack of task routines for each such task, and may transmit the DAG to the other device.

At 3270, the processor may check whether the one or more objects includes one or more instance logs (e.g., one or more of the instance logs 2720). If so, then at 3272, the processor may additionally check, for each instance log, whether each object identified in the instance log by its identifier is stored within the specified federated area (or within any base federated area to which the specified federated area is related and/or within any intervening federated area interposed therebetween). If, at 3272, there are any instance logs requested to be stored for which each specified object is stored within the specified federated area (or within such a base or intervening federated area), then for each instance log where each object specified therein is so stored, the processor may generate and assign an instance log identifier (e.g., one or more of the instance log identifiers 2721) at 3275, and at 3277, may then store each of the one or more instance logs for which each specified object is so stored. Otherwise, at 3273, for each instance log for which there is an identified object that is not stored, the processor may generate a DAG that provides a visual indication of each such missing object, and may transmit the DAG to the other device.

At 3280, the processor may check whether the one or more objects includes one or DAGs. If so, then at 3282, the processor may additionally check, for each DAG, whether there is a corresponding task routine (or corresponding multiple versions of a task routine) for each task graph object (e.g., one of the task graph objects 2984) and whether there is a corresponding data object for each data graph object (e.g., each data graph object 2983 or 2987) stored within the specified federated area (or within any base federated area to which the specified federated area is related and/or within any intervening federated area interposed therebetween). If, at 3282, there are any of such DAGs to be stored in the specified federated area (or within such a base or intervening federated area) for which all of such task routines and data objects are so stored, then for each of such DAG, the processor may generate and assign a job flow identifier at 3285 in recognition of the possibility that such a DAG may be used as a new job flow definition, and at 3286, may then store each of such DAGs. Otherwise, at 3265, for each job flow for which there is no task routine stored for one or more tasks, the processor may generate a DAG (e.g., one of the DAGs 2270) that provides a visual indication of the lack of task routines for each such task, and may transmit the DAG to the other device. Otherwise, at 3283, for each DAG for which there is a task routine and/or a data object that is not stored, the processor may generate another DAG that provides a visual indication of each such missing object, and may transmit the other DAG to the other device.

Figure 27A:
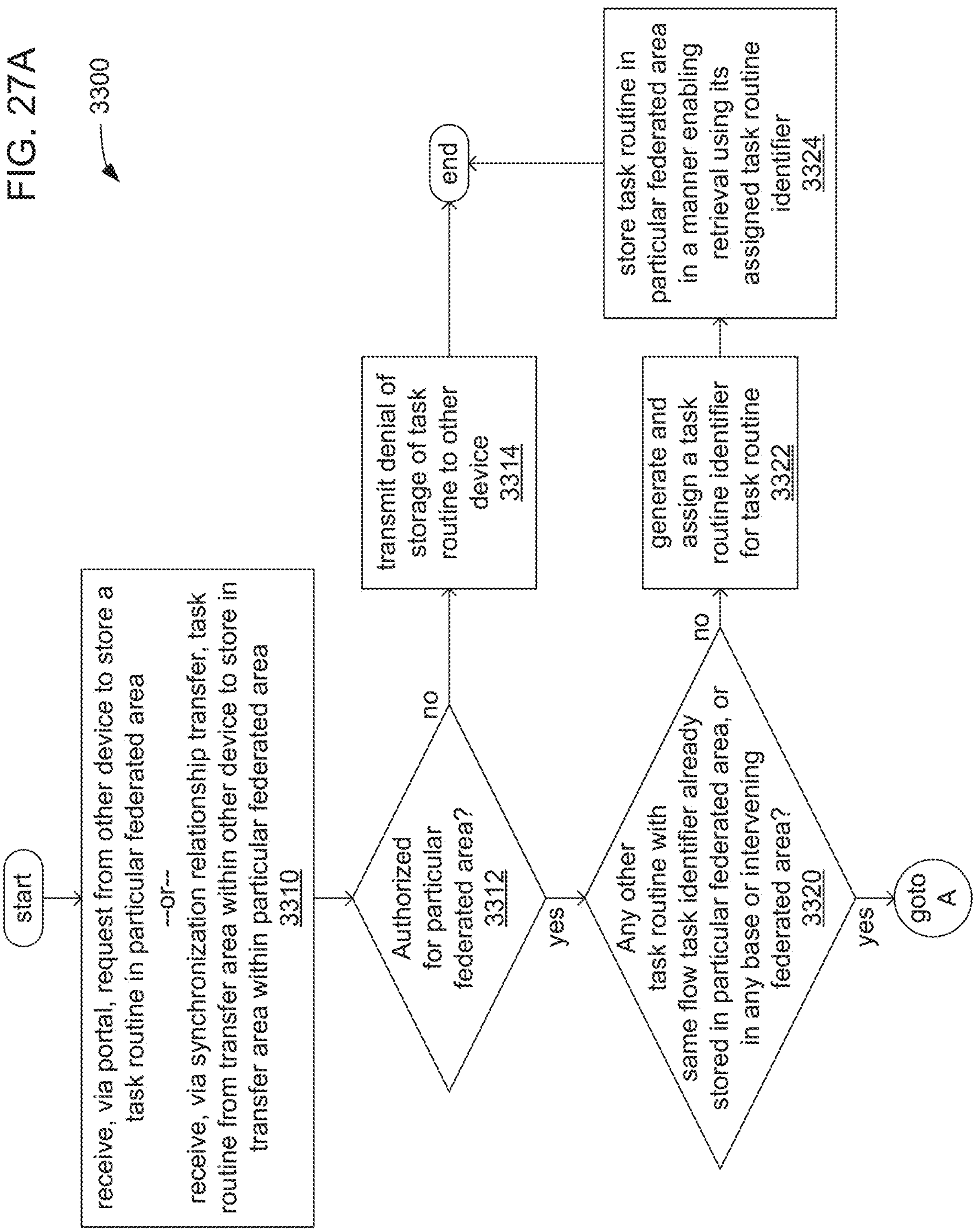
FIGS. 27A, 27B and 27C, together, illustrate an example embodiment of a logic flow of a federated device storing a task routine in a federated area FIGS. 28A, 28B and 28C, together, illustrate an example embodiment of a logic flow of a federated device storing a job flow definition in a federated area.
Figure 27B:
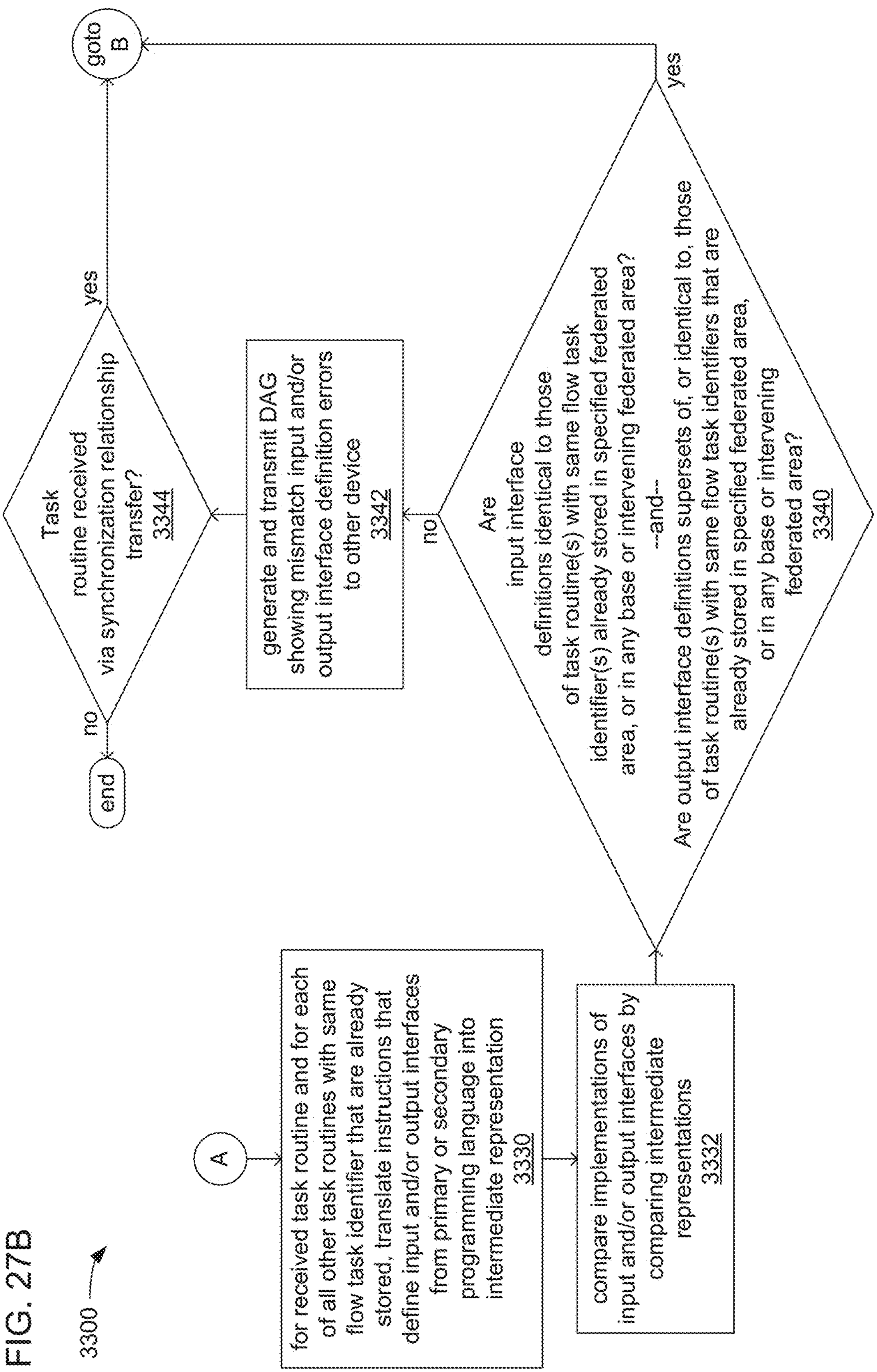
Figure 27C:
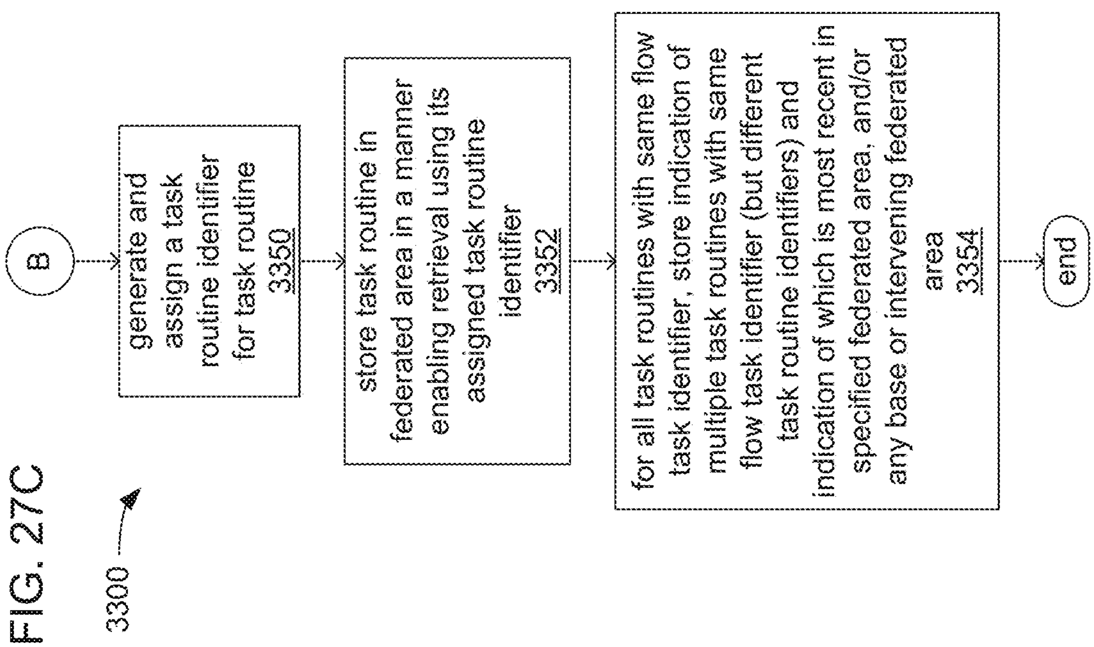

FIGS. 27A, 27B and 27C, together, illustrate an example embodiment of a logic flow 3300. The logic flow 3300 may be representative of some or all of the operations executed by one or more embodiments described herein. More specifically, the logic flow 3300 may illustrate operations performed by the processor(s) 2550 in executing the control routine 2540, and/or performed by other component(s) of at least one of the federated devices 2500.

At 3310, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to store a task routine (e.g., one of the task routines 2440) within a particular federated area specified in the request (e.g., one of the federated areas 2566). Again, such a portal may be generated by the processor to employ any of a variety of protocols and/or handshake mechanisms to enable the receipt of requests for various forms of access to the federated area by other devices, as well as to exchange objects with other devices, via the network. Alternatively, at 3310, the processor may receive the task routine, via the network, and in a transfer associated with a synchronization relationship between a transfer area instantiated within the particular federated area and another transfer area instantiated within the other device, where the task routine is intended to be stored within the transfer area within the particular federated area.

At 3312, in embodiments in which the federated device(s) that provide federated area(s) also control access thereto, the processor may perform a check of whether the request or synchronization relationship transfer is from an authorized device and/or from an authorized person or entity (e.g., scholastic, governmental or business entity) operating the device that is an authorized user of the specified federated area. As has been discussed, the processor may require the receipt of one or more security credentials from devices from which requests are received and/or with which transfers of objects associated with synchronization relationships are performed. If, at 3312, the processor determines that there is no such authorization, then the processor may transmit an indication of denial of the storage of the task routine to the other device via the network at 3314.

However, if at 3312, the processor determines that there is such authorization, then at 3320, the processor may check whether the task routine has the same flow task identifier as any of the task routines already stored within the particular federated area (or within any base federated area to which the specified federated area is related and/or within any intervening federated area interposed therebetween), such that there is already stored one or more other task routines executable to perform the same task. If not at 3320, then the processor may generate and assign a task routine identifier for the task routine (e.g., one of the task routine identifiers 2441) at 3322. At 3324, the processor may store the task routine within the particular federated area in a manner that enables later retrieval of the task routine by either its identifier or by the flow task identifier of the task that it performs.

However, if at 3320, there is at least one other task routine with the same flow task identifier already stored within the particular federated area (or within such a base or intervening federated area), then at 3330, the processor may translate the portions of executable instructions within each of these task routines that implement the input and/or output interfaces to generate intermediate representation(s) of the input and/or output interfaces for each of these task routines. As has been discussed, it may be that different ones of these task routines are written in different programming languages, which may make direct comparisons of implementations of input and/or output interfaces relatively difficult, and it may be that the intermediate representations generated for each include executable instructions generated in an intermediate programming language to better facilitate such direct comparisons. Alternatively or additionally, the intermediate representations may include a data structure of various values for various parameters of input and/or output interfaces that better enable such direct comparisons. At 3332, the processor may perform such comparisons using the intermediate representations.

Based on the results of those comparisons, the processor may check at 3340: 1) whether the input interfaces (e.g., data interfaces 2443 that receive data from data objects, and/or task interfaces 2444 that receive parameters from another task routine) are implemented in the task routine in a manner that is identical to those of the one or more other task routines with the same flow task identifier that are already so stored, and 2) whether the output interfaces (e.g., data interfaces 2443 that output a data object, and/or task interfaces 2444 that output parameters to another task routine) are implemented in the task routine in a manner that is either identical to or a superset of those of the one or more task routines with the same flow task identifier that are already stored within the federated area (or within such a base or intervening federated area). If at 3340, the input interfaces are identical, and each of the output interfaces of the task routine is identical to or a superset of the corresponding output interface within the one or more other task routine(s) already stored within the federated area (or within such a base or intervening federated area), then the processor may generate and assign a task routine identifier for the task routine at 3350. At 3352, the processor may store the task routine within the specified federated area in a manner that enables later retrieval of the task routine by either its identifier or by the flow task identifier of the task that it performs. At 3354, the processor may also store an indication of there being multiple task routines with the same flow task identifier, along with an indication of which is the most recent of the task routines for that flow task identifier.

However, if at 3340, the input interfaces are not identical, or the output interface(s) of the task routine are neither identical nor a superset, then at 3342, the processor may generate a DAG (e.g., one of the DAGs 2270) that provides a visual indication of the mismatch, and may transmit the DAG to the other device. If, at 3344, the task routine was received in a transfer from the other device as a result of a synchronization relationship, then the processor may proceed with the assignment of a task routine identifier at 3350, followed by storage of the task routine, etc. As has been discussed, proceeding with the storage of the task routine in spite of such a mismatch in implementations of input and/or output interfaces may be deemed desirable as it results in the synchronization relationship between the two transfer areas being maintained such that the contents of the two transfer areas are caused to be synchronized with each other. It may be deemed sufficient that the DAG providing a visualization of the details of the mismatch is generated and provided to the other device as a mechanism to notify the developer(s) who created the task routine so that they are able to correct it.

Figure 28A:
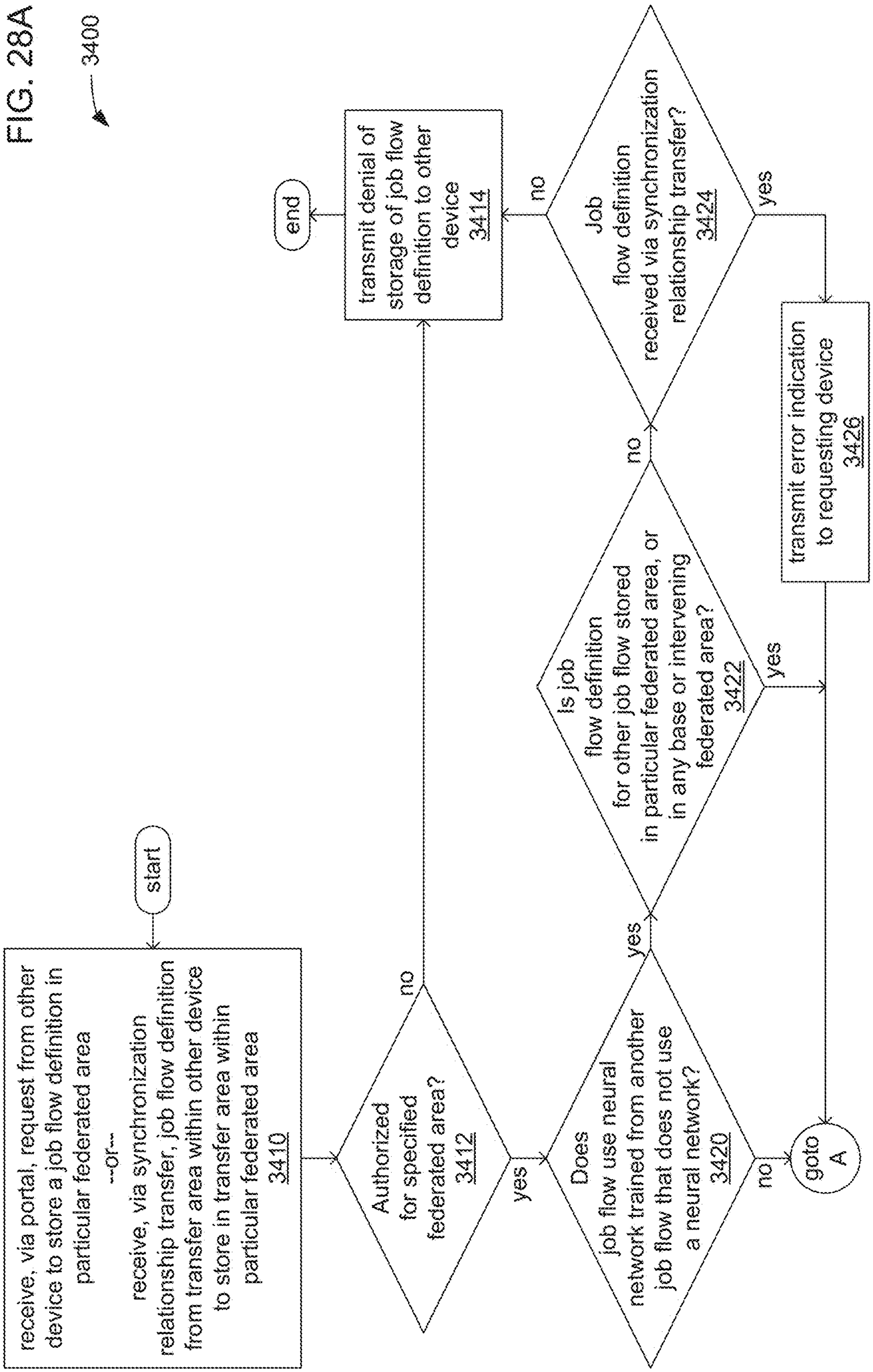
Figure 28B:
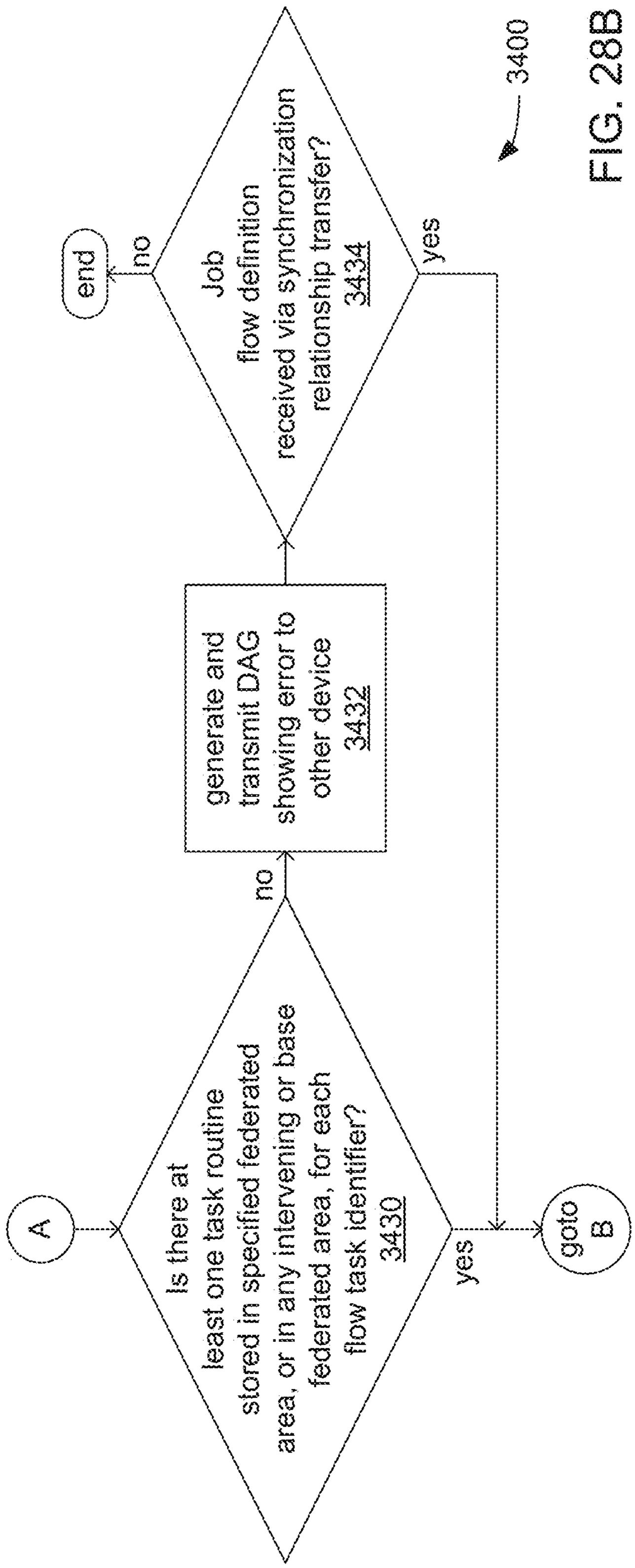
Figure 28C:
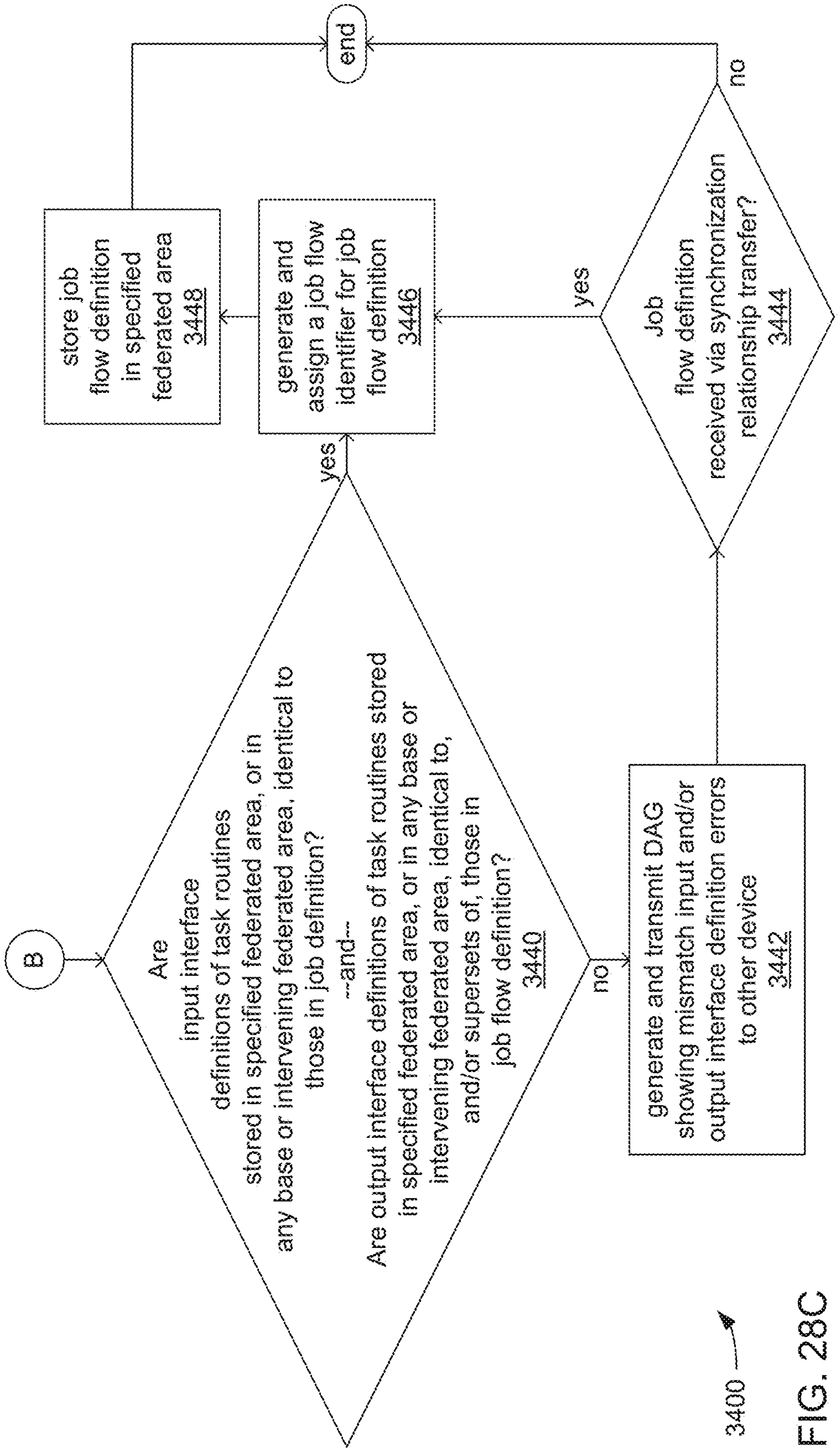
Figure 29A:
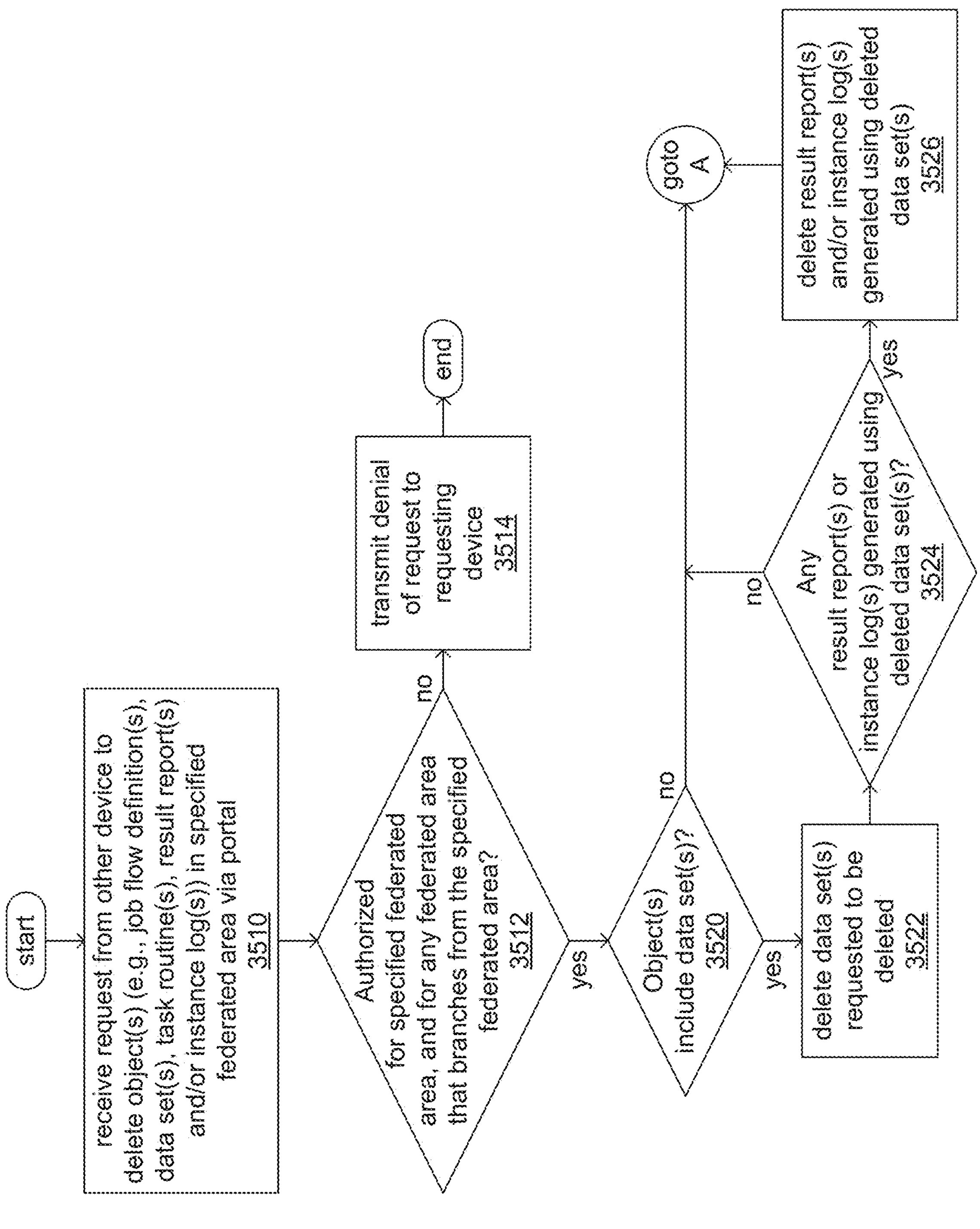
FIGS. 29A, 29B, 29C and 29D, together, illustrate an example embodiment of a logic flow of a federated device deleting objects stored within a federated area.
Figure 29B:
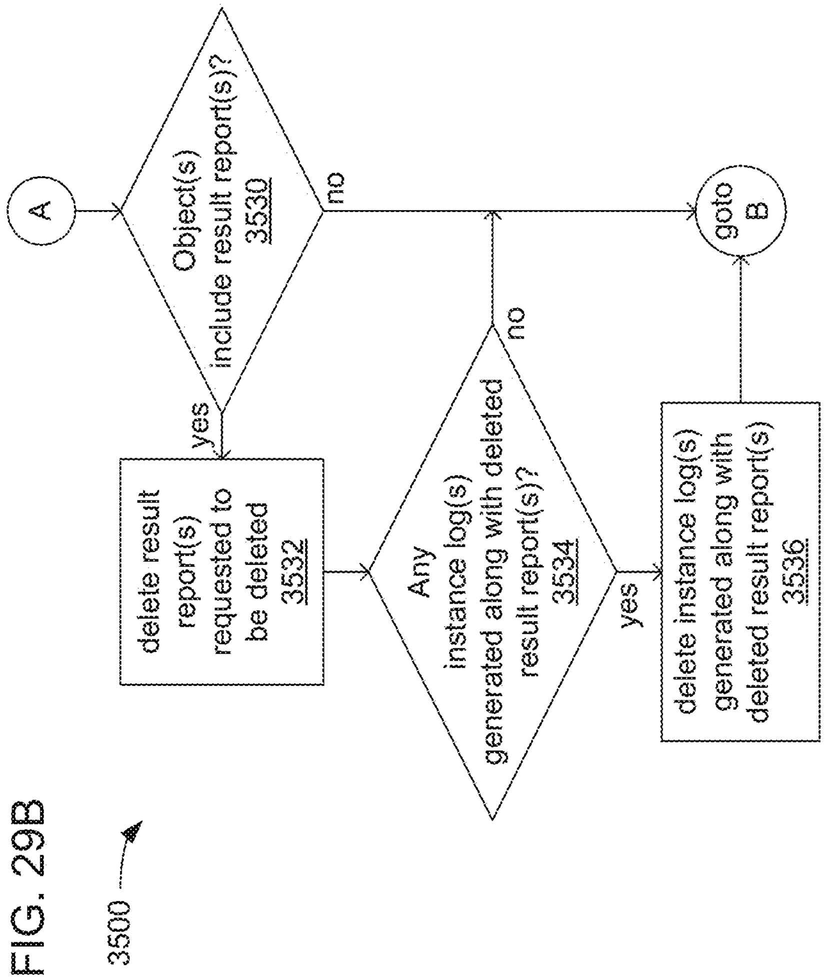
Figure 29C:
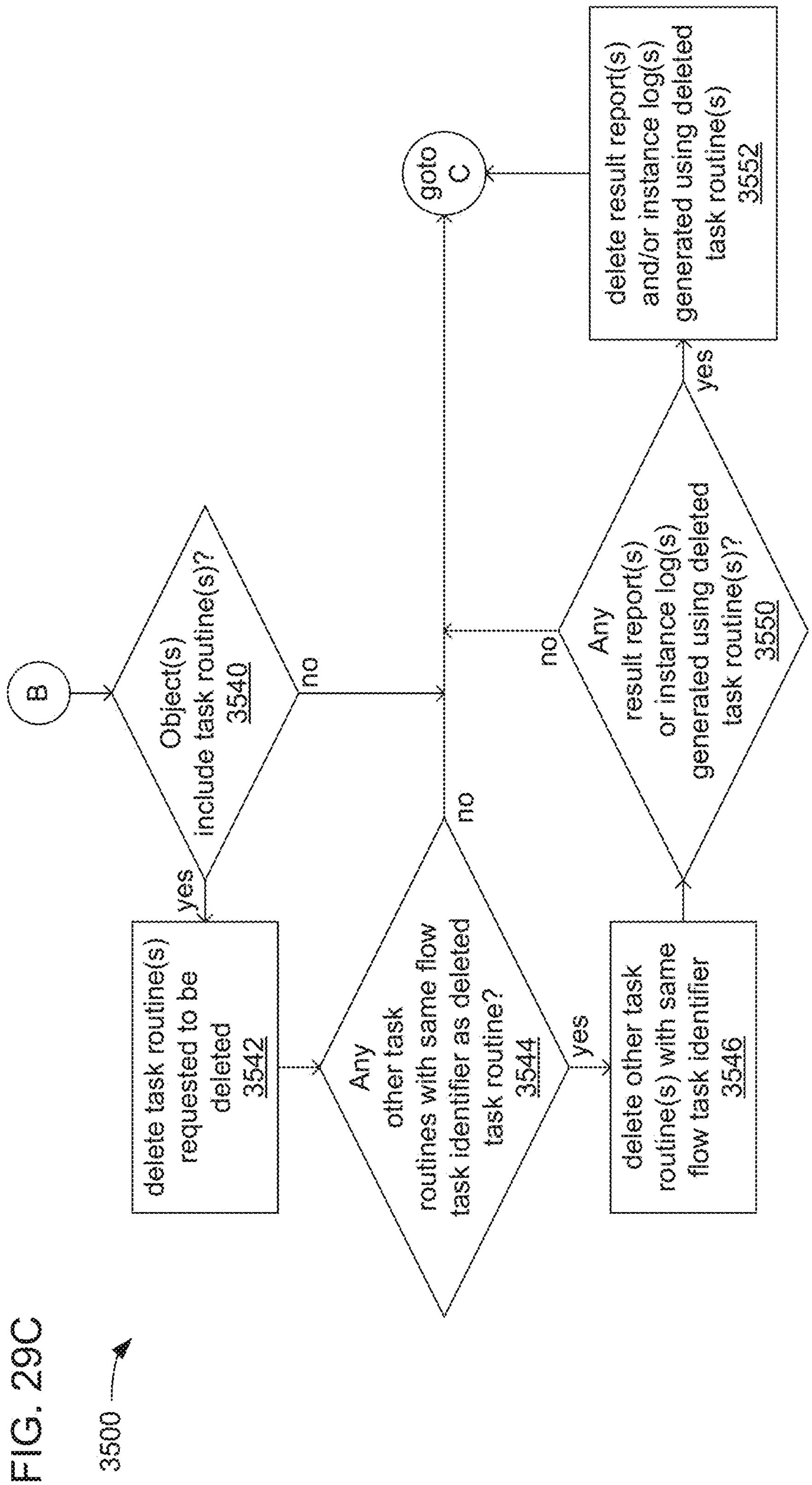
Figure 29D:
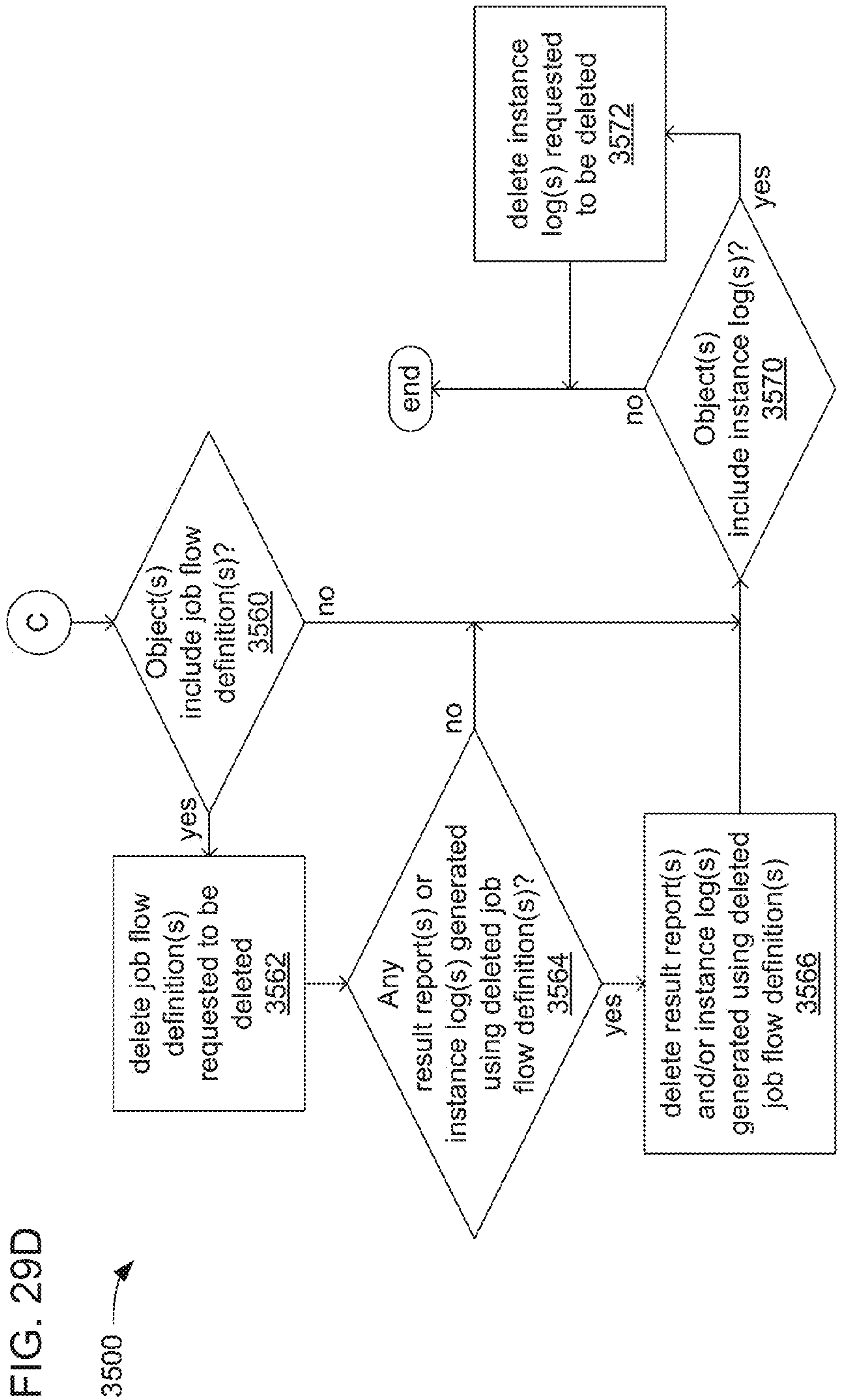

FIGS. 28A, 28B and 28C, together, illustrate an example embodiment of a logic flow 3400. The logic flow 3400 may be representative of some or all of the operations executed by one or more embodiments described herein. More specifically, the logic flow 3400 may illustrate operations performed by the processor(s) 2550 in executing the control routine 2540, and/or performed by other component(s) of at least one of the federated devices 2500.

At 3410, a processor of a federated device of a distributed processing system (e.g., at least one processor 2550 of one of the federated devices 2500 of the distributed processing system 2000) may receive a request from another device, via a network (e.g., one of the source devices 2100, or one of the reviewing devices 2800, via the network 2999) and through a portal provided by the processor for access to other devices via the network, to store a job flow definition (e.g., one of the job flow definitions 2220) within a particular federated area specified within the request (e.g., one of the federated areas 2566). Alternatively, at 3410, the processor may receive the job flow definition, via the network, and in a transfer associated with a synchronization relationship between a transfer area instantiated within the particular federated area and another transfer area instantiated within the other device, where the job flow definition is intended to be stored within the transfer area within the particular federated area.

At 3412, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 3412, the processor determines that the request is not from a device and/or user authorized to make such a request, then the processor may transmit an indication of denial of the storage of the job flow definition to the device via the network at 3414.

However, if at 3412, the processor determines that the request to store a job flow definition within the specified federated area is authorized, then at 3420, the processor may check whether the job flow of the job flow definition uses a neural network that was trained based on another job flow that does not use a neural network. If, at 3420, the processor determines that the job flow of the job flow definition does not use a neural network, or if at 3422, the processor determines that the other job flow definition is stored in the particular federated area (or within any base federated area to which the particular federated area is related and/or within any intervening federated area interposed therebetween), then at 3430, the processor may check whether there is at least one task routine stored within the federated area (or within any such base or such intervening federated area) for each task specified by a flow task identifier within the job flow definition.

However, if at 3420, the processor determines that the job flow of the job flow definition does use a neural network, and if at 3422, the other job flow definition is not so stored, then at 3424, the processor may check whether the job flow definition was received in a transfer from the other device as a result of a synchronization relationship. If not then, the processor may transmit an indication of denial of the storage of the job flow definition to the other device via the network at 3414. Otherwise, the processor may transmit an indication of an error arising from the other job flow definition not being so stored at 3426, before proceeding to the check made at 3430.

If, at 3430, there is at one task routine stored in the particular federated area (or within any base federated area to which the particular federated area is related and/or within any intervening federated area interposed therebetween) for each of the tasks specified by the job flow, then the processor may proceed to another check made at 3440. However, if at 3430, there are no task routines stored within the federated area (or within such a base or intervening federated area) for one or more of the tasks specified by the job flow, then at 3432, the processor may generate a DAG that provides a visual depiction of the lack of task routines for one or more tasks, and may transmit it to the other device. Then, if at 3434, the job flow definition was received in a transfer from the other device as a result of a synchronization relationship, the processor may proceed to the check made at 3440.

At 3440, the processor may check: 1) whether the input interfaces (e.g., data interfaces 2443 that receive data from data objects, and/or task interfaces 2444 that receive parameters from another task routine) that are implemented in the task routines stored in the federated area (or within such a base or intervening federated area) are identical to those specified in the job flow definition at 3440, and 2) whether the output interfaces (e.g., data interfaces 2443 that output a data object, and/or task interfaces 2444 that output parameters to another task routine) that are implemented in the task routines that are already stored within the federated area (or within such a base or intervening federated area) are identical to or are supersets of those specified in the job flow definition.

If at 3440, the input interfaces are identical, and if all of the output interfaces of all of the task routines already so stored are either identical to and/or are supersets of corresponding output interfaces specified in the job flow definitions, then the processor may generate and assign a job flow identifier for the job flow definition at 3446, and at 3448, may store the job flow definition within the particular federated area in a manner that enables later retrieval of the job flow by its identifier.

However, if at 3340, the input interfaces are not identical, or if an output interface of one or more of the task routines already so stored is neither identical nor a superset of a corresponding output interface specified in the job flow definition, then at 3442, the processor may generate a DAG that provides a visual indication of the mismatch, and may transmit it to the other device via the network. If, at 3444, the job flow definition was received in a transfer from the other device as a result of a synchronization relationship, the processor may proceed to the generation and transmission of a DAG at 3446.

FIGS. 29A, 29B, 29C and 29D, together, illustrate an example embodiment of a logic flow 3500. The logic flow 3500 may be representative of some or all of the operations executed by one or more embodiments described herein. More specifically, the logic flow 3500 may illustrate operations performed by the processor(s) 2550 in executing the control routine 2540, and/or performed by other component(s) of at least one of the federated devices 2500.

At 3510, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor, to delete one or more objects (e.g., one or more of the objects 2220, 2330, 2370, 2440, 2720 and/or 2770) within a particular federated area specified in the request (e.g., one of the federated areas 2566).

At 3512, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, as well as any federated area that may branch from the specified federated area, and/or has been granted a level of access that includes the authorization to make such requests. As has been discussed, the processor may require the receipt of one or more security credentials from devices from which requests are received. If, at 3512, the processor determines that the request is not from a device and/or user authorized to make such a request, then the processor may transmit an indication of denial of the request to the device via the network at 3514.

However, if at 3512, the processor determines that the request to delete one or more objects within the specified federated area is authorized, then at 3520, the processor may check whether the one or more objects includes one or more data sets (e.g., one or more of the data sets 2330 or 2370). If so, then the processor may delete the one or more data sets from the specified federated area at 3522. At 3524, the processor may additionally check whether there are any result reports or instance logs stored in the specified federated area (or within any federated area that branches from the specified federated area) that were generated in a past performance of a job flow in which any of the one or more deleted data sets were used. If so, then at 3526, the processor may delete such result report(s) and/or instance log(s) from the specified federated area and/or from one or more other federated areas that branch from the specified federated area.

As previously discussed, it may be deemed desirable for reasons of maintaining repeatability to avoid a situation in which there is an instance log that specifies one or more objects, such as data sets, as being associated with a performance of a job flow where the one or more objects are not present within any accessible federated area such that the performance of the job flow cannot be repeated. It is for this reason that the deletion of a data set from the specified federated area is only to be performed if a check can be made within federated areas that branch from the specified federated area for such objects as instance logs and/or result reports that have such a dependency on the data set to be deleted. And, it is for this reason that a request for such a deletion may not be deemed to be authorized unless received from a device and/or user that has authorization to access all of the federated areas that branch from the specified federated area.

At 3530, the processor may check whether the one or more objects includes one or more result reports (e.g., one or more of the result reports 2770). If so, then the processor may delete the one or more result reports from the specified federated area at 3532. At 3534, the processor may additionally check whether there are any instance logs stored in the specified federated area (or within any federated area that branches from the specified federated area) that were generated in a past performance of a job flow in which any of the one or more deleted result reports were generated. If so, then at 3536, the processor may delete such instance log(s) from the federated area and/or from the one or more other federated areas that branch from the specified federated area.

At 3540, the processor may check whether the one or more objects includes one or more task routines (e.g., one or more of the task routines 2440). If so, then the processor may delete the one or more task routines from the specified federated area at 3542. At 3544, the processor may additionally check whether there are any other task routines stored in the specified federated area (or within a federated area that branches from the specified federated area) that share the same flow task identifier(s) as any of the deleted task routines. If so, then at 3546, the processor may delete such task routine(s) from the specified federated area and/or from the one or more other federated areas that branch from the specified federated area. At 3550, the processor may additionally check whether there are any result reports or instance logs stored in the specified federated area (or within a federated area that branches from the specified federated area) that were generated in a past performance of a job flow in which any of the one or more deleted task routines were used. If so, then at 3552, the processor may delete such result report(s) and/or instance log(s) from the specified federated area and/or from the one or more other federated areas that branch from the specified federated area.

At 3560, the processor may check whether the one or more objects includes one or more job flow definitions (e.g., one or more of the job flow definitions 2220). If so, then at 3562, the processor may delete the one or more job flow definitions within the specified federated area. At 3564, the processor may additionally check whether there are any result reports or instance logs stored in the specified federated area (or within a federated area that branches from the specified federated area) that were generated in a past performance of a job flow defined by any of the one or more deleted job flow definitions. If so, then at 3566, the processor may delete such result report(s) and/or instance log(s) from the federated area and/or from the one or more other federated areas that branch from the specified federated area.

At 3570, the processor may check whether the one or more objects includes one or more instance logs (e.g., one or more of the instance logs 2720). If so, then at 3572, the processor may delete the one or more instance logs from the specified federated area.

Figure 30A:
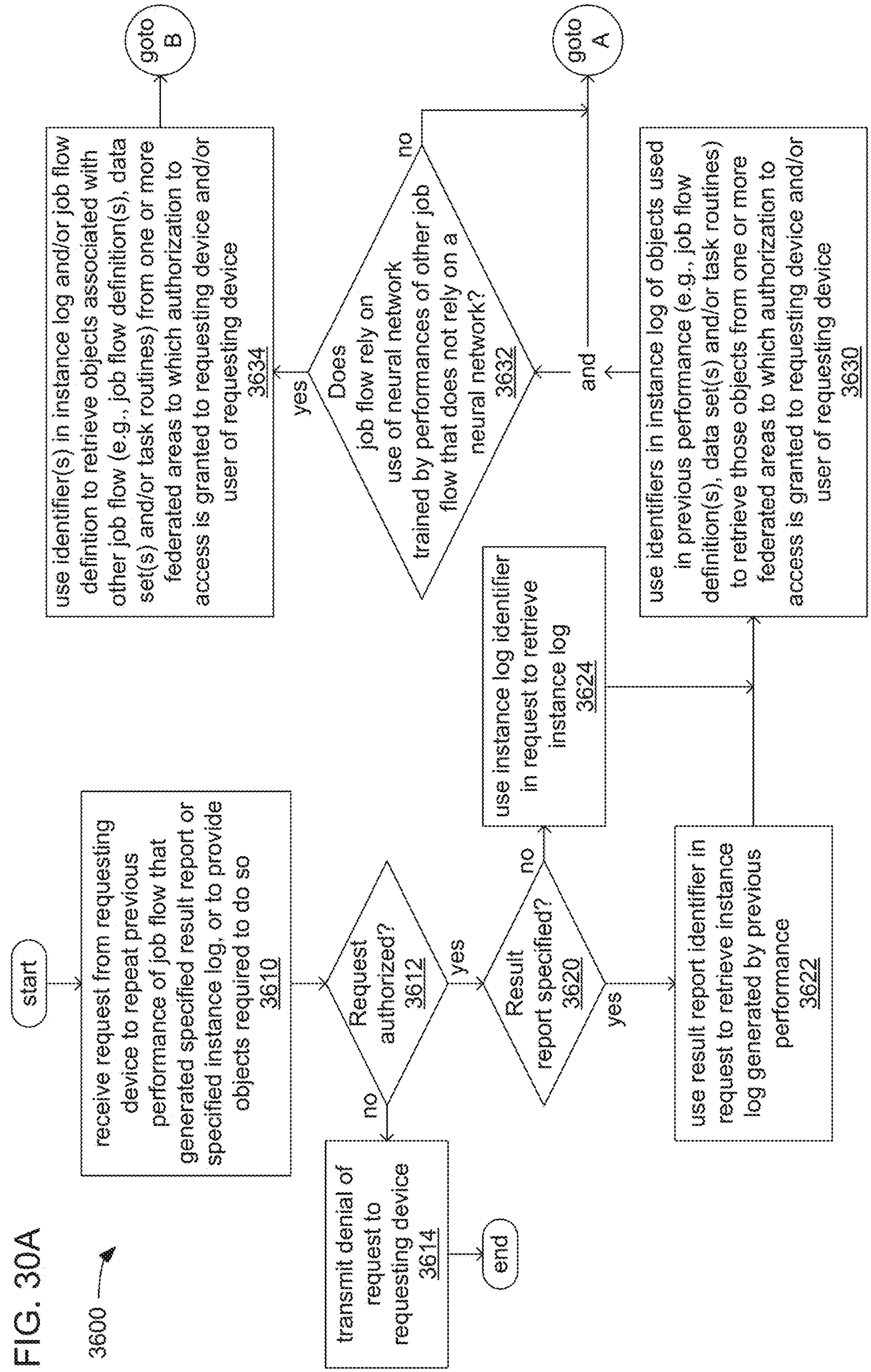
FIGS. 30A and 30B, together, illustrate an example embodiment of a logic flow of a federated device either repeating an earlier performance of a job flow that generated a specified result report or instance log, or transmitting objects to enable a requesting device to do so.
Figure 30B:
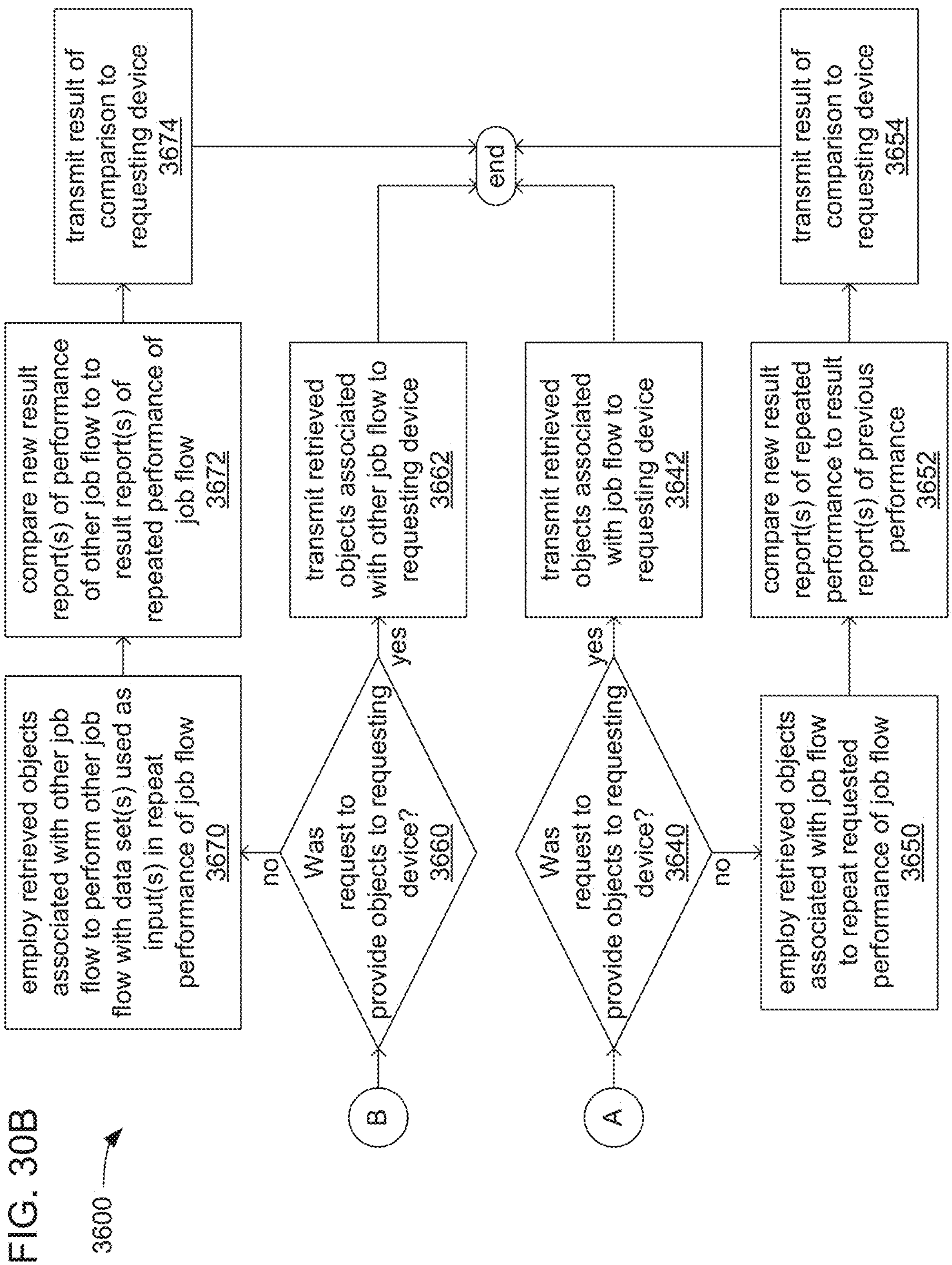

FIGS. 30A and 30B, together, illustrate an example embodiment of a logic flow 3600. The logic flow 3600 may be representative of some or all of the operations executed by one or more embodiments described herein. More specifically, the logic flow 3600 may illustrate operations performed by the processor(s) 2550 in executing the control routine 2540, and/or performed by other component(s) of at least one of the federated devices 2500.

At 3610, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to repeat a previous performance of a job flow that generated either a result report or an instance log (e.g., one of the result reports 2770 or one of the instance logs 2720) specified in the request (e.g., with a result report identifier 2771 or an instance log identifier 2721), or to provide the requesting device with the objects (e.g., one or more of the objects 2220, 2330, 2370, 2440, 2720 and/or 2770) needed to enable the requesting device to do so. As previously discussed, persons and/or entities involved in peer reviewing and/or other forms of review of analyses may operate a device to make a request for one or more federated devices to repeat a performance of a job flow to verify an earlier performance, or may make a request for the objects needed to allow the persons and/or entities to independently repeat the performance.

At 3612, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3612, the processor determines that the request is not from a device and/or user authorized to make such a request, then the processor may transmit an indication of denial of the request to the requesting device via the network at 3614.

However, if at 3612, the processor determines that the request is authorized, then at 3620, if the a result report was specified for the previous performance in the request, instead of the instance log, then at 3622, the processor may the use the result report identifier provided in the request for the result report to retrieve the instance log for the previous performance. Alternatively, if the instance log was specified for the previous performance in the request, then at 3624, the processor may use the instance log identifier provided in the request to retrieve the instance log for the previous performance.

At 3630, regardless of the exact manner in which the instance log is retrieved, the processor may use the identifiers specified in the instance log for the objects associated with the previous performance to retrieve each of those objects. It should be noted that, as has been previously discussed, searches for objects to fulfill such a request received from a particular requesting device may be limited to the one or more federated areas to which that particular requesting device and/or a user operating the requesting device has been granted access (e.g., a particular private or intervening federated area, as well as any base federated area and/or any other intervening federated area interposed therebetween). Therefore, the retrieval of objects used in the previous performance, and therefore, needed again to independently regenerate the result report, may necessarily be limited to such authorized federated area(s).

At 3632, the processor may check whether the job flow relies on the use of a neural network that was trained using one or more performances of another job flow that does not relay on the use of a neural network. If so, then at 3634, the processor may use an identifier in either of the job flow definition or instance log retrieved for the previous performance that provides a link to the job flow definition or instance log of the other job flow to retrieve objects associated with the other job flow and/or one or more performances of the other job flow.

Regardless of whether the job flow of the previous performance referred to in the request relies on the use of a neural network, if, at 3640, the request was to provide the objects needed to enable an independent repeat of the previous performance of the job flow referred to in the request, then at 3642, the processor may transmit the retrieved objects associated with that previous performance to the requesting device to so enable such an independent repeat performance. As previously discussed, the regenerated result report may be compared at the requesting device to the result report that was previously generated during the previous performance to verify one or more aspects of the previous performance. However, if at 3640, the request received was not to so provide the retrieved objects, but instead, was for one or more federated devices to repeat the previous performance of the job flow, then at 3650, the processor may employ the objects retrieved at 3630 to repeat the previous performance, and thereby regenerate the result report. As previously discussed, in some embodiments, including embodiments in which one or more of the data sets associated with the previous performance is relatively large in size, the processor of the federated device may cooperate with the processors of multiple other federated devices (e.g., operate as the federated device grid 1005) to portions of the repeat performance among multiple federate devices to be carried out at least partially in parallel. At 3652, the processor may compare the regenerated result report to the result report previously generated in the previous performance of the job flow. The processor may then transmit the results of that comparison to the requesting device at 3654.

However, if, at 3632, the job flow of the previous performance referred to in the request does rely on the use of a neural network, then, in addition to retrieving objects associated with the other job flow at 3634, the processor may check at 3660 whether the request was to provide the objects needed to enable an independent repeat of the previous performance. If so, then at 3662, the processor may transmit the retrieved objects associated with that other job flow to the requesting device to enable aspects of the other job flow and/or one or more performances thereof to also be evaluated. However, if at 3660, the request received was not to so provide the retrieved objects, but instead, was for one or more federated devices to repeat the previous performance of the job flow, then at 3670, the processor may employ the objects retrieved at 3634 to perform the other job flow, and do so with the data set(s) associated with the previous performance of the job flow referred to in the request. At 3672, the processor may compare the result report(s) generated by the performance of the other job flow to the corresponding result reports regenerated from the repetition at 3650 of the previous performance of the job flow referred to in the request. The processor may then transmit the results of that comparison to the requesting device at 3674.

Figure 31A:
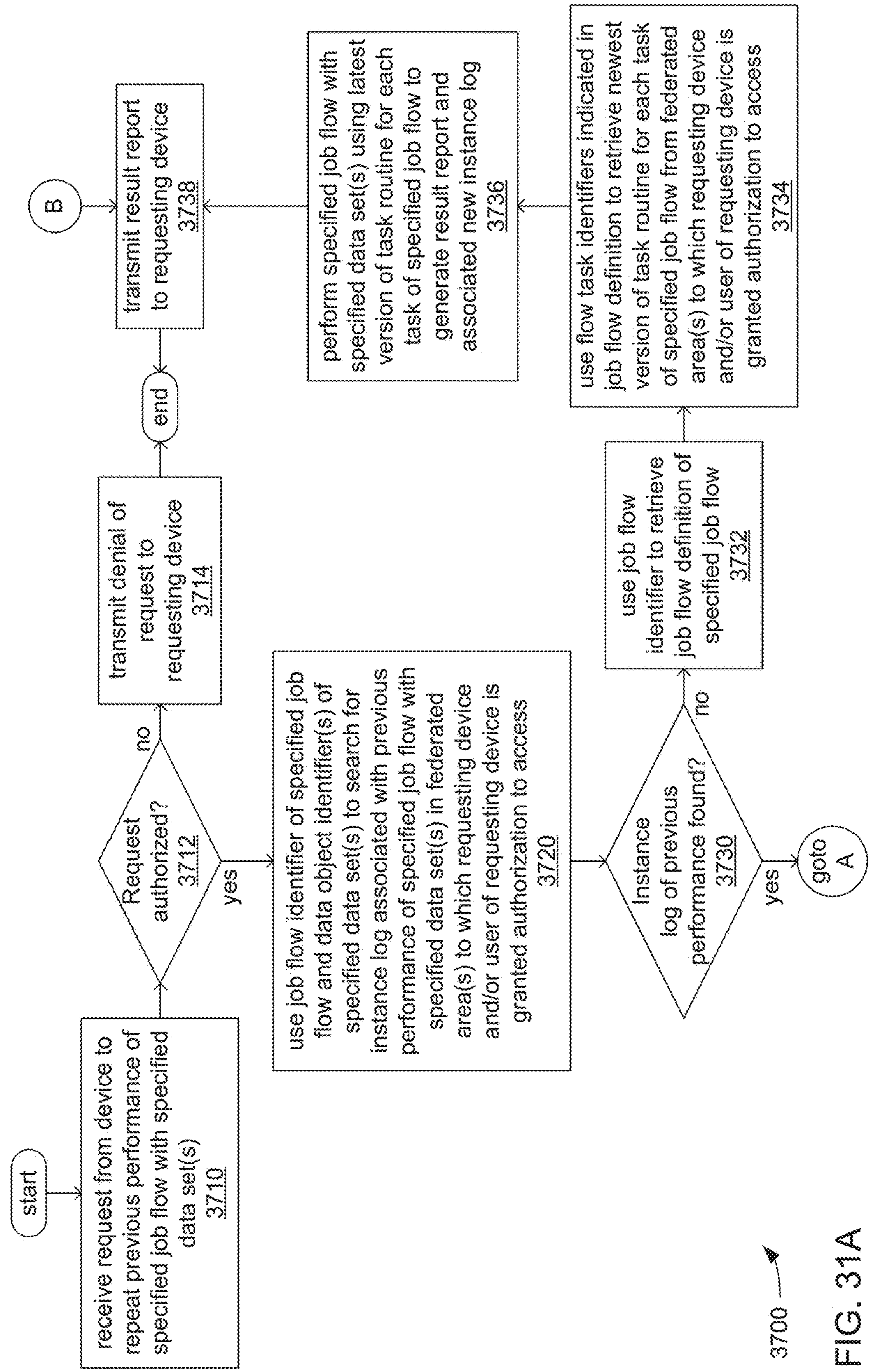
FIGS. 31A and 31B, together, illustrate another example embodiment of a logic flow of a federated device repeating an earlier performance of a job flow.
Figure 31B:
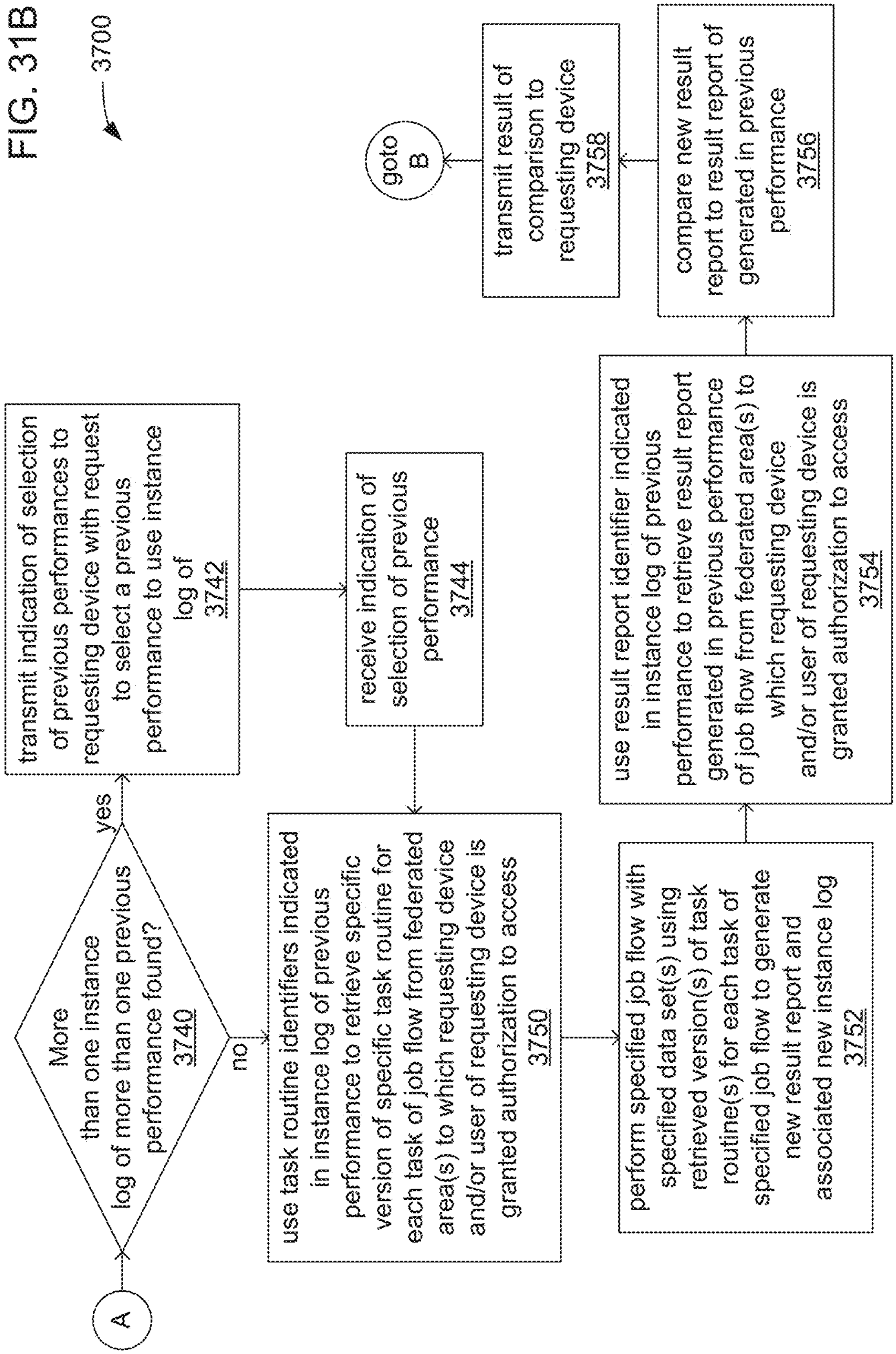
Figure 32A:
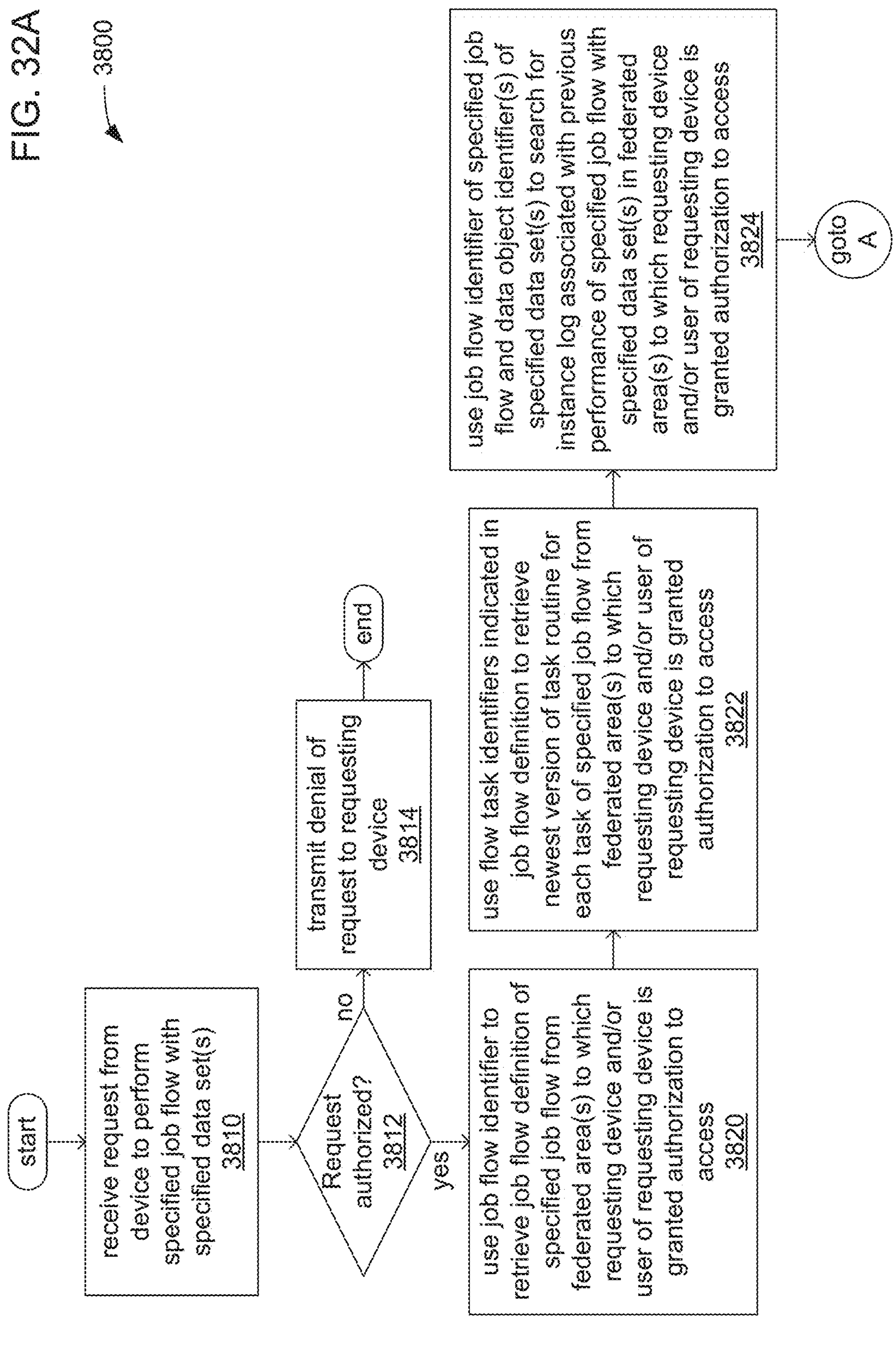
FIGS. 32A, 32B, 32C and 32D, together, illustrate an example embodiment of a logic flow of a federated device performing a job flow.
Figure 32B:
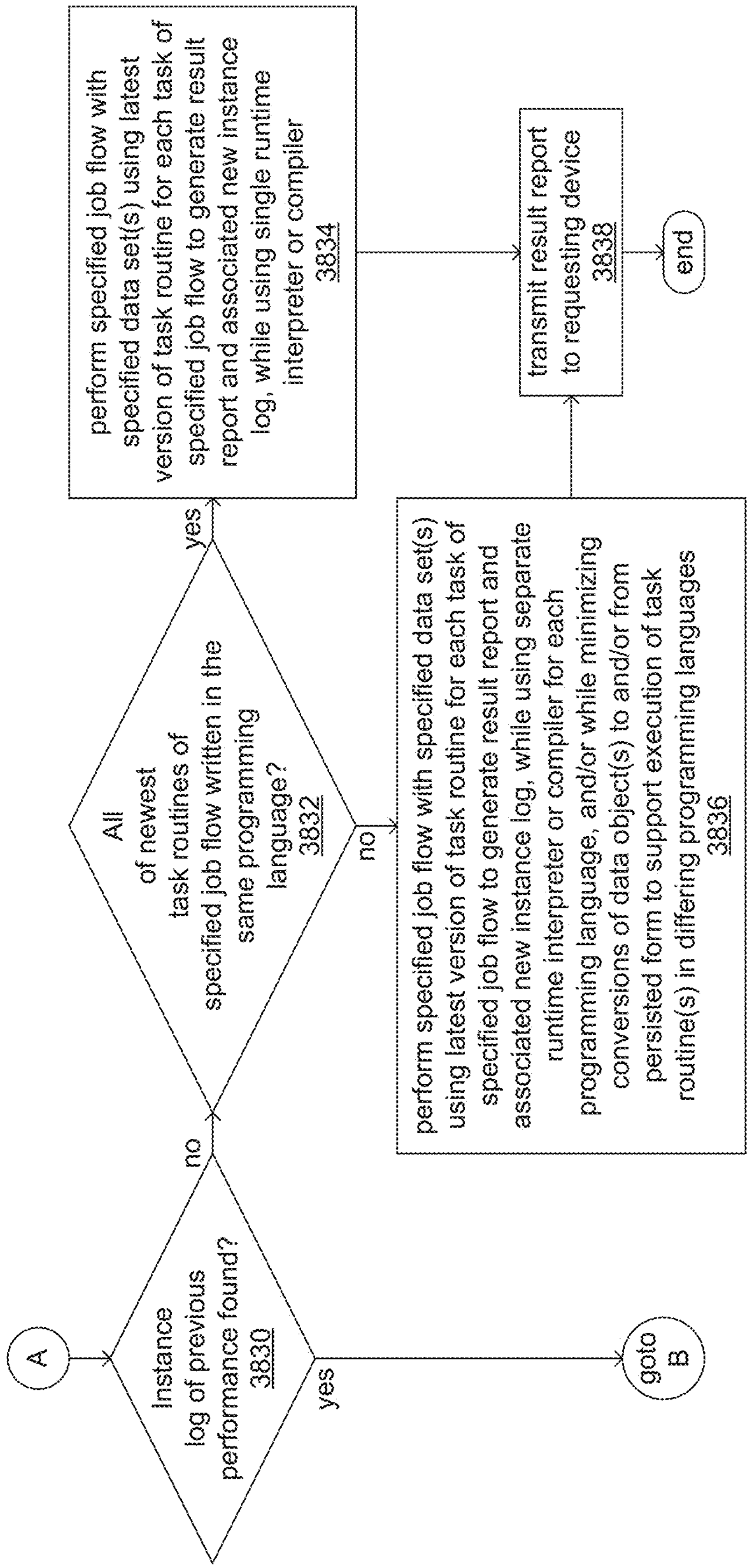
Figure 32C:
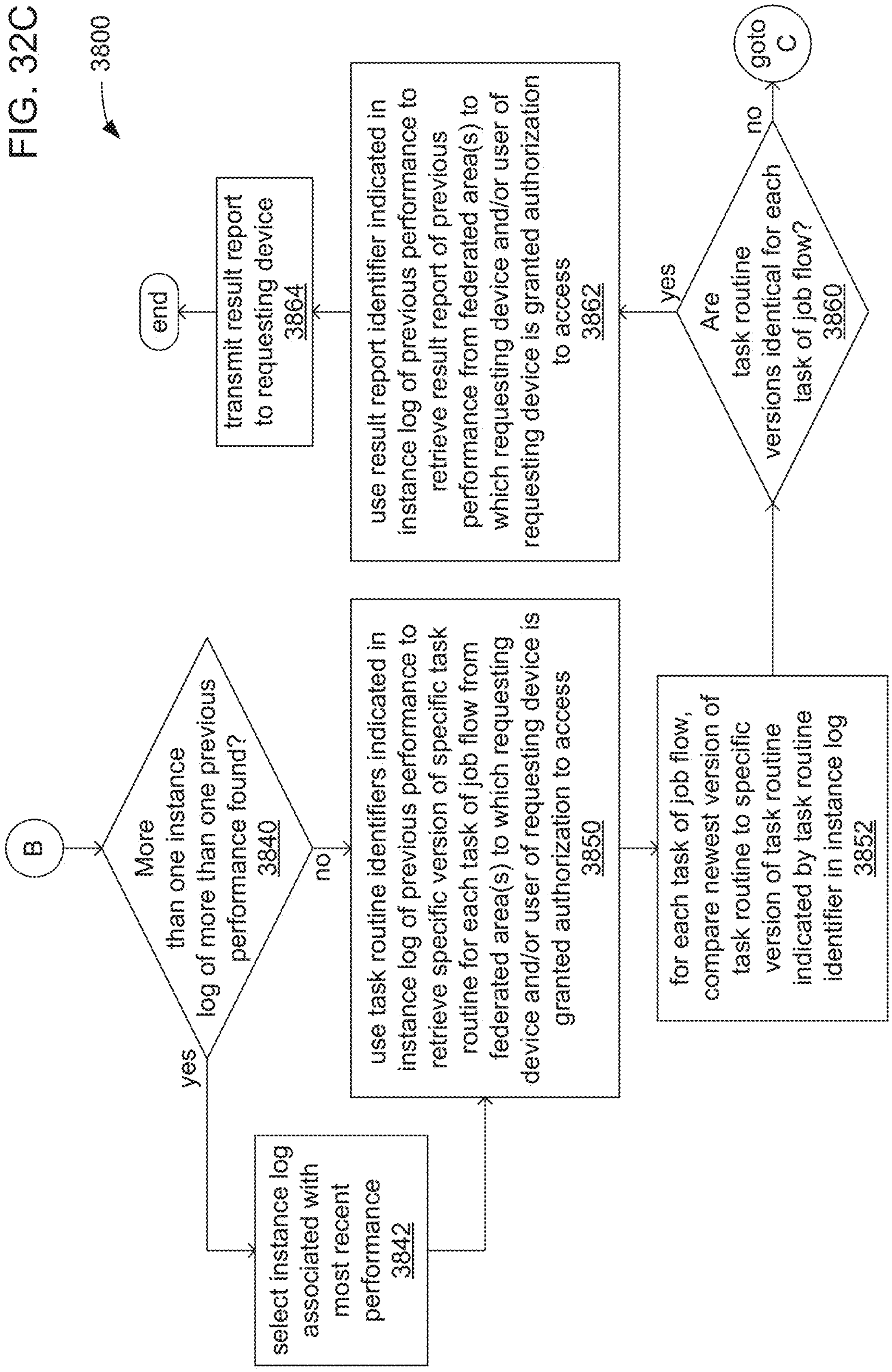
Figure 32D:
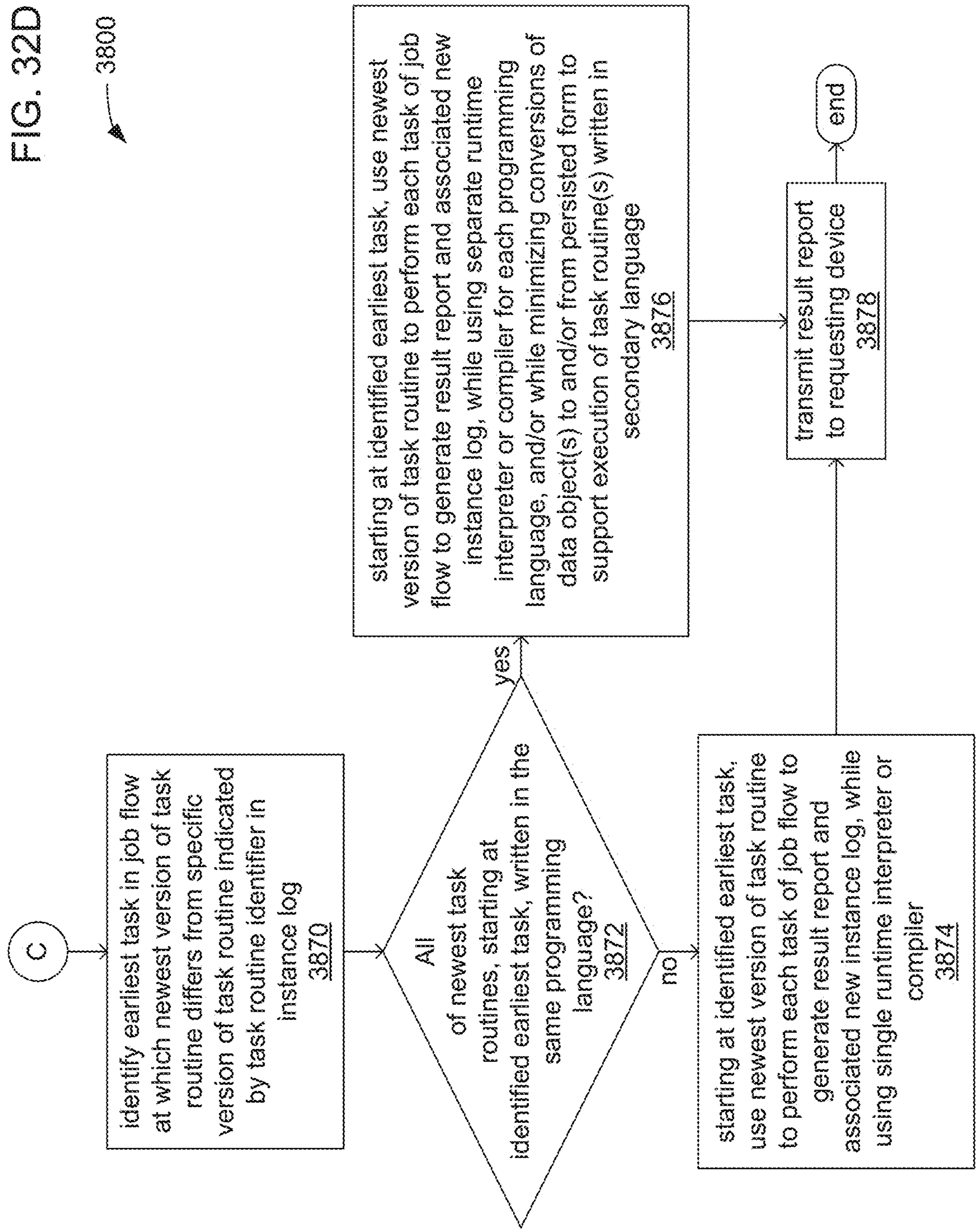

FIGS. 31A and 31B, together, illustrate an example embodiment of a logic flow 3700. The logic flow 3700 may be representative of some or all of the operations executed by one or more embodiments described herein. More specifically, the logic flow 3700 may illustrate operations performed by the processor(s) 2550 in executing the control routine 2540, and/or performed by other component(s) of at least one of the federated devices 2500.

At 3710, a processor of a federated device of a distributed processing system (e.g., at least one processor 2550 of one of the federated devices 2500 of the distributed processing system 2000) may receive a request from a requesting device, via a network (e.g., one of the reviewing devices 2800 via the network 2999) and through a portal provided by the processor, to repeat a previous performance a job flow with one or more data sets (e.g. one or more of the flow input data sets 2330) specified in the request by a job flow identifier and one or more data object identifiers (e.g., one of the job flow identifiers 2221, and one or more of the data object identifiers 2331). As previously discussed, persons and/or entities involved either in consuming results of analyses or in reviewing past performances of analyses may operate a device to make a request for one or more federated devices to repeat a performance of a job flow.

At 3712, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3712, the processor determines that the request is not from a device and/or user authorized to make such a request, then the processor may transmit an indication of denial of the request to the device via the network at 3714.

However, if at 3712, the processor determines that the request for a repeat of a performance of the specified job flow with the specified one or more data sets is authorized, then at 3720, the processor may the use the combination of the job flow identifier and the one or more data object identifiers to search within one or more federated areas to which the requesting device and/or a user of the requesting device has been granted access for an instance log associated with a previous performance of the job flow with the one or more data sets.

It should be noted that, as has been previously discussed, searches for objects to fulfill such a request received from a requesting device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to repeat a previous performance of a job flow may necessarily be limited to such authorized federated area(s).

If, at 3730, the processor determines, as a result of the search at 3720, that there is no such instance log, then at 3732, the processor may retrieve the job flow definition specified by the job flow identifier provided in the request (e.g., one of the job flow definitions 2220) from the one or more federated areas for which authorization to access has been granted to the requesting device and/or the user of the requesting device. At 3734, the processor may then retrieve the most recent version of task routine for each task specified in the job flow definition by a flow task identifier (e.g., one or more of the task routines 2440, each specified by a flow task identifiers 2241) from the one or more federated areas to which access has been granted. At 3736, the processor may retrieve each of the one or more data sets specified by the one or more data object identifiers from the one or more federated areas to which access has been granted, and may then use the retrieved job flow definition, the retrieved newest versions of task routines, and the retrieved one or more data sets to perform the job flow as requested. At 3738, the processor may transmit the results of the performance to the requesting device. As an alternative to (or in addition to) performing the job flow with the most recent versions of the task routines, the processor may transmit an indication to the requesting device that no record has been found of a previous performance in the one or more federated areas to which access has been granted.

However, if at 3730, the processor successfully locates (during the search at 3720) such an instance log, then the processor may additionally determine at 3740 whether there is more than one such instance log, each of which is associated with a different performance of the job flow with the one or more data sets specified in the request. If, at 3740, only one such instance log was located during the search at 3720, then at 3750, the processor may then retrieve the versions specified in the instance log of each of the task routines specified in the job flow definition for each task by a flow task identifier from the one or more federated areas to which access has been granted. At 3752, the processor may retrieve each of the one or more data sets specified by the one or more data object identifiers from the one or more federated areas to which access has been granted, and may then use the retrieved job flow definition, the retrieved specified versions of task routines, and the retrieved one or more data sets to perform the job flow as requested. At 3754, the processor may additionally retrieve the result report generated in the previous performance of the job flow from the one or more federated areas to which access has been granted, and may compare the retrieved result report to the new result report generated in the new performance of the job flow at 3756. At 3758, the processor may transmit the results of the comparison of result reports to the requesting device, and may transmit the new result report, itself, to the requesting device at 3758.

However, if at 3740, there is more than one such instance log located found during the search at 3720, then the processor may transmit an indication of the available selection of the multiple previous performances that correspond to the multiple located instance logs to the requesting device at 3742 with a request that one of the multiple previous performances be selected as the one from which the instance log will be used. The processor may then await receipt of an indication of a selection of one of the multiple previous performances at 3744 before proceeding to retrieve specific versions of task routines at 3750.

FIGS. 32A, 32B, 32C and 32D, together, illustrate an example embodiment of a logic flow 3800. The logic flow 3800 may be representative of some or all of the operations executed by one or more embodiments described herein. More specifically, the logic flow 3800 may illustrate operations performed by the processor(s) 2550 in executing the control routine 2540, and/or performed by other component(s) of at least one of the federated devices 2500.

At 3810, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to perform a job flow with one or more data sets (e.g. one or more of the flow input data sets 2330) specified in the request by a job flow identifier and one or more data object identifiers (e.g., one of the job flow identifiers 2221, and one or more of the data object identifiers 2331).

At 3812, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3812, the processor determines that the request is not from a device and/or user authorized to make such a request, then the processor may transmit an indication of denial of the request to the device via the network at 3814.

However, if at 3812, the processor determines that the request for a performance of the specified job flow with the specified one or more data sets is authorized, then at 3820, the processor may the use the job flow identifier provided in the request to retrieve the corresponding job flow definition (e.g., one of the job flow definitions 2220) from within one or more federated areas to which the requesting device and/or a user of the requesting device has been granted access. At 3822, the processor may then retrieve the most recent version of task routine for each task specified in the job flow definition by a flow task identifier (e.g., one or more of the task routines 1440, each specified by a flow task identifiers 1241) that is stored within the one or more federated areas to which the requesting device and/or a user of the requesting device has been granted access.

It should be noted that, as has been previously discussed, searches for objects to fulfill such a request received from a particular device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to perform a specified job flow may necessarily be limited to such authorized federated area(s).

At 3824, the processor may use the combination of the job flow identifier and the one or more data object identifiers to search for an instance log associated with a previous performance of the job flow with the one or more data sets within the one or more federated areas to which the requesting device and/or a user of the requesting device has been granted access. If, at 3830, the processor determines (during the search at 3824) that there is no such instance log, then at 3832, the processor may then check whether all of the retrieved newest versions of task routines are written in the same programming language. As has been discussed, there may be an expectation that, normally, task routines are all written in a single primary programming language that is normally supported for executing the executable instructions within task routines (e.g., the executable instructions 2447). However, as has also been discussed, it may be that there is a mixture of two or more programming languages (e.g., the primary programming language along with one or more secondary programming languages) among a set of task routines to be executed in performing the tasks of a job flow.

If, at 3832, all of the retrieved most recent versions of task routines are written in the same programming language (e.g., the primary programming language), then at 3834, the processor may retrieve each of the one or more data sets specified by the one or more data object identifiers from the one or more federated areas to which the requesting device and/or a user of the requesting device has been granted access, and may then use the retrieved job flow definition, the retrieved newest versions of task routines, and the retrieved one or more data sets to perform the job flow as requested. In so doing, the processor may be caused to use the same runtime interpreter or compiler to execute the executable instructions within all of the retrieved most recent versions of task routines. At 3838, the processor may then transmit the results of the performance to the requesting device. However, if at 3832, there is a mixture of programming languages is used among the retrieved most recent versions of task routines, then at 3836, the processor may retrieve each of the one or more data sets specified by the one or more data object identifiers from the one or more federated areas to which the requesting device and/or a user of the requesting device has been granted access, and may then use the retrieved job flow definition, the retrieved newest versions of task routines, and the retrieved one or more data sets to perform the job flow, but may do so using a combination of multiple different runtime interpreters and/or compilers to execute the executable instructions within each of those task routines. At 3838, the processor may then transmit the results of the performance to the requesting device.

However, if at 3830, the processor successfully locates such an instance log (during the search at 3824), then the processor may additionally determine at 3840 whether there is more than one such instance log, each of which is associated with a different performance of the job flow with the one or more data sets specified in the request. If only one such instance log is located at 3840, then at 3850, the processor may then retrieve the versions specified in the instance log of each of the task routines for each task specified in the job flow definition by a flow task identifier from the one or more federated areas to which the requesting device and/or a user of the requesting device has been granted access. However, if at 3840, there is more than one such instance log located, then the processor may analyze the multiple instance logs to identify and select the instance log from among the multiple instance logs that is associated with the most recent performance of the job flow at 3842, before proceeding to retrieve specified versions task routines for each task of the job flow at 3850.

At 3852, for each task specified in the job flow definition, the processor may compare the retrieved version of the task routine identified in the instance log to the newest version stored within the one or more federated areas to which the requesting device and/or a user of the requesting device has been granted access to determine whether each of the retrieved task routines is the newest version. At 3860, if each of the retrieved task routines is the newest version thereof, then there is no need to perform the job flow anew, as the most recent previous performance (or the only previous performance) already used the newest version of each task routine such that the result report generated is already the most up to date form of the result report, possible. Thus, at 3862, the processor may retrieve the result report of that previous performance using the result report identifier specified by the instance log from the one or more federated areas to which the requesting device and/or a user of the requesting device has been granted access, and may then transmit the result report to the requesting device at 3734.

However, if at 3860, one or more of the task routines specified in the instance log and retrieved from the one or more federated areas to which the requesting device and/or a user of the requesting device has been granted access is not the newest version thereof, then at 3870, the processor may parse the job flow set forth in the job flow definition to identify the earliest task within the job flow at which the version of the task routine so retrieved is not the newest version. At 3872, the processor may then check whether all of the newest versions of task routines, starting with the task routine for the identified earliest task, proceeding through the task routines for each of the later tasks in the job flow, are written in the same programming language.

If, at 3872, all such retrieved newest task routines are written in the same programming language, then at 3874, starting at the identified earliest task, the processor may use the newest version of task routine for that task and for each later task in the job flow to perform that task and each of the later tasks, thereby taking advantage of the one or more earlier tasks of job flow at which the newest version of task routine was used in the most recent previous performance (or the only previous performance). In so doing, the processor may be caused to use the same runtime interpreter or compiler to execute the executable instructions within all of such retrieved most recent versions of task routines. The processor may then transmit the result report generated in such a partial performance of the job flow to the requesting device at 3878. However, if at 3872, there is a mixture of programming languages is used among these particular most recent versions of task routines, then at 3876, the processor may use the newest version of task routine for that earliest identified task and for each later task in the job flow to perform that task and each of the later tasks, but may do so using a combination of multiple different runtime interpreters and/or compilers to execute the executable instructions within each of those task routines. The processor may then transmit the result report generated in such a partial performance of the job flow to the requesting device at 3878.

Figure 33A:
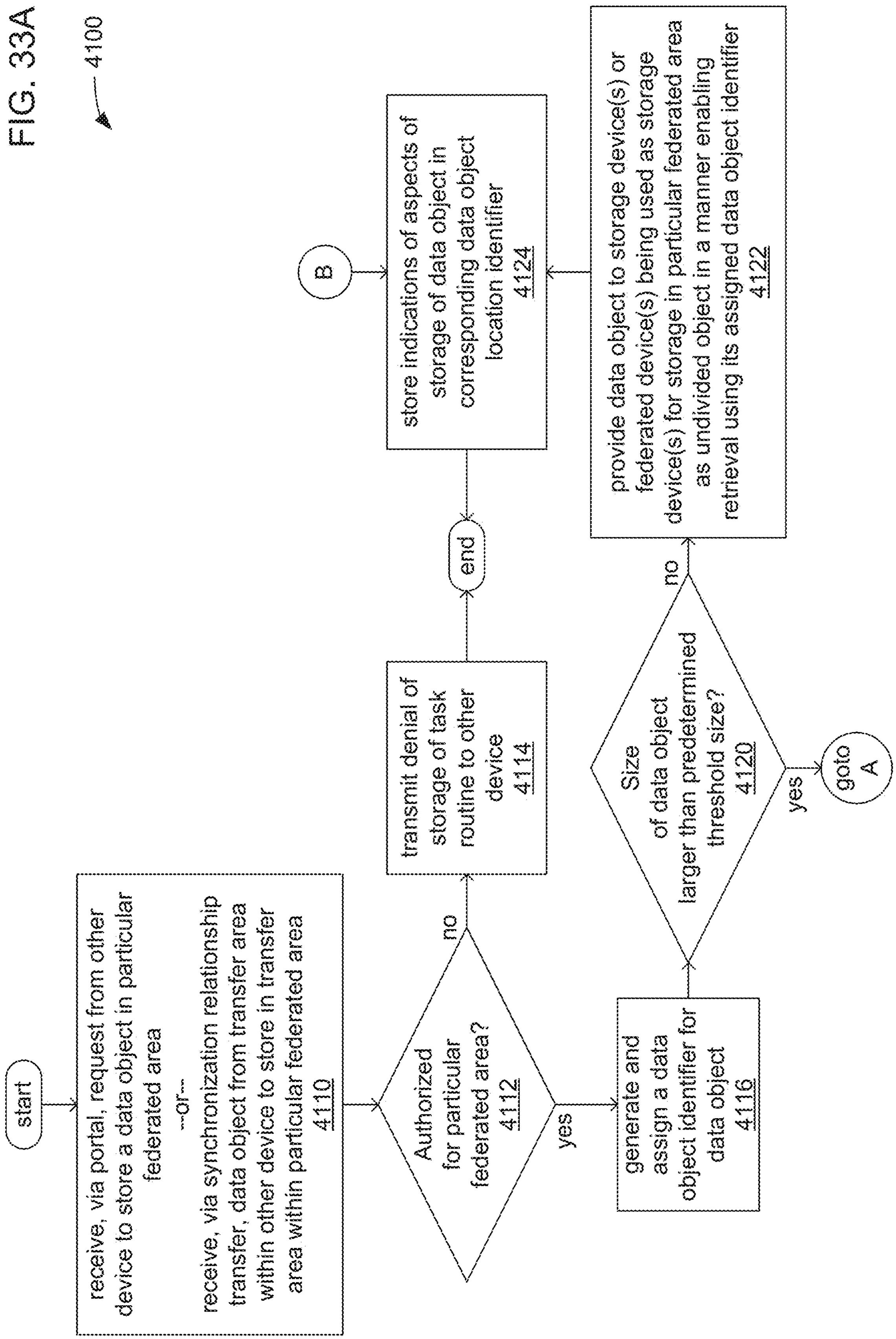
FIGS. 33A and 33B, together, illustrate an example embodiment of a logic flow of a federated device storing a data object in a federated area.
Figure 33B:
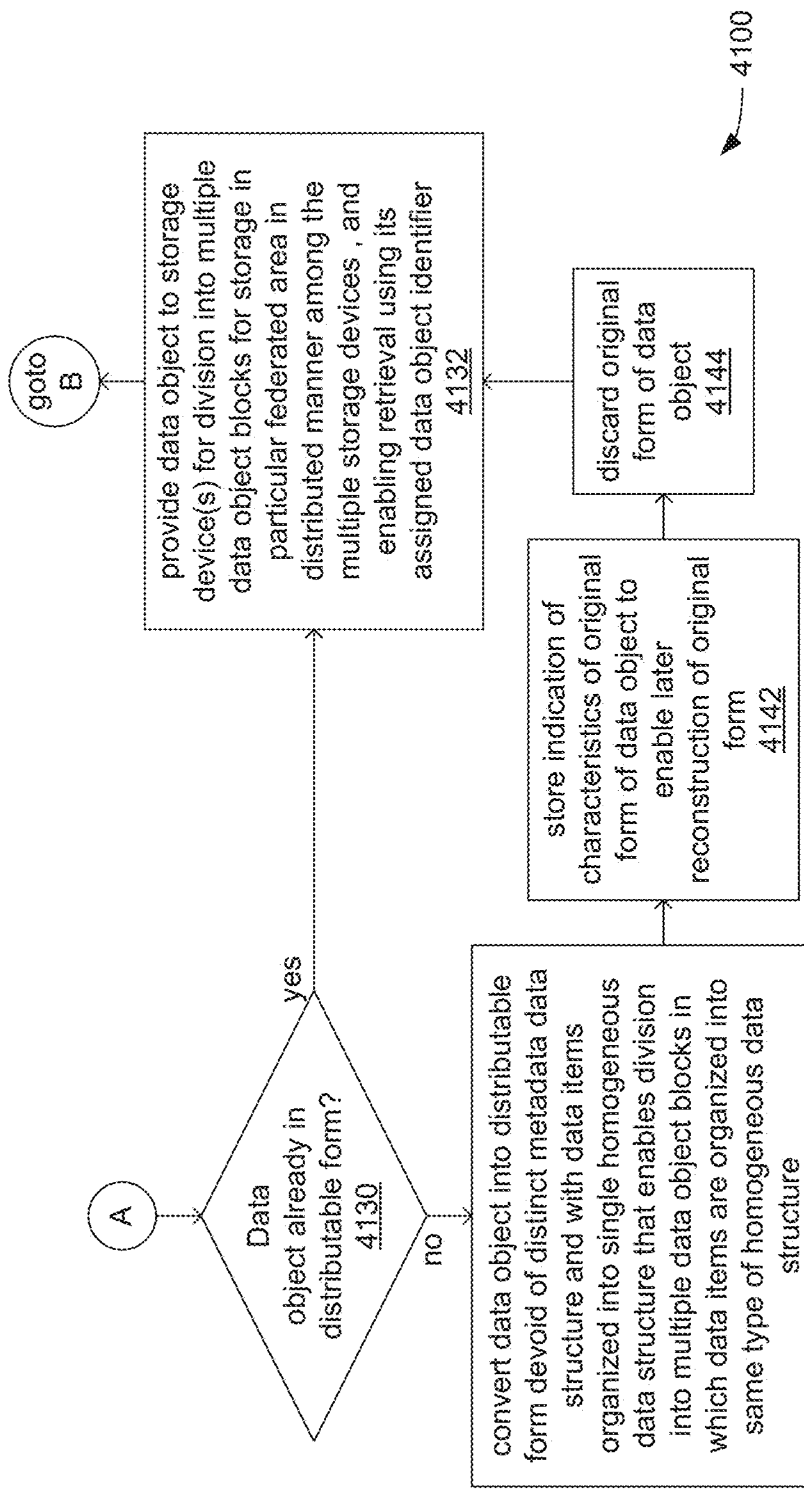

FIGS. 33A and 33B, together, illustrate an example embodiment of a logic flow 4100. The logic flow 4100 may be representative of some or all of the operations executed by one or more embodiments described herein. More specifically, the logic flow 4100 may illustrate operations performed by the processor(s) 2550 in executing the control routine 2540, and/or performed by other component(s) of at least one of the federated devices 2500.

At 4110, a processor of a federated device of a distributed processing system (e.g., at least one processor 2550 of one of the federated devices 2500 of the distributed processing system 2000) may receive a request from another device, via a network (e.g., one of the source devices 2100, or one of the reviewing devices 2800, via the network 2999) and through a portal provided by the processor for access to other devices via the network, to store a data object (e.g., one of the flow input data objects 2330, one of the mid-flow data objects 2370 or one of the result reports 277) within a particular federated area specified within the request (e.g., one of the federated areas 2566). Alternatively, at 4110, the processor may receive the data object, via the network, and in a transfer associated with a synchronization relationship between a transfer area instantiated within the particular federated area and another transfer area instantiated within the other device, where the job flow definition is intended to be stored within the transfer area within the particular federated area.

At 4112, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 4112, the processor determines that the request is not from a device and/or user authorized to make such a request, then the processor may transmit an indication of denial of the storage of the job flow definition to the device via the network at 4114.

However, if at 4112, the processor determines that the request to store a job flow definition within the specified federated area is authorized, then the processor may generate and assign a data object identifier for the data object at 4116.

If, at 4120, the size of the data object is not larger than a predetermined threshold size, then at 4122, the processor may provide the data object to at least one storage device of a set of storage devices (e.g., one of the storage devices 2600*a-x* and/or 2600*z*), or to at least one federated device of a set of federated devices being used to store objects (e.g., one of the federated devices 2500*a-x* and/or 2500*z*) to be stored within the federated area specified in the request as an undivided object within the storage space provided by a single one of the set of storage devices, or federated devices, for the specified federated area. As previously discussed, in some embodiments, the predetermined threshold size may be determined to be set to be equal to (or in some other way based on) the threshold size used by the set of storage devices to determine whether to divide a data object into multiple data object blocks. At 4124, the processor may also store indications of aspects of the storage of the data object (e.g., its size, whether stored as an undivided object or in a distributed manner, whether stored in distributable form (if applicable), the identity of the federated area in which it is stored and/or the identity of each device in which at least a portion of it is stored).

However, if at 4120, the size of the data object is larger than the predetermined threshold size, then at 4130, the processor may check whether the data object is already in a distributable form. As previously discussed, a distributable form of a data object may entail having no distinct metadata data structure (e.g., the metadata 2338), and having the data items thereof organized into a single homogeneous data structure (e.g., the data items 2339 organized into a single homogeneous data structure 2335*d*). Further, in some of such embodiments, there may be a limited preselected set of types of homogeneous data structure from which the type of the single homogeneous data structure is to be selected.

If, at 4130, the data object is already in such a distributable form, then the processor may provide the data object to the set of storage devices, or the set of federated devices being employed as a set of storage devices, to be divided up by that set of devices into multiple data object blocks (e.g., the data object blocks 2336*d*) that are then stored in a distributed manner as by being distributed among that set of devices such that each data object block is stored within a portion of one of the devices that provides a portion of a distributed file system that spans that set of devices and in which the specified federated area has been defined to also span that set of devices. Following such distributed storage, the processor may then store indications of aspects of the storage of the data object at 4124.

However, if at 4130, the data object is not already in such a distributable form, then the processor may convert the data object from the form in which it was originally received and into a distributable form at 4140. At 4142, the processor may store indications of one or more characteristics of the original form (e.g., the metadata 2338) for future use in re-creating the original form, before discarding the original form at 4144, and then providing the distributable form to the set of storage devices, or of federated devices used as storage devices, at 4132. Alternatively, and as previously discussed, the processor may provide both the original and distributable forms of the data object to the set of storage devices to enable both to be stored in a distributed manner within the specified federated area. Again, following such distributed storage, the processor may then store indications of aspects of the storage of the data object at 4124.

Figure 34A:
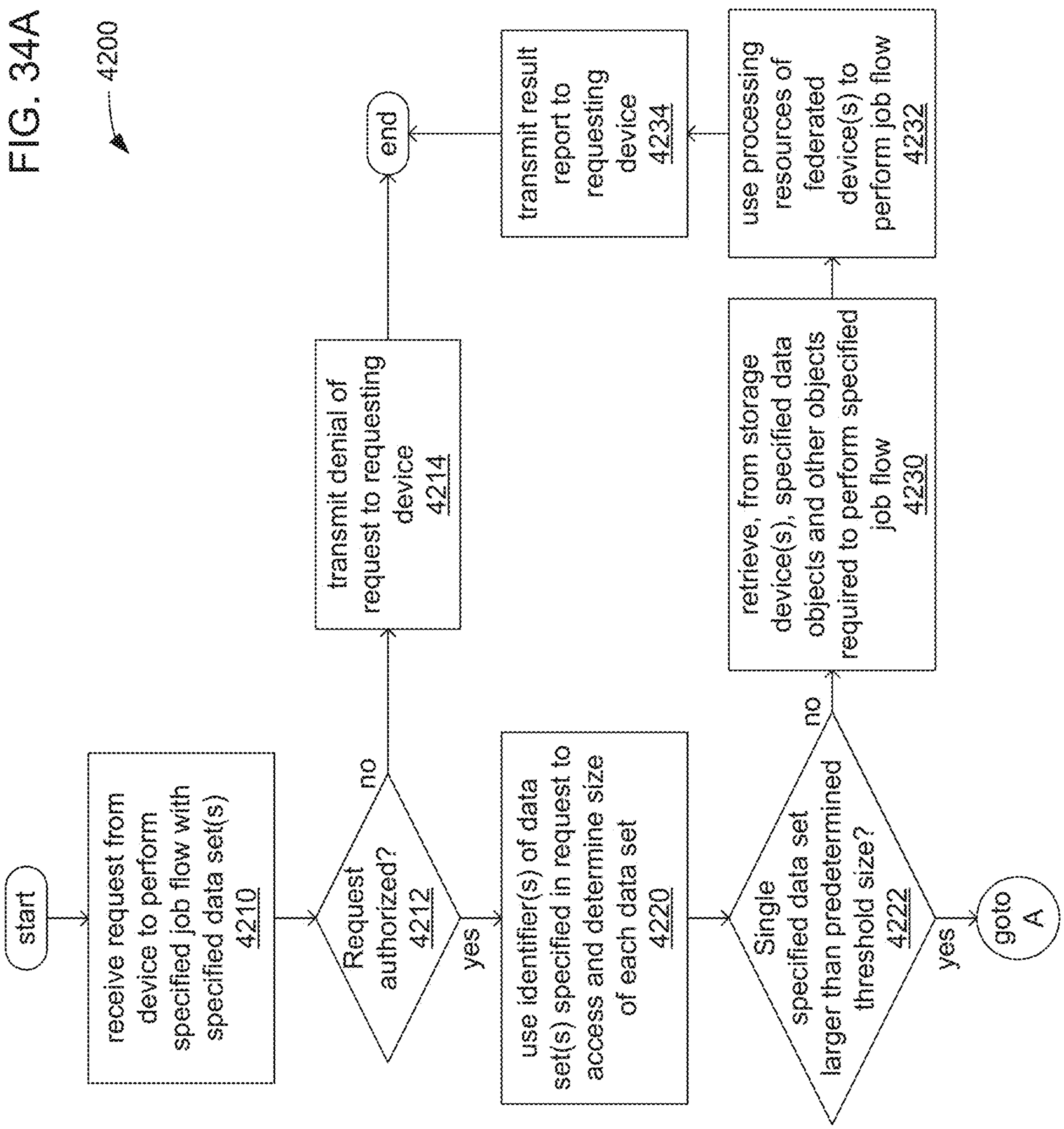
FIGS. 34A, 34B and 34C, together, illustrate another example embodiment of a logic flow of a federated device performing a job flow.
Figure 34B:
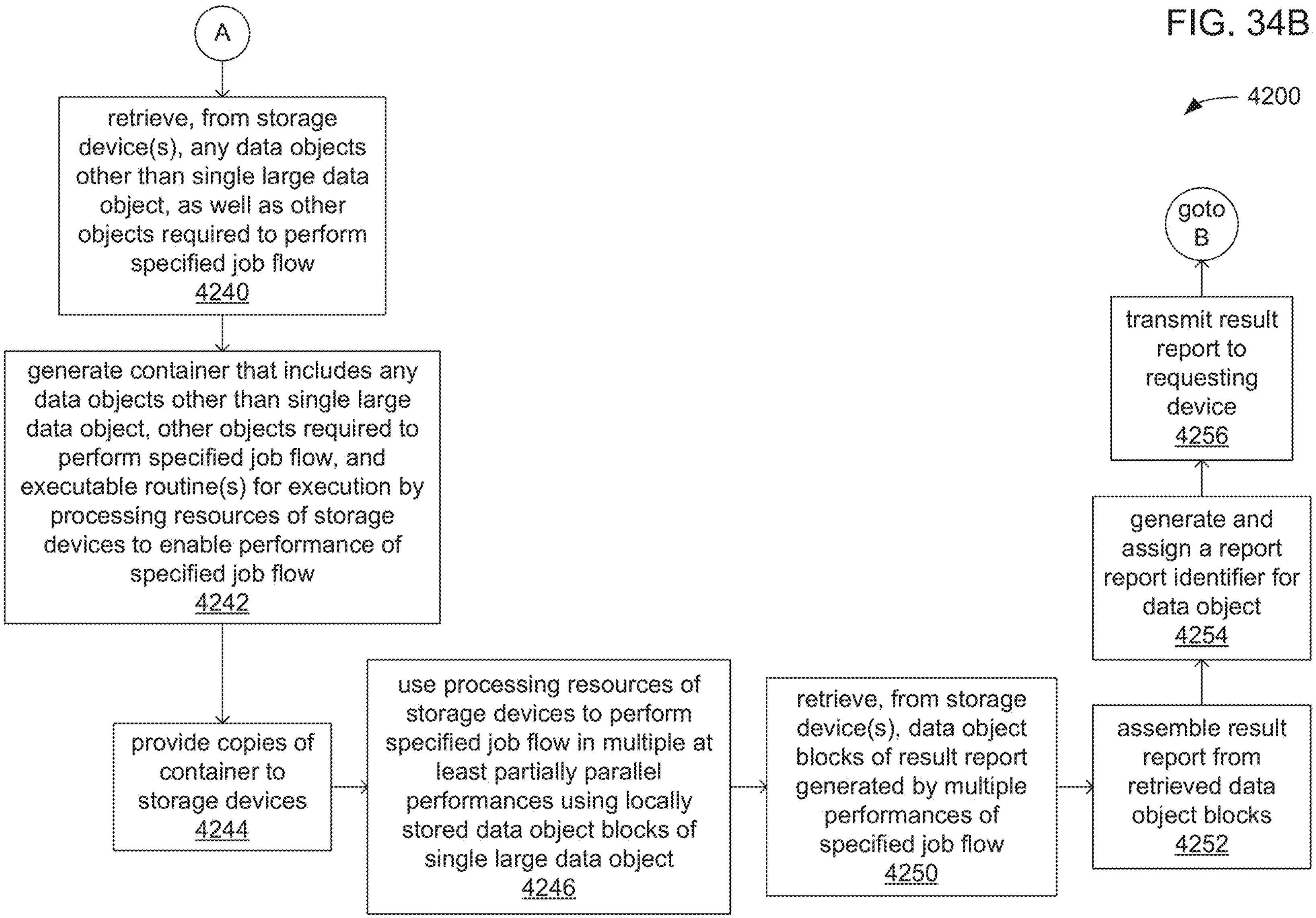
Figure 34C:
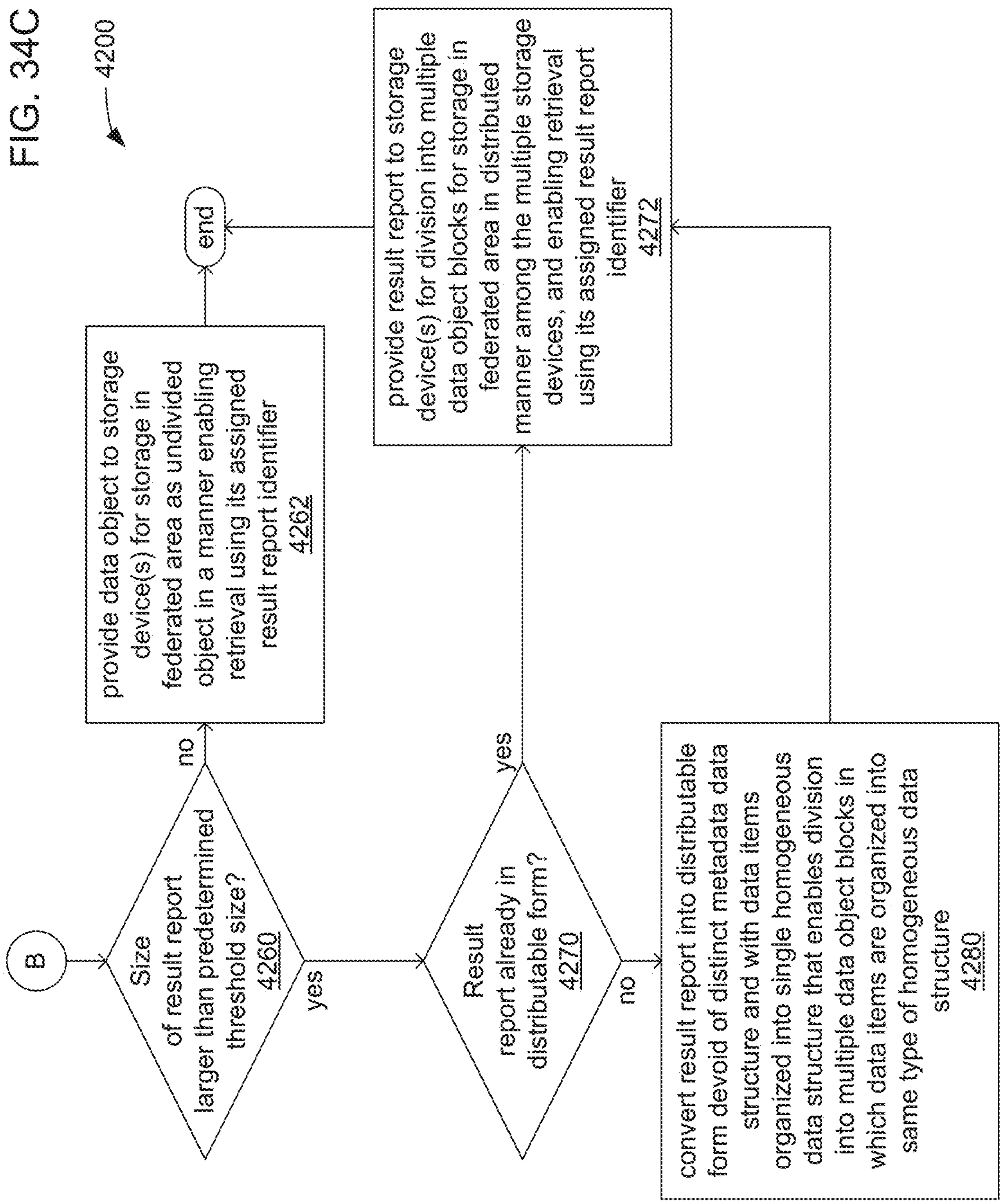

FIGS. 34A, 34B and 34C, together, illustrate an example embodiment of a logic flow 4200. The logic flow 4200 may be representative of some or all of the operations executed by one or more embodiments described herein. More specifically, the logic flow 4200 may illustrate operations performed by the processor(s) 2550 or 2650 in executing one or more components of the control routine 2540, and/or performed by other component(s) of at least one of the federated devices 2500 and/or at least one of the storage devices 2600.

At 4210, a processor of a federated device of a distributed processing system (e.g., at least one processor 2550 of one of the federated devices 2500 of the distributed processing system 2000) may receive a request from a device, via a network (e.g., one of the source devices 2100 or one of the reviewing devices 2800 via the network 2999) and through a portal provided by the processor, to perform a job flow with one or more data sets (e.g. one or more of the flow input data sets 2330) specified in the request by a job flow identifier and one or more data object identifiers (e.g., one of the job flow identifiers 2221, and one or more of the data object identifiers 2331).

At 4212, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 4212, the processor determines that the request is not from a device and/or user authorized to make such a request, then the processor may transmit an indication of denial of the request to the device via the network at 4214.

However, if at 4212, the processor determines that the request for a performance of the specified job flow with the specified one or more data sets is authorized, then at 4220, the processor may the use the one or more data object identifiers to access each data object and/or access stored information concerning each data object to determine the size of each.

At 4222, if none of the one or more specified data objects is larger than a predetermined threshold size, or if there are multiple data objects among the one of the one or more specified data object that are larger than the predetermined threshold size, then at 4230, the processor may retrieve the specified one or more data objects, along with other objects needed to perform the job flow (e.g., a job flow definition 2220 and one or more task routines 2440) from a set of storage devices. At 4232, the processor and/or other processing resources of the federated device and/or of one or more other federated devices may be used to perform the job flow, and the result of that performance may be transmitted to the requesting device at 4234.

However, if at 4222, there is a single data object among the one or more specified data objects that is larger than the predetermined threshold size, then at 4240, the processor may retrieve the others of the one or more specified objects (if there are such others) from the set of storage devices in which they are stored, as well as other objects needed to perform the job flow from the set of storage devices. At 4242, the processor may generate a container (e.g., the container 2565) to include the retrieved other data object(s) (if there are any), the other objects required for performing the job flow, and one or more executable routines (e.g., a version of the performance routine 2544) to be executed using processing resources of the set of storage devices to enable performing the job flow using the processing resources of the set of storage devices.

At 4244, the processor may provide copies of the container to the set of storage devices such that each storage device thereamong is provided with a copy of the container. At 4246, processor(s) of each storage device (e.g., the processor 2650 of a storage device 2600) of the set of storage devices that stores at least one data object block of the single large data set may execute the executable routine to then perform the job flow using the objects provided in the container, and using the locally stored data object block(s) of the single large data object as an input. As previously discussed, such performances by multiple storage devices within a set of storage devices may occur at least partially in parallel.

At 4250, with the performances of the job flow over, the processor may retrieve, from each of the storage devices in the set of storage devices that performed the job flow, data object blocks of a result report generated as a result of the job flow performances. At 4252, the processor may assemble the result report from the retrieved data object blocks, and may generate and assign a result report identifier for the result report at 4254. The processor may then transmit the newly assembled result report to the requesting device at 4256.

If, at 4260, the size of the result report is not larger than a predetermined threshold size, then at 4262, the processor may provide the result report to at least one storage device of the set of storage devices to be stored within a federated area as an undivided object within the storage space provided by a single one of the set of storage devices for that federated area. Again, as previously discussed, in some embodiments, the predetermined threshold size may be determined to be set to be equal to (or in some other way based on) the threshold size used by the set of storage devices to determine whether to divide a data object into multiple data object blocks.

However, if at 4260, the size of the result report is larger than the predetermined threshold size, then at 4270, the processor may check whether the result report is already in a distributable form. Again, a distributable form of a data object or result report may entail having no distinct metadata data structure (e.g., the metadata 2338), and having the data items thereof organized into a single homogeneous data structure (e.g., the data items 2339 organized into a single homogeneous data structure **2335*d***). Further, in some of such embodiments, there may be a limited preselected set of types of homogeneous data structure from which the type of the single homogeneous data structure is to be selected.

If, at 4270, the result report is already in such a distributable form, then the processor may provide the result report to the set of storage devices to be divided up by the set of storage devices into multiple data object blocks (e.g., the data object blocks **7336*d***) that are then stored in a distributed manner as by being distributed among the set of storage devices such that each data object block of the result report is stored within a portion of one of the storage devices that provides a portion of a distributed file system that spans multiple storage devices and in which a federated area has been defined to also span the multiple storage devices.

However, if at 4270, the result report is not already in such a distributable form, then the processor may convert the result report from its original form and into a distributed form at 4280, before providing the distributable form to the set of storage devices at 4272.

Figure 35A:
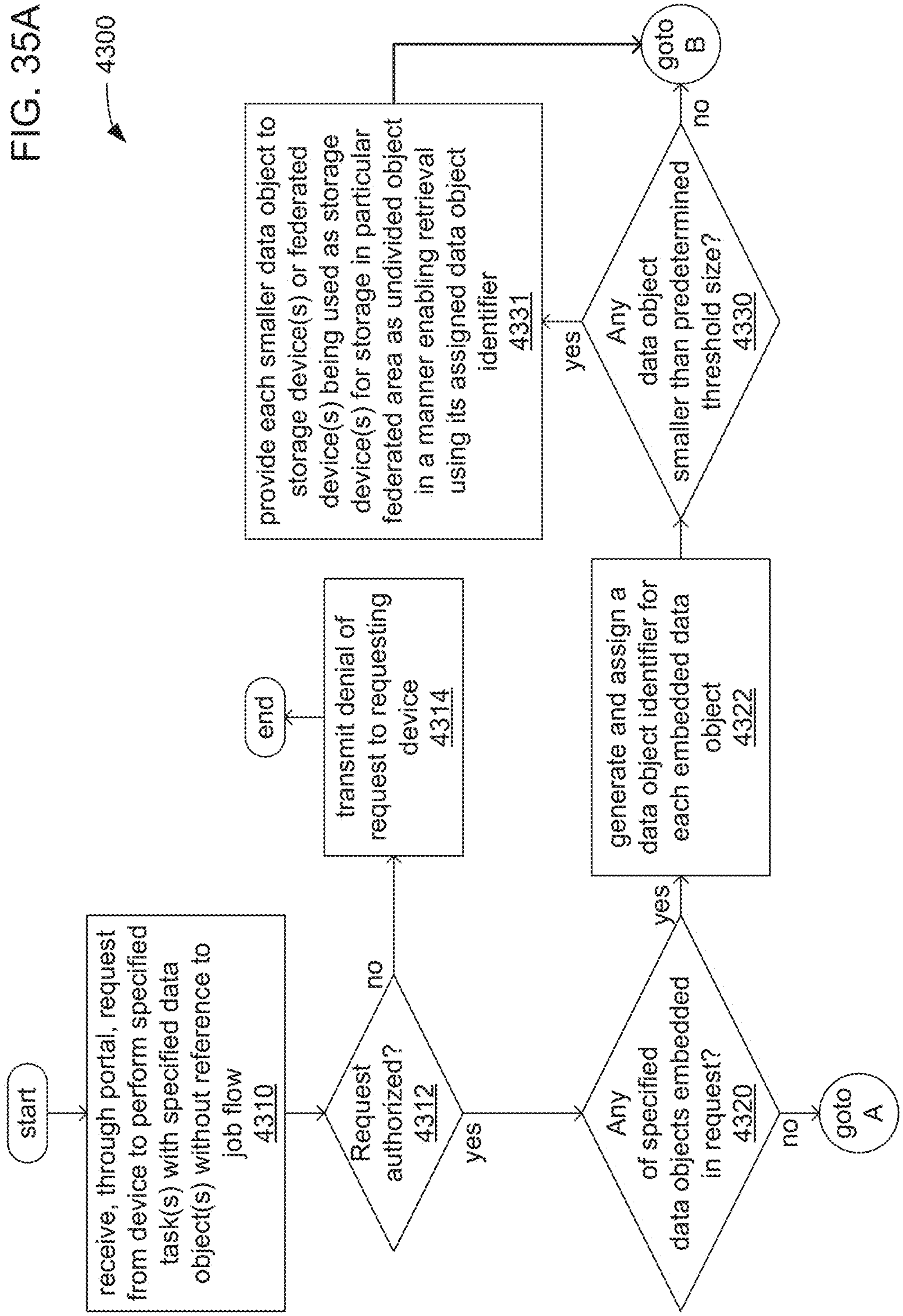
FIGS. 35A, 35B and 35C, together, illustrate another example embodiment of a logic flow of a federated device performing a set of tasks specified in a request as a job flow.
Figure 35B:
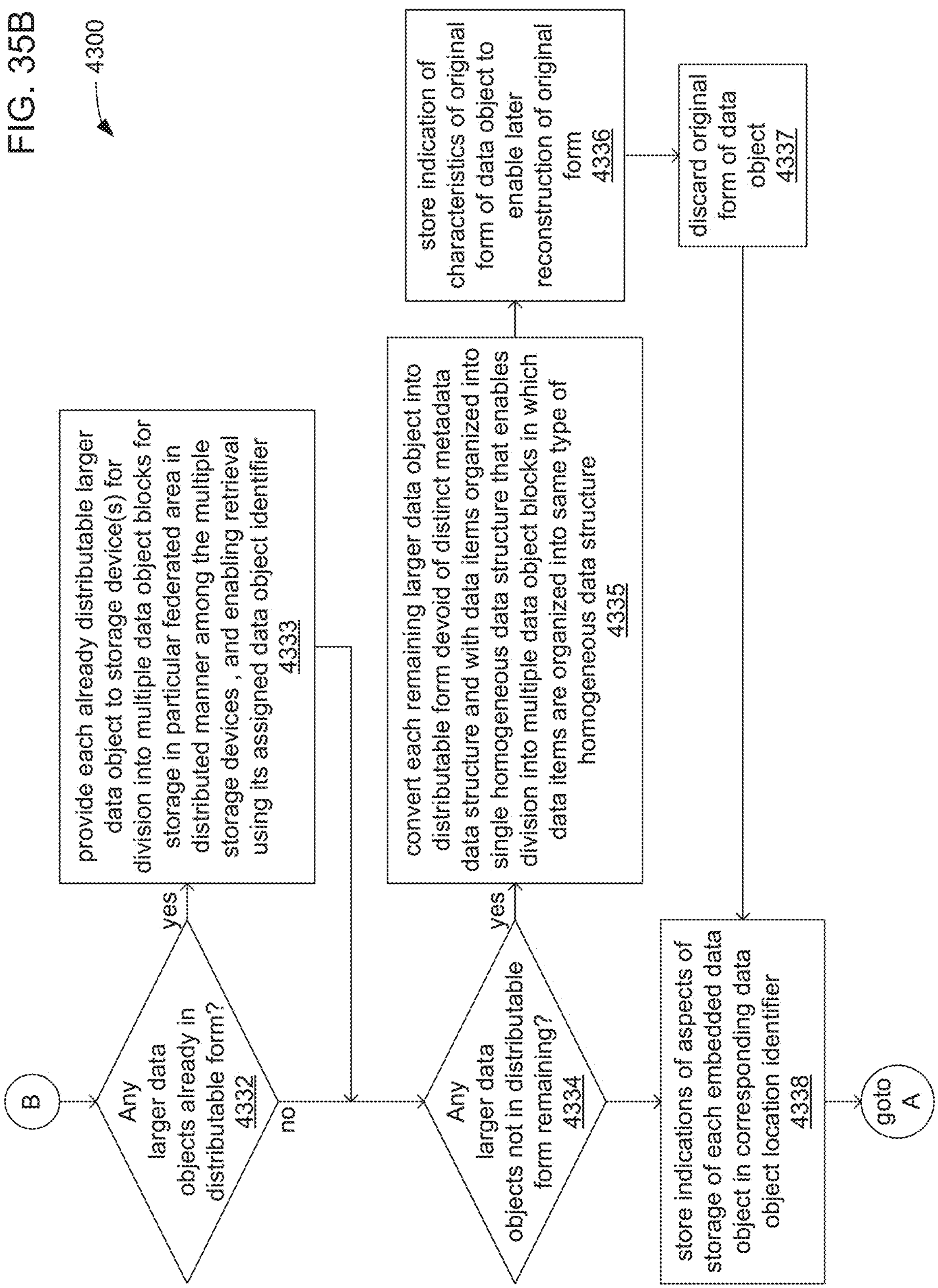
Figure 35C:
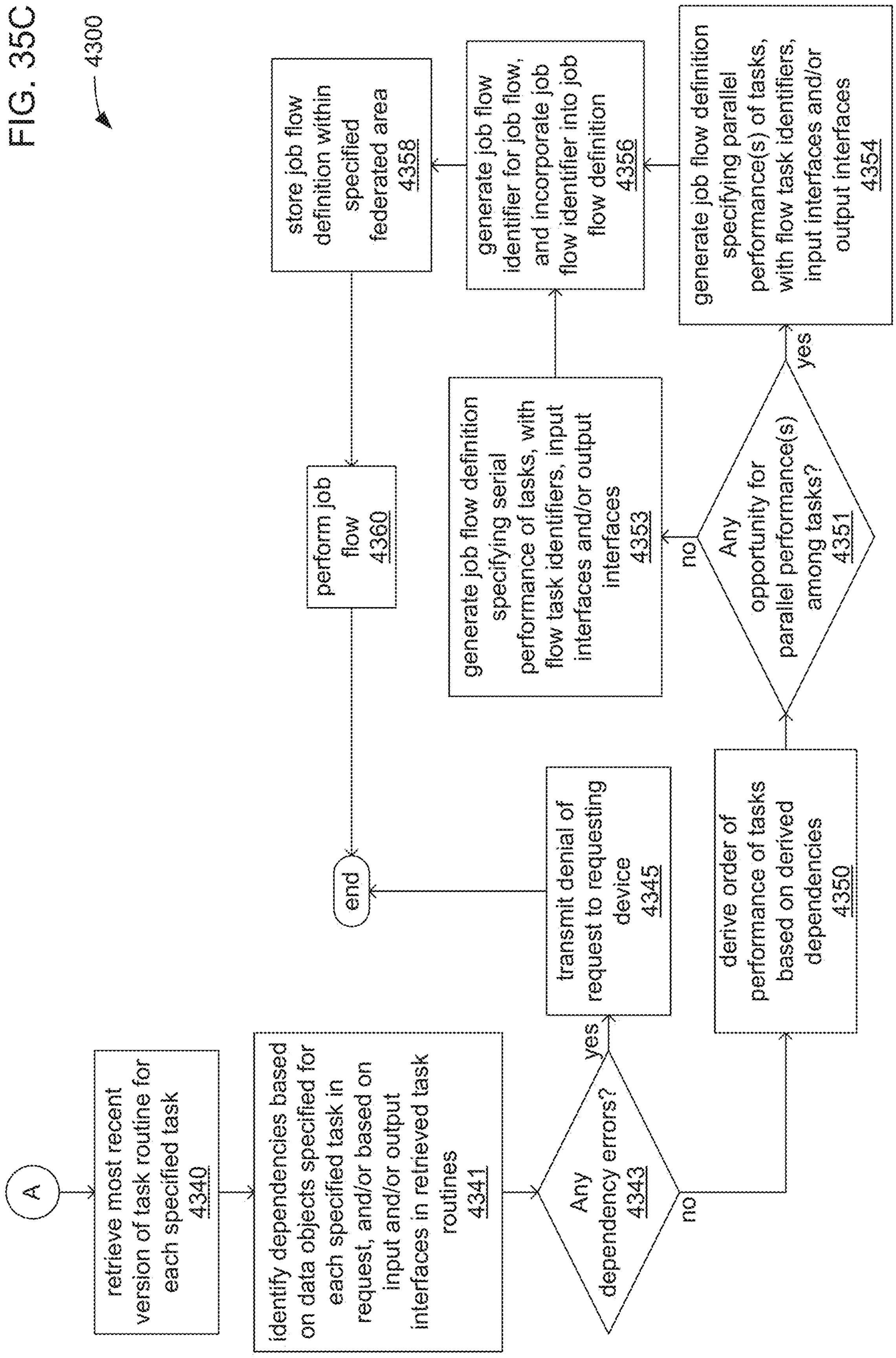

FIGS. 35A, 35B and 35C, together, illustrate an example embodiment of a logic flow 4300. The logic flow 4300 may be representative of some or all of the operations executed by one or more embodiments described herein. More specifically, the logic flow 4300 may illustrate operations performed by the processor(s) 2550 or 2650 in executing one or more components of the control routine 2540, and/or performed by other component(s) of at least one of the federated devices 2500 and/or at least one of the storage devices 2600.

At 4310, a processor of a federated device of a distributed processing system (e.g., at least one processor 2550 of one of the federated devices 2500 of the distributed processing system 2000) may receive a request from a device, via a network (e.g., one of the source devices 2100 or one of the reviewing devices 2800 via the network 2999) and through a portal provided by the processor, to perform a one or more tasks specified in the request (e.g., with each task specified by its corresponding flow task identifier 2241), and with one or more data objects specified in the request as inputs to each task (e.g. with each of one or more data objects 2330, 2370 and/or 2770 to be used as inputs specified in the request as inputs for each task specified using corresponding data object identifiers 2331, 2371 and/or 2771, respectively).

At 4312, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 4312, the processor determines that the request is not from a device and/or user authorized to make such a request, then the processor may transmit an indication of denial of the request to the device via the network at 4314.

However, if at 4312, the processor determines that the request for a performance of the specified job flow with the specified one or more data sets is authorized, then at 4320, the processor may check whether there area any data objects embedded in the request. As has been discussed, it may be that the request is formatted in a manner conforming to at least one version of the MPI specification to at least the degree that it may embed one or more of the data objects that may be used as an input to at least one of the specified tasks as streaming data.

If, at 4320, there are no data objects embedded within the request, then at 4340, the processor may use the flow task identifiers (or whatever other type of identifier is used in the request for each task) to retrieve the most recent version of task routine for each task specified in the request. As has been discussed, in retrieving task routines, the processor may limit the federated areas from which it so retrieves task routines to those to which access is authorized.

At 4341, the processor may identify dependencies among the tasks specified in request. As previously discussed, as part of identifying dependencies, the processor may analyze each instance of the specification of a data object as an input to one of the specified tasks and/or as an output from one of the specified tasks to identify any instances in which a dependency exists among two or specified tasks as a result of a data object that is output by one of the specified tasks being used as an input to another of the specified tasks. Alternatively or additionally, the processor may analyze the input interfaces and output interfaces of each of the retrieved task routines to identify each instance of an output interface of one task routine that matches an input interface of another task routine, which may be an indication of a dependency therebetween. As also previously discussed, within each task routine, there may be comments that describe its input and/or output interfaces in addition to the executable instructions that implement each of those interfaces, and the processor may analyze either or both of such comments (if present) and such executable instructions.

Regardless of the exact manner in which the processor identifies dependencies, if, at 4343, a dependency error is identified, then the processor may transmit an indication of denial of the request to the requesting device at 4345. By way of example, it may be that the processor identifies an instance of a data object being specified as both an input to and an output of the same task, or of the same set of tasks, such that an impossible situation of a data object being needed as an input before it can possibly be created as an output is being specified in the request. Alternatively or additionally, where the processor has also analyzed interfaces of the task routines, it may be that an object is specified as an output of one task and an input to another task where the output interface for that output of that one task is incompatible with the input interface for that input of the other task.

However, if no dependency error exists at 4343, at 4350, the processor may employ the earlier derived dependencies to derive an order of performance of the tasks as part of generating a new job flow for the performance of the set of tasks of the request, and may check whether there are any opportunities for parallelism in the performance of the tasks at 4351. If no such opportunities for parallelism exist, then at 4353, the processor may generate a job flow definition for the performance of the set of tasks specified in the request that specifies an entirely serial performance of those specified tasks. However, if there is such an opportunity for parallelism at 4351, then at 4354, the processor may generate the job flow definition to specify each of the one or more opportunities for the parallel performance of two or more of those specified tasks. Regardless of whether an entirely serial job flow definition is generated at 4353 or a job flow definition that specifies one or more opportunities for parallelism is generated at 4354, the resulting job flow definition may also be generated by the processor to specify aspects of input and/or output interfaces for each task by which data is received and/or output by each.

At 4356, the processor may generate a job flow identifier (e.g., a job flow identifier 2221) for the new job flow, and may incorporate the new job flow identifier 2221 into the newly generated job flow definition. At 4358, the processor may store the job flow definition generated at either 4153 or 4154 within a federated area. At 4360, the processor may then perform the job flow. In so doing, the processor may attempt to identify opportunities for parallelizing the performance of individual tasks that may be afforded by the an object specified as an input to a task having been stored in distributed form such that multiple instances of that task may be performed at least partially in parallel with each block of that object.

However, if at 4320, there are one or more data objects embedded within the request, then at 4322, then the processor may generate and assign a data object identifier for each of the one or more embedded data objects at 4322.

At 4330, the processor may check if there are any of the one or more embedded data objects that are smaller than a predetermined threshold size. If there are, then at 4331, the processor may provide each of those smaller data objects to at least one storage device of a set of storage devices (e.g., one of the storage devices 2600*a-x* and/or 2600*z*), or to at least one federated device of a set of federated devices being used to store objects (e.g., one of the federated devices 2500*a-x* and/or 2500*z*), to be stored within a federated area as an undivided object within the storage space provided by a single one of those devices. As previously discussed, in some embodiments, the predetermined threshold size may be determined to be set to be equal to (or in some other way based on) the threshold size used by a set of storage devices, or a set of federated devices being used to store objects, to determine whether to divide a data object into multiple data object blocks.

At 4332, the processor may check if there are any of the one or more embedded data objects that are larger than the predetermined threshold size, and that are already in distributable form. As previously discussed, a distributable form of a data object may entail having no distinct metadata data structure (e.g., the metadata 2338), and having the data items thereof organized into a single homogeneous data structure (e.g., the data items 2339 organized into a single homogeneous data structure **2335*d*). Further, in some of such embodiments, there may be a limited preselected set of types of homogeneous data structure from which the type of the single homogeneous data structure is to be selected. If there are any such data objects at 4332, then at 4333, then the processor may provide each such data object to the set of storage devices, or to the set of federated devices being employed as a set of storage devices, to be divided up by that set of devices into multiple data object blocks (e.g., the data object blocks 2336*d* of a flow input data object 2330**) that are then stored in a distributed manner as by being distributed among that set of devices such that each data object block is stored within a portion of one of the devices that provides a portion of a distributed file system that spans that set of devices and in which the specified federated area has been defined to also span that set of devices.

At 4334, the processor may check if there are any of the one or more embedded data objects that are larger than the predetermined threshold size, and that are not already in distributable form. If there are, then at 4335, the processor may convert each such data object from its non-distributable form and into a distributable form, before providing each such object in distributable form to the set of storage devices, or to the set of federated devices being employed as a set of storage devices, to be divided up by that set of devices into multiple data object blocks that are then stored in a distributed manner Δt 4336, the processor may store indications of one or more characteristics of the original form (e.g., the metadata 2338) of each such object for future use in re-creating their original forms, before discarding their original forms at 4337. Alternatively, and as previously discussed, the processor may provide both the original and distributable forms of each such data object to the set of devices to enable both to be stored in a distributed manner.

At 4338, the processor may also store indications of aspects of the storage of each data object that was received as embedded in the request (e.g., its size, whether stored as an undivided object or in a distributed manner, whether stored in distributable form (if applicable), the identity of the federated area in which it is stored and/or the identity of each device in which at least a portion of it is stored). Following the storage of such information for each such object, the processor may then proceed to retrieving the most recent version of task routine to perform each specified task at 4340.

In various embodiments, each of the processors 2150, 2550 and 2850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of each of the one or more federated devices 1500 may be selected to efficiently perform the analysis of multiple instances of job flows at least partially in parallel. By way of example, the processor 2550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2140, 2540 and 2840, including the components of which each is composed, may be selected to be operative on whatever type of processor or processors that are selected to implement applicable ones of the processors 2150, 2550 and/or 2850 within each one of the devices 2100, 2500 and/or 2800, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2550 and/or 2850. Where one or more device drivers are included, those device drivers may provide support for any of a variety of other components, whether hardware or software components, of the devices 2100, 2500 and/or 2800.

In various embodiments, each of the storages 2160, 2560 and 2860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, each of the input devices 2110 and 2810 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the displays 2180 and 2880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input devices 2110 and/or 2810, respectively, may be incorporated therein as touch-sensitive components thereof.

In various embodiments, each of the network interfaces 2190, 2590 and 2890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

However, in a specific embodiment, one or more of the network interfaces 2190, 2590 and/or 2890 may be implemented with multiple copper-based or fiber-optic based network interface ports to provide redundant and/or parallel pathways in exchanging one or more of the data sets 2330 and/or 2370.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 2330 and/or 2370 are not dependent on, nor constrained by, existing API architectures and/or supporting communications protocols. More broadly, there is nothing in the manner in which the data sets 2330 and/or 2370 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform operations comprising:

- receive, at the at least one processor and from a requesting device via a network, a request to perform a job flow, wherein:
  - the job flow is defined in a job flow definition that specifies a set of tasks to be performed via execution of a corresponding set of task routines during the job flow performance;
  - the job flow definition is stored among multiple job flow definitions within at least one federated area;
  - the set of task routines is stored among multiple task routines within the at least one federated area; and
  - the at least one federated area is maintained within at least one storage device;
- retrieve the job flow definition from among the multiple job flow definitions in the at least one federated area;
- store, within a job queue, a job performance request message comprising the job flow definition;
- within a first performance container, execute instructions of a first instance of a performance routine to cause the at least one processor to, in response to the storage of the job performance request message within the job queue, perform operations comprising:
  - derive an order of performance of the set of tasks that specifies at least a first task of the set of tasks to be performed and a second task to be performed after the first task, and that is based on indications in the job flow definition of dependencies among the set of tasks;

store, within a task queue, a first task routine execution request message comprising an identifier associated with the first task; and in response to at least storage of an execution completion message indicative of completion of execution of the first task routine within the task queue, store, within the task queue, a second task routine execution request message comprising an identifier associated with the second task to cause a latest version of a second task routine to be executed within a second task container to cause the at least one processor to perform the second task; and within a first task container, in response to the storage of the first task routine execution request message within the task queue, perform operations comprising:

use the identifier associated with the first task to retrieve a latest version of a first task routine of the set of task routines from the at least one federated area;

commence execution, within the first task container, of instructions of the first task routine to commence performance of the first task; and following completion of the execution of the first task routine, store, within the task queue, the execution completion message indicative of completion of execution of the first task routine.

2. The apparatus of claim 1, wherein the at least one processor is caused to perform operations comprising:

within the first task container, following completion of the execution of the instructions of the first task routine, store, within the task queue, an execution completion message indicative of completion of execution of the first task routine;

within the first performance container, in response to at least storage of the execution completion message within the task queue, store a job completion message indicative of completion of the job flow within the job queue; and in response to storage of the job completion message within the job queue, transmit an indication of completion of the job flow to the requesting device via the network.

3. The apparatus of claim 1, wherein the at least one processor is caused to perform operations comprising:

within the second task container, in response to the storage of the second task routine execution request message within the task queue, perform operations comprising:

use the identifier associated with the second task to retrieve a second task routine of the set of task routines from the at least one federated area; and commence execution, within the second task container, of instructions of the second task routine to commence performance of the second task.

4. The apparatus of claim 1, wherein:

the request to perform a job flow comprises a job flow identifier of the job flow definition;

the retrieval of the job flow definition comprises use of the job flow identifier, wherein the job flow definition comprises a set of flow task identifiers that each identify a task of the set of tasks; and the identifier associated with the first task comprises a flow task identifier of the set of flow task identifiers that identifies the first task.

5. The apparatus of claim 1, wherein the at least one processor is caused to perform operations comprising:

within a second performance container, execute instructions of a second instance of the performance routine to cause the at least one processor to, in response to the storage of the job performance request message within the job queue and in response to an uninstantiation of the first performance container prior to storage of a job completion message indicative of completion of the job flow within the job queue, perform operations comprising:

derive the order of performance of the set of tasks based on indications in the job flow definitions of dependencies among the set of tasks; and store, within the task queue, the first task routine execution request message.

6. The apparatus of claim 1, wherein the at least one processor is caused to perform operations comprising:

within a third task container, in response to the storage of the first task routine execution request message within the task queue and in response to an uninstantiation of the first task container prior to storage, within the task queue, of a task completion message indicative of completion of the first task, perform operations comprising:

use the identifier associated with the first task to retrieve the first task routine from the at least one federated area; and commence execution, within the third task container, of instructions of the first task routine to commence performance of the first task.

7. The apparatus of claim 1, wherein:

the at least one processor executes instructions of a resource allocation routine to cause the at least one processor to dynamically allocate multiple pods based on availability of at least one of processing resources and storage resources;

the first performance container and a first messaging container are instantiated within a first pod of the multiple pods;

within the first messaging container, instructions of a first instance of a messaging routine are executed by the at least one processor to cause the at least one processor to provide the first instance of the performance routine with access to the job queue and the task queue;

the first task container and a second messaging container are instantiated within a second pod of the multiple pods; and within the second messaging container, instructions of a second instance of the messaging routine are executed by the at least one processor to cause the at least one processor to provide the first task routine with access to the task queue.

8. The apparatus of claim 7, wherein:

a portal container and a third messaging container are instantiated within a third pod of the multiple pods;

within the portal container, the at least one processor executes instructions of an instance of a portal routine to cause the at least one processor to perform operations comprising:

receive the request to perform the job flow from the requesting device;

determine whether the requesting device or an operator of the requesting device is authorized to request a performance of the job flow;

retrieve the job flow definition from the at least one federated area; and store the job performance request message within the job queue.

9. The apparatus of claim 1, wherein the at least one processor executes instructions of a message broker routine to provide multiple queues comprising the job queue and the task queue.

10. A computer-program product tangibly embodied in a non-transitory machine-readable storage medium, the computer-program product including instructions operable to cause at least one processor to perform operations comprising:

receive, at the at least one processor and from a requesting device via a network, a request to perform a job flow, wherein:

the job flow is defined in a job flow definition that specifies a set of tasks to be performed via execution of a corresponding set of task routines during the job flow performance;

the job flow definition is stored among multiple job flow definitions within at least one federated area;

the set of task routines is stored among multiple task routines within the at least one federated area; and the at least one federated area is maintained within at least one storage device;

retrieve the job flow definition from among the multiple job flow definitions in the at least one federated area;

store, within a job queue, a job performance request message comprising the job flow definition;

within a first performance container, execute instructions of a first instance of a performance routine to cause the at least one processor to, in response to the storage of the job performance request message within the job queue, perform operations comprising:

derive an order of performance of the set of tasks that specifies at least a first task of the set of tasks to be performed and a second task to be performed after the first task, and that is based on indications in the job flow definition of dependencies among the set of tasks;

store, within a task queue, a first task routine execution request message comprising an identifier associated with the first task; and in response to at least storage of an execution completion message indicative of completion of execution of the first task routine within the task queue, store, within the task queue, a second task routine execution request message comprising an identifier associated with the second task to cause a latest version of a second task routine to be executed within a second task container to cause the at least one processor to perform the second task; and within a first task container, in response to the storage of the first task routine execution request message within the task queue, perform operations comprising:

use the identifier associated with the first task to retrieve a latest version of a first task routine of the set of task routines from the at least one federated area;

commence execution, within the first task container, of instructions of the first task routine to commence performance of the first task; and following completion of the execution of the first task routine, store, within the task queue, the execution completion message indicative of completion of execution of the first task routine.

11. The computer-program product of claim 10, wherein the at least one processor is caused to perform operations comprising:

within the first task container, following completion of the execution of the instructions of the first task routine, store, within the task queue, an execution completion message indicative of completion of execution of the first task routine;

within the first performance container, in response to at least storage of the execution completion message within the task queue, store a job completion message indicative of completion of the job flow within the job queue; and in response to storage of the job completion message within the job queue, transmit an indication of completion of the job flow to the requesting device via the network.

12. The computer-program product of claim 10, wherein the at least one processor is caused to perform operations comprising:

within the second task container, in response to the storage of the second task routine execution request message within the task queue, perform operations comprising:

use the identifier associated with the second task to retrieve a second task routine of the set of task routines from the at least one federated area; and commence execution, within the second task container, of instructions of the second task routine to commence performance of the second task.

13. The computer-program product of claim 10, wherein:

the request to perform a job flow comprises a job flow identifier of the job flow definition;

the retrieval of the job flow definition comprises use of the job flow identifier, wherein the job flow definition comprises a set of flow task identifiers that each identify a task of the set of tasks; and the identifier associated with the first task comprises a flow task identifier of the set of flow task identifiers that identifies the first task the retrieval of the first task routine comprises selecting, from among the multiple task routines stored within the at least one federated area, a latest version of task routine comprising instructions that, when executed by the at least processor, causes the at least one processor to perform the first task.

14. The computer-program product of claim 10, wherein the at least one processor is caused to perform operations comprising:

within a second performance container, execute instructions of a second instance of the performance routine to cause the at least one processor to, in response to the storage of the job performance request message within the job queue and in response to an uninstantiation of the first performance container prior to storage of a job completion message indicative of completion of the job flow within the job queue, perform operations comprising:

derive the order of performance of the set of tasks based on indications in the job flow definitions of dependencies among the set of tasks; and store, within the task queue, the first task routine execution request message.

15. The computer-program product of claim 10, wherein the at least one processor is caused to perform operations comprising:

within a third task container, in response to the storage of the first task routine execution request message within the task queue and in response to an uninstantiation of the first task container prior to storage, within the task queue, of a task completion message indicative of completion of the first task, perform operations comprising:

use the identifier associated with the first task to retrieve the first task routine from the at least one federated area; and commence execution, within the third task container, of instructions of the first task routine to commence performance of the first task.

16. The computer-program product of claim 10, wherein:

the at least one processor executes instructions of a resource allocation routine to cause the at least one processor to dynamically allocate multiple pods based on availability of at least one of processing resources and storage resources;

the first performance container and a first messaging container are instantiated within a first pod of the multiple pods;

within the first messaging container, instructions of a first instance of a messaging routine are executed by the at least one processor to cause the at least one processor to provide the first instance of the performance routine with access to the job queue and the task queue;

the first task container and a second messaging container are instantiated within a second pod of the multiple pods; and within the second messaging container, instructions of a second instance of the messaging routine are executed by the at least one processor to cause the at least one processor to provide the first task routine with access to the task queue.

17. The computer-program product of claim 16, wherein:

a portal container and a third messaging container are instantiated within a third pod of the multiple pods;

within the portal container, the at least one processor executes instructions of an instance of a portal routine to cause the at least one processor to perform operations comprising:

receive the request to perform the job flow from the requesting device;

determine whether the requesting device or an operator of the requesting device is authorized to request a performance of the job flow;

retrieve the job flow definition from the at least one federated area; and store the job performance request message within the job queue.

18. The computer-program product of claim 1, wherein the at least one processor executes instructions of a message broker routine to provide multiple queues comprising the job queue and the task queue.

19. A computer-implemented method comprising:

receiving, by at least one processor and from a requesting device via a network, a request to perform a job flow, wherein:

the job flow is defined in a job flow definition that specifies a set of tasks to be performed via execution of a corresponding set of task routines during the job flow performance;

the job flow definition is stored among multiple job flow definitions within at least one federated area;

the set of task routines is stored among multiple task routines within the at least one federated area; and the at least one federated area is maintained within at least one storage device;

retrieving the job flow definition from among the multiple job flow definitions in the at least one federated area;

storing, within a job queue, a job performance request message comprising the job flow definition;

within a first performance container, executing, by the at least one processor, instructions of a first instance of a performance routine causing the at least one processor to, in response to the storage of the job performance request message within the job queue, perform operations comprising:

deriving, by the at least one processor, an order of performance of the set of tasks that specifies at least a first task of the set of tasks to be performed and a second task to be performed after the first task, and that is based on indications in the job flow definition of dependencies among the set of tasks;

storing, within a task queue, a first task routine execution request message comprising an identifier associated with the first task; and in response to at least storage of an execution completion message indicative of completion of execution of the first task routine within the task queue, storing, within the task queue, a second task routine execution request message comprising an identifier associated with the second task to cause a latest version of a second task routine to be executed within a second task container to cause the at least one processor to perform the second task; and within a first task container, in response to the storage of the first task routine execution request message within the task queue, performing operations comprising:

using the identifier associated with the first task to retrieve a latest version of a first task routine of the set of task routines from the at least one federated area;

commencing execution of, by the at least one processor and within the first task container, instructions of the first task routine to commence performance of the first task; and following completion of the execution of the first task routine, storing, within the task queue, the execution completion message indicative of completion of execution of the first task routine.

20. The computer-implemented method of claim 19, comprising:

within the first task container, after completion of the execution of the instructions of the first task routine, storing, within the task queue, an execution completion message indicative of completion of execution of the first task routine;

within the first performance container, in response to at least storage of the execution completion message within the task queue, storing a job completion message indicative of completion of the job flow within the job queue; and in response to storage of the job completion message within the job queue, transmitting an indication of completion of the job flow to the requesting device via the network.

21. The computer-implemented method of claim 19, comprising:

within the second task container, in response to the storage of the second task routine execution request message within the task queue, performing operations comprising:

using the identifier associated with the second task to retrieve a second task routine of the set of task routines from the at least one federated area; and commencing execution of, by the at least one processor and within the second task container, instructions of the second task routine to commence performance of the second task.

22. The computer-implemented method of claim 19, wherein:

the request to perform a job flow comprises a job flow identifier of the job flow definition;

retrieving the job flow definition comprises using the job flow identifier, wherein the job flow definition comprises a set of flow task identifiers that each identify a task of the set of tasks; and the identifier associated with the first task comprises a flow task identifier of the set of flow task identifiers that identifies the first task.

23. The computer-implemented method of claim 19, comprising:

within a second performance container, executing, by the at least one processor, instructions of a second instance of the performance routine causing the at least one processor to, in response to the storage of the job performance request message within the job queue and in response to an uninstantiation of the first performance container prior to storage of a job completion message indicative of completion of the job flow within the job queue, perform operations comprising:

deriving the order of performance of the set of tasks based on indications in the job flow definitions of dependencies among the set of tasks; and storing, within the task queue, the first task routine execution request message.

24. The computer-implemented method of claim 19, comprising:

within a third task container, in response to the storage of the first task routine execution request message within the task queue and in response to an uninstantiation of the first task container prior to storage, within the task queue, of a task completion message indicative of completion of the first task, performing operations comprising:

using the identifier associated with the first task to retrieve the first task routine from the at least one federated area; and commencing execution of, by the at least one processor and within the third task container, instructions of the first task routine to commence performance of the first task.

25. The computer-implemented method of claim 19, wherein:

the at least one processor executes instructions of a resource allocation routine to cause the at least one processor to dynamically allocate multiple pods based on availability of at least one of processing resources and storage resources;

the first performance container and a first messaging container are instantiated within a first pod of the multiple pods;

within the first messaging container, instructions of a first instance of a messaging routine are executed by the at least one processor causing the at least one processor to provide the first instance of the performance routine with access to the job queue and the task queue;

the first task container and a second messaging container are instantiated within a second pod of the multiple pods; and within the second messaging container, instructions of a second instance of the messaging routine are executed by the at least one processor causing the at least one processor to provide the first task routine with access to the task queue.

26. The computer-implemented method of claim 25, wherein:

a portal container and a third messaging container are instantiated within a third pod of the multiple pods;

within the portal container, the at least one processor executes instructions of an instance of a portal routine causing the at least one processor to perform operations comprising:

receiving the request to perform the job flow from the requesting device;

determining whether the requesting device or an operator of the requesting device is authorized to request a performance of the job flow;

retrieving the job flow definition from the at least one federated area; and storing the job performance request message within the job queue.

27. The computer-implemented method of claim 19, comprising execute, by the at least one processor, instructions of a message broker routine to provide multiple queues comprising the job queue and the task queue.

* * * * *